United States Patent
Ohno et al.

(10) Patent No.: US 7,313,070 B2
(45) Date of Patent: Dec. 25, 2007

(54) REWRITABLE OPTICAL RECORDING MEDIUM AND OPTICAL RECORDING METHOD

(75) Inventors: Takashi Ohno, Yokohama (JP); Masae Kubo, Yokohama (JP); Michikazu Horie, Yokohama (JP); Masaaki Mizuno, Yokohama (JP); Hiroyuki Hoshino, Yokohama (JP); Akio Okamuro, Tokyo (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 10/890,414

(22) Filed: Jul. 14, 2004

(65) Prior Publication Data

US 2004/0248036 A1 Dec. 9, 2004

Related U.S. Application Data

(63) Continuation of application No. PCT/JP03/01509, filed on Feb. 13, 2003.

(30) Foreign Application Priority Data

| Feb. 13, 2002 | (JP) | ............................. | 2002-034827 |
| Mar. 18, 2002 | (JP) | ............................. | 2002-074818 |
| Apr. 26, 2002 | (JP) | ............................. | 2002-126491 |
| Oct. 31, 2002 | (JP) | ............................. | 2002-317858 |
| Nov. 27, 2002 | (JP) | ............................. | 2002-344557 |

(51) Int. Cl.
*G11B 7/125* (2006.01)
(52) U.S. Cl. .................... 369/59.12; 369/59.11
(58) Field of Classification Search ............ 369/59.12, 369/59.11; *B11B 7/00, 7/45; G11B 7/00, G11B 7/45, 7/125*
See application file for complete search history.

(56) References Cited

U.S. PATENT DOCUMENTS 4,629,649 A 12/1986 Osaka et al.

(Continued)

FOREIGN PATENT DOCUMENTS

EP 0 184 452 6/1986

(Continued)

OTHER PUBLICATIONS

Patent Abstracts of Japan, JP 11-232696, Aug. 27, 1999 (with corr. US 5,879,773).

(Continued)

*Primary Examiner*—A M Psitos
(74) *Attorney, Agent, or Firm*—Oblon, Spivak, McClelland, Maier & Neustadt, P.C.

(57) ABSTRACT

The present invention provides CD-RW which makes high velocity recording at a level of at least 24-times velocity possible, rewritable DVD which makes high velocity recording at a level of at least 6-times velocity possible, and a recording method therefor, while maintaining interchangeability with conventional CD-RW standards and rewritable DVD standards.

A rewritable optical recording medium comprising a substrate and a phase-change type recording layer, wherein a portion in a crystalline state corresponds to an unrecorded or erased state, and a portion in an amorphous state correspond to a recorded state, to record EFM modulated information by forming amorphous marks by irradiating the recording layer with a recording laser beam, and wherein recording is carried out by irradiating a recording laser beam having a wavelength of about 780 nm through an optical system having a numerical aperture NA of 0.5 or 0.55, at 24-times velocity or 32-times velocity of the reference velocity, where the reference velocity (1-time velocity) is a linear velocity of from 1.2 m/s to 1.4 m/s, modulation $m_{11}$ of record signals is from 60% to 80%, the top value $R_{top}$ of the reflectivity of the high pattern is from 15% to 25%, and jitters are at most 35 nsec.

22 Claims, 67 Drawing Sheets

U.S. PATENT DOCUMENTS

| | | | |
|---|---|---|---|
| 4,710,452 A | 12/1987 | Raychaudhuri | |
| 4,774,170 A | 9/1988 | Pan et al. | |
| 4,795,695 A | 1/1989 | Pan et al. | |
| 4,798,785 A | 1/1989 | Pan et al. | |
| 4,812,385 A | 3/1989 | Pan et al. | |
| 4,812,386 A | 3/1989 | Pan et al. | |
| 4,865,955 A | 9/1989 | Pan et al. | |
| 4,904,577 A | 2/1990 | Tyan et al. | |
| 4,960,680 A | 10/1990 | Pan et al. | |
| 4,981,772 A | 1/1991 | Pan et al. | |
| 5,055,331 A | 10/1991 | Raychaudhuri | |
| 5,077,181 A | 12/1991 | Pan et al. | |
| 5,123,007 A | 6/1992 | Miyauchi et al. | |
| 5,221,588 A | 6/1993 | Morimoto et al. | |
| 5,234,803 A | 8/1993 | Raychaudhuri | |
| 5,254,382 A | 10/1993 | Ueno et al. | |
| 5,257,256 A | 10/1993 | Terao et al. | |
| 5,271,978 A | 12/1993 | Vazan et al. | |
| 5,312,664 A | 5/1994 | Raychaudhuri | |
| 5,412,626 A | 5/1995 | Ohno et al. | |
| 5,530,688 A | 6/1996 | Hurst, Jr. et al. | |
| 5,732,062 A | 3/1998 | Yakoi et al. | |
| 5,789,055 A | 8/1998 | Yoon | |
| 5,818,808 A | 10/1998 | Takada et al. | |
| 5,848,043 A | 12/1998 | Takada et al. | |
| 5,849,458 A | 12/1998 | Pan et al. | |
| 5,862,123 A | 1/1999 | Horie et al. | |
| 5,879,773 A | 3/1999 | Hatwar et al. | |
| 6,004,646 A | 12/1999 | Ohno et al. | |
| 6,108,295 A | 8/2000 | Ohno et al. | |
| 6,115,352 A | 9/2000 | Ohno et al. | |
| 6,115,353 A | 9/2000 | Horie et al. | |
| 6,128,273 A | 10/2000 | Horie et al. | |
| 6,143,468 A | 11/2000 | Ohno et al. | |
| 6,177,166 B1 | 1/2001 | Ohno et al. | |
| 6,256,277 B1 | 7/2001 | Saga et al. | |
| 6,294,310 B1 | 9/2001 | Ohno et al. | |
| 6,411,579 B2 | 6/2002 | Nobukuni et al. | |
| 6,567,367 B2 | 5/2003 | Ohno et al. | |
| 6,587,425 B2 | 7/2003 | Ohno et al. | |
| 6,596,366 B2 | 7/2003 | Ohno | |
| 6,661,760 B2 * | 12/2003 | Nobukuni et al. | 369/59.11 |
| 6,707,783 B2 | 3/2004 | Ohno | |
| 6,723,410 B2 | 4/2004 | Ohno et al. | |
| 6,771,577 B2 * | 8/2004 | Yokoi | 369/59.11 |
| 2002/0001284 A1 | 1/2002 | Inoue et al. | |
| 2002/0012305 A1 | 1/2002 | Shingai et al. | |
| 2002/0015816 A1 | 2/2002 | Shingai et al. | |
| 2002/0146643 A1 | 10/2002 | Shingai et al. | |

FOREIGN PATENT DOCUMENTS

| | | |
|---|---|---|
| EP | 0 388 897 | 9/1990 |
| EP | 0 902 424 | 3/1999 |
| JP | 60-177446 | 9/1985 |
| JP | 61-156545 | 7/1986 |
| JP | 62-246788 | 10/1987 |
| JP | 62-259229 | 11/1987 |
| JP | 63-76121 | 4/1988 |
| JP | 63-201927 | 8/1988 |
| JP | 63-244422 | 10/1988 |
| JP | 63-266632 | 11/1988 |
| JP | 63-298726 | 12/1988 |
| JP | 64-14083 | 1/1989 |
| JP | 64-059651 | 3/1989 |
| JP | 64-060832 | 3/1989 |
| JP | 64-63195 | 3/1989 |
| JP | 1-303643 | 12/1989 |
| JP | 2-88288 | 3/1990 |
| JP | 4-501742 | 3/1992 |
| JP | 4-232780 | 8/1992 |
| JP | 5-016528 | 1/1993 |
| JP | 6-12674 | 1/1994 |
| JP | 7-37251 | 2/1995 |
| JP | 7-37252 | 2/1995 |
| JP | 8-287465 | 11/1996 |
| JP | 9-282661 | 10/1997 |
| JP | 9-286174 | 11/1997 |
| JP | 9-286175 | 11/1997 |
| JP | 10-172179 | 6/1998 |
| JP | 10-326436 | 12/1998 |
| JP | 11-115313 | 4/1999 |
| JP | 11-240250 | 9/1999 |
| JP | 2000-79761 | 3/2000 |
| JP | 2000-233576 | 8/2000 |
| JP | 2000-313170 | 11/2000 |
| JP | 2001-39031 | 2/2001 |
| JP | 2001-67719 | 3/2001 |
| JP | 2002-11958 | 1/2002 |
| JP | 2002-079757 | 3/2002 |
| JP | 2002-264506 | 9/2002 |
| JP | 2002-347341 | 12/2002 |
| JP | 2003-191638 | 7/2003 |
| JP | 2003-231354 | 8/2003 |
| JP | 2003-291534 | 10/2003 |
| JP | 2003-335065 | 11/2003 |

OTHER PUBLICATIONS

Patent Abstracts of Japan, JP 2002-008236, Jan. 11, 2002 (with corr. US 2002/0012305 A1).

Patent Abstracts of Japan, JP 2002-157737, May 31, 2002 (with corr. US 2002/0001284 A1).

Patent Abstracts of Japan, JP 2002-172860, Jul. 18, 2002 (with corr. US 2002/0146643 A1).

Patent Abstracts of Japan, JP 9-293269, 1997 (with corr. US 5,789,055).

Patent Abstracts of Japan, JP 11-175976, Jul. 2, 1999 (with corr. US 6,256,277).

Patent Abstracts of Japan, JP 09-007176, Jan. 10, 1997 (with corr. US 5,818,808 and US 5,848,043).

J. Feinleib, et al., "Rapid Reversible Light-Induced Crystallization of Amorphous Semiconductors", Applied Physics Letters, vol. 18, No. 6, Mar. 15, 1971, pp. 254-257.

I. Friedrich, et al., "Structural transformations of $Ge_2Sb_2Te_5$ films studied by electrical resistance measurements", Journal of Applied Physics, vol. 87, No. 9, May 1, 2000, pp. 4130-4134.

C. N. Afonso, et al., "Ultrafast reversible phase change in GeSb films for erasable optical storage", Appl. Phys. Lett., vol. 60, No. 25, Jun. 22, 1992, pp. 3123-3125.

Kazuya Nakayama, et al., "Phase-change switching memory", PCOS2001, Towards the new stage of Phase Change Optical and Electronic Memories, Proceedings of The 13th Symposium Phase Change Optical Information Storage, Dec. 6 and 7, 2001, pp. 61-66.

G. F. Zhou, et al., "Crystallization behaviour of phase change materials: Comparison between nucleation- and growth- dominated crystallization", Optical Data Storage 2000, Proceedings of SPIE-The International Society for Optical Engineering, vol. 4090, May 14 and 17, 2000, pp. 108-115.

N. Nobukuni, et al., "Microstructural changes in GeSbTe film during repetitious overwriting in phase-change optical recording", J. Appl. Phys., vo. 78, No. 12, Dec. 15, 1995, pp. 6980-6988.

Tatsuya Kato, et al., "The Phase Change Optical Disc with the Data Recording Rate of 140 Mbps", Jpn. J. Phys., vol. 41, Part 1, No. 3B, Mar. 2002, pp. 1664-1667.

Natsuko Nobukuni, et al., "High speed rewritable CD and DVD", Phase Change Optical Recording toward Next Generation, Proceedings of The 12th Symposium on Phase Change Optical Information Storage, PCOS2000, Nov. 30 to Dec. 1, 2000, pp. 52-55.

Michikazu Horie, et al., "High speed rewritable DVD up to 20m/s with nucleation-free eutectic phase-change material of $Ge(Sb_{70}Te_{30})$+Sb", Proceedings of SPIE, SPIE-The International Society for Optical Engineering, Optical Data Storage 2000, vol. 4090, May 14 to 17, 2000, pp. 135-143.

Michikazu Horie, et al., "Material Characterization and Application of Eutectic SbTe Based Phase-Change Optical Recording Media", Proceedings of Spie Reprint, SPIE-The International Society for Optical Engineering, vol. 4342, Apr. 22 to 25, 2001.

U.S. Appl. No. 09/573,319, filed May 18, 2000, Unknown.

U.S. Appl. No. 09/530,599, filed May 9, 2000, Mizuno et al.

U.S. Appl. No. 09/919,846, filed Aug. 2, 2001, Ohno et al.

U.S. Appl. No. 10/059,193, filed Jan. 31, 2002, Horie et al.

U.S. Appl. No. 10/378,990, filed Mar. 5, 2003, Horie et al.

U.S. Appl. No. 10/657,121, filed Sep. 9, 2003, Nobukuni et al.

U.S. Appl. No. 10/890,414, filed Jul. 14, 2004, Ohno et al.

* cited by examiner (a)

(b)

(a)

(b)

(c)

(d)

(e)

(f)

(a)

(b)

(a)

(b)

(a)

(b)

(a)

(b)

(c)

(d)

(e)

(f)

(a)

(b)

(a)

(b)

(a)

(b)

(a)

(b)

(a)

(b)

(c)

(d)

(e)

(f)

(a)

(b)

(a)

(b)

(a)

(b)

(a)

(b)

(a)

(b)

(a)

(b)

(a)

(b)

(a)

(b)

(c)

(d)

(b)

(a)

(a)

(b)

(a)

(b)

(c)

(d)

*: Recording method CD1-2e, **: Comparative recording method CD1,
***: Recording method CD2

(a)

(b)

\*: Recording method CD1-2e
\*\*: Comparative recording method CD1
\*\*\*: Comparative recording method CD2

*: Recording method CD1-2e, **: Comparative recording method CD1,
***: Comparative recordign method CD2

(a)

(b)

(c)

(d)

(a)

(b)

\*: Recording method CD1-2e
\*\*: Comparative recording method CD1

(a)

(b)

(c)

(d)

(a)

(b)

(a)

(b)

(c)

(d)

(a)

(b)

(a)

(b)

(a)

(b)

(c)

(d)

(a)

(b)

(c)

(d)

(a)

(b)

(c)

(c)

(a)

(b)

(a)

(b)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

(a)

(b)

(c)

REWRITABLE OPTICAL RECORDING MEDIUM AND OPTICAL RECORDING METHOD

CROSS REFERENCE TO RELATED APPLICATION

This is a Continuation Application of PCT Application No. PCT/JP03/01509, filed on Feb. 13, 2003, which was not published under PCT Article 21(2) in English. This application is based upon and claims the benefit of priority from the prior Japanese Patent Application Nos. 2002-034827, filed Feb. 13, 2002, 2002-074818, filed Mar. 18, 2002, 2002-126491, filed Apr. 26, 2002, 2002-317858, filed Oct. 31, 2002, 2002-344557, filed November 2002, the entire contents of which are incorporated herein by reference.

TECHNICAL FIELD

The present invention relates to a rewritable optical recording medium (in the present invention, a rewritable optical recording medium may simply be referred to as an optical recording medium, a medium, an optical disk or a disk) which has retrieving interchangeability with a readout-only medium specified in conventional CD-ROM or DVD (—ROM) standards, and a recording method therefor. Particularly, it provides a rewritable optical recording medium capable of one-beam overwriting at a linear velocity as high as at least 20 m/s. Further, it provides a recording method, whereby excellent recording can be carried out within a wide range of recording linear velocity.

BACKGROUND ART

With a compact disk (CD) or a digital versatile disk (DVD), it is common that recording of binary signals and detection of tracking signals are carried out by utilizing a change in reflectivity caused by interference or reflected lights from the mirror surface and the bottom of pits.

In recent years, phase-change type rewritable compact disks (CD-RW, CD-Rewritable) or phase-change type rewritable DVD (tradename: DVD-RW, DVD+RW, in this specification, rewritable DVD may sometimes be referred to as RW-DVD) have been used as optical recording media interchangeable with CD or DVD.

Such phase-change type CD-RW or RW-DVD utilizes a phase difference and a difference in reflectivity caused by a difference in the refractive index between an amorphous state and a crystalline state to detect recording information signals. A usual phase-change type CD-RW or RW-DVD has a structure comprising a substrate, and a lower protective layer, a phase-change type recording layer, an upper protective layer and a reflective layer, formed on the substrate, so that multiple interference of these layers can be utilized to control the difference in reflectivity and the phase difference and to provide interchangeability with CD or DVD. Further, recording on CD-RW or RW-DVD means recording by overwriting wherein recording and erasing are carried out simultaneously.

As a result, although it is difficult to secure interchangeability covering a high reflectivity as high as at least 70%, it is possible to secure interchangeability of recording signals and groove signals within a range where the reflectivity is lowered to a level of from 15 to 25% in the case of CD-RW or to a level of from 18 to 30% in the case of RW-DVD, and retrieving can be carried out by a current CD drive or DVD drive for retrieving only, if an amplifying system to complement the low reflectivity is added to the retrieving system.

However, one of problems in using CD-RW or RW-DVD is that the recording velocity and the transfer rate are low. The reference velocity (hereinafter referred to also as 1-time velocity) in recording/retrieving of CD is a linear velocity (in this specification, "a linear velocity" may simply be referred to as "linear speed" of from 1.2 to 1.4 m/s. However, for CD-ROM, a high velocity retrieving at a level of 40-times velocity at the maximum has been already realized, and a low velocity at a level of 1-time velocity is used only for retrieving of musics or images. Usually, in up to 16-times velocity retrieving, a constant linear velocity mode (CLV) inherent to CD is used, but in 24 to 40-times velocity retrieving, the transfer rate, access and seek times for the outer periphery data have been remarkably speeded up by an application of a constant angular velocity mode (CAV).

Speeding up in recording is in progress also for CD-RW, but in CLV mode, the speed is still at a level of 12-times velocity at best. Usually, with CD-RW, it takes a time as much as 74 minutes (or 63 minutes) if recording is made over the entire surface at 1-time velocity, and even at 12-times velocity, it takes about 6 minutes. However, at 20-times velocity, recording can be completed in 5 minutes, whereby the application of CD-RW can be substantially broadened for recording data of large amounts such as musics and images.

Further, as a peripheral memory device for a computer, CD-R has already accomplished 24-times velocity for recording, and also for CD-RW, it is desired to increase the transfer rate in recording.

On the other hand, the reference velocity (hereinafter referred to also as 1-time velocity) in retrieving of DVD is a linear velocity of 3.49 m/s, but with DVD-ROM, high velocity retrieving at a level of 16-times velocity at the maximum has already been realized, and a low velocity at a level of 1-time velocity is used only for retrieving of musics or images.

Speeding up in recording is in progress also for RW-DVD, but in CLV mode, it is still at a level of 2.4-times velocity at best. Usually, with RW-DVD, it takes a time as much as about 60 minutes if recording is carried out over the entire surface at 1-time velocity, and even at 2.4-times velocity, it takes about 25 minutes. However, at 6-times velocity, recording can be completed in 10 minutes, and application of RW-DVD can be substantially broadened for recording data of large amounts such as musics or images.

Therefore, a phase-change medium and a recording method have been desired whereby recording can be carried out at a higher velocity.

However, a rewritable phase-change medium capable of recording up to a high linear velocity of at least 20-times velocity for CD or at least 6-times velocity for RW-DVD, has not yet been realized. This means that a rewritable CD or DVD medium which is overwritable at a high linear velocity at a level of exceeding a linear velocity of 20 m/s, has not yet been realized.

A first reason for why such a rewritable phase-change medium can not be realized, is that it is difficult to simultaneously satisfy the archival stability of amorphous marks and erasing in a short time by high speed crystallization of amorphous marks.

For example, with a recording material comprising a SbTe alloy as the main component which is used as a material for a recording layer of CD-RW overwritable at 1 to 4-times velocity or RW-DVD overwritable at up to about 2.4-times velocity, high speed crystallization is possible by relatively increasing the Sb content, whereby overwriting at a linear speed of at least 20 m/s will be possible. However, according to a study made by the present inventors, it has been found that such an increase of the Sb content tends to substantially impair the archival stability of amorphous marks, whereby amorphous marks will disappear by recrystallization to such an extent that no retrieving is possible, within 1 to 2 years at room temperature or in a few days in a high temperature environment at a level of from 50 to 80° C. in the interior of the recording apparatus. Otherwise, there is a serious problem such that amorphous marks start to disappear by repeated retrieving from about a few hundreds to a few thousands times by a laser beam of at most 1 mW, and it has been found that the reliability as a recording medium can not be maintained.

In addition to the necessity to solve such a problem, CD-RW or RW-DVD has a restriction such that it is necessary to secure retrieving interchangeability with a widely used CD-ROM drive or DVD-ROM drive for retrieving only.

For example, in the case of CD-RW, in order to secure retrieving interchangeability, it is necessary to satisfy not only a high modulation at a level of a modulation of from 55 to 70% but also a reflectivity of from 15 to 25% and other servo signal characteristics. On the other hand, in the case of RW-DVD, in order to secure retrieving interchangeability, it is necessary to satisfy not only a high modulation at a level of a modulation of from 55 to 70% but also a reflectivity of from 18 to 30% and other servo signal characteristics.

Further, a second reason for why CD-RW or RW-DVD overwritable at a high linear velocity of at least 24 m/s has not yet been realized, is that a fairly strict recording pulse strategy (pulse division method) is specified in CD-RW standards or RW-DVD standards.

Namely, in CD-RW standards Orange Book, Part 3, a recording pulse strategy as shown in FIG. 1, is specified. Accordingly, in a currently practically used recording device, IC for generating such a recording pulse strategy is employed. Accordingly, with a currently practically used recording device, it is obliged to carry out recording in a wide range of linear velocity ranging from 1-time velocity to 8- to 10-times velocity by such a recording pulse strategy or by a recording pulse strategy having certain changes made thereto.

Also in standards for DVD-RW or DVD+RW as standards for rewritable DVD, a similar recording strategy is specified. A characteristic of such a recording strategy is that an amorphous mark having a nT mark length is divided into n−1 recording pulses and cooling pulses (off-pulses) for recording. Therefore, in such a recording strategy, an average repeating period for a pair of a recording pulse and a cooling pulse is made to be about 1 T.

FIG. 1(a) shows EFM modulated data signals having time lengths of from 3 T to 11 T, and FIG. 1(b) shows the practical recording laser powers generated on the basis of such data signals. Pw represents a writing power to form an amorphous mark by melting and quenching the recording layer, Pe represents an erasing power to erase an amorphous mark by crystallization, and usually, a bias power Pb is substantially the same as a retrieving power Pr of a retrieving laser beam. Writing power (Pw) irradiation sections are referred to as recording pulses, and bias power irradiation sections are referred to as off-pulses.

In the case of EFM+ modulation, data signals having time lengths of 14 T are added to the above-mentioned data signals having time lengths of from 3 to 11 T.

Here, in the above-mentioned recording strategies, a repeating period for a recording pulse and an off-pulse is basically constant as a reference clock period T. The reference clock period T is made to have a high frequency in proportion to the linear velocity in high linear velocity recording.

At a reference velocity of 1-time velocity for CD, T=231 nsec, but at 24-times velocity, T=9.6 nsec, and at 32-times velocity, T=7.2 nsec. Accordingly, in a case where the recording pulse strategy shown in FIG. 1 is used in high linear velocity recording at least 24-times velocity, the time widths of divided recording pulses and off-pulses in FIG. 1 will be less than 5 nsec by the above-mentioned change for high frequency corresponding to the high velocity recording.

On the other hand, at a reference velocity of 1-time velocity for DVD, T=38.2 nsec, but at 6-times velocity, T=6.4 nsec, and at 8-times velocity, T=4.8 nsec. Accordingly, in high linear velocity recording at least 6-times velocity, the time widths of divided recording pulses and off-pulses in FIG. 1 will be at most 3 nsec by the above-mentioned change for high frequency corresponding to such high velocity recording.

Whereas, by irradiation with a laser beam having a usual writing power, it takes from 1 to 3 nsec in rising or falling. Accordingly, at such a high frequency, the rise time or the fall time can not be neglected, and the lengths of recording pulse sections and the lengths of off-pulse sections will further substantially be shortened and will be substantially less than 5 nsec (in the case of CD-RW) or less than 3 nsec (in the case of RW-DVD). In such a case, heating for recording pulses tends to be inadequate, and the required writing power will be sharply high. On the other hand, cooling for the off-pulse sections also tends to be inadequate, whereby a cooling rate required for the change into an amorphous state tends to be hardly obtainable. Further, for the high linear velocity recording, it is common to employ a material having a high erasing speed i.e. a high crystallization speed for the recording layer for CD-RW or RW-DVD. Accordingly, deficiency in the cooling rate for the above-mentioned off-pulse sections, tends to lead to recrystallization of the once-melted region.

Accordingly, with the recording pulse strategy shown in FIG. 1, it is very difficult to carry out high velocity recording at a level of at least 24-times velocity on CD-RW or to carry out high velocity recording at a level of at least 6-times velocity on RW-DVD.

In order to solve such problems, some of the present inventors have already realized overwriting on CD at 16-times velocity or on DVD at 5-times velocity by a division method wherein the repeating period of a recording pulse and an off-pulse is set to be 2 T base (JP-A-2001-331936). However, even if such a division method of 2 T base is employed, it is necessary, as mentioned above, to employ a material having a high crystallization speed for high linear velocity recording at a level of at least 24-times velocity for CD or at a level of at least 6-times velocity for DVD, while, if such a material is employed, the recrystallization phenomenon will be more serious due to deficiency of the cooling rate.

It is an object of the present invention to provide a rewritable optical recording medium to be used for high velocity recording at a level of at least 20 m/s and a recording method therefor.

A specific object of the present invention is to provide CD-RW to be used for high velocity recording at a level of at least 24-times velocity and a recording method therefor. More specifically, the object is to provide a rewritable medium having retrieving interchangeability with CD with respect to the recording signal format and a recording method therefor, wherein in CD-RW, an amorphous state of the recording layer corresponds to a recorded mark, and mark length recording is carried out by EFM modulation (i.e. by a combination of mark lengths and space lengths between marks, having time lengths of from 3 T to 11 T, based on the reference clock period T of data).

A specific object of the present invention is to provide a rewritable DVD recording medium to be used for high velocity recording at a level of at least 6-times velocity. More specifically, the object is to provide a rewritable medium having retrieving interchangeability with DVD with respect to the recording signal format, and a recording method therefor, wherein an amorphous state of the recording layer corresponds to a recorded mark, and mark length recording is carried out by EFM+ modulation, i.e. a combination of mark lengths and space lengths between marks, having time lengths of from 3 T to 14 T, based on the reference clock period T of data.

DISCLOSURE OF THE INVENTION

In the first aspect, the present invention provides a rewritable optical recording medium comprising a substrate having a guide groove formed thereon, and a phase-change type recording layer, wherein a portion in a crystalline state of the phase-change type recording layer corresponds to an unrecorded or erased state, and a portion in an amorphous state of the phase-change type recording layer corresponds to a recorded state, so that an amorphous mark corresponding to the recorded state will be formed upon irradiation with a recording laser beam, and wherein when EFM modulation signals are recorded by overwriting 10 times by one recording method selected from the conditions of the following recording methods CD1-1 and CD1-2 while maintaining the reference clock period T to satisfy $VT=V_1T_1$, where $V_1$ is a reference velocity (1-time velocity) which is set to be a linear velocity of 1.2 m/s, V is a linear velocity which is selected to be either $V=24V_1$ i.e. a linear velocity 24 times the reference velocity, or $V=32V_1$ i.e. a linear velocity 32 times the reference velocity, and $T_1$ is 231 nsec, and then, record signals are retrieved at 1-time velocity, the modulation $m_{11}$ of an eye pattern of the record signals obtained by the retrieving is from 60 to 80%, the top value $R_{top}$ of the reflectivity of the eye pattern of the record signals is from 15 to 25%, and jitters of the respective mark lengths and the respective spaces between marks are at most 35 nsec;

Recording Method CD1-1:

A laser beam having a wavelength of 780 nm is applied via an optical system having a numerical aperture NA of 0.5, wherein when the time length of one amorphous mark is represented by nT (where n is an integer of from 3 to 11), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1+\Delta_1$ (where $\Delta_1=0.3$ to 0.6), $\alpha_i'=\alpha c$ (where i is an integer of from 2 to m−1), $\beta_{i-1}'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.3$ to 0.6, and $\beta_m'=\beta_m$, a recording laser beam having a constant writing power Pw sufficient to melt the recording layer (provided that Pw is from 20 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\alpha c$, $\beta_m(=\beta_m')$, $\beta_1$, $\Delta_1$, $\beta_{m-1}$, $\alpha_m$ and $\Delta_m$ are constant irrespective of m, when m=2 (n=4, 5), $\alpha_1$, $\alpha_1'$, $\alpha_2$, $\alpha_2'$, $\beta_2$ and $\beta_2'$ are made to be equal to $\alpha_1$, $\alpha_1'$, $\alpha_3'$, $\alpha_3'$, $\beta_3$ and $\beta_3'$ in the case where m is 3, respectively, $\beta_1$ is made to be equal to either $\beta_1$ or $\beta_2$ in the case where m is 3, and $\beta_1'$ is made to be equal to either $\beta_1'$ or $\beta_2'$ in the case where m is 3, and when m=1 (n=3), irradiation with a recording laser beam comprising a pair of a writing power irradiation section $\alpha_1'T$ and a bias power irradiation section $\beta_1'T$ is carried out;

Recording Method CD1-2:

A laser beam having a wavelength of 780 nm is applied via an optical system having a numerical aperture NA of 0.5, wherein when the time length of one amorphous mark is represented by nT (where n is an integer of from 3 to 11), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1$, $\alpha_i'=\alpha c$ (where i is an integer of from 2 to m−1), $\beta_{i-1}'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.5$ to 1.2, and $\beta_m'=\beta_m$, a recording laser beam having a constant writing power Pw sufficient to melt the recording layer (provided that Pw is from 20 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\beta_1(=\beta_1')$, $\alpha c$, $\beta_{m-1}$, $\Delta_{m-1}$, $\alpha_m$, $\beta_m$ and $\Delta_m'$ are constant irrespective of m, when m=2 (n=4, 5), $\alpha_1$, $\alpha_1'$, $\beta_1$, $\beta_1'$, $\alpha_2$, $\alpha_2'$, $\beta_2$ and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m is 3, respectively, and when m=1 (n=3), irradiation with a recording laser beam comprising a pair of a writing power irradiation section $\alpha_1'T$ and a bias power irradiation section $\beta_1'T$ is carried out.

In the second aspect, the present invention provides a rewritable optical recording medium comprising a substrate having a guide groove formed thereon, and a phase-change type recording layer, wherein a portion in a crystalline state of the phase-change type recording layer corresponds to an unrecorded or erased state, and a portion in an amorphous state of the phase-change type recording layer corresponds to a recorded state, so that an amorphous mark corresponding to the recorded state will be formed upon irradiation with a recording laser beam, and wherein when EFM+ modulation signals are recorded by overwriting 10 times by one recording method selected from the conditions of the following recording methods DVD1-1 and DVD1-2 while maintaining the reference clock period T to satisfy $VT=V_1T_1$, where $V_1$ is a reference velocity (1-time velocity) which is set to be a linear velocity of 3.49 m/s, V is a linear velocity which is selected to be one of $V=6V_1$ i.e. a linear velocity 6 times the reference velocity, $V=8V_1$ i.e. a linear velocity 8 times the reference velocity, $V=10V_1$ i.e. a linear velocity 10 times the reference velocity and $V=12V_1$ i.e. a linear velocity 12 times the reference velocity, and $T_1$ is 38.2 nsec, and then, record signals are retrieved at 1-time velocity, the modulation $m_{14}$ of an eye pattern of the record signals obtained by the retrieving is from 55 to 80%, the top value $R_{top}$ of the reflectivity of the eye pattern of the record signals is from 18 to 30%, and the clock jitter of the retrieved signals is at most 15%;

Recording Method DVD1-1:

A laser beam having a wavelength of 650 nm is irradiated via an optical system having a numerical aperture NA of 0.65, wherein when the time length of one amorphous mark is represented by nT (where n is an integer of from 3 to 11 and 14), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_iT$ and $\beta_iT$ comprising $\alpha_iT$, $\beta_1T$, $\alpha_2T$, $\beta_2T$, ..., $\alpha_mT$ and $\beta_mT$ so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and 3 m=0 to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1+\Delta_1$ (where $\Delta_1=0.3$ to 0.6), $\alpha_i'=\alpha c$ (where i is an integer of from 2 to m−1), $\beta_{i-1}'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq 0.6$), $\Delta_{mm}=\Delta_{m-1}+\Delta_m=0.3$ to 0.6, and $\beta_m'=\beta_m$, a recording laser beam having a constant writing power Pw sufficient to melt the recording layer (provided that Pw is from 10 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\alpha c$, $\beta_m(=\beta_m')$, $\beta_1$, $\Delta_1$, $\beta_{m-1}$, $\Delta_{m-1}$, $\alpha_m$ and $\Delta_m$ are constant irrespective of m, when m=2 (n=4, 5), $\alpha_1$, $\alpha_1'$, $\alpha_2$, $\alpha_2'$, $\beta_2$ and $\beta_2'$ are made to be equal to $\alpha_1$, $\alpha_1'$, $\alpha_3$, $\alpha_3'$, $\beta_3$ and $\beta_3'$ in the case where m is 3, respectively, $\beta_1$ is made to be equal to either $\beta_1$ or $\beta_2$ in the case where m is 3, and $\beta_1'$ is made to be equal to either $\beta_1'$ or $\beta_2'$ in the case where m is 3, and when m=1 (n=3), irradiation with a recording laser beam comprising a pair of a writing power irradiation section $\alpha_1'T$ and a bias power irradiation section $\beta_1'T$ is carried out;

Recording Method DVD1-2:

A laser beam having a wavelength of 650 nm is irradiated via an optical system having a numerical aperture NA of 0.65, wherein when the time length of one amorphous mark is represented by nT (where n is an integer of from 3 to 11 and 14), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_iT$ and $\beta_iT$ comprising $\alpha_iT$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.4 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1$, $\alpha_i'=\alpha c$ (where i is an integer of from 2 to m−1), $\beta_1'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq 0.6$), $\Delta_{mm}=\Delta_{m-1}+\Delta_m=0.5$ to 1.2, and $\beta_m'=\beta_m$, a recording laser beam having a constant writing power Pw sufficient to melt the recording layer (provided that Pw is from 10 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\beta_1(=\beta_1')$, $\alpha c$, $\beta_{m-1}$, $\Delta_{m-1}$, $\alpha_m$, $\beta_m$ and $\Delta_m'$ are constant irrespective of m, when m=2 (n=4, 5), $\alpha_1$, $\alpha_1'$, $\beta_1$, $\beta_1'$, $\alpha_2$, $\alpha 2'$, $\beta_2$ and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m is 3, respectively, and when m=1 (n=3), irradiation with a recording laser beam comprising a pair of a writing power irradiation section $\alpha_1'T$ and a bias power irradiation section $\beta_1'T$ is carried out.

In the third aspect, the present invention provides a recording method for a rewritable optical recording medium, which comprises recording information on a rewritable optical recording medium by a plurality of record mark lengths and space lengths between record marks, wherein:

between record marks, a laser beam having an erasing power Pe capable of crystallizing an amorphous phase is applied to form spaces between record marks, and when the time length of one record mark is represented by nT (where T is the reference clock period), for a record mark of n=2m (where m is an integer of at least 1), of which the time length (n−j)T (where j is a real number of from −2.0 to 2.0) is divided into m sections of $\alpha_iT$ and $\beta_iT$ comprising $\alpha_iT$, $\beta_1T$, $\alpha_2T$, $\beta_2T$, ..., $\alpha_mT$ and $\beta_mT$ (provided that $\Sigma_i(\alpha_i+\beta_i)=n-j$), and for a record mark of n=2m+1 (where m is an integer of at least 1), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$ (provided that $\Sigma_i(\alpha_i'+\beta_i')=n-k$), a laser beam having a constant writing power Pw sufficient to melt the recording layer is applied within a time of $\alpha_i T$ and $\alpha_i' T$ (where i is an integer of from 1 to m), and a laser beam having a bias power Pb is applied within a time of $\beta_i T$ and $\beta_i' T$ (where i is an integer of from 1 to m); and further, when $m \geq 3$, for a record mark of n=2m, when the start time for nT mark is represented by $T_0$, (i) after a delay time $T_{d1} T$ from $T_0$, $\alpha_1 T$ is generated, then, (ii) within i=2 to m, $\beta_{i-1} T$ and $\alpha_i T$ are alternately generated in this order, while $\beta_{i-1} + \alpha_i$ maintains about period 2 (provided that at i=2 and/or i=m, $\beta_{i-1} + \alpha_i$ may be deviated from about period 2 within a range of ±0.5, and when $m \geq 4$, $\beta_{i-1}$ and $\alpha_i$ take constant values $\beta c$ and $\alpha c$, respectively, within i=3 to m−1), and then, (iii) $\beta_m T$ is generated, and for a record mark of n=2m+1, when the start time for nT mark is represented by $T_0$, (i) after a delay time $T_{d1}' T$ from $T_0$, $\alpha_1' T$ is generated, then, (ii) within i=2 to m, $\beta_{i-1}' T$ and $\alpha_i' T$ are alternately generated in this order, while $\beta_{i-1}' + \alpha_i'$ maintains about period 2 (provided that at i=2 and/or i=m, $\beta_{i-1}' + \alpha_i'$ may be deviated from about period 2 within a range of ±2, and when $m \geq 4$, $\beta_{i-1}'$ and $\alpha_i'$ take constant values $\beta c$ and $\alpha c$, respectively, within i=3 to m−1), and then, (iii) $\beta_m' T$ is generated, and with the same m, for a record mark of n=2m and a record mark of n=2m+1, $T_{d1} = T_{d1}'$, $\alpha_1 = \alpha_1'$, $\beta_1 = \beta_1'$ and $\alpha_m \neq \alpha_m'$, and at least one set selected from ($\beta_{m-1}$ and $\beta_{m-1}'$) and ($\beta_m$ and $\beta_m'$) takes different values.

Further, in the present invention, the expression reading "□is within a range of ○ to Δ" means "○≦□≦Δ".

EMBODIMENTS OF THE PRESENT INVENTION

Figure 1:
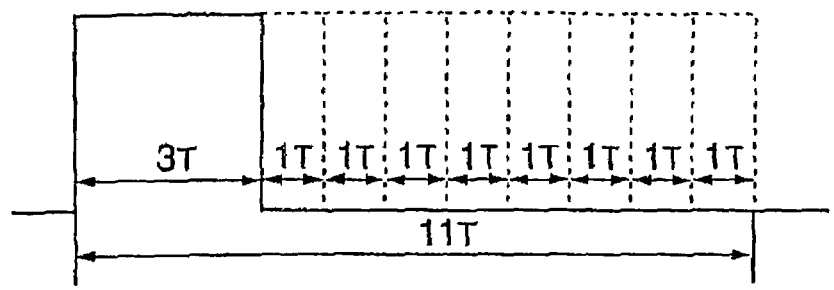
FIG. 1 is views illustrating an example of a conventional recording pulse-dividing method.
Figure 1:
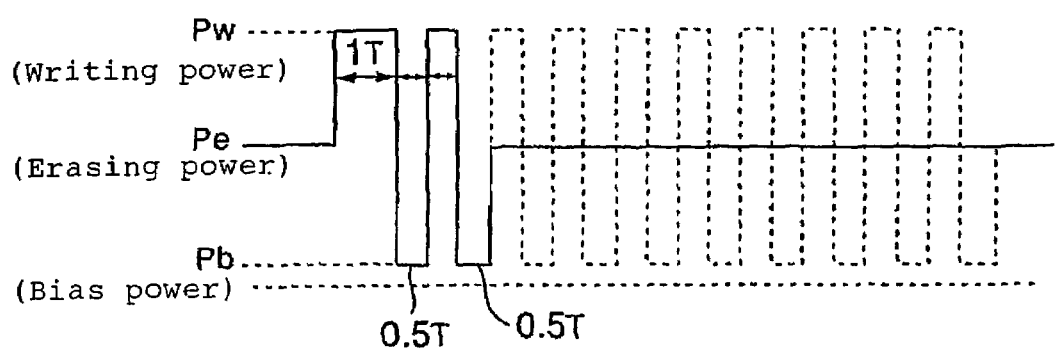

1. With Respect to the Characteristics of the Medium 1-1. In the Case of CD-RW

In a case where the present invention is to be applied to CD-RW, as a linear velocity being a velocity of a beam spot of a recording laser beam to the medium, 1.2 m/s to 1.4 m/s, particularly 1.2 m/s, is used as the reference velocity $V_1$ i.e. 1-time velocity.

Firstly, disks according to the first and second aspects of the present invention will be described.

A rewritable optical recording medium of the present invention is usually of a disk-shape. And, a portion in a crystalline state of the phase-change type recording layer is in an unrecorded or erased state, and a portion in an amorphous state is in a recorded state. Information to be recorded comprises signals EFM modulation by being irradiated with a recording beam such as a laser beam to form amorphous marks. A usually spiral groove is formed on the substrate of the medium. The amorphous marks are usually formed in this groove. Here, the groove is meant for a bottom of a recess for guiding a laser beam, formed on the substrate surface, which is a face closer as viewed from the incident side of the recording/retrieving laser beam. The groove is preferably wobbling in a radial direction at a frequency based on a carrier frequency which becomes 22.05 kHz as calculated as 1-time velocity, and such a groove is called a wobbling groove. And, the above carrier frequency is frequency-modulated with a frequency of ±1 kHz, and by this fine change in frequency, address information on the disk is incorporated as absolute time information. Such absolute time information is called ATIP (absolute time in pre-groove) signal.

This wobbling groove can be formed by forming it on a stamper at a linear velocity of 1-time velocity of CD in a CLV mode and then injection molding a substrate based on this stamper. To increase the recording capacity, a wobbling groove is usually formed so that the carrier frequency would be 22.05 kHz at a linear velocity of 1.2 m/s (with an allowance of ±0.1 m/s).

When data are to be recorded, the reference clock period T will be a reference, and data will be recorded by forming marks and spaces (between marks) having various time lengths corresponding to integral multiple lengths of the reference clock period. In EFM modulation, marks having time lengths of from 3 T to 11 T are usually formed. Further, it is common that the reference clock period T is changed in inverse proportion to the recording linear velocity.

The inverse number of the reference clock period T is called a reference clock frequency, and the reference clock frequency at 1-time velocity of CD (linear velocity of from 1.2 m/s to 1/4 m/s) corresponds to 1 channel bit of data and is usually 4.3218 MHz. This reference clock frequency is just 196 times the reference frequency of 22.05 kHz of the above wobbling.

The reference clock period T at 1-time velocity usually becomes $1/(4.3218 \times 10^6) = 231 \times 10^{-9}$ (sec)=231 (nsec).

In the following description, the product VT of the reference clock period T and the linear velocity V is constant irrespective of the linear velocity, unless otherwise specified.

Figure 2A:
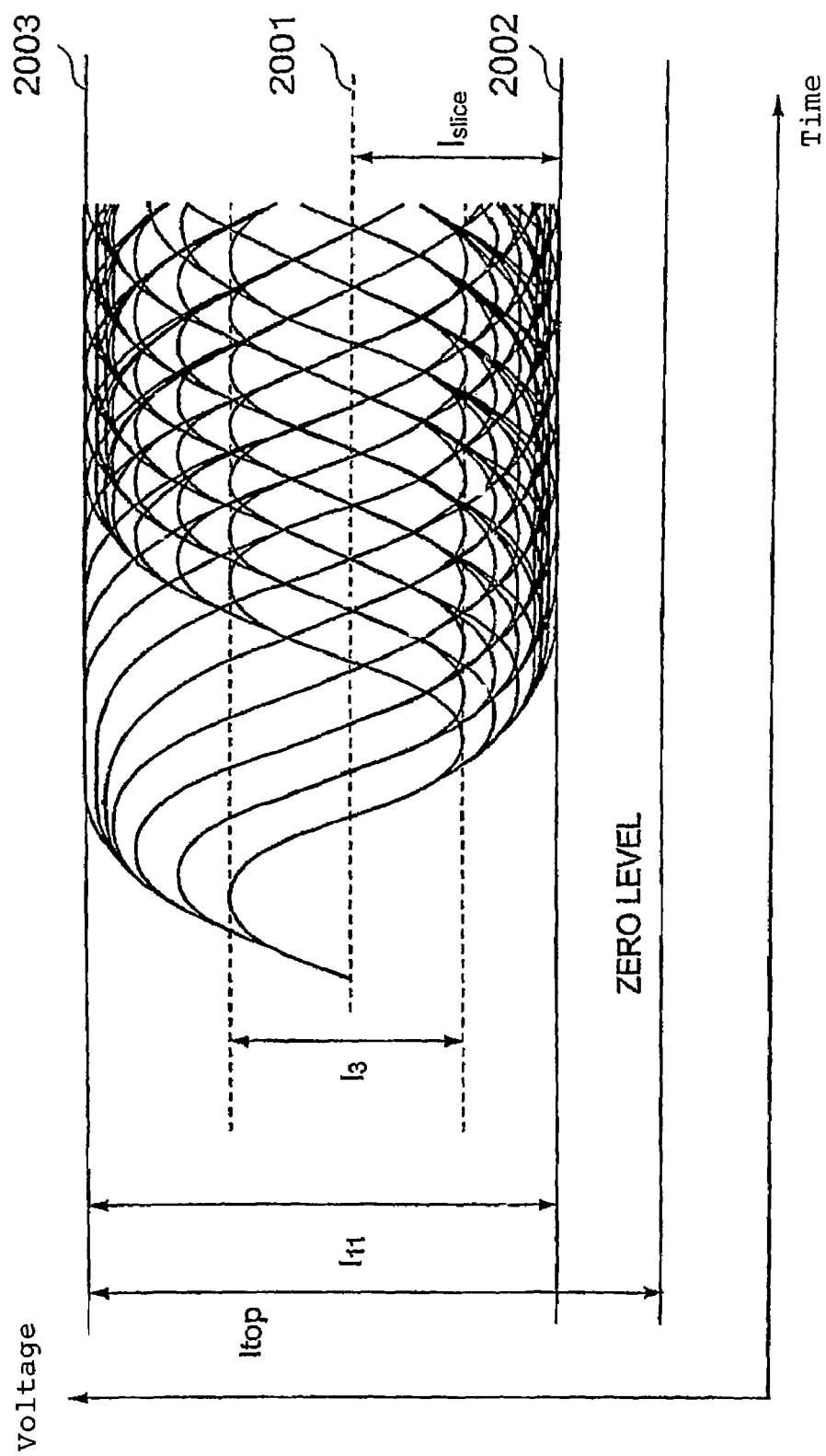
FIG. 2 is schematic views of retrieving waveforms (eye patterns) of EFM modulation signals.

FIG. 2(a) shows a schematic view of a retrieving waveform (an eye pattern) of EFM modulation signals to be used for a CD family including CD-RW. In this eye pattern, all retrieving waveforms of amorphous marks and spaces in crystalline state, of from 3 T to 1 T, are randomly contained. The retrieving waveforms are waveforms as observed on an oscilloscope when the reflected light intensities are taken out as voltage signals. In such a case, the retrieving signals contain a direct current component.

One having the top $I_{top}$ of the eye pattern converted to a reflectivity to an incident light is the top value $R_{top}$ of reflectivity corresponding to a space, and one having the amplitude $I_{11}$ of the eye pattern (for practical purpose, the amplitude of 11 T mark) normalized by $I_{top}$, is the modulation $m_{11}$ of the eye pattern of a record signal represented by the following formula (1) (in this specification, $m_{11}$ may sometimes be referred to simply as a modulation).

$$m_{11} = I_{11}/I_{top} \times 100(\%) \quad (1)$$

In the present invention, the modulation $m_{11}$ is from 60% to 80%. The modulation depends upon the optical resolution and tends to be observed to be large by an optical system having a high NA. Therefore, in the present invention, a modulation $m_{11}$ is taken when recording is carried out by irradiating a laser beam having a wavelength of about 780 nm through an optical system having a numerical aperture NA of 0.5. However, the wavelength is not required to be strictly 780 nm, and it may be within a range of from about 775 to 795 nm.

The larger the signal amplitude $I_{11}$, the better. However, if it is too high, the gain of the amplifier in the signal retrieving system tends to be extremely saturated, and accordingly, the upper limit of $m_{11}$ is 80%, preferably 78%, more preferably about 75%. On the other hand, if it is too small, the signal-to-noise ratio (SN ratio) tends to be low, and accordingly, the lower limit is 60%, preferably 62%, more preferably about 65%. Further, $R_{top}$ is within a range of from 15 to 25%, preferably from 15 to 20%, more preferably from 16 to 19%. Further, it is preferred that the asymmetry value Asym as defined by the following formula (2):

$$\text{Asym}=(I_{slice}/I_{11}-1/2)(\%) \qquad (2)$$

is preferably as close as possible to 0, but it is usually within a range of ±10%. Here, $I_{slice}$ is the potential difference between the centerline 2001 of I and the bottom 2002 of the envelope curve in FIG. 2(*a*), and $I_{11}$ is a voltage between the top 2003 and the bottom 2002 of the envelop curve.

The jitter and deviation of each of mark lengths and space lengths of from 3 T to 11 T to be used for EFM modulation are determined as follows. Namely, the deviation of each of mark lengths and space lengths of from 3 T to 11 T is a deviation from a prescribed value of an average value of mark lengths or space lengths (nT; n=3 to 11), obtained by taking out a RF component by passing the retrieving signals in FIG. 2(*a*) through a highpass filter, followed by DC-splicing using, as a threshold value, the 0 level which will be the substantial center value of the signal amplitudes, and the jitter is the standard deviation (jitter) thereof. A detailed measurement method is prescribed in Red Book as CD standards, Orange Book as CD-RW standards or "CD Family" (published by OHM Co., Apr. 25, 1996). In the present invention, the jitter is preferably such that when retrieving is carried out at 1-time velocity (the reference clock period: 231 nsec), the jitter value is at most 35 nsec, preferably at most 30 nsec, more preferably at most 25 nsec.

Usually, jitter of 3 T mark length or space length tends to have the worst value among 3 T to 11 T in many cases. Further, jitter of 3 T space length tends to have a worse value than jitter of 3 T mark in many cases.

In the present invention, the deviation is usually at most ±40 nsec with 3 T and at most ±60 nsec with 11 T. Further, with respect to 4 T to 10 T, the deviation will be a value obtained by complementing at most ±40 nsec and at most ±60 nsec as prescribed for 3 T and 1 T. In any case, the deviation is acceptable if it is within a range of about ±20% of the reference clock period T.

With respect to the quality of signals after recording, it is preferred that the same characteristics as specified in the current standards are basically satisfied. Specifically, it is preferred to satisfy the content disclosed in Orange Book, Part 3.

By controlling the modulation $m_{11}$, the top value $R_{top}$ of reflectivity and the jitter within the above-mentioned values, a medium recorded at a high velocity at a level of at least 24-times velocity, can be retrieved by a retrieving system for conventional CD-RW, while maintaining interchangeability with conventional CD-RW standards.

With the rewritable optical recording medium of the present invention, it is preferred that in the recording at a linear velocity of 24-times velocity, when a simple periodic signal comprising a 3 T mark (a mark having a time length of 3 T, where T is the data reference clock period) and a 3 T space (a space between marks, having a time length of 3 T), is recorded, and then, a simple periodic signal comprising a 11 T mark (a mark having a time length of 11 T) and a 11 T space (a space between marks, having a time length of 11 T), is overwritten, the erase ratio of the 3 T mark is at least 20 dB. Such erase ratio is more preferably at least 25 dB. Further, also at 32-times velocity, such erase ratio is at least 20 dB, more preferably at least 25 dB. The higher such erase ratio at a high linear velocity, the higher the recrystallization speed at the time of erasing amorphous marks, whereby with such a medium, overwriting of EFM signals at a high linear velocity is possible. For example, if such erase ratio at 32-times velocity is set to be at least 20 dB, it is not only possible to obtain good characteristics when used at 32-times velocity, but also possible to obtain good characteristics also when used at less than 24-times velocity. Here, to record the simple periodic signal comprising a 3 T mark and a 3 T space (between marks) and to overwrite the simple periodic signal comprising a 11 T mark and a 11 T space, a recording method of the after-mentioned recording method CD1-1 or 1-2 is employed. At the time of recording the simple periodical signal comprising a 3 T mark and a 3 T space (between marks), a 3 T mark is recorded by a writing power comprising one writing pulse Pw and a subsequent off-pulse Pb (0<Pb<1 mW), and at other sections, an erasing power Pe is irradiated. Pw is a power to melt the recording layer, and Pb is a cooling power to quench the melted region to form an amorphous state. At the time of overwriting the simple periodic signal comprising a 11 T mark and a 11 T space, a 11 T mark is recorded by repeating a writing power comprising five writing pulses Pw and off-pulses Pb (0<Pb<1 mW) accompanying individual Pw, and at other sections, an erasing power Pe is irradiated. In overwriting 3 T data and 11 T data, the same Pe and Pw are used, and the Pe dependency of the erase ratio is measured by changing Pe while maintaining Pe/Pw to be constant within a range of from 0.2 to 0.6, to confirm that at some Pe, the erase ratio becomes at least 20 dB, preferably at least 25 dB. The erase ratio is one obtained by measuring the decrease of the carrier level of 3 T data between before and after the overwriting of the 11 T data, by dB unit.

In any case, recording is carried out in the same groove, and usually, recording is carried out in a groove corresponding to one round.

If the erase ratio is sufficient at the upper limit within the linear velocity range for overwriting, there will be no possibility that the erase ratio becomes deficient on a lower linear velocity side. Namely, the time for irradiation of the recording layer with a laser beam having a wavelength of λ focused by an object lens having a numerical aperture NA moving at a linear velocity V, is normalized by λ/(NA·V), whereby the irradiation time increases as the linear velocity is low, and the time required for recrystallization can sufficiently be secured.

Further, as a recording method in the case of measuring the overwriting erase ratio by overwriting a 3 T mark and a 11 T mark, either one of the after-mentioned recording methods CD1-1, 1-2 and 1-3, may be employed. However, it is particularly preferred to employ the recording method CD1-3. In a case where the recording method CD1-3 is employed, it is not particularly necessary to employ recording conditions where jitter is low, in the measurement of the erase ratio, and at the time of recording a 11 T mark, a tentative value of $\beta_m'=0.5$ may be employed.

Further, in the method for measuring the erase ratio, there may be a case where the reduction of the carrier level of the recorded marks is measured by a decibel value, while irradiating an erasing power Pe in a direct current (DC) fashion, and this is called a DC erase ratio. In the measurement of the DC erase ratio, an erase ratio is employed in a case where the maximum erase ratio can be obtained while Pe is variable. As compared with the above-mentioned overwriting erase ratio, it may sometimes take a higher value by from 1 to 2 dB. If such a correction value is taken into consideration, the measurement of the overwriting erase ratio may be substituted by the measurement of the DC erase ratio.

Further, when the archival life of the recording medium is represented by the time until the jitter of record signals previously recorded will reach 35 nsec (nano seconds) in retrieving at 1-time velocity, the archival life at a temperature of 80° C. under a relative humidity of 85%, is preferably at least 200 hours, more preferably at least 500 hours.

Further, in the present invention, in order to satisfy the above characteristics, when an accelerated test at a temperature of at least 105° C. is applied as a condition where evaluation can be carried out in a shorter time, each of the modulation $m_{11}$ and the top value $R_{top}$ of reflectivity in a crystalline state (in this specification, this value may sometimes be referred to simply as $R_{top}$) maintains preferably at least 80%, more preferably at least 90% of the initial value even upon expiration of 3 hours in the accelerated test environment at a temperature of 105° C., because such a requirement is satisfied by currently commercially available CD-RW for from 1 to 4-time velocity. Especially when $m_{11}$ after the above accelerated test is made to maintain preferably at least 80%, more preferably at least 90% of the initial value, the crystallization temperature of the recording layer which will be described hereinafter, can be made to be at least about 150° C.

The definitions for the modulation $m_{11}$, $R_{top}$, the jitter of each mark or space between marks, the deviation, the asymmetry value, the erase ratio, etc. at the linear speed or linear velocity V (at this paragraph, V represents a linear velocity of 24-times velocity or 32-times velocity) in the present invention, are given from record signals obtained by recording EFM modulation signals by overwriting 10 times by one recording method selected from the conditions of the following recording methods CD1-1 and CD1-2 while maintaining the reference clock period T to satisfy $VT=V_1T_1$, where $V_1$ is a reference velocity (1-time velocity) which is set to be a linear velocity of 1.2 m/s, and $T_1$ is 231 nsec, followed by retrieving at 1-time velocity.

Recording Method CD1-1:

A laser beam having a wavelength of 780 nm is irradiated via an optical system having a numerical aperture NA of 0.5, wherein when the time length of one amorphous mark is represented by nT (where n is an integer of from 3 to 11), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1+\Delta_1$ (where $\Delta_1=0.3$ to 0.6), $\alpha_i'=\alpha c$ (where i is an integer of from 2 to m−1), $\beta_{i-1}'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.3$ to 0.6, and $\beta_m'=\beta_m$, a recording laser beam having a constant writing power Pw sufficient to melt the recording layer (provided that Pw is from 20 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\alpha c$, $\beta_m(=\beta_m')$, $\beta_1$, $\Delta_1$, $\beta_{m-1}$, $\Delta_{m-1}$, $\alpha_m$ and $\Delta_m$ are constant irrespective of m, when m=2 (n=4, 5) $\alpha_1$, $\alpha_1'$, $\alpha_2$, $\alpha_2'$, $\beta_2$ and $\beta_2'$ are made to be equal to $\alpha_1$, $\alpha_1'$, $\alpha_3$, $\alpha\beta_3'$, $\beta_3$ and $\beta_3'$ in the case where m is 3, respectively, $\beta_1$ is made to be equal to either $\beta_1$ or $\beta_2$ in the case where m is 3, and $\beta_1'$ is made to be equal to either $\beta_1'$ or $\beta_2'$ in the case where m is 3 (provided that a deviation of about ±10% is allowable), and when m=1 (n=3), irradiation with a recording laser beam comprising a pair of a writing power irradiation section $\alpha_1'T$ and a bias power irradiation section $\beta_1'T$ is carried out;

Recording Method CD1-2:

A laser beam having a wavelength of 780 nm is irradiated via an optical system having a numerical aperture NA of 0.5, wherein when the time length of one amorphous mark is represented by nT (where n is an integer of from 3 to 11), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1$, $\alpha_i'=\alpha c$ (where i is an integer of from 2 to m−1), $\beta_{i-1}'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.5$ to 1.2, and $\beta_m'=\beta_m$, a recording laser beam having a constant writing power Pw sufficient to melt the recording layer (provided that Pw is from 20 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\beta_1(=\beta_1')$, $\alpha c$, $\beta_{m-1}$, $\Delta_{m-1}$, $\alpha_m$, $\beta_m$ and $\Delta_m'$ are constant irrespective of m, when m=2 (n=4, 5), $\alpha_1$, $\alpha_1'$, $\beta_1$, $\beta_1'$, $\alpha_2$, $\alpha_2'$, 32 and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m is 3, respectively (provided that a deviation of about ±10% is allowable), and when m=1 (n=3), irradiation with a recording laser beam comprising a pair of a writing power irradiation section $\alpha_1'T$ and a bias power irradiation section $\beta_1'T$ is carried out.

Here, $\Sigma_i(\alpha_i+\beta_i)$ or the like means to take the sum from 1 to m with respect to i.

In the present invention, with a CD-RW disk rewritable at 24-times velocity or 32-times velocity of the above reference linear velocity, it is preferred that at least one of 8-times velocity, 10-times velocity, 12-times velocity, 16-times velocity and 20-times velocity of the reference linear velocity, the modulation $m_{11}$, $R_{top}$, the jitter of each mark or space between marks, the deviation, the asymmetry value and the value of the erase ratio will be within the above-mentioned numerical value ranges.

Further, it is preferred that at any linear velocity between $V_{min}$ and $V_{max}$, where $V_{min}$ is a linear velocity of any one selected from 8-times velocity, 10-times velocity, 12-times velocity, 16-times velocity and 20-times velocity, and $V_{max}$ is a linear velocity of either 24-times velocity or 32-times velocity, the modulation $m_{11}$, $R_{top}$, the jitter, the deviation, the asymmetry value and the value of the erase ratio will be within the above numerical value ranges, whereby recording by the after-mentioned P-CAV or CAV system will be possible.

Here, specific values of the modulation $m_{11}$, $R_{top}$, the jitter, the deviation, the asymmetry value, the erase ratio, etc. at 8-times velocity, 10-times velocity, 12-times velocity, 16-times velocity or 20-times velocity, are measured as follows. Namely, they are given from record signals obtained by recording EFM modulation signals by overwriting 10 times by one recording method selected from the conditions of the following recording methods CD2-1 and 2-2 at any one of 8-times velocity ($8V_1$), 10-times velocity ($10V_1$), 12-times velocity ($12V_1$) 16-times velocity ($16V_1$) and 20-times velocity ($20V_1$) of the reference velocity $V_1$ (1-time velocity) which is set to be a linear velocity of 1.2 m/s, while maintaining the data reference clock period T to satisfy $VT=V_1T_1$ (where $T_1$ is 231 nsec, and V is any one of 10 $V_1$, 12 $V_1$, 16 $V_1$ and 20 $V_1$), followed by retrieving at 1-time velocity.

Recording Method CD2-1:

A laser beam having a wavelength of 780 nm is irradiated via an optical system having a numerical aperture NA of 0.5, wherein when the time length of one amorphous mark is represented by nT (where n is an integer of from 3 to 11), between record marks, an erasing power Pe capable of crystallizing an amorphous phase is applied, and for a record mark of n=2m (where m is an integer of at least 3), of which the time length (n–j)T (where j is a real number of from –2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.1$ to 1, $\alpha_i=0.1$ to 1 (where i is an integer of from 2 to m–1, and $\alpha_i$ takes a constant value $\alpha c$ between 0.1 to 1 irrespective of such i), $\beta_1+\alpha_2=1.7$ to 2.3, $\beta_{i-1}+\alpha_i=2$ (where i is an integer of from 3 to m–1), $\beta_{m-1}+\alpha_m=1.7$ to 2.3, $\alpha_m=0.1$ to 1, and $\beta_m=0$ to 2, and for a record mark of n=2m+1 (where m is an integer of at least 3), of which the time length (n–k)T (where k is a real number of from –2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1+\Delta_1$ (where $\Delta_1=0.3$ to 0.6), $\alpha_i'=\alpha c$ (where i is an integer of from 2 to m–1), $\beta_{i-1}'+\alpha_i'=2$ (where i is an integer of from 3 to m–1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.3$ to 0.6, and $\beta_m'=\beta_m$, a recording laser beam having a constant writing power Pw sufficient to melt the recording layer (provided that Pw is from 20 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$ (where i is an integer of from 1 to m); and further, when m is at least 3, $\alpha_1(=\alpha_1')$, $\alpha c$, $\beta_m(=\beta_m')$, $\beta_1$, $\Delta_1$, $\beta_{m-1}$, $\Delta_{m-1}$, $\alpha_m$ and $\Delta_m$ are constant irrespective of m, when m=2 (n=4, 5), $\alpha_1$, $\alpha_1'$, $\alpha_2$, $\alpha_2'$, 2 and $\beta_2'$ are made to be equal to $\alpha_1$, $\alpha_1'$, $\alpha_3$, $\alpha_3'$, $\beta_3$ and $\beta_3'$ in the case where m is 3, respectively, $\beta_1$ is made to be equal to either $\beta_1$ or $\beta_2$ in the case where m is 3, and $\beta_1'$ is made to be equal to either $\beta_1'$ or $\beta_2'$ in the case where m is 3 (provided that a deviation of about ±10% is allowable), provided that with respect to $\beta_2'$, the value may further be changed within a range of ±0.5, and when m=1 (n=3), irradiation with a recording laser beam comprising a pair of a writing power irradiation section $\alpha_1'T$ and a bias power irradiation section $\beta_1'T$ is carried out;

Recording Method CD2-2:

A laser beam having a wavelength of 780 nm is irradiated via an optical system having a numerical aperture NA of 0.5, wherein when the time length of one amorphous mark is represented by nT (where n is an integer of from 3 to 11), between record marks, an erasing power Pe capable of crystallizing an amorphous phase is applied, and for a record mark of n=2m (where m is an integer of at least 3), of which the time length (n–j)T (where j is a real number of from –2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, so that $\Sigma_i(\alpha_i+\beta_i)=n-j$, in the order of $\alpha_1=0.1$ to 1, $\alpha_i=0.1$ to 1 (where i is an integer of from 2 to m–1, and $\alpha_i$ takes a constant value $\alpha c$ between 0.1 to 1 irrespective of such i), $\beta_1+\alpha_2=1.7$ to 2.3, $\beta_{i-1}+\alpha_i=2$ (where i is an integer of from 3 to m–1), $\beta_{m-1}+\alpha_m=1.7$ to 2.3, $\alpha_m=0.1$ to 1, and $\beta_m=0$ to 2, and for a record mark of n=2m+1 (where m is an integer of at least 3), of which the time length (n–k)T (where k is a real number of from –2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1$, $\alpha_i'=\alpha c$ (where i is an integer of from 2 to m–1), $\beta_{i-1}'+\alpha_i'=2$ (where i is an integer of from 3 to m–1), $\beta_{m-1}'=\beta_{m-1}+\alpha_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.5$ to 1.2, and $\beta_m'=\beta m+\Delta_m'$ (where $\Delta_m'=0$ to 1), a recording laser beam having a constant writing power Pw sufficient to melt the recording layer (provided that Pw is from 20 to 40 mW, and Pe/Pw=0.2 to 0.6) is applied within a time of $\alpha_iT$ and $\alpha_i'T$ (where i is an integer of from 1 to m), and a recording laser beam having a bias power Pb of less than 1 mW is applied within a time of $\beta_iT$ and $\beta_i'T$(where i is an integer of from 1 to m); and further, when m is at least 3, $\alpha_1(=\alpha_1')$, $\beta_1(=\beta_1')$, $\alpha c$, $\beta_{m-1}$, $\Delta_{m-1}$, $\alpha_m$, $\beta_m$ and $\Delta_m'$ are constant irrespective of m, when m=2 (n=4, 5), $\alpha_1$, $\alpha_1'$, $\beta_1$ $\beta_i'$, $\alpha_2$, $\alpha_2'$, $\beta_2$ and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m is 3, respectively (provided that a deviation of about ±10% is allowable), and when m=1 (n=3), irradiation with a recording laser beam comprising a pair of a writing power irradiation section $\alpha_1'T$ and a bias power irradiation section $\beta_1'T$ is carried out.

Here, in the recording methods CD1-1, 1-2, 2-1 and 2-2, j and k may take different values for every n. Further, Pw, Pb and Pe are at constant power levels, and $Pb\leq Pe\leq Pw$. And by using recording methods CD1-1 and 1-2, or recording methods CD2-1 and 2-2, recording of an EFM random pattern is carried out wherein while maintaining the Pe/Pw ratio to be constant at a level between 0.2 and 0.6, Pw is changed between 20 and 40 mW, so that at Pw where the best characteristics can be obtained, the above-mentioned respective values of the jitters of the respective mark lengths and the respective spaces between marks, $m_{11}$ and $R_{top}$, may be satisfied. Here, the power values Pw, Pe, Pb, etc. are meant to be powers of the main beams among the recording laser beams and exclude powers which are classified to be beams not directly related to the recording, like a servo beam for a servo operation in a so-called three beam method. With respect to the Pe/Pw ratio, firstly a value between 0.3 and 0.4 is employed, and as a result, if the above requirements for $m_{11}$, $R_{top}$, the asymmetry, the deviation, etc. are not satisfied, a value between 0.2 and 0.3, or between 0.3 and 0.6, is employed.

Further, the laser beam power level at each of recording pulse sections $\alpha_i T$ and $\alpha_i' T$ and off-pulse sections $\beta_i T$ and $\beta_i' T$, is constant at Pw for the recording pulse sections and at Pb for the off-pulse sections. However, in a case where superposed frequencies are applied, Pw and Pb are defined by average powers at such sections. Further, unavoidable overshooting or undershooting due to a response of a laser diode is allowable. The rising or falling of the recording pulses $\alpha_i T$ and $\alpha_i' T$ is at most about 3 nsec, but preferably from 1 nsec to 2 nsec.

Recording methods CD1-1 and 1-2 are ones having a further study added to a record pulse-dividing method as disclosed in JP-A-2001-331936 wherein a recording pulse (Pw irradiation section) and an off-pulse (Pb irradiation section) are alternately generated in repeated periods having period 2 T as the base. Namely, in the present invention, among recording strategies having the 2 T period as the base, a record pulse-dividing method which is particularly suitable for CD-RW overwritable at 24- or 32-times velocity and which is particularly industrially useful, economical and simple, has been found. By using the recording pulse strategy of the present invention, it is possible to provide a recording medium and a recording method therefor, whereby the record quality can easily be maintained even when recorded by a plurality of drives and interchangeability can easily be secured.

Accordingly, in the present invention, variable parameters and their ranges in the record pulse-dividing method using period 2 T as the base, are defined. And, in the present invention, among many parameters in the record pulse-dividing method using period 2 T as the base, the minimum parameters required to maintain a good record quality at 24-times velocity or 32-times velocity, have been found, and they are used as variable. If the number of variable parameters is increased, it becomes relatively easy to accomplish good recording at 24-times velocity or 32-times velocity. However, to make many parameters to be variable simply makes the design of the electronic circuit (integrated circuit) complicated for generating pulses in a recording device to carry out recording on the optical recording medium. Therefore, in the present invention, the minimum parameters have been found which make it possible to realize CD-RW capable of carrying out 24-times velocity recording or 32-times velocity recording while simplifying the design of the electronic circuit (integrated circuit).

The minimum parameters to be variable to carry out good recording at 24-times velocity or 32-times velocity, can be realized for the first time by carrying out a study on a recording medium overwritable at 24-times velocity or 32-times velocity and a study on a pulse-dividing recording method, while feeding back the respective knowledges mutually. Thus, the present invention has been accomplished by a high level of creation such that the recording medium and the recording method are simultaneously realized.

By such studies, in the present invention, it has been made possible to present a CD-RW recording medium and a recording method having high recording and retrieving interchangeability within a very wide range of linear velocities ranging from 8- or 10-times velocity to 24- or 32-times velocity, which have not heretofore been realized.

In the case of EFM modulation of CD-RW, mark lengths nT may have cases where n=3, 4, 5, 6, 7, 8, 9, 10 and 11, which are divided into periods having 2 T as the base where m=1, 2, 2, 3, 3, 4, 4, 5, and 5, respectively, so that recording is carried out by recording pulses divided into sets of m recording pulses and m off-pulses. In the present invention, in order to clearly define the CD-RW recording medium overwritable at 24-times velocity or 32-times velocity, the definitions as shown by recording methods CD1-1 and 1-2, are adopted.

Figure 3:
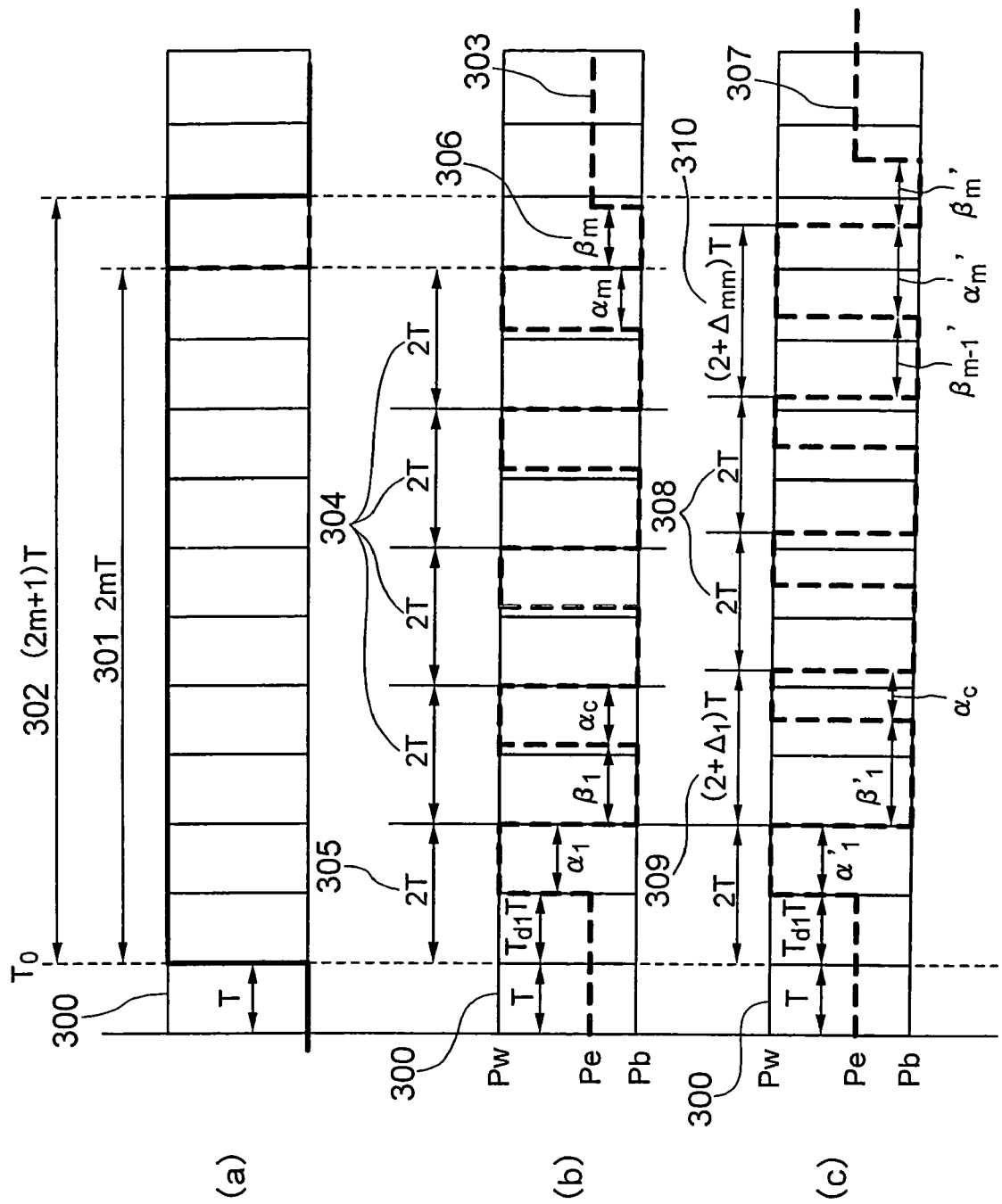
FIG. 3 is a view illustrating a recording pulse-dividing method.

FIG. 3 is a graph showing one embodiment of the relation of the respective recording pulses in a case where the pulse-dividing methods according to the above-mentioned recording methods CD1-1 and 2-1 are to be carried out. In FIG. 3(b), the time widths of recording pulses and off-pulses to form mark lengths 2 mT should formally be represented by $\alpha_1 T$, $\beta_1 T$, $\alpha c T$, ... $\alpha_m T$, $\beta_m T$, but for the sake of simple clear representation of the graph, in FIG. 3(b), they are simply represented by $\alpha_1$, $\beta_1$, $\alpha c$, ... $\alpha m$, $\beta_m$, i.e. by omitting the indication of the reference clock period T. The same applies also to FIG. 3(c).

As shown in FIG. 3, in the recording method of the present invention, consideration is given to whether the value which n in nT mark can take, is an odd number or an even number. Correction of mark length difference 1 T between an even number length mark and an odd number length mark for the same division number m, is divided and allocated to an off-pulse section $\beta_1 T$ next to the forefront recording pulse and to a recording pulse periodic section $(\beta_{m-1}+\alpha_m) T$ second from the last. Namely, the correction of mark length 1 T is carried out by adjustment of off-pulse lengths $\beta_1 T$ and $\beta_{m-1} T$, and pulse $\alpha_m T$ of the last recording pulse section.

In FIG. 3, 300 represents the reference clock of period T.

FIG. 3(a) shows a pulse waveform corresponding to a record mark having a length of nT=2mT or nT=(2m+1)T, wherein symbol 301 corresponds to the length of a record mark having a length of 2 mT, and symbol 302 corresponds to the length of a record mark having a length of (2m+1)T. In FIG. 3(a), a case where m=5, is shown.

In FIG. 3(b), 303 represents a waveform of divided recording pulses in a case where n=2m(=10). In FIG. 3(c), 307 represents a waveform of divided recording pulses in a case where n=2m+1(=11).

A value obtained by multiplying $T_{d1}$ by T represents a delay time of $\alpha_i T$ and $\alpha_1' T$ to the forward end $T_0$ of nT mark, and is usually constant irrespective of n. Further, usually, $(T_{d1}+\alpha_1)T=(T_{d1}+\alpha_1')T=2$ T to facilitate synchronization of the recording pulse-generating circuit, but fine adjustment at a level of ±0.5 T is further allowable. Especially for 3 T, 4 T and 5 T marks, it is preferred to carry out such fine adjustment of the delay time. The writing power level at recording pulse sections $\alpha_i T$ (i=1 to m) is constant at Pw; the bias power level at off-pulse sections $\beta_i T$ (i=1 to m) is constant at Pb; and the laser beam irradiation power between marks i.e. at sections other than $\alpha_i T$ (i=1 to m) and $\beta_i T$ (i=1 to m), is erasing power Pe which is constant. When n is an even number, at sections 304 excluding the forefront recording pulse and the last off-pulse (i.e. sections excluding 305 and 306 in FIG. 3), $(\beta_{i-1}+\alpha_i)T=2$ T (i=2 to m) i.e. constant, provided that fine adjustment within a range of ±0.3 T is allowable only with respect to $(\beta_1+\alpha_2)T$ and $(\beta_{m-1}+\alpha_m)T$.

On the other hand, in a case where n is an odd number, at sections 308 in FIG. 3, $(\beta_{i-1}'+\alpha_i')T=2$ T (i=3 to m−1) i.e. constant.

In order to record two types of mark lengths where n=2m and 2m+1 with the same division number, section $(\beta_1+\alpha_2)T$ and section $(\beta_{m-1}+\alpha_m)T$ are respectively increased or reduced by about 0.5 T to adjust their lengths. Due to an influence of heat interference, etc., such a value may not precisely be 0.5 T, but will generally be within a range of from 0.3 T to 0.6 T. $\beta_m$ and $\beta_m'$ take substantially the same values within a range of from 0 to 2, but it is preferred that $\beta_m=\beta_m'$.

Referring to FIG. 3, recording corresponding to the mark length difference 1 T between even number length mark nT=10 T and odd number length mark nT=11 T, is carried out by the following operations 1 and 2.

Operation 1: As shown at section 309 in FIG. 3, $\Delta_1$ is added to only $\beta_1'$ of section $(\beta_1'+\alpha_2')T$ to make $\beta_1'=\beta_1+\Delta_1$ and $\alpha_2'=\alpha c$.

Operation 2: As shown at section 310 in FIG. 3, $\Delta_{mm}$ T is added to section $(\beta_{m-1}'+\alpha_m')T$. Here, $\Delta_{mm}=\Delta_{m-1}+\Delta_m$, and $\Delta_{mm}$ is divided into $\Delta_{m-1}$ and $\Delta_m$, so that $\Delta_{m-1}$ is added to $\beta$m−1, and $\Delta_m$ is added to $\alpha_m$. Here, $\Delta_{m-1}$ may be zero.

In the present invention, $\Delta_m$ is made to be larger than 0 ($\Delta_m>0$) to make $\alpha m \neq \alpha_m'$. By making $\Delta_m$ larger than 0, the shape of the rear end of record mark where n is an odd number among the same division number m, will be stabilized, whereby the jitter characteristics will be remarkably improved. More preferably, $\Delta_{m-1}$, and $\Delta_m$ are made to have substantially equal values. If $\Delta_{m-1}$ and $\Delta_m$ are made to be substantially equal, it will be possible to simplify the design of the electronic circuit (integrated circuit) to control generation of laser beams (pulsed beams) for recording pulses and off-pulses in a recording pulse strategy, while maintaining good jitter characteristics.

The above operations are carried out for m being at least 3, and $\Delta_1$ and $\Delta_{mm}$ will take a value of from 0.3 to 0.6. The values of $\Delta_{m-1}$ and $\Delta_m$ are determined depending upon how $\Delta_{mm}$ is divided and distributed, whereby $\Delta_{m-1}$ may take a value of from 0 to 0.6, and $\Delta_m$ may take a value of more than 0 and at most 0.6.

In order to increase or decrease section $(\beta_1+\alpha_2)T$ and section $(\beta_{m-1}+\alpha_m)T$, respectively, by about 0.5 T to adjust their lengths, as mentioned above, $\Delta_1$ and $\Delta_{mm}$ may be made to be 0.6, but $\Delta_{m-1}$ and $\Delta_m$ are preferably made to be a value of at most 0.5.

Now, with respect to recording method CD1-1, cases wherein m is at least 3, m=2 and m=1, will, respectively, be described. Recording method CD2-1 will be described later.

In recording method CD1-1, when m is at least 3, $\alpha_1'=\alpha_1$, $\beta_m'=\beta_m$, and $\alpha_i$ and $\alpha_i'$ are constant as $\alpha c$ irrespective of i where i=2 to m−1. Further, $\alpha_m$ and $\alpha_m'$ are also constant irrespective of m. Further, $\alpha_1(\alpha_1')$ is from 0.7 to 1.4, ac is from 0.7 to 1.2, and $\alpha_m$ is from 0.7 to 1.2.

Further, when m is at least 3, $\alpha_1(=\alpha_1')$, $\alpha c$, $\beta m(=\beta_m')$, $\beta_1$, $\Delta_1$, $\beta_{m-1}$, $\Delta_{m-1}$ and $\Delta_m$ are constant irrespective of m. At 24-times velocity or 32-times velocity, $\alpha c=\alpha_i$ (i=2 to m−1) is firstly made to be a value within a range of from 0.9 to 1, and thereafter, fine adjustment is carried out within a range of ±0.2 (within a range of from 0.7 to 1.2). For $\alpha_1$ and $\alpha_m$, firstly the same value as $\alpha c$ is employed, and then, fine adjustment is carried out within a range of about 0.3 at the maximum.

Here, when m=2 (n=4, 5), section $(\beta_1+\alpha_2)T$ may be understood to be section $(\beta_{m-1}+\alpha_m)T$, since m−1=1. In such a case, $(\beta_1'+\alpha_2')T$ is made to be longer by about 1 T than $(\beta_1+\alpha_2)T$. More specifically, $\alpha_1$, $\alpha_1'$ $\alpha_2$, $\alpha_2'$, $\beta_2$ and $\beta_2'$ are made to be equal to $\alpha_1$, $\alpha_1'$, $\alpha_m$, $\alpha_m'$, $\beta_m$ and $\beta_m'$ in the case where m is 3, respectively, $\beta_1$ is made to be equal to either $\beta_1$ or $\beta_{m-1}$ in the case where m is 3, and $\beta_1'$ is made to be equal to either $\beta_1'$ or $\beta_{m-1}'$ in the case where m is 3. Here, in spite of the expression "made to be equal", a deviation at a level of ±10% is allowable.

Thus, for an even number length mark, a recording pulse row 303 shown by a dotted line in FIG. 3(b) is obtained, and for an odd number length mark, a recording pulse row 307 shown by a dotted line in FIG. 3(c) is obtained.

Further, when m=1 (n=3), irradiation with a recording laser beam comprising a pair of a writing power irradiation section $\alpha_1'$T and a bias power irradiation section $\beta_1'$T is carried out. In such a case, it is preferred that $\alpha_1'$ is made to be larger by from about 0.1 to 1.5 than $\alpha_1'$ in the case where m is at least 2, and $\beta_1'$ is made to be smaller than $\beta_1'$ and to be the same as or larger than $\beta_m$ and $\beta_m'$ in the case where m is at least 2. Further, the range of $\beta_1'$ is preferably from 0 to 2.

Figure 16:
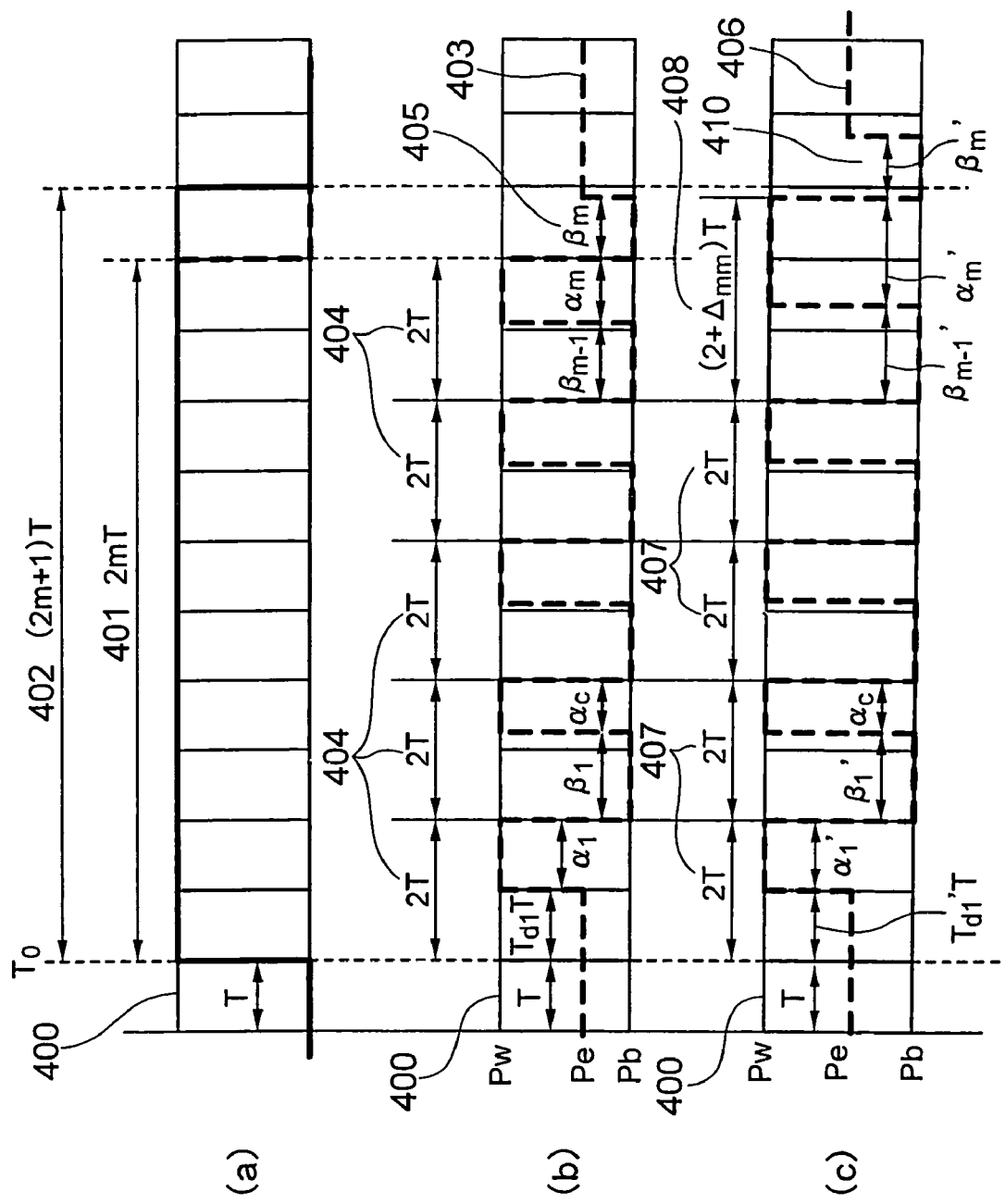
FIG. 16 is a view illustrating a recording pulse-dividing method.

FIG. 16 is a graph showing one embodiment of the relation of the respective recording pulses in a case where the pulse-dividing methods according to the above-mentioned recording methods CD1-2 and 2-2 are to be carried out. In FIG. 16(b), the time widths of recording pulses and off-pulses to form mark lengths 2 mT should formally be represented by $\alpha_1T$, $\beta_1T$, $\alpha cT$, . . . $\alpha_mT$, $\beta_mT$, but for the sake of simple clear representation of the graph, in FIG. 16(b), they are simply represented by $\alpha_1$, $\beta_1$, $\alpha c$, . . . $\alpha_m$, $\beta m$, i.e. the indication of the reference clock period T is omitted. The same applies also to FIG. 16(c).

As shown in FIG. 16, consideration is given whether the value which n in nT mark can take, is an odd number or an even number. Correction of mark length difference 1 T between an even number length mark and an odd number length mark for the same division number m is divided and allocated to a recording pulse periodic section $(\beta_{m-1}+\alpha_m)T$ and the last off-pulse $\beta_mT$. Namely, the correction of mark length 1 T is carried out by adjustment of off-pulse lengths $\beta_{m-1}$ T and $\beta_mT$, and pulse $\alpha_mT$ of the last recording pulse section.

As compared with the recording method shown in FIG. 3 (recording method CD1-1, 2-1), in this recording method, recording pulses and off-pulses to be changed as between even number and odd number marks, are concentrated at the rear end portion of a mark, whereby there is not only a merit in that the rear end jitter of a record mark can easily be controlled, but also a merit in that the design of an electronic circuit (integrated circuit) to control generation of laser beams (pulsed beams) for recording pulses and off-pulses of the recording pulse strategy can be simplified. Further, there is a merit that the number of parameters to be variable is small.

In FIG. 16, 400 represents the reference clock of period T.

FIG. 16(a) shows a pulse waveform corresponding to a record mark having a length of nT=2mT or nT=(2m+1)T, wherein symbol 401 corresponds to the length of a record mark having a length of 2mT, and symbol 402 corresponds to the length of a record mark having a length of (2m+1)T. In FIG. 16(a), a case where m=5, is shown.

In FIG. 16(b), 403 represents a waveform of divided recording pulses in a case where n=2m(=10). In FIG. 3(c), 406 represents a waveform of divided recording pulses in a case where n=2m+1(=11).

A value obtained by multiplying $T_{d1}$ by T represents a delay time to the forward end $T_0$ of nT mark, of $\alpha_tT$ and $\alpha_1'T$ and is usually constant irrespective of n. Further, usually, $(T_{d1}+\alpha_1)T=(T_{d1}+\alpha_1')T=2$ T to facilitate synchronization of the record pulse-generating circuit, but fine adjustment at a level of ±0.5 T is further allowable. Especially for 3 T, 4 T and 5 T marks, it is preferred to carry out such fine adjustment of the delay time. The writing power level at recording pulse sections $\alpha_i T$ (i=1 to m) is constant at Pw; the bias power level at off-pulse sections $\beta_i T$ (i=1 to m) is constant at Pb; and the laser beam irradiation power between marks i.e. at sections other than $\alpha_i T$ (i=1 to m) and $\beta_i T$ (i=1 to m), is erasing power Pe which is constant. When n is an even number, at sections 404, $(\beta_{i-1}+\alpha_i)T=2$ T (i=2 to m) i.e. constant, provided that fine adjustment within a range of ±0.3 T is allowable only with respect to $(\beta_1+\alpha_2)T$ and $(\beta_{m-1}+\alpha_m)T$. On the other hand, in a case where n is an odd number, at sections 407 in FIG. 16, $(\beta_{i-1}'+\alpha_i')T=2$ T (i=2 to m−1) i.e. constant. However, $(\beta_1'+\alpha_2')T$ is made to be equal to $(\beta_1+\alpha_2)T$.

In order to record two types of mark lengths where n=2m and 2m+1 with the same division number, section $(\beta_{m-1}+\alpha_m)T$ is increased or reduced by about 1 T to adjust its length. Due to an influence of heat interference, etc., such a value may not precisely be 1 T, but will generally be within a range of from 0.5 to 1.2 T. $\beta_m$ and $\beta_m'$ take substantially the same values within a range of from 0 to 2 (in recording method CD2-2, $\beta_m'$=within 0 to 3). However, to correct the influence over the jitter at the rear end of a mark, $\beta_m$ and $\beta_m'$ are individually finely adjusted. Especially in recording method CD2-2, $\beta_m'=\beta_m+\Delta_m'$, i.e. $\Delta_m'$ (=0 to 1) is added to $\beta_m$.

Referring to FIG. 16, recording corresponding to the mark length difference 1 T between even number length mark nT=10 T and odd number length mark nT=11 T, is carried out by the following operation 3.

Operation 3: As shown at section 408 in FIG. 16, $\Delta_{mm}$ T is added to section $(\beta_{m-1}\alpha_m)T$ to obtain $(\beta_{m-1}'+\alpha_m')T$. Here, $\Delta_{mm}=\Delta_{m-1}+\Delta_m$, and $\Delta_{mm}$ is divided into $\Delta_{m-1}$ and $\Delta_m$, so that $\Delta_{m-1}$ added to $\beta_{m-1}$, and $\Delta_m$ is added to $\alpha_m$. Further, in order to correct the influence to the jitter at the rear end of a mark, $\Delta_m$ is changed to $\beta_m'$ by an addition of $\Delta_m'$.

The foregoing operation is carried out when m is at least 3, and $\Delta_{mm}$ takes a value of from 0.5 to 1.2. $\Delta_{m-1}$ and $\Delta_m$ may, respectively, take a value of from 0 to 0.6 depending upon how $\Delta_m$ is divided and distributed. $\Delta_{m-1}$ may be zero, $\Delta_m$ is made larger than 0 so that $\alpha_m \neq \alpha_m'$. When $\Delta_m$ is made larger than 0, the shape of the rear end of a record mark where n is an odd number among the same division number m, the jitter characteristics will be stable and remarkably improved. More preferably, $\Delta_{m-1}$ and $\Delta_m$ are made to have substantially equal values. When $\Delta_{m-1}$ and $\Delta_m$ are made to be substantially equal, it will be possible to simplify the design of an electronic circuit (integrated circuit) to control generation of pulsed beams, while maintaining good jitter characteristics.

$\Delta_m'$ takes a value of from 0 to 1, more preferably a value of from 0 to 0.6. Especially at a linear velocity lower than 16-times velocity, it is preferred to make $\Delta_m'$ larger than in the case of 24- or 32-times velocity. On the other hand, at 24- or 32-times velocity, it is preferred to make $\Delta_m'$=0.

Now, with respect to recording method CD1-2, cases where m is at least 3, m=2 and m=1 will, respectively, be described. Recording method CD2-2 will be described later.

In recording method CD1-2, when m is at least 3, $\alpha_1'=\alpha_1$ and $\beta_1'=\beta_1$, and $\alpha_i$ and $\alpha_i'$ are constant as αc irrespective of i where i=2 to m−1. Further, $\alpha_1(=\alpha_1')$ takes a value within a range of from 0.7 to 1.4, and αc and $\alpha_m$ take a value within a range of from 0.7 to 1.2. More preferably, $\alpha_1(=\alpha_1')$, αc and $\alpha_m$ are within a range of from 0.7 to 1.

Further, when m is at least 3, $\alpha_1(=\alpha_1')$, $\beta_1$, αc, $\beta_{m-1}$, $\Delta_{m-1}$, $\alpha_m$, $\Delta_m$, $\Delta_m$ and $\Delta_m'$ are constant irrespective of m. At 24-times velocity or 32-times velocity, it is preferred that $\alpha c=\alpha_i$ (i=2 to m) is firstly made to be 1, and then fine adjustment within a range of ±0.2 is further carried out. For $\alpha_1$ and $\alpha_m$, firstly, the same value as αc is employed, and fine adjustment is carried out within a range of larger by about 0.3 at the maximum than αc. $\Delta_m$ and $\Delta_{m-1}$ take about 0.4 as the initial value, and fine adjustment is carried out to obtain the prescribed mark lengths. Further, $\beta_m'$ at section 410 is firstly made to be equal to $\beta_m$ at section 405, and thereafter, fine adjustment is carried out.

Here, when m=2, $(\beta_i'+\alpha_2')T$ is made longer by about 1 T than $(\beta_1+\alpha_2)T$. However, since m−1=1, they may be deemed to be $(\beta_{m-1}'+\alpha_m')T$ and $(\beta_{m-1}+\alpha_m)T$, respectively. And, $\alpha_1$, $\alpha_1'$, $\beta_1$, $\beta_1'$, $\alpha_2$, $\alpha_2'$, $\beta_2$ and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m=3, respectively. However, when m=2, $\alpha_1$, $\alpha_1'$, $\beta_1$, $\beta_1'$, $\alpha_2$, $\alpha_2\alpha$, $\beta_2$ and $\beta_2'$ may further be finely adjusted within a range of about ±10%.

Thus, for an even number length mark, recording pulse train 402 shown by a dotted line in FIG. 16(*b*) is obtained, and for an odd number length mark, recording pulse train 406 shown by a dotted line in FIG. 16(*c*) is obtained.

Further, when m=1 (n=3), irradiation with a recording laser beam comprising a pair of a writing power irradiation section $\alpha_1'T$ and a bias power irradiation section $\beta_1'T$ is carried out. In such a case, $\alpha_1'$ is preferably made to larger by from about 0.1 to 1.5 than $\alpha_1'$ in the case where m is at least 2. Further, the range of $\beta_1'$ is preferably from 0 to 2.

In recording method CD2-1, an even number length mark and an odd number length mark are recorded by the same rule as in recording method CD1-1, and in recording method CD2-2, an even number length mark and an odd number length mark are recorded by the same rule as in recording method CD1-2, but $\alpha_i$ and $\alpha_i'$ (i=1 to m) are made to be values smaller than in recording at a linear velocity of 24- or 32-times velocity and within a range of from 0.1 to 1. Consequently, $\beta_i$ and $\beta_i'$ (i=1 to m) are made to be values larger than in recording at a linear velocity of 24-times velocity or 32-times velocity. Further, in the case of recording method CD2-2, especially $\Delta_m'$ is made to be variable within a range of from 0 to 1. Further, $\Delta_{m-1}+\Delta_m+\Delta_m'$ is preferably made to be within a range of from 0.5 to 1.5.

When $\alpha_i$ and $\alpha_i'$ in the case where the maximum linear velocity $V_{max}$ in recording method CD1-1 or CD1-2 is made to be 24-times velocity or 32-times velocity, are represented by $\alpha_{i0}$ and $\alpha_{i0}'$, if the same medium is subjected to recording at 8-times velocity, 10-times velocity, 12-times velocity, 16-times velocity or 20-times velocity (i.e. linear velocity V is any one of $8V_1$, $10V_1$, $12V_1$, $16V_1$ and $20V_1$) by recording method CD2-1 or recording method CD2-2, they are generally set to be $\alpha_i=\eta(V/V_{max})\alpha_{i0}$, and $\alpha_i'=\eta(V/V_{max})\alpha_{i0}'$, and thereafter, fine adjustment within a range of about ±0.1, is carried out.

Here, η is a real number within a range of from 0.8 to 1.5. Particularly, a value within a range of from 1.0 to 1.3 is firstly employed, and thereafter, measurement is carried out by enlarging the range to be from 0.8 to 1.5.

Further, in recording method CD2-1 or 2-2, an exceptional rule may be applied when n=5.

Namely, in recording method CD2-1, when m=2 (n=4, 5), $\alpha_1\alpha_1'$, $\alpha_2$, $\alpha_2'$, $\beta_2$ and $\beta_2'$ are made to be equal to $\alpha_1$, $\alpha_1'$, $\alpha_3$ ($\alpha_m$), $\alpha_3'$ ($\alpha_m'$), $\beta_3'$(m) and $\beta_3'(\beta_m')$ in the case where m is 3, respectively, $\beta_1$ is made to be equal to either $\beta_1$ or $\beta_2$ ($\beta_{m-1}$)

in the case where m is 3, and $\beta_1'$ is made to be equal to either $\beta_1'$ or $\beta_2'(\beta_{m-1}')$ in the case where m is 3. However, in spite of the expression "made to be equal", a deviation at a level of ±10% is allowable. Further, with respect to $\beta_2'$ when m=2, the value may further be changed within a range of ±0.5.

Further, in recording method CD2-2, when m=2 (n=4, 5), $\alpha_1$, $\alpha_i'$, $\beta_1$, $\beta_i'$, $\alpha_2$, $\alpha_2'$, $\beta_2$ and $\beta_2'$ are made to be equal to $\alpha_1$, $\alpha_1'$, $\beta_2(\beta_{m-1})$, $\beta_2'(\beta_{m-1}')$, $\alpha_3(\alpha_m)$, $\alpha_3'(\alpha_m')$, $\beta_3(\beta_m)$ and $\beta_3'$ $(\beta_m')$ in the case of m=3, respectively. However, in spite of the expression "made to be equal", a deviation at a level of ±10% is allowable. Further, $\beta_i'$ in the case where n=3, is preferably made to be within a range of from 0 to 3.

With respect to CD-RW expected to be used at a velocity of up to 24-times velocity, the recording characteristics are defined for example at 10-times velocity and 24-times velocity, or at 12-times velocity and 24-times velocity, and with respect to CD-RW expected to be used at a velocity of up to 32-times velocity, the recording characteristics at 10-times velocity and 32-times velocity, the recording characteristics at 12-times velocity and 32-times velocity, or the recording characteristics at 16-times velocity and 32-times velocity, are, respectively, defined, whereby a medium suitable for the after-mentioned CAV recording system, P-CAV recording system or ZCLV recording system, can substantially univocally be defined from the viewpoint of recording/retrieving interchangeability among drives. In such a case, it is preferred that in recording method CD2-1 or 2-2 in the measurement of a low linear velocity side, the values of $\alpha_i$, $\alpha_i'$, $\beta_i$ and $\beta_i'$ are set so that they are generally proportional to the linear velocity as mentioned above ($\alpha_i = \eta$ (V/V$_{max}$) $\alpha_{i0}$, $\alpha_i' = \eta$ (V/V$_{max}$)$\alpha_{i0}'$), whereby the medium characteristics can better be defined.

Thus, to define the characteristics of a rewritable optical recording medium at a plurality of recording linear velocities within different recording velocity ranges wherein the ratio between the minimum linear velocity and the maximum linear velocity becomes at least two times, is a preferred method also with a view to securing recording/retrieving interchangeability of a medium from the viewpoint of recording drives. It is particularly preferred to use recording method CD1-1 in combination with recording method CD2-1, and to use recording method CD1-2 in combination with recording method CD2-2.

Thus, in the case of defining a medium within a specific range, it is particularly preferred to combine recording method CD1-2 with recording method CD2-2 to define rewritable CD-RW with the maximum linear velocity V$_{max}$ of 24-times velocity or 32-times velocity.

Further, in a method for defining the medium characteristics corresponding to such 32-times velocity or 24-times velocity, recording method CD1-2 may be further defined to present the following recording method CD1-3, whereby the medium characteristics can more specifically be defined. Thus, it is preferred that interchangeability can be secured when such a medium is subjected to recording by a plurality of recording devices.

Recording Method CD1-3:

For a mark length of m=at least 2, $T_{d1}'=T_{d1}=2-\alpha c$, $\alpha_i'=\alpha_i=\alpha c$ (i=1 to m−1), $\beta_i'=\beta_i=2-\alpha c$ (i=1 to m−2), $\alpha_m=\alpha c$ and $\beta_{m-1}=2-\alpha c$, being constant, and $\beta_{m-1}'=1+\Delta_{m0}$ $(0<\Delta_{m0} \leq 0.6)$, $\alpha_m'=1+\Delta_{m0}$ $(0<\Delta_{m0} \leq 0.6)$ and $\beta_m'=\beta_m+\Delta_m'$, and $\Delta_{m0}$, $\Delta_m'$ are constant irrespective of m. Here, when m=2, $\beta_1$, $\beta_1'$, $\alpha_2$, $\alpha_2'$, $\beta_2$ and $\beta_2'$ are deemed to be $\beta_2(\beta m-1)$, $\beta_2'(\beta_{m-1}')$, $\alpha_3 (\alpha_m)$, $\alpha_3'(\alpha_m')$, $\beta_3 (\beta_m)$ and $\beta_3'(\beta_m')$ in the case where m=3. $\alpha c$ is from 0.7 to 1.2, more preferably from 0.7 to 1, particularly preferably from 0.9 to 1.

Here, it is particularly preferred to combine recording method CD1-3 with the following recording method CD2-3 to define rewritable CD-RW to be used at the maximum linear velocity V$_{max}$ of 24-times velocity or 32-times velocity.

Recording Method CD2-3:

For a mark length of m=at least 2 (n=4), $T_{d1}'+\alpha_1'=T_{d1}+\alpha_1=2$, $\alpha_i=\alpha c$ (i=1 to m), $\alpha_i'=\alpha c$ (i=1 to m−1), wherein $\alpha c=0.1$ to 1, $\beta_{i-1}+\alpha_i=2$ (i=2 to m) and $\beta_{i-1}'+\alpha_1'=2$ (i=2 to m−1), and $\beta_{m-1}'=\beta_{m-1}+\Delta_{m0}$ $(0<\Delta_{m0} \leq 0.6)$, $\alpha_m'=\alpha_m+\Delta_{m0}$ $(0<\Delta_{m0} \leq 0.6)$ and $\beta_m'=\beta_m+\Delta_m'(\Delta_m'=0$ to 1), and further, $\Delta_{m0}$, $\Delta_m$ and $\Delta_m'$ are constant irrespective of m. Here, when m=2, $\beta_1$, $\alpha_2$ and $\beta_2$ are deemed to be $\beta_2(m-1)$, $\beta_3(m)$ and $\alpha_3'(\alpha_m')$ in the case of m=3, respectively.

Recording methods CD1-3 and 2-3 are characterized in that when an odd number record mark is to be formed among an even number record mark and an odd number record mark having the same division number m, equal $\Delta_m$ (which is represented by $\Delta_{m0}$ in recording methods CD1-3 and 2-3) is imparted to an off-pulse section ($\beta$m−1') immediately before the last and to the last recording pulse section ($\alpha_m'$). By imparting equal $\Delta_m$ (which is represented as $\Delta_{m0}$ in recording methods CD1-3 and 2-3), the design of an electronic circuit (integrated circuit) to control generation of laser beams (pulsed beams) for recording pulses and off-pulses of the recording pulse strategy for forming record marks, can be simplified, whereby it will be possible to reduce the costs for the electronic circuit (integrated circuit).

It is particularly preferred to make $\Delta_m$ larger than 0 with a view to stabilizing the shape of the rear end portion of the record mark to improve the jitter characteristics. Specifically, it is preferred that it is made to be $\Delta_{m0}$ in recording methods 1-3 and 2-3, and $\Delta_{m0}$ is made to be within a range of $0<\Delta_{m0} \leq 0.6$. In order to stabilize the shape of the rear end portion of the record mark, more preferred is that $\Delta_{m0}$ is made to be within a range of $0<\Delta_{m0} \leq 0.5$.

Further, with a view to stabilizing the shape of the rear end portion of a record mark where n is an odd number to improve the jitter characteristics, $\Delta_m'$ is preferably set to be within a range of $0<\Delta_m' \leq 1$, more preferably $0<\Delta_m' \leq 0.6$, particularly preferably within a range of $0<\Delta_m' \leq 0.5$.

Figure 17:
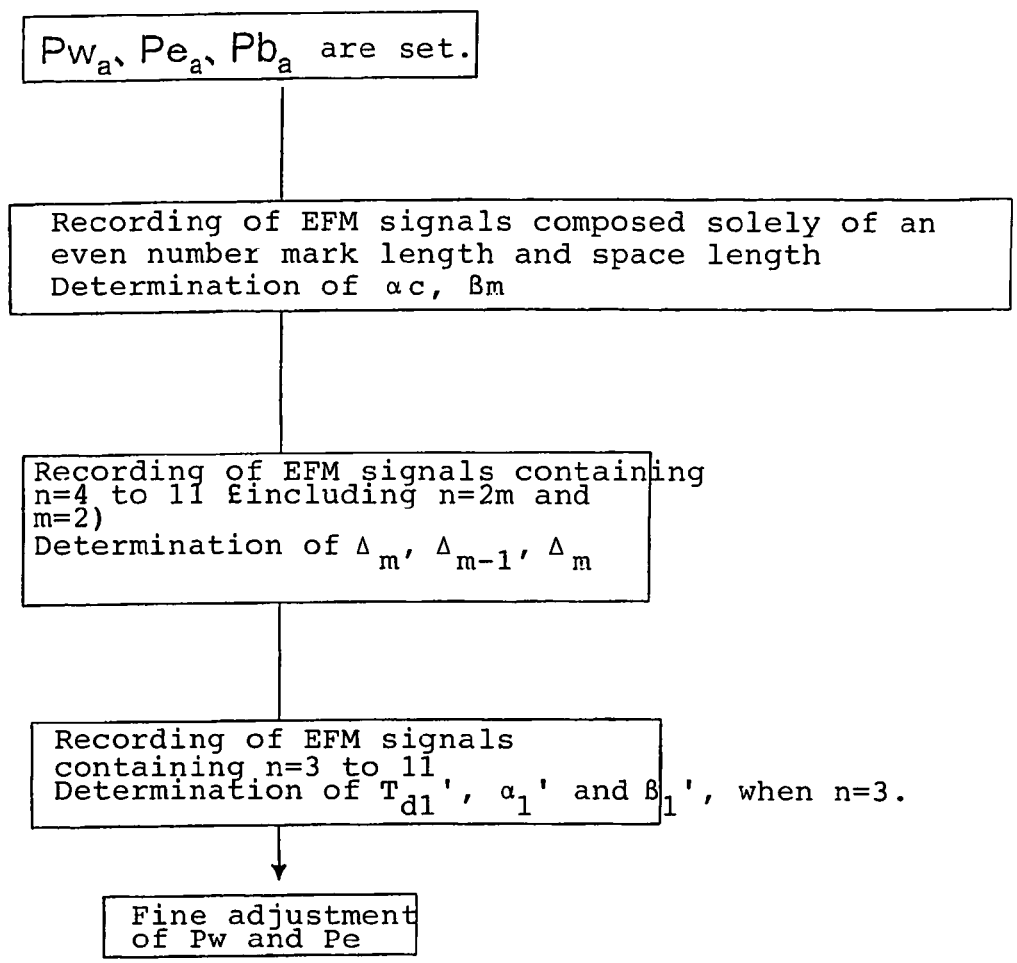
FIG. 17 shows a method for determining a recording pulse-dividing method.

And, at each linear velocity, the optimum values of minimum parameters are determined in accordance with the procedure shown in FIG. 17. That is:

1) Provisional values Pw$_a$, Pe$_a$ and Pb$_a$ are determined for Pw, Pe and Pb.

2) EFM signals composed solely of an even number mark and a space length (containing all of n=4, 6, 8 and 10) are recorded by irradiating Pw$_a$, Pe$_a$ and Pb$_a$. As $\alpha c$ and $\beta_m$ are variable, such $\alpha c$ and $\beta_m$ are determined so that each mark length and each space length can be retrieved to have the prescribed length at the time of 1-time velocity retrieving within a range where m$_{11}$=0.6 to 0.8, and the jitter value will be 35 nsec.

3) Then, EFM signals obtained by adding an odd number mark length and space length (including all of n=5, 7, 9 and 11) other than n=3, to the above-mentioned FEM signals composed solely of an even number length mark and space length, are recorded by irradiation with Pw$_a$, Pe$_a$ and Pb$_a$. For $\alpha c$ and $\beta_m$, the above values are employed, and $\Delta_{m0}=\Delta_{m-1}=\Delta_m$ and $\Delta_m'$ are variable, and such values are determined so that each mark length and each space length can be retrieved to have the prescribed length at the time of retrieving at 1-time velocity, and the jitter value will be 35 nsec.

4) Finally, complete FEM signals having 3 T mark and space added, are recorded by irradiation with $Pw_a$, $Pe_a$ and $Pb_a$. With respect to the mark length of n=at least 2, the above-mentioned values of αc, $β_m$, $Δ_{m0}=Δ_{m-1}=Δ_m$ and $Δ_m'$ are employed. Only $T_{d1}'$, $α_1'$ and $β_1'$ relating to n=3 are variable, and such values are determined so that 3 T mark length and space length can be retrieved to have the prescribed lengths at the time of retrieving at 1-time velocity and the jitter value will be 35 nsec.

5) $Pw_a$ and $Pe_a$ are variable, and fine adjustment of Pw and Pe is carried out so that primarily, the jitter or the error rate will be minimum within a range where $m_{11}$=0.6 to 0.8. If, in each step of the above procedure, $m_{11}$=0.6 to 0.8, and the jitter of 35 nsec, can not be obtained, such a medium is regarded as not satisfying the requirements of the present invention.

Further, in FIG. 17, the Pe/Pw ratio and the initial value of Pw are determined as follows.

A repeating pattern (hereinafter referred to as 11 T data) composed solely of 11 T mark length and space length, is recorded in an unrecorded state groove with Pe=0 and only Pw being variable. In this state, Pw whereby $m_{11}$ would be within a range of from 0.6 to 0.8, is determined to obtain the initial value $Pw_a$. If $m_{11}$ increases beyond the range of from 0.6 to 0.8 when Pw is increased, a Pw value whereby $m_{11}$ would be about 0.7, is taken as the initial value $Pw_a$. Then, Pe is irradiated in a direct current fashion to the 11 T data signals recorded by such $Pw_a$, to measure the decrease of the carrier level of the 11 T data signals by dB (decibel value). This operation is repeated while increasing Pe within a range of Pe/$Pw_a$=0.2 to 0.6, and the first Pe whereby the decrease of the carrier level exceeds 25 dB, is taken as the initial value $Pe_a$ of Pe. As the initial value $Pb_a$ of Pb, a power equivalent to a retrieving laser beam power at a level where servo will be stabilized at the time of retrieving with a power of 0<$Pb_a$<1 mW, is selected.

Further, in this specification, "overwriting" usually means to overwrite new data without returning once-recorded data to a uniform unrecorded or erased state by a certain specific treatment. However, in the present invention, also a case where recording is carried out in an initial uniform non-recorded or erased state is regarded as overwriting. For example, "overwriting ten times" in the case of evaluating the characteristics of an optical recording medium by means of the above recording method CD1-1, 1-2, 2-1 or 2-2, means to carry out the first recording (overwriting first time) in the initial crystalline state and then carry out overwriting 9 times. The same applies in the following description.

Further, the definition of "$α_i+β_{i-1}$=2" in recording methods CD1-1, 1-2, 2-1 and 2-2, means that $(α_i+β_{i-1})$ is a time length twice the reference clock period T and may contain an error at a level of fluctuation which inevitably results from the circuit design. Specifically, a difference at a level of 0.1 T is regarded to be substantially equal. Likewise, in the above description, for example, in a case where a specific $α_i$ is made to be "constant" or "equal" to another $α_i$ or $α_i'$, inevitable fluctuation in practicing an electronic circuit, is allowable.

Furthermore, even if the wavelength of the recording laser beam in recording methods CD1-1, 1-2, 2-1 and 2-2 is fluctuated within a range of from about 775 to 795 nm, such will not be a serious problem, since with a phase-change medium, the wavelength dependency within such a wavelength range is very small.

1-2. In the Case of RW-DVD

In a case where the present invention is to be applied to RW-DVD, as a linear velocity (speed) being a velocity of a beam spot of a recording laser beam to the medium, 3.49 m/s is used as the reference velocity $V_1$ i.e. 1-time velocity.

Firstly, disks according to the first and second aspects of the present invention will be described.

A rewritable optical recording medium of the present invention is usually of a disk-shape. And, a portion in a crystalline state of the phase-change type recording layer is in an unrecorded or erased state, and a portion in an amorphous state is in a recorded state. Information to be recorded comprises signals EFM+ modified by irradiating a recording beam such as a laser beam to form amorphous marks. A usually helical groove is formed on the substrate of the medium. The amorphous marks are usually formed in this groove. Here, the groove is meant for a bottom of a recess for guiding a laser beam, formed on the substrate surface, which is a face closer as viewed from the incident side of the recording/retrieving laser beam.

When data are to be recorded, the reference clock period T will be a reference, and data will be recorded by forming marks and spaces (between marks) having various time lengths corresponding to integral multiple lengths of the reference clock period. In EFM+ modulation, marks having time lengths of from 3 T to 14 T are usually formed. Further, it is common that the reference clock period T is changed in inverse proportion to the recording linear velocity.

The inverse number of the reference clock period T is called a reference clock frequency, and the reference clock frequency at 1-time velocity of DVD (linear velocity of 3.49 m/s) corresponds to 1 channel bit of data and is usually 26.15625 MHz.

The reference clock period T at 1-time velocity usually becomes $1/(26.15625 \times 10^6) = 38.2 \times 10^{-9}$ (sec)=38.2 (nsec).

In the following description, the product VT of the reference clock period T and the linear velocity V is constant irrespective of the linear velocity, unless otherwise specified.

Figure 2B:
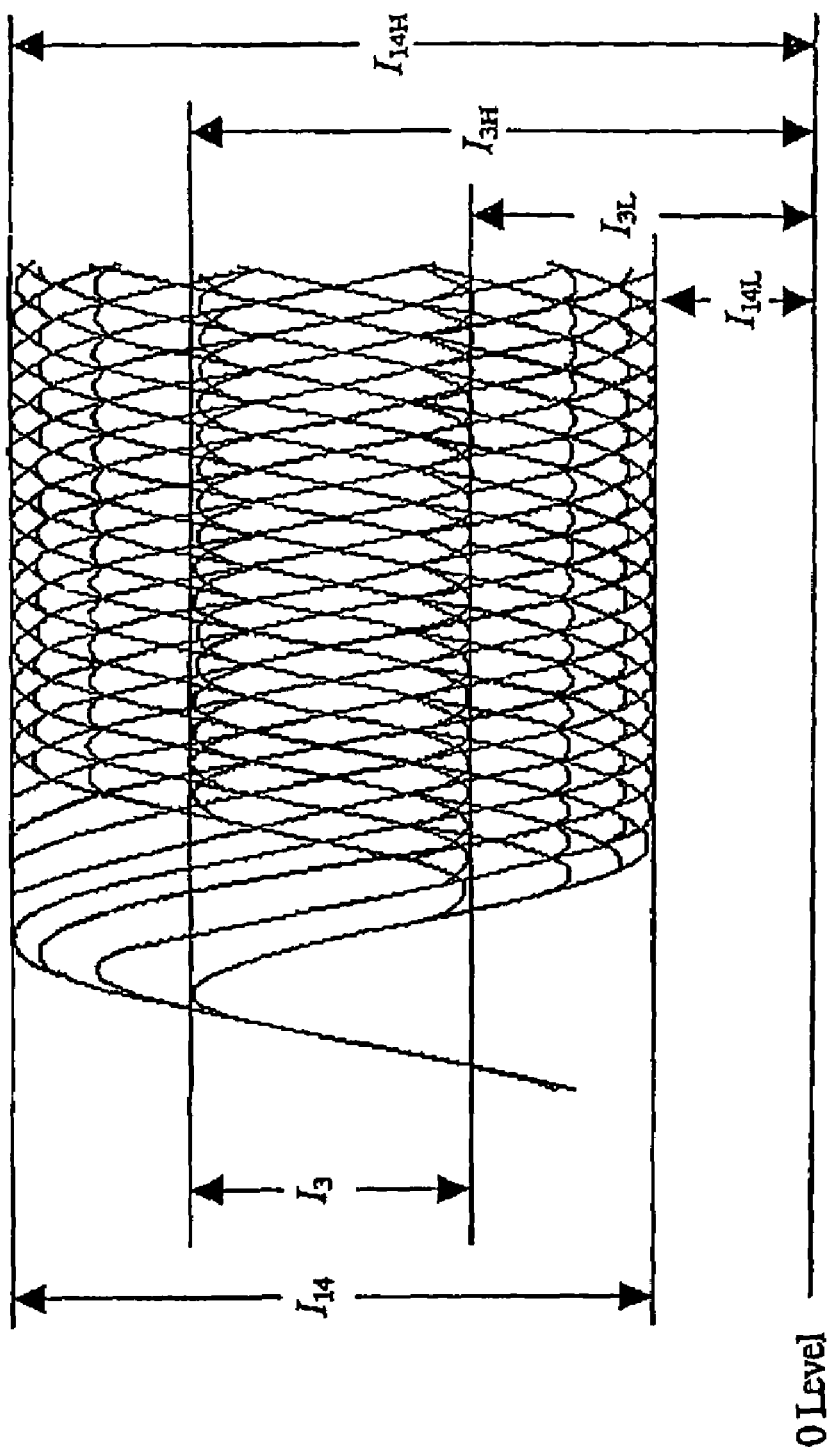

FIG. 2(*b*) shows a schematic view of a retrieving waveform (an eye pattern) of EFM+ modified signals to be used for a DVD family including DVD-RW. In this eye pattern, all retrieving waveforms of amorphous marks and spaces in crystalline state, of from 3 T to 14 T, are randomly contained. The retrieving waveforms are waveforms as observed on an oscilloscope when the reflected light intensities are taken out as voltage signals. In such a case, the retrieving signals contain a direct current component.

One having the top $I_{14H}$ of the eye pattern converted to a reflectivity to an incident light is the top value $R_{top}$ of reflectivity corresponding to a space, and one having the amplitude $I_{14}$ of the eye pattern (for practical purpose, the amplitude of 14 T mark) normalized by $I_{14H}$, is the modulation $m_{14}$ of a record signal represented by the following formula (DVD1) (in this specification, $m_{14}$ may sometimes be referred to simply as a modulation).

$$m14=I_{14}/I_{14H} \times 100(\%) \tag{DVD1}$$

In the present invention, the modulation $m_{14}$ is from 55% to 80%. The modulation depends upon the optical resolving power and tends to be observed to be large by an optical system having a large NA. Therefore, in the present invention, a modulation $m_{14}$ is taken when recording is carried out by irradiating a laser beam having a wavelength of about 650 nm through an optical system having a numerical aperture NA=0.60 or NA=0.65. However, the wavelength is not required to be strictly 650 nm, and it may be within a range of from about 630 to 665 nm.

The larger the signal amplitude $I_{14}$, the better. However, if it is too large, the gain of the amplifier in the signal retrieving system tends to be extremely saturated, and accordingly, the upper limit of $m_{14}$ is 80%, preferably 78%, more preferably about 75%. On the other hand, if it is too small, the signal-to-noise ratio (SN ratio) tends to be low, and accordingly, the lower limit is 55%, preferably 60%, more preferably about 65%. Further, $R_{top}$ is within a range of from 18 to 30%, preferably from 18 to 25%, more preferably from 19 to 23%. Further, it is preferred that the asymmetry value Asym as defined by the following formula (DVD2):

$$\mathrm{Asym}=(((I_{14H}+I_{14L})/2-(I_{3H}+I_{3L})/2)/I_{14})\times 100(\%) \quad (\mathrm{DVD2})$$

is preferably as close as possible to 0, but it is usually within a range of from +10% to −5%.

Clock jitter of retrieving signals is one obtained by normalizing by the reference clock period T a standard deviation (jitter) of the difference in time against PLL clock of the leading edge and the trailing edge of binary signals obtained by passing the retrieving signals through an equalizer and LPF, followed by conversion to binary signals by a slicer. A detailed measurement method is prescribed in DVD-ROM standards or DVD+RW standards. In the present invention, with respect to the clock jitter, the clock jitter value when retrieving is carried out 1-time velocity (reference clock period: 38.2 nsec) is at most 15%. Here, in current RW-DVD standards, the allowable value of this clock jitter is stipulated to be at most 9%, but in the present invention, up to 15% is taken as an allowable value, taking into consideration the improvement in performance of the DVD retrieving circuit in recent years. This clock jitter value is more preferably at most 12%, further preferably at most 10%.

By controlling the modulation $m_{14}$, the top value $R_{top}$ of reflectivity and the clock jitter within the above-mentioned values, a medium recorded at a high velocity at a level of at least 6-times velocity, can be retrieved by a retrieving system for conventional phase-change type DVD, while maintaining interchangeability with conventional phase-change type DVD standards.

Further, in the following, the clock jitter in RW-DVD may sometimes be referred to simply as jitter.

With the rewritable optical recording medium of the present invention, it is preferred that when at any one of 6-times velocity, 8-times velocity, 10-times velocity and 12-times velocity, a simple periodic signal (referred to as 3 T data) comprising a 3 T mark and a 3 T space (a space between mark), is recorded, and then, a simple periodic signal (referred to as 14 T data) comprising a 14 T mark and a 14 T space, is overwritten, the erase ratio of the 3 T mark is at least 20 dB, preferably at least 25 dB. Further, also at 12-times velocity, such erase ratio is preferably at least 20 dB, more preferably at least 25 dB. The higher such erase ratio at a high linear velocity, the higher the recrystallization speed at the time of erasing amorphous marks, whereby with such a medium, overwriting of EFM+ signals at a high linear velocity is possible. For example, if such erase ratio at 10-times velocity or 12-times velocity is set to be at least 20 dB, it is not only possible to obtain good characteristics when used at 6-times velocity, but also possible to obtain good characteristics also when used at less than 6-times velocity. Here, to record the simple periodic signal comprising a 3 T mark and a 3 T space (between marks) and to overwrite the simple periodic signal comprising a 14 T mark and a 14 T space, a recording method of the after-mentioned recording method DVD1-1 or 1-2 is employed. At the time of recording the simple periodical signal comprising a 3 T mark and a 3 T space (between marks), a 3 T mark is recorded by a writing power comprising one writing pulse Pw and a subsequent off-pulse Pb (0<Pb<1 mW), and at other sections, an erasing power Pe is irradiated. Pw is a power to melt the recording layer, and Pb is a cooling section to quench the melted region to form an amorphous state. At the time of overwriting the simple periodic signal comprising a 14 T mark and a 14 T space, a 14 T mark is recorded by repeating a writing power comprising seven writing pulses Pw and off-pulses Pb (0<Pb<1 mW) accompanying individual Pw, and at other sections, an erasing power Pe is irradiated. In overwriting 3 T data and 14 T data, the same Pe and Pw are used, and the Pe dependency of the erase ratio is measured by changing Pe while maintaining Pe/Pw to be constant within a range of from 0.2 to 0.6, to confirm that at some Pe, the erase ratio becomes at least 20 dB, preferably at least 25 dB. The erase ratio is one obtained by measuring the decrease of the carrier level of 3 T data between before and after the overwriting of the 14 T data, by dB unit.

In any case, recording is carried out in the same groove, and usually, recording is carried out in a groove corresponding to one round.

With respect to the erase ratio, if the erase ratio is sufficient at the upper limit within the linear velocity range for overwriting, there will be no possibility that the erase ratio becomes deficient on a lower linear velocity side than usual. Namely, the time for irradiation of the recording layer with a laser beam having a wavelength of λ condensed by an object lens having a numerical aperture NA moving at a linear velocity V, is standardized by λ/(NA·V), whereby the irradiation time increases as the linear velocity is low, and the time required for recrystallization can sufficiently be secured.

Further, when the archival life of the recording medium is represented by the time until the jitter of record signals previously recorded will reach 12% in retrieving at 1-time velocity, the archival life at a temperature of 80° C. under a relative humidity of 85%, is preferably at least 200 hours, more preferably at least 500 hours.

Further, in the present invention, in order to satisfy the above characteristics, when an accelerated test at a temperature of at least 105° C. is applied as a condition where evaluation can be carried out in a shorter time, each of the modulation $m_{14}$ and the top value $R_{top}$ of reflectivity in a crystalline state maintains preferably at least 90% of the initial value even upon expiration of 3 hours in the accelerated test environment at a temperature of 105° C., because such a requirement is satisfied by currently commercially available DVD+RW for from 1 to 2.4-time velocity.

The definitions for the modulation $m_{14}$, $R_{top}$, the jitter, the asymmetry value, the erase ratio, etc. at the linear velocity V (at this paragraph, V represents a linear velocity of 6-times velocity, 8-times velocity, 10-times velocity or 12-times velocity) in the present invention, are given from record signals obtained by recording EFM+ modulation signals by overwriting 10 times by one recording method selected from the conditions of the following recording methods DVD1-1 and DVD1-2 while maintaining the data reference clock period T to satisfy $VT=V_1T_1$, where $V_1$ is a reference velocity (1-time velocity) which is set to be a linear velocity of 3.49 m/s, and $T_1$ is 38.2 nsec, followed by retrieving at 1-time velocity.

Recording Method DVD1-1:

A laser beam having a wavelength of 650 nm is irradiated via an optical system having a numerical aperture NA of 0.65, wherein when the time length of one amorphous mark is represented by nT (where n is an integer of from 3 to 11 and 14), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_i T$ and $\beta_i T$ comprising $\alpha_1 T$, $\beta_1 T$, $\alpha_2 T$, $\beta_2 T$, ..., $\alpha_m T$ and $\beta_m T$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1+\Delta_1$ (where $\Delta_1=0.3$ to 0.6), $\alpha_i'=\alpha c$ (where i is an integer of from 2 to m−1), $\beta_{i-1}+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m \leq 0.6$), $\Delta_{mm}=\Delta_{m-1}+\Delta_m=0.3$ to 0.6, and $\beta_m'=\beta_m$, a recording laser beam having a constant writing power Pw sufficient to melt the recording layer (provided that Pw is from 10 to 40 mW, and Pe/Pw=0.2 to 0.6) is applied within a time of $\alpha_i T$ and $\alpha_i'T$ (where i is an integer of from 1 to m), and a recording laser beam having a bias power Pb of less than 1 mW is applied within a time of $\beta_i T$ and $\beta_i'T$ (where i is an integer of from 1 to m); and further, when m is at least 3, $\alpha_1(=\alpha_1')$, $\alpha c$, $\beta_m(=\beta_m')$ $\beta_1$, $\Delta_1$, $\beta_{m-1}$, $\Delta_{m-1}$, $\alpha_m$ and $\Delta_m$ are constant irrespective of m, when m=2 (n=4, 5), $\alpha_1$, $\alpha_1'$, $\alpha_2$, $\alpha_2'$, $\beta_2$ and $\beta_2'$ are made to be equal to $\alpha_1$, $\alpha_1'$, $\alpha_3$, $\alpha_3'$, $\beta_3$ and $\beta_3'$ in the case where m is 3, respectively, $\beta_1$ is made to be equal to either $\beta_1$ or $\beta_2$ in the case where m is 3, and $\beta_1'$ is made to be equal to either $\beta_1'$ or $\beta_2'$ in the case where m is 3 (provided that a deviation of about ±10% is allowable), and when m=1 (n=3), irradiation with a recording laser beam comprising a pair of a writing power irradiation section $\alpha_1'T$ and a bias power irradiation section $\beta_1'T$ is carried out;

Recording Method DVD1-2:

A laser beam having a wavelength of 650 nm is irradiated via an optical system having a numerical aperture NA of 0.65, wherein when the time length of one amorphous mark is represented by nT (where n is an integer of from 3 to 11 and 14), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_i T$ and $\beta_i T$ comprising $\alpha_1 T$, $\beta_1 T$, $\alpha_2 T$, $\beta_2 T$ ..., $\alpha_m T$ and $\Delta_m T$, so that $\Sigma_i(\alpha_i+\beta_i)=n-j$, in the order of $\alpha_1=0.7$ to 1.4, $\alpha_i=0.7$ to 1.2 (where i is an integer of from 2 to m−1, and $\alpha_i$ takes a constant value $\alpha c$ between 0.7 to 1.2 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.7$ to 1.2, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1$, $\alpha_i'=\alpha c$ (where i is an integer of from 2 to m−1), $\beta_{i-1}'+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m \leq 0.6$), $\Delta_{mm}=\Delta_{m-1}+\Delta_m=0.5$ to 1.2, and $\beta_m'=\beta_m$, a recording laser beam having a constant writing power Pw sufficient to melt the recording layer (provided that Pw is from 10 to 40 mW, and Pe/Pw=0.2 to 0.6) is applied within a time of $\alpha_i T$ and $\alpha_i'T$ (where i is an integer of from 1 to m), and a recording laser beam having a bias power Pb of less than 1 mW is applied within a time of $\beta_i T$ and $\beta_i'T$ (where i is an integer of from 1 to m); and further, when m is at least 3, $\alpha_1(=\alpha_1')$, $\beta_1(=\beta_1')$, $\alpha c$, $\beta_{m-1}$ $\Delta_{m-1}$, $\alpha_m$, $\beta_m$ and $\Delta_m'$ are constant irrespective of m, when m=2 (n=4, 5), $\alpha_1$, $\alpha_1'$, $\beta_1$, $\beta_1'$, $\alpha_2$, $\alpha_2'$, $\beta_2$ and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m is 3, respectively, provided that in spite of the expression "made to be equal", a deviation of about ±10% is allowable, and when m=1 (n=3), irradiation with a recording laser beam comprising a pair of a writing power irradiation section $\alpha_1'T$ and a bias power irradiation section $\beta_1'T$ is carried out.

Here, $\Sigma_i(\alpha_i+\beta_i)$ or the like means to take the sum from 1 to m with respect to i.

In the present invention, with RW-DVD rewritable at 6-times velocity, 8-times velocity, 10-times velocity or 12-times velocity of the above reference linear velocity, it is preferred that at least one of 2-times velocity, 2.5-times velocity, 3-times velocity, 4-times velocity and 5-times velocity of the reference linear velocity, the modulation $m_{14}$, $R_{top}$, the jitter, the asymmetry value and the value of the erase ratio will be within the above-mentioned numerical value ranges.

Further, it is preferred that at any linear velocity between $V_{min}$ and $V_{max}$, where $V_{min}$, is a linear velocity of any one selected from 2-times velocity, 2.5-times velocity, 3-times velocity, 4-times velocity and 5-times velocity, of the above-mentioned reference velocity, and $V_{max}$ is 6-times velocity, 8-times velocity, 10-times velocity or 12-times velocity, of the reference velocity, the modulation $m_{14}$, $R_{top}$ the jitter, the asymmetry value and the value of the erase ratio will be within the above numerical value ranges, whereby recording by the after-mentioned P-CAV or CAV system will be possible.

Here, specific values of the modulation $M_{14}$, $R_{top}$, the jitter, the asymmetry value, the erase ratio, etc. at 2-times velocity, 2.5-times velocity, 3-times velocity, 4-times velocity or 5-times velocity, are measured as follows. Namely, they are given from record signals obtained by recording EFM+ modulation signals by overwriting 10 times by one recording method selected from the conditions of the following recording methods DVD2-1 and 2-2 at any one of 2-times velocity ($2V_1$), 2.5-times velocity ($2.5V_1$), 3-times velocity ($3V_1$), 4-times velocity ($4V_1$) and 5-times velocity ($5V_1$) of the reference velocity $V_1$ (1-time velocity) which is set to be a linear velocity of 3.49 m/s, while maintaining the data reference clock period T to satisfy $VT=V_1 T_1$ (where $T_1$ is 38.2 nsec, and V is any one of $2.5V_1$, $3V_1$, $4V_1$ and $5V_1$), followed by retrieving at 1-time velocity.

Recording Method DVD2-1:

A laser beam having a wavelength of 650 nm is irradiated via an optical system having a numerical aperture NA of 0.65, wherein when the time length of one amorphous mark is represented by nT (where n is an integer of from 3 to 11 and 14), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_i T$ and $\beta_i T$ comprising $\alpha_i T$, $\beta_1 T$, $\alpha_2 T$, $\beta_2 T$, ..., $\alpha_m T$ and $\beta_m T$, so that $\Sigma_i(\alpha_i+\beta_i)=n-j$, in the order of $\alpha_1=0.1$ to 1, $\alpha_i=0.1$ to 1 (where i is an integer of from 2 to m−1, and $\alpha_i$ takes a constant value $\alpha c$ between 0.1 to 1 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.1$ to 1, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1+\Delta_1$ (where $\Delta_1=0.3$ to 0.6), $\alpha_i'=\alpha c$ (where i is an integer of from 2 to m−1), $\beta_{i-1}+\alpha_i'=2$ (where i is an integer of from 3 to m−1), $\beta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.3$ to 0.6, and $\beta_m'=\beta_m$, a recording laser beam having a constant writing power Pw sufficient to melt the recording layer (provided that Pw is from 10 to 40 mW, and Pe/Pw=0.2 to 0.6) is applied within a time of $\alpha_i T$ and $\alpha_i'T$ (where i is an integer of from 1 to m), and a recording laser beam having a bias power Pb of less than 1 mW is applied within a time of $\beta_i T$ and $\beta_i'T$ (where i is an integer of from 1 to m); and further, when m is at least 3, $\alpha_1(=\alpha_1')$, $\alpha c$, $\beta_m(=\beta_m')$, $\beta_1$, $\Delta_1$, $\beta_{m-1}$, $\Delta_{m-1}$, $\alpha_m$ and $\Delta_m$ are constant irrespective of m, when m=2 (n=4, 5), $\alpha_1$, $\alpha_1'$, $\alpha_2$, $\alpha_2'$, $\beta_2$ and $\beta_2'$ are made to be equal to $\alpha_1$, $\alpha_1'$, $\alpha_3$, $\alpha_3'$, $\beta_3$ and $\beta_3'$ in the case where m is 3, respectively, $\beta_1$ is made to be equal to either $\beta_1$ or $\beta_2$ in the case where m is 3, and $\beta_1'$ is made to be equal to either $\beta_1'$ or $\beta_2'$ in the case where m is 3, here a deviation of about ±10% is allowable, provided that with respect to $\beta_2'$, the value may further be changed within a range of ±10.5, and when m=1 (n=3), irradiation with a recording laser beam comprising a pair of a writing power irradiation section $\alpha_1'T$ and a bias power irradiation section $\beta_1'T$ is carried out;

Recording Method DVD2-2:

A laser beam having a wavelength of 650 nm is irradiated via an optical system having a numerical aperture NA of 0.65, wherein when the time length of one amorphous mark is represented by nT (where n is an integer of from 3 to 11 and 14), between record marks, an erasing power Pe capable of crystallizing an amorphous phase is applied, and for a record mark of n=2m (where m is an integer of at least 3), of which the time length (n−j)T (where j is a real number of from −2.0 to 2.0) is divided into m sections of $\alpha_i T$ and $\beta_i T$ comprising $\alpha_i T$, $\beta_1 T$, $\alpha_2 T$, $\beta_2 T$, ..., $\alpha_m T$ and $\beta_m T$, so that $\Sigma_i(\alpha_i+\beta_i)=n-j$, in the order of $\alpha_1=0.1$ to 1, $\alpha_i=0.1$ to 1 (where i is an integer of from 2 to m−1, and $\alpha_i$ takes a constant value $\alpha c$ between 0.1 to 1 irrespective of such i), $\beta_1+\alpha_2=1.7$ to 2.3, $\beta_{i-1}+\alpha_i=2$ (where i is an integer of from 3 to m−1), $\beta_{m-1}+\alpha_m=1.7$ to 2.3, $\alpha_m=0.1$ to 1, and $\beta_m=0$ to 2, and for a record mark of n=2m+1 (where m is an integer of at least 3), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, so that $\Sigma_i(\alpha_i'+\beta_i')=n-k$, in the order of $\alpha_1'=\alpha_1$, $\beta_1'=\beta_1$, $\alpha_i'=\alpha c$ (where i is an integer of from 2 to m−1), $\beta_{i-1}'+\alpha_i'=2$ (where i is an integer of from 3 to m−1), $\Delta_{m-1}'=\beta_{m-1}+\Delta_{m-1}$ (where $\Delta_{m-1}=0$ to 0.6), $\alpha_m'=\alpha_m+\Delta_m$ (where $0<\Delta_m\leq0.6$), $\Delta_{mm}=\Delta_{m-1}+\Delta_m=0.5$ to 1.2, and $\beta_m'=\beta_m+\Delta_m'$ (where $\Delta_m'=0$ to 1), a recording laser beam having a constant writing power Pw sufficient to melt the recording layer (provided that Pw is from 10 to 40 mW, and Pe/Pw=0.2 to 0.6) is applied within a time of $\alpha_i T$ and $\alpha_i'T$ (where i is an integer of from 1 to m), and a recording laser beam having a bias power Pb of less than 1 mW is applied within a time of $\beta_i T$ and $\beta_i'T$(where is an integer of from 1 to m); and further, when m is at least 3, $\alpha_1(=\alpha_1')$, $\beta_1(=\beta_1')$, $\alpha c$, $\Delta_{m-1}$, $\alpha_m$, $\beta_m$ and $\Delta_m'$ are constant irrespective of m, when m=2 (n=4, 5), $\alpha_1$, $\alpha_1'$, $\beta_1$, $\beta_1'$, $\alpha_2$, $\alpha_2'$, $\beta_2$ and $\beta_2'$ are made to be equal to $\alpha_1$, $\alpha_1'$, $\beta_2'$, $\alpha_3$, $\alpha_3'$, $\beta_3$ and $\beta_3'$ in the case where m is 3, respectively, provided that a deviation of about ±10% is allowable, and when m=1 (n=3), irradiation with a recording laser beam comprising a pair of a writing power irradiation section $\alpha_1'T$ and a bias power irradiation section $\beta_1'T$ is carried out.

Here, in the recording methods DVD1-1, 1-2, 2-1 and 2-2, j and k may take different values for every n. Further, Pw, Pb and Pe are at constant power levels, and Pb≦Pe≦Pw. And by using recording methods DVD1-1 and 1-2, or recording methods DVD2-1 and 2-2, recording of an EFM+ random pattern is carried out wherein while maintaining the Pe/Pw ratio to be constant at a level between 0.2 and 0.6, Pw is changed between 10 and 40 mW, so that at Pw where the best characteristics can be obtained, the above-mentioned respective values of the jitters, $m_{14}$ and $R_{top}$, may be satisfied. Here, the power values Pw, Pe, Pb, etc. are meant to be powers of the main beams among the recording laser beams and extrude powers which are classified to be beams not directly related to the recording, like a servo beam for a servo operation in a so-called three beam method. With respect to the Pe/Pw ratio, firstly a value between 0.3 and 0.4 is employed, and as a result, if the above requirements for $m_{14}$, $R_{top}$, the asymmetry, etc. are not satisfied, a value between 0.2 and 0.3, or between 0.3 and 0.6, is employed.

Further, the laser beam power level at each of recording pulse sections $\alpha_i T$ and $\alpha_i'T$ and off-pulse sections $\beta_i T$ and $\beta_i'T$, is constant at Pw for the recording pulse sections and at Pb for the off-pulse sections. However, in a case where superposed frequencies are applied, Pw and Pb are defined by average powers at such sections. Further, unavoidable overshooting or undershooting due to a response of a laser diode is allowable. The rising or falling of the recording pulses $\alpha_i T$ and $\alpha_i'T$ is at most about 2 nsec, but preferably from 1 nsec to 2 nsec.

Recording methods DVD1-1 and 1-2 are ones having a further study added to a record pulse-dividing method as disclosed in JP-A-2001-331936 wherein a recording pulse (Pw irradiation section) and an off-pulse (Pb irradiation section) are alternately generated in repeated periods having period 2 T as the base. Namely, in the present invention, among recording strategies having the 2 T period as the base, a record pulse-dividing method which is particularly suitable for phase-change type rewritable DVD overwritable at 6- to 12-times velocity and which is particularly industrially useful, economical and simple, has been found. By using the recording pulse strategy of the present invention, it is possible to provide a recording medium and a recording method therefor, whereby the record quality can easily be maintained even when recorded by a plurality of drives and interchangeability can easily be secured.

Accordingly, in the present invention, variable parameters and their ranges in the record pulse-dividing method using period 2 T as the base, are defined. And, in the present invention, among many parameters in the record pulse-dividing method using period 2 T as the base, the minimum parameters required to maintain a good record quality at 6-times velocity to 12-times velocity, have been found, and they are used as variable. If the number of variable parameters is increased, it becomes relatively easy to accomplish good recording at 6-times velocity to 12-times velocity. However, to make many parameters to be variable simply makes the design of the electronic circuit (integrated circuit) complicated for generating pulses in a recording device to carry out recording on the optical recording medium. Therefore, in the present invention, the minimum parameters have been found which make it possible to accomplish good recording at 6-times velocity to 12-times velocity while simplifying the design of the electronic circuit (integrated circuit).

The minimum parameters to be variable to carry out good recording at 6-times velocity to 12-times velocity, can be realized for the first time by carrying out a study on a recording medium overwritable at 6-times velocity to 12-times velocity and a study on a pulse-dividing recording method, while feeding back the respective knowledges mutually. Thus, the present invention has been accomplished by a high level of creation such that the recording medium and the recording method are simultaneously realized.

By such studies, in the present invention, it has been made possible to present a recording medium and a recording method having high recording and retrieving interchangeability within a very wide range of linear velocities ranging from 2- or 2.5-times velocity to 6- or 12-times velocity, which have not yet been realized.

In the case of EFM+ modulation of RW-DVD, mark lengths nT may have cases where n=3, 4, 5, 6, 7, 8, 9, 10, 11 and 14, which are, respectively, divided into periods having 2 T as the base where m=1, 2, 2, 3, 3, 4, 4, 5, 5 and 7, so that recording is carried out by recording pulses divided into sets of m recording pulses and m off-pulses. In the present invention, in order to clearly define the RW-DVD overwritable at 6-times velocity, 8-times velocity, 10-times velocity or 12-times velocity, the definitions as shown by recording methods DVD1-1 and 1-2, are adopted.

FIG. 3 is a graph showing one embodiment of the relation of the respective recording pulses in a case where the pulse-dividing methods according to the above-mentioned recording methods DVD1-1 and 2-1 are to be carried out. In FIG. 3(b), the time widths of recording pulses and off-pulses to form mark lengths 2 mT should formally be represented by $\alpha_1 T$, $\beta_1 T$, $\alpha cT$, ... $\alpha_m T$, $\beta_m T$, but for the sake of simple clear representation of the graph, in FIG. 3(b), they are simply represented by $\alpha_1$, $\beta_1$, $\alpha C$, ... $\alpha_m$, $\beta_m$, i.e. the indication of the reference clock period T is omitted. The same applies also to FIG. 3(c).

As shown in FIG. 3, in the recording method of the present invention, consideration is given whether the value which n in nT mark can take, is an odd number or an even number. Correction of mark length difference 1 T between an even number length mark and an odd number length mark for the same division number m is divided and allocated to an off-pulse section $\beta_1 T$ next to the forefront recording pulse and a recording pulse periodic section $(\beta_{m-1} + \alpha_m)T$ second from the last. Namely, the correction of mark length 1 T is carried out by adjustment of off-pulse lengths $\beta_1 T$ and $\beta_{m-1} T$, and pulse $\alpha_m T$ of the last recording pulse section.

In FIG. 3, 300 represents the reference clock of period T.

FIG. 3(a) shows a pulse waveform corresponding to a record mark having a length of nT=2mT or nT=(2m+1)T, wherein symbol 301 corresponds to the length of a record mark having a length of 2 mT, and symbol 302 corresponds to the length of a record mark having a length of (2m+1)T. In FIG. 3(a), a case where m=5, is shown.

In FIG. 3(b), 303 represents a waveform of divided recording pulses in a case where n=2m(=10). In FIG. 3(c), 307 represents a waveform of divided recording pulses in a case where n=2m+1(=11).

A value obtained by multiplying $T_{d1}$ by T represents a delay time to the forward end $T_0$ of nT mark, of $\alpha_i T$ and $\alpha_1' T$ and is usually constant irrespective of n. Further, usually, $(T_{d1}+\alpha_1)T=(T_{d1}+\alpha_1')T=2$ T to facilitate synchronization of the record pulse-generating circuit, but fine adjustment at a level of ±0.5 T is further allowable. Especially for 3 T, 4 T and 5 T marks, it is preferred to carry out such fine adjustment of the delay time. The writing power level at recording pulse sections $\alpha_i T$ (i=1 to m) is constant at Pw; the bias power level at off-pulse sections $\beta_i T$ (i=1 to m) is constant at Pb; and the laser beam irradiation power between marks i.e. at sections other than $\alpha_i T$ (i=1 to m) and $\beta_i T$ (i=1 to m), is erasing power Pe which is constant. When n is an even number, at sections 304 excluding the forefront recording pulse and the last off-pulse (i.e. sections excluding 305 and 306 in FIG. 3), $(\beta_{i-1}+\alpha_i)T=2$ T (i=2 to m) i.e. constant, provided that fine adjustment within a range of ±0.3 T is allowable only with respect to $(\beta_1+\alpha_2)T$ and $(\beta_{m-1}+\alpha_m)T$. On the other hand, in a case where n is an odd number, at sections 308 in FIG. 3, $(\beta_{i-1}'+\alpha_i')T=2$ T (i=3 to m−1) i.e. constant.

In order to record two types of mark lengths where n=2m and 2m+1 with the same division number, section $(\beta_1+\alpha_2)T$ and section $(\beta_{m-1}+\alpha_m)T$ are respectively increased or reduced by about 0.5 T to adjust their lengths. Due to an influence of heat interference, etc., such a value may not precisely be 0.5 T, but will generally be within a range of from 0.3 T to 0.6 T. $\beta_m$ and $\beta_m'$ take substantially the same values within a range of from 0 to 2, but it is preferred that $\beta_m=\beta_m'$.

Referring to FIG. 3, recording corresponding to the mark length difference 1 T between even number length mark nT=10 T and odd number length mark nT=11 T, is carried out by the following operations 1 and 2.

Operation 1: As shown at section 309 in FIG. 3, $\Delta_1$ is added to only $\beta_1'$ of section $(\beta_1'+\alpha_2')T$ to make $\beta_1'=\beta_1+\Delta_1$ and $\alpha_2'=\alpha c$.

Operation 2: As shown at section 310 in FIG. 3, $\Delta_{mm} T$ is added to section $(\beta_{m-1}'+\alpha_m')T$. Here, $\Delta_{mm}=\Delta_{m-1}+\Delta_m$, and $\Delta_{mm}$ is divided into $\Delta_{m-1}$ and $\Delta_m$, so that $\Delta_{m-1}$ is added to $\beta_{m-1}$ and $\Delta_m$ is added to am. Here, $\Delta_{m-1}$ may be zero.

In the present invention, $\Delta_m$ is made to be larger than 0 ($\Delta_m>0$) to make $\alpha_m \neq \alpha_m'$. By making $\Delta_m$ larger than 0, the shape of the rear end of record mark where n is an odd number among the same division number m, will be stabilized, whereby the jitter characteristics will be remarkably improved. More preferably, $\Delta_{m-1}$ and $\Delta_m$ are made to have substantially equal values. If $\Delta_{m-1}$ and $\Delta_m$ are made to be substantially equal, it will be possible to simplify the design of the electronic circuit (integrated circuit) to control generation of laser beams (pulsed beams) for recording pulses and off-pulses in a recording pulse strategy, while maintaining good jitter characteristics.

The above operations are carried out for m being at least 3, and $\Delta_1$ and $\Delta_{mm}$ will take a value of from 0.3 to 0.6. The values of $\Delta_{m-1}$ and $\Delta_m$ are determined depending upon how $\Delta_{mm}$ is divided and distributed, whereby $\Delta_{m-1}$ may take a value of from 0 to 0.6, and $\Delta_m$ may take a value of more than 0 and at most 0.6.

In order to increase or decrease section $(\beta_1+\alpha_2)T$ and section $(\beta_{m-1}+\alpha_m)T$, respectively, by about 0.5 T to adjust their lengths, as mentioned above, $\Delta_1$, $\Delta_{m-1}$, $\Delta_m$ and $\Delta_{mm}$ may be made to be 0.6, but $\Delta_1$, $\Delta_{m-1}$ and $\Delta_m$ are preferably made to be a value of at most 0.5.

Now, with respect to recording method DVD1-1, cases wherein m is at least 3, m=2 and m=1, will, respectively, be described. Recording method DVD2-1 will be described later.

In recording method DVD1-1, when m is at least 3, $\alpha_1'=\alpha_1$, $\beta_m'=\beta_m$, and $\alpha_i$ and $\alpha_i'$ are constant as αc irrespective of i where i=2 to m−1. Further, $\alpha_m$ and $\alpha_m'$ are also constant irrespective of m. Further, $\alpha_1(\alpha_1')$ is from 0.7 to 1.4, αc is from 0.7 to 1.2, and $\alpha_m$ is from 0.7 to 1.2.

Further, when m is at least 3, $\alpha_1(=\alpha_1')$, αc, $\beta_m(=\beta_m')$, $\beta_1$, $\Delta_1$, $\beta_{m-1}$, $\Delta_{m-1}$ and $\Delta_m$ are constant irrespective of m. At 6-times velocity or 8-times velocity, $\alpha c=\alpha_i$ (i=2 to m−1) is firstly made to be a value within a range of from 0.9 to 1, and thereafter, fine adjustment is carried out within a range of ±0.2 (within a range of from 0.7 to 1.2). For $\alpha_1$ and $\alpha_m$, firstly the same value as αc is employed, and then, fine adjustment is carried out within a range of about 0.3 at the maximum.

Here, when m=2 (n=4, 5), section $(\beta_1+\alpha_2)T$ may be understood to be section $(\beta_{m-1}+\alpha_m)T$, since m−1=1. In such a case, $(\beta_1'+\alpha_2')T$ is made to be longer by about 1 T than $(\beta_1+\alpha_2)T$. More specifically, $\alpha_1$, $\alpha_1'$, $\alpha_2$, $\alpha_2'$, $\beta_2$ and $\beta_2'$ are made to be equal to $\alpha_1$, $\alpha_1'$, $\alpha_m$, $\alpha_m'$, $\beta_m$ and $\Delta_m'$ in the case where m is 3, respectively, $\beta_1$ is made to be equal to either $\beta_1$ or $\beta_{m-1}$ in the case where m is 3, and $\beta_1'$ is made to be equal to either $\beta_1'$ or $\beta_{m-1}'$ in the case where m is 3. Here, in spite of the expression "made to be equal", a deviation at a level of ±10% is allowable.

Thus, for an even number length mark, a recording pulse row 303 shown by a dotted line in FIG. 3(b) is obtained, and for an odd number length mark, a recording pulse row 307 shown by a dotted line in FIG. 3(c) is obtained.

Further, when m=1 (n=3), irradiation with a recording laser beam comprising a pair of a writing power irradiation section $\alpha_1'T$ and a bias power irradiation section $\beta_1'T$ is carried out. In such a case, it is preferred that $\alpha_1'$ is made to be larger by from about 0.1 to 1.5 than $\alpha_1'$ in the case where m is at least 2, and $\beta_i'$ is made to be smaller than $\beta_i'$ and to be the same as or larger than $\beta_m$ and $\beta_m'$ in the case where m is at least 2. Further, the range of $\beta_1'$ is preferably from 0 to 2.

FIG. 16 is a graph showing one embodiment of the relation of the respective recording pulses in a case where the pulse-dividing methods according to the above-mentioned recording methods DVD1-2 and 2-2 are to be carried out. In FIG. 16(b), the time widths of recording pulses and off-pulses to form mark lengths 2 mT should formally be represented by $\alpha_i T$, $\beta_1 T$, αcT, ... $\alpha_m T$, $\beta_m T$, but for the sake of simple clear representation of the graph, in FIG. 16(b), they are simply represented by $\alpha_1$, $\beta_1$, αc, ... $\alpha_m$, $\beta_m$, i.e. the indication of the reference clock period T is omitted. The same applies also to FIG. 16(c).

As shown in FIG. 16, consideration is given whether the value which n in nT mark can take, is an odd number or an even number. Correction of mark length difference 1 T between an even number length mark and an odd number length mark for the same division number m is divided and allocated to a recording pulse periodic section $(\beta_{m-1}+\alpha_m)T$ second from the last and the last off-pulse $\beta_m T$. Namely, the correction of mark length 1 T is carried out by adjustment of off-pulse lengths $\beta_{m-1} T$ and $\beta_m T$, and pulse $\alpha_m T$ of the last recording pulse section.

As compared with the recording method shown in FIG. 3 (recording methods DVD1-1, 2-1), in this recording method, recording pulses and off-pulses to be changed as between even number and odd number marks, are concentrated at the rear end portion of a mark, whereby there is not only a merit in that the rear end jitter of a record mark can easily be controlled, but also a merit in that the design of an electronic circuit (integrated circuit) to control generation of laser beams (pulsed beams) for recording pulses and off-pulses of the recording pulse strategy can be simplified. Further, there is a merit that the number of parameters to be variable is small.

In FIG. 16, 400 represents the reference clock of period T.

FIG. 16(a) shows a pulse waveform corresponding to a record mark having a length of nT=2mT or nT=(2m+1)T, wherein symbol 401 corresponds to the length of a record mark having a length of 2mT, and symbol 402 corresponds to the length of a record mark having a length of (2m+1)T. In FIG. 16(a), a case where m=5, is shown.

In FIG. 16(b), 403 represents a waveform of divided recording pulses in a case where n=2m(=10). In FIG. 3(c), 406 represents a waveform of divided recording pulses in a case where n=2m+1(=11).

A value obtained by multiplying $T_{d1}$ by T represents a delay time to the forward end $T_0$ of nT mark, of $\alpha_i T$ and $\alpha_1'T$ and is usually constant irrespective of n. Further, usually, $(T_{d1}+\alpha_1)T=(T_{d1}+\alpha_1')T=2$ T to facilitate synchronization of the record pulse-generating circuit, but fine adjustment at a level of ±0.5 T is further allowable. Especially for 3 T, 4 T and 5 T marks, it is preferred to carry out such fine adjustment of the delay time. The writing power level at recording pulse sections $\alpha_i T$ (i=1 to m) is constant at Pw; the bias power level at off-pulse sections $\beta_i T$ (i=1 to m) is constant at Pb; and the laser beam irradiation power between marks i.e. at sections other than $\alpha_i T$ (i=1 to m) and $\beta_i T$ (i=1 to m), is erasing power Pe which is constant. When n is an even number, at sections 404, $(\beta_{i-1}+\alpha_i)T=2$ T (i=2 to m) i.e. constant, provided that fine adjustment within a range of ±0.3 T is allowable only with respect to $(\beta_1+\alpha_2)T$ and $(\beta_{m-1}+\alpha_m)T$. On the other hand, in a case where n is an odd number, at sections 407 in FIG. 16, $(\beta_{i-1}'+\alpha_i')T=2$ T (i=2 to m−1) i.e. constant. However, $(\beta_1'+\alpha_2')T$ is made to be equal to $(\beta_1+\alpha_2)T$.

In order to record two types of mark lengths where n=2m and 2m+1 with the same division number, section $(\beta_{m-1}+\alpha_m)T$ is increased or reduced by about 1 T to adjust its length. Due to an influence of heat interference, etc., such a value may not precisely be 1 T, but will generally be within a range of from 0.5 to 1.2 T. $\beta_m$ and $\beta_m'$ take substantially the same values within a range of from 0 to 2 (in recording method DVD2-2, $\beta_m'$=within 0 to 3). However, to correct the influence over the jitter at the rear end of a mark, $\beta_m$ and $\beta_m'$ are individually finely adjusted. Especially in recording method DVD2-2, $\beta_m'=\beta_m+\Delta_m'$, i.e. $\Delta_m'(=0$ to 1) is added to $\beta_m$.

Referring to FIG. 16, recording corresponding to the mark length difference 1 T between even number length mark nT=10 T and odd number length mark nT=11 T, is carried out by the following operation 3.

Operation 3: As shown at section 408 in FIG. 16, $\Delta_{mm}T$ is added to section $(\beta_{m-1}+\alpha_m)$ T to obtain $(\beta_{m-1}'+\alpha_m')T$. Here, $\Delta_{mm}=\Delta_{m-1}+\Delta_m$, and $\Delta_{mm}$ is divided into $\Delta_{m-1}$ and $\Delta_m$, so that $\Delta_{m-1}$ added to $\beta_{m-1}$, and $\Delta_m$ is added to am. Further, in order to correct the influence to the jitter at the rear end of a mark, $\beta_m$ is changed to $\beta_m'$ by an addition of $\Delta_m'$.

The foregoing operation is carried out when m is at least 3, and $\Delta_{mm}$ takes a value of from 0.5 to 1.2. With respect to $\Delta_{m-1}$ and $\Delta_m$, $\Delta_{m-1}$ may take a value of from 0 to 0.6 (from 0 to 0.7 in recording method DVD2-2), and $\Delta_m$ may take a value of larger than 0 and at most 0.6, depending upon how $\Delta_{mm}$ is divided and distributed. $\Delta_{m-1}$ may be zero, $\Delta_m$ is made larger than 0 so that am $\alpha_m \neq \alpha_m'$. When $\Delta_m$ is made larger than 0, the shape of the rear end of a record mark where n is an odd number among the same division number m, will be stabilized, whereby the jitter characteristics will be remarkably improved. More preferably, $\Delta_{m-1}$ and $\Delta_m$ are made to have substantially equal values. When $\Delta_{m-1}$ and $\Delta_m$ are made to be substantially equal, it will be possible to simplify the design of an electronic circuit (integrated circuit) to control generation of pulsed beams, while maintaining good jitter characteristics.

$\Delta_m'$ takes a value of from 0 to 1, more preferably a value of from 0 to 0.6. Especially at a linear velocity lower than 4-times velocity, it is preferred to make $\Delta_m'$ larger than in the case of 6-, 8-, 10- or 12-times velocity. On the other hand, at 6-, 8-, 10- or 12-times velocity, it is preferred to make $\Delta_m'=0$.

Now, with respect to recording method DVD1-2, cases where m is at least 3, m=2 and m=1 will, respectively, be described. Recording method DVD2-2 will be described later.

In recording method DVD1-2, when m is at least 3, $\alpha_1'=\alpha_1$ and $\beta_1'=\beta_1$, and $\alpha_i$ and $\alpha_i'$ are constant as $\alpha c$ irrespective of i where i=2 to m–1. Further, $\alpha_1(=\alpha_1')$ takes a value within a range of from 0.7 to 1.4, and $\alpha c$ and $\alpha_m$ take a value within a range of from 0.7 to 1.2. More preferably, $\alpha_1(=\alpha_1')$, $\alpha c$ and $\alpha_m$ are within a range of from 0.7 to 1.

Further, when m is at least 3, $\alpha_1(=\alpha_1')$, $\beta_1$, $\alpha c$, $\beta_{m-1}$, $\Delta_{m-1}$, $\alpha_m$, $\Delta_m$, $\beta_m$ and $\Delta_m'$ are constant irrespective of m. At 6-times velocity or 8-times velocity, it is preferred that $\alpha c=\alpha_i$ (i=2 to m) is firstly made to be 1, and then fine adjustment within a range of ±0.2 is further carried out. For $\alpha_1$ and $\alpha_m$, firstly, the same value as $\alpha c$ is employed, and fine adjustment is carried out within a range of larger by about 0.3 at the maximum than $\alpha c$. $\Delta_m$ and $\Delta_{m-1}$ take about 0.4 as the initial value, and fine adjustment is carried out to obtain the prescribed mark lengths. Further, $\beta_m'$ at section 410 is firstly made to be equal to $\beta_m$ at section 405, and thereafter, fine adjustment is carried out.

Here, when m=2, $(\beta_1'+\alpha_2')T$ is made longer by about 1 T than $(\beta_1+\alpha_2)T$, since m–1=1, they may be deemed to be $(\beta_{m-1}'+\alpha_m')T$ and $(\beta_{m-1}+\alpha_m)T$, respectively. And, $\alpha_1$, $\alpha_1'$, $\beta_1$, $\beta_1'$, $\alpha_2$, $\alpha_2'$, $\beta_2$ and $\beta_2'$ are made to be equal to $\alpha_1$, $\alpha_1'$, $\beta_2$, $\beta_2'$, $\alpha_3$, $\alpha_3'$, $\beta_3$ and $\beta_3'$ in the case where m=3, respectively. However, when m=2, $\alpha_1$, $\alpha_1'$, $\beta_1$, $\beta_1'$, $\alpha_2$, $\alpha_2'$, $\beta_2$ and $\beta_2'$ may further be finely adjusted within a range of about ±10%.

Thus, for an even number length mark, recording pulse train 402 shown by a dotted line in FIG. 16(*b*) is obtained, and for an odd number length mark, recording pulse train 406 shown by a dotted line in FIG. 16(*c*) is obtained.

Further, when m=1 (n=3), irradiation with a recording laser beam comprising a pair of a writing power irradiation section $\alpha_1'T$ and a bias power irradiation section $\beta_1'T$ is carried out. In such a case, $\alpha_1'$ is preferably made to larger by from about 0.1 to 1.5 than $\alpha_1'$ in the case where m is at least 2. Further, the range of $\beta_1'$ is preferably from 0 to 2.

In recording method DVD2-1, an even number length mark and an odd number length mark are recorded by the same rule as in recording method DVD1-1, and in recording method DVD2-2, an even number length mark and an odd number length mark are recorded by the same rule as in recording method DVD1-2, but $\alpha_i$ and $\alpha_i'$(i=1 to m) are made to be values smaller than in recording at a linear velocity of from 6 to 12-times velocity and within a range of from 0.1 to 1. Consequently, $\beta_i$ and $\beta_i'$(i=1 to m) are made to be values larger than in recording at a linear velocity of 6-times velocity, 8-times velocity, 10-times velocity or 12-times velocity. Further, in the case of recording method DVD2-2, especially $\Delta_m'$ is made to be variable within a range of from 0 to 1. Further, $\Delta_{m-1}+\Delta_m+\Delta_m'$ is preferably made to be within a range of from 0.5 to 1.5.

When $\alpha_i$ and $\alpha_i'$ in the case where the maximum linear velocity $V_{max}$ in recording method DVD1-1 or DVD1-2 is made to be 6, 8, 10 or 12-times velocity, are represented by $\alpha_{i0}$ and $\alpha_{i0}'$, if the same medium is subjected to recording at 2-times velocity, 2.5-times velocity, 3-times velocity or 4-times velocity (i.e. linear velocity V is any one of $2V_1$, $2.5V_1$, $3V_1$ and $4V_1$) by recording method DVD2-1 or recording method DVD2-2, they are generally set to be $\alpha_i=\eta$ $(V/V_{max})$ $\alpha_{i0}$, and i'=$\eta$ $(V/V_{max})$ $\alpha_{i0}'$, and thereafter, fine adjustment within a range of about ±0.1, is carried out.

Here, $\eta$ is a real number within a range of from 0.8 to 1.5. Particularly, a value within a range of from 1.0 to 1.3 is firstly employed, and thereafter, measurement is carried out by enlarging the range to be from 0.8 to 1.5.

Further, in recording method DVD2-1 or 2-2, an exceptional rule may be applied when n=5.

Namely, in recording method DVD2-1, when m=2 (n=4, 5), $\alpha_1$, $\alpha_1'$, $\alpha_2$, $\alpha_2'$, $\beta_2$ and $\beta_2'$ are made to be equal to $\alpha_1$, $\alpha\alpha_1'$, $\alpha_3$ $(\alpha_m)$, $\beta_3'(\alpha_m')$, $\beta_3'(\beta_m)$ and $\beta_3'(\beta_m')$ in the case where m is 3, respectively, $\beta_1$ is made to be equal to either $\beta_1$ or $\beta_2$ ($\beta_{m-1}$) in the case where m is 3, and $\beta_1'$ is made to be equal to either $\beta_1'$ or $\beta_2'(\beta_{m-1})$ in the case where m is 3. However, in spite of the expression "made to be equal", a deviation at a level of ±10% is allowable. Further, with respect to $\alpha_2'$ and $\beta_2'$ when m=2, the value may further be changed within a range of ±0.5.

Further, in recording method DVD2-2, when m=2 (n=4, 5), $\alpha_1$, $\alpha_1'$, $\beta_1$, $\beta_i'$, $\alpha_2$, $\alpha_2'$, $\beta_2$ and $\beta_2'$ are made to be equal to $\alpha_1$, $\alpha_1'$, $\beta_2(\beta_{m-1})$, $\beta_2'(\beta_{m-1}')$, $\alpha_3(\alpha_m)$, $\alpha_3'(\alpha_m')$, $\beta_3'(\beta_m)$ and $\beta_3'(\beta_m')$ in the case of m=3, respectively. However, in spite of the expression "made to be equal", a deviation at a level of ±10% is allowable. Further, $\beta_1'$ in the case where n=3, is preferably made to be within a range of from 0 to 3.

With respect to RW-DVD expected to be used at a velocity of up to 6-times velocity, the recording characteristics are defined at 2-times velocity and 6-times velocity, or at 3-times velocity and 6-times velocity; with respect to RW-DVD expected to be used at a velocity of up to 8-times velocity, the recording characteristics at 2.5-times velocity and 8-times velocity, the recording characteristics at 3-times velocity and 8-times velocity, or the recording characteristics at 4-times velocity and 8-times velocity, are, respectively, defined; with respect to RW-DVD expected to be used at a velocity of up to 10-times velocity, the recoding characteristics at 4-times velocity and 10-times velocity are defined; and likewise, with respect to RW-DVD expected to be used up to 12-times velocity, the recording characteristics at 4-times velocity and 12-times velocity, or the recording characteristics at 6-times velocity and 12-times velocity, or the recording characteristics at 4-times velocity and 8-times velocity, are, respectively, defined; whereby a medium suitable for the after-mentioned CAV recording system, P-CAV recording system or ZCLV recording system, can substantially univocally be defined from the viewpoint of recording/ retrieving interchangeability among drives. In such a case, it is preferred that in recording method DVD2-1 or 2-2 in the measurement of a low linear velocity side, the values of $\alpha_i$, $\alpha_i'$, $\beta_i$ and $\beta_i'$ are set so that they are generally proportional to the linear velocity as mentioned above ($\alpha_i=\eta$ (V/V$_{max}$) $\alpha_{i0}$, $\alpha_i'=\eta$ (V/V$_{max}$) $\alpha_{i0}'$), whereby the medium characteristics can better be defined.

Thus, to define the characteristics of a rewritable optical recording medium at a plurality of recording linear velocities within different recording velocity ranges wherein the ratio between the minimum linear velocity and the maximum linear velocity becomes at least two times, is a preferred method also with a view to securing recording/retrieving interchangeability of a medium from the viewpoint of recording drives. It is particularly preferred to use recording method DVD1-1 in combination with recording method DVD2-1, and to use recording method DVD1-2 in combination with recording method DVD2-2.

Thus, in the case of defining a medium within a specific range, it is particularly preferred to combine recording method DVD1-2 with recording method DVD2-2 to define RW-DVD with the maximum linear velocity V$_{max}$ of 6-times velocity, 8-times velocity, 10-times velocity or 12-times velocity.

Further, in a method for defining the medium characteristics corresponding to such 6-times velocity, 8-times velocity, 10-times velocity or 12-times velocity, recording method DVD1-2 may be further defined to present the following recording method DVD1-3, whereby the medium characteristics can more specifically be defined. Thus, it is preferred that interchangeability can be secured when such a medium is subjected to recording by a plurality of recording devices.

Recording Method DVD1-3:

For a mark length of m=at least 2, $T_{d1}'=T_{d1}=2-\alpha c$, $\alpha_i'=\alpha_i=\alpha c$ (i=1 to m−1), $\beta_i'=\beta_i=2-\alpha c$ (i=1 to m−2), $\alpha_m=\alpha c$ and $\beta_{m-1}=2-\alpha c$, being constant, and $\beta_{m-1}'=1+\Delta_{m0}$ (0<$\Delta_{m0}$≦0.7), $\alpha_m'=1+\Delta_{m0}$ (0<$\Delta_{m0}$≦0.7) and $\beta_m'=\beta_m+\Delta_m'$, and $\Delta_{m0}$, $\Delta_m'$ and $\beta_m$ are constant irrespective of m. Here, when m=2, $\beta_1$, $\beta_1'$, $\alpha_2$, $\alpha_2'$, $\beta_2$ and $\beta_2'$ are deemed to be $\beta_2(\beta_{m-1})$, $\beta_2'(\beta_{m-1}')$, $\alpha_3$ ($\alpha_m'$), $\beta_3'(\alpha_m')$, $\beta_3(\beta_m)$ and $\beta_3'(\beta_m')$ in the case where m=3. $\alpha c$ is from 0.7 to 1.2, more preferably from 0.7 to 1, particularly preferably from 0.9 to 1.

Here, it is particularly preferred to combine recording method DVD1-3 (to be applied at one of 6, 8, 10 or 12-times velocity) with the following recording method DVD2-3 (to be applied at one of 2, 2.5, 3, 4 or 5-times velocity) to define phase-change type rewritable DVD to be used at the maximum linear velocity V$_{max}$ of 6-times velocity, 8-times velocity, 10-times velocity or 12-times velocity.

Recording Method DVD2-3:

For a mark length of m=at least 2 (n=4), $T_{d1}'+\alpha_1'=T_{d1}+\alpha_1=2$, $\alpha_i=\alpha c$ (i=1 to m), $\alpha_i'=\alpha c$ (i=1 to m−1), wherein $\alpha c$=0.1 to 1, $\beta_{i-1}+\alpha_i=2$ (i=2 to m) and $\beta_{i-1}'+\alpha_i'=2$ (i=2 to m−1), and $\beta_{m-1}'=\beta_{m-1}+\Delta_{m0}$ (0<$\Delta_{m0}$<−0.7), $\alpha_m'=\alpha_m+\Delta_{m0}$ (0<$\Delta_{m0}$≦0.7) and $\beta_m'=\beta_m+\Delta_m'(\Delta_m'$=0 to 1), and further, $\Delta_{m0}$, $\beta_m$ and $\Delta_m'$ are constant irrespective of m. Here, when m=2, $\beta_i$, $\alpha_2$ and $\beta_2$ are deemed to be $\beta_2(\beta_{m-1})$, $\beta_3(\beta_m)$ and $\alpha_3'(\alpha_m')$ in the case of m=3, respectively.

Recording methods DVD1-3 and 2-3 are characterized in that when an odd number record mark is to be formed among an even number record mark and an odd number record mark having the same division number m, equal $\Delta_m$ (which is represented by $\Delta_{m0}$ in recording methods DVD1-3 and 2-3) is imparted to an off-pulse section ($\beta_{m-1}'$) immediately before the last and to the last recording pulse section ($\alpha_m'$). By imparting equal $\Delta_m$ (which is represented as $\Delta_{m0}$ in recording methods DVD1-3 and 2-3), the design of an electronic circuit (integrated circuit) to control generation of laser beams (pulsed beams) for recording pulses and off-pulses of the recording pulse strategy for forming record marks, can be simplified, whereby it will be possible to reduce the costs for the electronic circuit (integrated circuit).

It is particularly preferred to make $\Delta_m$ larger than 0 with a view to stabilizing the shape of the rear end portion of the record mark to improve the jitter characteristics. Specifically, it is preferred that $\Delta_{m0}$ is made to be $\Delta_{m0}$ larger than 0 in recording methods 1-3 and 2-3, and $\Delta_{m0}$ is made to be within a range of 0<$\Delta_{m0}$≦0.7. In order to stabilize the shape of the rear end portion of the record mark, more preferred is that $\Delta_{m0}$ is made to be within a range of 0<$\Delta_{m0}$≦0.6.

Further, with a view to stabilizing the shape of the rear end portion of a record mark where n is an odd number to improve the jitter characteristics, $\Delta_m'$ is preferably set to be within a range of 0<$\Delta_m'$≦1, more preferably 0<$\Delta_m'$≦0.6, particularly preferably within a range of 0<$\Delta_m'$≦0.5.

And, at each linear velocity, the optimum values of minimum parameters are determined in accordance with the procedure shown in FIG. 17. That is:

1) Provisional values Pw$_a$, Pe$_a$ and Pb$_a$ are determined for Pw, Pe and Pb.

2) EFM+ signals composed solely of an even number mark and a space length (containing all of n=4, 6, 8, 10 and 14) are recorded by irradiating Pw$_a$, Pe$_a$ and Pb$_a$. As ac and $\beta_m$ are variable, such $\alpha c$ and $\beta_m$ are determined so that each mark length and each space length can be retrieved to have the prescribed length at the time of 1-time velocity retrieving within a range where m$_{14}$=0.55 to 0.8, and the jitter value will be at most 15%.

3) Then, EFM+ signals obtained by adding an odd number mark length and space length (including all of n=5, 7, 9 and 11) other than n=3, to the above-mentioned EFM+ signals composed solely of an even number length mark and space length, are recorded by irradiation with Pw$_a$, Pe$_a$ and Pb$_a$. For $\alpha c$ and $\beta_m$, the above values are employed, and $\Delta_{m0}=\Delta_{m-1}=\Delta_m$ and $\Delta_m'$ are variable, and such values are determined so that at the time of retrieving at 1-time velocity, the jitter value will be at most 15%.

4) Finally, complete FEM+ signals having 3 T mark and space added, are recorded by irradiation with Pw$_a$, Pe$_a$ and Pb$_a$. With respect to the mark length of n=at least 2, the above-mentioned values of $\alpha c$, $\beta_m$, $\Delta_{m0}=\Delta_{m-1}=\Delta_m$ and $\Delta_m'$ are employed. Only $T_{d1}'$, $\alpha_1'$ and $\beta_i'$ relating to n=3 are variable, and such values are determined so that at the time of retrieving at 1-time velocity, the jitter value will be at most 15%.

5) Pw$_a$ and Pe$_a$ are variable, and fine adjustment of Pw and Pe is carried out so that primarily, the jitter or the error rate will be minimum within a range where m$_{14}$=0.55 to 0.8. If, in each step of the above procedure, m$_{14}$=0.55 to 0.8, and the jitter of at most 15%, can not be obtained, such a medium is regarded as not satisfying the requirements of the present invention.

Further, in FIG. 17, the Pe/Pw ratio and the initial value of Pw are determined as follows.

A repeating pattern (hereinafter referred to as 14 T data) composed solely of 14 T mark length and space length, is recorded in an unrecorded state groove with Pe=0 and only Pw being variable. In this state, Pw whereby m$_{14}$ would be within a range of from 0.55 to 0.8, is determined to obtain the initial value Pw$_a$. If m$_{14}$ increases beyond the range of from 0.55 to 0.8 when Pw is increased, a Pw value whereby m$_{14}$ would be about 0.7, is taken as the initial value Pw$_a$.

Then, Pe is irradiated in a direct current fashion to the 14 T data signals recorded by such $Pw_a$, to measure the decrease of the carrier level of the 14 T data signals by dB (decibel value). This operation is repeated while increasing Pe within a range of $Pe/Pw_a=0.2$ to 0.6, and the first Pe whereby the decrease of the carrier level exceeds 25 dB, is taken as the initial value $Pe_a$ of Pe. As the initial value $Pb_a$ of Pb, a power equivalent to a retrieving laser beam power at a level where servo will be stabilized at the time of retrieving with a power of $0<Pb_a<1$ mW, is selected.

Further, in this specification, "overwriting" usually means to overwrite new data without returning once-recorded data to a uniform unrecorded or erased state by a certain specific treatment. However, in the present invention, also a case where recording is carried out in an initial uniform non-recorded or erased state is regarded as overwriting. For example, "overwriting ten times" in the case of evaluating the characteristics of an optical recording medium by means of the above recording method DVD1-1, 1-2, 2-1 or 2-2, means to carry out the first recording (overwriting first time) in the initial crystalline state and then carry out overwriting 9 times. The same applies in the following description.

Further, the definition of "$\alpha_i+\beta_{i-1}=2$" in recording methods DVD1-1, 1-2, 2-1 and 2-2, means that $(\alpha_i+\beta_{i-1})$ is a time length twice the reference clock period T and may contain an error at a level of a fluctuation which inevitably results from the circuit design. Specifically, a difference at a level of 0.1 T is regarded to be substantially equal. Likewise, in the above description, for example, in a case where a specific $\alpha_i$ is made to be "constant" or "equal" to another $\alpha_j$ or a inevitable fluctuation in practicing an electronic circuit, is allowable.

Furthermore, even if the wavelength of the recording laser beam in recording methods DVD1-1, 1-2, 2-1 and 2-2 is fluctuated within a range of from about 775 to 795 nm, such will not be a serious problem, since with a phase-change medium, the wavelength dependency within such a wavelength range is very small.

2. Regarding the Recording Layer of the Medium

With the rewritable optical recording medium of the present invention, it is important to satisfy both erasing of amorphous marks in a short time by high speed crystallization and archival stability of amorphous marks. Further, it is preferred to satisfy high modulation and at the same time to satisfy the reflectivity and other servo signal characteristics, etc., in the optical system used as the standard, in order to secure retrieving interchangeability with the CD-ROM drive or DVD-ROM drive for retrieving only.

In order to satisfy both the high speed crystallization and the archival stability, it becomes important firstly to select the material for the phase-change type recording layer to be formed on the substrate. In the present invention, it is important to increase the crystallization speed of the recording layer, which can be accomplished by adjusting the composition of the recording layer. In the present invention, in order to increase the crystallization speed, it is preferred to employ a composition containing Sb as the main component, for the phase-change type recording layer. Here, in the present invention, "containing the prescribed composition or the prescribed element as the main component" means that in the entire layer containing the prescribed composition or the prescribed element, the content of the prescribed composition or the prescribed element is at least 50 atomic %. The reason for containing Sb as the main component, is that the amorphous phase of Sb can be crystallized at a very high speed, whereby amorphous marks can be crystallized in a short time. Accordingly, erasing of record marks in an amorphous state will be facilitated. From this viewpoint, the content of Sb is preferably at least 60 atomic %, more preferably at least 70 atomic %. However, on the other hand, rather than using Sb alone, it is preferred to use together with Sb an additional element to facilitate formation of an amorphous phase and to increase the archival stability of the amorphous state. In order to facilitate formation of an amorphous phase of the phase-change type recording layer and to increase the archival stability of the amorphous state, the content of the above additional element is usually at least 1 atomic %, preferably at least 5 atomic %, more preferably at least 10 atomic %, and on the other hand, it is usually at most 30 atomic %.

The above additional element to facilitate formation of an amorphous phase and to increase the archival stability of the amorphous state, also has an effect to increase the crystallization temperature. As such an additional element, Ge, Te, In, Ga, Sn, Pb, Si, Ag, Cu, Au, a rare earth element, Ta, Nb, V, Hf, Zr, W, Mo, Cu, Cr, Co, nitrogen, oxygen and Se may, for example, be used. Among these additional elements, preferred is at least one member selected from the group consisting of Ge, Te, In, Ga and Sn, with a view to accelerating formation of an amorphous phase, improving the archival stability of the amorphous state and increasing the crystallization temperature, and it is particularly preferred to use Ge and/or Te.

As mentioned above, in the present invention, it is particularly preferred to use Sb in combination with Ge and/or Te, as the material for the phase-change type recording layer. At the time of adding Ge and/or Te to Sb, the content of Ge in the phase-change type recording layer is preferably from 1 atomic % to 30 atomic %, and the content of Te is preferably from 0 atomic % to 30 atomic %. However, in a case where the main component of the phase-change type recording layer is Sb, the content of Sb will be at least 50 atomic %, and when Ge and Te are incorporated together with Sb to the phase-change type recording layer, the total amount of Ge and Te is preferably less than 50 atomic %, and further, when Te and Ge are compared, it is more preferred to incorporate Ge.

The content of Ge or Te in the phase-change type recording layer is more preferably at most 3 atomic %, further preferably at most 5 atomic %. If the content is within this range, an adequate effect to stabilize amorphous marks will be obtained. On the other hand, the content of Ge or Te in the phase-change type recording layer is more preferably at most 25 atomic %, further preferably at most 20 atomic %. If the content is within this range, it will be possible to excellently control the tendency such that the amorphous phase tends to be so stable that the crystallization tends to be inversely slow, and accordingly it will be possible to suppress a noise due to light scattering at crystal grain boundaries. Further, the total content of Ge and Te is preferably at most 30 atomic %, more preferably at most 25 atomic %. If the total content is within this range, it will be possible to excellently control the tendency such that the amorphous phase tends to be so stable that the crystallization will inversely be slow, and it will be possible to suppress a noise due to light scattering at crystal grain boundaries.

Suitable compositions for the recording layer material to be used for the phase-change type recording layer in the optical recording medium of the present invention may be classified into two types depending upon the amount of Te contained in the phase-change type recording layer. One is a composition containing at least 10 atomic % of Te, and the other is a composition containing less than 10 atomic % of Te (inclusive of a case where no Te is contained).

As an example, the recording layer material is made to contain at least about 10 atomic % of Te and to have a compositional range wherein an alloy containing Sb in excess of the $Sb_{70}Te_{30}$ eutectic composition, as the main component. Specifically, Sb/Te is made to be at lest 4.5, preferably at least 5.5 and on the other hand, at most 7.3.

As a specific example of the composition for the above recording material, a composition comprising Sb and Te, and further Ge, may be mentioned. Namely, an alloy containing, as the main component, a composition of $Ge_y(Sb_xTe_{1-x})_{1-y}$ (where $0.01 \leq y \leq 0.06$, and $0.82 \leq x \leq 0.9$) which comprises, as a matrix, a $Sb_{70}Te_{30}$ alloy having a $Sb_{70}Te_{30}$ eutectic composition as the base and containing Sb in large excess and which further contains Ge, may be mentioned as a preferred composition for the above recording layer material. In the present invention, the composition is shown by the atomicity ratio. Thus, for example, y=0.06 means 6 atomic %.

When an alloy (hereinafter referred to as a GeSbTe eutectic) of a GeSbTe composition which comprises, as a base, a binary alloy containing Sb in excess of $Sb_{70}Te_{30}$ and which further contains Ge, is used for the phase-change type recording layer, it is possible to obtain CD-RW overwritable at a velocity of from 10- to 12-times velocity (JP-A-2001-229537). In such a case, the composition $Sb_xTe_{1-x}$ of the SbTe alloy to be the matrix, is limited within a range of $0.7<x \leq 0.8$. In this composition of the material, if the Sb/Te ratio is further increased, the crystallization speed can further be increased. Accordingly, if attention is paid only to the erase ratio at 24-times velocity, the value can be increased as high as at least 20 dB by adjusting Sb/Te=at least 4.5 ($0.82 \leq x$). However, according to a study made by the present inventors, it has been found that if the Sb/Te ratio is simply increased, the noise in the initial crystalline state (unrecorded state) after the production of an optical recording medium can not be lowered, and the jitter tends to be high, whereby it is difficult to obtain an optical recording medium which satisfies the requirements for the quality of CD-RW signals such that mark and space jitters in one-time velocity retrieving are at most 35 nsec.

Namely, with a composition which contains Te in an amount of at least 10 atomic % and which has a Sb/Te ratio as high as at least 4.5, if the Ge content exceeds 6 atomic %, the noise due to light scattering at crystal grain boundaries tends to be very high. It is considered that if the Ge content exceeds 6 atomic %, a GeTe phase will be formed, whereby a polycrystal structure showing remarkable mismatching at the grain boundaries is likely to be formed, and thus the above-mentioned noise due to light scattering will be very high. Namely, with a composition which contains at least 10 atomic % of Te and which has a Sb/Te ratio as high as at least 4.5, if the Ge content exceeds 6 atomic %, the noise will be high already in an unrecorded crystalline state, whereby the jitter tends to be high, and it will be difficult to obtain good recording characteristics as CD-RW. Further, in a case where the atomic ratios of Ge and Te are close to each other, an increase of the noise tends to result which is considered to be due to precipitation of a GeTe phase. Accordingly, the atomic ratio of Ge to Te is preferably 1:at least 3, more preferably 1:at least 4. On the other hand, if Te is contained excessively relative to Ge, the archival stability of amorphous marks tends to deteriorate. Accordingly, the atomic ratio of Ge to Te is preferably at most 1:20, more preferably at most 1:15.

Further, it has been also found that with a composition wherein the Sb/Te ratio is simply increased, the crystallization speed tends to be so high that amorphous marks are likely to be recrystallized in a short time even in the vicinity of room temperature, whereby it is difficult to realize CD-RW having high reliability and having good overwriting characteristics.

Under the circumstances, the present inventors have conducted a further study and as a result, have found it possible to obtain a rewritable optical recording medium overwritable at 24-times velocity while maintaining high quality of recording signals, by adjusting the Ge content to be at most 6 atomic %, while increasing the Sb/Te ratio and further controlling the initial crystalline state after the production of the optical recording medium.

With respect to the above-mentioned GeSbTe eutectic composition, details about initializing conditions after forming the recording layer, which are important to control the initial crystalline state after the production of the medium, will be described later, and firstly, the GeSbTe eutectic composition will be described.

A preferred composition for the GeSbTe eutectic composition is considered to be one containing, as the base, a ternary alloy having Ge added to a binary alloy containing Sb in excess of the SbTe eutectic composition, to improve the jitter and the archival stability of amorphous marks. It is considered that in such a case, by the addition of Ge, the archival stability of amorphous marks can be increased without impairing the high speed crystallization function by the excessive Sb in the GeSbTe eutectic composition. As compared with analogous Si, Sn or Pb, Ge has an effect to specifically improve the stability of amorphous marks. Further, Ge is considered to be an element most effective not only to increase the crystallization temperature but also to increase the activation energy for crystallization.

The amount of Ge is preferably at least 0.01, particularly preferably at least 0.02, as the value of y in $Ge_y(Sb_xTe_{1-x})_{1-y}$. On the other hand, in such a SbTe eutectic composition containing a large content of Sb, if the amount of Ge is too much, an intermetallic compound of GeTe or GeSbTe type will precipitate, and also a SbGe alloy may precipitate, and thus, it is considered that crystal grains having different optical constants tend to coexist in the phase-change type recording layer. And, by the coexistence of such crystal grains, the noise of the recording layer may increase, and the jitter may increase. Further, if Ge is added too much, the effect for the archival stability of amorphous marks will be saturated. Accordingly, the amount of Ge is usually at most 0.06, preferably at most 0.05, more preferably at most 0.04, as the value of y in the above formula ($Ge_y(Sb_xTe_{1-x})_{1-y}$).

On the other hand, if excessive Sb is too small, the recrystallization speed may be too low to carry out good overwriting at a high linear velocity at a level of at least 20-times velocity. Accordingly, particularly for a medium overwritable at 24-times velocity, Sb/Te is preferably made to be at least 5.5 (as the value of x in $Ge_y(Sb_xTe_{1-x})_{1-y}$, $0.85 \leq x$, and on the other hand to be at most 6.5 (as the value of x in $Ge_y(Sb_xTe_{1-x})_{1-y}$, $x \leq 0.87$)

In the case of employing the GeSbTe eutectic composition, more preferred is a system having In and Ga further incorporated to the above GeSbTe eutectic composition. Namely, more preferred is to employ the phase-change type recording layer containing, as the main component, a composition represented by $M_zGe_y(Sb_xTe_{1-x})_{1-y-z}$ (where $0.01 \leq z \leq =0.1$, $0.01 \leq y \leq 0.06$, $0.82 \leq x \leq 0.9$ and M is at least one element selected from the group consisting of Ga and In).

The characteristics will be further improved by adding at least one member selected from the above-mentioned group of elements represented by M=Ga and In. In and Ga are effective to reduce jitter. However, if the amount of element M is too much, segregation with time of a specific substance or segregation by repeated overwriting tends to take place. Accordingly, the amount of element M to be incorporated, is preferably at most 0.1, more preferably at most 0.09, as the amount of z in the formula $M_zGe_y(Sb_xTe_{1-x})_{1-y-z}$. On the other hand, in order to obtain the effect to reduce jitter by an addition of In or Ga, the above value of z is preferably at least 0.01, more preferably at least 0.03, further preferably at least 0.05.

As elements other than In and Ga which may be contained in the GeSbTe eutectic composition, nitrogen, oxygen and sulfur may be mentioned. These elements are effective for fine adjustment of optical characteristics or to prevent segregation in repeated overwriting. The content of nitrogen, oxygen and sulfur is more preferably at most 5 atomic % based on the total amount of Sb, Te and Ge.

Further, Sn, Cu, Zr, Hf, V, Nb, Ta, Cr or Co may be contained in the GeSbTe eutectic composition. By an addition in a very small amount, such an element increases the crystallization temperature without lowering the crystal growth rate and is effective for further improvement of the archival stability. However, if the amount of such an element is too much, segregation with time of a certain specific substance or segregation by repeated overwriting is likely to take place. Accordingly, the amount is usually at least 1 atomic % and usually at most 5 atomic %, preferably at most 3 atomic %. Once segregation takes place, the stability of the amorphous phase which the recording layer initially has, or the recrystallization speed of the like is likely to be changed, whereby the overwriting characteristics may sometimes deteriorate.

Here, the above-described recording layer composition being particularly preferred as compared with other compositions, will be explained.

InGeSbTe alloys are disclosed also in JP-A-1-63195, JP-A-1-14083, JP-A-5-16528 and JP-A-9-294269, and in each disclosure, a composition in the vicinity of a GeTe—$Sb_2Te_3$ pseudo binary alloy is regarded as preferred.

The above-mentioned composition of the present invention is different from such disclosures and is a composition which contains a SbTe eutectic composition as the main component and which contains Sb in large excess.

In the present invention, it is preferred that in the crystalline state of the phase-change recording layer, the recording layer is formed mainly of the same crystalline phase. As a result, the noise decreases, the storage stability will be improved, and it is possible to obtain a characteristic such that crystallization at a high velocity will be easy.

In a case where a crystalline phase having a hexagonal structure such as $Sb_2Te_3$, a crystalline phase which is a cubic crystal but has a substantially different lattice constant such as Sb and further other crystalline phases belonging to other space groups such as $Sb_7Te$, $Sb_2Te_3$, etc. are simultaneously present, large crystal grain boundaries having lattice mismatching will be formed, whereby it is likely that peripheral shapes of marks tend to be irregular and optical noises will result. Whereas, in a case where the recording layer is composed of the same crystalline phase, such crystal grain boundaries will not be formed, whereby reduction of noises, improvement of the storage stability and high speed crystallization, etc. will be possible.

Here, in order to let the recording layer have the same crystalline phase, it becomes important to control the crystalline state after the production of the medium. This means that it is important to control the initial crystallization conditions when the initial crystallization operation is carried out after forming the recording layer on the substrate. Details of such initial crystallization operation with respect to the GeSbTe eutectic composition will be described later.

The recording layer containing Sb as the main component, to be used in the present invention, exhibits a crystallization process consisting mainly of crystal growth. Namely, usually, the crystallization step comprises two steps i.e. formation of crystal nuclei which takes place at a relatively low temperature range of at least the crystallization temperature and growth of crystal nuclei which proceeds at a relatively high temperature range immediately below the melting point. However, the recording layer containing Sb as the main component, to be used in the present invention, has such a characteristic that formation of crystal nuclei is little, and the crystal growth speed is extremely fast.

The optical recording medium to be used in the present invention is prepared by forming various layers such as the recording layer, etc. constituting the optical recording medium, followed by initial crystallization of the recording layer to make the recording layer in an unrecorded or erased state having high reflectivity and thereby to obtain a final product. And, recording of information on the recording layer is carried out by irradiating the recording layer locally with a focused laser beam to melt and then quench the recording layer to form amorphous marks. On the other hand, erasing information from the recording layer is carried out by recrystallizing the thus formed amorphous marks to return the recording layer to a crystalline state again.

Here, such erasing (recrystallization) is accomplished by using the peripheral crystalline phase as crystal nuclei and by filling the amorphous portions with crystal growth from the peripheral portions of amorphous marks. Accordingly, contribution of formation of crystal nuclei in the interior of amorphous marks, is little, and contribution of crystal growth from the peripheral crystalline portions, which proceeds at a high temperature immediately below the melting point, is governing. Such erasing in the optical medium consisting mainly of the crystal growth from the peripheral crystalline portions, of course depends on the size of the amorphous marks (see e.g. G. F Zohu et. al., Proc. SPIE, Vol. 4090 (2000), p. 108). Especially in mark length modulation recording on CD or DVD, slender marks are formed along the advancing direction of the focused laser beam for recording/retrieving, and the above erasing depends on the mark width in the transverse direction to the advancing direction. Namely, as the mark width is wider, it takes more time in erasing such marks.

Accordingly, there is a situation such that with CD-RW or RW-DVD with a relatively low recording density, the size of amorphous marks tends to be large, whereby high velocity erasing is difficult, and high velocity overwriting is difficult, as compared with a high density mark length modulation recording by an optical system (hereinafter referred to as a blue recording system) having a wavelength $\lambda$=about 400 nm and NA of a focusing object lens for a focused laser beam=about 0.85, for which development has just recently been started.

According to a study made by the present inventors, it has been found that especially with recording layer compositions having the same Sb/Te ratio, the square root of the diameter of the focused laser beam generally determined by $\lambda$/NA is inversely proportional to the upper limit of the overwritable linear velocity. For example, with respect to the above-mentioned blue recording system, a recording layer overwritable at about 20 m/s has already been reported by the present inventors, wherein a Sb/Te eutectic recording layer having Ge added, is used (Horie et al., Proc. SPIE, Vol. 4342 (2001), p. 76). With the blue recording system, overwriting at 20 m/s can be accomplished even when the Sb/Te ratio is generally about 4. However, with the RW-DVD system ($\lambda$=660 nm, NA=0.65), overwriting is possible only to a level of about 14 m/s. Further, with the CD-RW system ($\lambda$=780 nm, NA=0.5), overwriting is possible only at a level of 11 m/s. Namely, even if a recording layer overwritable at a high linear velocity of more than about 20 m/s with the blue recording system, is simply applied, no satisfactory overwriting can be accomplished at from 18 to 20-times velocity with CD-RW or at about 5-times velocity with RW-DVD. Further, the blue recording system is applicable even to a recording layer whereby the influence of a noise due to crystal grains is low, and the Sb/Te ratio is high and the crystal grain boundary noise is relatively high. However, in an application to CD-RW or RW-DVD, the influence of a noise due to crystal grain boundaries as the Sb/Te ratio becomes high, can not be neglected.

Accordingly, in order to apply the SbTe eutectic material to RW-DVD or CD-RW, it is necessary to increase Sb/Te more and to bring it to a level of at least 4.5. On the other hand, the Sb/Te ratio may not simply be increased, and it is necessary to take a measure to lower the noise due to crystal grain boundaries by improving the above-mentioned composition range and the after-mentioned initialization method. Further, it is necessary to pay more attention also to the stability of amorphous marks in the vicinity of room temperature. Of course, it is necessary to carry out a substantial review taking into consideration the modulation and $R_{top}$, also with respect to the thickness, etc. of the protective layer, etc. as other constituting elements of the optical recording medium, to be used in the present invention.

The following may be mentioned as another suitable composition for the recording layer material to be used for the optical recording medium of the present invention, which can be classified by the amount of Te contained in the phase-change type recording layer. Namely, the composition of the phase-change type recording layer is made to contain Te in an amount of less than 10 atomic %, while using Sb as the main component and further made to contain Ge as an essential component. With such a composition, overwriting at 32-times velocity of CD-RW will be possible.

As a specific example of the above-mentioned composition for the phase-change type recording layer, an alloy (in this specification, this may sometimes be referred to as a GeSb type eutectic alloy) comprising as the main component an eutectic alloy having a composition close to $Ge_{10}Sb_{90}$ and containing less than 10 atomic % of Te, may preferably be mentioned. The composition in which the amount of Te is less than 10 atomic %, is not a SbTe eutectic, but tends to have a nature as a GeSb type eutectic alloy containing GeSb eutectic as the base. With such a GeSb type eutectic alloy, even if the Ge content is high at a level of 10 atomic %, the crystal grain size in the polycrystalline state after the initial crystallization is relatively fine, whereby the crystalline state is likely to be a single phase, whereby the noise is low. In the GeSb type eutectic alloy, Te is added merely as an additive and is not an essential element.

With the GeSb type eutectic alloy, the crystallization speed can be increased by adjusting the Sb/Ge ratio to be relatively high, whereby recrystallization of amorphous marks by recrystallization is possible. According to a study made by the present inventors, it has been found that with an optical recording medium using such a GeSb type eutectic alloy as the phase-change recording material, the amorphous marks are more stable than the above-mentioned GeSbTe eutectic system, even though high velocity crystallization is possible to such an extent that with CD-RW, an erase ratio of 25 dB can be accomplished at 32-times velocity. Further, it has been found that an optical recording medium employing such a GeSb type eutectic alloy as the phase-change recording material, has a characteristic such that no increase in the noise is observed as observed when the Sb/Te ratio is increased to enable erasing at 24-times velocity or even at 32-times velocity with the above-mentioned GeSbTe eutectic system, and thus recording at a low noise will be possible.

In fact, a recording layer in a crystalline state of an unrecorded or erased state, was peeled and inspected by a transmission electron microscope, whereby it was found that in the alloy recording layer containing the GeSb eutectic crystals as the base, the crystal grain size was smaller than in an alloy recording layer containing the SbTe eutectic crystals as the base, and thus, this is effective for lowering the noises attributable to light scattering due to the anisotropy of crystals or crystal grain boundaries.

Here, in a case where such a GeSb type eutectic alloy is used as the main component, the content of Ge is preferably made to be at least 1 atomic % and at most 30 atomic %.

As a preferred composition for such a GeSb type eutectic alloy, $Te_\gamma M1_\beta(Ge_\alpha Sb_{1-\alpha})_{1-\beta-\gamma}$ (where $0.01 \leq \alpha \leq 0.3$, $0 \leq \beta \leq 0.3$, $0 \leq \gamma < 0.1$, $2 \leq \beta/\gamma$, $0 < \beta+\gamma \leq 0.4$, and M1 is one member selected from the group consisting of In, Ga and Sn) may be mentioned. By adding In, Ga or Sn to the GeSb binary eutectic alloy, it is possible to make distinct the effect for increasing the difference in optical characteristics between the crystalline state and the amorphous state and thereby to obtain high modulation with interchangeable media of CD-RW and RW-DVD.

In the above TeM1GeSb type composition, Ge serves to facilitate formation of an amorphous phase and to increase the storage stability of amorphous record marks. Accordingly, $\alpha$ representing the content of Ge is made to be usually at least 0.01, preferably at least 0.03, more preferably at least 0.05. On the other hand, if the content of Ge becomes large, the crystallization speed decreases. Accordingly, in order to secure erasing performance in overwriting at a high velocity of at least 20 m/s, $\alpha$ is made to be usually at most 0.3, preferably at most 0.2.

Further, in the above TeM1GeSb type composition, elements M1 is one member selected from the group consisting of In, Ga and Sn.

By using In or Ga as element M1, the jitter in ultra high velocity recording will be improved, and the optical contrast may be increased. For this purpose, $\beta$ representing the content of In and/or Ga is made to be usually at least 0, preferably at least 0.01, more preferably at least 0.05. However, if In or Ga is too much, separately from the crystal phase to be used for an erased state, other crystal phases of In—Sb type or Ga—Sb type having a very low reflectivity, will be formed. Especially during the storage for a long time, such crystal phases will precipitate, and $R_{top}$ will decrease. Accordingly, $\beta$ is made to be usually at most 0.3, preferably at most 0.2, more preferably at most 0.15. Further, when In and Ga are compared, In is better in realizing lower jitter, and it is therefore preferred to use In for the above M1.

On the other hand, by using Sn as element M1, jitter in ultra high velocity recording can be reduced, and the optical contrast (the difference in reflectivity between the crystalline state and the amorphous state) can be made large. Accordingly, $\beta$ representing the content of Sn is made to be usually at least 0, preferably at least 0.01, more preferably at least 0.05. However, if Sn is too much, the amorphous phase immediately after recording is likely to change to another amorphous phase having a low reflectivity. Especially during the storage for a long time, such a stabilized amorphous phase will precipitate to lower the erasing performance. Accordingly, β is made to be usually at most 0.3, preferably at most 0.25, more preferably at most 0.2, further preferably at most 0.15, particularly preferably at most 0.12.

As element M1, a plurality of elements among In, Ga and Sn may be used. In a case where a plurality of elements are used as element M1, it is preferred that In and Sn are contained with a view to enlarging the modulation. In a case where In and Sn are contained, the total content of such elements is made to be usually at least 1 atomic %, preferably at least 5 atomic % and usually at most 40 atomic %, preferably at most 30 atomic %, more preferably at most 25 atomic %.

In the above TeM1GeSb type composition, by incorporating Te, it is possible to improve the archival change of the erase ratio in ultra high velocity recording. For this purpose, γ representing the content of Te is made to be usually at least 0, preferably at least 0.01, more preferably at least 0.02, further preferably at least 0.03, particularly preferably at least 0.05. However, if Te is too much, the noises may sometimes become high. Accordingly, γ is made to be usually less than 0.1, preferably at most 0.09, more preferably at most 0.08, more preferably at most 0.07.

Further, in a case where in the above TeM1GeSb type composition, Te and element M1 are incorporated, it is effective to control the total content thereof. Accordingly, β+γ representing the contents of Te and element M1, is made to be usually larger than 0, preferably at least 0.01, more preferably at least 0.05. By making β+γ within the above range, the effect of simultaneously incorporating Te and element M1 will be excellently provided. On the other hand, in order to excellently provide the effect of using the GeSb type eutectic alloy as the main component, β+γ is made to be usually at most 0.4, preferably at most 0.35, more preferably at most 0.3. On the other hand, β/γ representing the atomicity ratio of element M1 to Te is preferably made to be at least 2. By incorporating Te, the optical constant tends to decrease, and accordingly, in a case where Te is incorporated, it is preferred to slightly increase the content of element M1 (to slightly increase β).

Elements which may be added to the above TeM1GeSb type composition include, for example, Au, Ag, Pd, Pt, Si, Pb, Bi, Ta, Nb, V, Mo, rare earth elements, N and O, which may be used for e.g. fine adjustment of the optical characteristics or the crystallization speed. However, their amount is about 10 atomic % at the maximum.

In the foregoing, one of the most preferred compositions is a composition containing as the main component an alloy system of $In_p Sn_q Te_r Ge_s Sb_t$ ($0 \leq p \leq 0.3$, $0 \leq q \leq 0.3$, $0 < p+q = <0.3$, $0 \leq r \leq 0.1$, $0 \leq s \leq 0.2$, $0.5 \leq t \leq 0.9$, and $p+q+r+s+t=1$). In a case where Te and In and/or Sn are used in combination, it is preferred to make $(p+q)/r \geq 2$.

By employing the above composition, in the GeSb eutectic system, an increase of modulation can be accomplished by incorporating In or Sn, and reduction of jitter can also be accomplished. And, by incorporating Te, the archival stability of the erasing ability can be improved. Further, in the above composition, appearance of the crystalline phase attributable to any additional element can be suppressed, and there will be a merit in that single phase polycrystals composed substantially of hexagonal system crystals of Sb as the base, will be constantly formed.

In a case where either the above GeSbTe eutectic composition or the GeSb type eutectic composition is employed for the recording layer, it is preferred that the crystalline phase of the recording layer is formed mainly of the same crystalline phase. Such a form of the crystalline phase depends substantially on the initialization method for the recording layer. Namely, in order to form the preferred crystalline phase in the present invention, it is preferred to arrange the initialization method for the recording layer as follows.

The recording layer is formed usually by a physical vapor deposition method in vacuum such as a sputtering method. However, in an as-deposited state immediately after the deposition, it is usually amorphous, and therefore, it is usually crystallized to form an unrecorded or erased state. This operation is referred to as initialization (in this specification, the initialization may sometimes be referred to as "initial crystallization operation" or "initial crystallization"). As the initialization operation, a method such as oven annealing in a solid phase at a temperature of at least the crystallization temperature (usually from 150 to 300° C.) and at most the melting point, annealing under irradiation with a light energy of e.g. a laser beam or a flash lamp beam, or melt initialization, may be mentioned. However, in order to obtain a recording layer in the above-mentioned preferred crystalline state, it is preferred to employ melt initialization. In the case of annealing in a solid phase, there is a time until the thermal equilibrium is reached, whereby other crystalline phases are likely to be formed. Whereas, in a case where melt initialization is employed, crystal nuclei can more readily be formed than in the case of the solid phase, and the time until the thermal equilibrium is reached can be shortened, whereby there is an advantage such that a single crystalline phase is likely to be readily formed.

In the melt initialization, the recording layer may be melted and directly recrystallized during resolidification, or it may be once formed into an amorphous state during resolidification and then subjected to solid phase recrystallization in the vicinity of the melting point. In such a case, if the crystallization speed is too slow, there will be a time until the thermal equilibrium is reached, whereby other crystalline phases are likely to be formed. Accordingly, it is preferred to increase the cooling rate to some extent.

In the melt initialization, the time for maintaining the temperature at a level of at least the melting point is usually preferably at most 2 µs, preferably at most 1 µs. Further, for the melt initialization, it is preferred to employ a laser beam. It is particularly preferred to carry out initialization by using an oval laser beam having its minor axis substantially in parallel with the scanning direction (hereinafter, this initialization method may sometimes be referred to as "bulk erasing"). In such a case, the length of the major axis is usually from 10 to 1000 µm, and the length of the minor axis is usually from 0.1 to 10 µm. Here, the lengths of the major axis and the minor axis of the beam are defined from the half value width in a case where the light energy intensity distribution within the beam is measured. In a case where scanning is carried out at a speed higher than the overwritable maximum practical linear speed of the phase-change medium to be used, there may be a case where a region once melted in the initialization operation turns into an amorphous phase. Accordingly, it is preferred to carry out the operation at a linear velocity of not higher than the overwritable maximum practical linear velocity. Here, the maximum practical linear velocity itself is determined as the upper limit of the recording linear velocity where the erase ratio exceeds 20 dB when the erase ratio is measured by overwriting at that linear velocity. As the laser beam source, various types may be used including, for example, a semiconductor laser and a gas laser. The power of the laser beam is usually from about 100 mW to 5 W.

Now, a preferred scanning speed for a recording layer employing the GeSbTe eutectic composition will be described.

With a GeSbTe eutectic composition having a Sb/Te ratio of at most 4, whereby from 10 to 12-times velocity is the upper limit of the overwritable maximum practical linear velocity, as disclosed in JP-A-2001-229537, a preferred scanning speed is from about 3 to 10 m/s. Further, also with a GeSbTe eutectic composition expected for overwriting at about 16-times velocity, as disclosed in JP-A-2001-331936, a preferred scanning speed is from about 3 to 10 m/s. Thus, there has been a tendency that the scanning speed for initialization is increased as the practical overwriting linear velocity increases.

Whereas, it has been found that as in the present invention, with a GeSbTe eutectic composition wherein the Sb/Te ratio is made to be very high at a level of at least 4.5, excellent initial crystallization can be carried out at a rather low linear velocity of from 0.1 to 3 m/s, particularly preferably at a low linear velocity of about 2 m/s.

On the other hand, with a recording layer of a GeSb type eutectic composition (GeSb type eutectic alloy), it is advisable to initialize by scanning at a high linear velocity, and initialization may be carried out usually at from 10 to 20 m/s.

When initialization by bulk erasing is to be carried out by using, for example, a disk-form recording medium, the minor axis direction of an oval beam is brought substantially into line with the circumferential direction, and by rotating the disk, scanning is carried out in the minor axis direction, while moving the beam in the major axis (radial) direction every full circle (one rotation), whereby initialization can be carried out over the entire surface. The moving distance in the radial direction per one rotation is preferably set to be shorter than the major axis of the beam, so that the same radial region will be irradiated a plurality of times with the laser beam. As a result, initialization can certainly be carried out, and at the same time, it is possible to avoid non-uniformity of the initial crystallization state attributable to the energy distribution (usually from 10 to 20%) in the radial direction of the beam. On the other hand, if the moving distance is too short, the above-mentioned other undesirable crystalline phases tend to be formed. Accordingly, the moving distance in the radial direction per one rotation is usually set to be at least ½ of the major axis of the beam. Whether or not melt recrystallization has been properly done, can be judged by determining whether or not the reflectivity R1 in the erased state (crystalline state) after overwriting amorphous marks a plurality of times with a practical recording beam of about 1 μm, is substantially equal to the reflectivity R2 in the unrecorded state after the initial crystallization. Here, in a case where a signal pattern such that an amorphous mark is intermittently recorded, is employed, the measurement of R1 is usually carried out after overwriting a plurality of times at a level of from 5 to 100 times. In such a manner, an influence of the reflectivity at spaces between marks which may remain in an unrecorded state if recording is carried out only once, can be removed.

The above erased state for the measurement of reflectivity R1 may also be obtained by irradiating the writing power in a direct current fashion to melt the recording layer, followed by resolidification, without necessarily modulating the focused recording laser beam in accordance with a practical recording pulse-generating method.

In the present invention, it is preferred that the value of the following formula (F1) defined by R1 and R2 would become at most 10(%), particularly preferably at most 5(%).

$$2|R1-R2|/(R1+R2)\times 100(\%) \tag{F1}$$

For example, with a phase-change medium having R1 of about 17%, R2 may generally be within a range of from 16 to 18%.

And, in order to satisfy the above (F1), it is preferred to give a heat history substantially equal to the practical recording conditions, by the initial crystallization. Further, an alloy recording layer (crystalline state) comprising, as the main component, Sb in an unrecorded state after such initialization or in an erased state after overwriting thereon a plurality of times, was peeled, and the recording layer was inspected by a transmission electron microscope, whereby it was found that a single phase was formed wherein only a crystalline phase close to pure hexagonal crystals of Sb was observed, and the crystal grains were aligned in a specific direction with respect to the recording in-plane direction.

3. Regarding the Layer Structure of the Medium

Now, the layer structure of the medium to be used in the present invention and layers other than the recording layer will be described. It is important to control the layer structure and the compositions of layers other than the recording layer in order to satisfy both high speed crystallization of the recording layer and the archival stability of record marks and to maintain retrieving interchangeability with CD or DVD while bringing the optical characteristics of the medium within the specific ranges.

For the substrate of the medium of the present invention, a resin such as polycarbonate, acryl or polyolefin, or glass, may be employed. Among them, a polycarbonate resin is most preferred, since a polycarbonate is most commonly used for CD or DVD and is inexpensive. Further, in a case where a converged light beam enters from the substrate side, the substrate is preferably transparent. The thickness of the substrate is usually at least 0.1 mm, preferably at least 0.3 mm and on the other hand, usually at most 20 mm, preferably at most 15 mm. Usually, in the case of CD, the thickness is about 1.2 mm, and in the case of DVD, the thickness is about 0.6 mm.

In the case of DVD, a phase-change type recording layer is formed on such a substrate via prescribed layers such as a reflective layer and a protective layer, and further, a substrate is again formed on this phase-change type recording layer via a prescribed layer such as a protective layer. Namely, in DVD, a structure is adopted wherein the phase-change type recording layer is sandwiched between two substrates.

The recording layer preferably has both sides covered with protective layers to prevent deformation due to a high temperature at the time of recording (for the convenience of description, the protective layer on the incident light side of the recording layer may sometimes be referred to as a lower protective layer, and the protective layer on the opposite side may sometimes be referred to as the upper protective layer).

In order to maintain the interchangeability with the current CD or DVD system, a desired layer structure of the medium is such that on a substrate, a lower protective layer, a recording layer, an upper protective layer and a reflective layer are formed. In this case, the surface on the opposite side to the substrate may be coated with a resin (protective coating) curable by ultraviolet rays or heat.

The recording layer, the protective layer and the reflective layer can be formed by sputtering. In such a case, it is preferred to carry out deposition by sputtering in an in-line apparatus having a recording layer target, a protective layer target and, if necessary, a reflective layer material target provided in the same vacuum chamber, with a view to preventing oxidation or contamination among the respective layers of the recording layer, the protective layer and the reflective layer.

The material to be used for the protective layer is determined taking into consideration the refractive index, the thermal conductivity, the chemical stability, the mechanical strength, the adhesive property, etc. Usually, an oxide, sulfide, nitride or carbide of a metal or semiconductor, having high transparency and high melting point, or a fluoride of Ca, Mg, Li or the like, may be employed. Such an oxide, sulfide, nitride or fluoride may not necessarily take a stoichiometrical composition, and the composition may be controlled to adjust the refractive index, etc., and it is effective to use them as mixed.

When repeated recording characteristics are taken into consideration, a mixture of dielectrics is preferred. More specifically, a mixture of ZnS and ZnO, or a rare earth sulfide and a heat resistant compound such as an oxide, nitride or carbide, may be mentioned. The film density of such protective layers is preferably at least 80% of the bulk state, from the viewpoint of the mechanical strength.

In the present invention, the thermal conductivity of the protective layer, particularly of the upper protective layer, is preferably as small as possible. Specifically, it is preferred to use one having a thermal conductivity of at most 1 J/(m·k·s). As such a material, ZnS or a mixture containing ZnS in an amount of at least 50 mol %, may be mentioned.

The thickness of the lower protective layer is usually at least 30 nm, preferably at least 50 nm, more preferably at least 60 nm, particularly preferably at least 80 nm. In order to suppress deformation of the substrate due to heat damage at the time of repeated overwriting, a layer thickness of some extent is necessary, and if the thickness of the lower protective layer is too thin, the repeated overwriting durability tends to abruptly deteriorate. Particularly, at an initial stage where the repeated number of times is less than a few hundred times, jitter tends to abruptly increase. With respect to CD-RW, the thickness of the lower protective layer is particularly preferably made to be at least 80 nm.

Deterioration of jitter at the initial stage of repetition depends largely on the thickness of the lower protective layer. According to an observation by an atomic force microscope (AFM) conducted by the present inventors, it has been found that this initial deterioration is due to a deformation such that the substrate surface caves in by about from 2 to 3 nm. To suppress such a substrate deformation, the protective layer is required to have a sufficient thickness to provide a heat insulating effect not to conduct the heat generation of the recording layer to the substrate and to mechanically suppress the deformation, and for that purpose, the above-mentioned thickness is preferred.

Further, by controlling the thickness of the lower protective layer, the reflectivity $R_{top}$ can be adjusted to the prescribed range.

Namely, with a protective layer made of a dielectric material having a refractive index of from about 2.0 to 2.3 which is commonly employed for CD-RW employing a laser having a wavelength of about 780 nm, it is usual that if the thickness of the lower protective layer is made to be from 60 to 80 nm, the reflectivity $R_{top}$ will be minimum, and if the thickness of the lower protective layer is made to be 0 and about 150 nm, the reflectivity $R_{top}$ will be maximum. Namely, along with the change in the thickness of the lower protective layer, the reflectivity shows a periodic change taking the maximum and the minimum. Accordingly, it is optically meaningless to increase the thickness so much, and such will increase the material cost or may bring about a phenomenon (groove coverage phenomenon) wherein the groove formed on the substrate is embedded by the deposition of the thick film. Accordingly, in order to adjust $R_{top}$ to be from 15 to 25%, the lower protective layer is usually made to be at most 120 nm, preferably at most 100 nm, more preferably at most 90 nm.

On the other hand, with a protective layer made of a dielectric material having a refractive index of from about 2.0 to 2.3 which is commonly used in RW-DVD employing a laser having a wavelength of about 660 nm, it is usual that if the thickness of the lower protective layer is made to be from 50 to 70 nm, the reflectivity $R_{top}$ will be minimum, and if the thickness of the lower protective layer is made to be 0 or about 130 nm, the reflectivity $R_{top}$ will be maximum. Accordingly, from the same viewpoint as for CD-RW, the lower protective layer is made to be usually at most 100 nm, preferably at most 90 nm.

On the other hand, the thickness of the upper protective layer is usually at least 10 nm. In CD-RW, the thickness of the upper protective layer is preferably at least 20 nm, more preferably at least 25 nm. In RW-DVD, the thickness of the upper protective layer is preferably at least 15 nm, more preferably at least 18 nm.

The upper protective layer primarily prevents the mutual diffusion of the recording layer and the reflective layer. If the upper protective layer is too thin, the upper protective layer is likely to be broken by e.g. deformation at the time of melting of the recording layer, or heat dissipation at the recoding layer tends to be too large, whereby the power required for recording tends to be unnecessarily large (the recording sensitivity deteriorates). Especially when it is desired to carry out recording at a high velocity as in the present invention, deterioration of the recording sensitivity is undesirable.

On the other hand, if the upper protective layer is too thick, the temperature distribution within the protective layer tends to be sharp, whereby deformation of the protective layer itself tends to be large, and such deformation will be accumulated by overwriting and thus may bring about deformation of the medium. From such a viewpoint, in CD-RW, the thickness of the upper protective layer is made to be usually at most 60 nm, preferably at most 55 nm, more preferably at most 35 nm. On the other hand, in RW-DVD, the thickness of the upper protective layer is made to be usually at most 35 nm, preferably at most 30 nm.

Now, the recording layer will be described.

In CD-RW, thickness of the recording layer is made to be usually at least 10 nm, preferably at least 15 nm. On the other hand, in RW-DVD, the thickness of the recording layer is made to be usually at least 8 nm, preferably at least 15 nm. If the thickness of the recording layer is too thin, no adequate optical contrast tends to be obtainable, and the crystallization speed tends to be slow. Further, it tends to be difficult to erase the record in a short time.

On the other hand, the thickness of the recording layer is made to be usually at most 40 nm. In CD-RW, the thickness of the recording layer is made to be preferably at most 30 nm, more preferably at most 25 nm. On the other hand, in RW-DVD, the thickness of the recording layer is made to be preferably at most 25 nm, more preferably at most 20 nm. If the thickness of the recording layer is too thick, the optical contrast tends to be hardly obtainable, like in the case where the thickness is made thin, and further, the thermal capacity of the recording layer increases, whereby the recording sensitivity may sometimes deteriorate. Furthermore, the volume change of the recording layer accompanying the phase change, tends to be large as the recording layer becomes thick. Accordingly, if the recording layer is too thick, microscopic deformation will be accumulated in e.g. the protective layers and the substrate surface at the time of repeated overwriting, which may bring about an increase of noises.

The thicknesses of the recording layer and the protective layers are selected taking into consideration the interference effects attributable to the multilayer structure in addition to restrictions from the viewpoint of the mechanical strength and reliability (particularly the repeated overwriting durability), so that the efficiency for absorption of the laser beam will be good, and the amplitude of recording signals, i.e. the contrast between the recorded state and the unrecorded state, will be large.

For a layer structure to balance all of these, firstly, the refractive index of the upper and lower protective layers is made to be from 2.0 to 2.3. And, when the thickness of the lower protective layer is represented by $d_L$, the thickness of the recording layer by $d_R$ and the thickness of the upper protective layer by $d_U$, in CD-RW, $15 \leq d_R \leq 25$ nm, and $10 \leq d_U \leq 60$ nm. Further, the value of $d_L$ is preferably controlled so that in the $d_L$ dependency of the reflected light $R_{top}$ against the crystalline state at the time of retrieving, $d_L$ will be $\partial R_{top}/\partial d_L \geq 0$ between the minimum value of $R_{top}$ and the next minimum value in the thickness direction within a range of from 60 to 120 nm.

On the other hand, in RW-DVD, when the thickness of the lower protective layer is represented by $d_L$, the thickness of the recording layer by $d_R$ and the thickness of the upper protective layer by $d_U$, $10 \leq d_R \leq 20$ nm, and $15 \leq d_U < 30$ nm. Further, the value of $d_L$ is preferably controlled so that in the $d_L$ dependency of the reflected light $R_{top}$ against the crystalline state at the time of retrieving, $d_L$ will be $\partial R_{top}/\partial d_L \geq 0$ between the minimum value of $R_{top}$ and the next minimum value in the thickness direction within a range of from 50 to 100 nm.

With the optical recording medium of the present invention, as compared with the conventional CD-RW medium where the maximum practical linear velocity is 4-times velocity or 10-times velocity or the conventional RW-DVD medium where the maximum practical linear velocity is up to 2.4-times velocity, it is important to further increase the heat dissipation effect of the reflective layer. By adjusting the characteristics of the reflective layer and further combining it with the above recording layer, recording at both high-linear velocity and low-linear velocity will be more readily possible. Further, by using a material having a low thermal conductivity for the above protective layers, a larger effect can be obtained.

Formation of an amorphous phase and the recrystallization process, and the relation between the heat dissipating effect of the reflective layer and the recording linear velocity, will be described with reference to FIG. 4.

Figure 4:
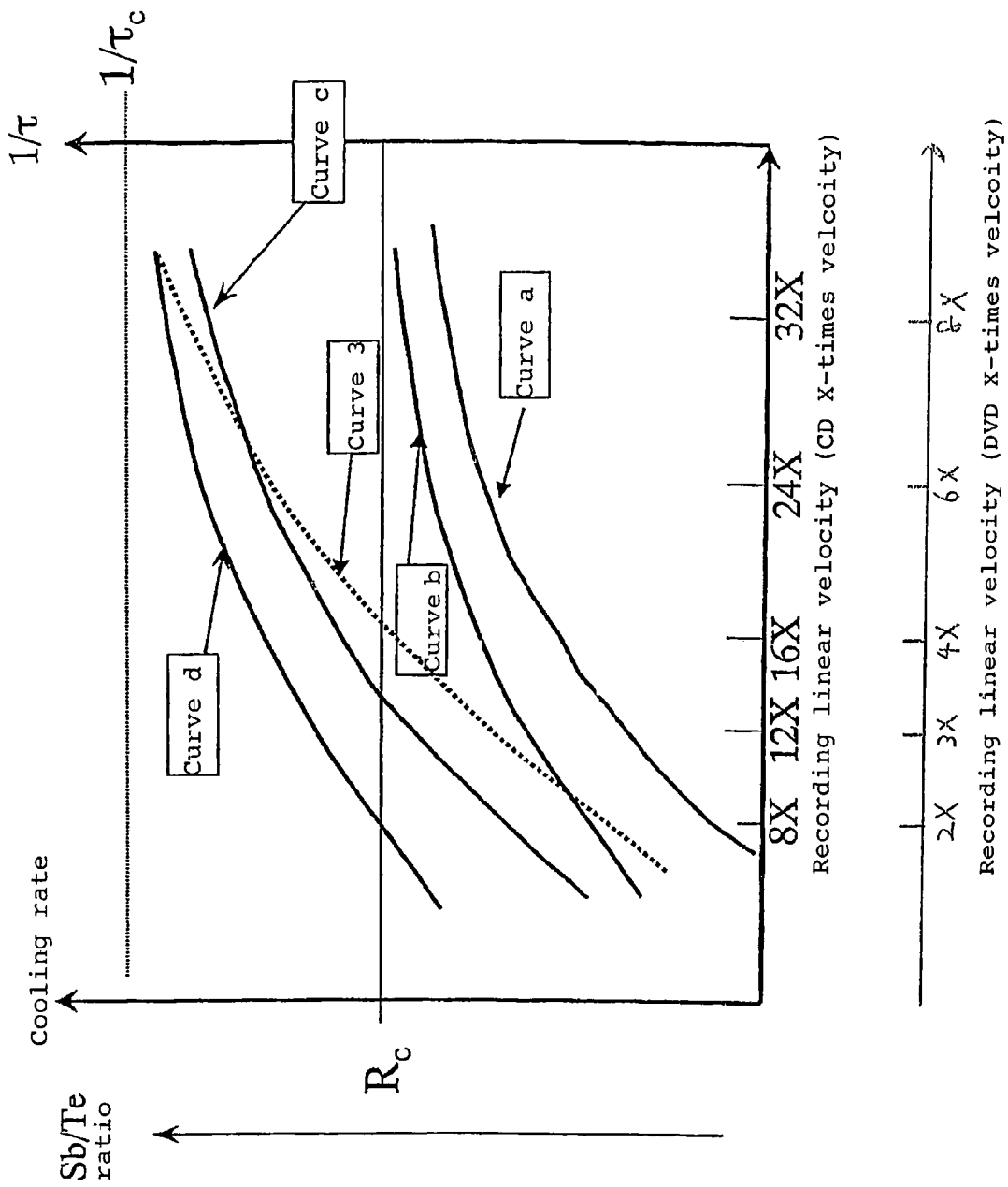
FIG. 4 is a view illustrating influences of the heat dissipation effect of the reflective layer, the composition of the recording layer and the recording method over the process for formation of an amorphous state and recrystallization at various recording linear velocities.

In FIG. 4, the horizontal axis represents the recording linear velocity, and the left vertical axis represents the cooling rate when the recording layer is melted and resolidified, and if this cooling rate R is larger than the critical cooling rate $R_c$ determined by the recording layer material, the recording layer will be amorphous, and amorphous marks will be formed. In the left vertical axis in FIG. 4, an increase of the crystallization speed of the recording layer means that $R_c$ will be large and moves upwards.

The relation between formation of an amorphous phase and the recording linear velocity in the case of realizing an optical recording medium wherein the minimum linear velocity and the maximum linear velocity in recording information on the optical recording medium are different at least twice by a combination of any one of the above recording methods CD1-1, 1-2 and 1-2 with any one of the above recording methods CD2-1, 2-2 and 2-3 (for example, an optical recording medium to be used at the minimum linear velocity being 8-times velocity, 10-times velocity or 12-times velocity of the reference linear velocity and at the maximum linear velocity being 24-times velocity of the reference linear velocity, or an optical recording medium to be used at the minimum linear velocity being 8-times velocity, 10-times velocity, 12-times velocity or 16-times velocity of the reference linear velocity and at the maximum linear velocity being 32-times velocity of the reference linear velocity) will be described with reference to FIG. 4. For example, in a case where the minimum linear velocity is 8-times velocity of the reference linear velocity, and the maximum linear velocity is 32-times velocity of the reference linear velocity, by using the recording layer composition and the layer structure of the optical recording medium of the present invention and/or the recording method of the present invention, it will be possible to make the cooling rate of the optical recording medium to be at least $R_c$ at every linear velocity as shown by curve d in FIG. 4, and even in a case where the recording linear velocity is different at least twice between the minimum linear velocity and the maximum linear velocity, it will be possible to properly form amorphous record marks on the optical recording medium.

In the same manner, the relation between formation of an amorphous phase and the recording linear velocity in the case of realizing an optical recording medium wherein the minimum linear velocity and the maximum linear velocity in recording information on the optical recording medium are different at least twice by a combination of any one of the above recording methods DVD1-1, 1-2 and 1-2 and any one of the above recording methods DVD2-1, 2-2 and 2-3 (for example, an optical recording medium to be used at the minimum linear velocity being 2-times velocity, 2.5-times velocity or 3-times velocity of the reference linear velocity and at the maximum linear velocity being 6-times velocity of the reference linear velocity, or an optical recording medium to be used at the minimum linear velocity being 2-times velocity, 2.5-times velocity, 3-times velocity or 4-times velocity of the reference linear velocity and at the maximum linear velocity being 8-times velocity of the reference linear velocity) will be described with reference to FIG. 4. For example, in a case where the minimum linear velocity is 2-times velocity of the reference linear velocity, and the maximum linear velocity is 8-times velocity of the reference linear velocity, by using the recording layer composition and the layer structure of the optical recording medium of the present invention and/or the recording method of the present invention, it will be possible to make the cooling rate of the optical recording medium to be at least $R_c$, at every linear velocity as shown by curve d in FIG. 4, and even in a case where the recording linear velocity is different at least twice between the minimum linear velocity and the maximum linear velocity, it will be possible to properly form amorphous record marks on the optical recording medium.

Curve a in FIG. 4 shows an example of the recording linear velocity dependency of the cooling rate of the recording layer in a case where the fixed pulse strategy of FIG. 1 is applied to a disk of a conventional structure wherein the sheet resistivity of the reflective layer is larger than 0.6Ω/□. By this optical recording medium and the recording method, the cooling rate is smaller than $R_c$ at every linear velocity, whereby it is impossible to form amorphous record marks in the recording layer.

Curve b in FIG. 4 shows an example of the recording linear velocity dependency of the cooling rate of the recording layer in a case where a fixed pulse strategy of FIG. 1 is applied with an optical recording medium having the heat dissipation effect improved by changing the reflective layer to one having a composition having a high heat dissipating effect as mentioned hereinafter, in order to realize the optical recording medium of the present invention. Curve b is located above curve a, and it is evident that with the optical recording medium having curve b, amorphous marks are more readily formed at every recording linear velocity, as compared with the optical recording medium having the recording linear velocity dependency of the cooling rate of the recording layer shown by curve a.

Further, curve c in FIG. 4 shows the recording linear velocity dependency of the cooling rate of the recording layer in a case where the after-mentioned recording pulse strategies of 2 T base (the recording pulse division methods (I) to (III)) are applied to a disk having the above conventional layer structure.

Further, curve d in FIG. 4 shows an example of the recording linear velocity dependency of the cooling rate of the recording layer in a case where the after-mentioned recording pulse division methods (I) to (III) are applied to a disk employing the above GeSbTe eutectic alloy or GeSb eutectic alloy for the recording layer. Curve d is located above curve c, and it is apparent that with the optical recording medium having curve d, amorphous marks are likely to be readily formed at every recording linear velocity.

At a high linear velocity, the cooling rate is sufficiently higher than the critical cooling rate $R_c$ for forming an amorphous phase in the recording layer, whereby the heat dissipating effect of the reflective layer is not distinctly influential over formation of the amorphous phase. However, at a low linear velocity, the cooling rate of the recording layer decreases as a whole, whereby the cooling rate becomes lower than the vicinity of $R_c$, whereby the heat dissipating effect of the reflective layer over the formation of the amorphous phase will be distinct.

On the other hand, these curves may be deemed to be the linear velocity dependency of the inverse number $1/\tau$ of time $\tau$ during which the recording layer is maintained at a temperature of at least the crystallization temperature, in a case where amorphous marks in the recording layer are recrystallized by a recording laser beam having an erasing power Pe (right hand side vertical axis in FIG. 4). If this holding time $\tau$ is longer than the critical crystallization time $\tau_c$ determined by the recording layer material, i.e. $1/\tau < 1/\tau_c$, amorphous marks will be sufficiently recrystallized and erased. In the present invention, the above-mentioned recording layer material having a particularly high crystallization speed is employed, whereby $\tau_c$ will be small, and $R_c$ will be large.

Further, with CD-RW, when a simple periodic signal comprising a 3 T mark and a 3 T space is recorded and then a simple periodic signal comprising a 11 T mark and a 11 T space is overwritten, if the erase ratio of the 3 T mark is adjusted to be at least 20 dB, usually, $1/\tau < 1/\tau_c$, whereby amorphous marks will be sufficiently recrystallized, and erasing of record marks will be properly carried out.

Likewise, with RW-DVD, when a simple periodic signal comprising a 3 T mark and a 3 T space is recorded and then, a simple periodic signal comprising a 14 T mark and a 14 T space is overwritten, if the erase ratio of the 3 T mark is adjusted to be at least 20 dB, usually, $1/\tau < 1/\tau_c$, whereby amorphous marks will be sufficiently recrystallized, and erasing of record marks will be properly carried out.

When the recording layer material of the above-mentioned GeSbTe eutectic alloy or GeSb eutectic alloy having a high crystallization speed, is employed, $\tau_c$ can be reduced, and erasing at a high speed in a short time will be possible, while there will be a situation such that $R_c$ is extremely high, and amorphous marks tend to be hardly formed.

Accordingly, with the optical recording material of the present invention, it is important to have such a characteristic as curve d whereby $1/\tau < 1/\tau_c$ is satisfied so that sufficient erasing can be carried out by overwriting at a high linear velocity, and at the same time an opposing requirement such that the cooling rate at a low linear velocity is made higher than $R_c$, is satisfied. To obtain such a medium, it is necessary to select the compositions and thicknesses of the respective layers and to employ the after-described 2 T base pulse strategy.

From the above-mentioned viewpoint, as the material for the reflective layer, it is preferred to employ an alloy containing as the main component Al or Ag having a high thermal conductivity and high heat dissipating effect. With the alloy containing Al or Ag as the main component, the specific heat of the reflective layer is similar to that of pure Al or pure Ag, and is considered to undergo no substantial change by an addition of a trace amount of elements or by reducing the layer thickness. Accordingly, the heat dissipating effect depends on the thermal conductivity and the thickness of the reflective layer.

Generally, the thermal conductivity of a thin film is substantially different from the thermal conductivity in a bulk state and is usually smaller, and by the influence of an island structure in the initial stage of deposition for forming the thin layer, the thermal conductivity may sometimes decrease by at least one figure. Further, depending upon the deposition condition, the crystallinity or the amount of impurities tends to be different, and accordingly, even if the target to be used for deposition by sputtering is of the same composition, the thermal conductivity of the thin film may sometimes be substantially different depending upon the deposition condition.

Here, "proper" or "improper" of the thermal conductivity can be judged by using the electrical resistance, since the thermal conductivity and the electrical conductivity are in a good proportional relation with a material, like a metal film, wherein the heat conduction or the electric conduction is carried out mainly by movement of electrons. The electrical resistance of a thin film is represented by the electrical resistivity defined by the film thickness or the area of the measured region. Among the electrical resistivities, the volume resistivity and the sheet resistivity (specific resistance) can be measured by a usual four probe method and is stipulated in JIS K7194. By measuring the volume resistivity and the sheet resistivity by means of this four probe method, the thermal conductivity of the thin film can be judged far more simply and with better reproducibility than actually measuring the thermal conductivity of the thin film itself.

The heat dissipating effect of the reflective layer is represented by a product of the thermal conductivity and the film thickness, and consequently, the heat dissipating effect can be defined by the sheet resistivity.

In the present invention, the sheet resistivity is made to be usually at most 0.55Ω/□, preferably at most 0.4Ω/□, more preferably at most 0.3Ω/□, particularly preferably at most 0.2Ω/□, most preferably 0.18Ω/□, in order to obtain a CD-RW medium overwritable at a wide range of linear velocity from 8-times velocity to 24-times velocity, or from 10-times velocity to 32-times velocity, or to obtain a RW-DVD medium overwritable at a wide range of linear velocity of from 4-times velocity to 10-times velocity, or from 4-times velocity to 12-times velocity. On the other hand, with a view to improving the heat dissipation of the reflective layer, the smaller the sheet resistivity, the better. However, the sheet resistivity is made to be usually at least 0.05Ω/□, preferably at least 0.1Ω/□.

Further, a preferred reflective layer has a volume resistivity of at most 150 nΩ·m, particularly at most 100 nΩ·m. On the other hand, a material having a volume resistivity being extremely small can hardly be obtainable in a thin film state, and it is usually at least 20 nΩ·m. In order to bring the above sheet resistivity within a range of from 0.05 to 0.2Ω/□, it is preferred that the volume resistivity is made to be as low as from 20 to 40 nΩ·m.

The thickness of the reflective layer is usually at least 40 nm, preferably at least 50 nm and on the other hand, usually at most 300 nm, preferably at most 200 nm. If it is too thick, no adequate heat dissipating effect can be obtained, and the recording sensitivity tends to deteriorate, although the sheet resistivity may be lowered. This is considered to be attributable to the fact that if the film thickness is thick, the thermal capacity per unit area increases, whereby it takes time for heat dissipation, and the heat dissipating effect rather tends to be small. Further, with such a thick film, it takes time for deposition, and also the material cost tends to increase. On the other hand, if the film thickness is too thin, the influence of the island structure at the initial stage of the film growth tends to result, whereby the reflectivity or the thermal conductivity may sometimes decrease.

As the material for the reflective layer, an Al alloy or an Ag alloy may be mentioned. More specifically, the material for the reflective layer suitable for the present invention may be an Al alloy comprising Al and at least one element selected from the group consisting of Ta, Ti, Co, Cr, Si, Sc, Hf, Pd, Pt, Mg, Zr, Mo and Mn. By using such an alloy, the hillock resistance can be improved. Accordingly, such an alloy can be employed taking into consideration the durability, the volume resistivity, the film-forming speed, etc. The content of the above-mentioned element is usually at least 0.1 atomic %, preferably at least 0.2 atomic % and on the other hand, usually at most 2 atomic %, preferably at most 1 atomic %. With respect to the Al alloy, if the amount of the additive impurity is too small, the hillock resistance tends to be inadequate in many cases, although such may depend also on the deposition condition. Further, if the amount of the additive impurity is too large, it tends to be difficult to obtain a low resistivity.

As the Al alloy, an Al alloy containing from 0 to 2 wt % of Si, from 0.5 to 2 wt % of Mg and from 0 to 0.2 wt % of Ti, may also be used. Si is effective to suppress fine peeling defects, but if the content is too large, the thermal conductivity may change with time. Accordingly, it is made to be usually at most 2 wt %, preferably at most 1.5 wt %. Mg improves the corrosion resistance of the reflective layer, but if the content is too large, the thermal conductivity may change with time. Accordingly, it is made to be usually at most 2 wt %, preferably at most 1.5 wt %. Ti is effective to prevent fluctuation of the sputtering rate, but if the content is too large, the thermal conductivity tends to deteriorate, and casting of a bulk having Ti uniformly solid-solubilized at a microlevel, tends to be difficult, and the target cost tends to increase. Accordingly, it is adjusted to be usually at most 0.2 wt %.

Further, another preferred example of the reflective layer material may be an Ag alloy comprising Ag and at least one element selected from the group consisting of Ti, V, Ta, Nb, W, Co, Cr, Si, Ge, Sn, Sc, Hf, Pd, Rh, Au, Pt, Mg, Zr, Mo and Mn. In a case where the archival stability is more important, Ti, Mg or Pd is preferred as the additive component. The content of the above element is usually at least 0.1 atomic %, preferably at least 0.2 atomic % and on the other hand, usually at most 2 atomic %, preferably at most 1 atomic %.

In the present invention, by using a reflective layer material having such a high thermal conductivity, it is possible to obtain a relatively thin reflective layer of at most 300 nm, having a properly small range of sheet resistivity at a level of from 0.2 to 0.55Ω/□. Further, at least, the additive element is adjusted to be at most 2 atomic %; the deposition rate and the vacuum degree are adjusted to be as mentioned hereinafter; impurity atoms such as oxygen inevitably included during the deposition are controlled to be generally at most 1 atomic %; the volume resistivity is adjusted to be from 20 to 40 nΩ·m; the film thickness is adjusted to be at least 100 nm, preferably at least 150 nm, whereby a low sheet resistivity of from 0.05 to 0.2Ω/□ can be obtained.

When another element is added to Al or Ag, it is common that the volume resistivity increases in proportion to the added concentration. Addition of such another element is considered to lower the thermal conductivity by increasing electron scattering at the grain boundaries usually by reducing the crystal grain size. Accordingly, by adjusting the content of such additive element, the crystal grain size can be made large, whereby the high thermal conductivity of the material itself can be obtained.

Further, the reflective layer is formed usually by sputtering or vacuum vapor deposition, and it is preferred to adjust the amount of impurities of the target or the vapor deposition material itself, or the amount of total impurities including the amount of moisture or oxygen included during the deposition, is controlled to be less than 2 atomic %. For this purpose, when the reflective layer is formed by sputtering, it is preferred to control the ultimate degree of vacuum in the process chamber to be less than $1 \times 10^3$ Pa.

Otherwise, if deposition is carried out at a background vacuum pressure poorer than $10^{-4}$ Pa, it is preferred to adjust the deposition rate to be at least 1 nm/sec, preferably at least 10 nm/sec, to prevent inclusion of impurities. Or, in a case where the additive element is intentionally incorporated more than 1 atomic %, it is preferred to adjust the deposition rate to be at least 10 nm/sec to prevent inclusion of additional impurities as far as possible.

In order to attain a higher thermal conductivity and higher reliability, it is also effective to have the reflective layer multi-layered. In such a case, it is preferred that at least one layer is made of the above-mentioned material having a low volume resistivity having a film thickness of at least 50% of the total thickness of the reflective layer. This layer substantially governs the heat dissipating effect, and other layers contribute to improvement of the corrosion resistance, the adhesion with the protective layer and the hillock resistance. Particularly when the first layer of the reflective layer containing Ag as the main component, is formed in contact with the protective layer containing e.g. ZnS containing sulfur, a second layer of the reflective layer containing no sulfur (in this specification, this layer may be referred to as an interfacial layer) is formed in order to prevent corrosion by the reaction of Ag with sulfur. As the material to be used for the interfacial layer, a dielectric material or a metal material may be mentioned. As a specific material, SiO$_2$, GeCrN, Ta, Nb or Al may, for example, be mentioned. For the interfacial layer, a metal which may function as a reflective layer may of course be employed. The thickness of the interfacial layer is usually at least 1 nm, preferably at least 2 nm and on the other hand, usually at most 10 nm, preferably at most 7 nm. In the case of employing a metal material, it is particularly preferred to adjust the thickness of the interfacial layer to be from 2 nm to 7 nm.

In the present invention, it is further necessary to pay attention to the construction of the groove provided on the substrate to secure retrieving interchangeability with CD or DVD.

3-1. In the Case of CD-RW

The track pitch of a groove is usually about 1.6 µm±0.1 µm. Further, the depth of the groove is usually from 30 to 45 nm, particularly preferably from about 30 to 40 nm.

If the groove depth is too deep, the push-pull value after recording tends to be too large. Further, the radial contrast value after recording tends to be too large as compared with the value before recording, whereby there may be a problem in the stability of servo.

On the other hand, if the groove depth is too shallow, the radial contrast value or the push-pull value is likely to be lower than the lower limit stipulated in CD-RW standards like Orange Book, Part 3. Further, the recording layer confinement effect by groove walls tends to be weak, whereby deterioration due to repeated overwriting tends to be accelerated. Further, if the groove depth is made too shallow, the production of a stamper for molding of the substrate tends to be difficult.

Within the above range, the reflectivity in the groove will be sufficiently high; 15% as the lower limit value in CD-RW standards can easily be satisfied; and the push-pull amplitude Pa after recording will not be too large, and even with a conventional concavo-convex pit retrieving circuit, it is possible to minimize the possibility that the gain of the push-pull detecting circuit is saturated.

The groove width is usually at least 0.5 µm, preferably at least 0.55 µm and usually at most 0.7 µm, preferably at most 0.65 µm. If the groove width is too small, the absolute value of the radial contrast after recording tends to hardly satisfy the stipulated value of less than 0.6. On the other hand, if the groove width is too large, deterioration of the overwriting durability caused by the presence of wobble tends to be distinct. The groove width is preferably made wide as compared with conventional CD-RW to be overwritten at about 10-times velocity.

The mechanism of the deterioration of the durability accelerated by the presence of wobble is not clearly understood, but it is considered to be attributable to the fact that a part of the recording laser beam has become readily applied to the side walls of the groove. Namely, the focused laser beam controlled by tracking servo will not follow the wobbling of the wobble and will advance straight along the center of the groove for scanning, and therefore, if there is wobbling of the groove walls, the laser beam is likely to be irradiated to such groove walls though slightly. At a groove wall portion or a groove corner portion where the adhesion of a thin film is poor, deterioration by heat damage during repeated overwriting is likely to take place for such a reason that a stress concentration is likely to take place, and accordingly, it is considered that even a part of the laser beam is irradiated at such a portion, deterioration will be accelerated. In general, there is a tendency that the durability will be improved by increasing the groove depth and reducing the groove width in recording in the groove of a phase-change medium. However, in a case where wobble is present, if the groove width is too small, the above-mentioned phenomenon of deterioration of the groove walls may rather be distinct.

Further, the groove width and the groove depth may be obtained by an optical diffraction method by U-groove approximation by means of e.g. a He—Ne laser beam having a wavelength of 633 nm. Further, the groove-shape can actually be measured by a scanning electron microscope or a scanning probe microscope. For the groove width in such a case, it is usually preferred to employ a value at a position halfway in the groove depth.

With the optical recording medium of the present invention, recording by a CAV system, is possible. Namely, with the medium of the present invention, recording of data can be carried out while the rotational speed is maintained to be constant irrespective of the radial position where the recording is carried out. In such a case, also retrieving can be carried out at a constant rotational speed, and it is preferred to carry out recording and retrieving at the same rotational speed.

3-2. In the Case of RW-DVD

The track pitch of a groove is usually about 0.74 µm ±0.01 µm. Further, the depth of the groove is usually from 20 to 40 nm, particularly preferably from about 25 to 35 nm.

If the groove depth is too deep, jitter of the recording signal will increase.

On the other hand, if the groove depth is too shallow, the radial contrast value or the push-pull value is likely to be lower than the lower limit stipulated in RW-DVD standards. Further, the recording layer confinement effect by groove walls tends to be weak, whereby deterioration due to repeated overwriting tends to be accelerated. Further, if the groove depth is made too shallow, the production of a stamper for molding of the substrate tends to be difficult.

Within the above range, the reflectivity in the groove will be sufficiently high; 18% as the lower limit value in RW-DVD standards can easily be satisfied; and stabilized servo and sufficient push-pull signals can be secured.

The groove width is usually at least 0.25 µm, preferably at least 0.28 µm and usually at most 0.36 µm, preferably at most 0.34 µm. If the groove width is too small, jitter of record signals tends to deteriorate, and it becomes difficult to adjust the reflectivity to be at least 18%. On the other hand, if the groove width is too large, the track cross signal value after recording is likely to be lower than the lower limit in phase-change type rewritable DVD standards, or interference of wobbling between the adjacent tracks tends to be large, whereby jitter of record signals is likely to deteriorate.

The mechanism of the deterioration of the durability accelerated by the presence of wobble is not clearly understood, but it is considered to be attributable to the fact that a part of the recording laser beam has become readily irradiated to the side walls of the groove. Namely, the focused laser beam controlled by tracking servo will not follow the wobbling of the wobble and will advance straight along the center of the groove for scanning, and therefore, if there is wobbling of the groove walls, the laser beam is likely to be applied to such groove walls though slightly. At a groove wall portion or a groove corner portion where the adhesion of a thin film is poor, deterioration by heat damage during repeated overwriting is likely to take place for such a reason that a stress concentration is likely to take place, and accordingly, it is considered that even a part of the laser beam is irradiated at such a portion, deterioration will be accelerated. In general, there is a tendency that the durability will be improved by increasing the groove depth and reducing the groove width in recording in the groove of a phase-change medium. However, in a case where wobble is present, if the groove width is too small, the above-mentioned phenomenon of deterioration of the groove walls may rather be distinct.

Further, the groove width and the groove depth may be obtained by an optical diffraction method by U-groove approximation by means of e.g. a He—Cd laser beam having a wavelength of 441.6 nm. Further, the groove-shape can actually be measured by a scanning electron microscope or a scanning probe microscope. For the groove width in such a case, it is usually preferred to employ a value at a position halfway in the groove depth.

With the optical recording medium of the present invention, recording by a CAV system, is possible. Namely, with the medium of the present invention, recording of data can be carried out while the rotational speed is maintained to be constant irrespective of the radial position where the recording is carried out. In such a case, also retrieving can be carried out at a constant rotational speed, and it is preferred to carry out recording and retrieving at the same rotational speed.

4. Regarding the Recording Method

In the present invention, by carrying out overwriting by the following recording method (recording pulse division method (I)) relating to the third aspect of the present invention, rewriting of information can properly be carried out at a recording linear velocity of from 10 to 32-times velocity of CD-RW or of from about 6 to 12-times velocity of RW-DVD. As a result, recording of signals excellent in the interchangeability with the current CD retrieving system will be possible.

The recording pulse division method (I) is one intended to obtain better recording signals by expanding variable parameters and their ranges than the recording methods CD1-1, 1-2, 1-3, 2-1 and 2-2 and recording method DVD1-1 as described with reference to FIGS. 3 and 16.

That is,

Recording Pulse Division Method (I):

A recording method to be used for a rewritable optical recording medium, which comprises recording information by a plurality of record mark lengths and space lengths between record marks, wherein:

between record marks, a laser beam having an erasing power Pe capable of crystallizing an amorphous phase is applied to form spaces between record marks, and when the time length of one record mark is represented by nT (where T is the reference clock period), for a record mark of n=2m (where m is an integer of at least 1), of which the time length (n−j)T (where j is a real number of from −2.0 to 2.0) is divided into m sections of $\alpha_i T$ and $\beta_i T$ comprising $\alpha_1 T$, $\beta_1 T$, $\alpha_2 T$, $\beta_2 T$, . . . , $\alpha_m T$ and $\beta_m T$ (provided that $\Sigma_i(\alpha_i+\beta_i)=n-j$), and for a record mark of n=2m+1 (where m is an integer of at least 1), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, . . . , $\alpha_m'T$ and $\beta_m'T$ (provided that $\Sigma_i(\alpha_i'+\beta_i')=n-k$), a laser beam having a constant writing power Pw sufficient to melt the recording layer is applied within a time of $\alpha_i T$ and $\alpha_i'T$ (where i is an integer of from 1 to m), and a laser beam having a bias power Pb is applied within a time of $\beta_i T$ and $\beta_i'T$ (where i is an integer of from 1 to m); and further, when m≧3, for a record mark of n=2m, when the start time for nT mark is represented by $T_0$, (i) after a delay time $T_{d1}T$ from $T_0$, $\alpha_i T$ is generated, then, (ii) within i=2 to m, $\beta_{i-1}T$ and $\alpha_i T$ are alternately generated in this order, while $\beta_{i-1}+\alpha_i$ maintains about period 2 (provided that at i=2 and/or i=m, $\beta_{i-1}+\alpha_1$ may be deviated from about period 2 within a range of ±0.5, and when m≧4, $\beta_{i-1}$ and $\alpha_i$ take constant values βc and αc, respectively, within i=3 to m−1), and then, (iii) $\beta_m T$ is generated, and for a record mark of n=2m+1, when the start time for nT mark is represented by $T_0$, (i) after a delay time $T_{d1}'T$ from $T_0$, $\alpha_1'T$ is generated, then, (ii) within i=2 to m, $\beta_{i-1}'T$ and $\alpha_i'T$ are alternately generated in this order, while $\beta_{i-1}'+\alpha_i'$ maintains about period 2 (provided that at i=2 and/or i=m, $\beta_{i-1}'+\alpha_i'$ may be deviated from about period 2 within a range of ±2, and when m≧4, $\beta_{i-1}'$ and $\alpha_i'$ take constant values βc and αc, respectively, within i=3 to m−1), and then, (iii) $\beta_m'T$ is generated, and with the same m, for a record mark of n=2m and a record mark of n=2m+1, $\alpha_m \neq \alpha_m'$, and at least one set selected from ($T_{d1}$, $T_{d1}'$), ($\alpha_1$, $\alpha_1'$), ($\beta_1$, $\beta_1'$), ($\beta_{m-1}$ and $\beta_{m-1}'$) and ($\beta_m$ and $\beta_m'$) takes different values.

In the foregoing, when m=at least 3, $T_{d1}$, $\alpha_1$, $\Delta_1$, αc, $\beta_c$, $\beta_{m-1}$, $\alpha_m$ and $\beta_m$ are preferably constant irrespective of m.

Likewise, when m=at least 3, $T_{d1}'$, $\alpha_1'$, $\beta_1'$, $\beta_{m-1}'$, $\alpha_m'$ and $\beta_m'$ are also preferably constant irrespective of m.

Further, in the EFM modulation system to be used for CD-RW, this recording system is applied using sets of (6,7), (8,9) and (10,11) for n in the case where m is at least 3. On the other hand, in the case of EFM+ modulation to be used for RW-DVD, it is necessary to consider n=14 in addition to the above sets of n, but in the recording pulse division method of n=10, two pairs of αcT and $\beta_c T$ may simply be added between $\alpha_1 T$ and $\alpha_m T$.

Here, when n=2, after a delay time $T_{d1}T$, a writing power Pw is applied at section $\alpha_i T$, and then a bias power Pb is applied at section $\beta_1 T$, to form an amorphous mark.

Further, when n=3, after a delay time $T_{d1}'T$, a writing power Pw is applied at section $\alpha_1'T$, and then a bias power Pb is applied at section $\beta_1'T$, to form an amorphous mark.

Further, in a case where the above recording method is applied as a recording method up to 32-times velocity of CD-RW, it is preferred to adopt the following recording conditions. Namely, the recording linear velocity is set to be a linear velocity of at most 32 times the reference linear velocity $V_1$=1.2 to 1.4 m/s, and EFM modulation information is recorded by a plurality of record mark lengths and space lengths between record marks, wherein the time length of one record mark is set to be nT (where n is an integer of from 3 to 11), the ratio of an erasing power Pe to a writing power Pw is set to be Pe/Pw=0.2 to 0.6, and a bias power Pb is set to be Pb≦0.2Pe.

Further, in a case where the above recording method is applied as a recording method up to 12-times velocity of RW-DVD, it is further preferred to adopt the following recording condition. Namely, the recording linear velocity is set to be a linear velocity of at most 12 times the reference linear velocity $V_1$=3.49 m/s, and EFM+ modulation information is recorded by a plurality of record mark lengths and space lengths between record marks, wherein the time length of one record mark is set to be nT (where n is an integer of from 3 to 11 and 14), the ratio of an erasing power Pe to a writing power Pw is set to be Pe/Pw=0.2 to 0.6, and a bias power Pb is set to be Pb≦0.2Pe.

In the present invention, the method for controlling the energy of the recording laser energy beam is generally called a recording pulse strategy or a pulse strategy. Particularly, the method in which a nT mark is formed by a pulse train of a plurality of divided writing power levels, is called divided recording pulses, a recording pulse division method or a pulse division method.

This recording pulse division method is preferably employed usually at a velocity of from 8-times velocity to 24-times velocity or 32-times velocity as a recording method for overwritable CD-RW.

Or, it is preferably employed usually at a velocity of from 2-times velocity to 12-times velocity as a recording method for overwritable RW-DVD.

Figure 5:
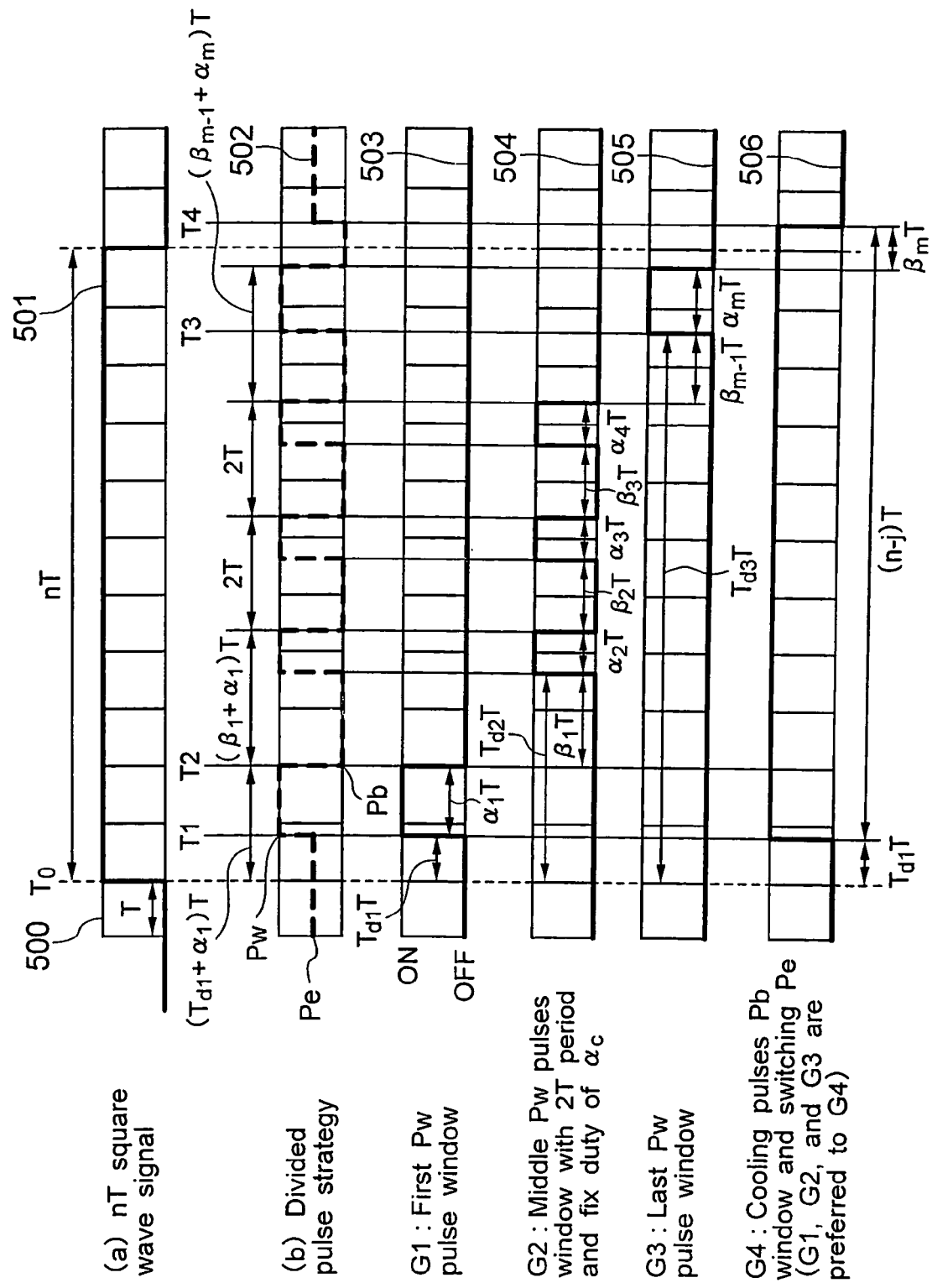
FIG. 5 is a view illustrating an embodiment of the recording pulse-dividing method in the recording method of the present invention.

FIG. 5 is a timing chart for illustrating an example of the relation of the respective recording pulses in a case where the pulse division method is carried out in the recording method of the present invention. Electronic circuits (integrated circuits) for controlling the irradiation timings of the respective laser beams for writing power Pw, bias power Pb and erasing power Pe, in the recording device to carry out recording of information on an optical recording medium, are designed, based on the timing chart shown in FIG. 5. FIG. 5 shows a case wherein Pb≦Pe≦Pw, the writing power at the recording pulse section $\alpha_i T$ (i=an integer of 1 to m) is constant at Pw, the bias power at off-pulse section $\beta_i T$ (i=integer of 1 to m) is constant at Pb, and the power for irradiation at spaces between marks and at sections other than $\alpha_i T$ (i=1 to m) and $\beta_i T$ (i=1 to m) is the erasing power Pe which is constant. Pe/Pw is adjusted to be usually at least 0.2, preferably at least 0.25. On the other hand, Pe/Pw is adjusted to be usually at most 0.6, preferably at most 0.4. Within the above range, Pe/Pw is preferably a value of from 0.2 to 0.6, particularly preferably a value within a range of from 0.2 to 0.4, more preferably within a range of from 0.25 to 0.4. If this ratio is smaller than the above range, the erasing power is too low, whereby unerased amorphous marks are likely to remain, and if it is larger than the above range, the portion irradiated with Pe is likely to be amorphous again after being melted.

In FIG. 5, 500 represents a reference clock having period T.

FIG. 5(a) shows a pulse waveform corresponding to a record mark having length nT, and symbol 501 corresponds the length of the record mark having length nT. In FIG. 5(a), a case where n=11 and m=5, is shown. FIG. 5 shows an example of an odd number mark, but to simply the description, in the description of FIG. 5 and the following, when an odd number mark and an even number mark are described, unless otherwise specified, the respective parameters of $\alpha_i$, $\beta_1$, $T_{d1}$, $T_{d2}$, $T_{d3}$ and j will be used as representatives. Namely, in the description where n is an even number mark, the above parameters may be used as they are, and in the description where n is an odd number mark, the above parameters may be substituted by $\alpha_i'$, $\beta_i'$, $T_{d1}'$, $T_{d2}'$, $T_{d3}'$ and k, respectively.

Against the recording method for conventional CD-RW or RW-DVD shown in FIG. 1, the significance of the present recording method shown in FIG. 5, is as follows.

If j is 0, $\Sigma_i(\alpha_i+\beta_i)/m=n/m$. Thus, n/m is a value corresponding to an average length of $(\alpha_i+\beta_i)$, and (n/m)T will be a value corresponding to an average period of divided pulses.

In the optical recording method of the present invention, in a case where n=2m or n=2m+1, the division number of recording pulses will be m, and n/m will be about 2. Namely, by adjusting the average period for repetition comprising a recording pulse and an off-pulse to be generally 2 T, the lengths of $\alpha_i T$ and $\beta_i T$ can be made sufficient. For example, recording pulse section $\alpha_i T$ and off-pulse section $\beta_i T$ can be taken to be sufficiently longer than 0.5 T and even if the data reference clock period T at 32-times velocity of CD became about 7.2 nsec or even if the data reference clock period at 12-times velocity of DVD becomes about 3.5 nsec, heating of the recording layer can be sufficiently carried out, while supply of heat by the subsequent pulses can be suppressed, so that sufficient cooling effects can be obtained.

In the division method disclosed in conventional CD-RW or RW-DVD standards, m is fixed to m=n−1, and thus, n/m=n/(n−1). This value becomes small as n increases, and accordingly, when the longest mark time length is represented by $n_{max}T$, n/m will be minimum at $n_{max}$. Namely, the average period of repetition comprising a recording pulse and an off-pulse (in this specification, this average period of repetition comprising a recording pulse and an off-pulse may sometimes be referred to as an average period of divided pulses) is longest with the shortest mark and shortest with the longest mark, and accordingly, $\alpha_i T$ or $\beta_i T$ is shortest at the longest mark.

For example, in the EFM modulation system, n=3 to 11 and k=1, and therefore, $(n_{max}/m)=11/(11−1)=1.1$ Further, for example, in the EFM+ modulation system, n=3 to 11 and 14, and k=1, and therefore, $(n_{max}/m)=14/(14−1)=1.08$.

Namely, the average of repeating periods (divided pulses) in the EFM modulation system and the EFM+ modulation system, is generally 1 T.

In this specification, the conventional pulse division method defined in FIG. 1 is referred to as "1 T base" pulse strategy, and the pulse division method of the present invention as defined in FIG. 5 is referred to as "2 T base" pulse strategy.

At least 24-times velocity of CD or at least 4-times velocity of DVD, when the data reference clock period T becomes less than about 10 nsec, in the longest mark, the average period of divided pulses generally becomes less than 10 nsec. This means that the average of divided pulses in the 1 T base pulse strategy becomes shorter than 10 nsec. And, in such a case, the average value of recording pulse section $\alpha_i T$ or the average value of off-pulse section $\beta_i T$ becomes less than 5 nsec. Further, in the above description, even if a certain ai or $\beta_i$ is made to be longer than the average value, such means that another $\beta_i$ or $\alpha_i$ becomes shorter, and thus, there is no difference in that either one $\alpha_i T$ or $\beta_i T$ becomes small. And, if either one of $\alpha_i T$ or $\beta_i T$ becomes less than 5 nsec, especially less than 3 nsec, there may be a case where in high velocity recording, beam irradiation and cooling time can not sufficiently be secured.

Record marks in the present invention are, usually, recognized as physical marks which are continuously formed in the recording medium and which can be optically distinguishable from other portions. Namely, a record mark may be formed from a plurality of physical marks. When the numerical aperture of the object lens for focusing the retrieving laser is represented by NA, and the retrieving laser wavelength is represented by λ, if physical marks are closer than $0.2(\lambda/NA)$, such physical marks can hardly be optically distinguished. Accordingly, when one record mark having mark length nT is to be formed of a plurality of physical marks, their distances are preferably adjusted to be smaller than $0.2(\lambda/NA)$.

Further, when the present invention is applied to CD-RW, it is preferred to adjust the average value of recording pulse sections $\alpha_i T$ (i=1 to m) and the average value of off-pulse sections $\beta_i T$ (i=1 to m−1) to be at least 3 nsec to secure the time follow up nature of irradiated laser power. More preferably, individual $\alpha_i T$ (i=1 to m) and $\beta_i T$ (i=1 to m−1) are adjusted to be at least 3 nsec.

On the other hand, when the present invention is applied to RW-DVD, it is preferred to adjust both the average value of recording pulse sections $\alpha_i T$ (i=1 to m) and the average value of off-pulse sections $\beta_i T$ (i=1 to m−1) to be at least 2 nsec, to secure the time follow up nature of irradiated laser power.

Here, with respect to the time width of pulse $\alpha_i T$ (i=1 to m), in a transition of a logical level corresponding to the transition of the power level between Pw and Pb in the divided pulse generating logical circuit as shown by the timing chart in FIG. 5, a logical level is defined by the time until the output has reached from one level to a half level of the other level. Accordingly, for example, the time width of the recording pulse of $\alpha_i T$ in FIG. 5 means an interval from the time when a half level of the logical level is reached at the time of the change of the rising portion of the above pulse from Pb to Pw, to the time when a half level of the logical level is reached at the time of the change of the falling portion of the above pulse from Pw to Pb. Here, the logical levels are for example binary levels of 0 V and 5 V in TTL.

The reason as to why in CD, $\alpha_i T(\beta_i T)$ is preferably adjusted to be at least 3 nsec, while in DVD, $\alpha_i T(\beta_i T)$ is preferably adjusted to be at least 2 nsec, will be explained. Namely, in the case of the DVD system, the diameter of the focused laser beam for recording is about 70% of that in the case of the CD system. Accordingly, the spacial influence which one recording pulse irradiation will give, will be also about 70%. Thus, the diameter of the focused laser beam becomes small, and the spacial resolution will be improved, whereby a short time pulse irradiation at a level of 2 nsec which is about 70% of 3 nsec, becomes effective. Further, with a small beam system, the area to be heated is small, whereby cooling is fast, and also with respect to an off-pulse section, even if it is shortened to a level of 2 nsec, sufficient cooling effects can be obtained. However, also in the case of RW-DVD, at least 3 nsec is more preferred.

In the present invention, $\beta_m$ may be 0, so that no beam is applied to $\beta_m T$ i.e. the last off-pulse section. However, in a case where the heat accumulation problem at the rear end portion of a mark is substantial, it is preferred to provide $\beta_m T$. In such a case, $\beta_m T$ is also adjusted to be at least 2 nsec, more preferably at least 3 nsec. Here, the pulse time width of $\beta_m T$ is defined by the time when a half of the logical level has been reached in the transition of the logical level between Pb and Pe, like in the case of the above-mentioned $\alpha_i T$.

Actual divided pulses for irradiation of a laser beam are formed by using a timing chart as shown as an example in FIG. 5 and by inputting an integrated circuit output of a logical level for generating a gate signal to a laser drive circuit, to control a large current for laser driving thereby to control a laser output from a laser diode to control the writing power. In the present invention, as mentioned above, the pulse width is defined based on the time width at the logical level. The actual output laser waveform will have a delay of from about 1 to 3 nsec and at the same time will be accompanied by overshooting or undershooting. Accordingly, the change with time of the writing power is not of a simple square waveform as shown in FIG. 3. However, in the recording pulse division method in the present invention, when recording pulse sections $\alpha_i T$ (i=1 to m) are at least 2 nsec, an irradiation energy required for recording can be secured by increasing writing power $Pw_i$, although there may be a problem of the rising/falling of the recording beam. Also in such a case, by adjusting the rising and falling of the actual recording laser beam pulses to be less than 2 nsec, more preferably less than 1.5 nsec, more preferably less than 1 nsec, the necessary writing power Pw can be controlled. Further, the actual writing power rising time or falling time is usually meant for the time required for transition from 10% to 90% as the difference from one level to another level when the power transfers between the power levels of Pe and Pw or when the power transfers between the power levels of Pb and Pw. The sum of the rising and falling is smaller than the time width of $\alpha_i T$, preferably at most 80% of $\alpha_i T$, more preferably at most 50% of $\alpha_i T$.

In the recording pulse division method of the present invention, even if there is a discrepancy between the time width of the logical level and the actual response of the writing power, there is no problem so long as it is a delay at a level of the above rising or falling time. With a delay of such a level, proper recording can be carried out within the preferred variable ranges of the respective parameters defining the recording pulse division method, as described later (defined by theoretical levels). Inversely, even with a laser diode output necessarily accompanied by such a delay or overshooting, etc., mark length modulation recording by the divided recording pulses will be possible in a clock period of less than 10 nsec, which is an important feature of the recording pulse division method of the present invention.

On the other hand, when off-pulse sections $\beta_i T$ (i=1 to m−1) are also at least 2 nsec, the cooling effects can be secured by lowering the bias power Pb to the same level as the retrieving power Pr or to 0 so long as there will be no adverse effect to other systems such as a tracking servo.

In order to obtain larger cooling effects, it is preferred that $\Sigma_i(\alpha_i)$ is made to be smaller than 0.5 n with respect to time lengths of all record marks. More preferably, $\Sigma_i(\alpha_i)$ is at most 0.4 n. Namely, the sum of recording pulse sections $\Sigma_i(\alpha_i T)$ is made shorter than $\Sigma_i(\beta_i T)$, so that off-pulse sections in each mark are made to be longer. Particularly preferably, with respect to every i of i=2 to m−1, $\alpha_i T \leq \beta_i T$, and at least in the recording pulse train of the second et seq, $\beta_i T$ is made longer than $\alpha_i T$.

In the recording method of the present invention, the values for $\alpha_i$ (i=1 to m) and $\beta_i$ (i=1 to m−1) are optionally set depending upon the values for e.g. recording pulse sections $\alpha_i T$ (i=1 to m), off-pulse sections $\beta_i T$ (i=1 to m−1), etc., but they are respectively usually at least 0.01, preferably at least 0.05 and, except for a case where n=3, usually at most 2, more preferably at most 1.5. Especially with respect to $\beta_i$ (i=1 to m−1), if the value is too small, the cooling effect may sometimes be inadequate, and it is preferably at least 0.1, particularly preferably at least 0.3. On the other hand, if it is too large, a record mark may sometimes be optically separated by too much cooling, and it is at most 2. However, with respect to $\beta_m'$ of the last off-pulse section in a case where n=3, it is at most 3, preferably at most 2.5, more preferably at most 2. Further, in a modulation system containing n=2, the case of n=3 will likewise apply.

The effect of enlarging an off-pulse section is large at the first off-pulse section $\beta_1 T$ which presents a substantial influence over the shape of the forward end of a mark and at the last off-pulse section $\beta_m T$ which presents a substantial influence over the shape of the rear end of the mark. Among them, the influence over the last off-pulse section $\beta_m T$ will be particularly large.

In the present invention, $Pb_i < Pw_i$, and $Pb_i < Pw_{i+1}$, where $Pw_i$ is the recording laser power applied to recording pulse sections $\alpha_i T$ (i=1 to m), and $Pb_i$ is the recording laser power applied to off-pulse sections $\beta_i T$ (i=1 to m−1), and it is preferred that Pw and Pb take constant values, respectively, in one recording pulse section and off-pulse section, irrespective of i and n. In order to obtain a large cooling effect, it is preferred to set Pb<Pw with respect to time lengths of all record marks. More preferably, Pb/Pw≦0.2, further preferably Pb/Pw≦0.1. Further, the bias power Pb may be made to be equal to a laser power Pr applied at the time of retrieving. As a result, setting of the divided pulse circuit required for pulse division will be simplified.

It is preferred that parameters $\alpha_i$ (i=1 to m) and $\beta_i$ (i=1 to m−1) relating to the pulse width can be specified for a high resolution of at least $1/16$ T. More preferably, they can be specified for an optical resolution of at least $1/20$ T, more preferably at least $1/32$ T. With a low resolution of less than $1/8$, there may be a case where parameter values relating to the optimum pulse width for proper recording can not be found out.

In such a case, it is possible to employ two or more different values for $Pb_i$ and/or $Pw_i$ depending upon i, against the time length of a specific one record mark.

For example, writing powers $Pw_i$ and $Pw_m$ at the forefront recording pulse section $\alpha_i T$ and the last recording pulse section $\alpha_m T$ are made to have values different from the writing power Pw at intermediate recording pulse sections $\alpha_i T$ (i=2 to m−1), whereby the mark shapes at the fore-end and rear-end portions of the mark may accurately be controlled. In such a case, the writing power Pw at intermediate recording pulse sections $\alpha_i T$ (i=2 to m−1) is preferably made to have the same power value at every section, whereby setting of the divided pulse circuit will be simplified. Likewise, with respect to the bias power $Pb_i$ at off-pulse sections $\beta_i T$ (i=1 to m−1), it is preferably set to have the same power value, except that only the bias power $Pb_m$ at $\beta_m T$ is set to have a value different from other Pb complementarily. Further, in order to properly record 3 T marks, among at least two record marks having different n, different Pw and/or Pb values may be adopted for the same i. Namely, at the time of recording mark lengths of n=4 or more, Pw and Pb are set to be constant, while only at the time of recording a mark length of n=3, the writing power may be set to have a slightly different value (a difference of about 10%). Also in such a case, Pb is preferably set to be constant.

In the present invention, primarily, only by controlling a time (relating to a pulse width) parameter of any one of $T_{d1}$, $\alpha_1$, $\beta_1$, $\beta_{m-1}$, $\alpha_m$ and $\beta_m$, accurate mark length control and low jitter can be realized, and it is preferred for simplification of the circuit, fine adjustment of $Pw_1$, $Pw_m$ or $Pb_m$ is individually carried out only in a case where there is some restriction in setting such time parameters. Such a restriction may specifically be a case wherein the resolution to set parameter values relating to the pulse width is so rough that proper recording can not be done only by setting the pulse widths.

The bias power Pb is preferably of substantially the same value as the retrieving power Pr of a retrieving laser beam required for retrieving. For CD-RW, it is usually of a value of at most 2 mW, preferably at most 1.5 mW, more preferably at most 1 mW. On the other hand, for RW-DVD, it is usually of a value of at most 1 mW, preferably at most 0.7 mW, more preferably at most 0.5 mW. So long as there will be no adverse effect to focusing or tracking servo, it is preferably set to be as close as possible to 0, whereby the quenching effect of the recording layer at the Pb irradiation sections (off-pulse sections) will be accelerated. Further, the values for Pw, Pe and Pb may not necessarily be constant in a direct current fashion, and may, for example, have a high frequency superimposed in a cycle of at most about $1/10$ of the clock period T, whereby the laser operation can be stabilized. In such a case, Pw, Pe and Pb will be the respective average values.

FIG. 5(b) shows a recording pulse strategy (dotted line 502) in a case where n=11 i.e. m=5, which is formed by a combination of a plurality of recording pulse-controlling gates shown at 503, 504, 505 and 506. Namely, gate signal G1(503) to form the first recording pulse $\alpha_1 T$, gate signal G2(504) to form middle recording pulses $\alpha_i T$ (2≦i≦m−1), gate G3 to form the last recording pulse $\alpha_m T$ (505) and gate G4 to define sections for application of Pe and Pb, are separately formed, and they are combined. At G1, G2 and G3, writing powers will be emitted at level ON. Further, with gate signal G4, its ON-section has the rising of $\alpha_i T$ as the base point (i.e. after a delay of $T_{d1}$ from $T_0$), and the ON-section of (n−j)T is set.

The preferential relation of such gate signals can be accomplished by carrying out summing operation of logical signals for controlling the respective gates by letting ON-OFF of the gates correspond to logical 1 or 0, Specifically, ON-signals of G1, G2 and G3 are preferred to an ON-signal of reversed polarity signal of G4, so that even during the G4 ON-period (even during irradiation with Pb), if G1, G2 or G3 becomes ON, Pw will be applied. As a result, gate signal G4 will define the timing of an off-pulse section $\beta_1 T$ at a section where each of G1, G2 and G3 is OFF.

The position of the forward end of a mark is substantially determined by the rising of the writing power laser beam at $\alpha_i T$, and the jitter is determined by powers $Pw_1$ and $Pb_1$ at $\alpha_i T$ and $\beta_1 T$ and the duty ratio of $\alpha_i T$ to $\beta_1 T$. With respect to $\beta_1$, so long as it is within a range of from 0.5 to 2, a change at a level of 0.5 gives no substantial influence over the forward end position of the mark or the jitter, and accordingly, it can be used for controlling the difference 1 T in the mark length between an even number length and an odd number length, which will be described later.

On the other hand, the rear end position of the mark depends on the falling position of the last recording pulse $\alpha_m T$ or the subsequent cooling process of the recording layer temperature. Further, it depends on the power at the divided pulse $(\beta_{m-1} + \alpha_m)T$ at the rear end of the mark, $Pw_m$, $Pb_m$ and the duty ratio of $\alpha m$ to $\beta m$. Particularly, with a phase-change medium forming amorphous marks, it also depends on the value of the rear end off-pulse section $\beta_m T$ which gives a substantial influence over the cooling rate of the recording layer. With respect to $\beta_{m-1}$, if it is within a range of from 0.5 to 2, a change at a level of 0.5 gives no direct influence over the rear end position of the mark or the jitter, and accordingly, it can be used for controlling the difference 1 T in the mark length between an even number length and an odd number length, which will be described later. However, as described hereinafter, in a case where an optical recording medium of the present invention capable of high velocity recording is to be used for low velocity recording, it will be important to adjust also $\beta_m T$.

In a case where the division number m is 3 or more, among intermediate recording pulses present between the forefront pulse and the rear end pulse, $\beta_{i-1}T$ and $\alpha_i T$ where i=2 to m, will be repeated with a period of generally 2 T. Namely, $\beta_{i-1}+\alpha_i$ will be generally 2 (i=2 to m). By making the period constant in such a manner, the pulse-generating circuit can be simplified. In the present invention, "generally" 2 or "generally" 2 T is meant to express that a deviation from 2 T which inevitably results from the practical nature of the electronic circuit, etc., is allowable. Namely, a deviation more or less from 2 T is allowable so long as the effect of the present invention is obtainable such that proper recording is possible within a wide range of recording linear velocity of from 8 to 24-times velocity or from 8 to 32-times velocity in the case of CD (from 2 to 10-times velocity or from 2 to 12-times velocity in the case of DVD). For example, a deviation at a level of ±0.2 (from 1.8 T to 2.2 T) is included in the deviation from 2 T which inevitably results from the practical performance of the electronic circuit, etc.

In the case of an even number mark length, even at $\beta_1+\alpha_2$ and $\beta_{m-1}+\alpha_m$, their values can be made generally 2, and such is preferred, since the pulse-generating circuit can be simplified. However, with respect to i=1 and/or i=m in an even number mark length, i.e. $\beta_1+\alpha_2$ and/or $\beta_{m-1}+\alpha_m$, there may be a case where it is better to allow a deviation from 2 within a range of ±0.5, so that an accurate mark length and control of jitter at the mark end can be possible. In such a case, $\beta_{i-1}+\alpha_i$ present between $\beta_1+\alpha_2$ and $\beta_{m-1}+\alpha_m$ may be made to be generally 2.

Further, also with respect to i=1 and/or i=m in an odd number mark length i.e. $\beta_i'+\alpha_2'$ and/or $\beta_{m-1}'+\alpha_m'$, it may be better to allow a deviation from 2, so that a more accurate mark length and control of jitter at a mark end, will be possible. Namely, since $\beta_1'=\beta_1+\Delta_1$, $\beta_{m-1}'+\beta_{m-1}+\Delta_{m-1}$ and $\alpha_m'=\alpha_m+\Delta_m$, $\beta_1'+\alpha_2'$ and/or $\beta_{m-1}'+\alpha_m'$ should better allow a deviation from 2 for at least $\Delta_1$, $\Delta_{m-1}$ and $\Delta_m$, whereby a more accurate mark length and control of jitter at a mark end, will be possible. Accordingly, in such a case, $\beta_{i-1}'+\alpha_i'$ present between $\beta_1'+\alpha_2'$ and $\beta\Delta_m'+\alpha_m'$, may be made to be generally 2.

In this pulse generating method, the duty ratio of $\alpha_i T$ and $\beta_{i-1} T$ in middle recording pulses where i=2 to m-1, gives no influence over the jitter at the forward or rear end of the mark, and accordingly, it may be any so long as amorphous marks can be formed with a prescribed width, and the signal amplitude can be secured. Accordingly, in order to simplify the pulse-generating circuit, such a ratio should be to have a constant value. Particularly in a case where m is 4 or more, where intermediate pulses may be repeatedly present, $\alpha_i=\alpha c$ (constant value) for every i which is at least 3 and at most (m-1) in record marks of two types i.e. an even number length mark and an odd number length mark in the case of the same division number m. At the same time, period 2 T is generally constant, and accordingly, $\beta_i=2-ac$ will generally have a constant value $\beta c$. In this sense, $\beta c$ depends on $\alpha c$ and will be determined once $\alpha c$ is determined.

After all, when m is 3 or more (n=6 or more), fine adjustment is carried out for period $(\beta_1+\alpha_2)T$ and/or $(\beta\Delta_m+\alpha_m)T$, whereby desired mark length nT will be accomplished. Here, it is preferred that also $\alpha_2$ will also take the same value $\alpha c$ as other $\alpha_i$ (i=3 to m-1). Further, in an even number mark, it is preferred that also $\alpha_m$ takes the same value $\alpha c$. In this manner, designing of the control circuit for controlling the generation of laser beams (pulsed beams) for recording pulses and off-pulses of the recording pulse strategy, can be simplified.

However, in a case where n=3, $\alpha_1$ and $\beta_1$ will serve also as $\alpha_m$ and $\beta_m$, whereby it will be necessary to adjust the 3 T mark length and the jitters at the forward and rear ends of the mark only by $\alpha_1$ and $\beta_1$ as values different from other n.

Now, the recording pulse division method of 2 T base of the present invention has a feature that based on a more highly regulated rule, consideration is given as to whether the value which n of nT mark can take, is an odd number or an even number.

In the following description, explanations will be made again by distinguishing parameters $\alpha_i$, $\beta_i$, $T_{d1}$, $T_{d2}$, $T_{d3}$ and J corresponding to the case of an even number mark length and parameters $\alpha_i'$, $\beta_i'$, $T_{d1}'$, $T_{d2}'$, $T_{d3}'$ and k corresponding to the case of n being an odd number mark length, with the same m.

In FIG. 5, times having $T_{d1}$, $T_{d2}$ and $T_{d3}$ multiplied by T, are defined as delay times from the forward end time $T_0$ of nT mark, but $T_{d1}$, $T_{d2}$ and $T_{d3}$ are primarily intended to define the timing for generation of recording pulse $\alpha_1 T$, forefront pulse $\alpha_2 T$ among middle pulses and $\alpha_m T$, respectively. It is optional where to take the basic point to accomplish such a purpose. For example, $T_{d2}$ may be defined from the final point of $\alpha_i T$, i.e. $T_{d2}=\beta_1$, or it may be defined from the starting point of $\alpha_i T$, so that $T_{d2}=(\alpha_1+\beta_1)$. Likewise, $T_{d3}$ may be defined by using $T_0$ as the basic point, but it may be defined by using the falling of $\alpha_{m-1} T$ as the basic point, i.e. $T_{d3}=\beta_{m-1}$. Inversely, by the definition of such delay times $T_{d1}$, $T_{d2}$, $T_{d3}$, etc., $\beta_1$, $\beta_{m-1}$ and $\beta_m$ will be fixed. Namely, (m, $T_{d1}$, $\alpha_1$, $\beta_1$, $\alpha c$, $\beta_{m-1}$, $\alpha_m$, $\beta_m$) will be fixed as a set of independent parameters to univocally define the recording strategy of the present invention. Further, in a case where n is an odd number, as a set of independent parameters, (m, $T_{d1}'$, $\alpha_1'$, $\beta_1'$, $\alpha C'$, $\beta_{m-1}'$, $\alpha_m'$, $\beta_m'$) will be fixed.

As mentioned above, essentially, it is sufficient that these parameters (timings for rising and falling of the respective recording pulses and off-pulses) are fixed, and it is optional how to indirectly take the basic points of parameters for delay times such as $T_{d1}$, $T_{d2}$ and $T_{d3}$.

And, in order to record the mark length and space length nT for each n and to reduce the mark and space jitters as fluctuation thereof, for each n, the division number m and at least two sets among ($T_{d1}$ and $T_{d1}'$), ($T_{d2}$ and $T_{d2}'$), ($T_{d3}$ and $T_{d3}'$), ($\alpha_1$ and $\alpha_1'$), ($\alpha_m$ and $\alpha_m'$) and ($\beta_m$ and $\beta_m'$) are changed to generate divided recording pulses. This also means that for every n, the division number m and at least two sets among ($T_{d1}$ and $T_{d1}'$), ($\alpha_1$ and $\alpha_1'$), ($\beta_1$ and $\beta_1'$), ($\beta_{m-1}$ and $\beta_{m-1}'$), ($\alpha_m$ and $\alpha_m'$) and ($\beta_m$ and $\beta_m'$) are changed.

In the above recording method to change various parameters for each n, preferred is such that with the same m, for a record mark of n=2m and a record mark of n=2m+1, $\alpha_m \neq \alpha_m'$, and at least one set selected from ($T_{d1}$, $T_{d1}'$), ($\alpha_1$, $\alpha_1'$), ($\beta_1$, $\beta_1'$), ($\beta_{m-1}$ and $\beta_{m-1}'$) and ($\beta_m$ and $\beta_m'$) takes different values.

Namely, especially when m is 3 or more, in order to impart mark length difference T between an even number length mark and an odd number length mark with the same division number m, in the present invention, especially time lengths of the respective sections of $\beta_1 T$, $\beta_{m-1} T$, $\alpha_m T$ and $\beta_m T$ are adjusted. If only one parameter among these $\beta_1$, $\beta_{m-1}$, $\alpha_m$ and $\beta_m$ is changed to impart difference 1 T between an even number length mark and an odd number length mark, there may be an adverse effect to the formation of the front and rear ends of the odd number length mark. Therefore, when an odd number length mark is to be formed, a value other than 0 is added to $\alpha_m$ (to make $\alpha_m \neq \alpha_m'$), while adding a value other than 0 to at least one of $\beta_1$, $\beta_{m-1}$, and $\beta_m$ used for the formation of an even number length mark (to satisfy at least one of $\beta_1 \neq \beta_1'$, $\beta_{m-1} \neq \beta_{m-1}'$ and $\beta_m \neq \beta_m'$). This means that from the above definitions of $T_{d1}$, $T_{d2}$ and $T_{d3}$, for an even number length mark and an odd number length mark with the same division number m, $\alpha_m \neq \alpha_m'$, and further, at least one set of parameters among three sets of ($T_{d2}$ and $T_{d2}'$), ($T_{d3}$ and $T_{d3}'$) and ($\beta_m$ and $\beta_m'$) take different values depending on whether n is an even number or an odd number. Or, this means that for an even number length mark and an odd number length mark with the same division number m, $\alpha_m \neq \alpha_m'$, and further at least one set of parameters among three sets of ($\beta_1$ and $\beta_1'$), ($\beta_{m-1}$ and $\beta_{m-1}'$) and ($\beta_m$ and $\beta_m'$) take different values depending upon whether n is an even number or an odd number.

In JP-A-2002-331936 or in literatures "Proceedings of PCOS2002, No. 30-Dec. 1, 2002, pp. 52-55", "Proc. SPIE Vol. 4090 (2000) pp. 135-143", and "Proc. SPIE, Vol. 4342 (2002), pp. 76-87", some of the present inventors have proposed that in order to properly realize a mark length difference of 1 T between an even number length mark and an odd number length mark with the same division m, mainly the lengths of $\beta_1 T$ and $\beta_{m-1} T$ are respectively corrected to $\beta_i' T$ and $\beta_{m-1}' T$.

However, as a result of a study made by the present inventors, it has been found that if with CD-RW, the recording linear velocity is increased to 24-times velocity or 32-times velocity, or with RW-DVD, the recording linear velocity is increased to 8-times velocity or 10-times velocity, it tends to be difficult to properly form an even number length mark and an odd number length mark with the same division number m only by the above-mentioned correction of $\beta_1$ and $\beta_{m-1}$.

Therefore, the present inventors have conducted a further study. As a result, it has been found that in order to properly carry out high velocity recording as mentioned above, it is important to firstly correct the length of $\alpha_m T$ to obtain $\alpha_m' T$ rather than carry out the above-mentioned correction of $\beta_1$ and $\beta_{m-1}$ at the time of forming an odd number length mark.

According to the study of the present inventors, it has been found that while setting $\beta_1 = \beta_1'$ and $\beta_{m-1} = \beta_{m-1}'$, firstly, $\alpha_m$ is corrected to obtain $\alpha_m'$ without carrying out correction of $\beta_1$ and $\beta_{m-1}$ between an even number mark and an odd number mark, even in high velocity recording, recording marks having relatively good quality can be formed. However, at the same time, it has been found also that it is still insufficient to correct the above $\alpha_m$ to obtain $\alpha_m'$ in order to certainly obtain good recording characteristics in high velocity recording.

Thus, in the present invention, in addition to the above-mentioned correction of the length of $\alpha_m T$ ($\alpha_m \neq \alpha_m'$), at least one of $\beta_1 T$, $\beta_{m-1} T$ and $\beta_m T$ is corrected, whereby it will be possible to certainly carry out good high velocity recording. Particularly, good recording can be carried out within a wide linear velocity range as in the after-mentioned CAV or P-CAV recording.

In a conventional 2 T base recording pulse division method, if the difference 1 T between an even number length mark and an odd number length mark with the same division number m is corrected solely by off-pulse sections $\beta_1 T$ and $\beta_{m-1} T$, the sum of recording pulse sections $\Sigma \alpha_i T$ ($\Sigma \alpha_i' T$) imparted to form the above-mentioned even number length and odd number length marks will be the same for the even number length mark and the odd number length mark. Further, in the present invention, primarily, a case is supposed wherein writing power Pw is constant in recording pulse sections to form one record mark (namely, writing power Pw is set to be constant in the respective sections from $\alpha_i T$ to $\alpha_m T$). Accordingly, $\Sigma \alpha_i T$ ($\Sigma \alpha_i' T$) being the same for an even number length mark and an odd number length mark, means that the sum of recording energies Pw ($\Sigma \alpha_i T$) relating to the formation of one set of an even number mark and an odd number mark becomes to be the same ($\Sigma \alpha_i T = \Sigma \alpha_i' T$).

Whereas, recording devices (drives) to carry out recording on optical recording media usually have certain fluctuation in outputs of laser-generating means among the individual recording devices. This means that the above-mentioned writing power Pw is fluctuating among the recording devices. As a result of an extensive study by the present inventors, it has been found that by the irradiation method for recording energy wherein the sum of recording energies Pw($\Sigma \alpha_i T$) relating to the formation of one set of an even number mark and an odd number mark becomes to be constant, there is a problem that due to the above-mentioned fluctuation of Pw among the recording devices, the change in the odd number mark length and the even number mark length with the same division number m will not be the same. Namely, by an increase or decrease $\Delta$Pw of writing power Pw due to the fluctuation among recording device products, even if one set of even number and odd number mark lengths with the same m are recorded, among the recording devices, the above-mentioned mark lengths will deviate by $\Delta$Tmark. Here, if $\Delta$Tmark of the odd number mark is substantially the same as $\Delta$Tmark of the even number mark, there will be no problem, but it has been found that if correction of only off-pulse sections of $\beta_1 T$ and $\beta_{m-1} T$ is carried out by means of $\alpha_2 T$ base recording pulse strategy as a recording method (a method wherein Pw ($\Sigma \alpha_i T$) is constant), due to $\Delta$Pw among the recording devices, $\Delta$Tmark of an odd number mark length is remarkably different from $\Delta$Tmark of an even number mark.

In the conventional 1 T base recording pulse division method shown in FIG. 1, every time when the mark length changed by 1 T, one recording pulse was added, and thus a rule was maintained such that if the mark length became long, the sum of recording energies was monotonously increased. Accordingly, $\Delta$Tmark due to fluctuation of Pw among recording devices was substantially constant irrespective of an odd number or even number mark. However, as mentioned above, by the conventional 1 T base recording pulse division method, it is impossible to carry out high velocity recording at a level of 24 or 32-times velocity for CD-RW or 8-times velocity or 10-times velocity for RW-DVD, and it becomes essential to use $\alpha_2 T$ base recording pulse division method to secure the laser irradiation time and the cooling time. Accordingly, so long as the 2 T base recording pulse division method is employed, it becomes important that the above-mentioned $\Delta$Tmark is made to be substantially constant between an even number mark and an odd number mark.

Therefore, the present inventors have conducted a further study of the 2 T base recording pulse division method to make good recording possible even at 24-times velocity or 32-times velocity of CD-RW or even at 8-times velocity or 10-times velocity of RW-DVD. As a result, it has been found that in order to make $\Delta$Tmark due to $\Delta$Pw among recording devices to be substantially constant between an even number mark length and an odd number mark length, it is effective that in the 2 T base recording pulse division method, $\alpha_m T$ is necessarily corrected between an even number (2m) mark and an odd number (2m+1) mark with the same division number m, so that the sum of recording energies Pw($\Sigma \alpha_i T$) is increased together with the mark length. It is preferred that $\Sigma \alpha_i T$ increases generally by 0.5 T every time when the mark length increases by 1 T. Every time when m increases by 1, $\alpha_i T$ and $\beta_i T$ will increase by 1, respectively, and in such a case, usually, intermediate pulses $\alpha c T$ and $\beta c T$ will be added. $\beta c+\alpha c$ is generally 2, hence $\Sigma\alpha_i T$ increases by 1 T on average. The same division number m includes two cases of n and n+1, and if the mark length is increased by 1 T from n to n+1, $\Sigma\alpha_i T$ will be increased generally by 0.5 T.

For this purpose, as mentioned above, it is difficult to obtain a good recording power margin by adjusting only $\beta_1$, $\beta_{m-1}$ and lengths of other off-pulse sections to adjust a mark length of 1 T as the difference between an even number mark and an odd number mark, with the same m.

On the other hand, with respect to a question of which length of recording pulses $\alpha_i T$ should be adjusted, it is most preferred to adjust the length of the last $\alpha_i T$ i.e. $\alpha_m T$ with the same m, in order to provide the same function as that every time when m increases or decreases, the last $\alpha_i T$ will increase by one.

Further, by a study by the present inventors, it has been found effective to correct, in addition to $\alpha_m T$, at least one of $\beta_1 T$, $\beta_{m-1} T$ and $\beta_m T$, in order to obtain low jitter at the mark ends, together with correction of the mark length by 1 T. Further, according to a study by the present inventors, it has been found also that when $\alpha_m'=\alpha_m+\Delta_m$, $\Delta_m$ is preferably within a range of $0<\Delta_m\leq 1$ rather than being accurately 1. Further, it has been found that $\Delta_1$, $\Delta_{m-1}$ and $\beta_m'$ are preferably at most 1, also when $\beta_1'=\beta_1+\Delta_1$, $\beta_{m-1}'=\Delta_{m-1}+\Delta_{m-1}$ and $\beta_m'=\beta_m+\Delta_m'$.

In this way, a difference of mark length T will be imparted depending upon whether n is an even number or an odd number with the same division number m, and specifically, the following two methods may be mentioned.

Recording Pulse Division Method II

This recording pulse division method is a method wherein in the "Recording pulse division method I", when m is 3 or more, with the same division number m, for a record mark of n=2m and a record mark of n=2m+1, $\alpha_m\neq\alpha_m'$ and $\beta_1\neq\beta_1'$, and at least one set selected from $(T_{d1}, T_{d1}')$, $(\alpha_1$ and $\alpha_1')$, $(\Delta_{m-1}$ and $\Delta_{m-1}')$ and $(\beta_m$ and $\beta_m')$ takes different values.

Specifically, with the same division number m, $\Delta_{m-1}+\alpha_m'+\beta_m'$) in a case where n is an odd number is made larger than $(\beta_{m-1}+\alpha_m+\beta_m)$ in a case where n is an even number, and at the same time, $\beta_1'$ in a case where n is an odd number is preferably made to be larger than $\beta_1$ in the case where n is an even number.

Namely, $\alpha_m'=\alpha_m+\beta_m$, and at the same time, $\beta_1'>\beta_1$ and $\beta_1'=\beta_1+\Delta_1$. Here, $\Delta_m$ is larger than 0, preferably at least 0.2 and on the other hand, at most 1, preferably at most 0.7, more preferably at most 0.6. Further, $\Delta_1$ is larger than 0, preferably at least 0.2 and on the other hand, at most 1, preferably at most 0.7, more preferably at most 0.6.

More specifically, it is preferred that $\beta_1'=\beta_1+\Delta_1$ (where $0<\Delta_1\leq 1$), $\beta_{m-1}'+\alpha_m'=\beta_{m-1}+\Delta_{m-1}+\alpha_m\Delta_m=\beta_{m-1}+\alpha_m+\Delta_{mm}$ ($\Delta_{mm}=0.2$ to 1). The upper limit of the value for $\Delta_1$ and $\Delta_{mm}$ is preferably at most 1, and $\Delta_1$ is particularly preferably made to be a value of from 0.2 to 0.7, more preferably from 0.3 to 0.6. Among them, in $\beta_{m-1}'=\beta_{m-1}+\Delta_{m-1}$ and $\alpha_m'=\alpha_m+\Delta_m$, 0 to 1 is allocated to each of $\Delta_{m-1}$ and $\Delta_m$, but the upper limits of $\Delta_{m-1}$ and $\Delta_m$ are preferably at most 0.7, more preferably at most 0.6. Further, $\Delta_{m-1}+\Delta_m+\Delta_m'$ is preferably from 0.2 to 1.2.

Particularly when m is 3 or more, it is preferred that $T_{d1}'=T_{d1}$, $\alpha_1'=\alpha_1$, $\beta_1'=\beta_1+\Delta_1$ ($0<\Delta_1\leq 1$), $\beta_{m-1}'=\beta_{m-1}+\Delta_{m-1}$ ($\Delta_{m-1}=0$ to 1), $\alpha_m'=\alpha_m+\Delta_m$ ($0<\Delta_{m-1}$), $\Delta_{mm}=\Delta_{m-1}+\beta_m'$, and $0<\Delta_{mm}\leq 1$. Here, it is preferred that $\Delta_1$ and $\Delta_{mm}$ are made to have a value of from 0.2 to 0.7. It is preferred that $\Delta_{m-1}$ is made to have a value of from 0 to 0.7, and $\Delta_m$ is made to have a value of from 0.2 to 0.7.

To simplify the pulse-generating circuit, it is preferred that $\beta_1+\alpha_2$ and $\beta_{m-1}+\alpha_m$ take a value within a range of from 1.7 to 2.3, and particularly preferably, $\beta_1+\alpha_2=2$, and $\beta_{m-1}+\alpha_m=2$.

Further, it is preferred that $\alpha_m=\alpha c$. Further, it is preferred that $\alpha_1=\alpha_1'$, and further, $\alpha_1=\alpha_1'=\alpha c$, with a view to reducing the number of variable parameters.

Here, when m=2 (n=4 or 5), m-1=1, hence section $(\beta_1+\alpha_2)T$ may be regarded as section $(\beta_{m-1}+\alpha_m)T$. In such a case, $(\beta_1'+\alpha_2')$ T of 5 T mark is made longer by about 1 T than $(\beta_1+\alpha_2)$ T of 4 T mark. More specifically, it is preferred that $\alpha_1$, $\alpha_1'$, $\alpha_2$, $\alpha_2'$, $\beta_2$ and $\beta_2'$ are, respectively, made to be equal to $\alpha_1$, $\alpha_1'$, $\alpha_m$, $\alpha_m'$, $\beta_m$ and $\beta_m'$ in a case where m is 3 or more, and $\beta_1$ made to be equal to either $\beta_1$ or $\beta_{m-1}$ at any m in a case where m is 3 or more, and $\beta_1'$ is made to be equal to either $\beta_1'$ or $\beta_{m-1}'$ at any m in a case where m is 3 or more. It is preferred that the respective values of $\alpha_1$, $\alpha_1'$, $\alpha_2$, $\alpha_2'$, $\beta_2$ and $\beta_2'$ when m=2 are made to be equal to $\alpha_1$, $\alpha_1'$, $\alpha_3$, $\alpha_3'$, $\beta_3$ and $\beta_3'$ in a case where m=3, $\beta_1$ is made to be equal to $\beta_1$ or $\beta_2$ in a case where m=3, and $\beta_1'$ is made to be equal to either $\beta_1'$ or $\beta_2'$ in a case where m=3 or more. Particularly preferably, $\alpha_1$, $\alpha_1'$, $\beta_1$, $\beta_1'$, $\alpha_2$, $\alpha_2'$, $\beta_2$ and $\beta_2'$ in a case where m=2 are, respectively, made to be equal to $\alpha_1$, $\alpha_1'$, $\beta_2$, $\beta_2'$, $\alpha_3$, $\alpha_3'$, $\beta_3$ and $\beta_3'$ in a case where m is 3.

However, in any case relating to m=2, with respect to $\beta_2'$, fine adjustment is further allowable within a range of ±0.5. Thus, when n=4 or 5, those capable of taking values different from a case where m is 3 or more, are three parameters of $T_{d1}$, $T_{d1}'$ and $\beta_2'$.

Further, when m=1 (n=3), recording light irradiation comprising a pair of writing power irradiation section $\alpha_1'T$ and bias power irradiation section $\beta_1'T$, is carried out. In such a case, it is preferred that $\alpha_1'$ is made to be larger by from about 0.1 to 1.5 than $\alpha_1'$ in a case where m is 3 or more, and $\beta_1'$ is made to be smaller than $\beta_1'$ and larger than $\beta_m$ and $\beta_m'$ in a case where m is 3 or more. Otherwise, it is also preferred that $\alpha_1'$ is made to be from 1 to 2 times of $\alpha_1'$ in a case where m is 3 or more.

As another specific method,

Recording Pulse Division Method III

This recording pulse division method is one wherein in the "Recording pulse division method I", when m is 3 or more, with the same division number m, for a record mark of n=2m and a record mark of n=2m+1, $\alpha_m\neq\alpha_m'$, $T_{d1}=T_{d1}'$, $\alpha_1=\alpha_1'$ and $\beta_1=\beta_1'$, and at least one set selected from $(\beta_{m-1}$ and $\beta_{m-1}')$ and $(\beta_m$ and $\beta_m')$ takes different values. Already in the "Recording pulse division method I", $\beta_{i-1}+\alpha_i=\beta_{i-1}'+\alpha_i'=\beta_c+\alpha_c$ (i=2 to m-1), and accordingly, by setting $T_{d1}=T_{d1}'$, $\alpha_1=\alpha_1'$ and $\beta_1=\beta_1'$, it is possible to synchronize all recording pulse and off-pulse sections up to the start time of the off-pulse section $\beta_{m-1}T$ and $\beta_{m-1}'T$ with respect to an even number mark and an odd number mark, whereby the recording pulse-generating circuit can be simplified to a large extent.

Namely, when m is 3 or more, with the same division number m, about 1 is added to $(\beta_{m-1}+\alpha_m+\beta_m)$ in a case where n is an even number to obtain $(\beta_{m-1}'+\alpha_m'+\beta_m')$ in a case where n is an odd number. About 1 to be added to the above $(\beta_{m-1}+\alpha_m+\beta_m)$ is preferably a value within a range of from 0.5 to 1.5, more preferably a value within a range of from 0.5 to 1.2. Among them, to $\beta_{m-1}$ and $\beta_m$, a value of at least 0 and at most 1 is given and to $\alpha_m$, a value larger than 0 and at most 1 will be given, but it is more preferred that the upper limits of the values given to $\beta_{m-1}$ and $\alpha_m$ are at most 0.6. If it is attempted to carry out correction of a mark length of 1 T solely by $\alpha_m$, the rear end jitter is likely to be high, and at least either $\beta_{m-1}$ or $\beta_m$ is corrected together with $\alpha_m$. Here, as explained in the Recording pulse division method I, $\alpha_2'=\alpha_2=\alpha c$, hence $\beta_1'+\alpha_2'=\beta_1+\alpha_2$.

Namely, when m is 3 or more, it is preferred that $\beta_{m-1}'=\beta_{m-1}+\Delta_{m-1}$ ($\Delta_{m-1}=0$ to 1), $\alpha_m'=\alpha_m+\Delta_m$ ($0<\Delta_m\leq 1$), $\beta_m=\beta_m+\Delta_m'$ ($\Delta_m'=0$ to 1) and $\Delta_{mm}+\beta_m'=\beta_m'+\beta_m+\Delta_m'=0.5$ to 1.5, more preferably 0.5 to 1.2.

$\beta_1+\alpha_2=\Delta_1'+\alpha_2'$ and $\beta_{m-1}+\alpha_m$ preferably take values within a range of from 1.5 to 2.5, as mentioned above, and more preferably take values within a range of from 1.7 to 2.3. It is particularly preferred that $\beta_1+\alpha_2=2$, and $\beta_{m-1}+\alpha_m=2$.

Here, when m=2 (n=4 or 5), m−1=1, and accordingly, section $(\Delta_1+\alpha_2)T$ may be regarded as section $(\beta_{m-1}+\alpha_m)T$. In such a case, $(\beta_1+\alpha_2)T$ of 5 T mark is made longer by about 1 T than $(\beta_1+\alpha_2)T$ of 4 T mark. More specifically, it is preferred that $\alpha_1$, $\alpha_1'$, $\beta_1$, $\beta_1'$, $\alpha_2$, $\alpha_2'$, $\beta_2$ and $\beta_2'$ are, respectively, made to be equal to $\alpha_1$, $\alpha_1'$, $\beta_{m-1}$, $\beta_{m-1}'$, $\alpha_m$, $\alpha_m'$, $\beta_m$ and $\beta_m'$ at any m which is 3 or more.

However, with respect to $\alpha_2$, $\alpha_2'$, $\beta_2$ and $\beta_2'$ where m=2, fine adjustment of the value may further be carried out within a range of ±0.2, but necessity for such adjustment is small. Particularly preferred is that $\alpha_1$, $\alpha_1'$, $\beta_1$, $\beta_1'$, $\alpha_2$, $\alpha_2'$, $\beta_2$ and $\beta_2'$ where m=2, are made to be equal to $\alpha_1$, $\alpha_1'$, $\beta_2$, $\beta_2'$, $\alpha_3$, $\alpha_3'$, $\beta_3$ and $\beta_3'$ where m=3, respectively.

Further, when m=1 (n=3), again, recording laser beam irradiation comprising a pair of writing power irradiation section $\alpha_1'T$ and bias power irradiation section $\beta_1'T$, is carried out. In such a case, $\alpha_1'$ is preferably made to be larger by from about 0.1 to 1.5 than $\alpha_1'$ where m is 3 or more. Otherwise, $\alpha_1'$ is preferably made to be from 1 to 2 times of $\alpha_1'$ where m is 3 or more.

As described above, in the "recording pulse division method III", when m is 3 or more, $\beta_1'=\beta_1$, and about 1 is added to $(\beta_{m-1}+\alpha_m+\alpha_m)$ in the case where n is an even number to obtain $(\beta_{m-1}'+\alpha_m'+\beta_m')$ in the case where n is an odd number, with the same division number m. In order to add the above 1, in addition to setting $\alpha_m'=\alpha_m+\Delta_m$, three cases are conceivable i.e. a case where m−1'=$\beta_{m-1}+\Delta_{m-1}$, a case where $\beta_m=\beta_m+\Delta_m'$ and a case $\beta_{m-1}'=\beta_{m-1}+\Delta_{m-1}$ and $\beta_m=\beta_m\Delta_m'$. Among them, in a case where recording is carried out at a linear velocity slower than the upper limit of the recordable linear speed, it is preferred that firstly $\beta_m=\beta_m+\Delta_m'$ is set so that correction of $\beta_m$ is given priority over correction of $\beta_{m-1}$. The reason will be given below.

Namely, when recording is carried out on a recording medium of the present invention at a linear velocity lower than the upper limit of the overwritable linear velocity, a correction of $\alpha_m'>\alpha_m$ presents a substantial influence over the cooling process of the rear end of a mark. Accordingly, the correction value $\beta_m'$ for $\beta_m$ is preferably corrected to be $\beta_m'=\beta_m+\Delta_m'$ ($\Delta_m'=0$ to 1). For example, this applies to a case where recording is carried out at less than 24-times velocity on a CD-RW medium of the present invention overwritable at 24-times velocity or a case where recording is carried out at less than 8-times velocity on a RW-DVD medium of the present invention overwritable at 8-times velocity, and is useful in a case where the after-mentioned CAV or P-CAV recording is carried out. In such a case, it is preferred to give priority to $\beta_m'>0$ over $\Delta_{m-1}$.

In the recording pulse division methods (I), (II) and (III), $\alpha_i$ and $\beta_i$ can, respectively, be optimized with respect to the respective mark lengths, but for simplification of the pulse-generating circuit, they are preferably made to have constant values as far as possible.

Firstly, with respect to intermediate recording pulses present in a case where m is 3 or more, it is preferred that $\alpha_i$ and $\alpha_i'$ (i=2 to m−1) are made to be constant with a value $\alpha c$ irrespective of i and n. Then, the forefront pulse parameters $\alpha_1$ and $\alpha_1'$ can be made to have constant values irrespective of an even number length mark or an odd number length mark with m being at least 2, or at least with m being at least 3. That is $\alpha_1'=\alpha_1$, and $\alpha_1$ is preferably made to have a constant value irrespective of m. In such a case, again, it is preferred that $T_{d1}=T_{d1}'$ is also constant at least with m being at least 3.

With respect to $\alpha_m$ and $\alpha_m'$, they are different for an even number length mark and an odd number length mark with the same m, but with m being at least 3, more preferably with m being at least 2, irrespective of m, $\alpha_m$ for an even number length mark is made to be constant, and $\alpha_m'$ for an odd number length mark can be made to be constant. And, it is preferred that also $\alpha_m$ for an even number length mark is made to be $\alpha c$.

In addition to the foregoing, in the recording pulse division method (II), when m is at least 3, more preferably when m is at least 2, $\Delta_1$, $\Delta_{m-1}$ and $\Delta_m$ are, respectively, made to be constant. Accordingly, $\Delta_{mm}=\Delta_{m-1}+\Delta_m$ also becomes constant.

As described in the foregoing, if parameters not depending on m are taken into consideration, in the case of RW-DVD, even if a case where n=14 is to be added, it is required only to insert two pairs of $\alpha cT$ and $\alpha cT$, whereby the number of independent parameters is considered to be the same as in the case of CD-RW.

In summarizing the foregoing, the recording pulse division method (II) will be the following more simplified recording pulse division method.

Namely, with m being 3 or more (i.e. n being 6 or more), relations of $T_{d1}'=T_{d1}$, $\alpha_1'=\alpha_1$, $\beta_1+\alpha_2=1.5$ to 2.5, $\beta_{m-1}+\alpha_m=1.5$ to 2.5, $\beta_1'=\beta_1+\Delta_1$ ($0<\Delta_1\leq 1$), $\beta_{m-1}'=\beta_{m-1}+\beta_{m-1}$ ($\Delta_{m-1}=0$ to 1), $\alpha_m'=\alpha_m+\Delta_m$ ($0<\beta_m\leq 1$), $\Delta_{mm}=\beta_{m-1}+\Delta_m=0.2$ to 1, and $\beta_m'=\beta_m+\Delta_m'$ ($\Delta_m'=0$ to 1) are satisfied, and $T_{d1}$, $\alpha_1$, $\beta_1$, $\Delta_1$, $\alpha c$, $\beta_{m-1}$, $\Delta_{m-1}$, $\alpha_m$, $\Delta_m$, $\beta_m$ and $\beta_m'$ can be made constant irrespective of m when m is 3 or more.

Here, by setting $(T_{d1}+\alpha_1)T=(T_{d1}'+\alpha_1')T=2$ T especially with m being 3 or more, it is possible to synchronize the falling of each recording pulse $\alpha_iT$ with the clock period especially for an even number length mark, whereby the circuit can further be simplified. Here, for a mark wherein m is 3 or more (n is 6 or more), the following recording pulse division method (II-A) can be defined by 11 independent parameters of ($T_{d1}$, $\alpha_1$, $\beta_1$, $\Delta_1$, $\alpha c$, $\beta_{m-1}$, $\Delta_{m-1}$, $\alpha_m$, $\Delta_m$, $\beta_m$ and $\beta_m'$).

Namely, the recording pulse division method (II-A) is a recording method for a rewritable optical recording medium wherein:

between record marks, a laser beam having an erasing power Pe capable of crystallizing an amorphous phase is applied, and for a record mark of n=2m (where m is an integer of at least 2), of which the time length (n−j)T (where j is a real number of from −2.0 to 2.0) is divided into m sections of $\alpha_iT$ and $\beta_iT$ comprising $\alpha_1T$, 3 T, $\alpha_2T$, $\beta_2T$, . . . , $\alpha_mT$ and $\beta_mT$, provided that $\Sigma_i(\alpha_i+\beta_i)=n-j$ and for a record mark of n=2m+1 (where m is an integer of at least 2), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, . . . , $\alpha_m'T$ and $\beta_m'T$, provided that $\Sigma_i(\alpha_i'+\beta_i')=n-k$, a laser beam having a constant writing power Pw (provided that Pe/Pw=0.2 to 0.6) sufficient to melt the recording layer is applied within a time of $\alpha_iT$ and $\alpha_i'T$ (where i is an integer of from 1 to m), and a laser beam having a bias power Pb of Pb≦0.2Pe is applied within a time of $\beta_i T$ and $\beta_i' T$ (where i is an integer of from 1 to m); and when n=2m (m is at least 3), when the start time for nT mark is represented by $T_0$, after a delay time $T_{d1}T$ from $T_0$, $\alpha_1 T$, $\beta_1 T$ and $\alpha_2 T = \alpha c T$ are generated in this order, then, while maintaining generally period 2 T, $\beta_{i-1}T = \beta c T$ and $\alpha_i T = \alpha c T$ (i=3 to m−1, and αc and βc=2−αc are constant irrespective of i), are alternately generated in this order, and then, $\beta_{m-1}T$, $\alpha_m T$ and $\beta_m T$ are generated in this order, and when n=2m+1 (m is at least 3), when the start time for nT mark is represented by $T_0$, after a delay time $T_{d1}'T$ from $T_0$, $\alpha_1'T$, $\beta_1'T$ and $\alpha_2'T = \alpha c T$ are generated in this order, then, while maintaining generally period 2 T, $\beta c T = \beta_{i-1}'T$ and $\alpha c T = \alpha_i'T$ (i=3 to m−1) are alternately generated in this order, and then $\alpha_m'T$ and $\beta_m'T$ are generated in this order after $\beta_{m-1}'T$, and further when m is at least 3, with the same division number m, the relations of $T_{d1}'=T_{d1}$, $\alpha_1=\alpha_1'$, $\beta_1'=\beta_1+\Delta_1$ $(0<\Delta_1\leq 1)$, $\beta_{m-1}'=\beta_{m-1}+\Delta_{m-1}$ ($\Delta_{m-1}=0$ to 1), $\alpha_m'=\alpha c+\Delta_m$ $(0<\beta_m'-<1)$, $\Delta_{mm}=\Delta_{m-1}+\Delta_m$, $0<\Delta_{mm}\leq 1$, $\beta_m'=m+\Delta_m'(\Delta_m'=0$ to 1), are satisfied, and $T_{d1}$, $\alpha_1$, $\beta_1$, $\Delta_1$, αc, $\beta_{m-1}$, $\Delta_{m-1}$, $\alpha_m$, $\beta_m$, $\beta_m$ and $\beta_m'$ are constant irrespective of m.

Here, when m=2, $\alpha_1$, $\alpha_1'$, $\beta_1$, $\beta_1'$, $\alpha_2$, $\alpha_2'$, $\beta_2$ and $\beta_2'$ are preferably made to be equal to $\alpha_1$, $\alpha_1'$, $\beta_{m-1}$, $\beta_{m-1}'$, $\alpha_m$, $\alpha_m'$, $\beta_m$ and $\beta_m'$ in the case of m=3, respectively (provided that $\beta_2'$ may further be adjustable within a range of ±0.5).

The above-mentioned recording methods CD1-1 and 2-1 and DVD1-1 and 2-1 correspond to such recording pulse division method (II-A), wherein the ranges and relative degrees of various parameters are more restrictively defined.

In the above recording pulse division method (II-A), "maintaining generally period 2 T" represents $(\beta_{i-1}+\alpha_1)T=2$ T (i=2 to m) and $(\beta_{I-1}+\alpha_i')T=2$ T (i=3 to m−1) and not only means to allow an inevitable deviation from 2 T to realize an electronic circuit but also means to allow fine adjustment within a range of ±0.5 T with respect to $(\beta_1+\alpha_2)T$ and $(\beta_{m-1}+\alpha_m)T$.

Thus, with respect to mark lengths where m is 3 or more (n is 6 or more), the recording pulse division method can be defined by eleven independent parameters ($T_{d1}$, $\alpha_1$, $\beta_1$, $\Delta_1$, αc, $\beta_{m-1}$, $\Delta_{m-1}$, $\alpha_m$, $\beta_m$, $\beta_m$ and $\beta_m'$) and further, if $T_{d1}'$, $\alpha_1'$ and $\beta_1'$(total of 3 parameters) where n=3 and parameters of $T_{d1}$, $T_{d1}'$, $\alpha_2'$ and $\beta_2'$(total of 4 parameters) where m=2 (n=4 or 5) are defined, a recording pulse division method for forming all mark lengths of from 3 to 11 will be fixed. Further, if Pw and Pb take constant power levels at all sections, they may together with Pe define three types of writing power level values, and thus total of 21 independent parameters i.e. 11+3+4+3=21 may be defined.

Here, in the pulse division method (II-1), in order to more simplify designing of the control circuit (electronic circuit) to control laser beams (pulsed beams) for recording pulses and off-pulses of the recording pulse strategy, it is preferred to set that at least one formula among $T_{d1}+\alpha_1=2$, $\alpha_1=\alpha c$, $\beta_1+\alpha_2=2$, $\beta_{m-1}+\alpha_m=2$ and $\alpha_m=\alpha c$, is satisfied when m is at least 3.

When m is 3 or more (namely n=6 or more), it is preferred to set $T_{d1}+\alpha_1=2$, $\beta_1+\alpha_2=2$ and $\beta_{m-1}+\alpha_m=2$, whereby the falling of each recording pulse $\alpha_i T$ where i=1 to m can be synchronized to the clock period, and the circuit can be further simplified. In such a case, $T_{d1}'+\alpha_1'=2$. Further, it is preferred to set $\beta_1'+\alpha_2'=2.5$ i.e. $\beta_1'=\beta_1+0.5$, whereby the falling of each recording pulse $\alpha_i'T$ where i=1 to m−1 can be synchronized to a ½ period of the clock period; the number of independent parameters can be reduced to a large extent, and the circuit can be further simplified.

Independent parameters in this case include three parameters of the recording power levels, three parameters of $T_{d1}'$, $\alpha_1'$, and $\beta_1'$ where n=3, four parameters of $T_{d1}$, $T_{d1}'$, $\alpha_2'$ and $\beta_2'$ where n=4 or 5 and eight parameters of ($\alpha_1$, $\Delta_1$, αc, $\Delta_{m-1}$, $\alpha_m$, $\beta_m$, $\beta_m$ and $\Delta_m'$) where n is 6 or more in a total of 3+3+4+8=18 parameters, whereby determination of the parameters can be simplified. It is more preferred to set $T_{d1}+\alpha_1=T_{d1}'+\alpha_1'=2$ where m is 2 or more (n is 4 or more). In such a case, two parameters of $T_{d1}$ and $T_{d1}'$ where n=4 or 5 will become non-independent, whereby the number of independent parameters will be 16. It is further preferred to set a m=αc or $\alpha_1$=αc where m is 3 or more, whereby the number of independent parameters can further be reduced. If $\alpha_m=\alpha_1=\alpha c$, the number of independent parameters will be 14.

Namely, it is preferred that like in the case of m=3 or more, also when m=2, at least one of $T_{d1}+\alpha_1=T_{d1}'+\alpha_1'=2$, $\alpha_1=_1'$, $\beta_1+\alpha_2=2$ and $\alpha_2=\alpha c$ is satisfied.

Further, if, irrespective of whether $\alpha_m$, $\alpha_1$ and αc are equal or not, ratios of $\alpha_1/\alpha c$ and $\alpha_m/\alpha c$, or differences of $\alpha_1-\alpha c$ and $\alpha_m-\alpha c$ take predetermined values, $\alpha_1$ and $\alpha_m$ will be univocally determined once αc is determined, whereby the number of parameters can be reduced. In such a case, specifically, the ratios of $\alpha_1/\alpha c$ and $\alpha_m/\alpha c$ preferably take a value of 1 to 2. Further, the ratios of $\alpha_1/\alpha c$ and $\alpha_m/\alpha c$ may be mutually different so long as they are values within this range.

Further, if $\alpha_1>\alpha c$, there may be a case where the power required for recording can be reduced, and in such a case, it is advisable to positively differentiate $\alpha_1$ and αc.

Further, $\alpha_1'$ where n=3 may be set to be equal to $\alpha_1$ in a case where n=4 or more; or $\alpha_1'$ where n=3, and $\alpha_1$ or αc where n is 4 or more, may be set to have a constant ratio or difference.

On the other hand, in the recording pulse division method (III), it is preferred to employ the following simplified recording pulse division method. Namely, it is preferred that when m is at least 3 i.e. n is at least 6, the relations of $T_{d1}'=T_{d1}$, $\alpha_1'=\alpha_1$, $\beta_1'=\beta_1$, $\beta_{i+\alpha 2}=1.5$ to 2.5, $\beta_{m-1}+\alpha_m=1.5$ to 2.5, $\beta_{m-1}'=\beta_{m-1}+\Delta_{m-1}$ (where $\Delta_{m-1}=0$ to 1), $\alpha_m'=\alpha_m+\Delta_m$ (where $0<\Delta_m\leq 1$), $\Delta_{mm}+\beta_m'=\beta_{m-1}+\beta_m+\Delta_m'=0.5$ to 1.5 and $\beta_m'=\beta_m+\Delta_m'$(where $\beta_m'=0$ to 1), are satisfied, and when m is at least 3, $T_{d1}$, $\alpha_1$, $\beta_1$ and αc are constant irrespective of m. Further, it is preferred that $\Delta_{m-1}$, $\Delta_{m-1}$, $\alpha_m$, $\beta_m$ and $\Delta_m'$ are also set to be constant when m is at least 3. $\Delta_m$ may take two values of $\Delta_{m1}$ and $\Delta_{m2}$, but preferably $\Delta_{m1}=\Delta_{m2}$. Each of $\Delta_{m-1}$ and $\Delta_m'$is more preferably from 0 to 0.7, particularly preferably from 0 to 0.6. $\Delta_m$ is preferably larger than 0 and at most 0.7, more preferably larger than 0 and at most 0.6.

The following recording pulse division method (III-A) may be defined.

That is,

Recording Pulse Division Method (III-A)

This is a recording method for a rewritable optical recording medium wherein:

between record marks, a laser beam having an erasing power Pe capable of crystallizing an amorphous phase is applied, and for a record mark of n=2m (where m is an integer of at least 2), of which the time length (n−j)T (where j is a real number of from −2.0 to 2.0) is divided into m sections of $\alpha_i T$ and $\beta_i T$ comprising $\alpha_1 T$, $\beta_1 T$, $\alpha_2 T$, $\beta_2 T$, . . . , $\alpha_m T$ and $\beta_m T$, provided that $\Sigma_i(\alpha_i+\beta_i)=n-j$ and for a record mark of n=2m+1 (where m is an integer of at least 2), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, provided that $\Sigma_i(\alpha_i'+\beta_i')=n-k$, a laser beam having a constant writing power Pw (provided that Pe/Pw=0.2 to 0.6) sufficient to melt the recording layer is applied within a time of $\alpha_iT$ and $\alpha_i'T$ (where i is an integer of from 1 to m), and a laser beam having a bias power Pb of Pb≦0.2Pe is applied within a time of $\beta_iT$ and $\beta_i'T$ (where i is an integer of from 1 to m); and when n=2m (m is at least 3), when the start time for nT mark is represented by $T_0$, after a delay time $T_{d1}T$ from $T_0$, $\alpha_1T$, $\beta_1T$ and $\alpha_2T=\alpha cT$ are generated in this order, then, while maintaining generally period 2 T, $\beta_{i-1}T=\beta cT$ and $\alpha_iT=\alpha cT$ (i=3 to m−1, and $\alpha c$ and $\beta c=2-\alpha c$ are constant irrespective of i), are alternately generated in this order, and then, $\beta_{m-1}T$, $\alpha_mT$ and $\beta_mT$ are generated in this order, and when n=2m+1 (m is at least 3), when the start time for nT mark is represented by $T_0$, after a delay time $T_{d1}'T$ from $T_0$, $\alpha_1'T$, $\beta_1'T$ and $\alpha_2'T=\alpha cT$ are generated in this order, then, while maintaining generally period 2 T, $\beta cT=\beta_{i-1}'T$ and $\alpha cT=\alpha_i'T$ (i=3 to m−1) are alternately generated in this order, and then $\alpha_m'T$ and $\beta_m'T$ are generated in this order after $\beta_{m-1}'T$, and further when m is at least 3, with the same division number m, the relations of $T_{d1}'=T_{d1}$, $\alpha_1=\alpha_1'$, $\beta_1'=\beta_1$, $\beta_1+\alpha_2=1.5$ to 2.5, $\beta_{m-1}+\alpha_m=1.5$ to 2.5, $\beta_{m-1}=\beta_{m-1}+\Delta_{m-1}$ ($\Delta_{m-1}=0$ to 1), $\alpha_m'=\alpha_m+\Delta_m$ ($0<\beta_m\leq 1$), $\Delta_{m-1}+\Delta_m+\Delta_m'=0.5$ to 1.5, $\beta_m'=\beta_m+\beta_m'(\Delta_m'=0$ to 1), are satisfied, and $T_{d1}$, $\alpha_1$, $\beta_1$, $\alpha c$, $\beta_{m-1}$, $\Delta_{m-1}$, $\alpha_1$, $\beta_m$ and $\Delta_m'$ are constant irrespective of m (provided that $\Delta_m$ may take two values of $\Delta_{m1}$ and $\Delta_{m2}$ depending on m).

Here, when m=2, like in the recording pulse division method (III), $\alpha_1$, $\alpha_1'$, $\beta_1$, $\beta_1'$, $\alpha_2$, $\alpha_2'$, $\beta_2$ and $82'$ are preferably made to be equal to $\alpha_1$, $\alpha_1'$, $\beta_{m-1}$, $\beta_{m-1}'$, $\alpha_m$, $\alpha_m'$, $\beta_m$ and $\beta_m'$ in the case of m=3, respectively.

In the above recording pulse division method (III-A), "maintaining generally period 2 T" represents $(\beta_{i-1}+\alpha_1)T=2$ T (i=2 to m) and $(\beta_{I-1}'+\alpha_i')T=2$ T (i=3 to m−1) and not only means to allow an inevitable deviation from 2 T to realize an electronic circuit but also means to allow fine adjustment within a range of ±0.5 T with respect to $(\beta_1+\alpha_2)T$ and $(\beta_{m-1}+\alpha_m)T$.

Thus, with respect to mark lengths where m is 3 or more (n is 6 or more), the recording pulse division method can be defined by eleven independent parameters ($T_{d1}$, $\alpha_1$, $\beta_1$, $\alpha c$, $\beta_{m-1}$, $\Delta_{m-1}$, $\alpha_m$, $\Delta_{m1}$, $\Delta_{m2}$, $\beta_m$ and $\Delta_m'$), and further, if $T_{d1}$ or $T_{d1}'$ (total of 3 parameters) each at n=3, 4 and 5 and parameters of $\alpha_1'$ and $\beta_1'$ (total of 2 parameters) where m=3 are defined, a recording pulse division method for forming all mark lengths of from 3 to 11 will be fixed. Further, if Pw and Pb take constant power levels at all sections, they may together with Pe define three types of writing power level values, and thus total of 19 independent parameters i.e. 11+3+2+3=19 may be defined.

The above-mentioned recording methods CD1-2 and 2-2 and DVD1-2 correspond to such recording pulse division method (III-A), wherein the ranges and relative degrees of various parameters are more restrictively defined.

Here, in the pulse division method (III-1), in order to more simplify designing of the control circuit (electronic circuit) to control laser beams (pulsed beams) for recording pulses and off-pulses of the recording pulse strategy, it is preferred to carry out the following settings.

Firstly, $\Delta_m=\beta_{m1}=\beta_{m2}$ is set when m is at least 3.

Secondly, it is so set that at least one formula among $T_{d1}+\alpha_1=2$, $\alpha_1=\alpha c$, $\beta_1+\alpha_2=2$, $\beta_{m-1}+\alpha_m=2$ and $\alpha_m=\alpha c$, is satisfied when m is at least 3.

Particularly when m is 3 or more, it is preferred to set $T_{d1}+\alpha_1=2$ and $\beta_1+\alpha_2=2$, whereby the falling of each record-ing pulse $\alpha_iT$ and $\alpha_i'T$ where i=1 to m−1 can be synchronized to the clock period; the circuit can be further simplified; and the number of independent parameters can be reduced to a large extent. Further, $\beta_1=\beta_1'$ and $\alpha_2=\alpha_2'=\alpha c$, thus, if $\beta_1+\alpha_2=2$, $\beta_1'+\alpha_2'=2$ will be satisfied. Likewise, $T_{d1}=T_{d1}'$ and $\alpha_1=\alpha_1'$, thus, if $T_{d1}+\alpha_1=2$, $T_{d1}'+\alpha_1'=2$ will be satisfied.

Independent parameters in this case include three parameters of the recording power levels, three parameters of $T_{d1}'$, $\alpha_1'$, and $\beta_1'$ where n=3, two parameters of $T_{d1}$ and $T_{d1}'$ where n=4 or 5 and eight parameters of ($\alpha_1$, $\alpha c$, $\beta_{m-1}$, $\Delta_{m-1}$, $\alpha_m$, $\Delta_m$, $\beta_m$ and $\Delta_m'$) where m is 3 or more in a total of 3+3+2+8=16 parameters, whereby determination of the parameters can be simplified. It is further preferred to set $\beta_{m-1}+\alpha_m=2$ and $\alpha_m=\alpha c$, whereby the number of parameters can further be reduced by two to 14.

Or, if ratios of $\alpha_1/\alpha c$ and $\alpha_m/\alpha c$, or differences of $\alpha_1-\alpha c$ and $\alpha_m-\alpha c$ take predetermined values, $\alpha_1$ and $\alpha_m$ will be univocally determined once ac is determined, whereby the number of parameters can again be reduced, such being preferred. In such a case, specifically, the ratios of $\alpha_1/\alpha c$ and $\alpha_m/\alpha c$ preferably take a value of 1 to 2. Further, the ratios of $\alpha_1/\alpha c$ and $\alpha_m/\alpha c$ may be mutually different so long as they are values within this range.

Further, if $\alpha_1>\alpha c$, there may be a case where the power required for recording can be reduced, and in such a case, it is advisable to positively differentiate $\alpha_1$ and $\alpha c$.

Further, $\alpha_1'$ where n=3 may be set to be equal to $\alpha_1$ in a case where n=4 or more; or $\alpha_1'$ where n=3, and $\alpha_1$ or $\alpha c$ where n is 4 or more, may be set to have a constant ratio or difference.

It is more preferred to set $T_{d1}+\alpha_1=2$ for all m which is 2 or more. In such a case, two parameters of $T_{d1}$ and $T_{d1}'$ where n=4 or 5 will become non-independent, whereby the number of independent parameters will be 12.

Namely, it is preferred that like in the case of m=3 or more, also when m=2, at least one of $T_{d1}+\alpha_1=T_{d1}'+\alpha_1'=2$, $\alpha_1=\alpha_1'$, $\beta_1+\alpha_2=2$ and $\alpha_2=\alpha c$ is satisfied.

Here, as the simplest recording pulse division method, a recording pulse division method (III-B) which can be regulated only by 12 independent parameters ($\alpha_1$, $\alpha c$, $\Delta_{m-1}$, $\Delta_m$, $\beta_m$ and $\Delta_m'$ where n is at least 4, $T_{d1}'$, $\alpha_1'$ and $\beta_1'$ where n=3, and Pw, Pe and Pb), will be defined as follows.

That is,

Recording Pulse Division Method (III-B)

This is a recording method for a rewritable optical recording medium wherein:

between record marks, a laser beam having an erasing power Pe capable of crystallizing an amorphous phase is applied, and for a record mark of n=2m (where m is an integer of at least 2), of which the time length (n−j)T (where j is a real number of from −2.0 to 2.0) is divided into m sections of $\alpha_iT$ and $\beta_iT$ comprising $\alpha_1T$, $\beta_1T$, $\alpha_2T$, $\beta_2T$, ..., $\alpha_mT$ and $\beta_mT$, provided that $\Sigma_i(\alpha_i+\beta_i)=n-j$ and for a record mark of n=2m+1 (where m is an integer of at least 2), of which the time length (n−k)T (where k is a real number of from −2.0 to 2.0) is divided into m sections of $\alpha_i'T$ and $\beta_i'T$ comprising $\alpha_1'T$, $\beta_1'T$, $\alpha_2'T$, $\beta_2'T$, ..., $\alpha_m'T$ and $\beta_m'T$, provided that $\Sigma_i(\alpha_i'+\beta_i')=n-k$, a laser beam having a constant writing power Pw (provided that Pe/Pw=0.2 to 0.6) sufficient to melt the recording layer is applied within a time of $\alpha_iT$ and $\alpha_i'T$ (where i is an integer of from 1 to m), and a laser beam having a bias power Pb of Pb≦0.2Pe is applied within a time of $\beta_iT$ and $\beta_i'T$ (where i is an integer of from 1 to m); and when n=2m (m is at least 3), when the start time for nT mark is represented by $T_0$, after a delay time $T_{d1}T$ from $T_0$, $\alpha_i T$ is generated, then, while maintaining generally period 2 T, $\beta c T=\beta_{i-1}T$ and $\alpha c T=\alpha_i T$ (i=2 to m, and $\alpha c$ and $\beta c=2-\alpha c$ are constant irrespective of i), are alternately generated in this order, and then, $\beta_m T$ is generated in this order, and when n=2m+1 (m is at least 3), when the start time for nT mark is represented by $T_0$, after a delay time $T_{d1}'T$ from $T_0$, $\alpha_1'T$ is generated, then, while maintaining generally period 2 T, $\beta c T=\beta_{i-1}'T$ and $\alpha c T=\alpha_i'T$ (i=2 to m−1) are alternately generated in this order, and then $\alpha_m'T$ and $\beta_m'T$ are generated in this order after $\beta_{m-1}'T$, and further when m is at least 3, with the same division number m, the relations of $T_{d1}'=T_{d1}$, $T_{d1}+\alpha_1=2$, $\alpha_1=\alpha_1'$, $\beta_{m-1}'=\beta_{m-1}+\Delta_{m-1}$ ($\Delta_{m-1}=0$ to 1), $\alpha_m'=\alpha c+\Delta_m$ ($0<\Delta_m \leq 1$), $\Delta_{m-1}+\Delta_m+\Delta_m'=0.5$ to 1.5, $\beta_m'=\beta_m+\Delta_m'$ and $\Delta_m'=0$ to 1, are satisfied, and $\alpha c$, $\Delta_{m-1}$, $\Delta_m$, $\beta_m$ and $\Delta_m'$ are constant irrespective of m.

Here, when m=2, $\alpha_1$, $\alpha_1'$, $\beta_1$, $\beta_i'$, $\alpha_2$, $\alpha_2'$, $\beta_2$ and $\beta_2'$ are made to be equal to $\alpha_1$, $\alpha_1'$, $\beta_2(=\beta c)$, $\beta_2'(=\beta c+\Delta_{m-1})$, $\alpha_3$ ($=\alpha c$), $\alpha_3'(=a c+\beta_m)$, $\alpha_3$ and $\alpha_3'=(\beta_3+\Delta_m')$ in the case of m=3, respectively.

Here, in the recording pulse division method (III-B), it is more preferred to set $\alpha_1=\alpha_1'=\alpha c$ where m is at least 3, further where m is at least 2. Further, especially at about 20-times velocity to 32-times velocity of CD-RW (at 6-times velocity to 12-times velocity of RW-DVD), it is preferred to set $\Delta_m'=0$, i.e. when m is at least 3, $\beta_m'=\beta_m$. Further, it is more preferred to set $\beta_m'=\beta_m$ when m is at least 2.

Further, in recording pulse division method (III-A) or (III-B), it is possible to set either $\Delta_{m-1}$ or $\beta_m'$ to be zero or to set $\Delta_{m-1}=\beta_m$ and thereby to further reduce the number of parameters. It is a feature of the recording medium of the present invention that good characteristics can be obtained even if the number of parameters is reduced like this. And, among recording media of the present invention, an optical recording medium employing a GeSb type recording layer shows particularly distinct tendency for such good characteristics. Namely, by using an optical recording medium employing a GeSb type recording layer, the effect of the present invention can be most effectively obtained such that good high velocity recording characteristics can be realized by a simple recording pulse division method.

"Recording method CD1-3" or "Recording method DVD1-3" corresponds to this recording pulse division method (III-B) wherein $\alpha_1=\alpha_1'=\alpha c$, and in order to define characteristics of a recording medium within specific ranges and to secure recording interchangeability among a plurality of drives, the ranges of eleven independent parameters are particularly restrictively employed.

The above-described recording pulse division methods (III), (III-A) and (III-B) are most preferred in that the number of independent parameters is small, and it is possible to synchronize the falling of $\alpha_i T$ within i=1 to m and the falling of $\alpha_i'T$ within i=1 to m−1 to period 2 T. Referring to FIG. 5, by (III-B), recording of all mark lengths of n=3 to 11 will be possible by combining four types of gates G1 to G4 in a case where middle divided pulses are present as in the case where m is at least 3, by combining G1, G3 and G4 in the case where m=2 and by using G3 and G4 in the case where n=3 (m=1). It is thereby possible to constitute the system solely by a circuit wherein gates G1 and G2 are synchronized to period 2 T without requiring an additional delay circuit, whereby a pulse-generating circuit can be very simply constituted. Further, G1 and G3 to generate $\alpha_1$ and $\alpha_m$, are independent, and accordingly, $\alpha_1$ and $\alpha_m$ can be made to be values different from ac by a combination of the same gate circuits.

Thus, the recording pulse division methods (III), (III-A) and (III-B) can be realized by a simple circuit which can readily be synchronized with the reference clock period, as compared with any one of the recording methods specifically disclosed in JP-A-2002-331936. Especially the recording pulse division method (III-B) has a merit that good recording characteristics can be provided, even though the number of independent parameters is as small as 12.

The number of independent parameters being small means simplification of the recording pulse-generating circuit. Further, it is preferred that some or all of the above-mentioned independent parameters in the optimum recording pulse division method are preliminarily written in the rewritable optical recording medium, in a combination of the rewritable optical recording medium proposed by the present invention with a certain specific drive for recording, so that such parameter information is read out by the drive to generate optimum recording pulses to carry out recording, and in such a case, the work load to preliminarily find out the parameters to be written on the disk can be reduced, such being preferred.

Specifically, the recording pulse division information parameters which are particularly desired to be written in the divided recording pulse-generating methods (III-A) and (III-B), are the optimum writing power $Pw_o$, the optimum erasing power $Pe_o$, $T_{d1}'$, $\alpha_1'$ and $\beta_1'$ where n=3 and $T_{d1}$, $\alpha_1$, $\alpha c$, $\Delta_{m-1}$, $\beta_m$, $\beta_m'$ and $\beta_m$ where m is at least 3. $Pw_o$ and $Pe_o$ may be given as a ratio of $Pe_o$ to $Pw_o$ ($Pe_o/Pw_o$).

Further, it is effective that when the disk is inserted into the drive, with respect to some or all of such parameters, the values preliminarily written on the disk are used as initial values, and trial writing is carried out while letting the initial values change in their vicinities, whereupon the signals written by such trial writing are retrieved, whereby on the basis of $m_{11}$, the jitters, the error rate, etc., the optimum parameters in the combination of the disk and the drive are determined, whereby the interchangeability can be secured.

As described in the foregoing, it will be possible to record individual amorphous mark lengths accurately at a high linear velocity while suppressing jitter at their edges. However, this does not necessarily mean that space length between marks are accurate, whereby jitter is suppressed. Especially in high linear velocity recording, separation of mark jitter and space jitter is substantial, and there may be a case where space jitter is large on the high writing power Pw side.

In the pulse division methods (I), (II), (II-A), (III), (III-A) and (III-B), especially when n=3, it is necessary to independently determine values different from the parameters to be used in the pulse division method where n=4 or more. It is preferred that the recording pulse width $\alpha_1'T$ where n=3 takes a value larger than each of $\alpha_i T$ and $\alpha_i'T$ in the case where n is 4 or more. The reason for this is that it is necessary to form a 3 T mark length by a single recording pulse without the thermal storage effect by the subsequent plurality of recording pulse train. Namely, if $\alpha_1'=\alpha_{n=3}$ is too small when n=3, 3 T mark length is hardly obtainable, and if $\alpha_{n=3}$ is too large, the width of the mark in a direction perpendicular to the recording beam operation direction tends to be too wide, and the mark edges tend to be hardly erased when overwriting is carried out, although 3 T mark length may be obtained. Accordingly, in a case where $\alpha_1$ and $\alpha_1'$ where n is at least 4, take constant $\alpha_1=\alpha_1'=\alpha_{top}$, $\alpha_1'=\alpha_{n=3}$ where n=3, is preferably within a range of $\alpha_{n=3}/\alpha_{top}=1$ to 2, more preferably within a range of from 1 to 1.5.

Therefore, in order to further reduce 3 T space length jitter, it is preferred that in the pulse division methods (I), (II), (II-A), (III), (III-A) and (III-B), only $T_{d1}$ and $T_{d1}'$ where n=3, 4, 5 are preferably made to have values different from constant $T_{d1}$ and $T_{d1}'$ at other n.

Specifically, when $T_{d1}'$ at n=3, 5 is represented by $T_{d1a}$ and $T_{d1c}$, respectively, $T_{d1}$ at n=4 is represented by $T_{d1b}$, and $T_{d1}$ and $T_{d1}'$ at n being at least 6 are represented by $T_{d1d}$, it is preferred that at least one of $T_{d1a}$, $T_{d1b}$ and $T_{d1c}$ has a value different from $T_{d1d}$.

More preferably, when $T_{d1}$ and $T_{d1}'$ where n is at least 6 are made to have a constant value $T_{d1d}$, $T_{d1}'$ at n=3, 5 is made to be $T_{d1a}$ and $T_{d1c}$, respectively, and $T_{d1}$ at n=4 is made to have $T_{d1b}$, $T_{d1a} < T_{d1b} \leq T_{d1c} \leq T_{d1d}$.

In the recording pulse division methods (II), (II-A), (III), (III-A) and (III-B), it is particularly effective to make $T_{d1}'$ and $T_{d1}$ at n=3, 4, 5 to be different from $T_{d1}$ in the case where n is at least 6, whereby the recording power margin for space length jitter, particularly 3 T space length jitter, can be improved by the simplest pulse-generating circuit.

In some cases, while on the basis of the recording pulse division method (I), it is necessary to simplify it by reducing the number of independent parameters on one hand, it will be necessary to finely adjust the recording pulse division method to form $n_0 T$ mark depending upon the combination of the preceding and succeeding record marks $n_1 T$ and $n_2 T$, and further upon the combination of space length $n_1 T$ between $n_1 T$ mark and $n_0 T$ mark and space length $n_{2sT}$ between $n_0 T$ mark and $n_2 T$ mark, in recording specific $n_0 T$ mark, taking into consideration the influence of the remaining heat due to heat diffusion from the preceding and succeeding record marks.

Here, in CD, $n_0$, $n_1$, $n_2$, $n_{1s}$ and $n_{2s}$ are any one of integers 3 to 11. Further, in DVD, $n_0$, $n_1$, $n_2$, $n_{1s}$ and $n_{2s}$ are any one of integers represented by n=3 to 11 and 14.

Also in this case, it is preferred to finely adjust especially ($T_{d1}$, $\alpha_1$, $\alpha_m$, $\beta_m$) among the above-mentioned parameters for defining the recording pulse division method to form $n_0 T$ mark depending upon the combination of ($n_1$, $n_{1s}$, $n_0$, $n_{2s}$ and $n_2$). Further, in recording of $n_0 T$ mark, reference may be made to some of ($n_1$, $n_{1s}$, $n_0$, $n_{2s}$ and $n_2$).

Further, the thermal interference becomes distinct in a case where space lengths are short. Accordingly, only when $n_{1s}$ and $n_{2s}$ are 3, ($T_{d1}$, $\alpha_1$, $\alpha_m$ and $\beta_m$) may be different from a case where $n_{1s}$ and $n_{2s}$ take other values. It is especially effective and preferred to adjust ($T_{d1}$ and $\beta_m$).

In the above-described recording method, good overwriting can be carried out while ensuring interchangeability with the CD-RW standards. Namely, the signal characteristics after overwriting EFM modulation signals, can maintain such a record quality that the above-mentioned modulation $m_{11}$ is at least 60%; interchangeability with CD is secured in the vicinity of asymmetry being 0; further, jitters of the respective marks and between marks (spaces) of retrieving signals are at most 35 nsec (at the time of retrieving at 1-time velocity); and the mark lengths and between marks have lengths of substantially nT×V (where T is the reference clock period of data, n is an integer of from 3 to 11, and V is a linear velocity at the time of retrieving). This means that retrieving can practically be carried out at a low error rate by a commercially available CD-ROM drive capable of retrieving CD-RW disks.

Further, in the above-mentioned recording method, good overwriting can be carried out while ensuring interchangeability with RW-DVD standards. Namely, the signal characteristics after overwriting EFM+ modulation signal can maintain such a record quality that the above-mentioned modulation $m_{14}$ is at least 55%; interchangeability with DVD can be secured in the vicinity of asymmetry being 0; and further jitter of retrieved signals is at most 15% (at the time of retrieving at 1-time velocity) or even at most 10%. This means that retrieving can practically be carried out at a low error rate by a commercially available DVD-ROM drive capable of retrieving RW-DVD disks.

5. Regarding the Recording Method at a Plurality of and In a Wide Range of Linear Velocities Now, the recording method according to the fourth aspect of the present invention will be described.

The medium of the present invention as a rewritable optical recording medium can be excellently retrieved by a conventional system capable of retrieving CD-RW at least in case of an optional linear velocity from a lower limit of 8 or 10-times velocity to an upper limit of a high linear velocity of 24 or 32-times velocity, if its recording method is set. Simultaneously the compatibility of medium and drive can be carried out easily.

And, if the above-mentioned divided recording pulse generation method (II) or (III) is employed, the optimum divided recording pulse strategy can easily be found by setting the switching period of recording pulses to be constant generally at 2 T and changing the duty ratio of $\alpha_i$ to $\beta_i$ (and $\alpha_i'$ to $\beta_i'$) (where i=1 to m−1), even when the same medium is used at different linear velocities.

In such a case, at any linear velocity, it is common to employ a pulse division method as shown in FIG. 5 wherein writing power Pw and bias power Pb are alternatively applied to form a mark having length nT. However, the optimum values of parameters determining its specific system usually vary depending upon the linear velocity. Therefore, with the medium of the present invention, it is preferred to preliminarily record on the medium the optimum writing power $Pw_0$, the optimum erasing power $Pe_0$ and the optimum bias power $Pb_0$ corresponding to the recording linear velocity, or at least one of pulse division information such as $\alpha_i$ (i is at least one of from 1 to m), $\beta_i$ (i is at least one of from 1 to m), the division number m, etc.

And, on the basis of the recording pulse division method (I), the recording pulse division method (IV) is applied.

Recording Pulse Division Method (IV)

This is an optical recording method employing the above-mentioned recording pulse division method (I), wherein the rewritable optical recording medium is a circular disk, and recording is carried out at a plurality of recording linear velocities while controlling the recording linear density to be constant so that it will be the same as in a disk CLV-recorded at 1-time reference velocity, in the same disk plane, and $\alpha_i = \alpha_{imax}$ (where i=1 to m) at the maximum linear velocity $V_{max}$ is from 0.5 to 2, and $\alpha_i' = \alpha_{imax}'$(where i=1 to m) at the $V_{max}$ is from 0.5 to 2, and $\alpha_i$ and $\alpha_i'$(where i=1 to m) are permitted to simply decrease as the linear velocity lowers.

A recording pulse division method may be defined in a similar manner also for each of (II), (II-A), (III), (III-A) and (III-B) derived from the recording pulse division method (I). The following "Recording pulse division method (V)" is a case where the recording pulse division method (II) is employed in the recording pulse division method (IV).

Further, in the following description, with respect to the reference linear velocity of 1-time velocity, the maximum linear velocity $V_{max}$ and the minimum linear velocity $V_{min}$, the respective values are differentiated between CD-RW and RW-DVD unless otherwise specified.

Namely, the reference linear velocity $V_1$ of 1-time velocity is from 1.2 m/s to 1/4 m/s in the case of CD-RW, and 3.49 m/s in the case of RW-DVD.

Further, the maximum linear velocity $V_{max}$ is, in the case of CD-RW, a linear velocity within a range of from 20 to 32-times velocity of the above-mentioned reference linear velocity of CD-RW, particularly 20, 24 or 32-times velocity. In the case of RW-DVD, it is a linear velocity in the range of from 4 to 12-times velocity of the above-mentioned reference linear velocity of RW-DVD, particularly 4, 5, 6, 8, 10 or 12-times velocity.

Likewise, the minimum linear velocity $V_{min}$ is, in the case of CD-RW, a linear velocity of at most about 22-times velocity, and in the case of RW-DVD, a linear velocity of at most about 7-times velocity. As a matter of course, when $V_{max}$ and $V_{min}$ are used in a pair, they are selected from a linear velocity range where $V_{max} > V_{min}$.

Accordingly, in the following description, when CD-RW is expected, the above-described values for CD-RW will be used as the reference linear velocity of 1-time velocity, $V_{max}$ and $V_{min}$, and when RW-DVD is expected, the above-described values for RW-DVD will be employed as the reference linear velocity of 1-time velocity, $V_{max}$ and $V_{min}$.

Recording Pulse Division Method (V)

This is an optical recording method employing the above-mentioned recording pulse division method (II), wherein the rewritable optical recording medium is a circular disk, and recording is carried out at a plurality of recording linear velocities while controlling the recording linear density to be constant so that it will be the same as in a disk CLV-recorded at 1-time reference velocity in the same disk plane, wherein $\alpha_i = \alpha_{imax}$ (where i=1 to m) at the maximum linear velocity $V_{max}$ is from 0.5 to 2, and $\alpha_i' = \alpha_{imax}'$ (where i=1 to m) at the $V_{max}$ is from 0.5 to 2, and $\alpha_i$ and $\alpha_i'$ (where i=1 to m) are permitted to monotonically decrease as the linear velocity lowers.

Further, a case wherein the recording pulse division method (II-A) is employed in the above recording pulse division method (V), will be designated as a recording pulse division method (V-A).

Further, a case wherein the recording pulse division method (III) is employed in the recording pulse division method (IV), will be designated as a recording pulse division method (VI) as follows.

Recording Pulse Division Method (VI)

This is an optical recording method employing the above-mentioned recording pulse division method (III), wherein the rewritable optical recording medium is a circular disk, and recording is carried out at a plurality of recording linear velocities while controlling the recording linear density to be constant so that it will be the same as in a disk CLV-recorded at 1-time reference velocity in the same disk plane, wherein $\alpha_i = \alpha_{imax}$ (where i=1 to m) at the maximum linear velocity $V_{max}$ is from 0.5 to 2, and $\alpha_i' = \alpha_{imax}'$ (where i=1 to m) at the $V_{max}$ is from 0.5 to 2, and $\alpha_i$ and $\alpha_i'$ (where i=1 to m) are permitted to monotonically decrease as the linear velocity lowers.

Here, a case wherein the recording pulse division method (III-A) is employed in the above recording pulse division method (VI), will be designated as a recording pulse division method (VI-A). Further, a recording pulse division method wherein the recording pulse division method (III-B) is employed in the above recording pulse division method (VI) will be designated as a recording pulse division method (VI-B).

Further, in each of the above recording pulse division methods (IV), (V) and (VI), "permitted to monotonically decrease" means that when $\alpha_i$ at the minimum linear velocity $V_{min}$ to carry out overwriting is represented by $\alpha_{imin}$ (i=1 to m), $\alpha_{imin} < \alpha_{imax}$ is satisfied with respect to all n and i. However, at an intermediate linear velocity between $V_{min}$ and $V_{max}$, $\alpha_i$ may sometimes be constant irrespective of the linear velocity, but, as a standard rule, it takes a smaller value at a lower linear velocity.

Further, the comparison of "large" or "small" of $\alpha_1$ is carried out with respect to individual $\alpha_i$ where i=1 to m for the same n.

At $V_{max}$, $\alpha_{imax}$ and $\alpha_{imax}'$ are set to be about 1, more specifically from 0.8 to 1.5. Especially with respect to i=2 to m-1, $\alpha_{imax}$ and $\alpha_{imax}'$ are preferably within a range of from 0.8 to 1.2. Namely, at $V_{max}$, $\Sigma_i(\alpha_{imax})$ and $\Sigma_i(\alpha_{imax}')$ are desired to be about n/2 or a value smaller than n/2.

And, $\alpha_{imin}$ is desired to take a value smaller than $\alpha_{imax}$ within a range of $\eta_0(V_{min}/V_{max})\alpha_{imax}$, where $\eta_0=0.8$ to 1.5, and at an intermediate linear velocity between $V_{min}$ and $V_{max}$, $\alpha_i$ takes a value between such $\alpha_{imin}$ and $\alpha_{imax}$. More preferably, $\eta_0$ is within a range of from 1 to 1.3.

The same applies to $\alpha_i'$, $\alpha_{imin}'$ and $\alpha_{imax}'$ (i=1 to m) Accordingly, $\Sigma_i(\alpha_i)$ and $\Sigma_i(\alpha_i')$ will monotonically decrease as the linear velocity lowers.

Further, also when n=3, $\alpha_1'$ is set to monotonically decrease as the linear velocity lowers. On the other hand, $T_{d1}'$ and $\beta_1'$ are permitted to monotonically increase as the linear velocity lowers.

Here, "controlling the recording linear density to be constant" means that VT is constant, where V is the recording linear velocity, and T is the reference clock period at that time. Further, "controlling the recording linear density to be constant" means to set $VT=V_1T_1$ where $T_1$ is the reference clock period at the reference linear velocity $V_1$ i.e. 1-time velocity. Thus, retrieving by the same retrieving system as for CD will be possible in a case where retrieving is carried out at a constant linear velocity irrespective of the degree of the linear velocity at the time of recording. Here, VT is permitted to have a deviation from $V_1T_1$ to such an extent as allowable from the nature of the retrieving circuit for CD, i.e. usually a deviation at a level of ±5%.

Further, for CD-RW, it is preferred to set 1-time velocity to be 1.2 m/s, whereby the physical length of a mark can be made small, and the recording linear density can be increased. In such a case, a capacity of from 650 to 700 MB can be accomplished.

To simplify the pulse-generating circuit, it is preferred that at each m, $T_{d1}+\alpha_1$, $\beta_{i-1}+\alpha_1$, $T_{d1}'+\alpha_1'$, and $\beta_{i-1}'+\alpha_i'$(i=1 to m, at least i=3 to m-2) are substantially constant irrespective of the linear velocity. Especially for a mark of m being at least 3, they are preferably constant except for inevitable fluctuation by the nature of the electronic circuit.

Specifically, within a linear velocity range of from $V_{min}$ to $V_{max}$, it is preferred that when m is at least 3, $T_{d1}+\alpha_1$, $T_{d1}'+\alpha_1'$, $\beta_{i-1}+\alpha_i=2$, and $\beta_{i-1}'+\alpha_i'=2$ (i=3 to m-1) are, respectively, constant irrespective of the linear velocity.

Especially when the recording pulse division method (VI-B) corresponding to the recording pulse division method (III-B) is employed, it is particularly preferred to set $T_{d1}+\alpha_1=T_{d1}'+\alpha_1'=2$ at any linear velocity and to set $\beta_{i-1}+\alpha_i$ where i=2 to m to be constant at 2 and to set $\beta_{i-1}'+\alpha_i'$ where i=2 to m-1 to be constant at 2 and to set $\beta_{i-1}'+\alpha_i'$ where i=2 to m-1 to be constant at 2. By such a setting, it will be possible to synchronize $\beta_{i-1}+\alpha_i$ ($\beta_{i-1}'+\alpha_i'$) where i=2 to m-1 with 2 T period. This means that in FIG. 5, the system can be constituted solely by a circuit having gates G1 and G2 synchronized with period 2 T. And, even if T is made to be variable depending upon the linear velocity, it is possible to obtain a recording pulse strategy capable of accommodating any linear velocity simply by changing only the duty ratio of $\alpha_i$ at G1 and G2, whereby it will be possible to simplify the design of the control circuit (electronic circuit) to generate laser beams (pulsed beams) for recording pulses and off-pulses of the recording pulse strategy.

On the other hand, $\beta_m$ and $\beta_m{}'$ are usually within a range of from 0 to 2 and permitted to monotonically increase as the linear velocity lowers. The meaning of "monotonically increase" is the same as in the case of "monotonically decrease" with respect to the above-mentioned $\alpha_i$ and $\alpha_i{}'$, and at an intermediate linear velocity between $V_{min}$ and $V_{max}$, $\beta_m$ and $\beta_m{}'$ may sometimes be constant irrespective of the linear velocity, but as a standard rule, it should take a larger value at a lower linear velocity.

Like $\beta_m$, $\beta_m{}'$ may be within a range of from 0 to 2. However, in the case of n=3 at a low linear velocity of at most about 16-times velocity in the case of CD-RW, $\beta_m$ and $\beta_m{}'$ are preferably made to have a value within a range of from 0 to 3.

Accordingly, by setting $\beta_m$=0 to 2 and $\beta_m{}'$=0 to 3 at any linear velocity to be used and to let $\beta_m$ and $\beta_m{}'$ monotonically increase as the linear velocity lowers, it will be possible to carry out good recording at any linear velocity. Here, to let $\beta_m{}'$ monotonically increase as the linear velocity lowers, means to let $\beta_m{}'$ monotonically increase as the linear velocity lowers.

In fact, in the recording pulse division method (VI-B), it is preferred that $\beta_m$ is permitted to monotonically increase as the linear velocity lowers, and also $\beta_m{}'$ is permitted to monotonically increase.

Further, in the recording pulse division method (VI-A) or (VI-B), it is possible to further reduce the number of parameters by setting either $\Delta_{m-1}$ or $\beta_m$ to be 0 or setting $\Delta_{m-1}=\beta_m$. It is a feature of the recording medium of the present invention that even if the number of parameters is reduced in this manner, good characteristics can be obtained. And, among recording media of the present invention, the tendency to obtain the above-mentioned good characteristics will be particularly distinct with an optical recording medium employing a GeSb type recording layer. Namely, by using an optical recording medium employing a GeSb type recording layer, the effect of the present invention such that good high velocity recording characteristics can be realized by a simple recording pulse division method, will be most effectively be provided.

Further, to obtain accurate 3 T mark lengths and low jitter at each linear velocity, it is preferred that among $T_{d1}{}'$, $\alpha_1{}'$ and $\beta_1{}'$ where n=3, $T_{d1}{}'$ and $\beta_1{}'$ are permitted to monotonically increase as the linear velocity lowers, and $\alpha_1{}'$ is permitted to monotonically decrease as the linear velocity lowers.

Thus, by a simple combination of logic gates as shown in FIG. 5, recording pulses can easily be generated by changing the data reference clock period T at each linear velocity.

Here, it is further preferred for simplification that within a linear velocity range of from $V_{min}$ to $V_{max}$, $T_{d1}+\alpha_1$, $T_{d1}{}'+\alpha_1{}'$, $\beta_{i-1}+\alpha_i$=2 and $\beta_{i-1}{}'+\alpha_i{}'$=2 (i=3 to m−1) are, respectively, constant irrespective of the linear velocity where m is at least 3.

Further, it is more preferred that when m is at least 2, these values are constant irrespective of the linear velocity.

With respect to other periods, in the case of CD-RW, at least in a linear velocity range of about 2-time velocity, the linear velocity dependency of the respective parameters in the recording pulse division method is relatively small, whereby it is preferred that some or all of the values of $\beta_{m-1}+\alpha_m$ and $\beta_1+\alpha_2$ in an even number length mark with m being at least 2, and $\beta_{m-1}{}'+\alpha_m{}'$ and $\beta_1{}'+\alpha_2{}'$ in an odd number length mark with m being at least 2, are made to be substantially constant irrespective of the linear velocity.

Here, the linear velocity range of about 2-times velocity in the case of CD-RW means that in a case where $V_{min}$=8-times velocity and $V_{max}$=24-times velocity, these parameters may be changed generally every 2-times velocity, like for a range of from 8 to 10, from 10 to 12, from 12 to 14, from 14 to 16, from 16 to 18, from 18 to 20, from 20 to 22, or 22 to 24-times velocity.

On the other hand, in the case of RW-DVD, at least in a linear velocity range of about 0.5-time velocity, the linear velocity dependency of the respective parameters of the recording pulse division method is relatively small, whereby it is preferred that some or all of the values of $\beta_{m-1}+\alpha_m$ and $\beta_1+\alpha_2$ in an even number length mark with m being at least 2 and $\beta_{m-1}{}'+\alpha_m{}'$ and $\beta_1{}'+\alpha_2{}'$ in an odd number length mark with m being at least 2, are made to be substantially constant irrespective of the linear velocity.

Here, the linear velocity range of about 0.5-time velocity in the case of RW-DVD means that for example, in a case where $V_{min}$=2-times velocity and $V_{max}$=6-times velocity, these parameters may be changed generally every 0.5-time velocity like for a range of from 2 to 2.5, from 2.5 to 3, from 3 to 3.5, from 3.5 to 4, from 4 to 4.5, from 4.5 to 5, from 5 to 5.5 or from 5.5 to 6-times velocity.

Of course, it is more preferred that these values are constant at every linear velocity within a range of from $V_{min}$ to $V_{max}$. In the recording pulse division method (VI), (VI-A) or (VI-B), even if. $\beta_1+\alpha_2$ and $\beta_{m-1}+\alpha_m$ in an odd number length mark of m being at least 3 are made to be constant at any linear velocity within a range of from $V_{min}$ to $V_{max}$, good recording signal quality can relatively easily be obtained, and it is particularly suitably applied. In such a case, it is more preferred that they are made to be constant at $\beta_1+\alpha_2$=2 and $\beta_{m-1}+\alpha_m$=2.

The "period is constant" means that it is constant within a range where the resolution of the value set by the division pulse-generating circuit allows, and when it is standardized by the clock period T, fluctuation less than ±0.01 T is allowable.

Referring again to FIG. 4, the significance of the recording pulse division methods (IV), (V) and (VI) will be explained taking CD-RW as an example. If $\alpha_i$ and $\beta_i$ used satisfactorily at 24 or 32-times velocity for the recording medium of the present invention, are used as they are in the entire linear velocity range of from 8 to 32-times velocity, and low velocity recording is carried out simply by setting the reference clock period for data to be variable, the cooling rate of the recording layer at the low linear velocity will remarkably decrease, like curve e shown by a dotted line in FIG. 4, whereby formation of an amorphous phase will be hindered. At a low linear velocity, the reference clock period T becomes relatively large as compared with the case of a high linear velocity, whereby the absolute time for irradiation of off-pulses will be long, but at the same time, the absolute time for irradiation of recording pulses will also be long, and consequently, the irradiation energy per unit time will also increase, whereby the cooling rate will decrease. Accordingly, in the 2 T base recording strategy in the present invention, the recording pulse duty ratio is lowered to prolong the off-pulse sections as the linear velocity lowers, whereby the decrease in the cooling rate at a low linear velocity is complemented to realize the characteristics corresponding to curve d in FIG. 4.

"Recording method CD2-3" and "Recording method DVD2-3" are capable of simply prescribing a recording medium having characteristics within specific ranges, particularly by defining the ranges of various parameters in the recording pulse division method (VI-B) and combining them with "Recording method CD1-3" or "Recording method DVD1-3" to univocally define curve d in a very limited range in FIG. 4.

Further, it is preferred to set $\beta_i T$ (i=1 to m) and $\beta_1' T$ (i=1 to m−1) to be at least 2 nsec at any linear velocity to be used. Specifically, if $\alpha_i T$ and $\alpha_i' T$ (i=1 to m) and $\beta_i T$ and $\beta_i' T$ (i=1 to m−1) are set to be at least 2 nsec at any radial position of the optical recording medium, it will be possible to properly carry out recording also by the after-mentioned CAV recording or P-CAV recording.

In the above-mentioned methods, Pb, Pw and the Pe/Pw ratio are preferably set to be constant irrespective of the linear velocity during overwriting. When the optimum writing power is represented by $Pw_0$ and the optimum erasing power is represented by $Pe_0$ at a linear velocity V within a range of from $V_{min}$ to $V_{max}$, $Pw_0$ and $Pe_0$ are usually selected so that the jitter or the error rate will be lower than specific levels. $Pe_0$ is usually selected so that the $Pe_0/Pw_0$ ratio becomes constant, and the ratio is usually from 0.2 to 0.6, preferably from 0.2 to 0.4, more preferably from 0.3 to 0.4. Further, if $Pw_0$ is high, deterioration by repeated overwriting will be accelerated, and the prescribed number of repeated overwriting is usually preferably set to be at least 1000 times. $Pw_0$ determined from such viewpoints may be one which varies depending upon the linear velocity, but the ratio of the minimum value to the maximum value of $Pw_0$ within the above linear velocity range is desired to be at least 0.8.

In such a case, it is preferred that information relating to the writing power, etc. and pulse division information are preliminarily written on the desk as concavo-convex pit signals or groove-deformation signals. As a result, the optimum pulse strategy can be automatically selected by a drive for recording. The information to be preliminarily written includes, for example, at least the values of the minimum and maximum linear velocities $V_{min}$ and $V_{max}$ for overwriting, themselves, the optimum Pe/Pw ratios at $V_{min}$, $V_{max}$ and several linear velocity V between them, the optimum writing power $Pw_0$, the optimum erasing power $Pe_0$, the optimum bias power $Pb_0$ and the numerical values of all or some of independent parameters as described for the recording pulse division methods (II-A), (III-A) and (III-B). However, it is preferred that $Pb_0$ is usually constant and is the same as the retrieving power Pr.

As the above linear velocity V, in the case of CD-RW, it may be selected with intervals generally larger than about 4-times velocity, and for example, in 8 to 24-times velocity, it may be selected like 8, 12, 16, 20 and 24-times velocities, but may be smaller than this.

As the above linear velocity V, in the case of RW-DVD, it may be selected with intervals generally larger than about 1-time velocity, and for example, in 2 to 6-times velocity, it may be selected like 2, 3, 4, 5 and 6-times velocities, but may be smaller than this.

Particularly, in (VI-B) corresponding to the recording pulse division method (III-B), if a total of eleven parameters, i.e. $\alpha c$, $\Delta_{m-1}$, $\Delta_m$, $\Delta_m$ and $\beta_m'$ where n is at least 4, $T_{d1}'$, $\alpha_1'$, and $\beta_1'$ where n=3 and Pw, Pe and Pb, are defined, the recording pulse division method to form all mark lengths of from 3 to 11 will be fixed. It is preferred that these eleven independent parameters are optimized for preliminarily selected every linear velocity and preliminarily written on the disk.

Also in a case where recording is carried out at a linear velocity not preliminarily selected in the after-mentioned CAV or P-CAV recording, some or all values of the above parameters at preliminarily selected recording linear velocity may be read out, and by means of such values, it will be possible to calculate the optimum parameters (such as $\alpha c$, etc.) of the recording pulse strategy in recording at the above-mentioned linear velocity not preliminarily selected. Accordingly, if the above eleven independent parameters are optimized for every preliminarily selected linear velocity and written on the disk, good overwriting will be possible at an optional linear velocity between $V_{min}$ and $V_{max}$.

Thus, by combining the recording medium of the present invention with the recording method of the present invention which makes one beam overwriting possible at a plurality of linear velocities, the following two practical usages will be possible.

Practical Usage 1

Firstly, with a current CD device, the rotational speed by a spindle motor to rotate a disk is limited to a level of 10000 rpm at the maximum. A polycarbonate resin having molecular weight of from 12000 to 20000 which is commonly used as a substrate for CD, is likely to be broken by a centrifugal force at a rotational speed higher than this. CD-RW usually has a disk shape having a diameter of 12 cm and has a record area (information area) having a radius of at least 23 mm to 58 mm, preferably from 22 to 58 mm. If the disk is rotated at about 8000 rpm, the linear velocity at the innermost periphery of the record area will be 16-times velocity, and the linear velocity at the outermost periphery of 58 mm will be about 38-times velocity. At 10000 rpm, the linear velocity at the innermost periphery of record area will be about 22-times velocity, and the linear velocity at the outermost periphery will be about 48-times velocity, whereby recording by a CLV system for a constant linear velocity at least about 22-times velocity over the entire surface, is impossible.

In the case of a DVD device, when rotated at about 10000 rpm, about 7-times velocity at the inner periphery and about 16-times velocity at the outer periphery are almost limits from the relation of the strength of the substrate like in the case of CD. However, in the case of RW-DVD of the present invention, the upper limit in the recording velocity is from about 10 to 12-times velocity, whereby from about 6000 to 7000 rpm will be the upper limit of the rotational speed for overwriting.

Accordingly, in practical usage 1, a recording system to increase the linear velocity gradually from the inner peripheral portion is adopted in a CD-RW recording or retrieving device to carry out recording or retrieving at a linear velocity of at least 24-times velocity at the maximum at the outermost peripheral portion of the record area or in a RW-DVD recording or retrieving device to carry out recording or retrieving at a linear velocity of at least 7-times velocity at the maximum at the outermost peripheral portion of the record area. This is referred to as P-CAV (partial CAV) or ZCLV (zoned CLV).

Here, in the case of CD-RW, P-CAV is such that by setting the velocity at the innermost periphery of the record area at from 16 to 22-times velocity, recording is carried out by a CAV system up to a radius Rs where the velocity will be from 24 to 32-times velocity, and at a radius outside of Rs, CLV recording is carried out at a constant linear velocity of from 24-times velocity to 32-times velocity.

On the other hand, ZCLV is such that up to the radius of Rs, a CLV recording is carried out at a relatively low linear velocity such as 16-times velocity or 20-times velocity while switching the linear velocity for every zone, whereby the linear velocity is increased towards the outer periphery.

On the other hand, in the case of RW-DVD, P-CAV is such that by setting the velocity at the innermost periphery of the record area at from 4 to 7-times velocity, recording is carried out by a CAV system up to a radius Rs where the velocity will be from 8 to 10-times velocity, and at a radius outside of Rs, CLV recording is carried out at a constant linear velocity of from 8-times velocity to 10-times velocity.

On the other hand, ZCLV is such that up to the radius Rs, CLV recording is carried out at a relatively low linear velocity such as 4-times velocity or 6-times velocity while switching the linear velocity for every zone, whereby the linear velocity is increased towards the outer periphery.

Practical Usage 2

This is a practical usage whereby CD-RW or RW-DVD of which recording used to be carried out only by a CLV mode, will be made recordable by a complete CAV mode, and is a practical method whereby a poor access or seek performance which used to be a weak point of a CD-RW medium which always required rotational synchronization, can be improved to a large extent. This is particularly efficient to carry out access to packets at skipping radial positions in random packet recording, whereby convenience as a medium for an external memory device of a computer will be substantially increased. Further, CLV consumes a large amount of electric power for acceleration or deceleration of a motor to change the rotational speed. Whereas, there is no such a necessity, and there is a merit that the power consumption of the drive can be improved to a large extent.

In the present invention, in accordance with at least either one of the recording pulse division methods (IV) to (VI), $\alpha_i$ and $\alpha_i'$(i=1 to m) are permitted to simply decrease, while $\beta_m$ and $\beta_m'$ are permitted to simply increase, as the linear velocity lowers. Usually, the recording pulse division method itself is set to be constant, while the respective parameters (Pw, Pe, Pb, $T_{d1}$, $\alpha_i$, $\beta_i$, etc.) in each division method are made variable.

And, in the case of CD-RW, irrespective of which one of the above recording pulse division methods (IV) to (VI) is used, when EFM modulation information is recorded on a disk-shaped rewritable optical recording medium by a plurality of mark lengths, a linear velocity of from 1.2 m/s to 1.4 m/s is used as the reference velocity (1-time velocity), and it is preferred to rotate the optical recording medium so that the linear velocity at the outermost periphery of the record area of the optical recording medium will be at least 20-times velocity.

Especially when P-CAV (partial CAV) or ZCLV (zoned CLV) is employed as a recording system to gradually increase the linear velocity from the inner peripheral portion, it is preferred to rotate the disk so that the linear velocity at the innermost periphery of the record area will be at least 16-times velocity of the reference linear velocity, and the recording linear velocity will be high towards the outer periphery.

On the other hand, in the case of RW-DVD, irrespective of which one of the above recording pulse division methods (IV) to (VI) is used, when EFM+ modulation information is recorded on a disk-shaped rewritable optical recording medium by a plurality of mark lengths, a linear velocity of 3.49 m/s is used as the reference velocity (1-time velocity), and it is preferred to rotate the optical recording medium so that the linear velocity at the outermost periphery of the record area of the optical recording medium will be at least 5-times velocity.

Particularly, when P-CAV (partial CAV) or ZCLV (zoned CLV) is used as a recording system to gradually increase the linear velocity from the inner peripheral portion, it is preferred to rotate the disk so that the linear velocity at the innermost periphery of the record area will be at least 4-times velocity of the reference linear velocity, and the recording linear velocity becomes higher towards the outer periphery.

In the case of CD-RW and RW-DVD, when a complete CAV mode or a P-CAV mode is used for recording or a ZCLV mode is used for recording, under the above conditions, it is preferred that the record region is divided into a plurality of virtual zones in every certain radius, and $\beta_m$=0 to 3, and further, $\beta_m$ is made to monotonically increase towards the inner peripheral zone, and $\alpha_i$ and $\alpha_i'$ are made to monotonically decrease towards the inner peripheral zone.

Further, with a view to simplifying the recording device, it is preferred that the values of Pb, Pw and Pe/Pw are substantially constant at any radial position of the optical recording medium.

In the ZCLV system (Practical method 1), the reference clock period T and parameters of the recording pulse division method are switched for every CLV zone. On the other hand, in a CAV zone of the CAV system (Practical usage 2) or P-CAV method (Practical usage 1), the linear speed continuously changes depending upon the radial position, and the reference clock period is also made to continuously change. On the other hand, for the parameters of the recording pulse division method, it is preferred that a virtual zone is set generally for every predetermined linear speed, thus for every predetermined radial width, and the parameters are made to be constant within each zone and to be switched for every zone. The width of such a virtual zone is preferably to be a range wherein the linear velocity changes from about 0.5-time velocity to 2-times velocity. Further, the width of every zone is preferably made to be basically constant, but it is also preferred that as the linear speed increases, i.e. towards the outer periphery, the width of the zone is gradually reduced. As the linear speed increases, a value such as jitter is likely to deteriorate, and it is necessary to frequently change to the optimum parameter.

Heretofore, in the retrieving system for CD-ROM and DVD-ROM, retrieving in a CAV mode has already been carried out, but at the time of recording, CAV was possible only at a speed of from 4 to 10-times velocity for CD-ROM and only at a speed of from 1 to 2.5-times velocity for RW-DVD, and therefore, it has been in practice to carry out retrieving by increasing the rotational speed at the time of retrieving. If the maximum overwriting linear velocity is at this level, recording can be made in a shorter period by carrying out the recording only by CLV, and accordingly, there has been little merit in recording by a CAV mode. However, like in the present invention, if the maximum overwriting linear speed can be made to be at least 24-times velocity for CD and at least 6-times velocity for DVD, merits to shorten the access time or to reduce the power consumption, by the complete CAV recording, can easily be obtained.

As mentioned above, CD-RW is usually of a disk-shape having a diameter of 12 cm and has a record area (information area) having a radius of at least 23 mm to 58 mm, preferably from 22 to 58 mm. If this disk is rotated at about 5000 rpm so that the velocity will be 10-times velocity at the inner periphery of the record area, the linear velocity at the outermost periphery of 58 mm of the record region will be about 24-times velocity. Namely, usually, if the innermost periphery is made to be 10-times velocity by a CAV system, the outermost periphery becomes about 24-times velocity. Likewise, if the linear velocity at the outermost periphery of the record area is made to be 32-times velocity, the linear velocity at the innermost periphery of the record area will be about 13-times velocity.

Further, RW-DVD is usually of a disk shape having a diameter of 12 cm and has a record area (information area) having a radius of at least 23 mm to 58 mm, preferably from 22 to 58 mm. If this disk is rotated at about 5000 rpm so that the velocity will be 2.5-times velocity at the innermost periphery of the record area, the linear velocity at the outermost periphery of 58 mm of the record area will be about 6-times velocity. Namely, usually, if the innermost periphery is made to be 2.5-times velocity by a CAV system, the outermost periphery will be about 6-times velocity. Likewise, if the linear velocity at the outermost periphery of the record area is made to be 10-times velocity, the linear velocity at the innermost periphery of the record area will be about 4-times velocity.

At that time, if the reference clock period T is changed in inverse proportion to the radial distance so that the product VT with the linear velocity V at any radial position, will be constant, the mark length nT will be constant irrespective of the rotation angular velocity, whereby recording with a constant linear density which is interchangeable with CD for retrieving only or with DVD for retrieving only, will be possible, while it is recording in a complete CAV mode.

Here, the record area includes, in addition to the record area for user's data, an area for trial writing, lead-in and lead-out areas, etc. to be used by the system. Accordingly, the radial positions of 22 mm and 58 mm may contain an error at a level of ±1 mm. Further, in correspondence with this allowable error, a certain deviation will result also in the frequency value, etc., but such a deviation is also allowable.

Figure 6:
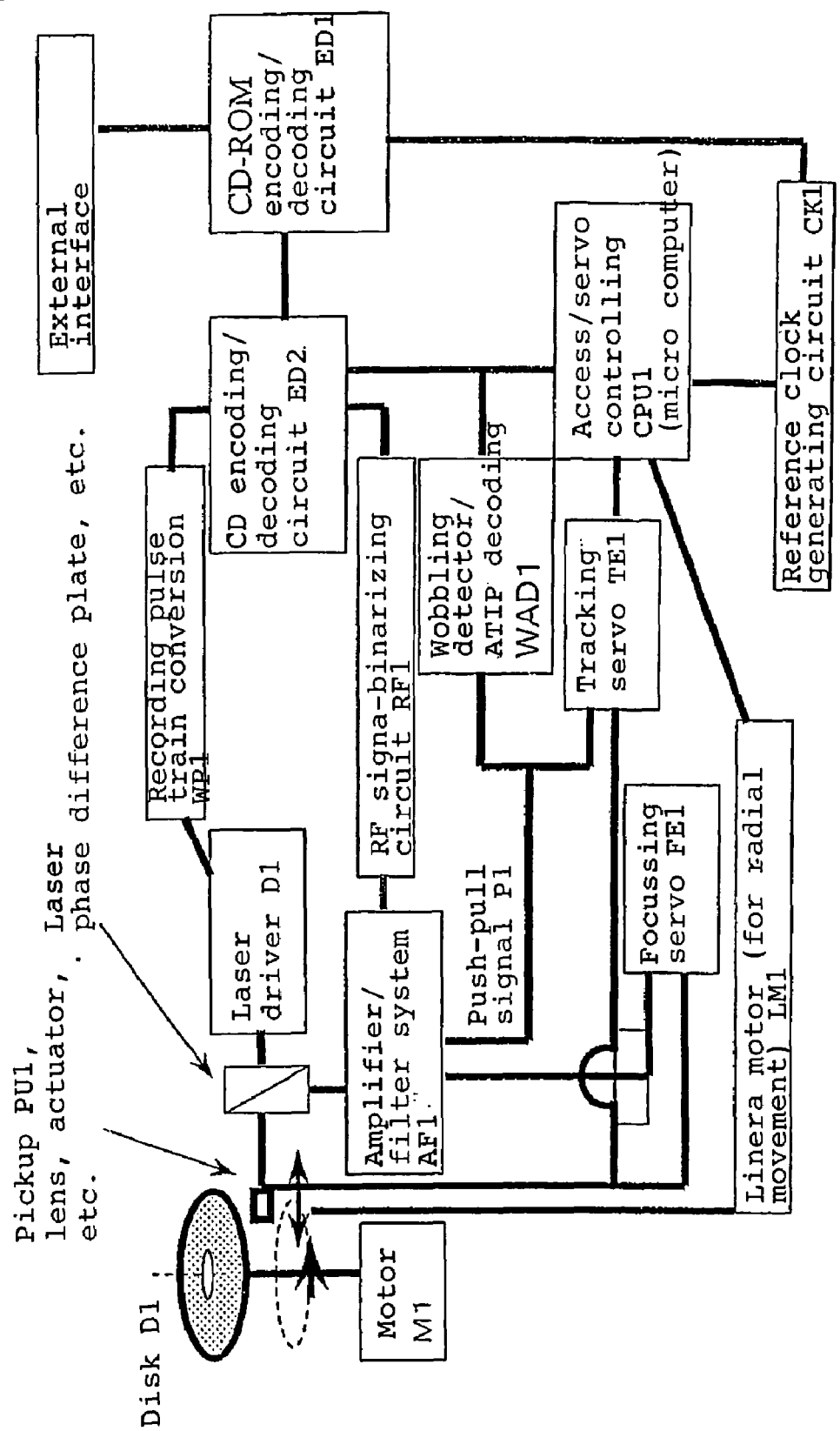
FIG. 6 is a schematic view of a recording device to be used for the recording method of the present invention.

A schematic view of the construction of a recording device to realize the recording method of the present invention is shown in FIG. 6 taking CD-RW as an example.

In FIG. 6, the optical disk D1 has a substrate having a helical groove wobbled in accordance with signals modified by address information and having a carrier frequency $f_{LO}$ having a constant spatial frequency ($f_{LO}$ represents a carrier frequency during CLV recording), and a recording layer, and it has address information to distinguish a record block being a record information unit located at a predetermined position in the helical groove, and a synchronization signal to distinguish the start position of such a block. In FIG. 6, particularly specifically, a rewritable compact disk is supposed as the optical disk, whereby $f_{LO}$=22.05 kHz, and the address information is ATIP information frequency-modulated by ±1 kHz, using $f_{LO}$ as the carrier frequency. Further, the wobble is formed by groove wobbling so that when retrieving is carried out at a linear velocity of from 1.2 m/s to 1.4 m/s, the carrier frequency $f_{LO}$ will be 22.05 kHz.

The optical disk recording/retrieving device 1 has a spindle motor M1 as a means to rotate the disk at an equal angular velocity about the center portion of the disk as an axis, and a linear motor as a moving mechanism (LM1) to move in a radial direction an optical pickup to generate a focused laser beam for recording/retrieving, to a predetermined address. The pickup PU1 contains a focusing servo circuit (FE1) to adjust the focal point of the focused laser beam generated from a laser diode as the light source, to the recording layer surface of the optical disk, and a groove-tracking servo circuit (TE1) to let the focused laser beam scan along the helical groove. For the focusing servo circuit, a known method such as an astigmatic method may be employed. For the tracking servo circuit, a known method such as a push-pull method or a 3-beam method may be employed (see "Compact Disk Book" third edition, Ohmsha, coauthored by Hetaro Nakajima and Hiroshi Ogawa).

The optical disk recording/retrieving device 1 further has a circuit (WAD1) to detect and decode the carrier frequency $f_{40}$ from the groove wobble, the address information and the block synchronizing signal, a circuit to generate a record data train, mark length-modified by encoders ED1 and ED2 in synchronization with the start position of the record block and with the reference clock T (frequency $f_{d0}$) of data, and a circuit (WP1) to modulate the laser writing power in correspondence with the record data train.

The optical disk D1 is CAV-driven by the motor M1. The disk is CAV-rotated at a rotational speed $\omega_0$ between from 5000 to 7000 rpm, so that the linear velocity will be 10-times velocity or 13-times velocity of 1.2 m/s to ¼ m/s, particularly at the innermost periphery of the record area with a radius of about 22 mm. CAV-rotation is maintained with precision such that the rotational jitter is not more than a few % by monitoring the rotation of the spindle motor M1 by a tachometer and feeding back the error from the prescribed rotational speed.

Decoding of the synchronization signal and the address information is carried out by retrieving a push-pull signal P1 through an amplifier/filter system AF1, detecting the wobble signal, decoding the ATIP signal, followed by decoding the contained synchronization signal and the address information. The address information and the synchronization signal are referred to by an access/servo-controlling CPU1, and the predetermined address movement is controlled by CPU1. The address movement comprises a radial movement by a coarse adjustment mechanism by linear motor LM1 driving in a state where the tracking servo TE1 is switched off, and fine adjustment (fine adjustment of the inclination of the object lens of PU1) while referring to the ATIP address, with the tracking servo switched on, in the vicinity of the predetermined address, but each one is controlled by CPU1.

Once it has been confirmed that a predetermined address has been reached, the clock of the circuit CK1 as the data reference clock generator, is synchronized with the synchronization signal of ATIP, to carry out recording at the predetermined ATIP frame. In the case of CD-ROM data, encoding of ROM data is carried out by ED1, and then encoding as CD is carried out by ED2. The data bit train is also synchronized with the reference clock of data, and the data train is further converted to a recording pulse train at WP1, to drive a laser driver LD1 to carry out overwriting.

Further, retrieving is carried out in such a manner that after a predetermined address has been reached, the retrieving signal is retrieved through a RF signal-binarizing circuit system RF1, and while synchronizing the reference clock of data with the EFM frame, data decoding as CD is carried out by ED2, and further, data decoding as CD-ROM is carried out by ED1.

In the recording method of the present invention, various methods are conceivable to generate the reference clock period T and a reference clock of data in inverse proportion to the radial distance. However, the following is conceivable as a preferred example. Here, description will be made by taking as an example a case wherein a wobble carrier frequency $f_{LO}$ at 1-time velocity in a CLV mode is 22.05 kHz, the linear velocities at the innermost periphery and the outermost periphery of the record area in a CAV mode are 10-times velocity and 24-times velocity, respectively, and the reference clock of data is 196 times the carrier frequency. Here, the carrier frequency $f_{LO}$ allows an error at a level of ±0.1 from 22.05 kHz.

The medium has a helical groove having imparted a wobble having a carrier frequency of frequency $f_{LO}$=22.05 kHz as calculated at 1-time velocity. This medium can be used as a usual CD-RW medium for a high velocity recording in a CLV mode.

In a case where the wobble of a wobble groove (wobbling groove) is constant at a frequency corresponding to the carrier frequency $f_{LO}$=22.05 kHz, during CAV rotation, retrieved carrier frequency $f_{40}$ of the wobble will change on appearance depending upon the radial position i.e. depending upon the linear velocity corresponding to the radial position. And, a reference data clock frequency in proportion to the radius can be obtained by multiplying by 196 the carrier frequency $f_{40}$ of the wobble retrieved at the radial position during the CAV rotation. Here, $f_{40}$ represents the carrier frequency during the CAV recording.

If recording is carried out in synchronization with this data reference clock frequency in proportion to the radius, it is possible to carry out mark length modulation recording with a constant linear density even in a CAV mode.

Namely, if a wobble signal is written on the substrate in a 1-time velocity mode of CLV rotation, when the medium is CAV-rotated, it is possible to make the spatial frequency to be constant i.e. to make the linear density to be constant, by generating the reference clock frequency of data by means of the same multiplying factor irrespective of the radial position.

For example, when the linear velocity at the innermost periphery of the record area is 10-times velocity, and the linear velocity at the outermost periphery of the record area is 24-times velocity, the carrier frequency $f_{40}$ of a wobble retrieved in a CAV mode will be 22.05×10=220.5 at the innermost periphery of the record area and 22.05×24=529.2 kHz at the outermost periphery of the record area, respectively. The frequencies having them multiplied by 196 times, i.e. 43.2 MHz (at the innermost periphery of the record area) and 103.72 MHz (at the outermost periphery of the record area) will be the reference clock frequencies of data. In such a case, the reference clock period T of data will be about 23.1 nsec at the innermost periphery of the record area and about 9.1 nsec at the outermost periphery of the record area. At an intermediate radial position, a reference clock period of data in inverse proportion to the radius between them, may be generated.

On the other hand, the wobble signal is usually frequency-modulated by ±1 kHz with ATIP signal, and accordingly, the actual frequency is 22.05 kHz±kHz and one period of the wobble signal will be accompanied by a fluctuation of about ±4.5%. If such a fluctuated signal is directly multiplied by prescribed times to obtain a reference clock period of data, fluctuation (deviation) of the mark length of ±4.5% will result again. Usually, such fluctuation in the mark length recording is called a phase shift, and if this shift is close to 5%, proper demodulation may not be possible. Accordingly, in such a case, it is necessary to extract only the carrier frequency $f_{40}$ from the frequency-modulated wobble signal, followed by the predetermined multiplication.

Recently, there is a case to set the reference linear velocity to be slightly smaller than 1.2 m/s to a level of 1 m/s, the spatial frequency of the wobble is made small, and the mark length is made shorter, for higher density. Even in such a case, application of the recording medium and the recording method of the present invention will not be hindered.

In the case of DVD, there are some differences such that the carrier frequency $f_{LO}$ in 1-time velocity retrieving is 144 kHz (1/157 of clock frequency) in so-called DVD-RW standards or about 700 kHz (1/32 of clock frequency) in DVD+ RW standards, but basically, the device is constituted on the totally similar principle.

6. Other Matters Relating to the Recording Method of the Present Invention

Application of the Recording Method of the Present Invention to a Conventional Low Linear Velocity Recording Medium When overwriting is carried out on conventional 4 or 10-times velocity CD-RW or on 2 or 2.4 (2.5) or 4-times velocity RW-DVD by a recording device whereby the recording method of the present invention can be applied to CD-RW of at least 24-times velocity or RW-DVD of at least 4-times velocity, as in the present invention, the conventional 1 T base strategy may be applied as it is, but it is possible to apply the 2 T base recording pulse division method of the present invention. Namely, it is possible to carry out CLV recording at various linear velocities by applying the recording methods (I), (II), and (III) of the present invention, or to carry out CAV recording at 4 to 10-times velocity of 10-times velocity CD-RW, or CAV recording at 1.6 to 4-times velocity of 4-times velocity RW-DVD, by applying (IV), (V) and (VI).

Thus, the same recording pulse-generating circuit can be applied for recording conventional CD-RW and RW-DVD, and CD-RW and RW-DVD of the present invention, whereby simplification of the pulse-generating circuit will be possible. On the other hand, in the conventional 1 T base recording pulse division method, it is practically impossible to carry out recording on a ultrahigh velocity medium as in the present invention.

For Rewritable Media of Other Formats

The recording medium of the present invention is not limited to an application to media having a specific format like CD-RW or RW-DVD. For example, it is applicable to a high density rewritable phase-change medium employing blue LD (laser disk). Further, the mark length modulation system is not limited to EFM or EFM+, and is applicable to, for example, so-called (1,7) run-length limited (RLL) non-return-to-zero inverted (NRZI) modulation system where n=2, 3, 4, 5, 6, 7 or 8.

EXAMPLES

CD-RW Basic Example

A polycarbonate resin substrate having a thickness of 1.2 mm and provided with a helical groove having a track pitch of 1.6 μm and wobbling in a reference frequency of 22.05 kHz as calculated at 1-time velocity (1.2 m/s), was formed by injection molding.

The groove width was 0.54 μm and the depth was 34 nm. Each of these values was obtained by an optical diffraction method of U groove approximation using a He—Ne laser beam having a wavelength of 633 mm. To the groove wobble, address information by ATIP was further imparted by frequency modulation of ±1 kHz.

Then, on the substrate, a lower protective layer, a recording layer, an upper protective layer, a reflective layer and an ultraviolet-curable resin layer were formed in this order. Deposition of the respective layers was carried out by sequential lamination by sputtering on the substrate without releasing the vacuum. However, the ultraviolet-curable resin layer (thickness of about 4 µm) was coated by spin coating.

Immediately after the deposition, the recording layer was amorphous, and by irradiating a laser beam having a wavelength of from 810 to 830 nm and focused into an oval shape having a major axis of about 150 µm and a minor axis of about 1.0 µm, by selecting the linear velocity and the initialization power within proper ranges, the entire surface was crystallized to obtain an initial (unrecorded) state.

With respect to the thickness of each layer, the deposition rate was accurately measured, and then the thickness was controlled by the sputtering time. The composition of the recording layer was determined by correcting the fluorescent intensities of the respective elements obtained by a fluorescent X-ray analysis by the absolute composition separately obtained by a chemical analysis (atomic absorption spectrometry).

The density of the recording layer or the protective layer was obtained from the weight change when deposited on the substrate as thick as a few hundred nm. The film thickness was determined by correcting the fluorescent X-ray intensity by the film thickness measured by a stylus meter.

The sheet resistivity of the reflective layer was measured by a 4-probe ohm meter (Loresta MP, tradename, manufactured by Mitsubishi Yuka (presently Dia Instruments)).

The measurement of the resistivity was carried out either by measuring the reflective layer formed on a glass or polycarbonate resin substrate as an insulating substance, or by measuring the reflective layer constituting the outermost layer after forming the above-mentioned four layers (lower protective layer/recording layer/upper protective layer/reflective layer). The upper protective layer is a dielectric thin film which is an insulating substance and thus presents no influence over the measurement of the sheet resistivity. Further, the measurement of the resistivity was carried out directly in the form of a disk substrate having a diameter of 120 mm by contacting the probes at a radial position of from 30 to 40 mm. In this manner, the measurement of the resistivity is carried out at a position which can be regarded as a substantially infinitely large area.

On the basis of the resistivity R thus obtained, the sheet resistivity $\rho_s$ and the volume resistivity $\rho_v$ were calculated by the following formulae.

$$\rho_s = F \cdot R \quad (3)$$

$$\rho_v = \rho_s \cdot t \quad (4)$$

Here, t is the film thickness. F is a correction coefficient determined by the shape of the thin film region to be measured and usually takes a value of from 4.3 to 4.5. Here, 4.4 was used.

Recording/retrieving evaluation was carried out by means of DDU1000 tester manufactured by Pulsteck Co. (wavelength: about 780 nm, NA=0.5, spot shape: a circular of about 1.32 µm with an intensity of $1/e^2$, hereinafter this tester is referred to as tester 1) or DDU1000 tester manufactured by Pulsteck Co. (wavelength: about 780 nm, NA=0.5, spot shape: oval of about 1.43×1.33 µm with an intensity of $1/e^2$, hereinafter this tester will be referred to as tester 2). On the basis of the reference linear velocity of 1.2 m/s of CD being 1-time velocity, overwriting characteristics at from 8 to 32-times velocity were evaluated.

The reference clock period of data at each linear velocity was one inversely proportionated at each linear velocity against the reference clock period 231 nsec of data at 1-time velocity.

Unless otherwise specified, retrieving was carried out at 1-time velocity. The output signal from DDU1000 was passed through a high frequency-passing filter having a cutoff lies between 5 and 20 kHz, whereupon the jitter was measured by a time interval analyzer (manufactured by Yokogawa Electric Corporation).

Modulation $m_{11}$ ($=I_{11}/I_{top}$) was read out by an inspection of the eye pattern on an oscilloscope. Further, $R_{top}$ was separately obtained by correction by means of CD reference disk CD5B (sold by Philips Co.).

Formation of a logic level to control the recording pulse division method was carried out by means of an optional signal generator (AWG620 or AWG710, manufactured by Sony Tektronix Co.). From the above signal generator, 2 channel gate signals comprising a logic signal corresponding generally to one having G1, G2 and G3 in FIG. 5 integrated and a logic signal corresponding to G4, were taken out and, as ECL level logic signals, input as gate signals against a laser driver of the above tester.

EFM random data were overwritten ten times, whereupon the mark lengths of the record data, the space lengths, the mark length and space length jitters, $m_{11}$, $R_{top}$ and the asymmetry value were measured. With EFM random data, mark lengths and space lengths of from 3 T to 11 T randomly appear. The frequencies of appearance of mark lengths relating to the respective n are about 34.0, 22.2, 16.4, 10.5, 4.9, 4.7, 4.4, 1.0 and 1.9% with respect to n=3, 4, 5, 6, 7, 8, 9 and 11, respectively. The frequencies of appearance of the mark length and the space length relating to the same n are substantially equal. They are average values of a data pattern appearing on a practical CD-ROM disk for data. In fact, 11 T marks and spaces are used only as a pattern for synchronization in most cases, and accordingly, the frequency of appearance is small.

Further, unless otherwise specified, bias power Pb was made to be the same as retrieving laser power Pr and constant at 0.8 mW.

In the measurement of the erase ratio by 3 T/11 T overwriting, a repeating pattern (3 T pattern) comprising a 3 T mark and a 3 T space (between marks), was recorded ten times, then a repeating pattern (11 T pattern) comprising 11 T mark and 11 T space (between marks), was overwritten, whereby the decreased amount (dB unit) of the carrier level of the 3 T mark was measured and taken as the erase ratio (erasability). The measurement of the carrier level was carried out by means of a spectrum analyzer (TR4171) manufactured by Advantest or 8567A manufactured by HP, and the retrieving signal output of the tester was used as input. The overwriting was carried out at each linear velocity, but retrieving was all carried out at a CD linear velocity (1.2 m/s). The resolution band width of the spectrum analyzer was 30 kHz, and the video band width was 30 Hz, and the input impedance was 50 Ω.

Further, unless otherwise specified, evaluation of the overwriting characteristics was carried out after overwriting ten times (writing for the first time in an unrecorded state, followed by overwriting nine times on the same track). Further, evaluation of the record signal after the accelerated aging test, was carried out only by retrieving the signal overwritten ten times before the accelerated aging test, after the accelerated aging test.

Example 1

In the above Basic Example, a disk was prepared and recording was carried out as follows.

On a substrate, 85 nm of a lower protective layer made of $(ZnS)_{80}(SiO_2)_{20}$, 17.5 nm of a recording layer made of $Ge_4Sb_{82}Te_{14}$ ($Ge_{0.04}$ ($Sb_{0.88}Te_{0.12}$) 0.96), 35 nm of an upper protective layer made of $(ZnS)_{80}(SiO_2)_{20}$, 200 nm of a reflective layer made of $Al_{99.5}Ta_{0.5}$ and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_4Sb_{82}Te_{14}$ or $Al_{99.5}Ta_{0.5}$ is an atomic ratio. The same applies in the following Examples. The volume resistivity $\rho_v$ of this $Al_{99.5}Ta_{0.5}$ reflective layer was 80 nΩ·m, and the sheet resistivity $\rho_s$ was about 0.4Ω/□. The initialization was carried out by scanning a laser diode beam having a wavelength of about 810 nm and having an oval spot shape having a major axis of about 150 μm and a minor axis of about 1.0 μm, in the minor axis direction at a linear velocity of about 2 m/s. The irradiation power was 950 mW.

On this disk, by means of the tester 1 with NA=0.50, overwriting of EFM modulation signal was carried out at 24 and 10-times velocities, and the characteristics were evaluated.

While maintaining Pe/Pw i.e. the ratio of erasing power Pe to writing power Pw, to be constant, Pw was changed every 1 mW from about 19 mW to about 29 mW, whereby the overwriting characteristics at the respective writing powers were evaluated. Each was evaluated by the value after overwriting ten times.

In 24-times velocity recording, recording method CD1-1 was applied. Firstly, a case where $T_{d1}$ and $T_{d1}'$ are constant irrespective of n, was studied, and in the following, this is designated as "recording method CD1-1$a$". "Recording method CD1-1$a$" is a practical usage wherein the number of independent parameters in the recording pulse division method (II-A) is further limited.

Recording Method CD1-1$a$

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m-1$), $\beta_{m-1}+\alpha_m=2$.

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.35$, provided that $\beta_1'=\beta_1+\Delta_1$, $\beta_{i-1}'+\alpha_i'=2$ (i=3 to m-1), $\beta_{m-1}'+\alpha_m'=2.4$, provided that $\alpha_m'=\alpha_m+\Delta_m$.

Here, $T_{d1}=T_{d1}'=0.9$, $\alpha_1=\alpha_1'=1.1$, $\beta_1=1$, $\Delta_1=0.35$, $\alpha_i=\alpha_i'=\alpha c=1$ ($\alpha c$ is constant with respect to i when $i=2$ to m-1), $\beta_{m-1}=1$, $\Delta_{m-1}=0$, $\Delta_m=0.4$, $\Delta_{mm}=0.4$, $\alpha_m=1$, and $\beta_m=\beta_m'=0.4$, and they are constant when m is at least 3.

Further, when m=2, with respect to 4 T mark, $T_{d1}=0.9$, $\alpha_1=1.1$, $\beta_1=1$, $\alpha_2=1$ and $\beta_m=0.4$, with respect to 5 T mark, $T_{d1}'=0.9$, $\alpha_1'=1.1$, $\beta_1'=1.35$, $\alpha_2'=1.4$ and $\beta_m'=0.4$.

When m=1, i.e. with respect to 3 T mark, $T_{d1}'=0.9$, $\alpha_1'=1.6$ and $\beta_1'=0.7$.

On the other hand, in the case of 10-times velocity recording, the following "Recording method CD2-1$a$" was used as a specific example of recording method CD2-1. "Recording method CD2-1$a$" is a practical usage wherein the number of independent parameters in the recording pulse division method (V) is further limited.

Recording Method CD2-1$a$

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_1+\alpha_2=1.8$, $\beta_{i-1}+\alpha_i=2$ ($i=3$ to $m-1$)

$\beta_{m-1}+\alpha_m=2$.

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.2$, provided that $\beta_1'=\beta_1+\Delta_1$, $\beta_{i-1}'+\alpha_i'=2$ (i=3 to m-1), $\beta_{m-1}'+\alpha_m'=2.55$, provided that $\beta_{m-1}'=\beta_{m-1}+\Delta_{m-1}$, and $\alpha_m'=\alpha_m+\Delta_m$.

Here, $T_{d1}=T_{d1}'=1.5$, $\alpha_1=\alpha_1'=0.5$, $\beta_1=1.3$, $\Delta_1=0.4$, $\alpha_i=\alpha_i'=\alpha c=0.5$ ($\alpha c$ is constant with respect to i when i=2 to m-1), $\beta_{m-1}=1.5$, $\Delta_{m-1}=0.35$, $\Delta_m=0.2$, $\Delta_{mm}=0.55$, $\alpha_m=0.5$, and $\beta_m=\beta_m'=1.3$, and they are constant when m is at least 3.

Further, when m=2, with respect to 4 T mark, $T_{d1}=1.5$, $\alpha_1=0.5$, $\beta_1=1.3$, $\alpha_2=0.5$ and $\beta_2=1.3$, and with respect to 5 T mark, $T_{d1}'=1.5$, $\alpha_1'=0.5$, $\beta_1'=1.7$, $\alpha_2'=0.8$ and $\beta_2'=1.6$.

With respect to 3 T mark, $T_{d1}'=1.5$, $\alpha_1'=0.8$ and $\beta_1'=2$.

Then, the recording pulse division method (II-A) wherein $T_{d1}$ and $T_{d1}'$ are not set to be constant for all n and set to have different values with respect to 3 T and 4 T marks, was studied in recording at 24-times velocity. The following recording method will be referred to as recording method CD-IIa.

Recording Method CD-IIa

With respect to an even number mark length nT=2mT in the case where m is at least 3, the mark is divided into m sections, and $\alpha_i$ and $\beta_i$ in recording pulse sections $\alpha_i T$ and off-pulse sections $\beta_i T$ were set to be as follows.

$T_{d1}+\alpha=2$, $\beta_1+\alpha_2=1.95$, $\beta_{i-1}+\alpha_i=2$ ($i=3$ to $m-1$), $\beta_{m-1}+\alpha_m=1.95$.

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$$T_{d1}'+\alpha_1'=2,$$

$$\beta_1'+\alpha_2'=2.25, \text{ provided that } \beta_1'=\beta_1+\Delta_1,$$

$$\beta_{i-1}'+\alpha_i'=2 \ (i=3 \text{ to } m-1),$$

$$\beta_{m-1}'+\alpha_m'=2.35, \text{ provided that } \alpha_m'=\alpha_m+\Delta_m.$$

Here, $T_{d1}=T_{d1}'=1$, $\alpha_1\alpha_1'=1$, $\beta_1=0.95$, $\Delta_1=0.3$, $\alpha_i=\alpha_i'=\alpha c=1$ ($\alpha c$ is constant with respect to i when i=2 to m−1), $\beta_{m-1}=1$, $\Delta_{m-1}=0$, $\Delta_m=0.4$, $\Delta_{mm}=0.4$, $\alpha_m=0.95$, and $\beta_m=\beta_m'=0.3$, and they are constant when m is at least 3.

When m=2, with respect to 4 T mark, $T_{d1}=0.95$, $\alpha_1=1$, $\beta_1=0.95$, $\alpha_2=0.95$ and $\beta_2=0.3$, and with respect to 5 T mark, $T_{d1}'=1$, $\alpha_1'=1$, $\beta_1'=1.25$, $\alpha_2'=1.35$ and $\beta_2'=0.3$.

Further, with respect to 3 T mark, $T_{d1}'=0.75$, $\alpha_1'=1.9$ and $\beta_1'=0.3$.

Further, $T_{d1}$, $\alpha_i$, $\beta_i$, etc. in each recording method are summarized in Table 1. Each recording method is based on the recording pulse method (II-A) or (V), and therefore, in the case where m is at least 3, ten parameters ($T_{d1}$, $\alpha_1$, $\beta_1$, $\Delta_1$, $\alpha c$, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (II), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\beta_1$, $\alpha_m$ and $\beta_m$. Here, in the recording methods CD1-1a, CD2-1a and CD-IIa, $\beta_1$ and $\beta_1'$ in the case where n=4, 5 are equal to $\beta_1$ and $\beta_1'(=\beta_1+\Delta_1)$ in the case where m is 3, respectively.

of the optimum Pw, good jitter values of less than 35 nsec were obtained. Further, the jitters of other mark lengths and space lengths were also less than 35 nsec.

Figure 7:
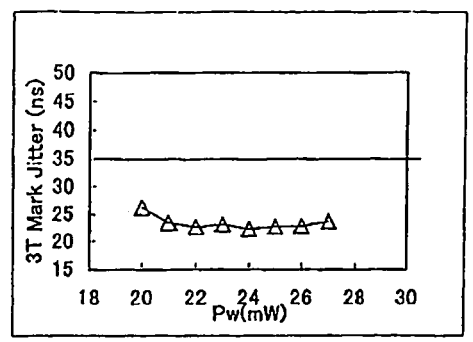
FIG. 7 presents data showing optical recording characteristics of an optical recording medium having a GeSbTe type recording layer, when 24-times velocity recording is carried out by a prescribed recording method.
Figure 7:
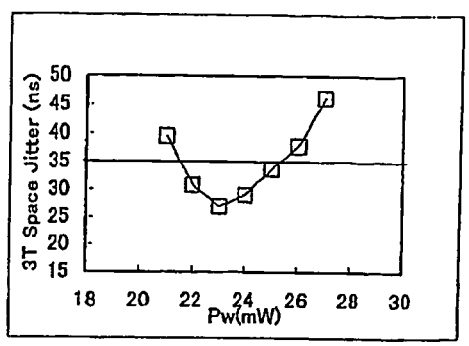
Figure 7:
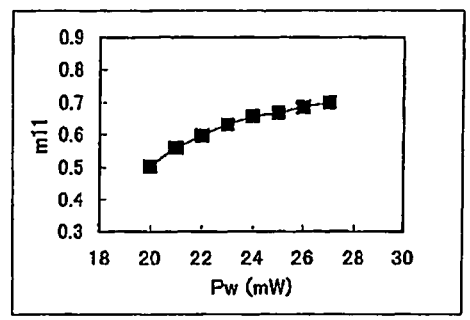
Figure 7:
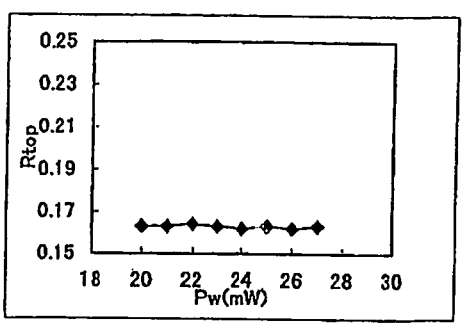
Figure 7:
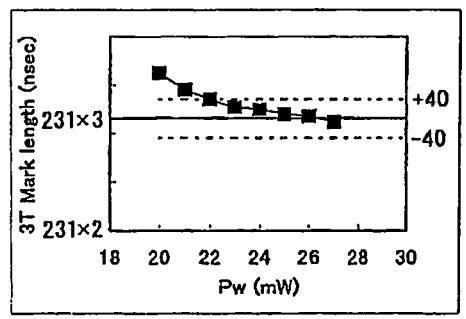
Figure 7:
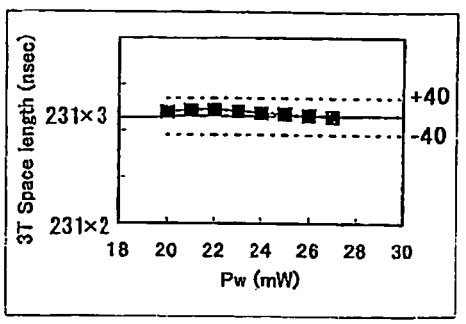

From FIGS. 7(*c*) and (*d*) and 8(*c*) and (*d*), it is evident that in either recording method, the modulation $m_{11}$ was from 60% to 80% (from 0.6 to 0.8), and $R_{top}$ was from 15 to 25% (from 0.15 to 0.25).

In FIGS. 7(*e*) and (*f*) and 8(*e*) and (*f*), the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation at a level of ±20% is usually allowable, and accordingly, a deviation within ±30 to 40 nsec is allowable. From the Figs., it is evident that there is no substantial deviation of the mark lengths and space lengths, and deviations, if any, are within the allowable range. Likewise, in the vicinity of the optimum Pw, also with respect to the mark lengths and space lengths of from 4 T to 11 T, desired mark lengths and space lengths were obtained within a range of the reference clock period T±10%.

Figure 8:
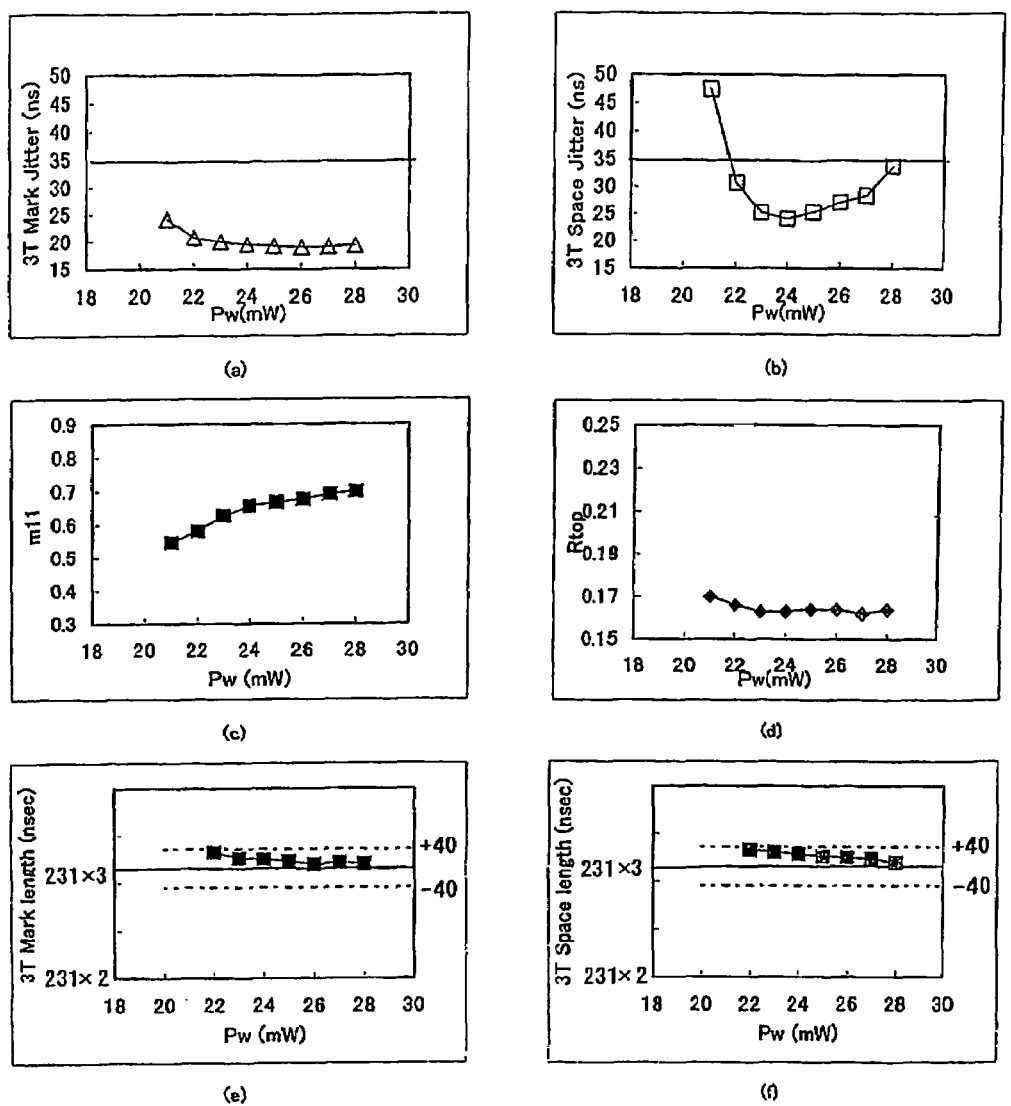
FIG. 8 presents data showing optical recording characteristics of an optical recording medium having a GeSbTe type recording layer, when 24-times velocity recording is carried out by another prescribed recording method.

Particularly, in 24-times velocity recording, when FIGS. 8(*a*) and (*b*) showing the results of overwriting characteristics of "Recording method CD-IIa" where $T_{d1}$ is not set to be constant, are compared with FIGS. 7(*a*) and (*b*) showing the results of overwriting characteristics of "Recording method CD1-1*a*" where $T_{d1}$ is set to be constant, it is apparent that in FIG. 8, the minimum value of the 3 T space length jitter is 24.1 nsec which is lower than 26.9 nsec in FIG. 7, and the Pw range within which the jitter is less than 35 nsec, is wider, indicating a wider power margin.

TABLE 1

| Recording method | | $T_{d1}$ | $\alpha_1$ | $\beta_1$ | $\Delta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|---|
| CD1-1a | m ≥ 3 | 0.9 | 1.1 | 1 | 0.35 | 1 | 1 | 0 | 1 | 0.4 | 0.4 |
|  | n = 5 | 0.9 | 1.1 | 1.35 | | | | | 1.4 | | 0.4 |
|  | n = 4 | 0.9 | 1.1 | 1 | | | | | 1 | | 0.4 |
|  | n = 3 | 0.9 | 1.6 | 0.7 | | | | | | | |
| CD2-1a | m ≥ 3 | 1.5 | 0.5 | 1.3 | 0.4 | 0.5 | 1.5 | 0.35 | 0.5 | 0.2 | 1.3 |
|  | n = 5 | 1.5 | 0.5 | 1.7 | | | | | 0.8 | | 1.6 |
|  | n = 4 | 1.5 | 0.5 | 1.3 | | | | | 0.5 | | 1.3 |
|  | n = 3 | 1.5 | 0.8 | 2 | | | | | | | |
| CD-IIa | m ≥ 3 | 1 | 1 | 0.95 | 0.3 | 1 | 1 | 0 | 0.95 | 0.4 | 0.3 |
|  | n = 5 | 1 | 1 | 1.25 | | | | | 1.35 | | 0.3 |
|  | n = 4 | 0.95 | 1 | 0.95 | | | | | 0.95 | | 0.3 |
|  | n = 3 | 0.75 | 1.9 | 0.3 | | | | | | | |

The results of evaluation of overwriting characteristics in the cases of "Recording method CD1-1*a*" and "Recording method CD-IIa" at 24-times velocity, are shown in FIGS. 7 and 8. Pe/Pw i.e. the ratio of erasing power Pe to writing power Pw was set to be 0.39 in "Recording method CD1-1*a*" and 0.33 in "Recording method CD-IIa". Pw was changed every 1 mW from 20 mW to about 27 mW. Bias power Pb was constant at 0.8 mW.

In the respective Figs., (a) to (f) show the Pw dependency of (a) 3 T mark length jitter, (b) 3 T space length jitter, (c) modulation $m_{11}$, (d) $R_{top}$, (e) 3 T mark length and (f) 3 T space length, respectively.

The optimum writing power where the jitter becomes minimum, was from 23 to 25 mW in "Recording method CD1-1*a*" and in the vicinity of from 23 to 27 mW in "Recording method CD-IIa", and the overwriting characteristics were evaluated by the values at such a power.

Figure 9:
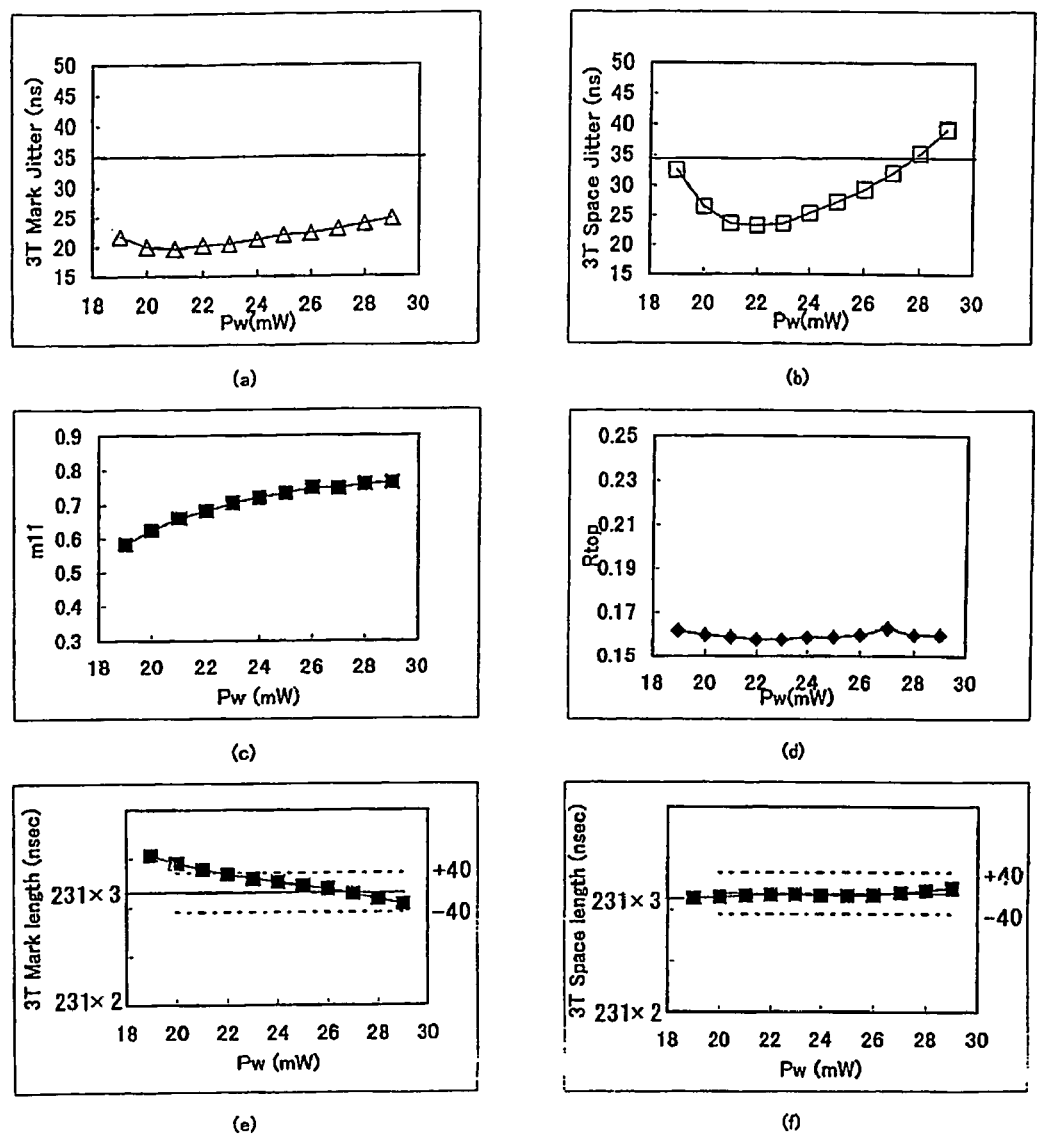
FIG. 9 presents data showing optical recording characteristics of an optical recording medium having a GeSbTe type recording layer, when 10-times velocity recording is carried out by another prescribed recording method.

The horizontal lines in FIGS. 7(*a*) and (*b*) and 8(*a*) and (*b*) indicate the standardized upper limit value of jitter=35 (nsec) during retrieving at 1-time velocity, and in the vicinity FIG. 9 shows the results of "Recording method CD2-1*a*" at 10-times velocity. Pe/Pw i.e. the ratio of erasing power Pe to writing power Pw is made to be constant at 0.39, and Pw was changed every 1 mW from about 19 mW to about 29 mW. Bias power Pb was constant at 0.8 W.

FIGS. 9(*a*) to (*f*) show the Pw dependency of (a) 3 T mark length jitter, (b) 3 T space length jitter, (c) modulation $m_{11}$, (d) $R_{top}$, (e) 3 T mark length and (f) 3 T space length, respectively. While the optimum writing power is in the vicinity of from 23 to 27 mW in 24-times velocity recording, it is in the vicinity of from 22 to 27 mW in 10-times velocity recording, and the overwriting characteristics were also evaluated by the values at this power.

The horizontal lines in FIGS. 9(*a*) and (*b*) indicate the standardized upper limit value of jitter=35 (nsec) during retrieving at 1-time velocity, and in the vicinity of the optimum Pw, good jitter values of less than 35 nsec were obtained. Further, the jitters of other mark lengths and space lengths were also less than 35 nsec.

From FIGS. 9(c) and (d), it is evident that in either recording method, the modulation $m_{11}$ was from 60% to 80% (from 0.6 to 0.8), and $R_{top}$ was from 15 to 25%.

In FIGS. 9(e) and (f), the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation of about ±20% is usually allowable, and accordingly, a deviation within ±30 to 40 nsec is allowable. From the Figs., it is evident that there is no substantial deviation of the mark lengths and space lengths, and deviations, if any, are within the allowable range. Likewise, in the vicinity of the optimum Pw, also with respect to the mark lengths and space lengths of from 4 T to 11 T, desired mark lengths and space lengths were obtained within a range of the reference clock period T±10%. As the asymmetry value, a value within ±10% was obtained.

In summarizing the foregoing, good recording characteristics were obtained at 10 and 24-times velocities, and if the recording medium and the recording pulse division method (II-A) or (V) of the present invention are applied, good characteristics will be obtained also at linear velocities between them, and the retrieving signals will be of a quality retrievable by conventional CD drives.

Figure 10:
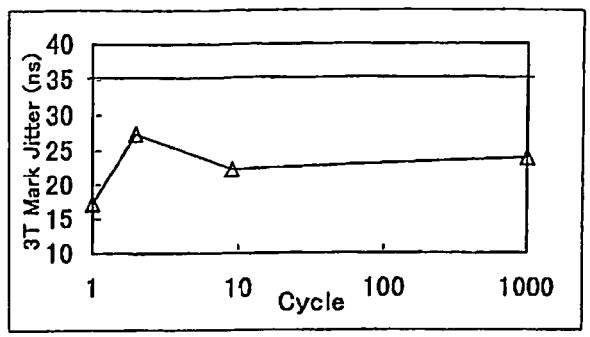
FIG. 10 presents data showing repeated overwriting characteristics of an optical recording medium having a GeSbTe type recording layer, when 24-times velocity recording is carried out by a prescribed recording method.
Figure 10:
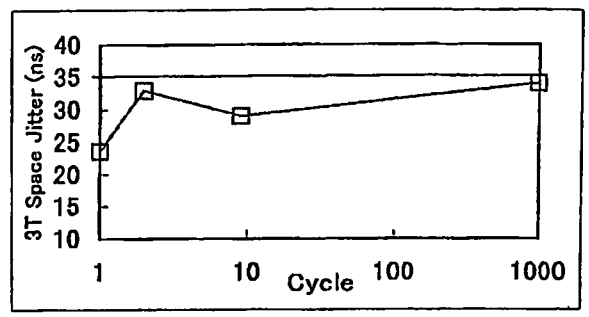
Figure 11:
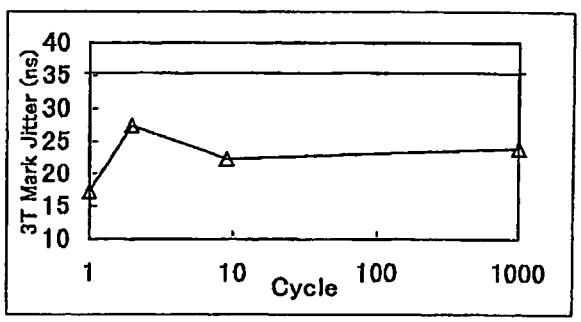
FIG. 11 presents data showing repeated overwriting characteristics of an optical recording medium having a GeSbTe type recording layer, when 24-times velocity recording is carried out by another prescribed recording method.
Figure 11:
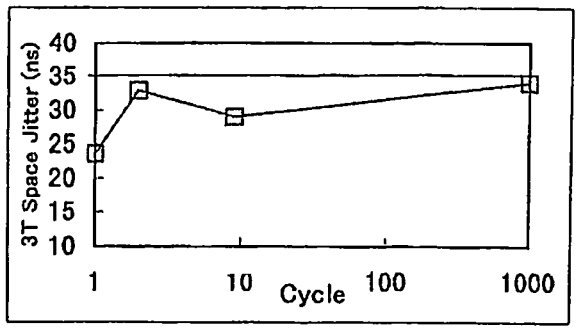
Figure 12:
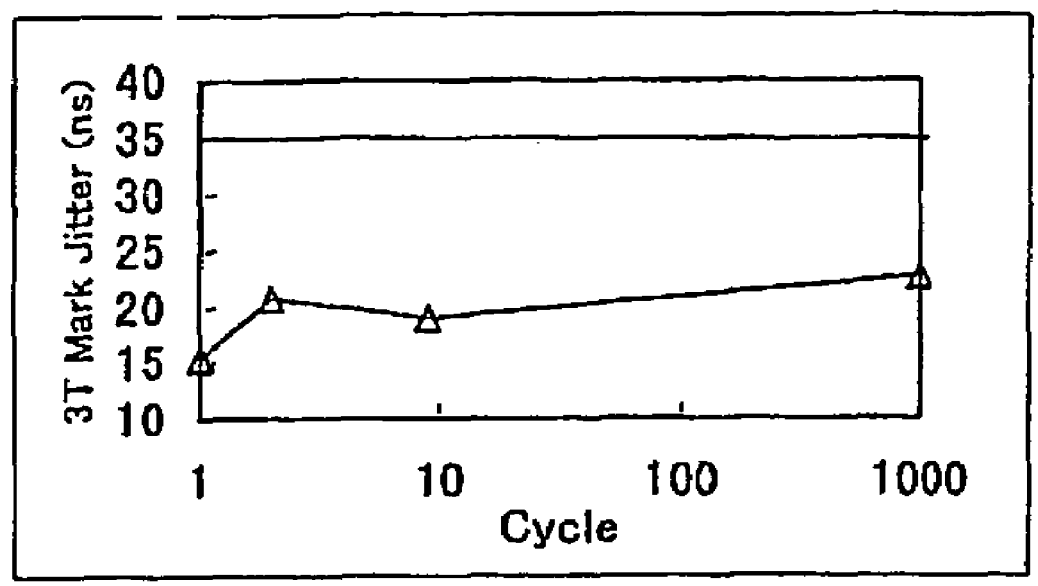
FIG. 12 presents data showing repeated overwriting characteristics of an optical recording medium having a GeSbTe type recording layer, when 10-times velocity recording is carried out by another prescribed recording method.
Figure 12:
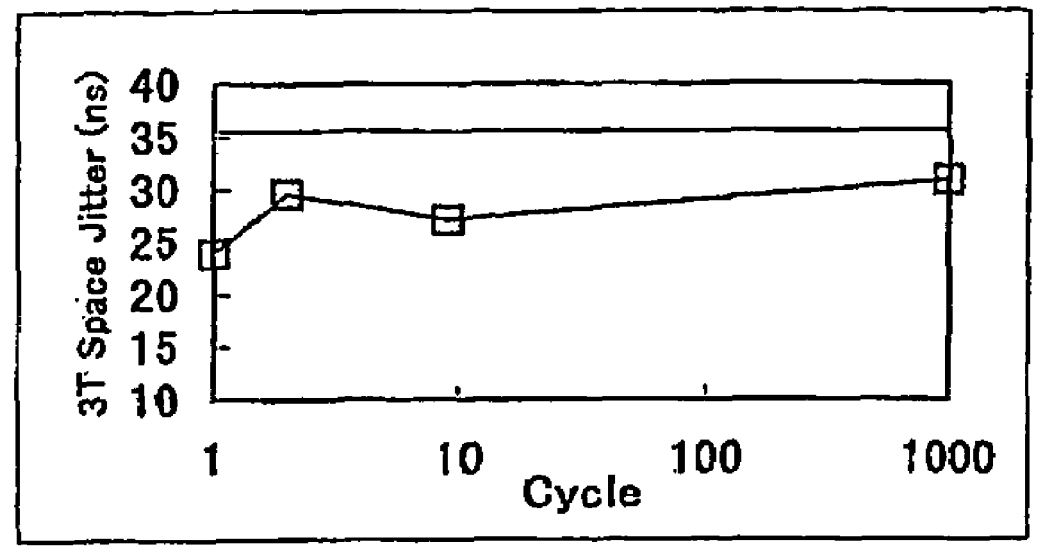

Now, the results of evaluation of overwriting durability will be described in cases wherein "Recording method CD1-1a" and "Recording method CD-IIa" at 24-times velocity, and "Recording method CD2-1a" at 10-times velocity were used. The overwriting cycle dependency when repeated overwriting was carried out at Pe/Pw=9.4 mW/24 mW, 8.6 mW/26 mW and 9 mW/23 mW, is shown in FIGS. 10, 11 and 12, respectively. In the respective Figs., (a) shows 3 T mark length jitter, and (b) shows 3 T space length jitter. In FIGS. 10, 11 and 12, for the purpose of showing the number of cycles of repeated overwriting on a logarithmic graph, the first recording is represented by first overwriting, and when overwriting was carried out nine times thereon, is represented by 10th overwriting. Also in the following Examples, the number of cycles of repeated overwriting is shown in the same manner on a logarithmic axis.

At each linear velocity, the overwriting durability of 1000 cycles required for CD-RW is sufficiently satisfied.

Further, the erase ratio at each linear velocity was measured. The 3 T/11 T overwriting erase ratio was measured at 10-times velocity by using 3 T and 11 T pulses of "Recording method CD2-1a", and at 24-times velocity by using 3 T and 11 T pulses of "Recording method CD-IIa". The 3 T/11 T overwriting erase ratios at 10-times velocity and 24-times velocity were 29 and 26 dB, respectively and thus sufficient erase ratios were obtained at the respective linear velocities.

Further, disks recorded at 24-times velocity by "Recording method CD1-1a" and "Recording method CD-IIa" were subjected to an accelerated test at 105° C., whereby even upon expiration of 3 hours, no substantial deterioration of the recorded signals was observed. The jitter was found to have increased by about 5 nsec, but still was lower than 35 nsec in retrieving at 1-time velocity, and the reflectivity $R_{top}$ and the modulation $m_{11}$ also did not substantially decrease and maintained at least 90% of the initial values.

Example 2

In the above Basic Example, a disk was prepared and recording was carried out as follows.

On a substrate, 80 nm of a lower protective layer made of $(ZnS)_{80}(SiO_2)_{20}$, 18 nm of a recording layer made of $In_{12}Ge_8Sb_{80}(In_{0.12}(Ge_{0.09}Sb_{0.91})_{0.88})$, 30 nm of an upper protective layer made of $(ZnS)_{80}(SiO_2)_{20}$, 200 nm of a reflective layer made of $Al_{99.5}Ta_{0.5}$ and about 4 μm of an ultraviolet-curable resin layer, were formed in this order to obtain a rewritable compact disk. The volume resistivity $\rho_v$ of this $Al_{99.5}Ta_{0.5}$ reflective layer was 80 nΩ·m, and the sheet resistivity $\rho_s$ was about 0.4Ω/□. The initialization was carried out by scanning a laser diode beam having a wavelength of about 810 nm and having an oval spot shape having a major axis of about 75 μm and a minor axis of about 1.0 μm, at a linear velocity of about 12 m/s. The irradiation power was 900 mW.

On this disk, by means of the tester 1 with NA=0.50, overwriting of EFM modulation signal was carried out at 24 and 10-times velocities, and the characteristics were evaluated.

While maintaining Pe/Pw i.e. the ratio of erasing power Pe to writing power Pw, to be constant, Pw was changed every 1 mW from about 21 mW to about 30 mW, whereby the overwriting characteristics at the respective writing powers were evaluated. Pb was constant at 0.8 mW. Each was evaluated by the value after overwriting ten times.

The recording pulse division method was as follows.

In 24-times velocity recording, recording method CD1-1 was applied. Firstly, a case where $T_{d1}$ and $T_{d1}'$ are constant irrespective of n, was studied, and in the following, this is designated as "recording method CD1-1b". "Recording method CD1-1b" is a practical usage wherein the number of independent parameters in the recording pulse division method (II-A) is further limited.

Recording Method CD1-1b

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m-1$), $\beta_{m-1}+\alpha^m=1.95$.

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_i'+\alpha_2'=2.35$, provided that $\beta_1'=\beta_1+\Delta_1$, $\beta_{i-1}'+\alpha_i'=2$ ($i=3$ to $m-1$), $\beta_{m-1}'+\alpha_m'=2.4$, provided that $\alpha_m'=\alpha_m+\beta_m$.

Here, $T_{d1}=T_{d1}'=0.9$, $\alpha_1=\alpha_1'=1.1$, $\beta_1=1$, $\Delta_1=0.35$, $\alpha_i=\alpha_i'=\alpha c=1$ (αc is constant with respect to i when i=2 to m−1), $\beta_{m-1}=0.9$, $\Delta_{m-1}=0.1$, $\Delta_m=0.35$, $\Delta_{mm}=0.45$, $\alpha_m=1.05$, and $\beta_m=\beta_m'=0.4$, and they are constant when m is at least 3.

Further, when m=2, with respect to 4 T mark, $T_{d1}=0.9$, $\alpha_1=1.1$, $\beta_1=0.9$, $\alpha_2=1.05$ and $\beta_m=0.4$. Here, 31=0.9 in 4 T mark is equal to $\beta_{m-1}$ ($\beta_2$) in the case where m=3 (6 T mark).

On the other hand, with respect to 5 T mark, $T_{d1}'=0.9$, $\alpha_1'=1.1$, $\beta_1'=1.35$, $\alpha_2'=1.4$ and m'=0.4.

When m=1, i.e. with respect to 3 T mark, $T_{d1}'=0.9$, $\alpha_1'=1.8$ and $\beta_1'=0.6$.

On the other hand, in the case of 10-times velocity recording, the following "Recording method CD2-1b" was used as recording method CD2-1. "Recording method CD2-

$1b$" is a practical usage wherein the number of independent parameters in the recording pulse division method (V) is further limited.

Recording Method CD2-1$b$

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_1+\alpha_2=2$, $\beta_{i-1}+\alpha_i=2$ ($i$=3 to $m$−1)

$\beta_{m-1}+\alpha_m=1.95$.

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.4$, provided that $\beta_1'=\beta_1+\Delta_1$, $\beta_{i-1}'+\alpha_i'=2$ ($i$=3 to $m$−1), $\beta_{m-1}'+\alpha_m'=2.55$, provided that $\beta_{m-1}'=\beta_{m-1}+\Delta_{m-1}$, and $\alpha_m'=\alpha_m+\beta_m$.

Here, $T_{d1}=T_{d1}'=1.5$, $\alpha_1=\alpha_1'=0.5$, $\beta_1=1.5$, $\Delta_1=0.4$, $\alpha_i=\alpha_i'=\alpha c=0.5$ ($\alpha c$ is constant with respect to i when i=2 to m−1), $\beta_{m-1}=1.45$, $\Delta_{m-1}=0.45$, $\Delta_m=0.15$, $\Delta_{mm}=0.6$, $\alpha_m=0.5$, and $\beta_m=\beta_m'=1.2$, and they are constant when m is at least 3.

Further, when m=2, with respect to 4 T mark, $T_{d1}=1.5$, $\alpha_1=0.5$, $\beta_1=1.45$, $\alpha_2=0.5$ and $\beta_2=1.2$. Here, $\beta_1=1.45$ in 4 T mark is equal to $\beta_2$ ($\beta_{m-1}$) in the case where m=2 (n=6 T mark).

On the other hand, with respect to 5 T mark, $T_{d1}'=1.5$, $\alpha_1'=0.5$, $\beta_1'=1.9$, $\alpha_2'=0.65$ and $\beta_2'=1.6$.

With respect to 3 T mark, $T_{d1}'=1.5$, $\alpha_1'=0.8$ and $\beta_1'=2$.

Then, the recording pulse division method (II-A) wherein $T_{d1}$ and $T_{d1}'$ are not set to be constant for all n and set to have different values with respect to 3 T and 4 T marks, was studied in recording at 24-times velocity by the following recording method CD-IIb.

Recording Method CD-IIb

With respect to an even number mark length nT=2mT in the case where m is at least 3, the mark is divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i$=2 to $m$−1), $\beta_{m-1}+\alpha_m=1.9$.

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.35$, provided that $\beta_1'=\beta_1+\Delta_1$, $\beta_{i-1}'+\alpha_i'=2$ ($i$=3 to $m$−1), $\beta_{m-1}'+\alpha_m'=2.4$, provided that $\alpha_m'=\alpha_m+\beta_m$.

Here, $T_{d1}=T_{d1}'=1$, $\alpha_1=\alpha_1'=1$, $\beta_1=1$, $\Delta_1=0.35$, $\alpha_i=\alpha_i'=\alpha c=1$ ($\alpha c$ is constant with respect to i when i=2 to m−1), $\beta_{m-1}=0.9$, $\Delta_{m-1}=0.1$, $\Delta_{m-1}=0.4$, $\Delta_m=0.5$, $\alpha_m=1$, and $\beta_m=\beta_m'=0.3$, and they are constant when m is at least 3.

When m=2, with respect to 4 T mark, $T_{d1}=0.95$, $\alpha_1=1$, $\beta_1=1$, $\alpha_2=1$ and $\beta_2=0.3$, and with respect to 5 T mark, $T_{d1}'=1$, $\alpha_1'=1$, $\beta_1'=1.35$, $\alpha_2'=1.4$ and $\beta_2'=0.3$.

Further, with respect to 3 T mark, $T_{d1}'=0.5$, $\alpha_1'=2.4$ and $\beta_1'=0.45$.

Further, $T_{d1}$, $\alpha_i$, $\beta_1$, etc. in each recording method are summarized in Table 2. Each recording method is based on the recording pulse method (II-A) or (V), and therefore, in the case where m is at least 3, ten parameters ($T_{d1}$, $\alpha_1$, $\beta_1$, $\Delta_1$, $\alpha c$, $\beta_{m-1}\Delta_{m-1}$, $\alpha_m$, $\Delta_m$ and $\beta_m$) and $T_{d1}$, $\alpha_i$ and $\beta_1$ when n=3, 4, 5, in the recording pulse division method (II), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\beta_1$, $\alpha_m$ and $\beta_m$. Here, in the recording methods CD1-1$b$ and 2-1$b$, $\beta_1$ in the case where n=4, is equal to $\beta_{m-1}$ in the case where m is at least 3 (n≧6), and $\beta_1'$ in the case where n=5, is equal to $\beta_1'(=\beta_1+\Delta_1)$ in the case where m is at least 3 (n≧6). In the recording method IIb, $\beta_1$ and $\beta_1'$ in the case where n=4, 5 are equal to $\beta_1$ and $\beta_1'(=\beta_1+\Delta_1)$ in the case where m is 3, respectively.

TABLE 2

| Recording method | | $T_{d1}$ | $\alpha_1$ | $\beta_1$ | $\Delta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|---|
| CD1-1b | m ≧ 3 | 0.9 | 1.1 | 1 | 0.35 | 1 | 0.9 | 0.1 | 1.05 | 0.35 | 0.4 |
| | n = 5 | 0.9 | 1.1 | 1.35 | | | | | 1.4 | | 0.4 |
| | n = 4 | 0.9 | 1.1 | 0.9 | | | | | 1.05 | | 0.4 |
| | n = 3 | 0.9 | 1.8 | 0.6 | | | | | | | |
| CD2-1b | m ≧ 3 | 1.5 | 0.5 | 1.5 | 0.4 | 0.5 | 1.45 | 0.45 | 0.5 | 0.15 | 1.2 |
| | n = 5 | 1.5 | 0.5 | 1.9 | | | | | 0.65 | | 1.6 |
| | n = 4 | 1.5 | 0.5 | 1.45 | | | | | 0.5 | | 1.2 |
| | n = 3 | 1.5 | 0.8 | 2 | | | | | | | |
| CD-IIb | m ≧ 3 | 1 | 1 | 1 | 0.35 | 1 | 0.9 | 0.1 | 1 | 0.4 | 0.3 |
| | n = 5 | 1 | 1 | 1.35 | | | | | 1.4 | | 0.3 |
| | n = 4 | 0.95 | 1 | 1 | | | | | 1 | | 0.3 |
| | n = 3 | 0.5 | 2.4 | 0.45 | | | | | | | |

Figure 13:
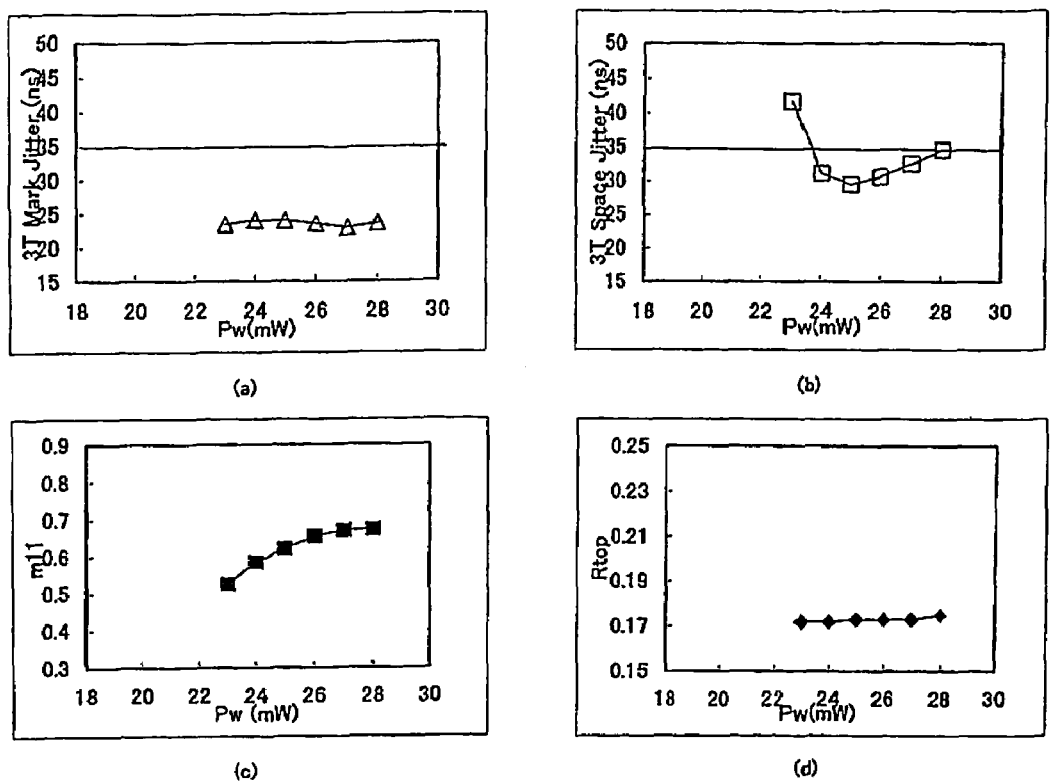
FIG. 13 presents data showing optical recording characteristics of an optical recording medium having a InGeSb type recording layer, when 24-times velocity recording is carried out by another prescribed recording method.
Figure 14:
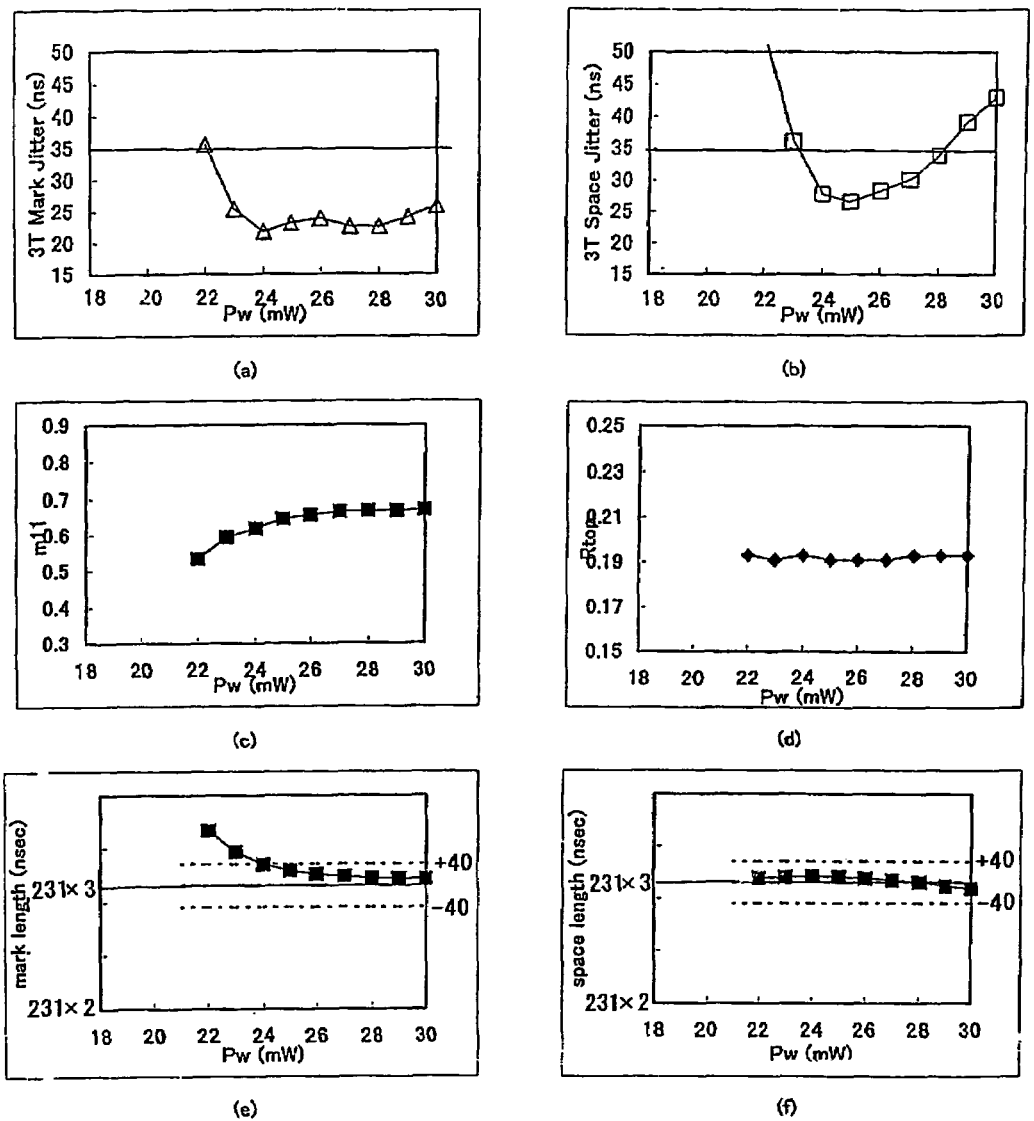
FIG. 14 presents data showing optical recording characteristics of an optical recording medium having a InGeSb type recording layer, when 24-times velocity recording is carried out by another prescribed recording method.
Figure 15:
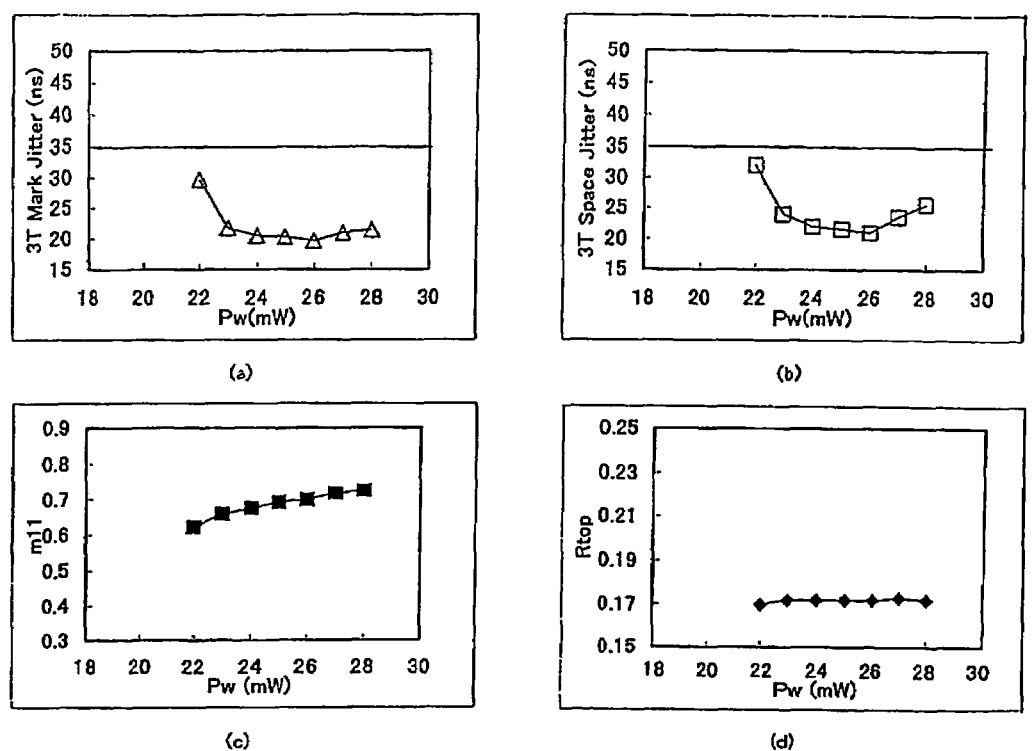
FIG. 15 presents data showing optical recording characteristics of an optical recording medium having a InGeSb type recording layer, when 10-times velocity recording is carried out by another prescribed recording method.

The results of evaluation of overwriting characteristics are shown in FIGS. 13 and 14 in the cases of "Recording method CD1-1$b$" and "Recording method CD-IIb" at 24-times velocity, and in FIG. 15 in the case of "Recording method CD2-1b" at 10-times velocity. Pe/Pw i.e. the ratio of erasing power Pe to writing power Pw was set to be 0.35 in "Recording method CD1-1b" and 0.33 in "Recording method CD-IIb" at 24-times velocity, and 0.31 in "Recording method CD2-1b" at 10-times velocity. Pw was changed every 1 mW from 21 mW to about 30 mW. Bias power Pb was constant at 0.8 mW.

In the respective Figs., (a) to (f) show the Pw dependency of (a) 3 T mark length jitter, (b) 3 T space length jitter, (c) modulation $m_{11}$, (d) $R_{top}$, (e) 3 T mark length and (f) 3 T space length, respectively.

The optimum writing power was in the vicinity of from 25 to 27 mW in "Recording method CD1-1b" and in the vicinity of from 24 to 28 mW in "Recording method CD-IIb" in the 24-times velocity recording, and in the vicinity of from 23 to 28 mW in the 10-times velocity recording, and the overwriting characteristics were evaluated by the values at such a power.

The horizontal lines in (a) and (b) in FIGS. 13, 14 and 15 indicate the standardized upper limit value of jitter=35 (nsec) during retrieving at 1-time velocity. Good jitter values of less than 35 nsec were obtained at any linear velocity.

From (c) and (d) in FIGS. 13, 14 and 15, it is evident that at any linear velocity, the modulation $m_{11}$ was from 60% to 80% (from 0.6 to 0.8), and $R_{top}$ was from 15 to 25%.

Then, 3 T mark lengths and 3 T space lengths during retrieving at 1-time velocity were measured in the cases where recording was carried out by "Recording method CD1-1b", "Recording method CD-IIb" and "Recording method CD2-1b". In either recording method, 3 T mark lengths and 3 T space lengths were within a range of a deviation of about ±10% from 23/nsec×3. Specifically, in FIGS. 14(e) and (f), the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation of about ±20% from the reference clock period T is usually allowable, and accordingly, a deviation within ±30 to 40 nsec is allowable. From FIGS. 14 (e) and (f), it is evident that there is no substantial deviation of the mark lengths and space lengths, and deviations, if any, are within the allowable range.

Likewise, in the vicinity of the optimum Pw, also with respect to the mark lengths and space lengths of from 4 T to 11 T, desired mark lengths and space lengths were obtained within a range of the reference clock period T±10%. As the asymmetry value, a value within ±10% was obtained.

In summarizing the foregoing, good recording characteristics were obtained at 10 and 24-times velocities, and the retrieving signals were of a quality retrievable by conventional CD drives. Further, by adjusting the pulses, good characteristics will be obtained also at linear velocities between them.

Now, the results of evaluation of overwriting durability will be described in cases wherein "Recording method CD1-1b" and "Recording method CD-IIb" at 24-times velocity, and "Recording method CD2-1b" at 10-times velocity were used. When repeated overwriting was carried out at Pw/Pe=25 mW/8.8 mW, 26 mW/8.6 mW and 26 mW/8.1 mW, respectively, at each linear velocity, the overwriting durability of 1000 cycles required for CD-RW was sufficiently satisfied.

Further, the erase ratio at each linear velocity was measured. The 3 T/11 T overwriting erase ratio was measured at 10-times velocity by using 3 T and 11 T pulses of "Recording method CD2-1b", and at 24-times velocity by using 3 T and 11 T pulses of "Recording method CD-IIb". The 3 T/11 T overwriting erase ratios at 10-times velocity and 24-times velocity were 28 and 21 dB, respectively, and thus sufficient erase ratios were obtained at the respective linear velocities.

Further, disks recorded at 24-times velocity by "Recording method CD1-1b" and "Recording method CD-IIb" were subjected to an accelerated test at 105° C., whereby even upon expiration of 3 hours, no substantial deterioration of the recorded signals was observed. The jitter was found to have changed by about 2 nsec, but still was lower than 35 nsec in retrieving at 1-time velocity, and the reflectivity $R_{top}$ and the modulation $m_{11}$ also did not substantially decrease and maintained at least 90% of the initial values.

Example 3

In the above Basic Example, a disk was prepared and recording was carried out as follows.

On a substrate, 80 nm of a lower protective layer made of $(ZnS)_{80}(SiO_2)_{20}$, 15 nm of a recording layer made of $Sn_{20}Ge_{18}Sb_{62}(Sn_{0.2}(Ge_{0.23}Sb_{0.77})_{0.8})$, 30 nm of an upper protective layer made of $(ZnS)_{80}(SiO_2)_{20}$, 200 nm of a reflective layer made of $Al_{99.5}Ta_{0.5}$ and about 4 μm of an ultraviolet-curable resin layer, were formed in this order to obtain a rewritable compact disk. The volume resistivity $\rho_v$ of this $Al_{99.5}Ta_{0.5}$ reflective layer was 80 nΩ·m, and the sheet resistivity $\rho_s$ was about 0.4Ω/□. The initialization was carried out by scanning a laser diode beam having a wavelength of about 810 nm and having an oval spot shape having a major axis of about 150 μm and a minor axis of about 1.0 μm, at a linear velocity of about 12 m/s. The irradiation power was 1600 mW.

On this disk, by means of the tester 1 with NA=0.50, overwriting of EFM modulation signal was carried out at 24 and 10-times velocities, and the characteristics were evaluated.

While maintaining Pe/Pw i.e. the ratio of erasing power Pe to writing power Pw, to be constant, Pw was changed every 1 mW from about 21 mW to about 30 mW, whereby the overwriting characteristics at the respective writing powers were evaluated. Pb was constant at 0.8 mW. Each was evaluated by the value after overwriting ten times.

The recording pulse division method was as follows.

In 24-times velocity recording, recording method CD1-1 was applied, this is designated as "recording method CD1-1c". "Recording method CD1-1c" is a practical usage wherein the number of independent parameters in the recording pulse division method (II-A) is further limited.

Recording Method CD1-1c

With respect to an even number mark length nT=2mT in the case where m is at least 3, the mark was divided into m sections, and $\alpha_i$ and $\beta_1$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.35$, provided that $\beta_1'=\beta_1+\Delta_1$, $\beta_{i-1}'+\alpha_i'=2$ ($i=3$ to $m-1$), $\beta_{m-1}'+\alpha_m'=2.45$, provided that $\beta_{m-1}'=\beta_{m-1}+\Delta_{m-1}$, $\alpha_m'=\alpha_m+\Delta_m$.

Here, $T_{d1}=T_{d1}'=1$, $\alpha_1=\alpha_1'=1$, $\beta_1=1$, $\Delta_1=0.35$, $\alpha_i=\alpha_i'=\alpha c=1$ ($\alpha c$ is constant with respect to i when i=2 to m−1), $\beta_{m-1}=1.0$, $\Delta_{m-1}=0$, $\Delta_m=0.5$, $\Delta_{mm}=0.5$, $\alpha_m=0.95$, and $\beta_m=\beta_m'=0.3$, and they are constant when m is at least 3.

Further, when m=2, with respect to 4 T mark, $T_{d1}=1$, $\alpha_1=1$, $\beta_1=1$, $\alpha_2=0.95$ and $\beta_m=0.3$, with respect to 5 T mark, $T_{d1}'=1$, $\alpha_1'=1$, $\beta_1'=1.35$, $\alpha_2'=1.45$ and $\beta_m'=0.3$.

When m=1, i.e. with respect to 3 T mark, $T_{d1}'=0.75$, $\alpha_1'=1.95$ and $\beta_1'=0.5$.

On the other hand, in the case of 10-times velocity recording, the following "Recording method CD2-1c" was used as recording method CD2-1. "Recording method CD2-1c" is a practical usage wherein the number of independent parameters in the recording pulse division method (V) is further limited.

Recording Method CD2-1c

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ (i=2 to m)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1{}^{1'}=2$, $\beta_1'+\alpha_2'=2.4$, provided that $\beta_1'=\beta_1+\Delta_1$, $\beta_{i-1}'+\alpha_i'=2$ (i=3 to m−1), $\beta_{m-1}'+\alpha_m=2.55$, provided that $\beta_{m-1}'=\beta_{m-1}+\Delta_{m-1}$, and $\alpha_m'=\alpha_m+\Delta_m$.

Here, $T_{d1}=T_{d1}'=1.5$, $\alpha_1=\alpha_1'=0.5$, $\beta_1=1.6$, $\Delta_1=0.4$, $\alpha_i=\alpha_i'=\alpha c=0.4$ ($\alpha c$ is constant with respect to i when i=2 to m−1), $\beta_{m-1}=1.6$, $\Delta_{m-1}=0.35$, $\Delta_m=0.2$, $\Delta_{mm}=0.55$, $\alpha_m=0.4$, and $\beta_m=\beta_m'=1.1$, and they are constant when m is at least 3.

Further, when m=2, with respect to 4 T mark, $T_{d1}=1.5$, $\alpha_1=0.5$, $\beta_1=1.6$, $\alpha_2=0.4$ and $\beta_2=1.1$, and with respect to 5 T mark, $T_{d1}=1.5$, $\alpha_1'=0.5$, $\beta_1'=2$, $\alpha_2'=0.6$ and $\beta_2'=1.45$. Here, $\beta_2'=1.45$ in 5 T mark is one having 0.35 imparted to $\beta_3'(\beta_m')=1.1$ where m=3 (6 T mark).

With respect to 3 T mark, $T_{d1}'=1.5$, $\alpha_1'=0.6$ and $\beta_1'=2.1$.

Further, $T_{d1}$, $\alpha_i$, $\beta_i$, etc. in each recording method are summarized in Table 3. Each recording method is based on the recording pulse method (II-A) or (V), and therefore, in the case where m is at least 3, ten parameters ($T_{d1}$, $\alpha_1$, $\beta_1$, $\Delta_1$, $\alpha c$, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (II-A), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\beta_1$, $\alpha_m$ and $\beta_m$. Here, in the recording methods CD1-1c and CD2-1c, $\beta_1$ and $\beta_1'$ in the case where n=4, 5 are equal to $\beta_1$ and $\beta_1'(=\beta_1+\Delta_1)$ in the case where m is 3, respectively.

TABLE 3

| Recording method | | $T_{d1}$ | $\alpha_1$ | $\beta_1$ | $\Delta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|---|
| CD1-1c | m ≥ 3 | 1 | 1 | 1 | 0.35 | 1 | 1 | 0 | 0.95 | 0.5 | 0.3 |
| | n = 5 | 1 | 1 | 1.35 | | | | | 1.45 | | 0.3 |
| | n = 4 | 1 | 1 | 1 | | | | | 0.95 | | 0.3 |
| | n = 3 | 0.75 | 1.95 | 0.5 | | | | | | | |
| CD2-1c | m ≥ 3 | 1.5 | 0.5 | 1.6 | 0.4 | 0.4 | 1.6 | 0.35 | 0.4 | 0.2 | 1.1 |
| | n = 5 | 1.5 | 0.5 | 2 | | | | | 0.6 | | 1.45 |
| | n = 4 | 1.5 | 0.5 | 1.6 | | | | | 0.4 | | 1.1 |
| | n = 3 | 1.5 | 0.6 | 2.1 | | | | | | | |

Figure 18:
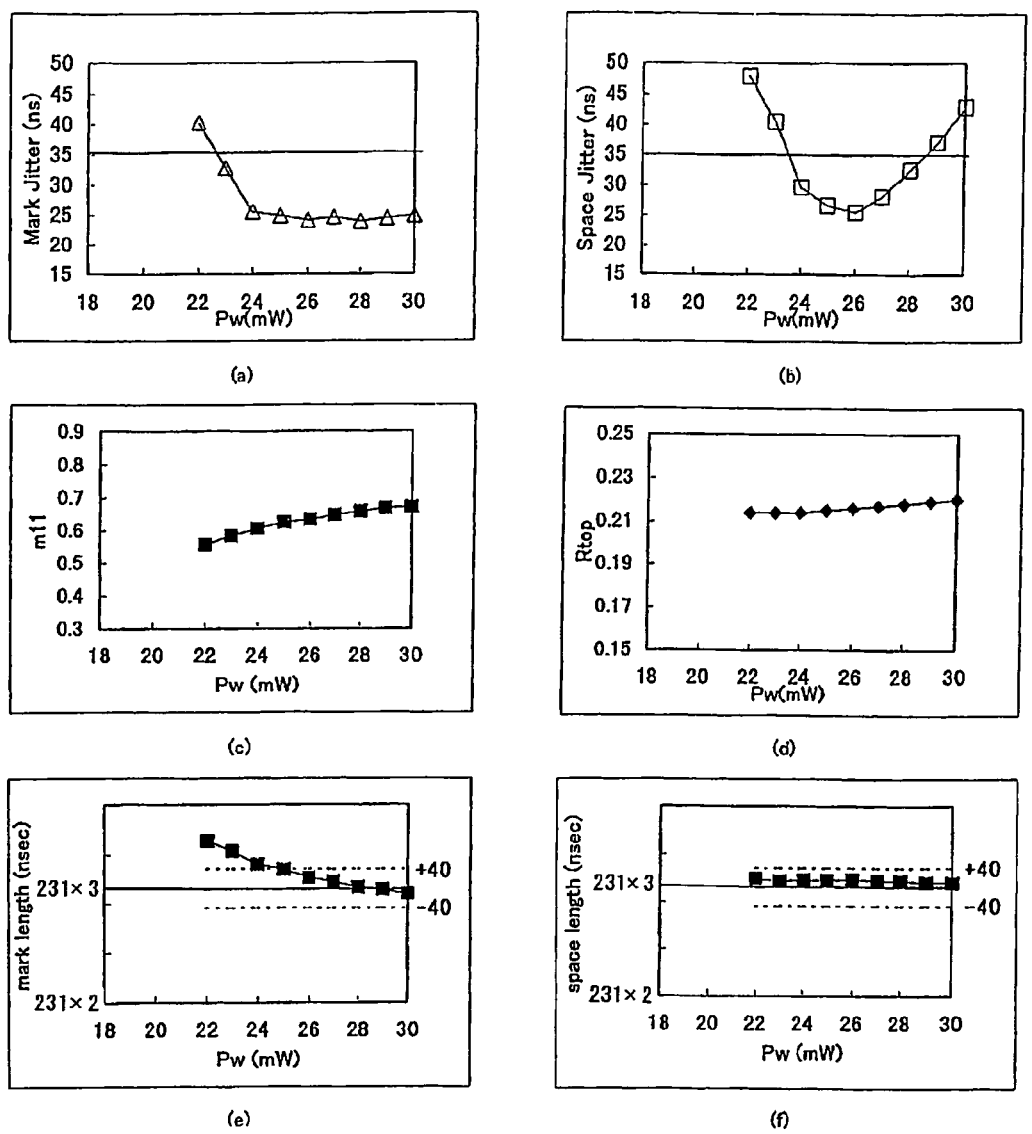
FIG. 18 presents data showing optical recording characteristics of an optical recording medium having a SnGeSb type recording layer, when 24-times velocity recording is carried out by another prescribed recording method.
Figure 19:
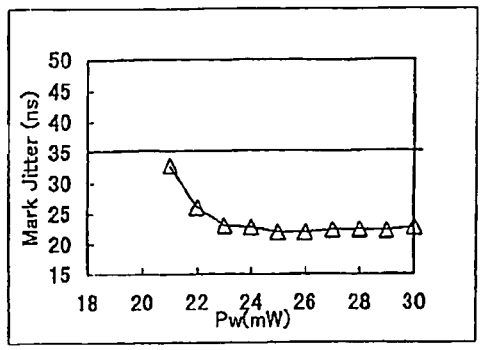
FIG. 19 presents data showing optical recording characteristics of an optical recording medium having a SnGeSb type recording layer, when 10-times velocity recording is carried out by another prescribed recording method.
Figure 19:
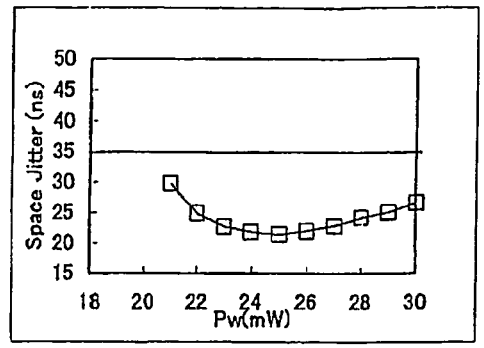
Figure 19:
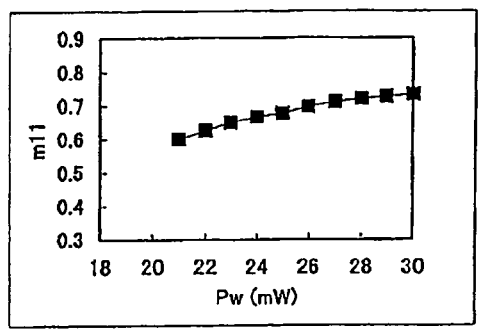
Figure 19:
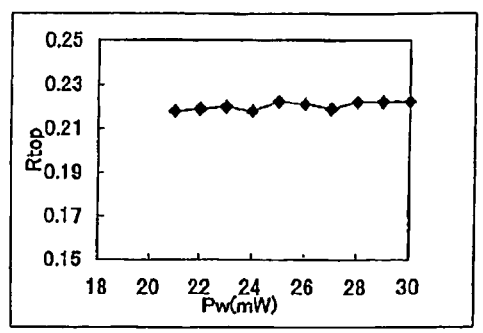
Figure 19:
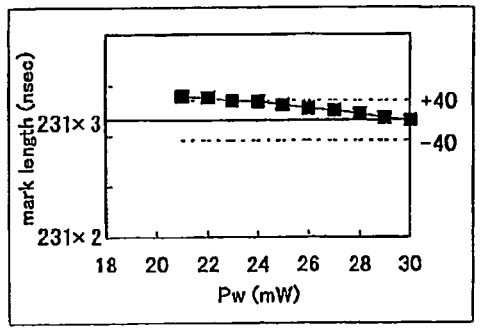
Figure 19:
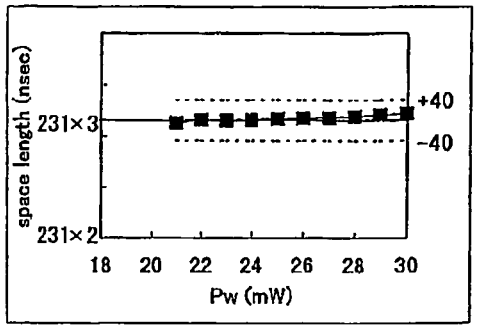

The results of evaluation of overwriting characteristics are shown in FIG. 18 in the case of "Recording method CD1-1c" at 24-times velocity and in FIG. 19 in the case of "Recording method CD2-1c" at 10-times velocity. Pe/Pw i.e. the ratio of erasing power Pe to writing power Pw was set to be 0.31 in "Recording method CD1-1c" at 24-times velocity and 0.33 in "Recording method CD2-1c" at 10-times velocity. Pw was changed every 1 mW from about 21 mW to about 30 mW. Bias power Pb was constant at 0.8 mW.

In the respective Figs., (a) to (f) show the Pw dependency of (a) 3 T mark length jitter, (b) 3 T space length jitter, (c) modulation $m_{11}$, (d) $R_{top}$, (e) 3 T mark length and (f) 3 T space length, respectively.

The optimum writing power was in the vicinity of from 25 to 28 mW in "Recording method CD1-1c" at 24-times velocity and in the vicinity of from 24 to 30 mW in "Recording method CD2-1c" at 10-times velocity, and the overwriting characteristics were evaluated by the values at such a power.

The horizontal lines in FIGS. 18(a) and (b) and 19(a) and (b) indicate the standardized upper limit value of jitter=35 (nsec) during retrieving at 1-time velocity. Good jitter values of less than 35 nsec were obtained at any linear velocity.

From FIGS. 18(c) and (d) and 19(c) and (d), it is evident that at any linear velocity, the modulation $m_{11}$ was from 60% to 80% (from 0.6 to 0.8), and $R_{top}$ was from 15 to 25%.

Then, 3 T mark lengths and 3 T space lengths during retrieving at 1-time velocity were measured in the cases where recording was carried out by "Recording method CD1-1c" and "Recording method CD2-1c". In either recording method, 3 T mark lengths and 3 T space lengths were within a range of a deviation of about ±10% from 23/nsec×3 nsec. Specifically, in FIGS. 18(e) and (f) and 19(e) and (f), the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation of about ±20% from the reference clock period T is usually allowable, and accordingly, a deviation within ±30 to 40 nsec is allowable. From FIGS. 18(*e*) and (*f*) and 19(*e*) and (*f*), it is evident that there is no substantial deviation of the mark lengths and space lengths, and deviations, if any, are within the allowable range.

Likewise, in the vicinity of the optimum Pw, also with respect to the mark lengths and space lengths of from 4 T to 11 T, desired mark lengths and space lengths were obtained within a range of the reference clock period T±10%. As the asymmetry value, a value within ±10% was obtained.

In summarizing the foregoing, good recording characteristics were obtained at 10 and 24-times velocities, and the retrieving signals were of a quality retrievable by conventional CD drives. Further, by adjusting the pulses, good characteristics will be obtained also at linear velocities between them.

Now, the results of evaluation of overwriting durability will be described in cases wherein "Recording method CD1-1*c*" at 24-times velocity, and "Recording method CD2-1*c*" at 10-times velocity were used. When repeated overwriting was carried out at Pw/Pe=26 mW/8.1 mW and 27 mW/8.9 mW, respectively, at each linear velocity, the overwriting durability of 1000 cycles required for CD-RW was sufficiently satisfied.

Further, the erase ratio at each linear velocity was measured. The 3 T/11 T overwriting erase ratio was measured at 10-times velocity by using 3 T and 11 T pulses of "Recording method CD2-1*c*", and at 24-times velocity by using 3 T and 11 T pulses of "Recording method CD1-1*c*". The 3 T/11 T overwriting erase ratios at 10-times velocity and 24-times velocity were 33 and 21 dB, respectively, and thus sufficient erase ratios were obtained at the respective linear velocities.

Further, disks recorded at 24-times velocity by "Recording method CD1-1*c*" were subjected to an accelerated test at 105° C., whereby even upon expiration of 3 hours, no substantial deterioration of the recorded signals was observed. The jitter was found to have changed by about 2 nsec, but still was lower than 35 nsec in retrieving at 1-time velocity, and the reflectivity $R_{top}$ and the modulation $m_{11}$ also did not substantially decrease and maintained at least 90% of the initial values.

Example 4

Using the disk of the above Example 3 and the tester 1, in 24-times velocity recording, recording method CD1-2 was applied, and this is designated as "recording method CD1-2*a*". "Recording method CD1-2*a*" is a practical usage wherein the number of independent parameters in the recording pulse division method (III-A) is further limited.

Recording Method CD1-2*a*

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$), $\beta_{m-1}'+\alpha_m'=2.85$, provided that $\beta_{m-1}'=\beta_{m-1}+\Delta_{m-1}$ and $\alpha_m'=\alpha_m+\beta_m$.

Here, $T_{d1}=T_{d1}'=1$, $\alpha_1=\alpha_1'=1$, $\alpha_i=\alpha_i'=\alpha c=1$ ($\alpha c$ is constant with respect to i when i=2 to m−1), $\beta_{m-1}=1$, $\Delta_{m-1}=0.4$, $\Delta_m=0.45$, $\Delta_{mm}=0.85$, $\alpha_m=1$, $\beta_m=0.3$ and $\Delta_m'=0$, and they are constant when m is at least 2.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2$ ($\beta_{m-1}$), $\beta_2'(\beta_{m-1}')$, $\alpha_3(\alpha_m)$, $\alpha_3'(\alpha_m')$, $\beta_3(\beta_m)$ and $\beta_3'(\beta_m')$ in the case where m=3, respectively.

Namely, with respect to 4 T mark, $\alpha_1=1$, $\beta_1=1$, $\alpha_2=1$ and $\beta_2=0.3$, and with respect to 5 T mark, $\alpha_1'=1$, $\beta_1'=1.4$, $\alpha_2'=1.45$ and $\beta_2'=0.3$.

When m=1, i.e. with respect to 3 T mark, $T_{d1}'=0.9$, $\alpha_1'=1.6$ and $\beta_1'=0.55$.

On the other hand, in the case of 10-times velocity recording, the following "Recording method CD2-2*a*" was used as recording method CD2-2. "Recording method CD2-2*a*" is a practical usage wherein the number of independent parameters in the recording pulse division method (VI) is further limited.

Recording Method CD2-2*a*

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$)

$\beta_{m-1}'+\alpha_m'=2.55$, provided that $\beta_{m-1}'=\beta_{m-1}+\alpha_{m-1}$, and $\alpha_m'=\alpha_m+\Delta_m$.

Here, $T_{d1}=T_{d1}'=1.5$, $\alpha_1=\alpha_1'=0.5$, $\alpha_i=\alpha_i'=\alpha c=0.4$ ($\alpha c$ is constant with respect to i when i=2 to m−1), $\beta_{m-1}=1.6$, $\Delta_{m-1}=0.35$, $\Delta_m=0.2$, $\Delta_{mm}=0.55$, $\alpha_m=0.4$, $\beta_m=0.8$ and $\Delta_m'=0.4$, and they are constant when m is at least 2.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2(\beta_{m-1})$, $\beta_2'(\beta_{m-1}')$, $\alpha_3(\alpha_m)$, $\alpha_3'(\alpha_m')$, $\beta_3(\beta_m)$ and $\beta_3'(\beta_m')$ in the case where m=3, respectively.

Namely, with respect to 4 T mark, $\alpha_1=0.5$, $\beta_1=1.6$, $\alpha_2=0.4$ and $\beta_2=0.8$, and with respect to 5 T mark, $\alpha_1=0.5$, $\beta_1'=1.95$, $\alpha_2'=0.6$ and $\beta_2'=1.2$.

With respect to 3 T mark, $T_{d1}'=1.5$, $\alpha_1'=0.7$ and $\beta_1'=1.7$.

Further, $T_{d1}$, $\alpha_i$, $\beta_i$, etc. in each recording method are summarized in Table 4.

In Table 4, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 4, they are presented in the columns for $T_{d1}$, $\alpha_1$ and $\beta_m$, respectively. In the case where n is from 4 to 11, in the recording pulse division method (III-A), $T_{d1}+\alpha_1=T_{d1}'+\alpha_1'=2$, $\beta_1+\alpha_2=\beta_{m-1}+\alpha_m=2$, $\alpha_1=\alpha_m=\alpha c$ and $\Delta_m$ were set to be constant irrespective of m. Therefore, although 10 parameters are presented in Table 4 including $T_{d1}$, $\beta_i$, $\beta_{m-1}$, $\beta_m$ and $\alpha_m$, independent parameters are 5 i.e. $\alpha_1$, $\alpha c$, $\Delta_{m-1}$, $\Delta_m$ and $\beta_m'$. Further, when n=4, $\beta_1=\beta_{m-1}=\beta c$, $\alpha_2=\alpha_m=\alpha c$ and $\beta_2=\beta_m$. When n=5, $\beta_1'=\beta c+\Delta_{m-1}$, $\alpha_2=\alpha c+\beta_m$, and $\beta_2'=\beta_m'+\beta_m'$.

TABLE 4

| Recording method | | $T_{d1}$ | $\alpha_1$ | $\beta_1$ | $\alpha c$ | $\beta_{m-1}$ | $\Delta_{m-1}$ | $\alpha_m$ | $\Delta_m$ | $\beta_m$ | $\Delta_m'$ |
|---|---|---|---|---|---|---|---|---|---|---|---|
| CD1-2a | n = 3 | 0.9 | 1.6 | | | | | | | 0.55 | |
| | n = 4~11 | 1 | 1 | 1 | 1 | 1 | 0.4 | 1 | 0.45 | 0.3 | 0 |
| CD2-2a | n = 3 | 1.5 | 0.7 | | | | | | | 1.7 | |
| | n = 4~11 | 1.5 | 0.5 | 1.6 | 0.4 | 1.6 | 0.35 | 0.4 | 0.2 | 0.8 | 0.4 |

Figure 22:
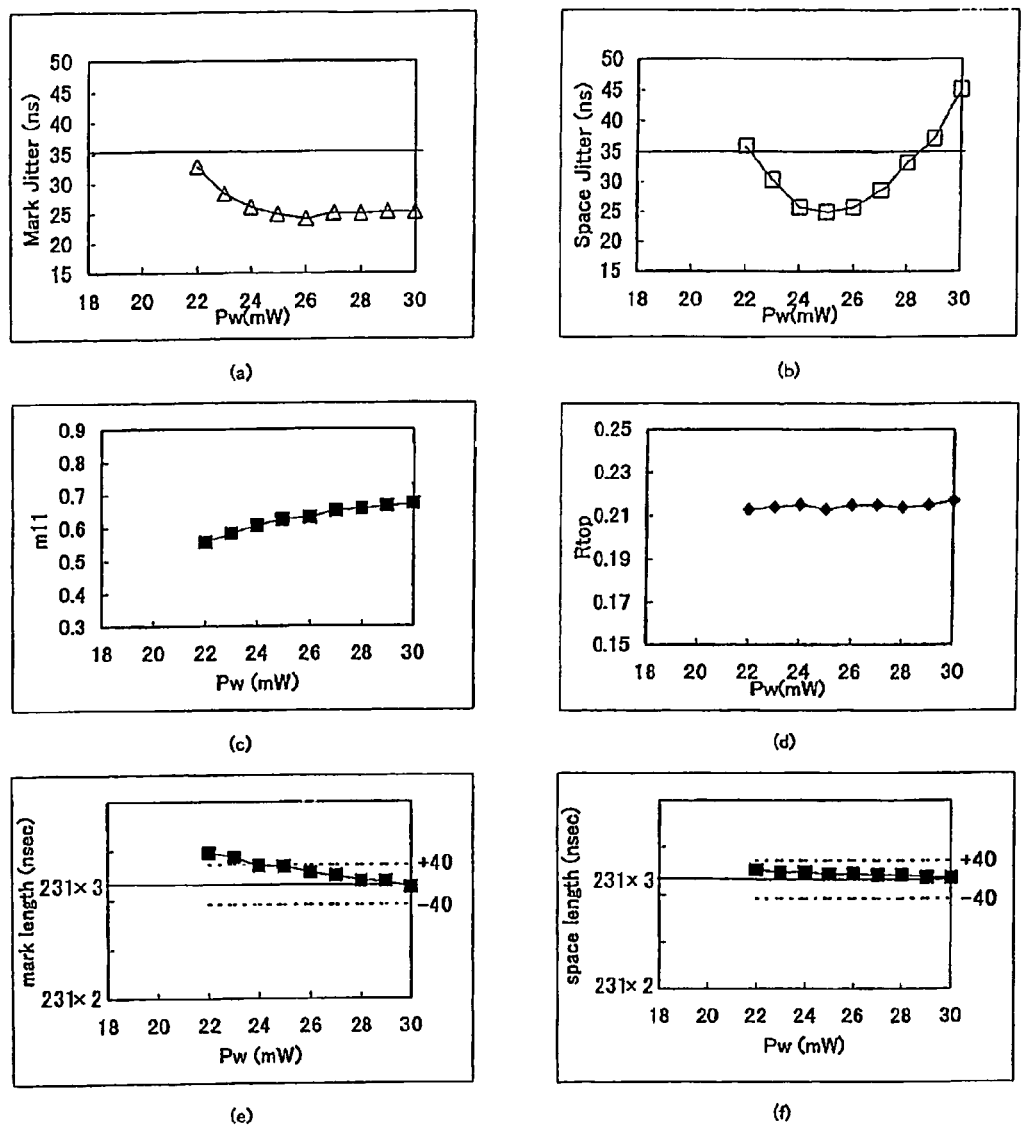
FIG. 22 presents data showing optical recording characteristics of an optical recording medium having a SnGeSb type recording layer, when 24-times velocity recording is carried out by another prescribed recording method.
Figure 23:
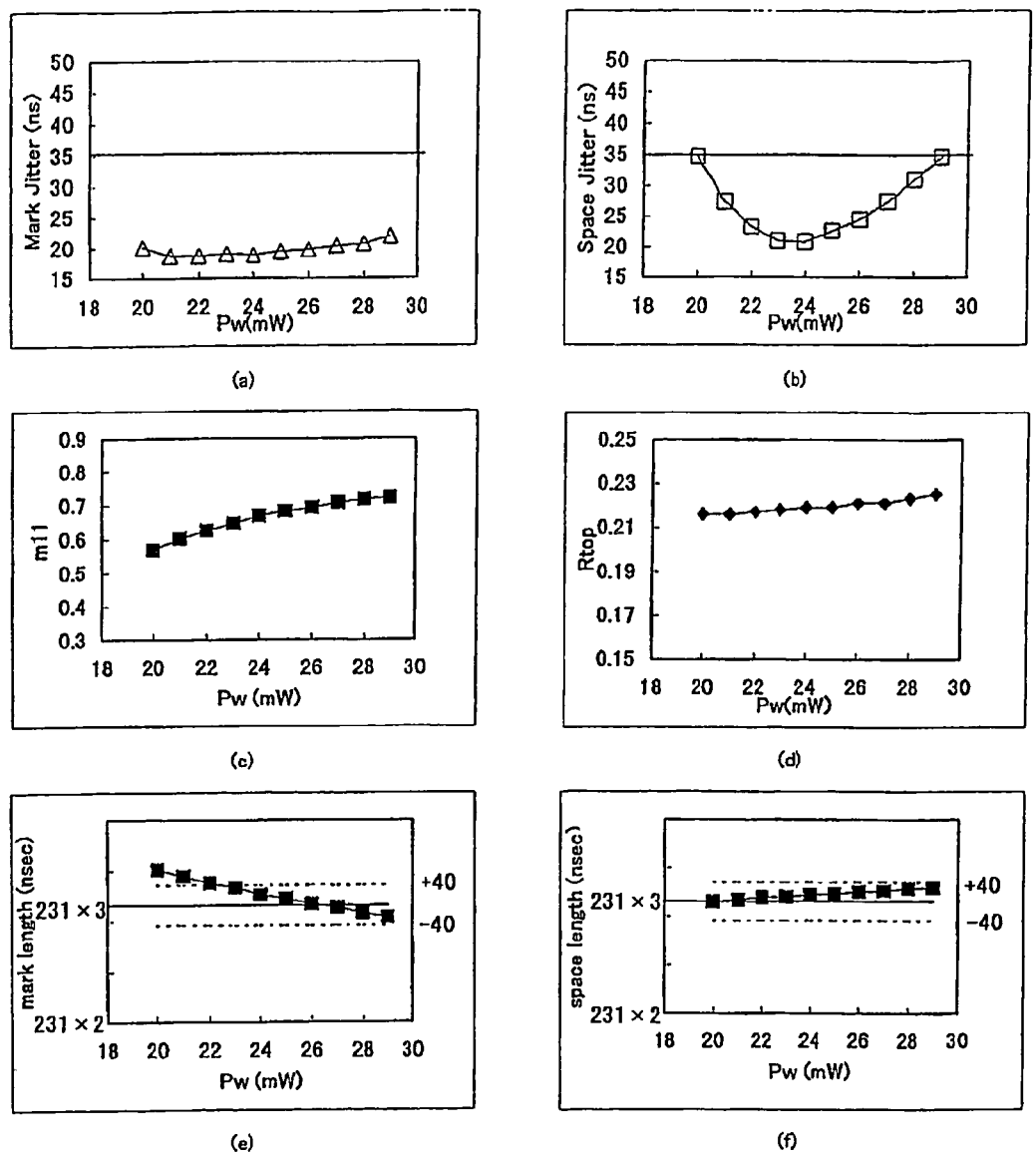
FIG. 23 presents data showing optical recording characteristics of an optical recording medium having a SnGeSb type recording layer, when 10-times velocity recording is carried out by another prescribed recording method.

The results of evaluation of overwriting characteristics are shown in FIG. 22 in the case of "Recording method CD1-2a" at 24-times velocity and in FIG. 23 in the case of "Recording method CD2-2a" at 10-times velocity. Pe/Pw i.e. the ratio of erasing power Pe to writing power Pw was set to be constant at 0.30 in "Recording method CD1-2a" at 24-times velocity and at 0.30 in "Recording method CD2-2a" at 10-times velocity. In "Recording method CD1-2a", Pw was changed every 1 mW from about 22 mW to about 30 mW. In "Recording method CD2-2a", Pw was changed every 1 mW from about 20 mW to about 29 mW. Bias power Pb was constant at 0.8 mW.

In the respective Figs., (a) to (f) show the Pw dependency of (a) 3 T mark length jitter, (b) 3 T space length jitter, (c) modulation $m_{11}$ (d) $R_{top}$, (e) 3 T mark length and (f) 3 T space length, respectively.

The optimum writing power was in the vicinity of from 24 to 28 mW in "Recording method CD1-2a" at 24-times velocity and in the vicinity of from 23 to 28 mW in "Recording method CD2-2a" at 10-times velocity, and the overwriting characteristics were evaluated by the values at such a power.

The horizontal lines in FIGS. 22(a) and (b) and 23(a) and (b) indicate the standardized upper limit value of jitter=35 (nsec) during retrieving at 1-time velocity. Good jitter values of less than 35 nsec were obtained at any linear velocity.

From FIGS. 22(c) and (d) and 23(c) and (d), it is evident that at any linear velocity, the modulation $m_{11}$ was from 60% to 80% (from 0.6 to 0.8), and $R_{top}$ was from 15 to 25%.

Then, 3 T mark lengths and 3 T space lengths during retrieving at 1-time velocity were measured in the cases where recording was carried out by "Recording method CD1-2a" and "Recording method CD2-2a". In either recording method, 3 T mark lengths and 3 T space lengths were within a range of a deviation of about +10% from 231 nsec×3 nsec. Specifically, in FIGS. 22(e) and (f) and 23(e) and (f), the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation of about ±20% from the reference clock period T is usually allowable, and accordingly, a deviation within ±30 to 40 nsec is allowable. From the FIGS. 22(e) and (f) and 23(e) and (f), it is evident that there is no substantial deviation of the mark lengths and space lengths, and deviations, if any, are within the allowable range.

Likewise, in the vicinity of the optimum Pw, also with respect to the mark lengths and space lengths of from 4 T to 11 T, desired mark lengths and space lengths were obtained within a range of the reference clock period T±10%. As the asymmetry value, a value within ±10% was obtained.

In summarizing the foregoing, good recording characteristics were obtained at 10 and 24-times velocities, and the retrieving signals were of a quality retrievable by conventional CD drives. Further, by adjusting the pulses, good characteristics will be obtained also at linear velocities between them.

Figure 24:
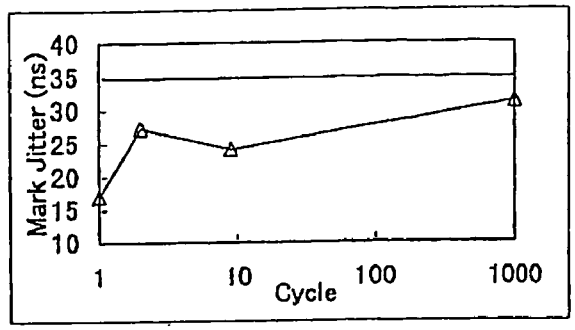
FIG. 24 presents data showing repeated overwriting characteristics of an optical recording medium having a SnGeSb type recording layer, when 24-times velocity recording is carried out by another prescribed recording method.
Figure 24:
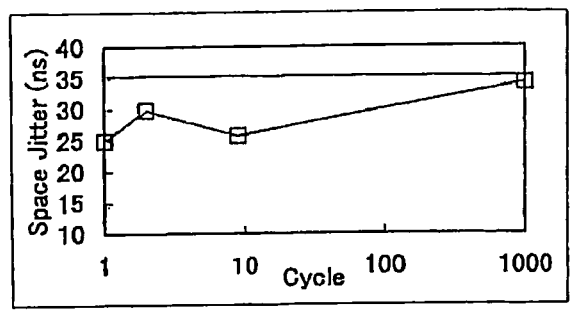
Figure 25:
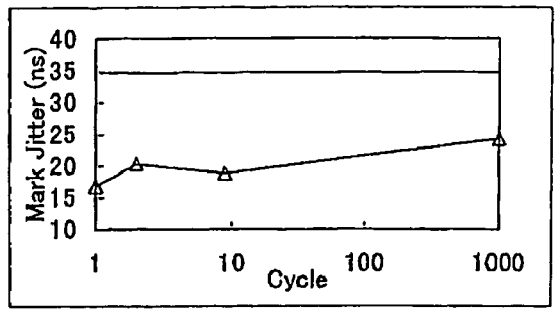
FIG. 25 presents data showing repeated overwriting characteristics of an optical recording medium having a SnGeSb type recording layer, when 10-times velocity recording is carried out by another prescribed recording method.
Figure 25:
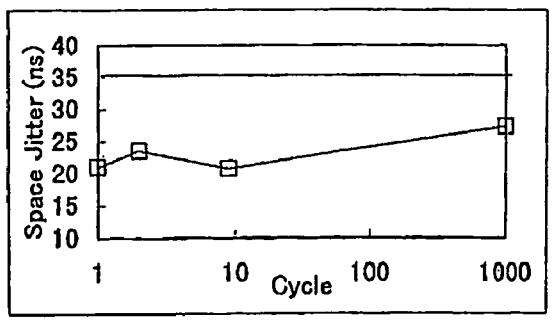

Now, the results of evaluation of overwriting durability will be described in cases wherein "Recording method CD1-2a" at 24-times velocity, and "Recording method CD2-2a" at 10-times velocity were used. The overwriting cycle dependency when repeated overwriting was carried out at Pw/Pe=26 mW/7.8 mW and 24 mW/7.2 mW is shown in FIGS. 24 and 25, respectively. In the respective Figs., (a) shows 3 T mark length jitter, and (b) shows 3 T space length jitter.

At each linear velocity, the overwriting durability of 1000 cycles required for CD-RW is sufficiently satisfied.

Further, disks recorded at 24-times velocity by "Recording method CD1-2a" were subjected to an accelerated test at 105° C., whereby even upon expiration of 3 hours, no substantial deterioration of the recorded signals was observed. The jitter was found to have changed by about 2 nsec, but still was lower than 35 nsec in retrieving at 1-time velocity, and the reflectivity $R_{top}$ and the modulation $m_{11}$ also did not substantially decrease and maintained at least 90% of the initial values.

Example 5

In the above Basic Example, a disk was prepared and recording was carried out as follows.

On a substrate, 80 nm of a lower protective layer made of $(ZnS)_{80}(SiO_2)_{20}$, 15 nm of a recording layer made of $Ge_{15}Sb_{65}Sn_{20}(Sn_{0.2}(Ge_{0.19}Sb_{0.81})_{0.8})$, 27 nm of an upper protective layer made of $(ZnS)_{80}(SiO_2)_{20}$, 3 nm of an interfacial layer made of $SiO_2$, 200 nm of a reflective layer made of Ag and about 4 μm of an ultraviolet-curable resin layer, were formed in this order to obtain a rewritable compact disk. The volume resistivity $\rho_v$ of this Ag reflective layer was 24 nΩ·m, and the sheet resistivity $\rho_s$ was about 0.12Ω/□. The initialization was carried out by scanning a laser diode beam having a wavelength of about 810 nm and having an oval spot shape having a major axis of about 150 μm and a minor axis of about 1.0 μm, in the minor axis direction at a linear velocity of about 12 m/s. The irradiation power was 1650 mW.

On this disk, by means of the tester 1 with NA=0.50, overwriting of EFM modulation signal was carried out at 32, 24 and 10-times velocities, and the characteristics were evaluated.

While maintaining Pe/Pw i.e. the ratio of erasing power Pe to writing power Pw, to be constant, Pw was changed every 1 mW from about 19 mW to about 30 mW, whereby the overwriting characteristics at the respective writing powers were evaluated. Each was evaluated by the value after overwriting ten times.

In 32-times velocity recording, recording method CD1-1 was applied, this is designated as "Recording method CD1-1*d*". "Recording method CD1-1*d*" is a practical usage wherein the number of independent parameters in the recording pulse division method (II-A) is further limited.

Recording Method CD1-1*d*

With respect to an even number mark length nT=2mT in the case where m is at least 3, the mark was divided into m sections, and $\alpha_i$ and $\beta_i$ in recording pulse sections $\alpha_i$T and off-pulse sections $\beta_i$T were set to be as follows.

$T_{d1}+\alpha_1=2$, $\beta_1+\alpha_2=2$, $\beta_{i-1}+\alpha_i=2$ ($i=3$ to $m-1$), $\beta_{m-1}+\alpha_m=2$.

On the other hand, with respect to an odd number mark length nT=(2m+1)T in the case where m is at least 3, the mark was divided into m sections, and $\alpha_i'$ and $\beta_i'$ in recording pulse sections $\alpha_i'$T and off-pulse sections $\beta_i'$T were set to be as follows.

$T_{d1}'+\alpha_1'=2$, $\beta_1'+\alpha_2'=2.32$, provided that $\beta_1'=\beta_1+\Delta_1$, $\beta_{i-1}'+\alpha_i'=2$ ($i=3$ to $m-1$), $\beta_{m-1}'+\alpha_m'=2.44$, provided that $\beta_{m-1}'=\beta_{m-1}+\beta_{m-1}$ and $\alpha_m=\alpha_m+\Delta_m$.

Here, $T_{d1}=T_{d1}'=1$, $\alpha_1=\alpha_1'=1$, $\beta_1=1.06$, $\Delta_1=0.32$, $\alpha_i=\alpha_i'=\alpha c=0.94$ ($\alpha c$ is constant with respect to i when i=2 to m−1), $\beta_{m-1}=1.06$, $\Delta_{m-1}=0$, $\Delta_m=0.44$, $\Delta_{mm}=0.44$, $\alpha_m=0.94$, and $\beta_m=\beta_m'=0.44$, and they are constant when m is at least 3.

Further, when m=2, with respect to 4 T mark, $T_{d1}=1$, $\alpha_1=1$, $\beta_1=1.06$, $\alpha_2=0.94$ and $\beta_2=0.44$, and with respect to 5 T mark, $T_{d1}'=1$, $\alpha_1'=1$, $\beta_1'=1.38$, $\alpha_2'=1.38$ and $\beta_m'=0.44$.

When m=1, i.e. with respect to 3 T mark, $T_{d1}'=0.81$, $\alpha_1'=1.91$ and $\beta_1'=0.25$.

Then, in the case of 24-times velocity recording, the following "Recording method CD2-1*d*" was used as a specific example of recording method CD2-1. "Recording method CD2-1*d*" is a practical usage wherein the number of independent parameters in the recording pulse division method (V) is further limited.

Recording Method CD2-1*d*

With respect to an even number mark length nT=2mT in the case where m is at least 3, at the time of recording the mark, the mark was divided into m sections, and $\alpha_i$ and $\beta_i$ in recording pulse sections $\alpha_i$T and off-pulse sections $\beta_i$T were set to be as follows.

$T_{d1}+\alpha_1=2$, $\beta_1+\alpha_2=1.85$, $\beta_{i-1}+\alpha_i=2$ ($i=2$ to $m$)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'$T and off-pulse sections $\beta_i'$T were set to be as follows.

$T_{d1}'+\alpha_1'=2$, $\beta_1'+\alpha_2'=2.35$, provided that $\beta_1'=\beta_1+\Delta_1$, $\beta_{i-1}'+\alpha_i'=2$ ($i=3$ to $m-1$), $\beta_{m-1}'+\alpha_m'=2.3$, provided that $\beta_{m-1}'=\beta m-1+\alpha_{m-1}$, and $\alpha_m'=\alpha_m+\beta_m$.

Here, $T_{d1}=T_{d1}'=1.3$, $\alpha_1=\alpha_1'=0.7$, $\beta_1=1.15$, $\Delta_1=0.5$, $\alpha_i=\alpha_i'=\alpha c=0.7$ ($\alpha c$ is constant with respect to i when i=2 to m−1), $\beta_{m-1}=1.3$, $\Delta_{m-1}=0.15$, $\Delta_m=0.15$, $\Delta_{mm}=0.3$, $\alpha_m=0.7$, and $\beta_m=\beta_m'=0.7$, and they are constant when m is at least 3.

Further, when m=2, with respect to 4 T mark, $T_{d1}=1.3$, $\alpha_1=0.7$, $\beta_1=1.15$, $\alpha_2=0.7$ and $\beta_2=0.7$, and with respect to 5 T mark, $T_{d1}'=1.3$, $\alpha_1'=0.7$, $\beta_1'=1.65$, $\alpha_2'=1.05$ and $\beta_2'=0.7$. Here, $\alpha_2'=1.05$ is one having 0.2 added to $\alpha_3'(\alpha_m'=\alpha_m+\Delta_m=0.7+0.15=0.85)$ where m=3 (6 T mark).

With respect to 3 T mark, $T_{d1}'=1.3$, $\alpha_1=1.1$ and $\beta_1=0.95$.

Further, in the case of 10-times velocity recording, the following "Recording method CD2-1*e*" was used as a specific example of recording method CD2-1. "Recording method CD2-1*e*" is a practical usage wherein the number of independent parameters in the recording pulse division method (V) is further limited.

Recording Method CD2-1*e*

With respect to an even number mark length nT=2mT in the case where m is at least 3, at the time of recording the mark, the mark was divided into m sections, and $\alpha_i$ and $\beta_i$ in recording pulse sections $\alpha_i$T and off-pulse sections $\beta_i$T were set to be as follows.

$T_{d1}+\alpha_1=2$, $\beta_1+\alpha_2=2$, $\beta_{i-1}+\alpha_i=2$ ($i=2$ to $m$)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'$T and off-pulse sections $\beta_i'$T were set to be as follows.

$T_{d1}'+\alpha_1'=2$, $\beta_1'+\alpha_2'=2.3$, provided that $\beta_1'=\beta_1+\Delta_1$, $\beta_{i-1}'+\alpha_i'=2$ ($i=3$ to $m-1$), $\beta_{m-1}'+\alpha_m'=2.3$, provided that $\beta_{m-1}'=\beta_{m-1}+\alpha_{m-1}$, and $\alpha_m'=\alpha_m+\Delta_m$.

Here, $T_{d1}=T_{d1}'=1.7$, $\alpha_1=\alpha_1'=0.3$, $\beta_1=1.7$, $\Delta_1=0.3$, $\alpha_i=\alpha_i'=\alpha c=0.3$ ($\alpha c$ is constant with respect to i when i=2 to m−1), $\beta_{m-1}=1.7$, $\Delta_{m-1}=0.35$, $\Delta_m=0.15$, $\Delta_{mm}=0.45$, $\alpha_m=0.3$, and $\beta_m=\beta_m'=1.2$, and they are constant when m is at least 3.

Further, when m=2, with respect to 4 T mark, $T_{d1}=1.7$, $\alpha_1=0.3$, $\beta_1=1.7$, $\alpha_2=0.3$ and $\beta_2=1.2$, and with respect to 5 T mark, $T_{d1}'=1.7$, $\alpha_1'=0.3$, $\beta_1'=2$, $\alpha_2'=0.45$ and $\beta_2'=1.65$. Here, $\beta_2'=1.65$ is one having 0.45 added to $\beta_3'(\beta_m'=1.2)$ where m=3 (6 T mark).

With respect to 3 T mark, $T_{d1}'=1.7$, $\alpha_1'=0.5$ and $\beta_1'=1.9$.

Further, $T_{d1}$, $\alpha_i$, $\beta_i$, etc. in each recording method are summarized in Table 5. Each recording method is based on the recording pulse method (II) or (V), and therefore, in the case where m is at least 3, ten parameters ($T_{d1}$, $\alpha_1$, $\beta_1$, $\Delta_1$, $\alpha c$, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (II-A), are presented. However, ($T_{d1}'$, $α_1'$ and $β_1'$) in the case where n=3 are presented in the columns for $T_{d1}$, $α_1$ and $β_1$. ($T_{d1}$, $α_1$, $β_1$, $α_2$ and $β_2$) in the case where n=4 and ($T_{d1}'$, $α_1'$, $β_1'$, $α_2'$ and $β_2'$) in the case where n=5 are presented in the columns for $T_{d1}$, $α_1$, $β_1$, $α_m$ and $β_m$.

Here, in the recording methods CD1-1d, 2-1d and 2-1e, $β_1$ and $β_1'$ in the case where n=4, 5 are equal to $β_1$ and $β_1'$ (=$β_1$+$Δ_1$) in the case where m is 3, respectively.

TABLE 5

| Recording method | | $T_{d1}$ | $α_1$ | $β_1$ | $Δ_1$ | $αc$ | $β_{m-1}$ | $Δ_{m-1}$ | $α_m$ | $Δ_m$ | $β_m$ |
|---|---|---|---|---|---|---|---|---|---|---|---|
| CD1-1d | m ≥ 3 | 1 | 1 | 1.06 | 0.32 | 0.94 | 1.06 | 0 | 0.94 | 0.44 | 0.44 |
|  | n = 5 | 1 | 1 | 1.38 | | | | | 1.38 | | 0.44 |
|  | n = 4 | 1 | 1 | 1.06 | | | | | 0.94 | | 0.44 |
|  | n = 3 | 0.81 | 1.94 | 0.25 | | | | | | | |
| CD2-1d | m ≥ 3 | 1.3 | 0.7 | 1.15 | 0.5 | 0.7 | 1.3 | 0.15 | 0.7 | 0.15 | 0.7 |
|  | n = 5 | 1.3 | 0.7 | 1.65 | | | | | 1.05 | | 0.7 |
|  | n = 4 | 1.3 | 0.7 | 1.15 | | | | | 0.7 | | 0.7 |
|  | n = 3 | 1.3 | 1.1 | 0.95 | | | | | | | |
| CD2-1e | m ≥ 3 | 1.7 | 0.3 | 1.7 | 0.3 | 0.3 | 1.7 | 0.35 | 0.3 | 0.15 | 1.2 |
|  | n = 5 | 1.7 | 0.3 | 2 | | | | | 0.45 | | 1.65 |
|  | n = 4 | 1.7 | 0.3 | 1.7 | | | | | 0.3 | | 1.2 |
|  | n = 3 | 1.7 | 0.5 | 1.9 | | | | | | | |

Figure 26:
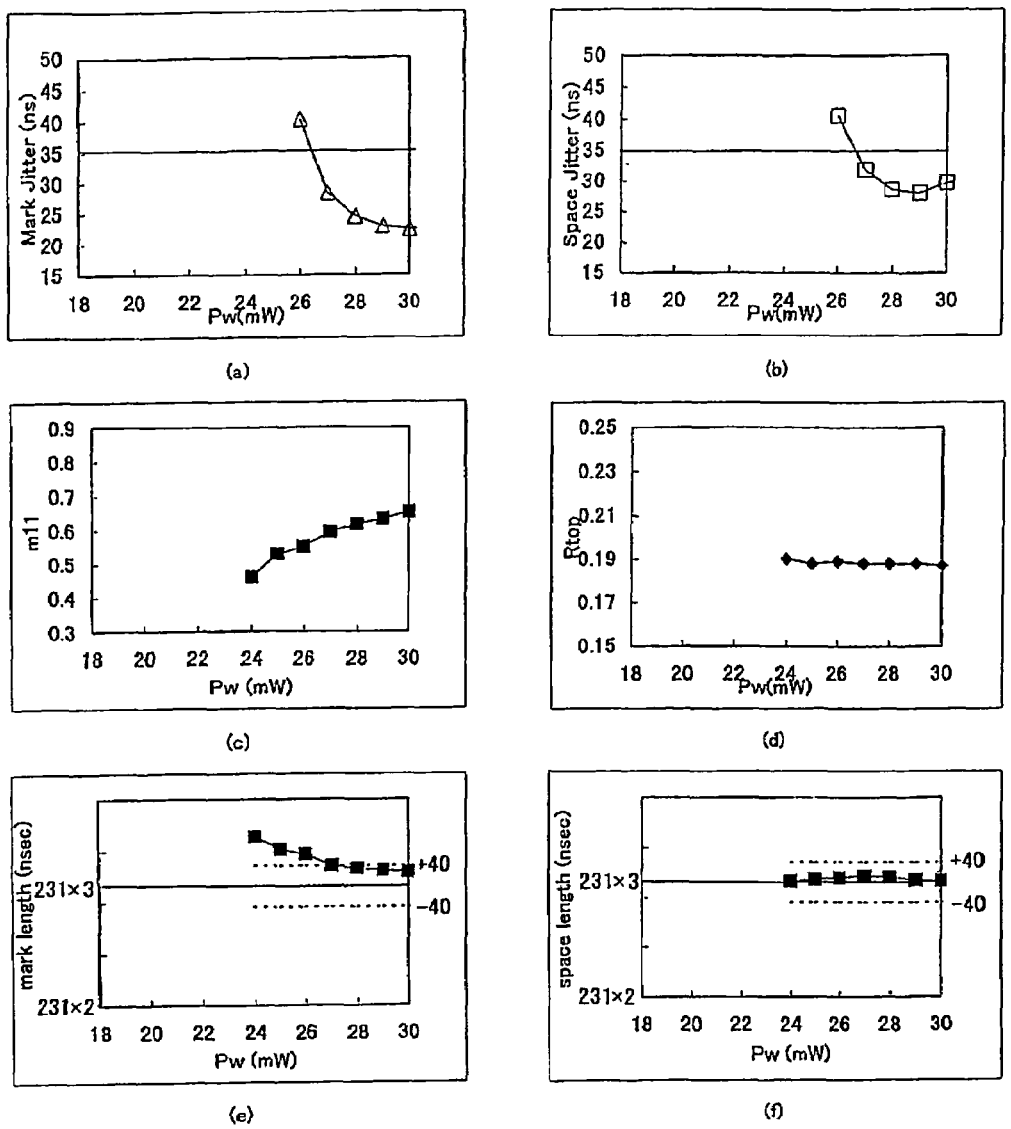
FIG. 26 presents data showing optical recording characteristics of an optical recording medium having a SnGeSb type recording layer, when 32-times velocity recording is carried out by another prescribed recording method.
Figure 27:
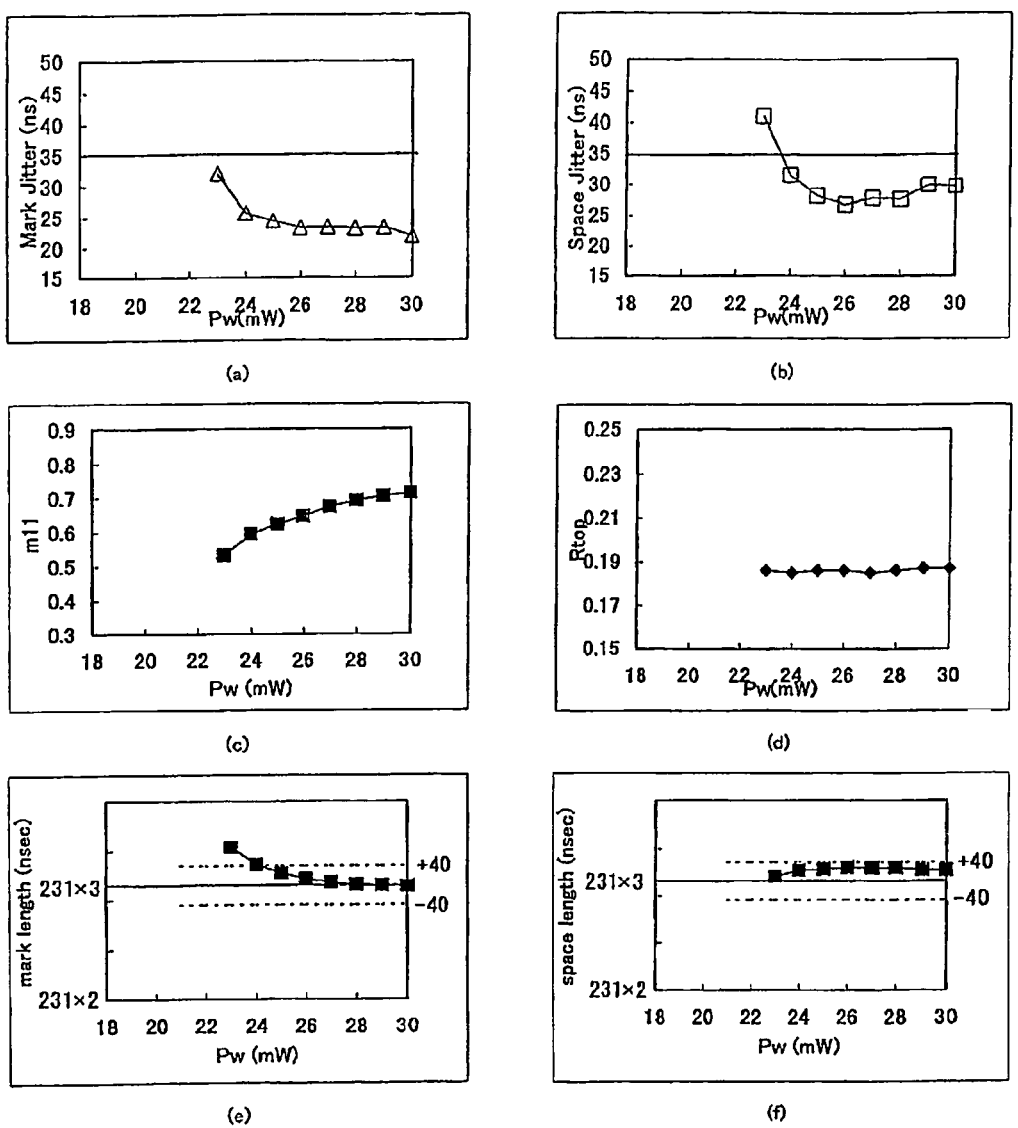
FIG. 27 presents data showing optical recording characteristics of an optical recording medium having a SnGeSb type recording layer, when 24-times velocity recording is carried out by another prescribed recording method.
Figure 28:
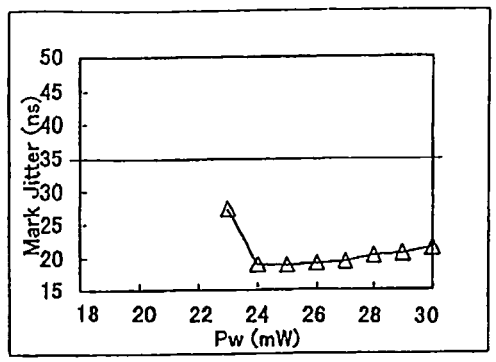
FIG. 28 presents data showing optical recording characteristics of an optical recording medium having a SnGeSb type recording layer, when 10-times velocity recording is carried out by another prescribed recording method.
Figure 28:
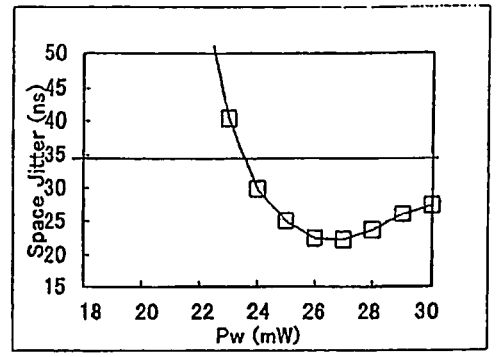
Figure 28:
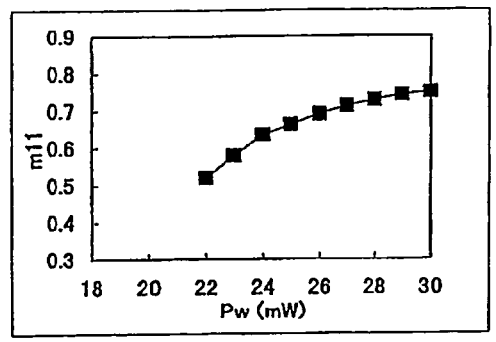
Figure 28:
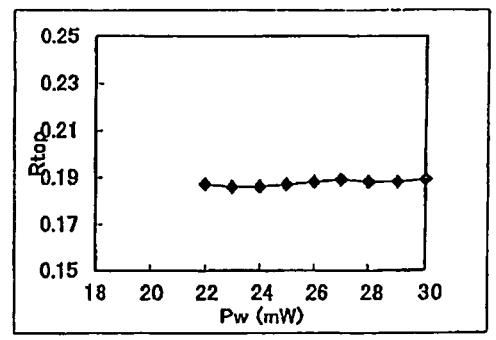
Figure 28:
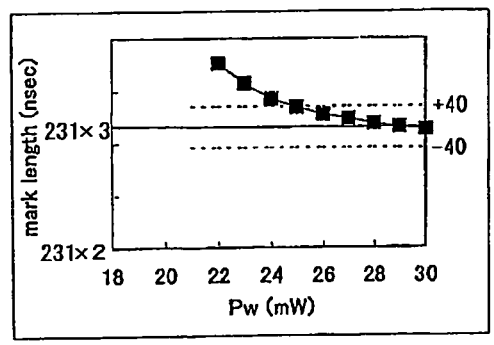
Figure 28:
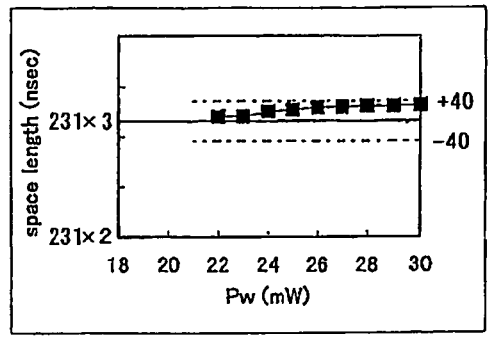

The results of evaluation of overwriting characteristics are shown in FIGS. 26, 27 and 28 in the cases of "Recording method CD1-1d" at 32-times velocity, "Recording method CD2-1d" at 24-times velocity and "Recording method CD2-1e" at 10-times velocity. Pe/Pw i.e. the ratio of erasing power Pe to writing power Pw was set to be constant at 0.30 in "Recording method CD1-1d", 0.30 in "Recording method CD2-1d" and 0.30 in "Recording method CD2-1e". In "Recording method CD1-1d", Pw was changed every 1 mW from 26 mW to about 30 mW. In "Recording method CD2-1d", Pw was changed every 1 mW from 23 mW to about 30 mW. In "Recording method CD2-1e", Pw was changed every 1 mW from 22 mW to about 30 mW. Bias power Pb was constant at 0.8 mW.

In the respective Figs., (a) to (f) show the Pw dependency of (a) 3 T mark length jitter, (b) 3 T space length jitter, (c) modulation $m_{11}$, (d) $R_{top}$, (e) 3 T mark length and (f) 3 T space length, respectively.

The optimum writing power where the jitter becomes minimum, was from 28 to 30 mW in "Recording method CD1-1d" at 32-times velocity, from 25 to 30 mW in "Recording method CD2-1d" at 24-times velocity and in the vicinity of from 25 to 30 mW in "Recording method CD2-1e" at 10-times velocity, and the overwriting characteristics were evaluated by the values at such a power.

The horizontal lines in (a) and (b) in FIGS. 26, 27 and 28 indicate the standardized upper limit value of jitter=35 (nsec) during retrieving at 1-time velocity, and in the vicinity of the optimum Pw, good jitter values of less than 35 nsec were obtained. Further, the jitters of other mark lengths and space lengths were also less than 35 nsec.

From (c) and (d) in FIGS. 26, 27 and 28, it is evident that in either recording method, the modulation $m_{11}$ was from 60% to 80% (from 0.6 to 0.8), and $R_{top}$ was from 15 to 25%.

In (e) and (f) in FIGS. 26, 27 and 28, the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation of about ±20% from the reference clock period T is usually allowable, and accordingly, a deviation within ±30 to 40 nsec is allowable. From the Figs., it is evident that in the vicinity of the optimum Pw, there is no substantial deviation of the mark lengths and space lengths, and deviations, if any, are within the allowable range. Likewise, in the vicinity of the optimum Pw, also with respect to the mark lengths and space lengths of from 4 T to 11 T, desired mark lengths and space lengths were obtained within a range of the reference clock period T±10%. As the asymmetry value, a value within ±10% was obtained.

If the recording medium and the recording method of this Example are employed, good recording characteristics will be obtained at least within a range of from 32-times velocity to 10-times velocity, and the retrieving signals will be of a quality retrievable by conventional CD drives.

Figure 29:
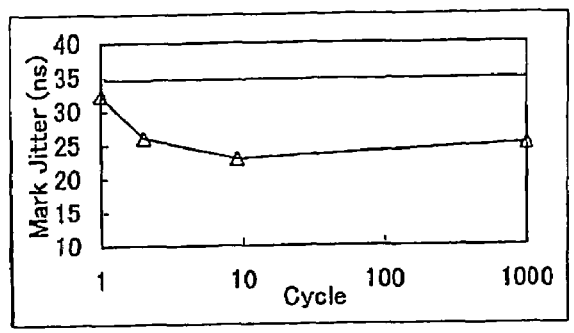
FIG. 29 presents data showing optical recording characteristics of an optical recording medium having a SnGeSb type recording layer, when 32-times velocity recording is carried out by another prescribed recording method.
Figure 29:
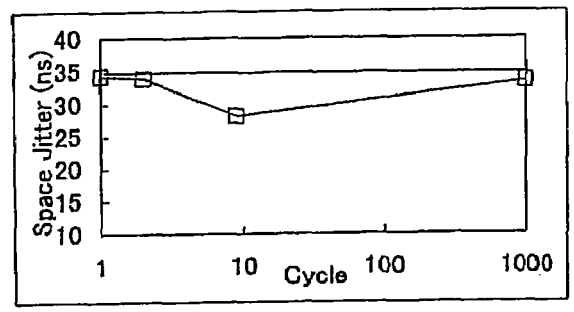
Figure 30:
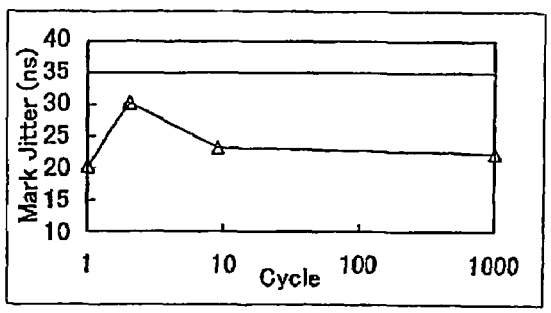
FIG. 30 presents data showing repeated overwriting characteristics of an optical recording medium having a SnGeSb type recording layer, when 24-times velocity recording is carried out by another prescribed recording method.
Figure 30:
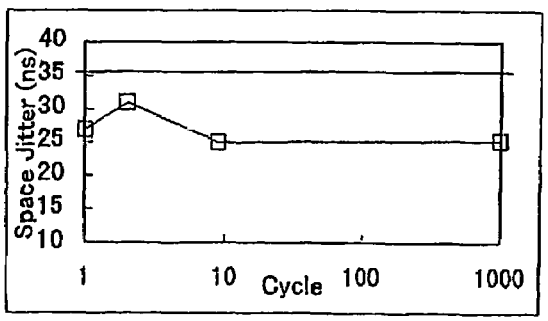
Figure 31:
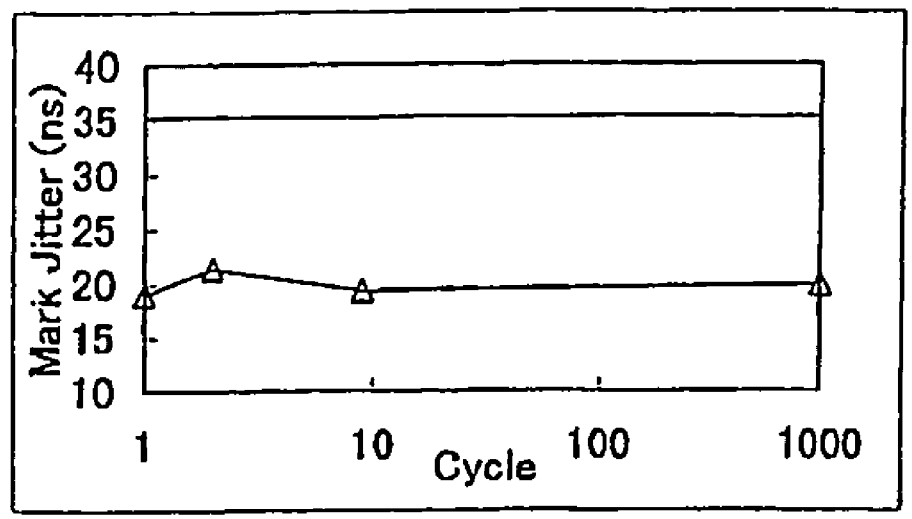
FIG. 31 presents data showing repeated overwriting characteristics of an optical recording medium having a SnGeSb type recording layer, when 10-times velocity recording is carried out by another prescribed recording method.
Figure 31:
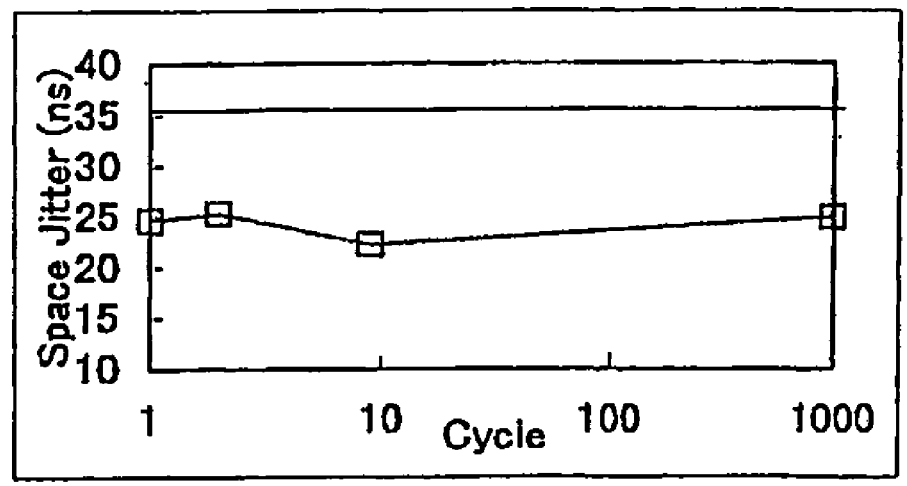

Now, the results of evaluation of overwriting durability will be described in cases wherein "Recording method CD1-1d" at 32-times velocity, "Recording method CD2-1d" at 24-times velocity, and "Recording method CD2-1e" at 10-times velocity were used. The overwriting cycle dependency when repeated overwriting was carried out at Pw/Pe=29 mW/8.7 mW, 28 mW/8.4 mW and 27 mW/8.1 mW, is shown in FIGS. 29, 30 and 31, respectively. In the respective Figs., (a) shows 3 T mark length jitter, and (b) shows 3 T space length jitter.

At any linear velocity, the overwriting durability of 1000 cycles required for CD-RW is sufficiently satisfied.

Further, the erase ratio at each linear velocity was measured. The 3 T/11 T overwriting erase ratio was measured at 10-times velocity by using 3 T and 11 T pulses of "Recording method CD2-1e", at 24-times velocity by using 3 T and 11 T pulses of "Recording method CD2-1d", and at 32-times velocity using 3 T and 11 T pluses of "Recording method CD1-1d". The 3 T/11 T overwriting erase ratios at 10-times velocity, 24-times velocity and 32-times velocity were 30, 28 and 24 dB, respectively, and thus sufficient erase ratios were obtained at the respective linear velocities.

Further, disks recorded at 32-times velocity by "Recording method CD1-1d" were subjected to an accelerated test at 105° C., whereby even upon expiration of 3 hours, no substantial deterioration of the recorded signals was observed. The jitter was found to have changed by about 2 nsec, but still was lower than 35 nsec in retrieving at 1-time velocity, and the reflectivity $R_{top}$ and the modulation $m_{11}$ also did not substantially decrease and maintained at least 90% of the initial values.

Example 6

Using the tester 1 against the medium of Example 5, in 32-times velocity recording, recording method CD1-2 was applied, and this is designated as "recording method CD1-2b". "Recording method CD1-2b" is a practical usage wherein the number of independent parameters in the recording pulse division method (III-A) is further limited.

Recording Method CD1-2b

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1} + \alpha_1 = 2$, $\beta_{i-1} + \alpha_i = 2$ ($i=2$ to $m$).

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}' + \alpha_1' = 2$, $\beta_{i-1}' + \alpha_i' = 2$ ($i=2$ to $m-1$), $\beta_{m-1}' + \alpha_m' = 2.4$, provided that $\beta_{m-1}' = \beta_{m-1} + \alpha_{m-1}$ and $\alpha_m' = \alpha_m + \beta_m$, $\beta_m' = \beta_m + \beta_m'$, Here, $T_{d1} = T_{d1}' = 1$, $\alpha_1 = \alpha_1' = 1$, $\beta_1 = 1.06$, $\alpha_i = \alpha_i' = \alpha c = 0.94$ ($\alpha c$ is constant with respect to i when i=2 to m-1), $\beta_{m-1} = 1.06$, $\Delta_{m-1} = 0.32$, $\alpha_m = 0.94$, $\beta_m = 0.44$, and $\beta_m' = 0$, and they are constant when m is at least 3. As $\beta_m$, $\Delta_{m1} = 0.44$ was used for m=2, 3 and $\Delta_{m2} = 0.5$ was used for m=4, 5.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2(\beta_{m-1})$, $\beta_2'(\beta_{m-1}')$, $\alpha_3(\alpha_m)$, $\alpha_3'(\alpha_m')$, $\beta_3(\beta_m)$ and $\beta_3'(\beta_m')$ in the case where m=3, respectively.

When m=1, i.e. with respect to 3 T mark, $T_{d1}' = 0.81$, $\alpha_1' = 1.94$ and $\beta_1' = 0.25$.

Then, in the case of 24-times velocity recording, the following "Recording method CD2-2b" was used as a specific example of recording method CD2-2. "Recording method CD2-2b" is a practical usage wherein the number of independent parameters in the recording pulse division method (VI) is further limited.

Recording Method CD2-2b

With respect to an even number mark length nT=2mT in the case where m is at least 2, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1} + \alpha_1 = 2$, $\beta_{i-1} + \alpha_i = 2$ ($i=2$ to $m$)

On the other hand, with respect to an odd number mark length nT=(2m+1)T in the case where m is at least 2, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}' + \alpha_1' = 2$, $\beta_{i-1}' + \alpha_i' = 2$ ($i=2$ to $m-1$), $\beta_{m-1}' + \alpha_m' = 2.8$, provided that $\beta_{m-1}' = \beta_{m-1} + \Delta_{m-1}$, and $\alpha_m' = \alpha_m + \Delta_m$, $\beta_m' = \beta_m + \Delta_m'$.

Here, $T_{d1} = T_{d1}' = 1.3$, $\alpha_1 = \alpha_1' = 0.7$, $\alpha_i = \alpha_i' = \alpha c = 0.7$ ($\alpha c$ is constant with respect to i when i=2 to m-1), $\beta_{m-1} = 1.3$, $\Delta_{m-1} = 0.4$, $\Delta_m = 0.4$, $\Delta_{mm} = 0.8$, $\alpha_m = 0.7$, and $\beta_m = 0.7$, and $\beta_m' = 0.7$, and they are constant when m is at least 2.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2(\beta_{m-1})$, $\beta_2'(\beta_{m-1}')$, $\alpha_3(\alpha_m)$, $\alpha_3'(\alpha_m')$, $\beta_3(\beta_m)$ and $\beta_3'(\alpha_m')$ in the case where m=3, respectively.

With respect to 3 T mark, $T_{d1}' = 1.3$, $\alpha_1' = 1.3$ and $\beta_1' = 1$.

Further, in the case of 10-times velocity recording, the following "Recording method CD2-2c" was used as a specific example of recording method CD2-2. "Recording method CD2-2c" is a practical usage wherein the number of independent parameters in the recording pulse division method (VI) is further limited.

Recording Method CD2-2c

With respect to an even number mark length nT=2mT in the case where m is at least 2, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1} + \alpha_1 = 2$, $\beta_{i-1} + \alpha_i = 2$ ($i=2$ to $m$).

On the other hand, with respect to an odd number mark length nT=(2m+1)T in the case where m is at least 2, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}' + \alpha_1' = 2$, $\beta_{i-1}' + \alpha_i' = 2$ ($i=2$ to $m-1$), $\beta_{m-1}' + \alpha_m' = 2.6$, provided that $\beta_{m-1}' = \beta_{m-1} + \Delta_{m-1}$, and $\alpha_m' = \alpha_m + \Delta_m$, $\beta_m' = \beta_m + \Delta_m'$.

Here, $T_{d1} = T_{d1}' = 1.7$, $\alpha_1 = \alpha_1' = 0.3$, $\alpha_i = \alpha_i' = \alpha c = 0.3$ ($\alpha c$ is constant with respect to i when i=2 to m-1), $\beta_{m-1} = 1.7$, $\Delta_{m-1} = 0.3$, $\Delta_m = 0.3$, $\Delta_{mm} = 0.6$, $\alpha_m = 0.3$, and $\beta_m = 1.2$, and $\Delta_m' = 0.35$, they are constant when m is at least 2.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2(\beta_{m-1})$, $\beta_2'(\beta_{m-1}')$, $\alpha_3(\alpha_m)$, $\alpha_3'(\alpha_m')$, $\beta_3(\beta_m)$ and $\beta_3'(\beta_m')$ in the case where m=3, respectively.

With respect to 3 T mark, $T_{d1}' = 1.8$, $\alpha_1' = 0.6$ and $\beta_1' = 1.8$.

Further, $T_{d1}$, $\alpha_i$, $\beta_i$, etc. in each recording method are summarized in Table 6.

In Table 6, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 6, they are presented in the columns for $T_{d1}$, $\alpha_1$ and $\beta_m$, respectively. In the case where n is from 4 to 11, in the recording pulse division method (III-A), $T_{d1} + \alpha_1 = T_{d1}' + \alpha_1' = 2$, $\beta_1 + \alpha_2 = \beta_{m-1} + \alpha_m = 2$ and $\alpha_1 = \alpha_m = \alpha c$ were set to be constant irrespective of m.

Therefore, although 10 parameters are presented in Table 6 including $T_{d1}$, $\beta_1$, $\beta_{m-1}$, $\beta_m$ and $\alpha_m$, independent parameters are 6 i.e. $\alpha_1$, $\alpha c$, $\Delta_{m-1}$, $\Delta_{m1}$, $\Delta_{m2}$ and $\Delta_m'$. However, it is only in the case of Recording method CD1-2a (32-times velocity) that $\Delta_{m2}$ and $\Delta_{m1}$ take different values, and $\Delta_{m1} = 0.44$ was used when m=2, 3, and $\Delta_{m2} = 0.5$ was used when m=4, 5.

Further, when n=4, $\beta_i=\beta_{m-1}=\beta c$, $\alpha_2=\alpha_m=\alpha c$ and $2=\beta_m$. When n=5, $\beta_1'=\beta c+\Delta_{m-1}$, $\alpha_2'=\alpha c+\beta_m$, and $\beta_2'=\beta_m'$.

TABLE 6

| Recording method | | $T_{d1}$ | $\alpha_1$ | $\beta_1$ | $\alpha c$ | $\beta_{m-1}$ | $\Delta_{m-1}$ | $\alpha_m$ | $\Delta_{m1}$ | $\Delta_{m2}$ | $\beta_m$ | $\Delta_m'$ |
|---|---|---|---|---|---|---|---|---|---|---|---|---|
| CD1-2b | n = 3 | 0.81 | 1.94 | | | | | | | | 0.25 | |
| | n = 4~11 | 1 | 1 | 1.06 | 0.94 | 1.06 | 0.32 | 0.94 | 0.44 | 0.5 | 0.44 | 0 |
| CD2-2b | n = 3 | 1.3 | 1.3 | | | | | | | | 1 | |
| | n = 4~11 | 1.3 | 0.7 | 1.3 | 0.7 | 1.3 | 0.4 | 0.7 | 0.4 | 0.4 | 0.7 | 0 |
| CD2-2c | n = 3 | 1.8 | 0.6 | | | | | | | | 1.8 | |
| | n = 4~11 | 1.7 | 0.3 | 1.7 | 0.3 | 1.7 | 0.3 | 0.3 | 0.3 | 0.3 | 1.2 | 0.35 |

Figure 32:
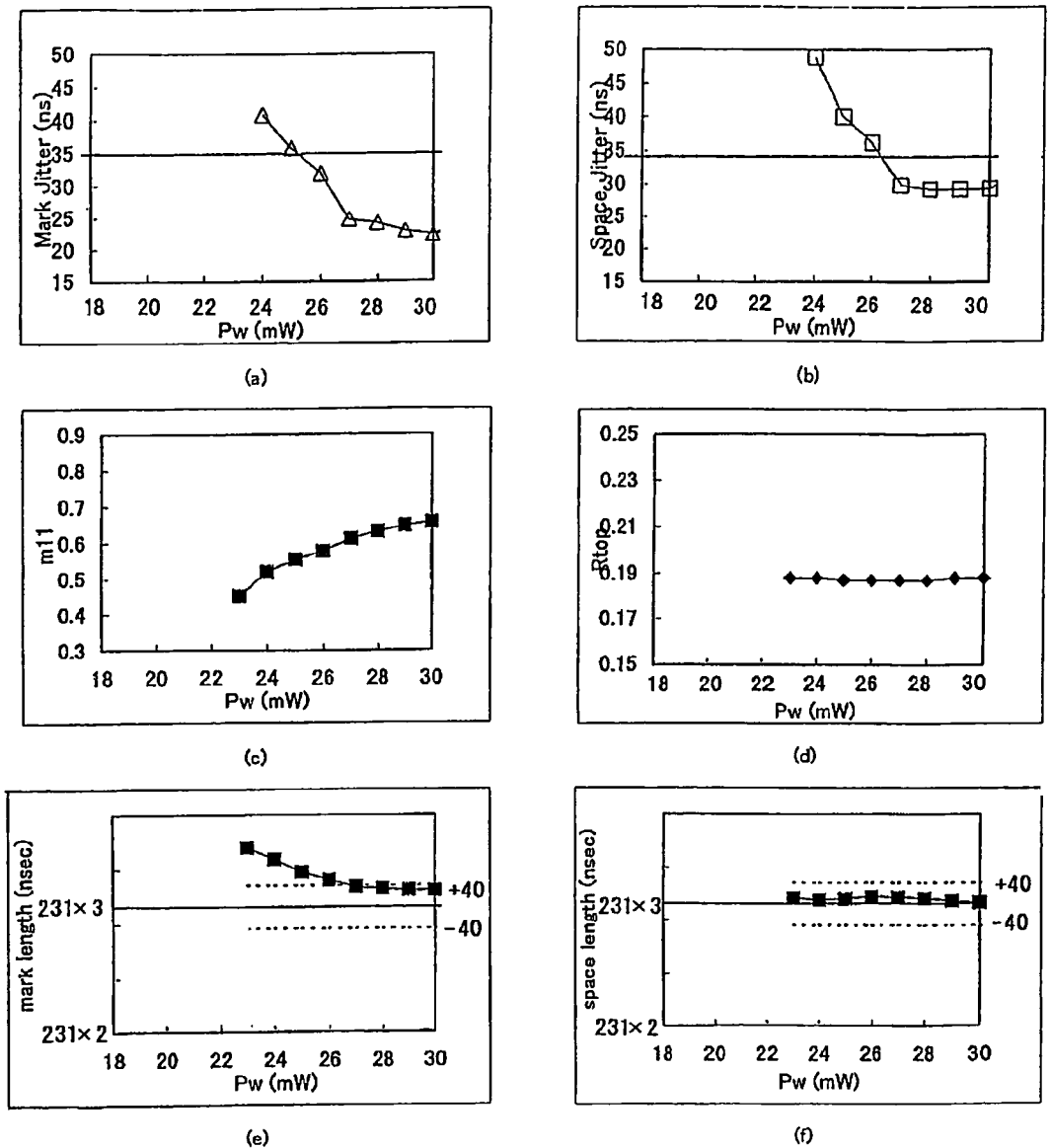
FIG. 32 presents data showing optical recording characteristics of an optical recording medium having a SnGeSb type recording layer, when 32-times velocity recording is carried out by another prescribed recording method.
Figure 33:
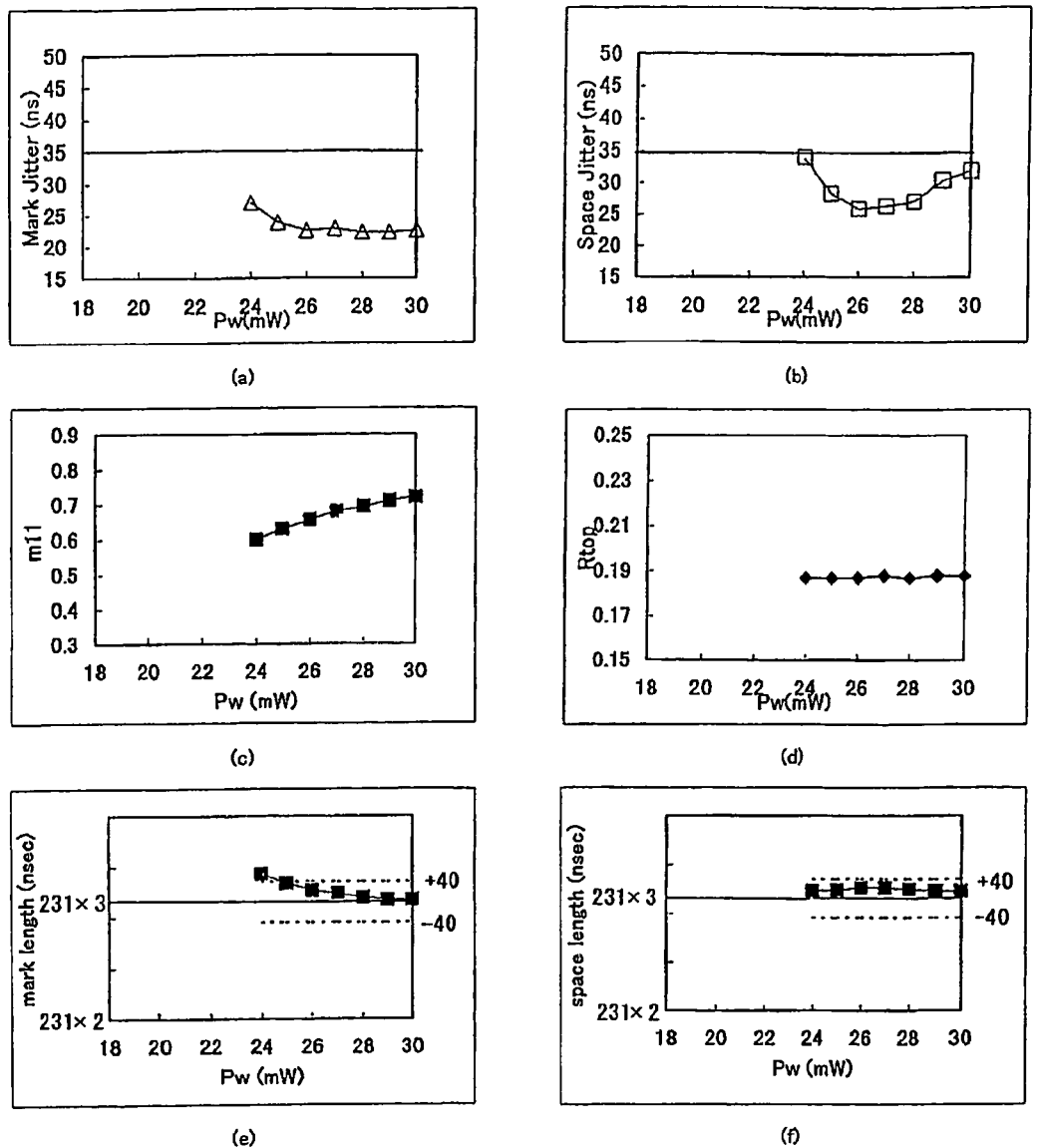
FIG. 33 presents data showing optical recording characteristics of an optical recording medium having a SnGeSb type recording layer, when 24-times velocity recording is carried out by another prescribed recording method.
Figure 34:
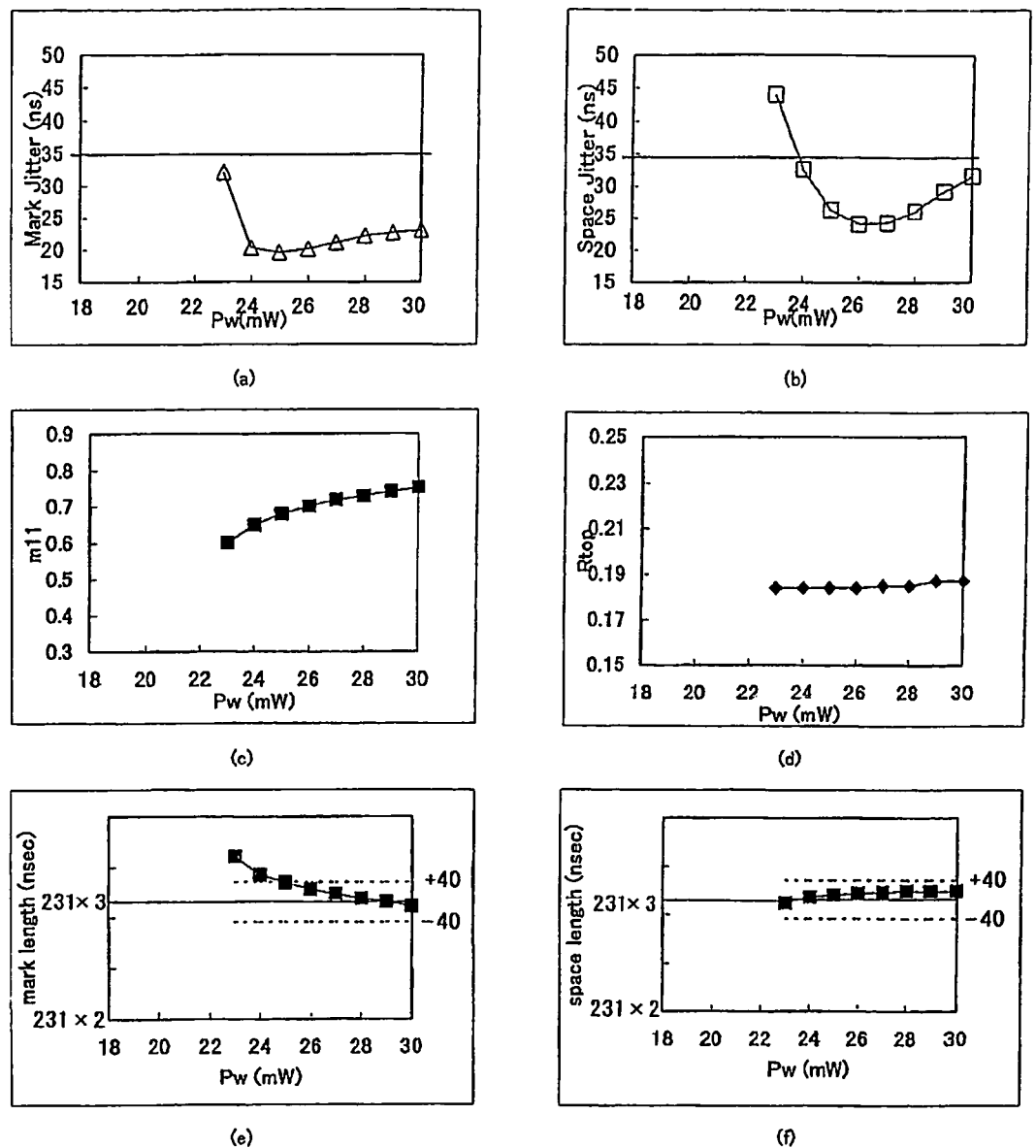
FIG. 34 presents data showing optical recording characteristics of an optical recording medium having a SnGeSb type recording layer, when 10-times velocity recording is carried out by another prescribed recording method.

The results of evaluation of overwriting characteristics are shown in FIGS. 32, 33 and 34 in the cases of "Recording method CD1-2b" at 32-times velocity, "Recording method CD2-2b" at 24-times velocity and "Recording method CD2-2c" at 10-times velocity. Pe/Pw i.e. the ratio of erasing power Pe to writing power Pw was set to be constant at 0.30 in "Recording method CD1-2b", 0.33 in "Recording method CD2-2b" and 0.30 in "Recording method CD2-2c". Pw was changed every 1 mW from 20 mW to about 30 mW. Bias power Pb was constant at 0.8 mW.

In the respective Figs., (a) to (f) show the Pw dependency of (a) 3 T mark length jitter, (b) 3 T space length jitter, (c) modulation $m_{11}$, (d) $R_{top}$, (e) 3 T mark length and (f) 3 T space length, respectively.

The optimum writing power where the jitter becomes minimum, was from 27 to 30 mW in "Recording method CD1-2b" at 32-times velocity, from 25 to 30 mW in "Recording method CD2-2b" at 24-times velocity and in the vicinity of from 25 to 30 mW in "Recording method CD2-2c" at 10-times velocity, and the overwriting characteristics were evaluated by the values at such a power.

The horizontal lines in (a) and (b) in FIGS. 32, 33 and 34 indicate the standardized upper limit value of jitter=35 (nsec) during retrieving at 1-time velocity, and in the vicinity of the optimum Pw, good jitter values of less than 35 nsec were obtained. Further, the jitters of other mark lengths and space lengths were also less than 35 nsec.

From (c) and (d) in FIGS. 32, 33 and 34, it is evident that in either recording method, the modulation $m_{11}$ was from 60% to 80% (from 0.6 to 0.8), and $R_{top}$ was from 15 to 25%.

In (e) and (f) in FIGS. 32, 33 and 34, the horizontal solid lines indicate 3 T mark length=3 T space length=231×3 (nsec) during retrieving at 1-time velocity. Further, the horizontal dotted lines indicate 231 nsec×3−40 nsec and 231 nsec×3+40 nsec. With respect to mark lengths and space lengths, a deviation of about ±20% from the reference clock period T is usually allowable, and accordingly, a deviation within ±30 to 40 nsec is allowable. From the Figs., it is evident that at least in the vicinity of the optimum Pw, there is no substantial deviation of the mark lengths and space lengths, and deviations, if any, are within the allowable range. Likewise, in the vicinity of the optimum Pw, also with respect to the mark lengths and space lengths of from 4 T to 11 T, desired mark lengths and space lengths were obtained within a range of the reference clock period T±10%. As the asymmetry value, a value within ±10% was obtained.

If the recording medium and the recording method of the this Example are employed, good recording characteristics will be obtained at least within a range of from 32-times velocity to 10-times velocity, and the retrieving signals will be of a quality retrievable by conventional CD drives.

Figure 35:
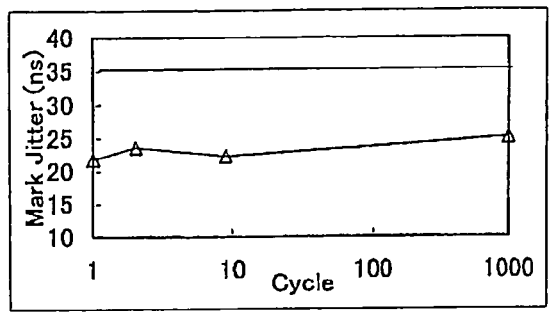
FIG. 35 presents data showing optical recording characteristics of an optical recording medium having a SnGeSb type recording layer, when 32-times velocity recording is carried out by another prescribed recording method.
Figure 35:
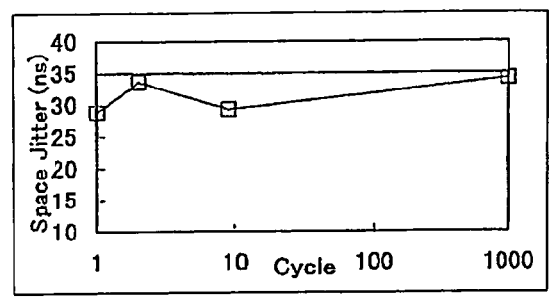
Figure 36:
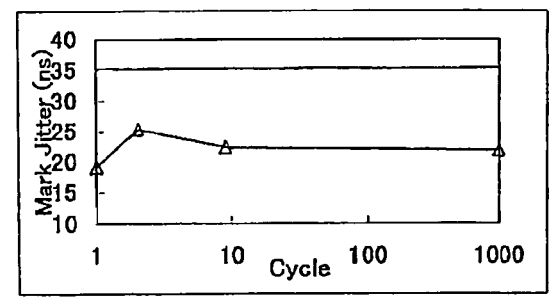
FIG. 36 presents data showing repeated overwriting characteristics of an optical recording medium having a SnGeSb type recording layer, when 24-times velocity recording is carried out by another prescribed recording method.
Figure 36:
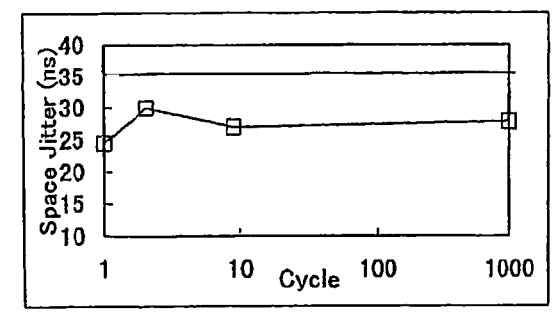
Figure 37:
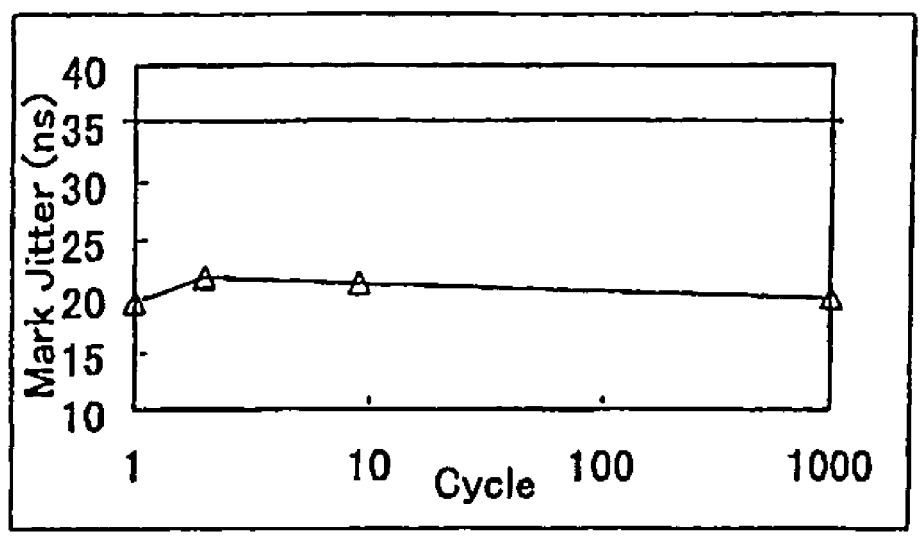
FIG. 37 presents data showing repeated overwriting characteristics of an optical recording medium having a SnGeSb type recording layer, when 10-times velocity recording is carried out by another prescribed recording method.
Figure 37:
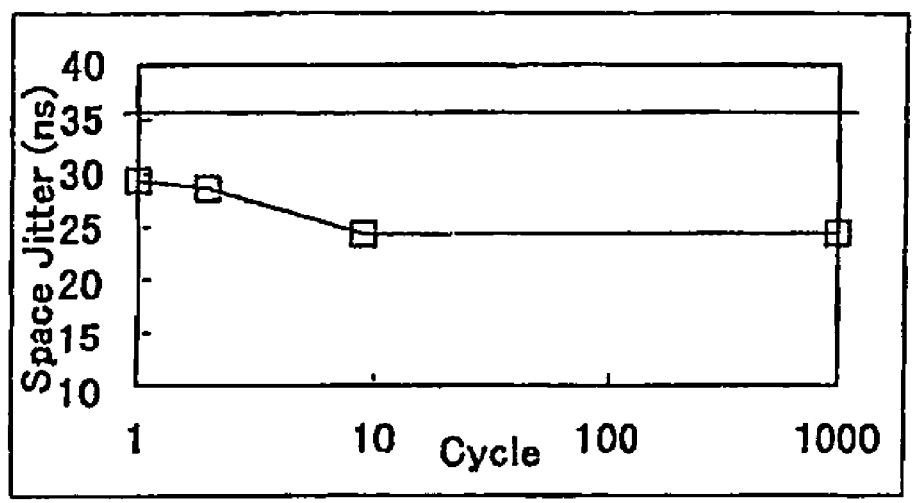

Now, the results of evaluation of overwriting durability will be described in cases wherein "Recording method CD1-2b" at 32-times velocity, "Recording method CD2-2b" at 24-times velocity, and "Recording method CD2-2c" at 10-times velocity were used. The overwriting cycle dependency when repeated overwriting was carried out at Pw/Pe=30 mW/9 mW, 28 mW/9.2 mW and 27 mW/8.1 mW, is shown in FIGS. 35, 36 and 37, respectively. In the respective Figs., (a) shows 3 T mark length jitter, and (b) shows 3 T space length jitter.

At any linear velocity, the overwriting durability of 1000 cycles required for CD-RW is sufficiently satisfied.

Further, disks recorded at 32-times velocity by "Recording method CD1-2b" were subjected to an accelerated test at 105° C., whereby even upon expiration of 3 hours, no substantial deterioration of the recorded signals was observed. The jitter was lower than 35 nsec in retrieving at 1-time velocity, and the reflectivity $R_{top}$ and the modulation $m_{11}$ also did not substantially decrease and maintained at least 90% of the initial values.

Example 7

Then, using the tester 1 against the medium of Example 3, overwriting was carried out at linear velocities of from 8-times velocity to 24-times velocity by means of the recording pulse division method (CDE-VI-1), as shown in Table 7. The recording pulse division method (CD-VI-1) is an example wherein the recording pulse division method (VI-B) is applied.

Specifically, overwriting was carried out at 8, 12, 16, 20 and 24-times velocities.

In Table 7, the recording pulse division method was presented as divided into a case where n=3 and a case where n is from 4 to 11. When n is 3, three parameters i.e. $T_{d1}'$, $\alpha_1'$ and $\beta_1'$ are required, and in Table 7, they are presented in the columns for $T_{d1}$, $\alpha c$ and $\beta_m$, respectively. When n is from 4 to 11, $T_{d1}$, $\alpha_i=\alpha c$ (i=1 to m) and $\alpha_i'=\alpha c$ (i=1 to m−1) are set to be constant irrespective of n, whereby $T+\alpha_1=T_{d1}'+\alpha_1'=2$, $\beta_{i-1}+\alpha_i=2$ (i=2 to m), and $\beta_{i-1}'+\alpha_i'=2$ (i=2 to m−1). Accordingly, $\beta_i=2-\alpha c$ (i=1 to m−1), and $\beta_i'=2-\alpha c$ (i=1 to m−2). Further, $\beta_{m-1}'=\Delta_{m-1}+\Delta_{m-1}=\beta c+\Delta_{m-1}$, $\alpha_m'=\alpha_m+\beta_m=\alpha c+\beta_m$, and $\beta_m'=\beta_m+\Delta_m'$, where $\Delta_{m-1}$, $\Delta_m$ and $\beta_m'$ are set to be constant irrespective of m. With respect to n=4 to 11 (m being at least 2), independent parameters are $\alpha c$, $\Delta_{m-1}$, $\beta_m$, $\Delta_m$ and $\Delta_m'$.

Further, when m=2 (n=4,5), $\alpha_1$, $\alpha_i'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m is 3, respectively. Accordingly, when n=4, $\beta_2=\beta_m$. When n=5, $\beta_1'=\beta c+\Delta_{m-1}$, $\alpha_2=\alpha c+\beta_m$, $\beta_2'=\beta_m+\Delta_m'$.

As Pw, $Pw_0$ was selected as the writing power with which the jitter value would be minimum, whereby repeated overwriting was carried out. Further, the Pe/Pw ratio at that time is also shown in Table 7. Pb was set to be constant at 0.8 mW, and Pe/Pw was set to be constant at 0.30.

TABLE 7

| -times velocity | n | $T_{d1}$ | $\alpha c$ | $\Delta_{m-1}$ | $\Delta_m$ | $\beta_m$ | $\Delta_m'$ | $Pw_0$ | Pe/Pw |
|---|---|---|---|---|---|---|---|---|---|
| 8 | 3 | 1.65 | 0.50 | | | 1.9 | | 24 | 0.30 |
| | 4~11 | 1.65 | 0.35 | 0.25 | 0.15 | 1 | 0.55 | 24 | 0.30 |
| 12 | 3 | 1.45 | 0.9 | | | 1.6 | | 25 | 0.30 |
| | 4~11 | 1.5 | 0.5 | 0.3 | 0.3 | 0.75 | 0.45 | 25 | 0.30 |
| 16 | 3 | 1.3 | 1.05 | | | 1.35 | | 26 | 0.30 |
| | 4~11 | 1.35 | 0.65 | 0.35 | 0.25 | 0.5 | 0.4 | 26 | 0.30 |
| 20 | 3 | 1.1 | 1.2 | | | 0.9 | | 27 | 0.30 |
| | 4~11 | 1.15 | 0.85 | 0.35 | 0.15 | 0.4 | 0.15 | 27 | 0.30 |
| 24 | 3 | 0.9 | 1.6 | | | 0.55 | | 26 | 0.30 |
| | 4~11 | 1 | 1 | 0.4 | 0.45 | 0.3 | 0 | 26 | 0.30 |

Figure 38:
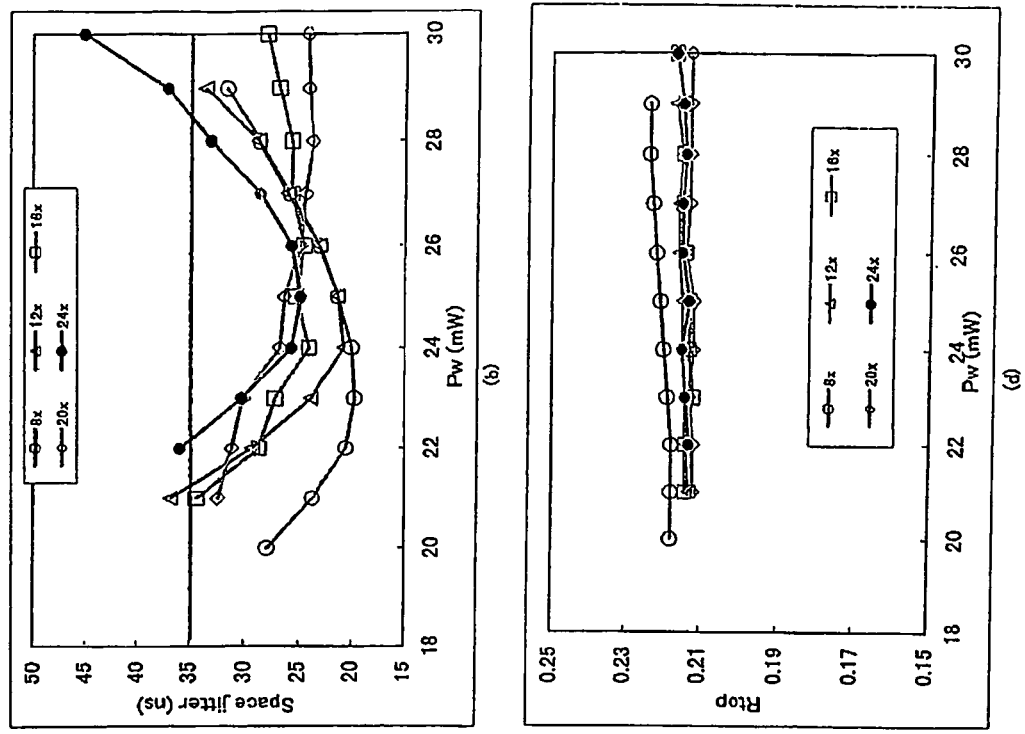
FIG. 38 presents data showing recording characteristics at the respective linear velocities, when recording was carried out on the same medium at 8- to 24-times velocities by another prescribed recording method.
Figure 38:
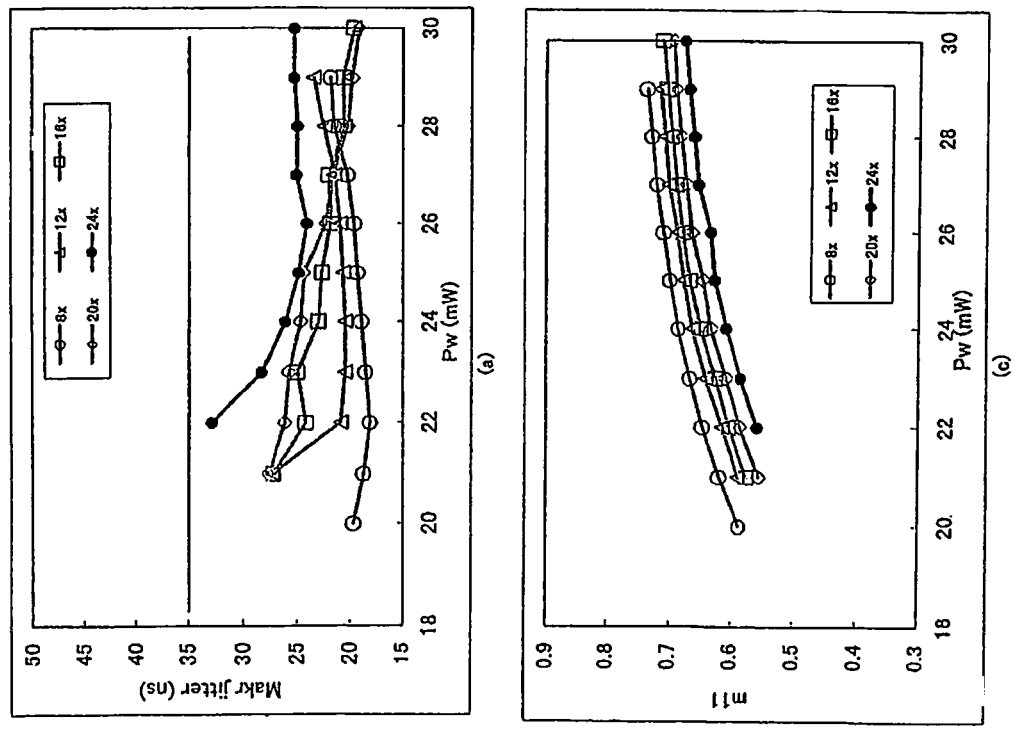

FIG. 38 shows (a) 3 T mark length jitter, (b) 3 T space length jitter, (c) modulation $m_{11}$ and (d) $R_{top}$ at 8, 12, 16, 20 and 24-times velocities.

The symbol "x" in FIGS. 38(a) to (d) means "-times velocity". For example, "8x" means 8-times velocity. The same applies in the following Examples.

At each linear velocity, good jitter values of less than 35 nsec were obtained with respect to mark lengths and space lengths in retrieving at 1-time velocity within a range of about $Pw_0\pm1$ mW. Likewise, with respect to all mark length and space length jitters, good jitters of less than 35 nsec were obtained.

Further, at each linear velocity, the modulation $m_{11}$ was from 60% to 80% (0.6 to 0.8), $R_{top}$ was from 15 to 25%, and the asymmetry value was a value within ±10%. In the vicinity of $Pw_0$, the desired mark lengths and space lengths were obtained within a range of the reference clock period T±10% with respect to any of mark lengths and space lengths of from 3 T to 11 T. At each linear velocity, the maximum value of $Pw_0$ was 27 mW, and the minimum value was 24 mW, and the ratio of the minimum value to the maximum value was 0.89.

Figure 39:
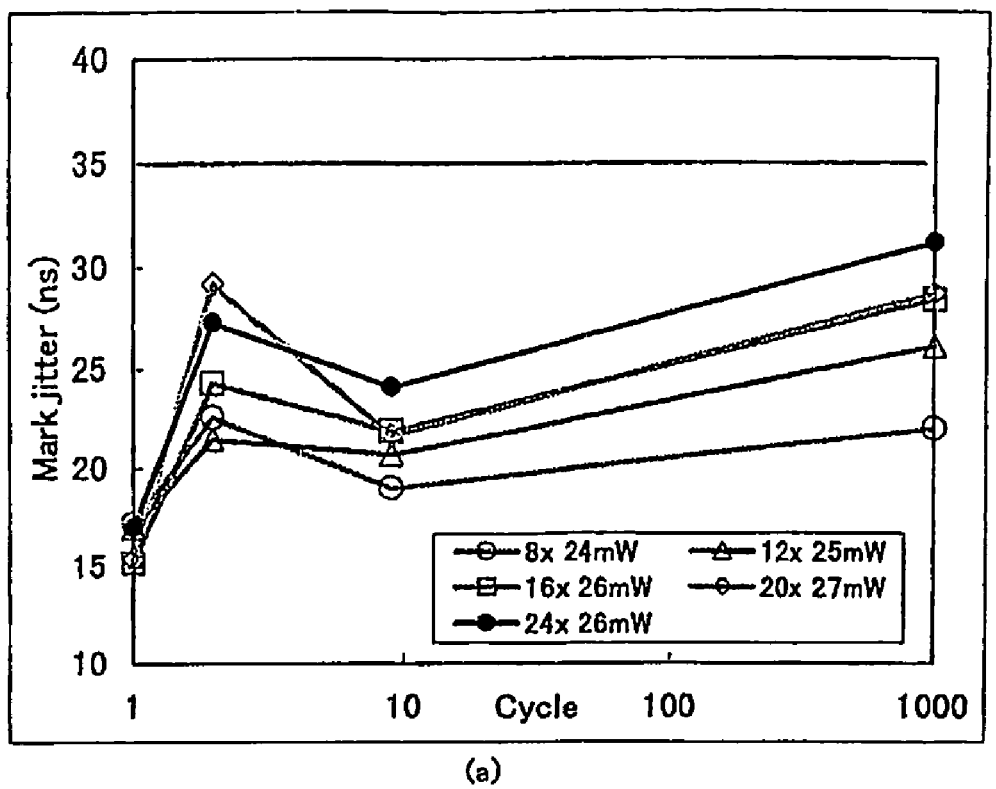
FIG. 39 presents data showing overwriting characteristics at the respective linear velocities, when recording was carried out on the same medium at 8- to 24-times velocities by another prescribed recording method.
Figure 39:
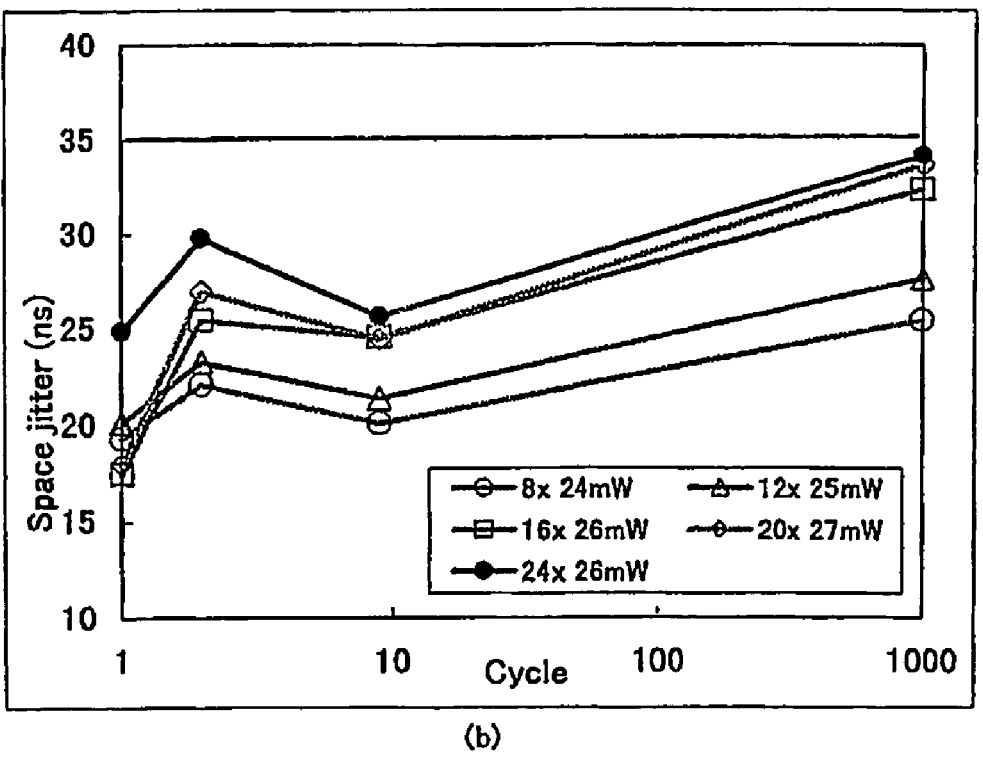

Then, evaluation of the overwriting durability was carried out at each linear velocity. The overwriting cycle dependency is shown in FIG. 39 when overwriting was carried out at each linear velocity at the $Pw_0$ and the Pe/Pw ratio as shown in Table 7. In FIG. 39, (a) shows 3 T mark length jitters, and (b) shows 3 T space length jitters.

In summarizing the foregoing, when the recording medium and the recording pulse division method (CD-VI-1) of the present invention are applied, good characteristics can be obtained by the recording pulse division method having a small number of parameters made variable, within a wide range of from 8 to 24-times velocities.

Example 8

Then, using the tester 1 against the medium of Example 5, overwriting was carried out at linear velocities of from 8-times velocity to 32-times velocity by means of the recording pulse division method (CDE-VI-2), as shown in Table 8. The recording pulse division method (CD-VI-2) is an example wherein the recording pulse division method (VI-B) is applied.

Specifically, overwriting was carried out at 8, 16, 24, 28 and 32-times velocities.

In Table 8, the recording pulse division method was presented as divided into a case where n=3 and a case where n is from 4 to 11. When n is 3, three parameters i.e. $T_{d1}'$, $\alpha_1'$ and $\beta_1'$ are required, and in Table 8, they are presented in the columns for $T_{d1}$, $\alpha c$ and $\beta_m$, respectively. When n is from 4 to 11, $T_{d1}$, $\alpha_i=\alpha c$ (i=1 to m) and $\alpha_i'=\alpha c$ (i=1 to m−1) are set to be constant irrespective of n, whereby $T_{d1}+\alpha_1=T_{d1}'+\alpha_1'=2$, $\beta_{i-1}+\alpha_i=2$ (i=2 to m), and $\beta_{i-1}'+\alpha_i'=2$ (i=2 to m−1).

Accordingly, $\beta_i=2-\alpha c$ (i=1 to m−1), and $\beta_i'=2-\alpha c$ (i=1 to m−2). Further, $\beta_{m-1}'=\beta_{m-1}+\Delta_{m-1}=\beta c+\Delta_{m-1}$, $\alpha_m'=\alpha_m+\beta_m=\alpha c+\beta_m$, and $\beta_m'=3$ m+$\Delta_m'$, where $\Delta_{m-1}$, $\Delta_m$ and $\beta_m'$ are set to be constant irrespective of m. With respect to n=4 to 11 (m being at least 2), independent parameters are $\alpha c$, $\Delta_{m-1}$, $\beta_m$, $\beta_m$ and $\beta_m'$.

Further, when m=2 (n=4,5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m is 3, respectively. Accordingly, when n=4, $\beta_2=\beta_m$. When n=5, $\beta_1'=\beta c+\Delta_{m-1}$, $\alpha_2=\alpha c+\Delta_m$, $\beta_2'=\beta_m+\Delta_m$.

As Pw, $Pw_0$ was selected as the writing power with which the jitter value would be minimum, whereby repeated overwriting was carried out. Further, the Pe/Pw ratio at that time is also shown in Table 8. Pb was set to be constant at 0.8 mW, and Pe/Pw was set to be constant at 0.30.

TABLE 7

| -times velocity | n | $T_{d1}$ | $\alpha c$ | $\Delta_{m-1}$ | $\Delta_m$ | $\beta_m$ | $\Delta_m'$ | $Pw_0$ | Pe/Pw |
|---|---|---|---|---|---|---|---|---|---|
| 8 | 3 | 1.9 | 0.4 | | | 2 | | | 0.30 |
| | 4~11 | 1.75 | 0.25 | 0.2 | 0.05 | 1.3 | 0.65 | 26 | 0.30 |
| 16 | 3 | 1.55 | 0.9 | | | 1.5 | | | 0.30 |
| | 4~11 | 1.5 | 0.5 | 0.2 | 0.2 | 0.8 | 0.65 | 27 | 0.30 |
| 24 | 3 | 1.25 | 1.3 | | | 0.9 | | | 0.30 |
| | 4~11 | 1.25 | 0.75 | 0.25 | 0.25 | 0.6 | 0.3 | 28 | 0.30 |
| 28 | 3 | 1.15 | 1.5 | | | 0.65 | | | 0.30 |
| | 4~11 | 1.15 | 0.85 | 0.25 | 0.45 | 0.55 | 0.05 | 29 | 0.30 |
| 32 | 3 | 0.88 | 1.94 | | | 0.25 | | | 0.30 |
| | 4~11 | 1 | 1 | 0.38 | 0.38 | 0.44 | 0 | 29 | 0.30 |

Figure 40:
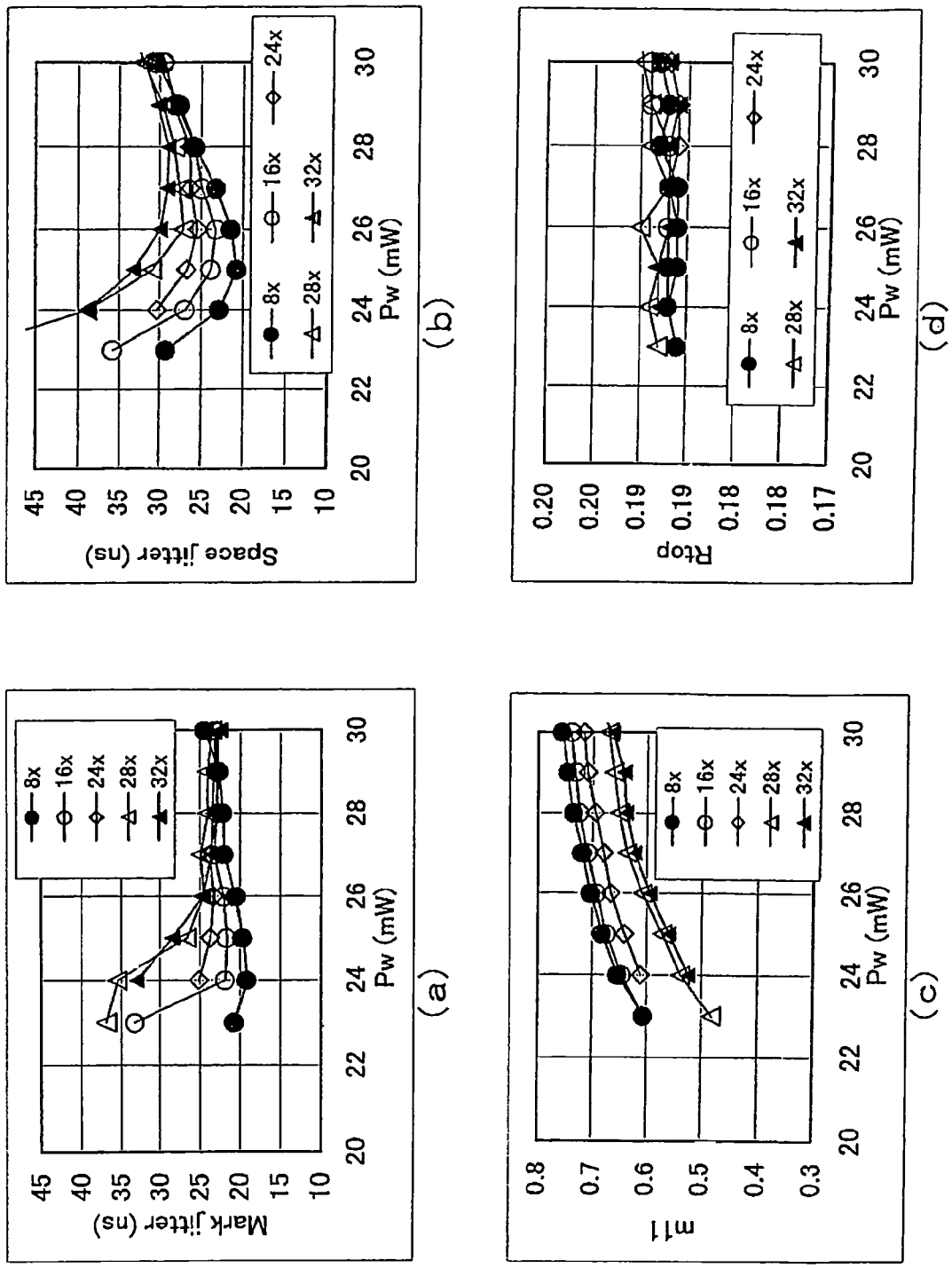
FIG. 40 presents data showing recording characteristics at the respective linear velocities, when recording was carried out on the same medium at 8- to 32-times velocities by another prescribed recording method.

FIG. 40 shows (a) 3 T mark length jitter, (b) 3 T space length jitter, (c) modulation $m_{11}$ and (d) $R_{top}$ at 8, 16, 24, 28 and 32-times velocities.

At each linear velocity, good jitter values of less than 35 nsec were obtained with respect to mark lengths and space lengths in retrieving at 1-time velocity within a range of about $Pw_0\pm1$ mW. Likewise, with respect to all mark length and space length jitters, good jitters of less than 35 nsec were obtained.

Further, at each linear velocity, the modulation $m_{11}$ was from 60% to 80% (0.6 to 0.8), $R_{top}$ was from 15 to 25%, and the asymmetry value was a value within ±10%. In the vicinity of $Pw_0$, the desired mark lengths and space lengths were obtained within a range of about ±10% with respect to any of mark lengths and space lengths of from 3 T to 11 T. At each linear velocity, the maximum value of $Pw_0$ was 29 mW in the case of 32-times velocity, and the minimum value was 26 mW in the case of 8-times velocity, and the ratio of the minimum value to the maximum value was 1.12.

Figure 41:
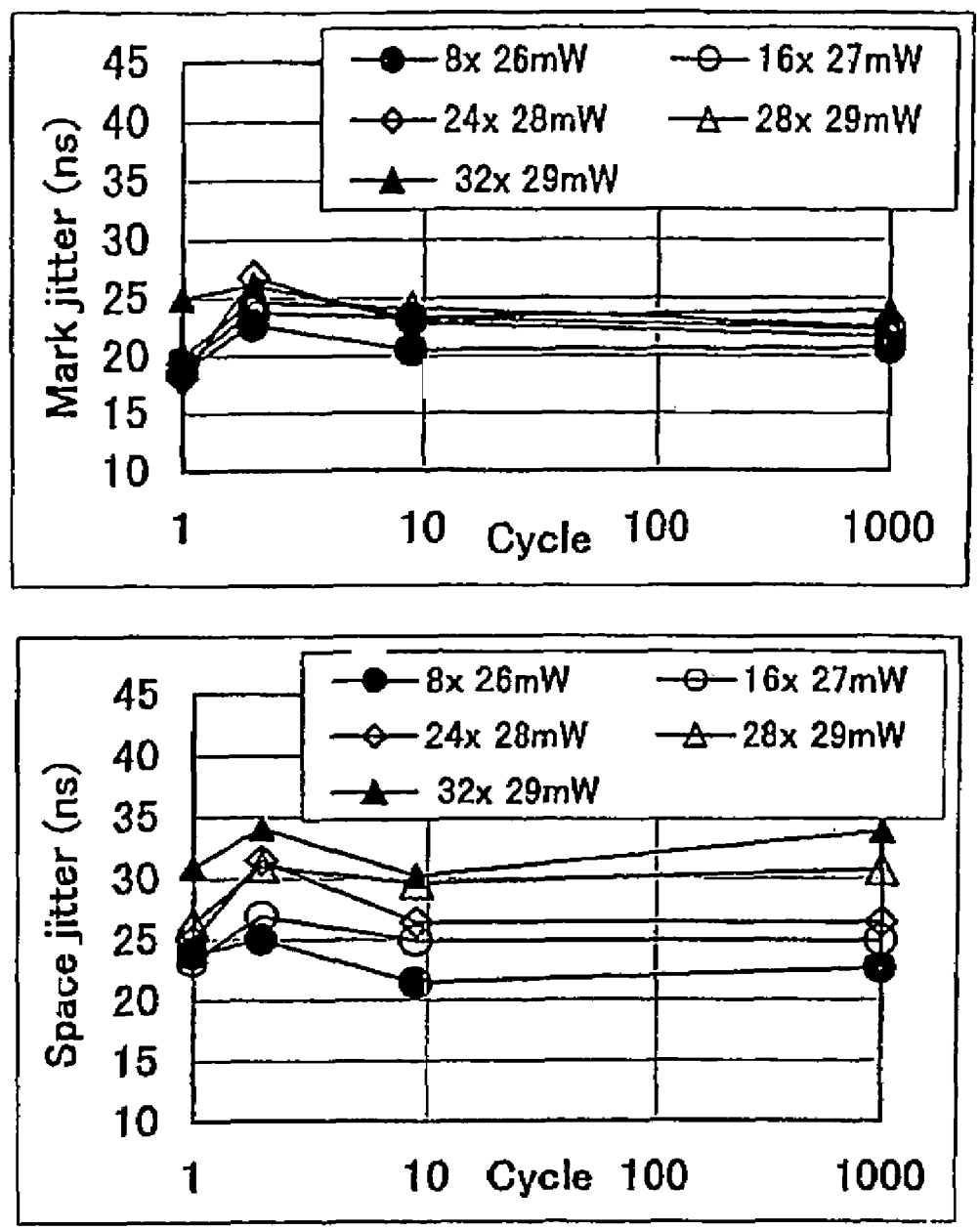
FIG. 41 presents data showing overwriting characteristics at the respective linear velocities, when recording was carried out on the same medium at 8- to 32-times velocities by another prescribed recording method.

Then, evaluation of the overwriting durability was carried out at each linear velocity. The overwriting cycle dependency is shown in FIG. 41 when overwriting was carried out at each linear velocity at the $Pw_0$ and the Pe/Pw ratio as shown in Table 8. In FIG. 41, (a) shows 3 T mark length jitters, and (b) shows 3 T space length jitters.

In summarizing the foregoing, when the recording medium and the recording pulse division method (CD-VI-2) of the present invention are applied, good characteristics can be obtained by the recording pulse division method having a small number of parameters made variable, within a wide range of from 8 to 32-times velocities.

Figure 42:
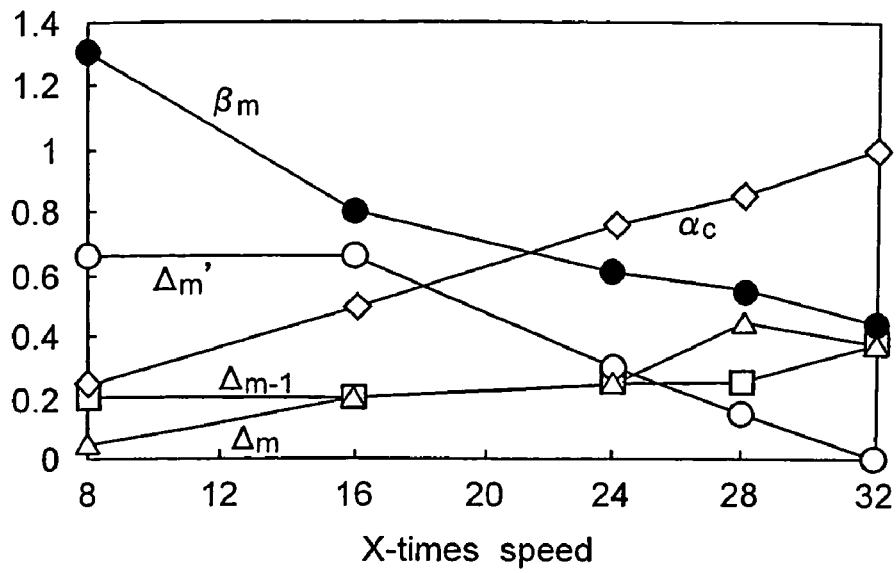
FIG. 42 presents data showing the linear velocity dependency of various parameters when n is at least 4.
Figure 43:
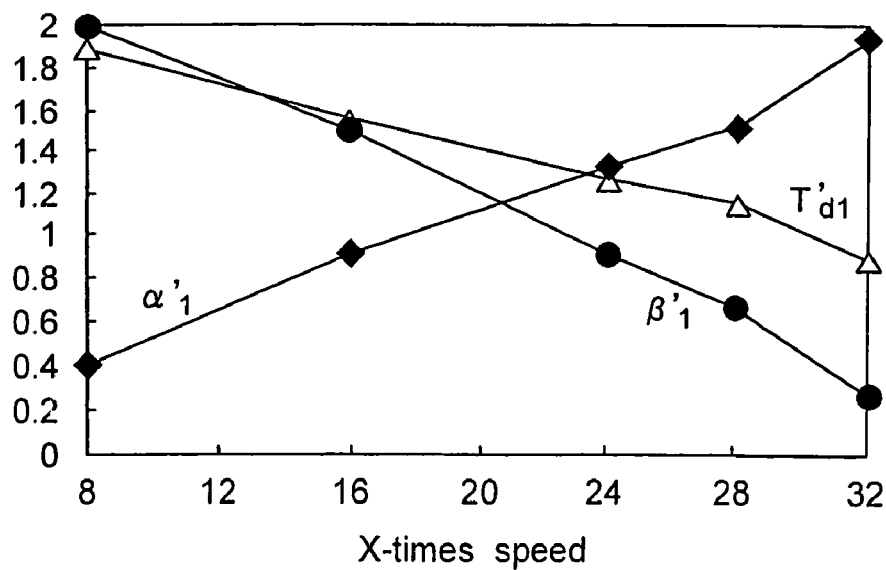
FIG. 43 presents data showing the linear velocity dependency of various parameters when n=3.

Here, as parameters particularly important to obtain low jitters, the linear velocity dependency of $\alpha c$, $\beta_m$, $\Delta_{m-1}$, $\Delta_m$ and $\beta_m'$ in the case where n is at least 4, is shown in FIG. 42, and the linear velocity dependency of $T_{d1}'$, $\alpha_1'$ and $\beta_1'$ in the case where n=3, is shown in FIG. 43. FIG. 42 is one wherein αc, $\beta_m$, $\Delta_{m-1}$, $\Delta_m$ and $\beta_m'$ where n=4 to 11 in Table 8 were plotted against the respective linear velocities. On the other hand, FIG. 43 is one wherein $T_{d1}'$, $\alpha_1'$ and $\beta_1'$ where n=3 in Table 8 were plotted against the respective linear velocities. As is apparent from FIGS. 42 and 43, although there is some fluctuation, each parameter changes substantially monotonously depending upon the linear velocity, and αc, $\Delta_{m-1}$, $\Delta_m$ and $\alpha_1'$ take smaller values as the linear velocity is lower, while $\beta_m$, $\beta_m'$, $T_{d1}'$ and $\beta_1'$ take larger values as the linear velocity is lower.

And, it is evident that at least with respect to αc, $T_{d1}'$, $\alpha_1'$ and $\beta_1'$, values having their parameter values at the maximum and minimum velocities substantially linearly complemented, may be applied in recording in a wide range of the linear velocity.

Example 9

In the above Basic Example, a disk was prepared and recording was carried out as follows.

On a substrate, 90 nm of a lower protective layer made of $(ZnS)_{80}(SiO_2)_{20}$, 18 nm of a recording layer made of $Ge_5In_{18}Sb_{72}Te_5(Te_{0.05}In_{0.18}(Ge_{0.06}Sb_{0.94})_{0.77})$, 27 nm of an upper protective layer made of $(ZnS)_{80}(SiO_2)_{20}$, 3 nm of an interfacial layer made of GeN, 200 nm of a reflective layer made of Ag and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_5In_{18}Sb_{72}Te_5$ is an atomic ratio. The same applies in the following Examples.

The volume resistivity $\rho_v$ of this Ag reflective layer was about 24 nΩ/□m, and the sheet resistivity $\rho_s$ was about 0.12Ω/□. The initialization was carried out by scanning a laser diode beam having a wavelength of about 810 nm and having an oval spot shape having a major axis of about 75 μm and a minor axis of about 1.0 μm, in the minor axis direction at a linear velocity of about 12 m/s. The irradiation power was about 1100 mW.

On this disk, by means of the tester 2 with NA=0.50, overwriting of EFM modulation signal was carried out at 24 and 8-times velocities, and the characteristics were evaluated.

While maintaining Pe/Pw i.e. the ratio of erasing power Pe to writing power Pw, to be constant, Pw was changed every 2 mW from about 26 mW to about 36 mW, whereby the overwriting characteristics at the respective writing powers were evaluated. Each was evaluated by the value after overwriting ten times.

In 24-times velocity recording, recording method CD1-2 was applied, and this is designated as "recording method CD1-2c". "Recording method CD1-2c" is a practical method wherein the number of independent parameters in the recording pulse division method (III-A) is further limited.

Recording Method CD1-2c

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$), $\beta_{m-1}'+\alpha_m'=2.85$, provided that $\beta_{m-1}'=\beta_{m-1}+\beta_{m-1}$ and $\alpha_m'=\alpha_m+\beta_m$, $\beta_m'=\beta_m+\Delta_m'$.

Here, $T_{d1}=T_{d1}'=1$, $\alpha_1=\alpha_1'=1$, $\alpha_i=\alpha_i'=\alpha c=0.9$ (αc is constant with respect to i when i=2 to m-1), $\beta_{m-1}=1.1$, $\Delta_{m-1}=0.35$, $\Delta_m=0.5$, $\Delta_{mm}=0.85$, $\alpha_m=0.9$, and $\beta_m=0.4$, and $\Delta_m'=0$, and they are constant when m is at least 2.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2(\beta_{m-1})$, $\beta_2'(\beta_{m-1})$, $\alpha_3(\alpha_m)$, $\alpha_3'(\alpha_m')$, $\beta_3(\beta_m)$ and $\beta_3'(\beta_m')$ in the case where m=3, respectively. Namely, with respect to 4 T mark, $\alpha_1=1$, $\beta_1=1.1$, $\alpha_2=0.9$ and $\beta_m=0.4$, and with respect to 5 T mark, $\alpha_1=1$, $\beta_1'=1.45$, $\alpha_2'=1.4$ and $\beta_m'=0.4$.

When m=1, i.e. with respect to 3 T mark, $T_{d1}'=0.9$, $\alpha_1'=1.4$ and $\beta_1'=0.85$.

On the other hand, in the case of 8-times velocity recording, the following "Recording method CD2-2d" was used as recording method CD2-2. "Recording method CD2-2d" is a practical usage wherein the number of independent parameters in the recording pulse division method (VI) is further limited.

Recording Method CD2-2d

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$), $\beta_{m-1}'+\alpha_m'=2.4$, provided that $\beta_{m-1}'=\beta_{m-1}+\Delta_{m-1}$, and $\alpha_m'=\alpha_m+\beta_m$, $\beta_m'=\beta_m+\beta_m'$.

Here, $T_{d1}=T_{d1}'=1.65$, $\alpha_1=\alpha_1'=0.35$, $\alpha_i=\alpha_i'=\alpha c=0.35$ (αc is constant with respect to i when i=2 to m-1), $\beta_{m-1}=1.65$, $\Delta_{m-1}=0.25$, $\Delta_m=0.15$, $\Delta_{mm}=0.4$, $\alpha_m=0.35$, $\beta_m=1.0$, and $\Delta_m'=0.55$, and they are constant when m is at least 2.

However, $\alpha_1$, $\alpha_1'$, $\beta_1$, $\beta_1'$, $\alpha_2$, $\alpha_2'$, $\beta_2$ and $\beta_2'$ in the case where m=2 (n=4, 5) were set to be equal to $\alpha_1$, $\alpha_1'$, $\beta_2(\beta_{m-1})$ $\beta_2'(\beta_{m-1}')$, $\alpha_3(\alpha_m)$, $\alpha_3'(\alpha_m')$, $\beta_3(\beta_m)$ and $\beta_3'(\beta_m')$ in the case where m=3, respectively. Namely, with respect to 4 T mark, $\alpha_1=0.35$, $\beta_1=1.65$, $\alpha_2=0.35$ and $\beta_m=1.0$, and with respect to 5 T mark, $\alpha_1'=0.35$, $\beta_1'=1.9$, $\alpha_2'=0.5$ and $\beta_2'=1.55$.

With respect to 3 T mark, $T_{d1}'=1.65$, $\alpha_1=0.5$ and $\beta_1'=1.9$.

Further, $T_{d1}$, $\alpha_i$, $\beta_i$, etc. in each recording method are summarized in Table 9.

In Table 9, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 9, they are presented in the columns for $T_{d1}'$, $\alpha_1$ and $\beta_m$, respectively. In the case where n is from 4 to 11, in the recording pulse division method (III-A), $T_{d1}+\alpha_1=T_{d1}'+\alpha_1'=2$, $\beta_1+\alpha_2=\beta_{m-1}+\alpha_m=2$, $\alpha_1=\alpha_m=\alpha c$ and $\Delta_m$ were set to be constant irrespective of m. Therefore, although 10 parameters are presented in Table 9 including $T_{d1}$, $\beta_1$, $\beta_{m-1}$, $\beta_m$ and $\alpha_m$, independent parameters are 5 i.e. $\alpha_1$, $\alpha c$, $\Delta_{m-1}$, $\Delta_m$ and $\beta_m'$. Further, when n=4, $\beta_1=\beta_{m-1}=\beta c$, $\alpha_2=\alpha_m=\alpha c$ and $\beta_2=\beta_m$. When n=5, $\beta_1'=\beta c+\beta_{m-1}$, $\alpha_2=\alpha c+\beta_m$, and $\beta_2'=\beta_m'$.

Figure 45:
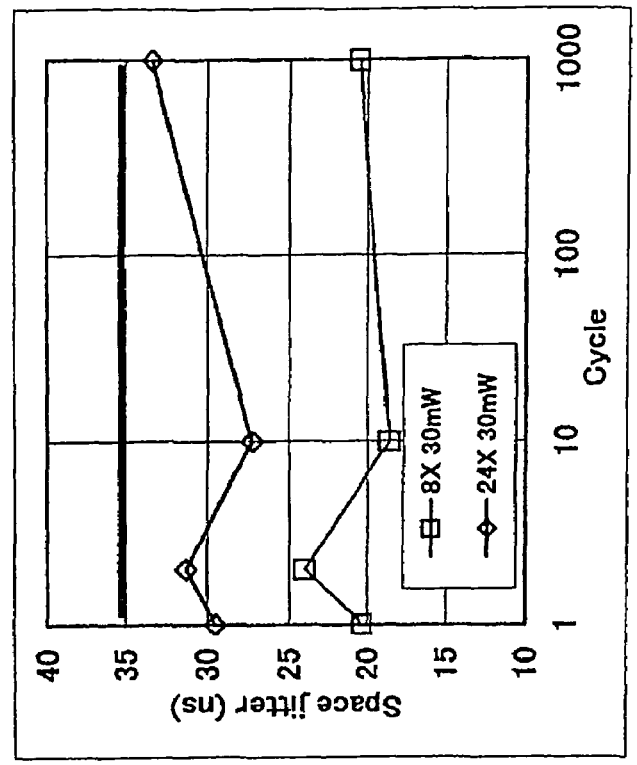
FIG. 45 presents data showing overwriting characteristics at the respective linear velocities, when recording was carried out on the same medium at 8- to 24-times velocities by another prescribed recording method.
Figure 45:
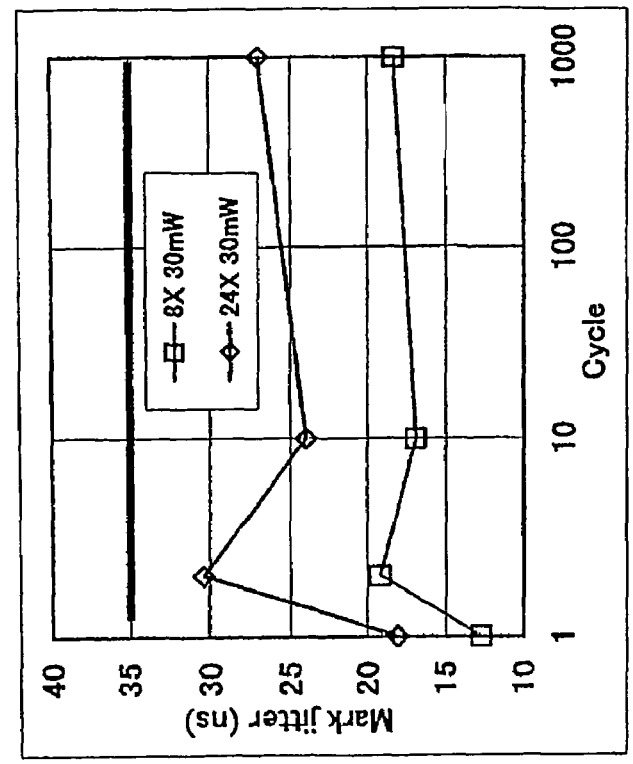

$2d'$ at 8-times velocity were used. The overwriting cycle dependency when repeated overwriting was carried out at Pw/Pe=30 mW/8 mW, is shown in FIG. 45. In the respective Figs., (a) shows 3 T mark length jitter, and (b) shows 3 T space length jitter. In FIG. 45, for the purpose of showing the number of cycles of repeated overwriting on a logarithmic graph, the first recording is represented by first overwriting, and when overwriting was carried out nine times thereon, is represented by 10th overwriting. Also in the following Examples, the number of cycles of repeated overwriting is shown in the same manner on a logarithmic axis.

At each linear velocity, the overwriting durability of 1000 cycles required for CD-RW is sufficiently satisfied.

Further, the erase ratio at each linear velocity was measured. The 3 T/11 T overwriting erase ratio was measured at

TABLE 9

| Recording method | | Td1 | α1 | β1 | αc | βm − 1 | Δm − 1 | αm | Δm | βm | Δm' |
|---|---|---|---|---|---|---|---|---|---|---|---|
| CD1-2c | n = 3 | 0.9 | 1.4 | | | | | | | 0.85 | |
| | n = 4~11 | 1 | 1 | 1.1 | 0.9 | 1.1 | 0.35 | 0.9 | 0.5 | 0.4 | 0 |
| CD2-2d | n = 3 | 1.65 | 0.5 | | | | | | | 1.9 | |
| | n = 4~11 | 1.65 | 0.35 | 1.65 | 0.35 | 1.65 | 0.25 | 0.35 | 0.15 | 1 | 0.55 |

Figure 44:
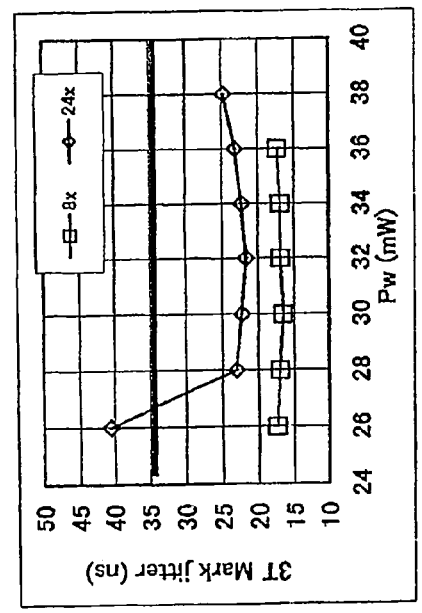
FIG. 44 presents data showing recording characteristics at the respective linear velocities, when recording was carried out on the same medium at 8- to 24-times velocities by another prescribed recording method.
Figure 44:
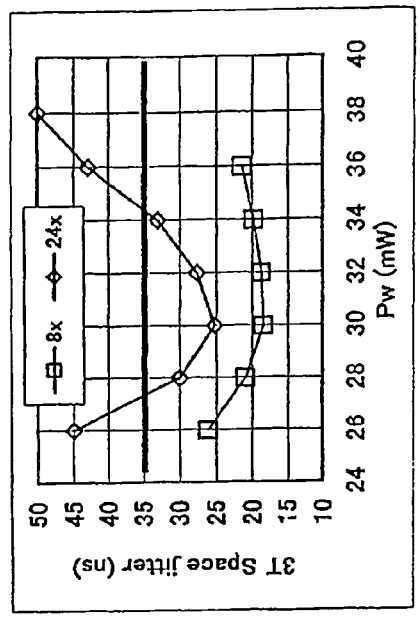
Figure 44:
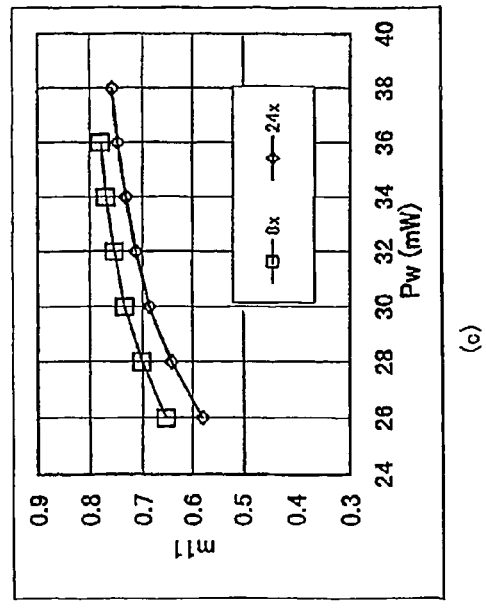
Figure 44:
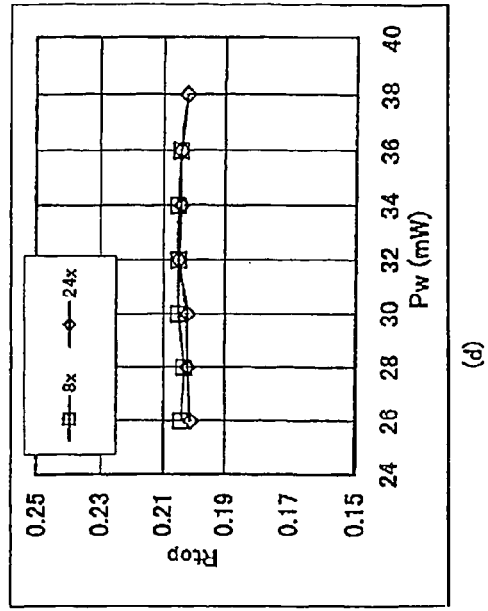

The results of evaluation of overwriting characteristics in the cases of "Recording method CD1-2*c*" at 24-times velocity and "Recording method CD2-2*d*" at 8-times velocity, are shown in FIG. 44. Pe/Pw i.e. the ratio of erasing power Pe to writing power Pw was set to be constant at 0.27 in "Recording method CD1-2*c*" at 24-times velocity and at 0.27 in "Recording method CD2-2*d* at 8-times velocity". In "Recording method CD1-2*c*", Pw was changed every 2 mW from about 26 mW to about 38 mW. In "Recording method CD2-2*d*", Pw was changed every 2 mW from about 26 mW to about 36 mW. Bias power Pb was constant at 0.8 mW.

In the respective Figs., (a) to (d) show the Pw dependency of (a) 3 T mark length jitter, (b) 3 T space length jitter, (c) modulation $m_{11}$ and (d) $R_{top}$, respectively.

The optimum writing power was in the vicinity of from 28 to 32 mW in "Recording method CD1-2*c*" at 24-times velocity and in the vicinity of from 28 to 32 mW in "Recording method CD2-2*d*" at 8-times velocity, and the overwriting characteristics were evaluated by the values at such a power.

The horizontal lines in FIGS. 44(*a*) and (*b*) indicate the standardized upper limit value of jitter=35 (nsec) during retrieving at 1-time velocity. Good jitter values of less than 35 nsec were obtained at either linear velocity.

From FIGS. 44(*c*) and (*d*), it is evident that in either recording method, the modulation $m_{11}$ was from 60% to 80% (from 0.6 to 0.8), and $R_{top}$ was from 15 to 25%, at either linear velocity.

Further, in the vicinity of the optimum writing power, with respect to the mark lengths and space lengths of from 3 T to 11 T, desired mark lengths and space lengths were obtained within a range of the reference clock period T±10%. As the asymmetry value, a value within ±10% was obtained.

In summarizing the foregoing, good recording characteristics were obtained at 8 and 24-times velocities, and the retrieving signals were of a quality retrievable by conventional CD drives. Further, by making the recording pulse division method variable as in the present invention, good characteristics will be obtained also at linear velocities between them.

Now, the results of evaluation of overwriting durability will be described in cases wherein "Recording method CD1-2*c*" at 24-times velocity and "Recording method CD2- 8-times velocity by using 3 T and 11 T pulses of "Recording method CD2-2*d*", and at 24-times velocity by using 3 T and 11 T pulses of "Recording method CD1-2*c*". The 3 T/11 T overwriting erase ratios at 8-times velocity and 24-times velocity were at least 25 dB, respectively and thus sufficient erase ratios were obtained at the respective linear velocities.

Further, disks recorded at 24-times velocity by "Recording method CD1-2*c*" were subjected to an accelerated test at 105° C., whereby even upon expiration of 3 hours, no substantial deterioration of the recorded signals were observed. The jitter was found to have changed by about 2 nsec, but still was lower than 35 nsec in retrieving at 1-time velocity, and the reflectivity $R_{top}$ and the modulation $m_{11}$ also did not substantially decrease and maintained at least 90% of the initial values.

Example 10

In the above Basic Example, a disk was prepared and recording was carried out as follows.

On a substrate, 90 nm of a lower protective layer made of $(ZnS)_{80}(SiO_2)_{20}$, 18 nm of a recording layer made of $Ge_3In_{18}Sb_{74}Te_5(Te_{0.05}In_{0.18}(Ge_{0.04}Sb_{0.96})_{0.77})$, 27 nm of an upper protective layer made of $(ZnS)_{80}(SiO_2)_{20}$, 3 nm of an interfacial layer made of GeN, 200 nm of a reflective layer made of Ag and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_3In_{18}Sb_{74}Te_5$ is an atomicity ratio. The same applies in the following Examples.

The volume resistivity $\rho_v$ of this Ag reflective layer was about 24 nΩ·m, and the sheet resistivity $\rho_s$ was about 0.12Ω/□. The initialization was carried out by scanning a laser diode beam having a wavelength of about 810 nm and having an oval spot shape having a major axis of about 75 μm and a minor axis of about 1.0 μm, in the minor axis direction at a linear velocity of about 12 m/s. The irradiation power was about 950 mW.

On this disk, by means of the tester 2 with NA=0.50, overwriting of EFM modified signal was carried out at 8, 16, 24 and 32-times velocities by means of the recording method as shown in Table 10, and the characteristics were evaluated.

The recording pulse division method at 32-times velocity is an example of "Recording method 1-2" and will be referred to as "Recording method CD1-2$d$". Further, the recording pulse division method at 8, 16 and 24-times velocity is an example of "Recording method 2-2" and will be referred to as "Recording method CD2-2$e$".

In Table 10, the recording pulse division method was presented as divided into a case where n=3 and a case where n is from 4 to 11. When n is 3, three parameters i.e. $T_{d1}'$, $\alpha_1'$ and $\beta_1'$ are required, and in Table 10, they are presented in the columns for $T_{d1}$, $\alpha_1$ and $\beta_m$, respectively. When n is from 4 to 11, $T_{d1}$, $\alpha_1$, $\alpha_1'$, $\alpha_i=\alpha c$ (i=2 to m) and $\alpha_i'=\alpha c$ (i=2 to m−1) are set to be constant irrespective of n, whereby $T_{d1}+\alpha_1=T_{d1}'+\alpha_1'=2$, $\beta_{i-1}+\alpha_i=2$ (i=2 to m), and $\beta_{i-1}'+\alpha_i'=2$ (i=2 to m−1). Accordingly, $\beta_i=2-\alpha c$ (i=2 to m−1), and $\beta_i'=2-\alpha c$ (i=2 to m−2). Further, $\beta_{m-1}'=\beta_{m-1}+\Delta_{m-1}=c+\Delta_{m-1}$, $\alpha_m'=\alpha_m+\beta_m=\alpha c+\beta_m$, and $\beta_m'=\beta_m+\beta_m'$, where $\Delta_{m-1}$, $\Delta_m$ and $\beta_m'$ are set to be constant irrespective of m. With respect to n=4 to 11 (m being at least 2), independent parameters are $\alpha_1$, $\alpha c$, $\Delta_{m-1}$, $\beta_m$, $\beta_m$ and $\Delta_m'$.

Further, when m=2 (n=4,5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m is 3, respectively. Accordingly, when n=4, $\beta_2=\beta_m$. When n=5, $\beta_1'=\beta c+\Delta_{m-1}$, $\alpha_2=\alpha c+\Delta_m$, $\beta_2'=\beta_m+\Delta_m'$.

Each recording method in Table 10 is also an example of the recording pulse division method (VI-A) of the present invention, and is further equivalent to the recording pulse division method (VI-B) except that $\alpha_1 \neq \alpha c$ at 32-times velocity.

While maintaining Pe/Pw i.e. the ratio of erasing power Pe to writing power Pw, to be constant, Pw was changed every 1 mW from about 29 mW to about 40 mW, whereby the overwriting characteristics at the respective writing powers were evaluated. Each was evaluated by the value after overwriting ten times. Bias power Pb was set to have a constant value of substantially 0 mW, and Pe/Pw was set to be constant at 0.27. $Pw_0$ as a writing power with which the jitter value would be minimum, is show in Table 10.

of $Pw_0$, the desired mark lengths and space lengths were obtained within a range of the reference clock period T±20% with respect to any of mark lengths and space lengths of from 3 T to 11 T.

In summarizing the foregoing, when the recording medium of the present invention and the recording pulse division method (VI-A) of the present invention are applied, good characteristics can be obtained by the recording pulse division method having a small number of parameters made variable, within a wide range of from 8 to 32-times velocities, and the retrieved signals are of a quality retrievable by conventional CD drives. Further, even between these linear velocities, good characteristics can be obtained by making the recording pulse division method variable as in the present invention.

Figure 47:
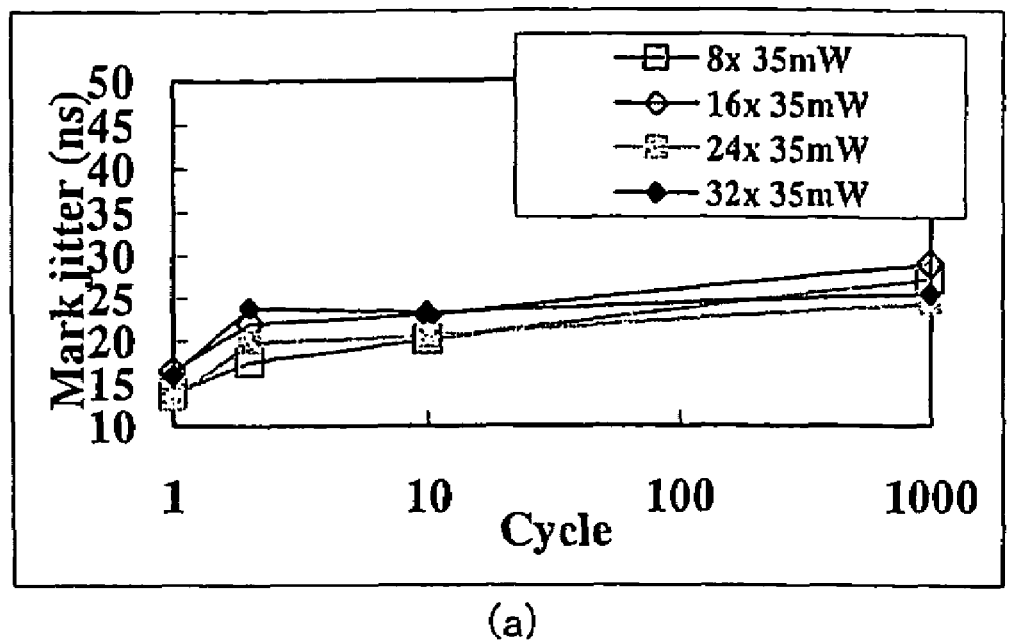
FIG. 47 presents data showing overwriting characteristics at the respective linear velocities, when recording was carried out on the same medium at 8- to 32-times velocities by another prescribed recording method.
Figure 47:
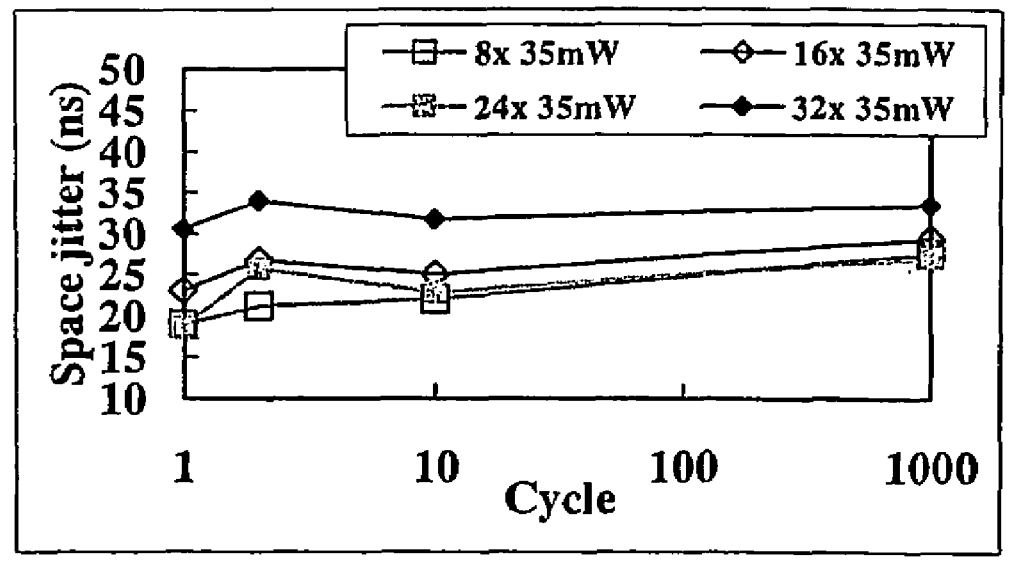

Then, evaluation of the overwriting durability was carried out at each linear velocity. The overwriting cycle dependency is shown in FIG. 47 when overwriting was carried out at each linear velocity at the $Pw_0$ and the Pe/Pw ratio as shown in Table 10. In FIG. 47, (a) shows 3 T mark length jitters, and (b) shows 3 T space length jitters.

At each linear velocity, the overwriting durability of 1000 cycles required for CD-RW is sufficiently satisfied.

Further, the erase ratio at each linear velocity was measured. The 3 T/11 T overwriting erase ratio measured by using 3 T and 11 T pulses of the recording pulse division methods in Table 10 were at least 25 dB, respectively, at 8-times velocity and 32-times velocity, and thus sufficient erase ratios were obtained at the respective linear velocities.

Further, disks recorded at 32-times velocity by "Recording method CD1-2$d$" in Table 10 were subjected to an accelerated test at 105° C., whereby even upon expiration of 3 hours, no substantial deterioration of the recorded signals was observed. The jitter was found to have changed by about 2 nsec, but still was lower than 35 nsec in retrieving at 1-time velocity, and the reflectivity $R_{top}$ showed a decrease of a little more than 10% of the initial value, but the modulation $m_{11}$ did not substantially decrease and maintained at least 90% of the initial values.

TABLE 10

| Recording method | -times velocity | | Td1 | α1 | αc | Δm−1 | Δm | βm | Δm' | Pwo | Pe/Pw |
|---|---|---|---|---|---|---|---|---|---|---|---|
| CD2-2e | 8 | 3 | 1.90 | 0.40 | — | — | — | 2.20 | — | 35 | 0.27 |
|  |  | 4~11 | 1.75 | 0.25 | 0.25 | 0.20 | 0.05 | 1.50 | 0.65 |  |  |
|  | 16 | 3 | 1.50 | 0.90 | — | — | — | 1.60 | — | 35 | 0.27 |
|  |  | 4~11 | 1.50 | 0.50 | 0.50 | 0.20 | 0.20 | 1.00 | 0.45 |  |  |
|  | 24 | 3 | 1.25 | 1.20 | — | — | — | 1.10 | — | 35 | 0.27 |
|  |  | 4~11 | 1.25 | 0.75 | 0.75 | 0.30 | 0.45 | 0.80 | 0.00 |  |  |
| CD1-2d | 32 | 3 | 0.94 | 1.63 | — | — | — | 0.25 | — | 35 | 0.27 |
|  |  | 4~11 | 1.00 | 1.00 | 0.94 | 0.19 | 0.44 | 0.38 | 0.00 |  |  |

Figure 46:
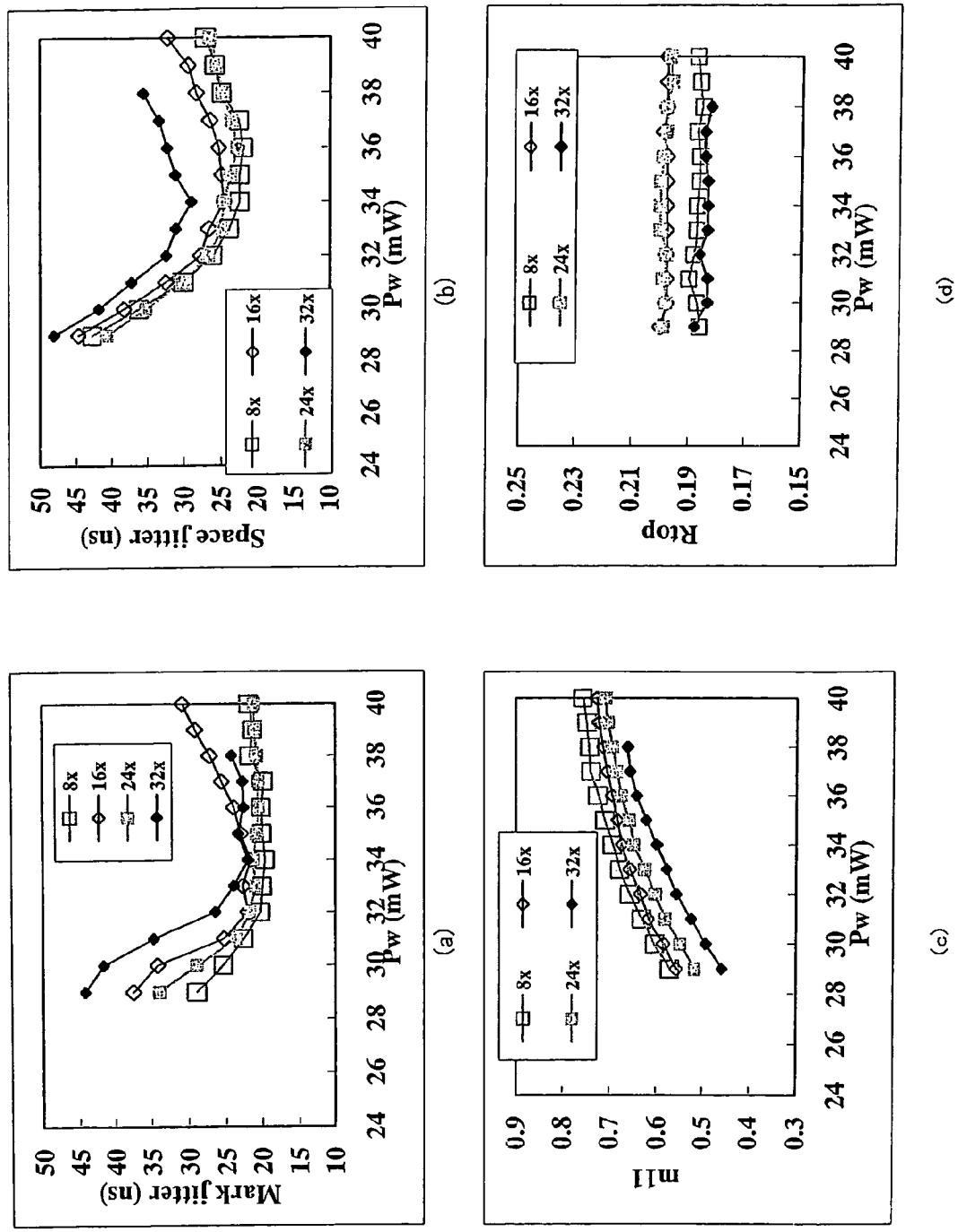
FIG. 46 presents data showing recording characteristics at the respective linear velocities, when recording was carried out on the same medium at 8- to 32-times velocities by another prescribed recording method.

FIG. 46 shows (a) 3 T mark length jitter, (b) 3 T space length jitter, (c) modulation $m_{11}$ and (d) $R_{top}$ at 8, 16, 24 and 32-times velocities.

At each linear velocity, good jitter values of less than 35 nsec were obtained with respect to mark lengths and space lengths in retrieving at 1-time velocity within a range of about $Pw_0$±1 mW. Likewise, with respect to all mark length and space length jitters, good jitters of less than 35 nsec were obtained.

Further, at each linear velocity, at least within a range of about $Pw_0$±1 mW, the modulation $m_{11}$ was from 60% to 80% (0.6 to 0.8), $R_{top}$ was from 15 to 25%, and the asymmetry value was a value within ±10%. In the vicinity Example 11

On the disk of Example 9, by means of the tester 2 with NA=0.50, overwriting of EFM modulation signal was carried out at 24-times velocity by the following three types of recording methods, and the characteristics were evaluated.

While maintaining Pe/Pw i.e. the ratio of erasing power Pe to writing power Pw, to be constant at 0.27, Pw was changed every 1 mW from about 26 mW to about 36 mW, whereby the overwriting characteristics at the respective writing powers were evaluated. Each was evaluated by the value after overwriting ten times. Bias power Pb was set to have a constant value of approx. zero.

Recording Method CD1-2e

This recording method is a practical usage wherein the number of independent parameters in the recording pulse division method (III-A) is further limited.

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i t$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$), $\beta_{m-1}'+\alpha_m'=2.85$, provided that $\beta_{m-1}'=\beta_{m-1}+\Delta_{m-1}$ and $\alpha_m=\alpha_m+\beta_m$, $\beta_m'=\beta_m+\alpha_m'$.

Here, $T_{d1}=T_{d1}'=1$, $\alpha_1=\alpha_1'=1$, $\alpha_i=\alpha_i'=\alpha c=0.9$ ($\alpha c$ is constant with respect to i when i=2 to m-1), $\beta_{m-1}=1.1$, $\Delta_{m-1}=0.35$, $\Delta_m=0.5$, $\Delta_{mm}=0.85$, $\alpha_m=0.9$, $\beta_m=0.4$, and $\Delta_m'=0$ and they are constant when m is at least 2.

However, $\beta_1$, $\alpha_2$, $\beta_2$, $\beta_1'$, $\alpha_2'$ and $\beta_2'$ in the case where m=2 are deemed to be $\beta_{m-1}$, $\alpha_m$, $\beta_m$, $\beta_{m-1}'$, $\alpha_m'$ and $\beta_m'$ in the case where m is at least 3. Namely, with respect to 4 T mark, $\beta_1=1.1$, $\alpha_2=0.9$ and $\beta_m=0.4$, and with respect to 5 T mark, $\beta_1'=1.45$, $\alpha_2'=1.4$ and $\beta_m'=0.4$.

When m=1, i.e. with respect to 3 T mark, $T_{d1}'=1.0$, $\alpha_1'=1.4$ and $\beta_1'=0.85$.

Further, $T_{d1}$, $\alpha_i$, $\beta_i$, etc. in each recording method are summarized in Table 11.

In Table 11, the recording pulse division method is presented as divided into a case where n=3 and a case where n is from 4 to 11. In the case where n=3, three parameters i.e. $T_{d1}'$, $\alpha_1'$, and $\beta_1'$ are required, and in Table 11, they are presented in the columns for $T_{d1}$, $\alpha_1$ and $\beta_m$, respectively. In the case where n is from 4 to 11, in the recording pulse division method (III-A), $T_{d1}+\alpha_1=T_{d1}'+\alpha_1'=2$, $\beta_1+\alpha_2=\beta_{m-1}+\alpha_m=2$, $\alpha_1=\alpha_m=\alpha c$ and $\Delta_m$ were set to be constant irrespective of m. Therefore, although 10 parameters are presented in Table 11 including $T_{d1}$, $\beta_1$, $\beta_{m-1}$, $\beta_m$ and $\alpha_m$, independent parameters are 5 i.e. $\alpha_1$, $\alpha c$, $\Delta_{m-1}$, $\Delta_m$ and $\beta_m'$. Further, when n=4, $\beta_1=\beta_{m-1}=\beta c$, $\alpha_2=\alpha_m=\alpha c$ and $\beta_2=\beta_m$. When n=5, $\beta_1'=\beta c+\Delta_{m-1}$, $\alpha_2=\alpha c+\beta_m$, and $\beta_2'=\beta_m'$.

Comparative Recording Pulse Division Method I

This recording pulse division method resembles the recording pulse division method (II-A) of the present invention, but is different from the recording method of the present invention in that $\alpha_m=\alpha_m'$ i.e. $\Delta_m=0$. Specifically:

Comparative Recording Method CD1

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$ $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.45$, provided that $\beta_1'=\beta_1+\Delta_1$, $\beta_{i-1}'+\alpha_i'=2$ ($i=3$ to $m-1$), $\beta_{m-1}'+\alpha_m'=2.45$, provided that $\beta_{m-1}'=\beta_{m-1}+\Delta_{m-1}$ and $\alpha m=\alpha_m+\beta_m$, $\beta_m'=\beta_m$.

Here, $T_{d1}=T_{d1}'=1$, $\alpha_1=\alpha_1'=1$, $\beta_1=1.1$, $\Delta_1=0.45$, $\alpha_i=\alpha_i'=\alpha c=0.9$ ($\alpha c$ is constant with respect to i when i=2 to m-1), $\beta_{m-1}=1.1$, $\beta_{m-1}=0.45$, $\Delta_m=0$, $\Delta_m=0.45$, $\alpha_m=0.9$, $\beta_m=\beta_m'=0.4$, and $\Delta_m'=0$, and they are constant when m is at least 3.

Further, when m=2, with respect to 4 T mark, $T_{d1}=1$, $\alpha_1=1$, $\beta_1=1.1$, $\alpha_2=\alpha_m=0.9$ and $\beta_m=0.4$, with respect to 5 T mark, $T_{d1}'=1$, $\alpha_1'=1$, $\beta_1'=1.45$, $\alpha_2'=\alpha_m'=0.9$ and $\beta_m'=0.4$.

When m=1, i.e. with respect to 3 T mark, $T_{d1}'=1$, $\alpha_1'=1.4$ and $\beta_1'=0.85$.

Further, $T_{d1}$, $\alpha_i$, $\beta_i$, etc. in "Comparative recording method CD1" are summarized in Table 12. In the case where m is at least 3, ten parameters ($T_{d1}$, $\alpha_1$, $\beta_1$, $\Delta_1$, $\alpha c$, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (II), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\beta_1$, $\alpha_m$ and $\beta_m$. Here, this method is different from the present invention in that $\Delta_m=0$.

TABLE 11

| Recording method | | Td1 | α1 | β1 | αc | βm − 1 | Δm − 1 | αm | Δm | βm | Δm' |
|---|---|---|---|---|---|---|---|---|---|---|---|
| CD1-2e | n = 3 | 1 | 1.4 | | | | | | | 0.85 | |
| | n = 4~11 | 1 | 1 | 1.1 | 0.9 | 1.1 | 0.35 | 0.9 | 0.5 | 0.4 | 0 |

TABLE 12

| Recording method | | Td1 | α1 | β1 | Δ1 | αc | βm−1 | Δm−1 | αm | Δm | βm |
|---|---|---|---|---|---|---|---|---|---|---|---|
| Comparative recording | m ≥ 3 | 1 | 1 | 1.1 | 0.45 | 0.9 | 1.1 | 0.45 | 0.9 | 0 | 0.4 |
| method CD1 | n = 5 | 1 | 1 | 1.45 | | | | | 1.4 | | 0.4 |
| | n = 4 | 1 | 1 | 1.1 | | | | | 0.9 | | 0.4 |
| | n = 3 | 1 | 1.4 | 0.85 | | | | | | | |

Comparative Recording Pulse Division Method II

This recording pulse division method is different from the recording pulse division method (II-A) of the present invention in that it is designed to impart the mark length difference of 1 T between an even number length mark and an odd number length mark for the same m when m is at least 3, solely by $\Delta_m$ (solely by $\alpha_m \neq \alpha_m'$). Specifically:

Comparative Recording Method CD2

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$)

$\beta_{m-1}'+\alpha_m'=2.6$, provided that $\beta_{m-1}'=\beta_{m-1}+\Delta_{m-1}$ and $\alpha_m'=\alpha_m+\Delta_m$, $\beta_m'=\beta_m+\Delta_m'$.

Here, $T_{d1}=T_{d1}'=1$, $\alpha_1=\alpha_1'=1$, $\beta_1=1.1$, $\alpha_i=\alpha_i'=\alpha c=0.9$ (αc is constant with respect to i when i=2 to m−1), $\beta_{m-1}=1.1$, $\Delta_{m-1}=0$, $\Delta_m=0.6$, $\Delta_{mm}=0.6$, $\alpha_m=0.9$, $\beta_m=\beta_m'=0.4$, and $\Delta_m'=0$, and they are constant when m is at least 3.

However, $\beta_1$, $\alpha_2$, $\beta_2$, $\beta_1'$, $\alpha_2'$ and $\beta_2'$ in the case where m=2 are deemed to be $\beta_{m-1}$, $\alpha_m$, $\beta_m$, $\beta_{m-1}'$, $\alpha_m'$ and $\beta_m'$ in the case where m is at least 3. Namely, with respect to 4 T mark, $\beta_1=1.1$, $\alpha_2=0.9$ and $\beta_m=0.4$, and with respect to 5 T mark, $\beta_1'=1.1$, $\alpha_2'=1.5$ and $\beta_m'=0.4$.

When m=1, i.e. with respect to 3 T mark, $T_{d1}'=1.0$, $\alpha_1'=1.4$ and $\beta_1'=0.85$.

Further, $T_{d1}$, $\alpha_i$, $\beta_1$, etc. in the recording method are summarized in Table 13.

In Table 13, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 13, they are presented in the columns for $T_{d1}$, $\alpha_1$ and $\beta_m$, respectively.

Further, when n=4, $\beta_1=\beta_{m-1}=\beta c$, $\alpha_2=\alpha_m=\alpha c$ and $\beta_2=\beta_m$. When n=5, $\beta_1'=\beta c+\beta_{m-1}$, $\alpha_2'=\alpha c+\beta_m$, and $\beta_2'=\beta_m'$.

TABLE 13

| Recording method | | Td1 | α1 | β1 | αc | βm−1 | Δm−1 | αm | Δm | βm | Δm' |
|---|---|---|---|---|---|---|---|---|---|---|---|
| Comparative recording | n = 3 | 1 | 1.4 | | | | | | | 0.85 | |
| method CD2 | n = 4~11 | 1 | 1 | 1.1 | 0.9 | 1.1 | 0 | 0.9 | 0.6 | 0.4 | 0 |

Figure 48:
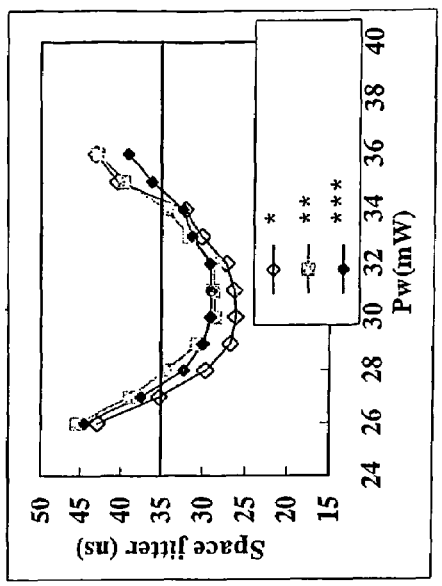
FIG. 48 presents an example of data showing recording characteristics when recording was carried out on the same medium by various recording methods.
Figure 48:
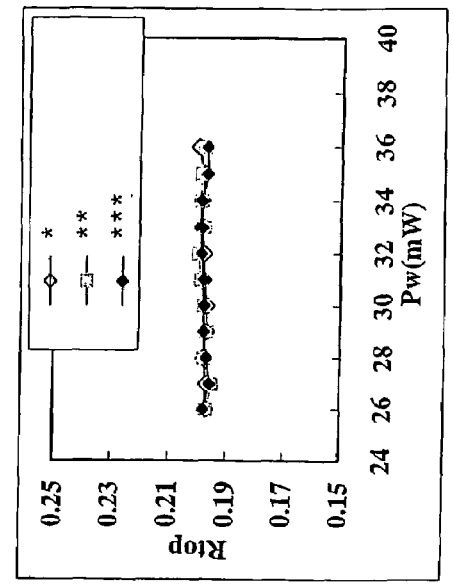
Figure 48:
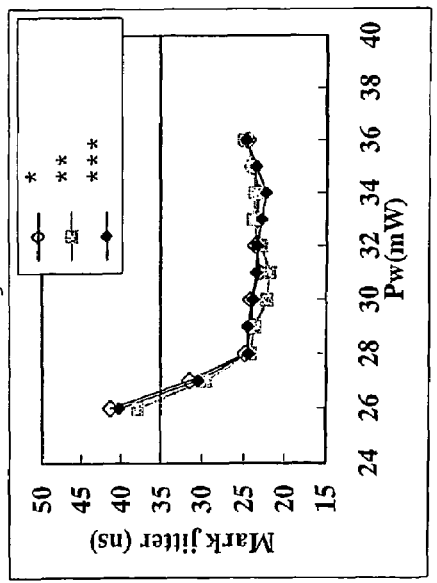
Figure 48:
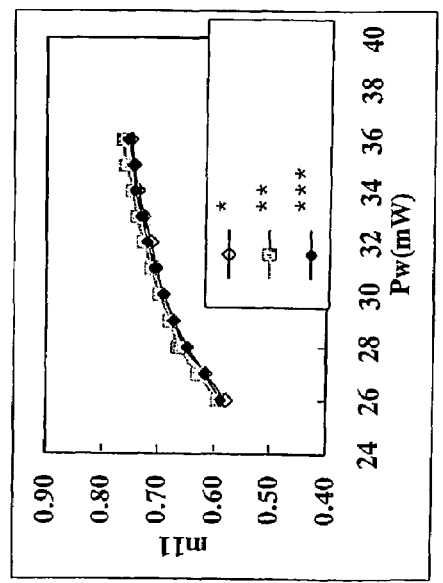

The results of evaluation of overwriting characteristics in the cases of "Recording method CD1-2e", "Comparative recording method CD1" and "Comparative recording method CD2", are shown in FIG. 48.

In FIGS. 48, (a) to (d) show the Pw dependency of (a) 3 T mark length jitter, (b) 3 T space length jitter, (c) modulation $m_{11}$ and (d) $R_{top}$, respectively.

The optimum writing power was in the vicinity of from 28 to 33 mW in "Recording method CD1-2e", in the vicinity of from 29 to 33 mW in "Comparative recording method CD1", and in the vicinity of from 29 to 34 mW in "Comparative recording method CD2", and the overwriting characteristics were evaluated by the values at such a power.

The horizontal lines in FIGS. 48(a) and (b) indicate the standardized upper limit value of jitter=35 (nsec) during retrieving at 1-time velocity. In each case, good jitter values of less than 35 nsec were obtained.

From FIGS. 48(c) and (d), it is evident that in each case, the modulation $m_{11}$ was from 60% to 80% (from 0.6 to 0.8), and $R_{top}$ was from 15 to 25%.

Further, in the vicinity of the optimum writing power, in each case, with respect to the mark lengths and space lengths of from 3 T to 11 T, desired mark lengths and space lengths were obtained within a range of the reference clock period T±20%. As the asymmetry value, a value within ±10% was obtained.

However, the 3 T space jitter values by "Comparative recording method CD1" and by "Comparative recording method CD2" were slightly higher than the 3 T space jitter values by "Recording method CD1-2e".

Figure 49:
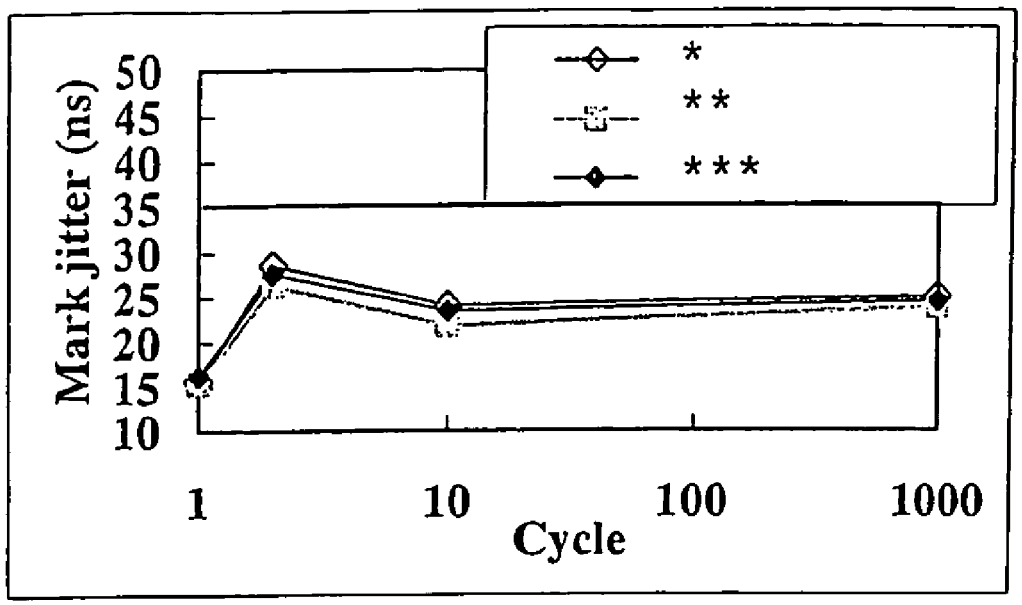
FIG. 49 presents an example of data showing overwriting characteristics when recording was carried out on the same medium by various recording methods.
Figure 49:
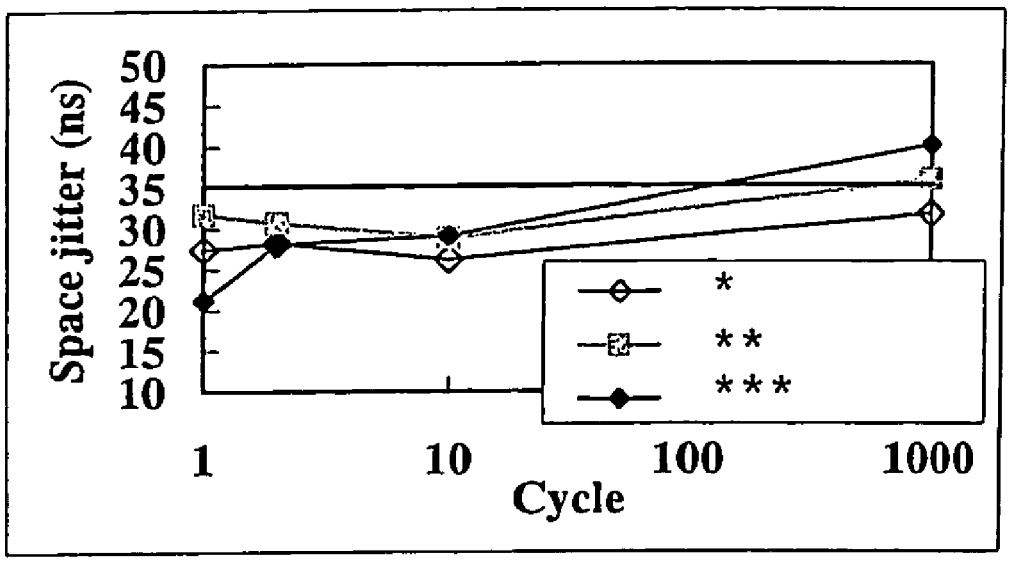

Now, the results of evaluation of overwriting durability are shown in FIG. 49 in cases wherein "Recording method CD1-2e", "Comparative recording method CD1" and "Comparative recording method CD2" were used. In the evaluation of the repeated overwriting characteristics, Pw/Pe in "Recording method CD1-2e" was set to be Pw/Pe=30 mW/8 mW; Pw/Pe in "Comparative recording method CD1" was set to be Pw/Pe=31 mW/8.4 mW; and Pw/Pe in "Comparative recording method CD2" was set to be Pw/Pe=31 mW/8.4 mW.

In FIG. 49, (a) shows 3 T mark length jitter, and (b) shows 3 T space length jitter. In FIG. 49, for the purpose of showing the repeated overwriting cycle number in a logarithmic graph, the first recording is represented by the first overwriting, and when overwriting was carried out 9 times thereon, is represented by the 10th overwriting.

FIGS. 49(a) and (b) show such results that when recording was carried out by "Recording method CD1-2e", the jitter value was less than 35 nsec even after overwriting 1000 times, while when recording was carried out by "Comparative recording method CD1" and by "Comparative recording method CD2", the space length jitter values after overwriting 1000 times exceeded 35 ns.

Example 12

In the above Basic Example, a disk was prepared and recording was carried out as follows.

On a substrate, 95 nm of a lower protective layer made of $(ZnS)_{80}(SiO_2)_{20}$, 15 nm of a recording layer made of $Ge_{16}Sb_{64}Sn_{20}(Sn_{0.2}(Ge_{0.2}Sb_{0.8})_{0.8})$, 30 nm of an upper protective layer made of $(ZnS)_{80}(SiO_2)_{20}$, 4 nm of an interfacial layer made of Ta, 210 nm of a reflective layer made of Ag and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_{16}Sb_{64}Sn_{20}$ is an atomic ratio. The same applies in the following Examples.

The volume resistivity $\rho_v$ of this Ag reflective layer was about 27 nΩ·m, and the sheet resistivity $\rho_s$ was about 0.13Ω/□. The initialization was carried out by scanning a laser diode beam having a wavelength of about 810 nm and having an oval spot shape having a major axis of about 75 μm and a minor axis of about 1.0 μm, in the minor axis direction at a linear velocity of about 12 m/s. The irradiation power was about 950 mW.

On this disk, by means of the tester 2 with NA=0.50, overwriting of EFM modulation signal was carried out at 24-times velocity by three recording methods of Example 10, i.e. "Recording method CD1-2e", "Comparative recording method CD1" and "Comparative recording method CD2", and the characteristics were evaluated.

While maintaining Pe/Pw i.e. the ratio of erasing power Pe to writing power Pw, to be constant, Pw was changed every 1 mW from about 26 mW to about 40 mW, whereby the overwriting characteristics at the respective writing powers were evaluated. Each was evaluated by the value after overwriting ten times. Bias power Pb was set to be constant at substantially zero.

Figure 50:
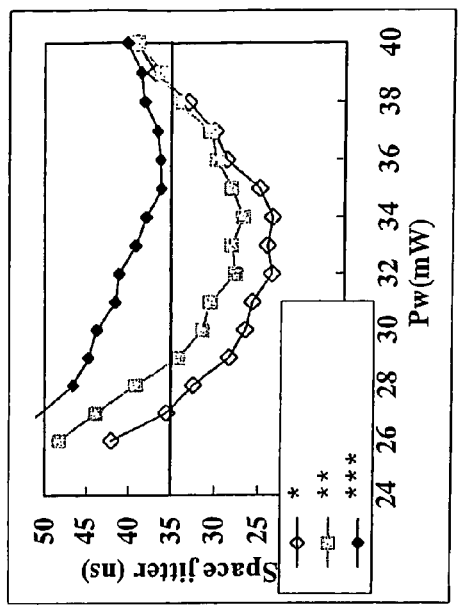
FIG. 50 presents another example of data showing recording characteristics when recording was carried out on the same medium by various recording methods.
Figure 50:
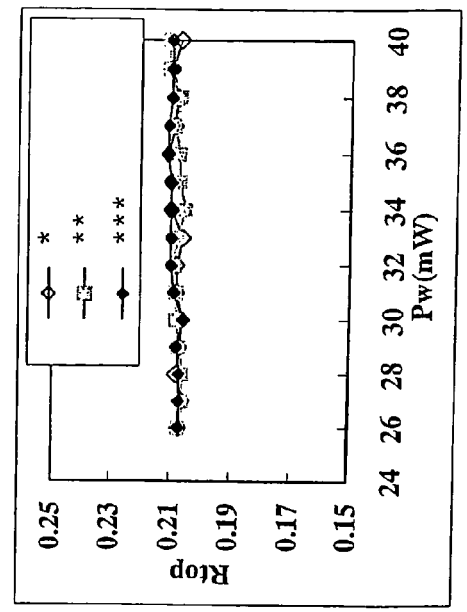
Figure 50:
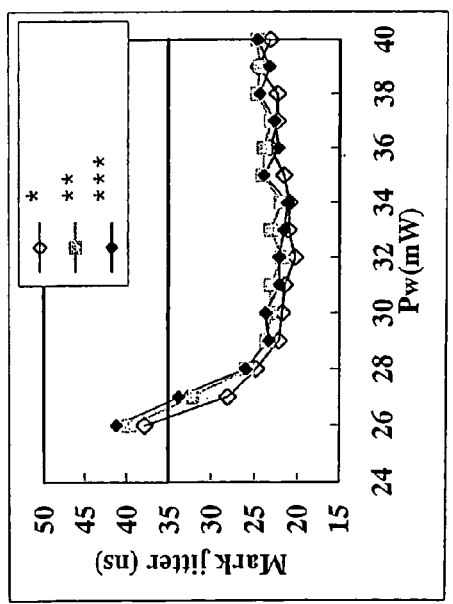
Figure 50:
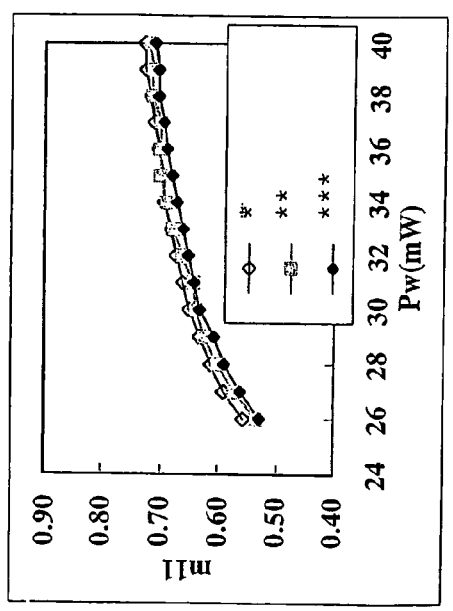

The results of evaluation of overwriting characteristics are shown in FIG. 50 in the cases where recording was carried out by the respective recording methods i.e. "Recording method CD1-2e", "Comparative recording method CD1" and "Comparative recording method CD2".

FIGS. 50(a) to (d) show the Pw dependency of (a) 3 T mark length jitter, (b) 3 T space length jitter, (c) modulation $m_{11}$ and (d) $R_{top}$, respectively.

The optimum writing power was in the vicinity of from 29 to 37 mW in "Recording method CD1-2e", in the vicinity of from 30 to 37 mW in "Comparative recording method CD1" and in the vicinity of from 35 to 37 mW in "Comparative recording method CD2", and the overwriting characteristics were evaluated by the values at such a power.

From FIGS. 50(c) and (d), it is evident that in each case, the modulation $m_{11}$ was from 60% to 80% (from 0.6 to 0.8), and $R_{top}$ was from 15 to 25%.

Further, in the vicinity of the optimum writing power, in each case, with respect to the mark lengths and space lengths of from 3 T to 11 T, desired mark lengths and space lengths were obtained within a range of about ±10%. As the asymmetry value, a value within ±10% was obtained.

As is apparent from FIG. 50(b), 3T space jitters are good at a level of less than 35 nsec when recording is carried out by "Recording method 1-2e". However, it is apparent that if recording is carried out by "Comparative recording method CD1" and "Comparative recording method CD2", 3 T space length jitters tend to be high as compared with a case where recording is carried out by "Recording method CD1-2e"). Especially by "Comparative recording method CD2", 3 T space length jitters were more than 35 nsec at all Pw.

Figure 51:
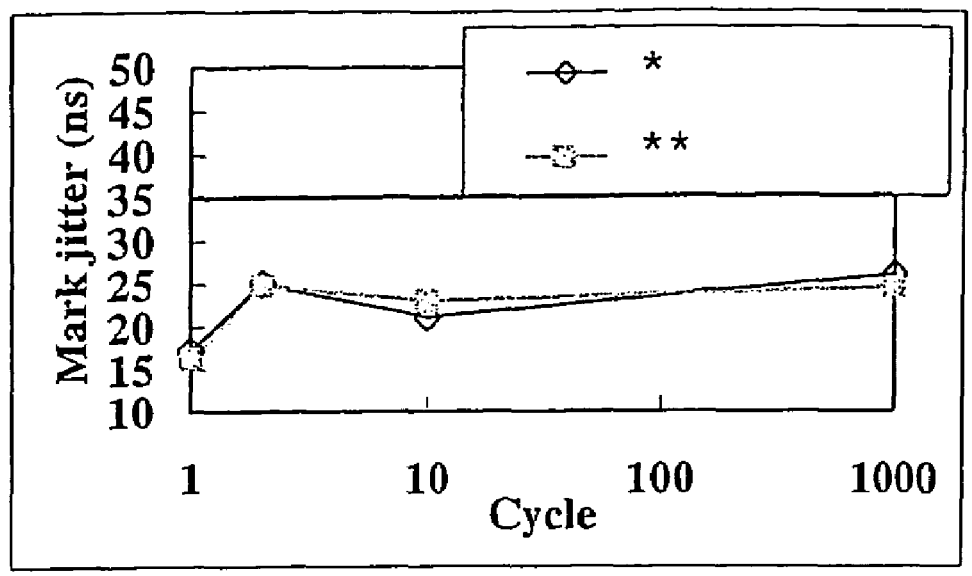
FIG. 51 presents another example of data showing overwriting characteristics when recording was carried out on the same medium by various recording methods.
Figure 51:
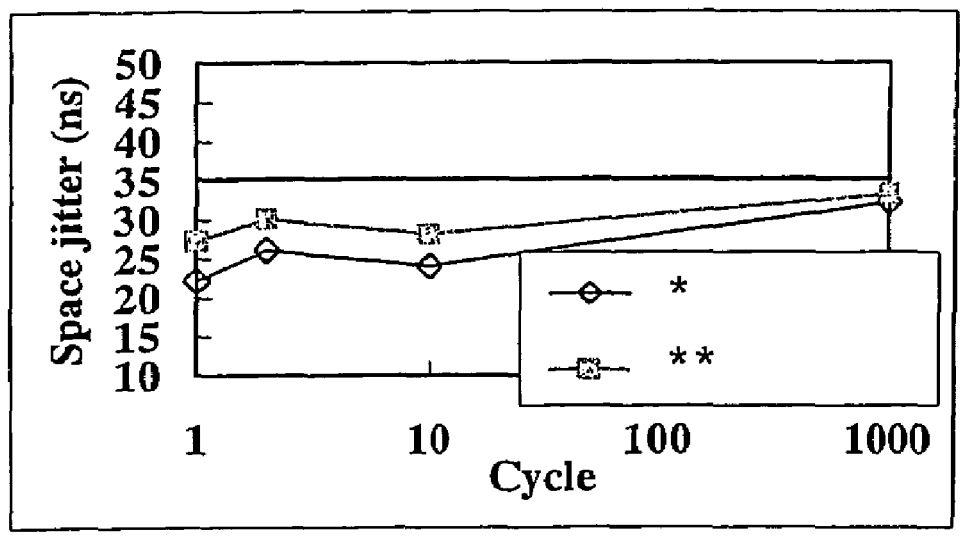

Now, the results of evaluation of overwriting durability are shown in FIG. 51 in cases wherein "Recording method CD1-2e" and "Comparative recording method CD1" were used. In the measurement of overwriting durability, Pw/Pe was set to be 33 mW/9 mW when recording was carried out by "Recording method CD1-2e", and Pw/Pe was set to be 33 mW/9 mW when recording was carried out by "Comparative recording method CD1". Further, no evaluation of overwriting durability was carried out by "Comparative recording method CD2", since even the initial jitter characteristics were poor.

In FIG. 51, (a) shows 3 T mark length jitter, and (b) shows 3 T space length jitter. In FIG. 51, for the purpose of showing the repeated overwriting cycle number in a logarithmic graph, the first recording is represented by the first overwriting, and when overwriting was repeated 9 times thereon, is represented by the 10th overwriting. When recording was carried out by "Recording method CD1-2e", the jitter value was less than 35 nsec even after overwriting 1000 times. On the other hand, by "Comparative recording method CD1", in all overwriting cycle numbers, the space length jitter values were higher than the space length jitter values in the case where recording was carried out by "Recording method CD1-2e".

Also from the foregoing results, the superiority of the "Recording method CD1-2e" as the recording pulse division method (III-A) of the present invention is evident.

Further, in "Comparative recording method CD1", a difference $\Delta_1$ is given between $\beta_1$ and $\beta_1'$, whereby the design of the recording pulse-generating circuit will be complicated, since all of the subsequent recording pulses will not synchronize with the reference clock, unless $\Delta_1$ is a value capable of synchronizing with the reference clock period T (for example, unless $\Delta_1$ is integral multiples (practically 1 or 2-times period) of the reference clock period T, or unless $\Delta_1$ is 1/integral multiples (practically ½ T or ¼) of the reference clock period T). Especially when it is attempted to employ "Comparative recording method CD1" in P-CAV or CAV system, the recording pulse-generating circuit will be more complicated.

On the other hand, "Comparative recording method CD2" has a merit in that the recording pulse-generating circuit can be simplified, since it requires only to give $\Delta_m$ between $\alpha_m$ and $\alpha_m'$. However, in a case where the optical recording medium in this Example is to be used at a low linear velocity at a level of 8-times velocity or 16-times velocity, cooling tends to be inadequate by "Comparative recording method CD2" as it does not control $\beta_i$ and $\beta_i'$, whereby the difference from the recording method of the present invention such as "Recording method CD1-2e" will be more distinct. Namely, the quality of record signals recorded by "Comparative recording method CD2" at a low linear velocity will be poorer.

Example 13

On the disk of Example 12, overwriting of EFM modulation signals was carried out by means of tester 2 having NA=0.50 at linear velocities of from 8-times velocity to 24-times velocity by the following three types of recording pulse division methods, and the characteristics were evaluated. The following three types of recording pulse division methods are examples wherein the number of parameters variable depending upon the linear velocity is particularly reduced to facilitate finding optimum parameters for every linear velocity, among recording pulse division methods (VI), (VI-A) and (VI-B) to enable overwriting in a wide range of linear velocities by e.g. CAV or P-CAV.

While maintaining Pe/Pw i.e. the ratio of erasing power Pe to writing power Pw, to be constant at 0.27, Pw was changed, and overwriting characteristics were evaluated at the respective writing powers. Each was evaluated by the values after overwriting 10 times. Pb was set to be constant at approx. 0 mW.

Recording Pulse Division Method CD-VI-3

This recording method is an example of the recording pulse division method (VI-B), but $\Delta_{m-1}$=0, and only $\Delta_m$ and $\beta_m'$ are optimized at each linear velocity, to impart a mark length difference between an odd number length and an even number length.

In Table 14, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 14, they are presented in the columns for $T_{d1}$, $\alpha_1$ and $\beta_m$, respectively. In the case where n is from 4 to 11, $T_{d1}$, $\alpha_1$, $\alpha_1'$, $\alpha_i$=αc (i=2 to m) and $\alpha_i'$=αc (i=2 to m−1) are constant irrespective of n, and $T_{d1}+\alpha_1=T_{d1}'+\alpha_1'=2$, $\beta_{i-1}+\alpha_i=2$ (i=2 to m) and $\beta_{i-1}'+\alpha_i'=2$ (i=2 to m−1). Therefore, $\beta_i=2-\alpha c$ (i=2 to m−1) and $\beta_i'=2-\alpha c$ (i=2 to m−2). Further, $\beta_{m-1}'=\beta_{m-1}+\Delta_{m-1}=\alpha c+\Delta_{m-1}$, $\alpha_m'=\alpha_m+\Delta_m=\alpha c+\alpha_m$ and $\beta_m'=\beta_m+\beta_m'$, and $\Delta_{m-1}$, $\Delta_m$ and $\beta_m'$ are set to be constant irrespective of m. Here, $\Delta_{m-1}$ is 0 irrespective of m or the linear velocity. When n=4 to 11 (m being at least 2), independent parameters are $\alpha_1$, αc, $\Delta_m$, $\beta_m$ and $\Delta_m'$.

Further, when m=2 (n=4, 5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m=3. Accordingly, when n=4, $\beta_2=\beta_m$. When n=5, $\beta_1'=\beta c$, $\alpha_2=\alpha c+\beta_m$ and $\beta_2'=\beta_m+\beta_m'$.

$Pw_0$ as the writing power with which the jitter value would be minimum, is shown in Table 14.

At each linear velocity, good jitter values of less than 35 nsec were obtained with respect to mark lengths and space lengths in retrieving at 1-time velocity within a range of about $Pw_0 \pm 1$ mW. Likewise, with respect to all mark length and space length jitters, good jitters of less than 35 nsec were obtained.

Further, at each linear velocity, the modulation $m_{11}$ was from 60% to 80% (0.6 to 0.8), $R_{top}$ was from 15 to 25%, and the asymmetry value was a value within ±10%. In the vicinity of $Pw_0$, the desired mark lengths and space lengths were obtained within a range of the reference clock period T±20% with respect to any of mark lengths and space lengths of from 3 T to 11 T.

In summarizing the foregoing, with the recording medium and the recording pulse division method (CD-VI-3) of the present invention, good characteristics can be obtained by the recording pulse division method having a small number of parameters made variable, within a wide range of from 8 to 24-times velocities, and the signals to be retrieved are of a quality retrievable by a conventional CD drive. Further, also at a linear velocity between them, good characteristics can be obtained by making the recording pulse division method variable as in the present invention.

Figure 53:
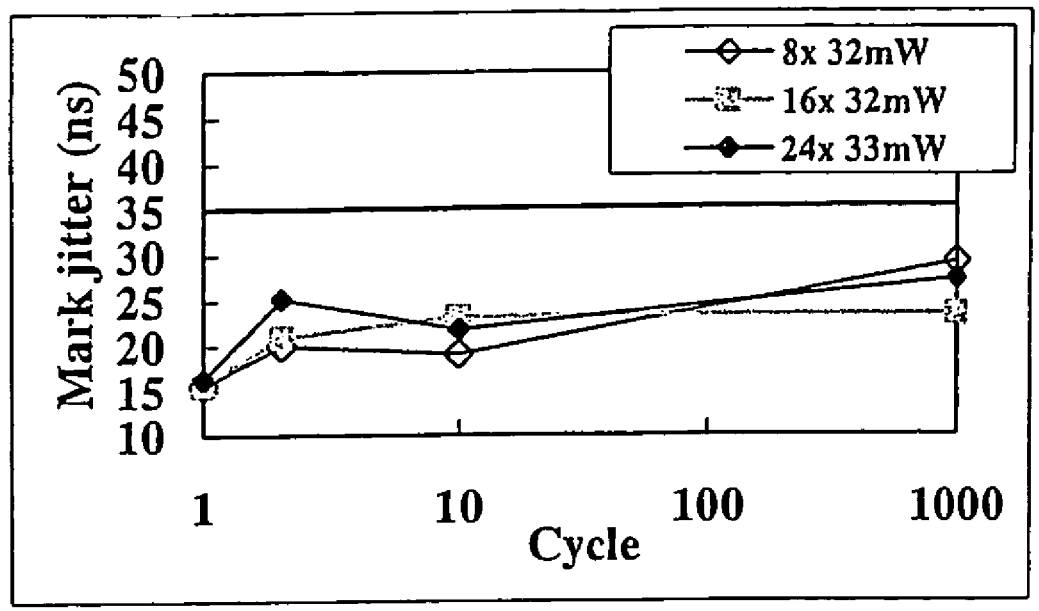
FIG. 53 presents data showing overwriting characteristics at the various linear velocities when recording was carried out on the same medium at 8- to 24-times velocities by another prescribed recording method.
Figure 53:
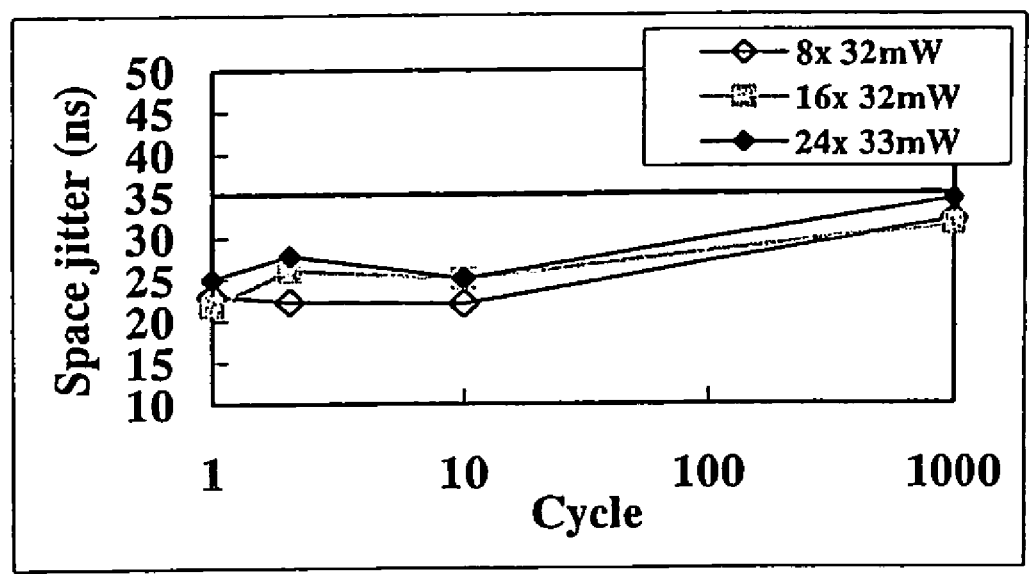

Then, evaluation of the overwriting durability was carried out at each linear velocity. The overwriting cycle dependency is shown in FIG. 53 when overwriting was carried out at each linear velocity at the $Pw_0$ and the Pe/Pw ratio as shown in Table 14. In FIG. 53, (a) shows 3 T mark length jitters, and (b) shows 3 T space length jitters.

At each linear velocity, the overwriting durability of 1000 times required for CD-RW was sufficiently satisfied.

Recording Pulse Division Method CD-VI-4

This recording method is an example of the recording pulse division method (VI-B), wherein $\beta_m'=$, and only $\Delta_{m-1}$ and $\Delta_m$ are optimized to give a mark length difference between an even number length and an odd number length.

Specifically, overwriting was carried out at 8, 16 and 24-times velocities.

In Table 15, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 15, they are presented in the columns for $T_{d1}$, $\alpha_1$ and $\beta_m$, respectively. In the case where n is from 4 to 11, $T_{d1}$, $\alpha_1$, $\alpha_1'$, $\alpha_i$=αc (i=2 to m) and $\alpha_i'$=αc (i=2 to m−1) are constant irrespective of n, and $T_{d1}+\alpha_1=T_{d1}'+\alpha_1'=2$, $\beta_{i-1}+\alpha_i=2$ (i=2 to m) and $\beta_{i-1}'+\alpha_i'=2$ (i=2 to m−1) Therefore, $\beta_i=2-\alpha c$ (i=2 to m−1) and $\beta_i'=2-\alpha c$ (i=2 to m−2). Further, $\beta_{m-1}'=\beta_{m-1}+\Delta_{m-1}=\beta c+\Delta_{m-1}$, $\alpha_m'=\alpha_m+\Delta_m=\alpha_i c+\Delta_m$ and $\beta_m'=\beta_m+\Delta_m'$, and $\Delta_{m-1}$, $\Delta_m$ and $\Delta_m'$ are set to be constant irrespective of m. Here, $\beta_m'$ is 0

TABLE 14

| -times velocity | | Td1 | α1 | αc | Δm − 1 | Δm | βm | Δm' | Pwo | Pe/Pw |
|---|---|---|---|---|---|---|---|---|---|---|
| 8 | 3 | 1.65 | 0.50 | — | — | — | 2.05 | — | 32 | 0.27 |
|  | 4~11 | 1.65 | 0.35 | 0.35 | 0.00 | 0.25 | 1.15 | 0.75 |  | 0.27 |
| 16 | 3 | 1.30 | 1.15 | — | — | — | 1.30 | — | 32 | 0.27 |
|  | 4~11 | 1.35 | 0.65 | 0.65 | 0.00 | 0.35 | 0.75 | 0.70 |  | 0.27 |
| 24 | 3 | 1.00 | 1.40 | — | — | — | 0.85 | — | 33 | 0.27 |
|  | 4~11 | 1.00 | 1.00 | 0.90 | 0.00 | 0.75 | 0.40 | 0.20 |  | 0.27 |

Figure 52:
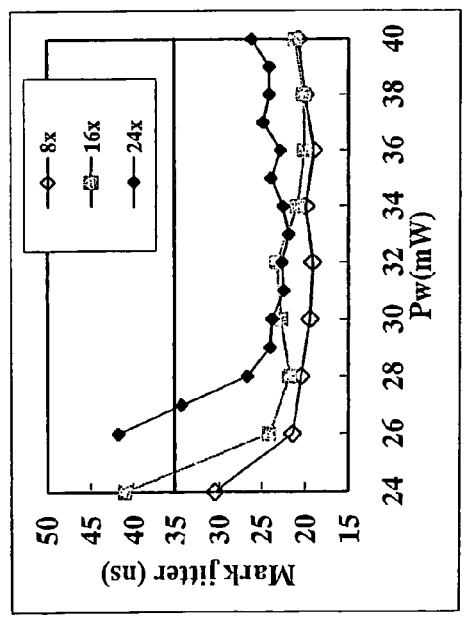
FIG. 52 presents data showing recording characteristics at the various linear velocities when recording was carried out on the same medium at 8- to 24-times velocities by another prescribed recording method.
Figure 52:
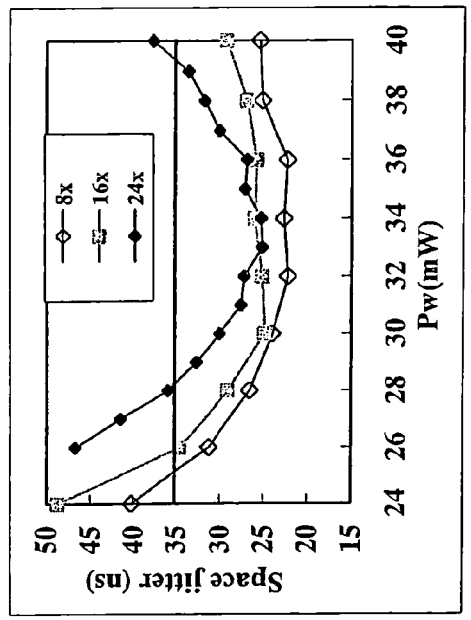
Figure 52:
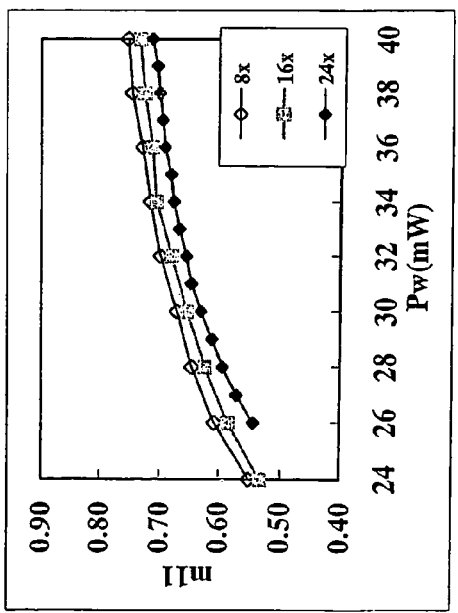
Figure 52:
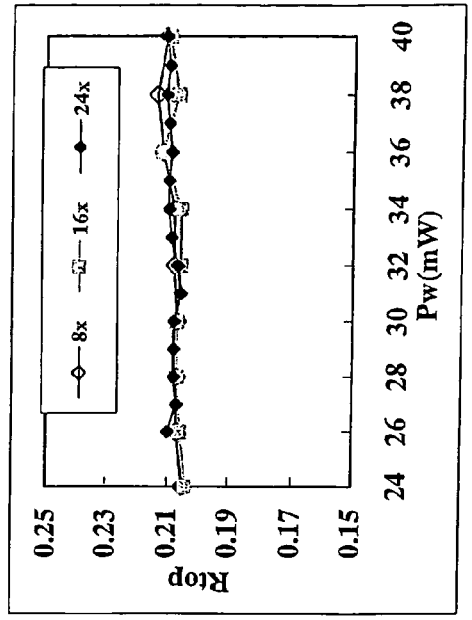

FIG. 52 shows (a) 3 T mark length jitter, (b) 3 T space length jitter, (c) modulation $m_{11}$ and (d) $R_{top}$ at 8, 16 and 24-times velocities.

irrespective of m or the linear velocity. When n=4 to 11 (m being at least 2), independent parameters are $\alpha_1$, αc, $\Delta_{m-1}$, $\Delta_m$ and $\beta_m$.

Further, when m=2 (n=4, 5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m=3. Accordingly, when n=4, $\beta_2=\beta_m$. When n=5, $\beta_1'=\beta c+\Delta_{m-1}$, $\alpha_2=\alpha c+\Delta_m$ and $\beta_2'=\beta_m$.

$Pw_0$ as the writing power with which the jitter value would be minimum, is shown in Table 15.

TABLE 15

| -times velocity | | Td1 | α1 | αc | Δm − 1 | Δm | βm | Δm' | Pwo | Pe/Pw |
|---|---|---|---|---|---|---|---|---|---|---|
| 8 | 3 | 1.65 | 0.50 | — | — | — | 2.05 | — | 32 | 0.27 |
|  | 4~11 | 1.65 | 0.35 | 0.35 | 0.75 | 0.25 | 1.15 | 0.00 |  | 0.27 |
| 16 | 3 | 1.30 | 1.15 | — | — | — | 1.30 | — | 32 | 0.27 |
|  | 4~11 | 1.35 | 0.65 | 0.65 | 0.60 | 0.35 | 0.75 | 0.00 |  | 0.27 |
| 24 | 3 | 1.00 | 1.40 | — | — | — | 0.85 | — | 33 | 0.27 |
|  | 4~11 | 1.00 | 1.00 | 0.90 | 0.10 | 0.75 | 0.40 | 0.00 |  | 0.27 |

Figure 54:
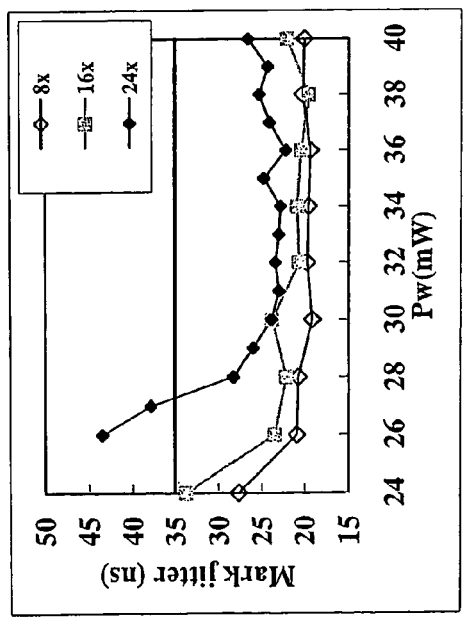
FIG. 54 presents data showing recording characteristics at the various linear velocities when recording was carried out on the same medium at 8- to 24-times velocities by another prescribed recording method.
Figure 54:
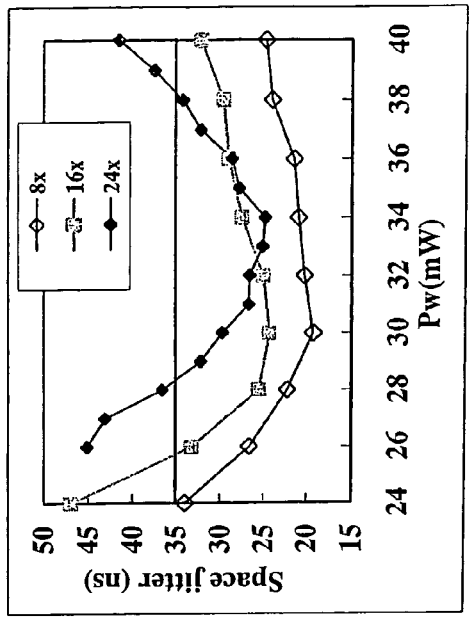
Figure 54:
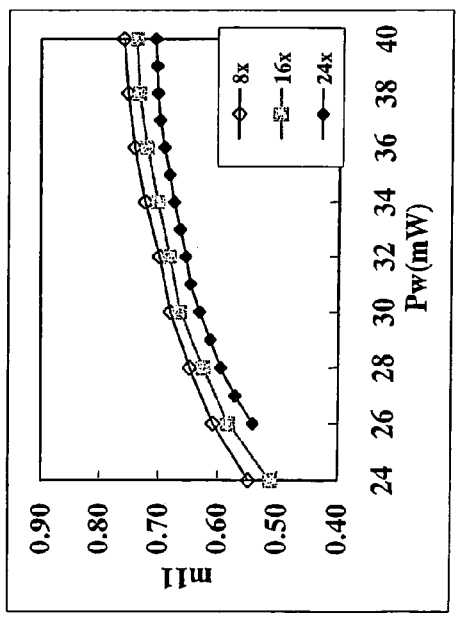
Figure 54:
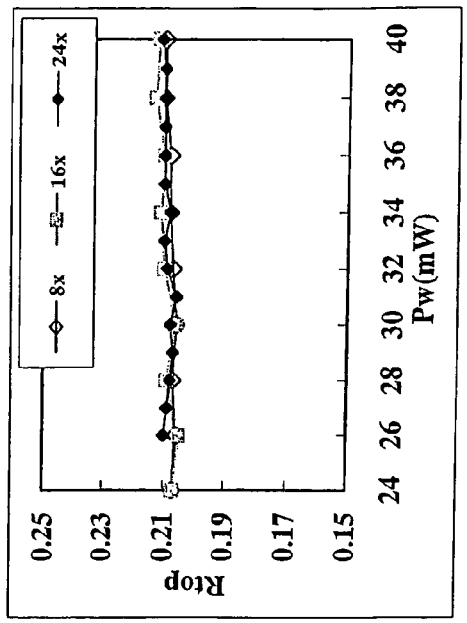

FIG. 54 shows (a) 3 T mark length jitter, (b) 3 T space length jitter, (c) modulation $m_{11}$ and (d) $R_{top}$ at 8, 16 and 24-times velocities.

At each linear velocity, good jitter values of less than 35 nsec were obtained with respect to mark lengths and space lengths in retrieving at 1-time velocity within a range of about $Pw_0 \pm 1$ mW. Likewise, with respect to all mark length and space length jitters, good jitters of less than 35 nsec were obtained.

Further, at each linear velocity, the modulation $m_{11}$ was from 60% to 80% (0.6 to 0.8), $R_{top}$ was from 15 to 25%, and the asymmetry value was a value within ±10%. In the vicinity of $Pw_0$, the desired mark lengths and space lengths were obtained within a range of the reference clock period T±10% with respect to any of mark lengths and space lengths of from 3 T to 11 T.

In summarizing the foregoing, when the recording medium and the recording pulse division method (CD-VI-4) of the present invention are applied, good characteristics can be obtained by the recording pulse division method having a small number of parameters made variable, within a wide range of from 8 to 24-times velocities, and the signals to be retrieved are of a quality retrievable by a conventional CD drive. Further, also at a linear velocity between them, good characteristics can be obtained by making the recording pulse division method variable as in the present invention.

Figure 55:
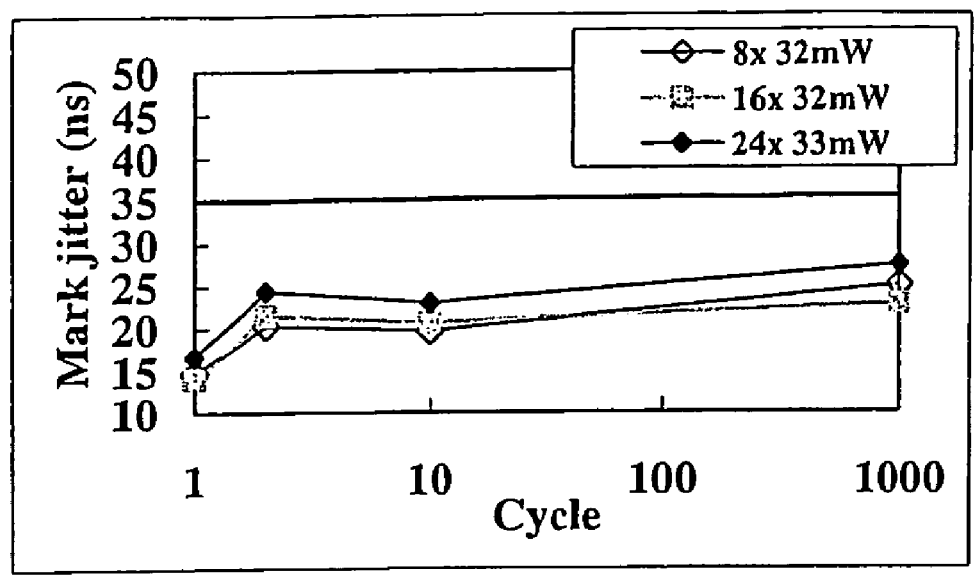
FIG. 55 presents data showing overwriting characteristics at the various linear velocities when recording was carried out on the same medium at 8- to 24-times velocities by another prescribed recording method.
Figure 55:
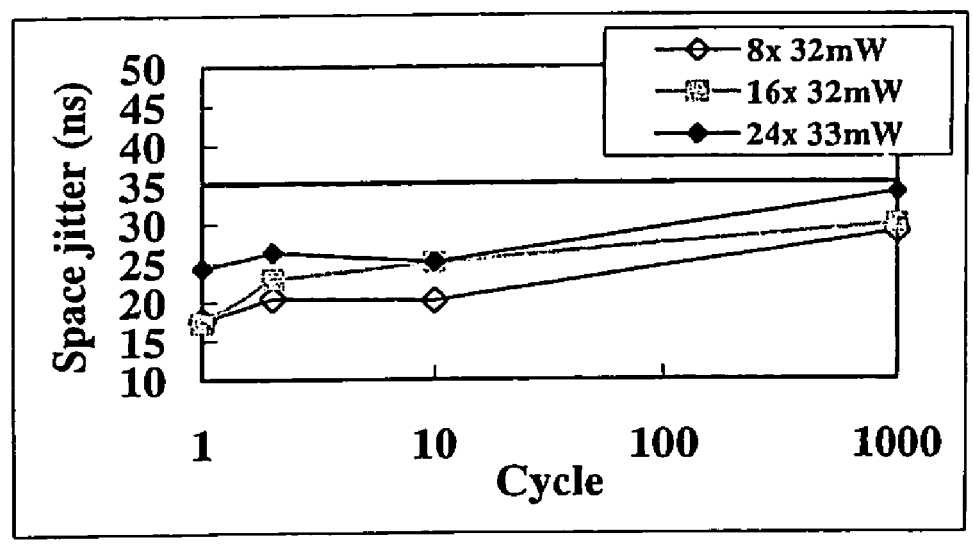

Then, evaluation of the overwriting durability was carried out at each linear velocity. The overwriting cycle dependency is shown in FIG. 55 when overwriting was carried out at each linear velocity at the $Pw_0$ and the Pe/Pw ratio as shown in Table 15. In FIG. 55, (a) shows 3 T mark length jitters, and (b) shows 3 T space length jitters.

At each linear velocity, the overwriting durability of 1000 times required for CD-RW was sufficiently satisfied.

Recording Pulse Division Method CD-VI-5

This recording method is an example of the recording pulse division method (VI-B), wherein $\Delta=\beta_{m-1}=\beta_m$, and only $\Delta$ and $\beta_m'$ are optimized to give a mark length difference between an even number length and an odd number length.

Specifically, overwriting was carried out at 8, 16 and 24-times velocities.

In Table 16, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 16, they are presented in the columns for $T_{d1}$, $\alpha_1$ and $\beta_m$, respectively. In the case where n is from 4 to 11, $T_{d1}$, $\alpha_1$, $\alpha_1'$, $\alpha_i=\alpha c$ (i=2 to m) and $\alpha_i'=\alpha c$ (i=2 to m−1) are constant irrespective of n, and $T_{d1}+\alpha_1=T_{d1}'+\alpha_1'=2$, $\beta_{i-1}+\alpha_i=2$ (i=2 to m) and $\beta_{i-1}'+\alpha_i'=2$ (i=2 to m−1) Therefore, $\beta_i=2-\alpha c$ (i=2 to m−1) and $\beta_i'=2-\alpha c$ (i=2 to m−2). Further, $\alpha_{m-1}'=\beta_{m-1}+\Delta_{m-1}=\beta c+\beta_{m-1}$, $\alpha_m'=\alpha_m+\Delta_m=\alpha c+\Delta_m$ and $\beta_m'=\beta_m+\beta_m'$, and $\Delta_{m-1}$, $\Delta_m$ and $\Delta_m'$ are set to be constant irrespective of m. Here, $\Delta_{m-1}=\beta_m$ irrespective of m or the linear velocity. When n=4 to 11 (m being at least 2), independent parameters are $\alpha_1$, $\alpha c$, $\Delta_{m-1}=\Delta_m$, $\beta_m$ and $\Delta_m$.

Further, when m=2 (n=4, 5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m=3. Accordingly, when n=4, $\beta_2=\beta_m$. When n=5, $\beta_1'=\beta c+\Delta_m$, $\alpha_2=\alpha c+\Delta_m$ and $\beta_2'=\beta_m$.

$Pw_0$ as the writing power with which the jitter value would be minimum, is shown in Table 16.

TABLE 16

| -time velocity | | Td1 | α1 | αc | Δm − 1 | Δm | βm | Δm' | Pwo | Pe/Pw |
|---|---|---|---|---|---|---|---|---|---|---|
| 8 | 3 | 1.65 | 0.50 | — | — | — | 2.05 | — | 32 | 0.27 |
|  | 4~11 | 1.65 | 0.35 | 0.35 | 0.25 | 0.25 | 1.15 | 0.55 |  | 0.27 |
| 16 | 3 | 1.30 | 1.15 | — | — | — | 1.30 | — | 32 | 0.27 |
|  | 4~11 | 1.35 | 0.65 | 0.65 | 0.30 | 0.30 | 0.75 | 0.40 |  | 0.27 |
| 24 | 3 | 0.95 | 1.40 | — | — | — | 0.85 | — | 32 | 0.27 |
|  | 4~11 | 1.00 | 1.00 | 0.90 | 0.40 | 0.40 | 0.40 | 0.00 |  | 0.27 |

Figure 56:
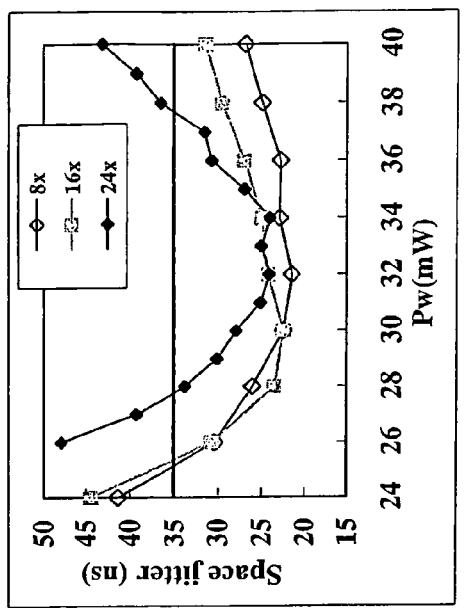
FIG. 56 presents data showing overwriting characteristics at the various linear velocities when recording was carried out on the same medium at 8- to 24-times velocities by another prescribed recording method.
Figure 56:
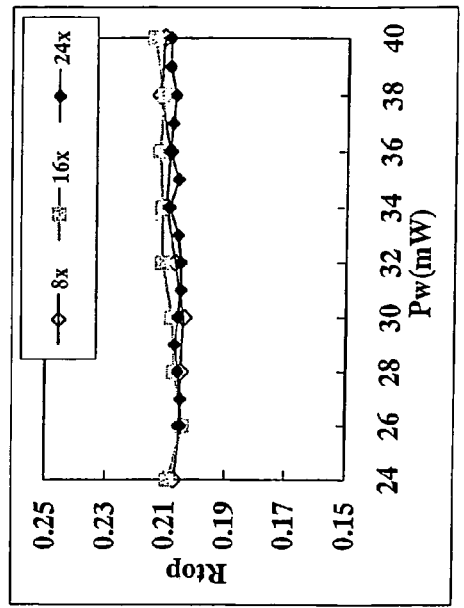
Figure 56:
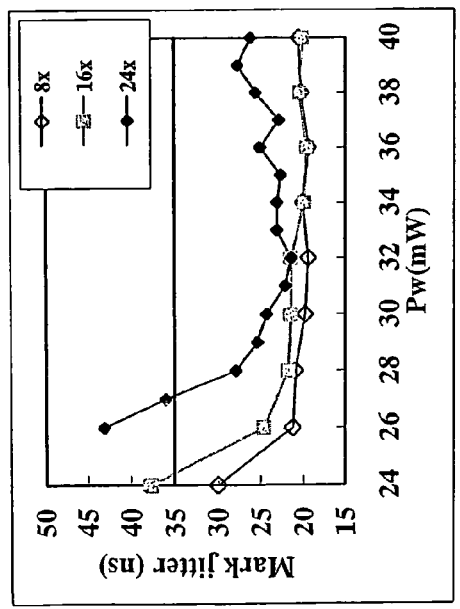
Figure 56:
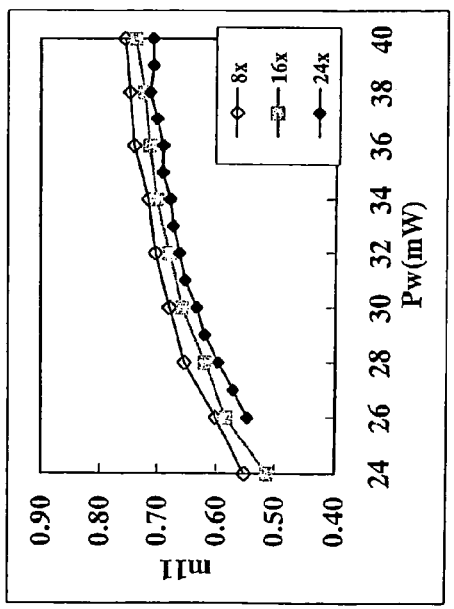

FIG. 56 shows (a) 3 T mark length jitter, (b) 3 T space length jitter, (c) modulation $m_{11}$ and (d) $R_{top}$ at 8, 16 and 24-times velocities.

At each linear velocity, good jitter values of less than 35 nsec were obtained with respect to mark lengths and space lengths in retrieving at 1-time velocity within a range of about $Pw_0 \pm 1$ mW. Likewise, with respect to all mark length and space length jitters, good jitters of less than 35 nsec were obtained.

Further, at each linear velocity, the modulation $m_{11}$ was from 60% to 80% (0.6 to 0.8), $R_{top}$ was from 15 to 25%, and the asymmetry value was a value within ±10%. In the vicinity of $Pw_0$, the desired mark lengths and space lengths were obtained within a range of the reference clock period T±20% with respect to any of mark lengths and space lengths of from 3 T to 11 T.

In summarizing the foregoing, when the recording medium and the recording pulse division method (CD-VI-5) of the present invention are applied, good characteristics can be obtained by the recording pulse division method having a small number of parameters made variable, within a wide range of from 8 to 24-times velocities, and the signals to be retrieved are of a quality retrievable by a conventional CD drive. Further, also at a linear velocity between them, good characteristics can be obtained by making the recording pulse division method variable as in the present invention.

Figure 57:
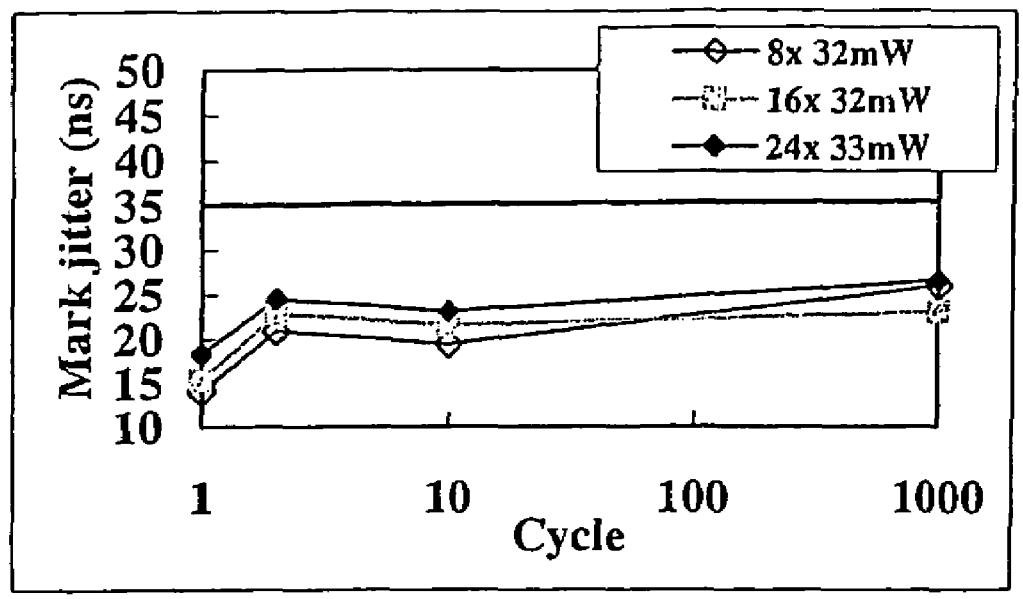
FIG. 57 presents data showing overwriting characteristics at the various linear velocities when recording was carried out on the same medium at 8- to 24-times velocities by another prescribed recording method.
Figure 57:
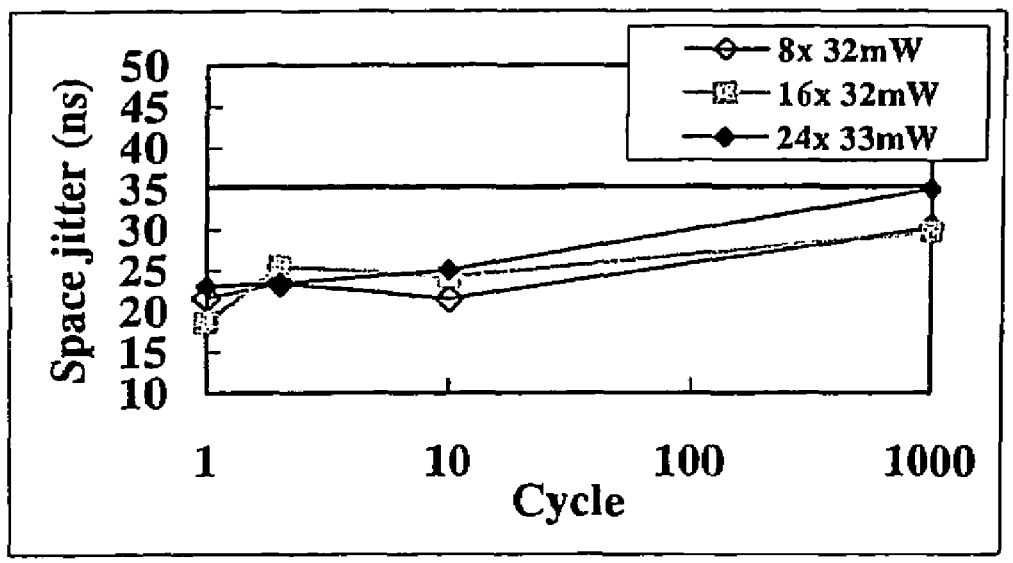

Then, evaluation of the overwriting durability was carried out at each linear velocity. The overwriting cycle dependency is shown in FIG. 57 when overwriting was carried out at each linear velocity at the $Pw_0$ and the Pe/Pw ratio as shown in Table 16. In FIG. 57, (a) shows 3 T mark length jitters, and (b) shows 3 T space length jitters.

At each linear velocity, the overwriting durability of 1000 times required for CD-RW was sufficiently satisfied.

Example 14

In the above Basic Example, two types of disks were prepared and recording was carried out as follows.

Disk of Example 14(a)

On a substrate, 80 nm of a lower protective layer made of $(ZnS)_{80}(SiO_2)_{20}$, 15 nm of a recording layer made of $Ge_{16.5}Sb_{63}Sn_{20.5}(Sn_{0.21}(Ge_{0.2}Sb_{0.8})_{0.79})$, 30 nm of an upper protective layer made of $(ZnS)_{80}(SiO_2)_{20}$, 3 nm of an interfacial layer made of GeN, 200 nm of a reflective layer made of $Al_{99.5}Ta_{0.5}$ and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_{6.5}Sb_{63}Sn_{20.5}$ is an atomic ratio. The same applies in the following Examples.

The volume resistivity $\rho_v$ of this $Al_{99.5}Ta_{0.5}$ reflective layer was about 80 nΩ·m, and the sheet resistivity $\rho_s$ was about 0.4Ω/□.

Disk of Example 14(b)

On a substrate, 82 nm of a lower protective layer made of $(ZnS)_{80}(SiO_2)_{20}$, 15 nm of a recording layer made of $Ge_{16.5}Sb_{63}Sn_{20.5}(Sn_{0.21}(Ge_{0.2}Sb_{0.8})_{0.79})$, 27 nm of an upper protective layer made of $(ZnS)_{80}(SiO_2)_{20}$, 3 nm of an interfacial layer made of Ta, 200 nm of a reflective layer made of Ag and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_{6.5}Sb_{63}Sn_{20.5}$ is an atomic ratio. The same applies in the following Examples.

The volume resistivity $\rho_v$ of this Ag reflective layer was about 24 nΩ·m, and the sheet resistivity $\rho_s$ was about 0.12Ω/□. The initialization of each of the disk of Example 14(a) and the disk of Example 14(b), was carried out by scanning a laser diode beam having a wavelength of about 810 nm and having an oval spot shape having a major axis of about 75 μm and a minor axis of about 1.0 μm, in the minor axis direction at a linear velocity of about 12 m/s. The irradiation power was about 850 mW.

On these disks, by means of the tester 2 with NA=0.50, overwriting of EFM modulation signal was carried out at 24-times velocity by the following "Recording method 1-2f" and at 8-times velocity by "Recording method 2-2f", and the characteristics were evaluated.

While maintaining Pe/Pw i.e. the ratio of erasing power Pe to writing power Pw, to be constant at 0.27, Pw was changed, whereby the overwriting characteristics at the respective writing powers were evaluated. Each was evaluated by the value after overwriting ten times. Pb was set to be constant at approx. 0 mW.

This recording method is a practical usage in which the number of parameters in the recording pulse division method (III-A) is further limited.

Specifically, overwriting was carried out at 8 and 24-times velocities.

In Table 17, the recording pulse division method is presented as divided into a case where n=3 and a case where n is from 4 to 11. In the case where n=3, three parameters i.e. $T_{d1}'$, $\alpha_1'$ and $\beta_1'$ are required, and in Table 17, they are presented in the columns for $T_{d1}$, $\alpha_1$ and $\beta_m$, respectively. In the case where n is from 4 to 11, $T_{d1}$, $\alpha_1$, $\alpha_1'$, $\alpha_i=\alpha c$ (i=2 to m) and $\alpha_i'=\alpha c$ (i=2 to m−1) are constant irrespective of n, and $T_{d1}+\alpha_1=T_{d1}'+\alpha_1'=2$, $\beta_{i-1}+\alpha_i=2$ (i=2 to m) and $\beta_{i-1}'+\alpha_i'=2$ (i=2 to m−1) Therefore, $\beta_i=2-\alpha c$ (i=2 to m−1) and $\beta_i'=2-\alpha c$ (i=2 to m−2) Further, $\beta_{m-1}'=\beta_{m-1}=\Delta_{m-1}=\beta c+\Delta_{m-1}$, $\alpha_m'=\alpha_m+\Delta_m=\alpha c+\Delta_m$ and $\beta_m'=\beta m+\beta_m'$, and $\Delta_{m-1}$, $\Delta_m$ and $\Delta_m'$ are set to be constant irrespective of m. When n=4 to 11 (m being at least 2), independent parameters are $\alpha_1$, $\alpha c$, $\Delta_{m-1}$, $\beta_m$, $\beta_m$ and $\Delta_m'$.

Further, when m=2 (n=4, 5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m=3. Accordingly, when n=4, $\beta_2=\beta_m$. When n=5, $\beta_1'=\beta c+\Delta_{m-1}$, $\alpha_2=\alpha c+\Delta_m$ and $\beta_2'=\beta_m+\Delta_m'$.

$Pw_0$ as the writing power with which the jitter value would be minimum, is shown in Table 17.

TABLE 17

| Recording method | -times velocity | Td1 | α1 | αc | Δm − 1 | Δm | βm | Δm' | Pwo Ex. 14-a | Pwo Ex. 14-b | Pe/Pw |
|---|---|---|---|---|---|---|---|---|---|---|---|
| Recording method CD2-2f | 8 | 3 | 1.65 | 0.50 | — | — | — | 2.05 | — | 28 | 32 | 0.27 |
| | | 4~11 | 1.65 | 0.35 | 0.35 | 0.25 | 0.15 | 1.15 | 0.55 | | | |
| Recording method CD1-2f | 24 | 3 | 1.00 | 1.40 | — | — | — | 0.85 | — | 32 | 32 | 0.27 |
| | | 4~11 | 1.00 | 1.00 | 0.90 | 0.35 | 0.50 | 0.40 | 0.00 | | | |

Figure 58:
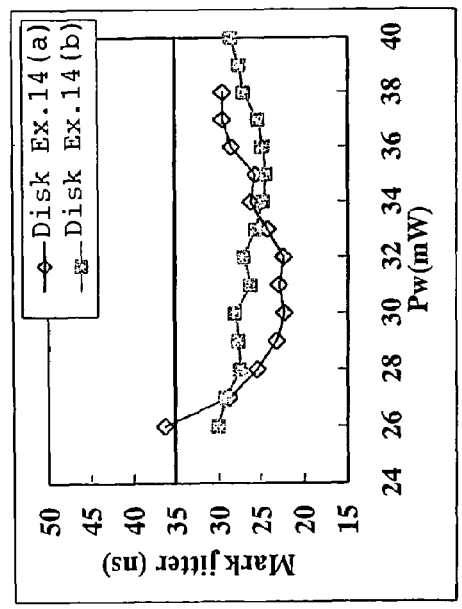
FIG. 58 presents data showing recording characteristics, when 24-times velocity recording was carried out by another prescribed recording method on two types of rewritable optical recording media having different reflective layers.
Figure 58:
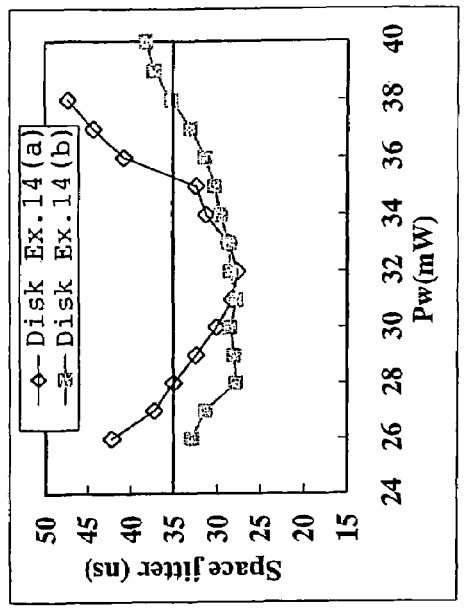
Figure 58:
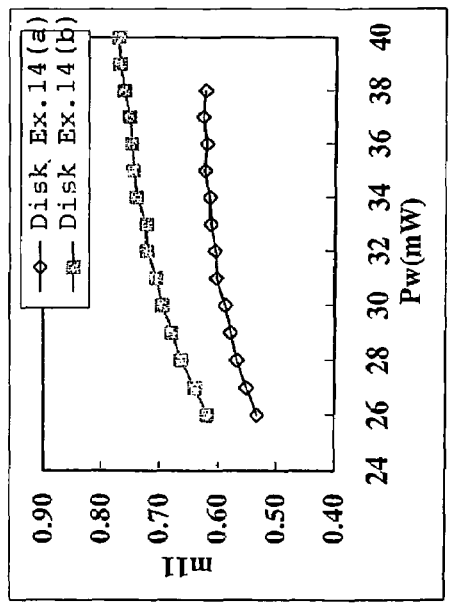
Figure 58:
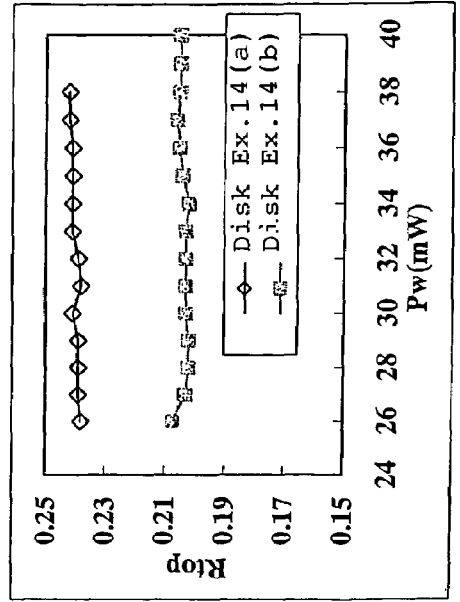

FIG. 58 shows (a) 3 T mark length jitter, (b) 3 T space length jitter, (c) modulation $m_{11}$ and (d) $R_{top}$ at 24-times velocities. Further, FIG. 59 shows (a) 3 T mark length jitter, (b) 3 T space length jitter, (c) modulation $m_{11}$ and (d) $R_{top}$ at 8-times velocities.

Figure 59:
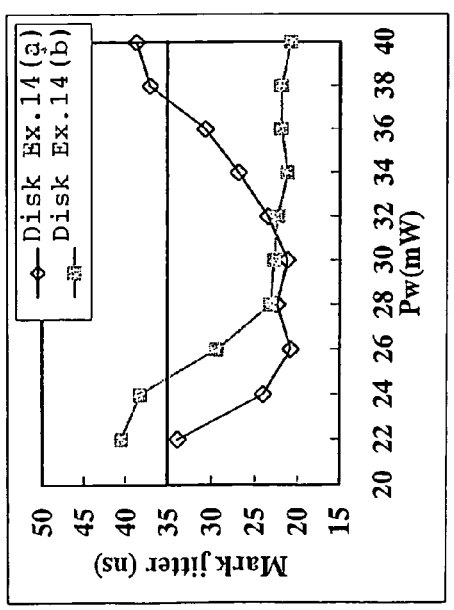
FIG. 59 presents data showing recording characteristics, when 8-times velocity recording was carried out by another prescribed recording method on two types of rewritable optical recording media having different reflective layers.
Figure 59:
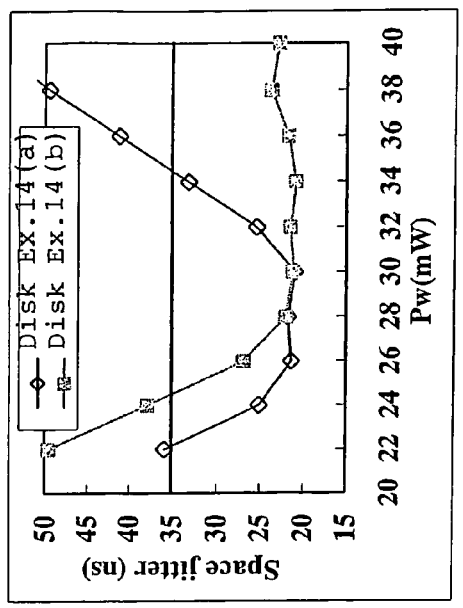
Figure 59:
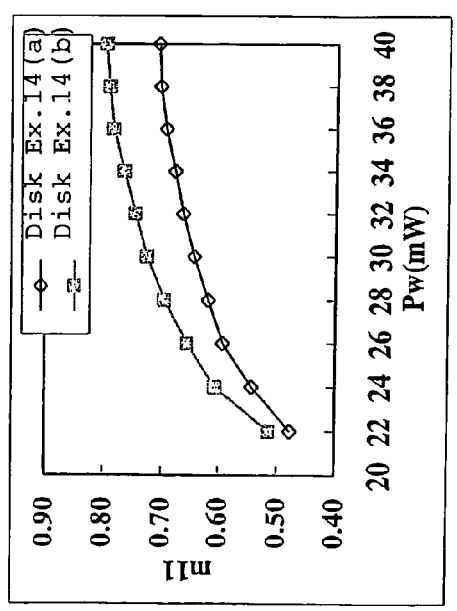
Figure 59:
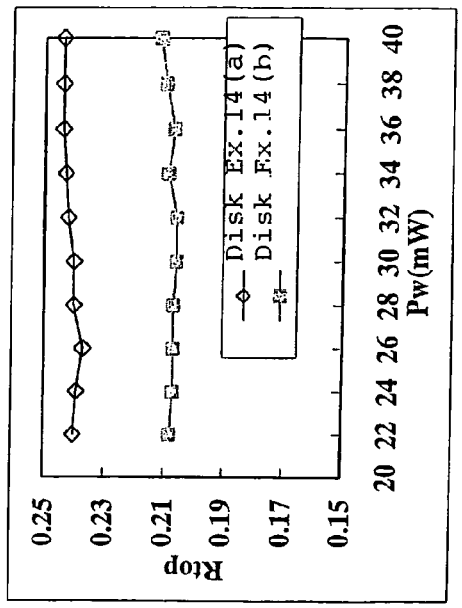

FIG. 59 shows (a) 3 T mark length jitter, (b) 3 T space length jitter, (c) modulation $m_{11}$ and (d) $R_{top}$ at 8-times velocities. Further, FIG. 59 shows (a) 3 T mark length jitter, (b) 3 T space length jitter, (c) modulation $m_{11}$ and (d) $R_{top}$ at 8-times velocities.

With each of the disks of Examples 14(a) and 14(b), good jitter values of less than 35 nsec were obtained with respect to mark lengths and space lengths in retrieving at 1-time velocity within a range of about $Pw_0 \pm 1$ mW. Likewise, with respect to all mark length and space length jitters, good jitters of less than 35 nsec were obtained. However, with the disk of Example 14(b), the range of writing power Pw in which the jitter value is low, is wider, and it can be regarded as a sample having a wider margin for the writing power. Especially, in the data of 8-times velocity in FIG. 59, the difference in the power margin is distinct (see FIGS. 59(a) and (b).)

Further, with each of the disks of Examples 14(a) and 14(b), modulation $m_{11}$ of from 60% to 80% (0.6 to 0.8) was obtained in a region of at least about $Pw_0$ at each linear velocity.

Furthermore, with each of the disks of Examples 14(a) and 14(b), $R_{top}$ was from 15 to 25%, and the asymmetry value was a value within a range of ±10%. In the vicinity of $Pw_0$, the desired mark lengths and space lengths were obtained within a range of about ±20% with respect to any of mark lengths and space lengths of from 3 T to 11 T.

In summarizing the foregoing, when the recording media and "Recording method CD1-2$f$" and "Recording method CD2-2$f$" of the present invention are applied, good characteristics can be obtained by the recording pulse division methods having a small number of parameters made variable, within a wide range of from 8 to 24-times velocities with each of the disks of Examples 14(a) and 14(b), and the signals to be retrieved are of a quality retrievable by a conventional CD drive. Especially, as in the disk of Example 14(b), it is preferred to adjust the sheet resistivity of the reflective layer to be at most $0.2\Omega/\square$, whereby a wide writing power margin can be obtained in a wide range of linear velocities.

Example 15

In the above Basic Example, a disk was prepared and recording was carried out as follows.

On a substrate, 80 nm of a lower protective layer made of $(ZnS)_{80}(SiO_2)_{20}$, 17 nm of a recording layer made of $Ge_6In_{11}Sb_{67}Sn_{12}Te_4$ ($In_{0.11}Sn_{0.12}Te_{0.04}$ $(Ge_{0.08}Sb_{0.92})_{0.73}$), 28 nm of an upper protective layer made of $(ZnS)_{80}(SiO_2)_{20}$, 4 nm of an interfacial layer made of Ta, 185 nm of a reflective layer made of Ag and about 4 µm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_6In_{11}Sb_{67}Sn_{12}Te_4$ is an atomicity ratio. The same applies in the following Examples.

The volume resistivity $\rho_v$ of this Ag reflective layer was about 27 nΩ·m, and the sheet resistivity $\rho_s$ was about $0.15\Omega/\square$. The initialization was carried out by scanning a laser diode beam having a wavelength of about 810 nm and having an oval spot shape having a major axis of about 75 µm and a minor axis of about 1.0 µm in the minor axis direction at a linear velocity of about 16 m/s. The irradiation power was about 1100 mW.

On this disk, by means of the tester 2 with NA=0.50, overwriting of EFM modified signal was carried out at 8, 16 and 32-times velocities by means of the recording methods as shown in Table 18, and the characteristics were evaluated.

The recording pulse division method at 32-times velocity is an example of "Recording method 1-2" and will be referred to as "Recording method CD1-2$g$". Further, the recording pulse division method at 16-times velocity is an example of "Recording method 2-2" and will be referred to as "Recording method CD2-2$g$". Still further, the recording pulse division method at 8-times velocity is an example of "Recording method 2-2" and will be referred to as "Recording method 2-2$h$".

In Table 18, the recording method at 32-times velocity was presented as divided into a case where n=3, 4, 5 and a case where m≧3, i.e. n is from 6 to 11.

When n is 3, three parameters i.e. $T_{d1}'$, $\alpha_1'$ and $\beta_1'$ are required, and in Table 18, they are presented in the columns for $T_{d1}$, $\alpha c$ and $\beta_m$, respectively. When m=2 (n=4, 5), parameters ($T_{d1}$, $\alpha_1$, $\beta_1$, $\alpha_2$, $\beta_2$) in the case of n=4 and ($T_{d1}'$, $\alpha_1'$, $\beta_1'$, $\alpha_2'$, $\beta_2'$) in the case of n=5, are required, and they are presented in the columns for $T_{d1}$, $\alpha_1$, $\beta_1$, $\alpha_m$, and $\beta_m$, respectively.

When m≧3 i.e. n is from 6 to 11, $T_{d1}$, $\alpha_1$, $\alpha_1'$, $\alpha_i = \alpha c$ (i=2 to m) and $\alpha_i' = \alpha c$ (i=2 to m−1) are set to be constant irrespective of n, and $T_{d1} + \alpha_1 = T_{d1}' + \alpha_1' = 2$, $\beta_{i-1} + \alpha_i = 2$ (i=2 to m) and $\beta_{i-1}' + \alpha_i' = 2$ (i=2 to m−1). Accordingly, $\beta_i = 2 - \alpha c$ (i=2 to m−1), and $\beta_i' = 2 - \alpha c$ (i=2 to m−2). Further, $\beta_{m-1}' = \beta_{m-1} + \Delta_{m-1} = \beta c + \Delta_{m-1}$, $\alpha_m' = \alpha_m + \beta_m = \alpha c + \Delta_m$ and $\beta_m' = \beta_m + \Delta_m'$, and $\Delta_{m-1}$, $\Delta_m$ and $\Delta_m'$ are set to be constant irrespective of m. With respect to n=6 to 11 (m being at least 3), independent parameters are $\alpha_1$, $\alpha c$, $\Delta_{m-1}$, $\beta_m$, $\beta_m$ and $\Delta_m'$.

Now in Table 18, the recording method at 8 and 16-times velocity was presented as divided into a case where n=3 and a case where n is from 4 to 11. When n is 3, three parameters i.e. $T_{d1}'$, $\alpha_1'$ and $\beta_1'$ are required, and in Table 18, they are presented in the columns for $T_{d1}$, $\alpha c$ and $\beta_m$, respectively. When n is from 4 to 11, $T_{d1}$, $\alpha_1$, $\alpha_1'$, $\alpha_i = \alpha c$ (i=1 to m) and $\alpha_i' = \alpha c$ (i=1 to m−1) are set to be constant irrespective of n, whereby $T_{d1} + \alpha_1 = T_{d1}' + \alpha_1' = 2$, $\beta_{i-1} + \alpha_i = 2$ (i=2 to m), and $\beta_{i-1}' + \alpha_i' = 2$ (i=2 to m−1). Accordingly, $\beta_i = 2 - \alpha c$ (i=2 to m−1), and $\beta_i' = 2 - \alpha c$ (i=2 to m−2). Further, $\beta_{m-1}' = \beta_{m-1} + \Delta_{m-1} = \beta c + \Delta_{m-1}$, $\alpha_m' = \alpha_m + \Delta_m = \alpha c + \beta_m$, and $\beta_m' = \beta_m + \Delta_m'$, where $\Delta_{m-1}$, $\Delta_m$ and $\beta_m'$ are set to be constant irrespective of m. With respect to n=4 to 11 (m being at least 2), independent parameters are $\alpha_1$, $\alpha c$, $\Delta_{m-1}$, $\Delta_m$, $\beta_m$ and $\Delta_m'$.

Further, when m=2 (n=4,5), $\alpha_1$, $\alpha_1'$, $\beta_1$, $\beta_1'$, $\alpha_2$, $\alpha_2'$, $\beta_2$ and $\beta_2'$ are set to be equal to $\alpha_1$, $\alpha_1'$, $\beta_{m-1}$, $\beta_{m-1}'$, $\alpha_m$, $\alpha_m'$, $\beta_m$ and $\beta_m'$ in the case where m is 3, respectively. Accordingly, when n=4, $\beta_2 = \beta_m$. When n=5, $\beta_1' = \beta c + \Delta_{m-1}$, $\alpha_2 = \alpha c + \beta_m$, $\beta_2' = \beta_m + \Delta_m'$.

Each recording method in FIG. 18 is also an example of the recording pulse division method (VI-B) of the present invention which is applicable to overwriting in a wide range of linear velocities, such as CAV recording.

Here, $\beta_1' = 1.38$ where n=3, is different by about 4% from $\beta_1' = 1.19 + 0.25 = 1.44$ where m=3, but this difference derives from the limit in setting pulses by an apparatus at such a high frequency, and the regularity stipulated by (VI-B) is substantially followed.

While maintaining Pe/Pw i.e. the ratio of erasing power Pe to writing power Pw, to be constant, Pw was changed every 1 mW from about 32 mW to about 45 mW, whereby the overwriting characteristics at the respective writing powers were evaluated. Each was evaluated by the value after overwriting ten times. Bias power Pb was set to take a constant value of approx. 0 mW, and Pe/Pw was set to be constant at 0.27. $Pw_0$ as the writing power with which the jitter value would be minimum, is shown in Table 18.

TABLE 18

| Recording method | -times velocity | | Td1 | α1 | β1 | αc | Δm − 1 | αm | Δm | βm | Δm' | Pwo | Pe/Pw |
|---|---|---|---|---|---|---|---|---|---|---|---|---|---|
| CD2-2h | 8 | 3 | 1.95 | 0.35 | — | — | — | — | — | 2.30 | — | 37 | 0.27 |
| | | 4~11 | 1.80 | 0.20 | — | 0.20 | 0.30 | 0.20 | 0.05 | 1.75 | 0.50 | | |
| CD2-2g | 16 | 3 | 1.75 | 0.65 | — | — | — | — | — | 1.90 | — | 38 | 0.27 |
| | | 4~11 | 1.60 | 0.40 | — | 0.40 | 0.30 | 0.40 | 0.10 | 1.40 | 0.40 | | |
| CD1-2g | 32 | n = 3 | 0.81 | 1.58 | — | — | — | — | — | 1.06 | — | 38 | 0.27 |
| | | n = 4 | 0.81 | 1.19 | 1.19 | — | — | 0.81 | — | 0.31 | — | | |
| | | n = 5 | 0.81 | 1.19 | 1.38 | — | — | 1.19 | — | 0.31 | — | | |
| | | m ≧ 3 | 0.81 | 1.19 | 1.19 | 0.81 | 0.25 | 0.81 | 0.38 | 0.31 | 0.00 | | |

Figure 60:
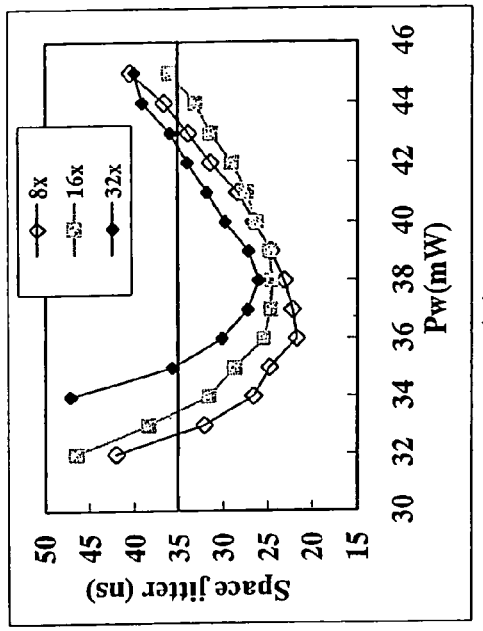
FIG. 60 presents another example of data showing recording characteristics, when recording was carried out on the same medium at recording linear velocities from 8-times velocity to 32-times velocity.
Figure 60:
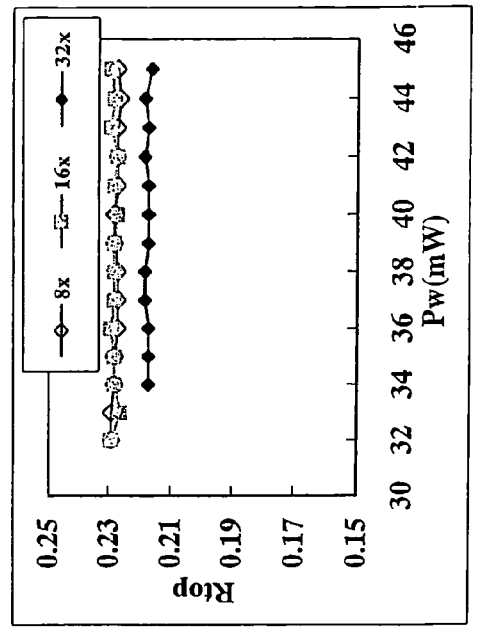
Figure 60:
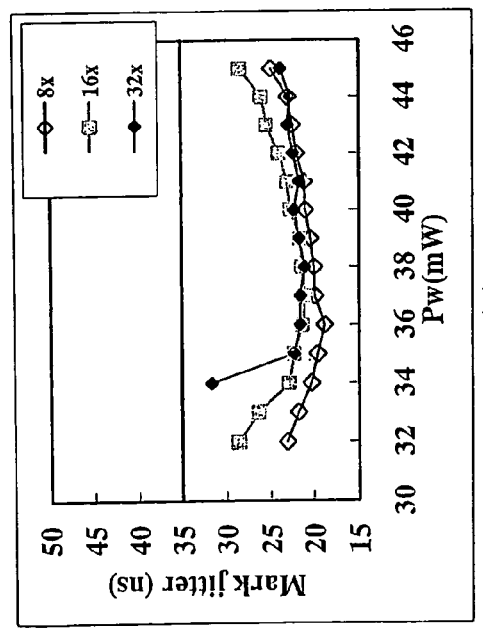
Figure 60:
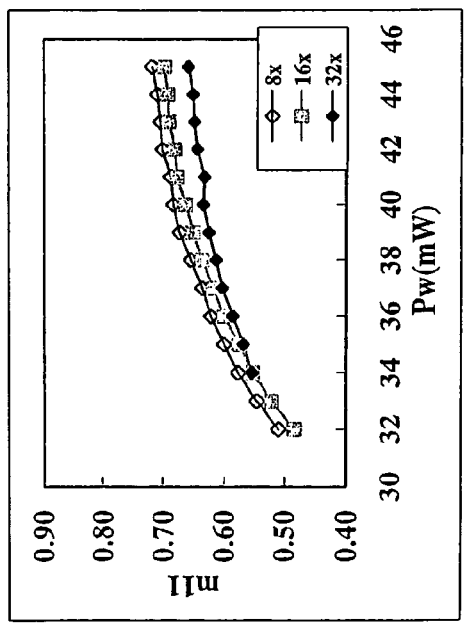

FIG. 60 shows (a) 3 T mark length jitter, (b) 3 T space length jitter, (c) modulation $m_{11}$ and (d) $R_{top}$ at 8, 16 and 32-times velocities. At each linear velocity, good jitter values of less than 35 nsec were obtained with respect to mark lengths and space lengths in retrieving at 1-time velocity within a range of about $Pw_0 \pm 1$ mW. Likewise, with respect to all mark length and space length jitters, good jitters of less than 35 nsec were obtained.

Further, at each linear velocity, the modulation $m_{11}$ was from 60% to 80% (0.6 to 0.8), $R_{top}$ was from 15 to 25%, and the asymmetry value was a value within ±10%. In the vicinity of $Pw_0$, the desired mark lengths and space lengths were obtained within a range of the reference clock period ±20% with respect to any of mark lengths and space lengths of from 3 T to 11 T.

In summarizing the foregoing, when the recording medium of the present invention and the recording pulse division method (VI-B) of the present invention are applied, good characteristics can be obtained by the recording pulse division method having a small number of parameters made variable, within a wide range of from 8 to 32-times velocities, and the signals to be retrieved are of a quality retrievable by a conventional CD drive. Further, also at a linear velocity between them, good characteristics can be obtained by making the recording pulse division method variable as in the present invention.

Figure 61:
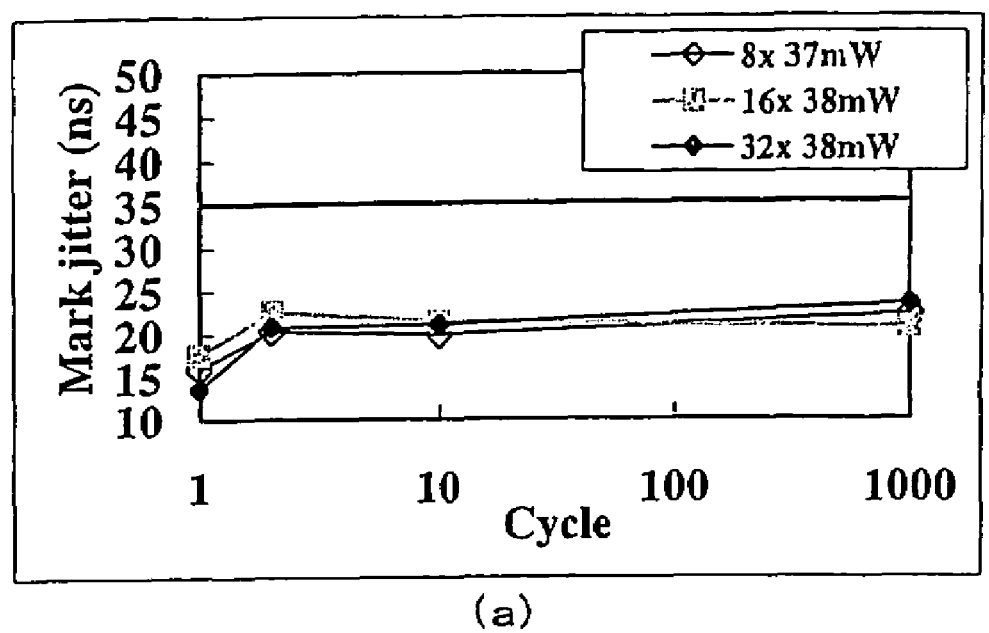
FIG. 61 presents another example of data showing overwriting characteristics, when recording was carried out on the same medium at recording linear velocities from 8-times velocity to 32-times velocity.
Figure 61:
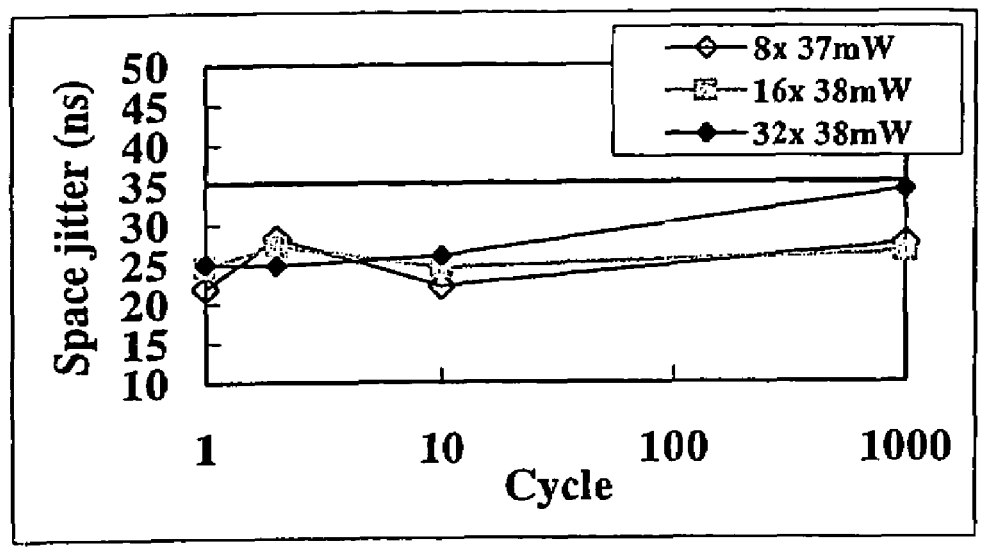

Then, evaluation of the overwriting durability was carried out at each linear velocity. The overwriting cycle dependency is shown in FIG. 61 when overwriting was carried out at each linear velocity at the $Pw_0$ and the Pe/Pw ratio as shown in Table 18. In FIG. 61, (a) shows 3 T mark length jitters, and (b) shows 3 T space length jitters.

At each linear velocity, the overwriting durability of 1000 cycles required for CD-RW, was sufficiently satisfied.

Further, the erase ratio at each linear velocity was measured. At 8-times velocity and 32-times velocity, the 3 T/11 T overwriting erase ratios measured by using 3 T and 11 T pulses of the recording pulse division methods in Table 18, were at least 25 dB, respectively and thus sufficient erase ratios were obtained at the respective linear velocities.

Further, disks recorded at 32-times velocity by "Recording method CD1-2g" in Table 18 were subjected to an accelerated test at 105° C., whereby even upon expiration of 3 hours, no substantial deterioration of the recorded signals was observed. The jitter was found to have changed by about 2 nsec, and was lower than 35 nsec in retrieving at 1-time velocity, and the reflectivity $R_{top}$ and the modulation $m_{11}$ also did not substantially decrease and maintained at least 90% of the initial values.

Comparative Example 1

A disk having a maximum overwritable linear velocity of about 10-times velocity, as disclosed in JP2001-229537, was prepared, and overwriting at 24-times velocity was tried.

On a substrate, 92 nm of a lower protective layer made of $(ZnS)_{80}(SiO_2)_{20}$, 13 nm of a recording layer made of $Ge_3In_3Sb_{72}Te_{22}$ ($In_{0.03}Ge_{0.03}$ ($Sb_{0.77}Te_{0.23}$) 0.94), 31 nm of an upper protective layer made of $(ZnS)_{80}(SiO_2)_{20}$, 140 nm of a reflective layer made of an Al alloy and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_3In_3Sb_{72}Te_{22}$ is an atomicity ratio. The same applies in the following Examples.

The volume resistivity $\rho_v$ of this Al alloy reflective layer was 62 nΩ·m, and the sheet resistivity $\rho_s$ was about 0.44Ω/□.

The initialization was carried out by scanning a laser diode beam having a wavelength of about 810 nm and having an oval spot shape having a major axis of about 150 μm and a minor axis of about 1.0 μm, in the minor axis direction at a linear velocity of about 7 m/s. The irradiation power was 1650 mW.

On this disk, by means of the tester 2 with NA=0.50, overwriting of EFM modulation signal was carried out at 24-times velocity, and the characteristics were evaluated.

While maintaining Pe/Pw i.e. the ratio of erasing power Pe to writing power Pw, to be constant at 0.43, Pw was changed at a level of about 30 mW, at which adequate signal characteristics were obtained by a single overwriting operation, whereby the 10-times overwriting characteristics at the respective writing powers were evaluated. Bias power Pb was set to have a constant value of approx. zero.

As the recording method in recording at 24-times velocity, "Comparative recording method CD1" and "Comparative recording method CD2" of Example 11 were applied.

After overwriting 10 times on this disk, the 3 T space length jitter was at least 50 ns, the modulation $m_{11}$ was about 30% (0.3), and $R_{top}$ was a value of about 8%, and thus, at 24-times velocity, no good recording characteristics were obtained. The signals to be retrieved were of a quality not retrievable by a conventional CD drive.

In the disk of this Comparative Example, first all, the Sb/Te ratio is not more than 4.5, and the crystallization speed is slow, whereby the erasing performance is inadequate, and accordingly, overwriting is impossible at such a high linear velocity of 24-times velocity.

Comparative Example 2

On a disk having a maximum overwritable linear velocity of about 16-times velocity, and disclosed in JP2001-331936, overwriting at 24-times velocity was tried.

On a substrate, 70 nm of a lower protective layer made of $(ZnS)_{80}(SiO_2)_{20}$, 17 nm of a recording layer made of $Ge_7Sb_{78}Te_{15}(Ge_{0.07}(Sb_{0.84}Te_{0.16})\ 0.93)$, 45 nm of an upper protective layer made of $(ZnS)_{80}(SiO_2)_{20}$, 220 nm of a reflective layer made of an $Al_{99.5}\ Ta_{0.5}$ alloy and about 4 μm of an ultraviolet-curable resin layer, were formed in this order to obtain a rewritable compact disk. Here, the meaning of $(ZnS)_{80}(SiO_2)_{20}$ indicates that it is a film obtained by high frequency sputtering of a target having 80 mol % of ZnS and 20 mol % of $SiO_2$ mixed. Further, the compositional ratio in $Ge_7Sb_{78}Te_{15}$ is an atomicity ratio. The same applies in the following Examples.

The volume resistivity $\rho_v$ of this Al alloy reflective layer was 100 nΩ·m, and the sheet resistivity $\rho_s$ was about 0.45Ω/□.

Two disks prepared in this manner were used. The respective disks were initialized under the two initialization conditions.

The first initialization operation was carried out as follows. Namely, a focused laser beam having a laser wavelength of about 810 and having an oval shape with a beam major axis of about 108 μm×a beam minor axis of about 1.5 μm, was used and disposed so that the major axis of this focused beam would align in the radial direction of the disk, whereupon, while irradiating a power of from 400 to 600 mW, the disk was operated at a linear velocity of from 3 to 6 m/s, to carry out the initialization of the disk. Further, an operation to reduce a noise of crystallization level was carried out by applying servo to crystallize the groove and spaces between the grooves once with a DC light of 9.5 mW by means of a tester with 780 nm and numerical aperture NA of a pickup being 0.55.

The second initialization operation was carried out as follows. Namely, a laser diode beam having a wavelength of about 810 nm and having an oval spot shape with a major axis of about 150 μm and a minor axis of about 1.0 μm, was used and scanned in the short axis direction at a linear velocity of about 7 m/s while irradiating a power of 1450 mW, to carry out the initialization.

On these two disks, overwriting of EFM modulation signals was carried out at 24-times velocity by means of the tester 2 having NA=0.50, and the characteristics were evaluated. Here, substantially the same results will be obtained if NA is changed to 0.55.

Figure 20:
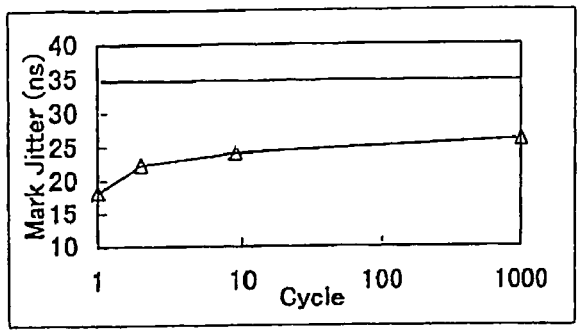
FIG. 20 presents data showing repeated overwriting characteristics of an optical recording medium having a SnGeSb type recording layer, when 24-times velocity recording is carried out by another prescribed recording method.
Figure 20:
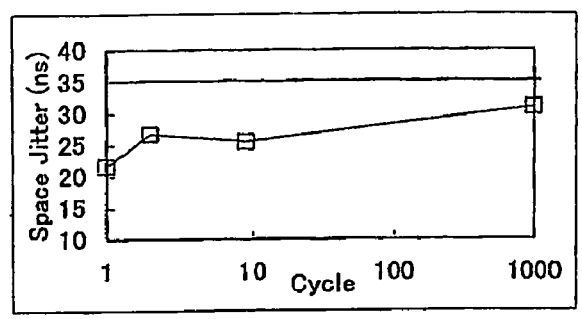
Figure 21:
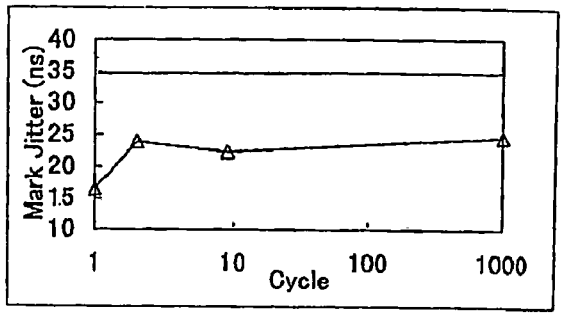
FIG. 21 presents data showing repeated overwriting characteristics of an optical recording medium having a SnGeSb type recording layer, when 10-times velocity recording is carried out by another prescribed recording method.
Figure 21:
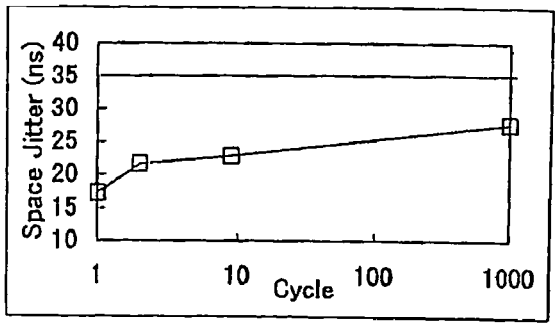

As the recording method, the pulse division method as disclosed in JP-A-2001-331936 is employed. Specifically, the method of FIG. 20 disclosed in JP-A-2001-331936 is employed.

JP-A-2001-331936 and the present invention are different in the description of the recording method. Accordingly, the recording method will be described hereinafter mainly along JP-A-2001-331936.

$T_{d1}$ and $T_{d1}'$ are set to be constant irrespective of n.

With respect to an even number mark length nT=2mT in the case where m is at least 3, the mark was divided into m sections, and $\alpha_i$ and $\beta_i$ in recording pulse sections $\alpha_iT$ and off-pulse sections $\beta_iT$ were set to be as follows.

$\alpha_1+\beta_1=2$, $\beta_i+\alpha_i=2$ ($i=2$ to $m-1$), $\alpha_m+\beta_m=1.6$.

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$\alpha_1'+\beta_1'=2$, $\alpha_i'+\beta_i'=2$ ($i=2$ to $m-1$), $\alpha_m'+\beta_m'=2.1$.

Here, $\alpha_i=\alpha_i'=0.8$ ($i=2$ to $m-1$), and $\beta_i=\beta_i'=1.2$ ($i=2$ to $m-1$).

When n is an even number, $\alpha_1=0.8$, $\beta_1=1.2$, $\alpha_m=0.7$ and $\beta_m=0.9$.

When n is an odd number, $\alpha_1'=1.0$, $\beta_1'=1.5$, $\alpha_m'=1.0$ and $\beta_m'=1.1$.

Further, when m=2, $\alpha_1$, $\beta_1$, $\alpha_2$, $\beta_2$, $\alpha_1'$, $\beta_1'$, $\alpha_2'$ and $\beta_2'$ are deemed to be $\alpha_1$, $\beta_1$, $\alpha_m$, $\beta_m$, $\alpha_1'$, $\beta_1'$, $\alpha_m'$ and $\beta_m'$ in the case where m is at least 3, respectively. Namely, with respect to 4 T mark, $\alpha_1=0.8$, $\beta_1=1.2$, $\alpha_2=0.7$ and $\beta_m=0.9$ and with respect to 5 T mark, $\alpha_1'=1.0$, $\beta_1'=1.5$, $\alpha_2'=1.0$ and $\beta_2'=1.1$.

When m=1, i.e. with respect to 3 T mark, $\alpha_i'=1.1$ and $\beta_1'=1.5$.

Even if the 10 times overwriting characteristics are evaluated by this recording method at 24-times velocity by setting erasing power Pe to be constant at 10 mW and Pb to be constant at 0.8 mW and by changing Pw to carry out overwriting at the respective writing powers, it is impossible to obtain such good characteristics that the jitters will be less than 35 nsec.

In the disks of this Comparative Example, the Sb/Te ratio is 5.2 or 5.6, while the Ge amount is as large as 7%, whereby the crystallization speed is slow, and the erasing performance is inadequate, whereby overwriting is impossible at such a high linear velocity at a level of 24-times velocity.

Reference Example 1

On the disk having a maximum overwritable linear velocity of about 10-times velocity prepared in Comparative Example 1, overwriting of EFM modulation signals was carried out at 10-times velocity by the following "Reference recording method CD1" as an example of the recording method of the present invention, and the characteristics were evaluated. Such a disk itself is disclosed in JP-A-2001-229537, but there has been no disclosure of a case wherein the recording method of the present invention is applied.

Using the tester 2 having NA=0.50, and while maintaining Pe/Pw i.e. the ratio of erasing power Pe to writing power Pw, to be constant at 0.43, Pw was changed every mW from about 16 mW to about 24 mW, whereby the overwriting characteristics at the respective writing powers were evaluated. Each was evaluated by the values after overwriting 10 times. Bias power Pb was set to have a constant value of almost zero.

Reference Recording Method CD1

This recording method is a practical usage wherein the number of independent parameters in the recordings pulse division method (III-A) is further limited.

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ (i=2 to m)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ (i=2 to m−1), $\beta_{m-1}'+\alpha_m'=2.7$, provided that $\beta_{m-1}'=\beta_{m-1}+\Delta_{m-1}$ and $\alpha_m'=\alpha_m+\beta_m$, $\beta_m'=\beta_m+\Delta_m'$.

Here, $T_{d1}=T_{d1}'=1$, $\alpha_i=\alpha_1'=1$, $\alpha_i=\alpha_i'=\alpha c=1$ ($\alpha c$ is constant with respect to i when i=2 to m−11), $\beta_{m-1}=1$, $\Delta_{m-1}=0.5$, $\Delta_m=0.2$, $\Delta_{mm}=0.7$, $\alpha_m=1$, $\beta_m=0.4$, and $\Delta_m'=0.2$, and they are constant when m is at least 2.

However, when m=2, $\beta_1$, $\alpha_2$, $\beta_2$, $\beta_2'$, $\alpha_2'$ and $\beta_2'$ are deemed to be $\beta_{m-1}$, $\alpha_m$, $\beta_m$, $\beta_{m-1}'$, $\alpha_m'$ and βm' in the case where m is at least 3. Namely, with respect to 4 T mark, $\beta_1=1.0$, $\alpha_2=1$ and $\beta_m=0.4$, and with respect to 5 T mark, $\beta_1'=1.5$, $\alpha_2'=1.2$ and $\beta_m'=0.6$.

When m=1, i.e. with respect to 3 T mark, $T_{d1}'=0.85$, $\alpha_1'=1.6$ and $\beta_1'=0.75$.

Further, $T_{d1}$, $\alpha_i$, $\beta_i$, etc. in "Reference recording method CD1" are summarized in Table 19.

In Table 19, the recording pulse division method is presented as divided into a case where n=3 and a case where n is from 4 to 11. In the case where n=3, three parameters i.e. $T_{d1}'$, $\alpha_1'$ and $\beta_i'$ are required, and in Table 19, they are presented in the columns for $T_{d1}$, $\alpha_1$ and $\beta_m$, respectively. In the case where n is from 4 to 11, in the recording pulse division method (III-A), $T_{d1}+\alpha_1=T_{d1}'+\alpha_1'=2$, $\beta_1+\alpha_2=\beta_{m-1}+\alpha_m=2$, $\alpha_1=\alpha_m=\alpha c$ and $\Delta_m$ were set to be constant irrespective of m. Therefore, although 10 parameters are presented in Table 19 including $T_{d1}$, $\beta_1$, $\beta_{m-1}$, $\beta_m$ and $\alpha_m$, independent parameters are 5 i.e. $\alpha_1$, $\alpha c$, $\Delta_{m-1}$, $\Delta_m$ and $\beta_m'$. Further, when n=4, $\beta_1=\beta_{m-1}=\beta c$, $\alpha_2=\alpha_m=\alpha c$ and $\beta_2=\beta_m$. When n=5, $\beta_1'=\beta c+\Delta_{m-1}$, $\alpha_2=\alpha c+\beta_m$, and $\beta_2'=\beta_m'$.

The optimum writing power was in the vicinity of from 16 to 23 mW, and the overwriting characteristics were evaluated by the values at such a power.

The horizontal lines in FIGS. 62(a) and (b) indicate the standardized upper limit value of jitter=35 (nsec) during retrieving at 1-time velocity. Good jitter values of less than 35 nsec were obtained.

From FIGS. 62(c) and (d), it is evident that the modulation $m_{11}$ was from 60% to 80% (from 0.6 to 0.8), and $R_{top}$ was from 15 to 25%.

Further, in the vicinity of the optimum writing power, with respect to the mark lengths and space lengths of from 3 T to 11 T, desired mark lengths and space lengths were obtained within a range of the reference clock period T±10%. As the asymmetry value, a value within ±10% was obtained.

In summarizing the foregoing, good recording characteristics were obtained at 10-times velocity, and the retrieving signals were of a quality retrievable by conventional CD drives.

Figure 63:
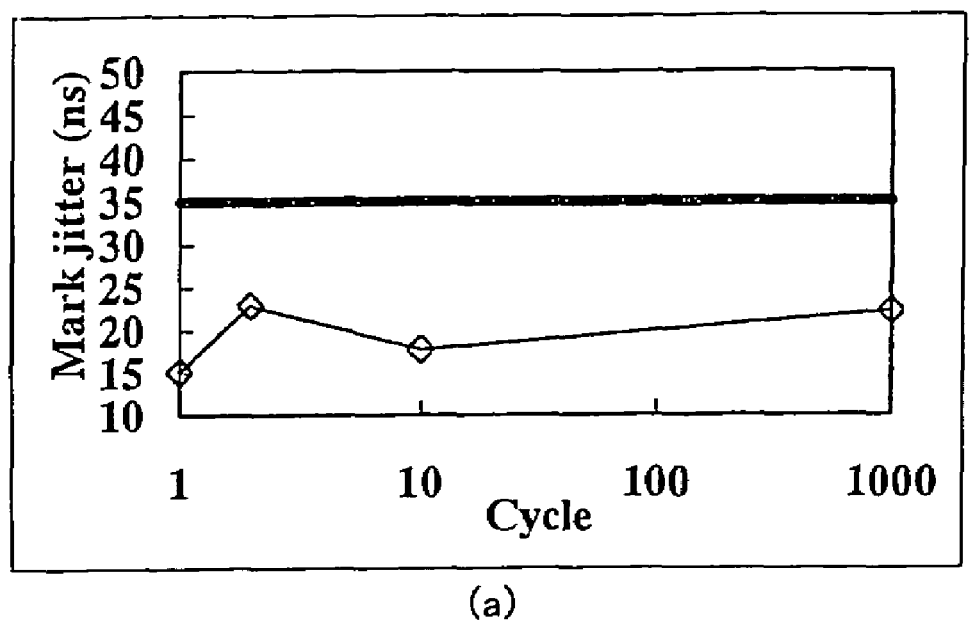
FIG. 63 presents data showing overwriting characteristics, when recording was carried out at 10-times velocity by employing one embodiment of the recording method of the present invention.
Figure 63:
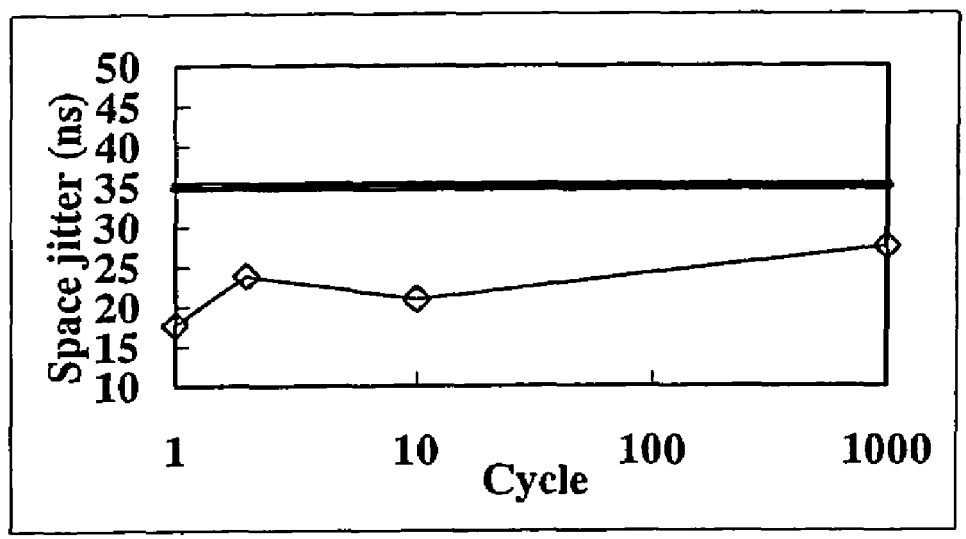

Now, the results of evaluation of overwriting durability will be described in the case wherein "Reference recording method CD1" was used. The overwriting cycle dependency when repeated overwriting was carried out at Pw/Pe=19 mW/8 mW, is shown in FIG. 63, respectively. In FIG. 63, (a) shows 3 T mark length jitter, and (b) shows 3 T space length jitter. In FIG. 63, for the purpose of showing the number of cycles of repeated overwriting on a logarithmic graph, the first recording is represented by first overwriting, and when overwriting was carried out nine times thereon, is represented by 10th overwriting. The overwriting durability of 1000 cycles required for CD-RW was sufficiently satisfied.

Now, Examples in which the rewritable optical recording medium of the present invention and the optical recording method of the present invention are applied to RW-DVD.

RW-DVD Basic Example

In the following, the Basic Example of RW-DVD will be described by particularly pointing out the differences from the Basic Example of CD-RW.

A polycarbonate resin substrate having a thickness of 0.6 mm and provided with a helical groove having a track pitch of 0.74 µm, a groove width of about 0.31 µm and a depth of about 28 nm with wobbling, was formed by injection molding.

Each of these values of the groove shape was obtained by an optical diffraction method of U groove approximation using a He—Cd laser beam having a wavelength of 441.6 nm. To the groove wobble, address information by ADIP was further imparted by phase modulation.

TABLE 19

| Recording method | | Td1 | α1 | β1 | αc | βm − 1 | Δm − 1 | αm | Δm | βm | Δm' |
|---|---|---|---|---|---|---|---|---|---|---|---|
| Reference recording | n = 3 | 0.85 | 1.6 | | | | | | | 0.75 | |
| method CD1 | n = 4~11 | 1 | 1 | 1 | 1 | 1 | 0.5 | 1 | 0.2 | 0.4 | 0.2 |

The results of evaluation of overwriting characteristics in the case of "Reference recording method CD1", are shown in FIG. 60.

Figure 62:
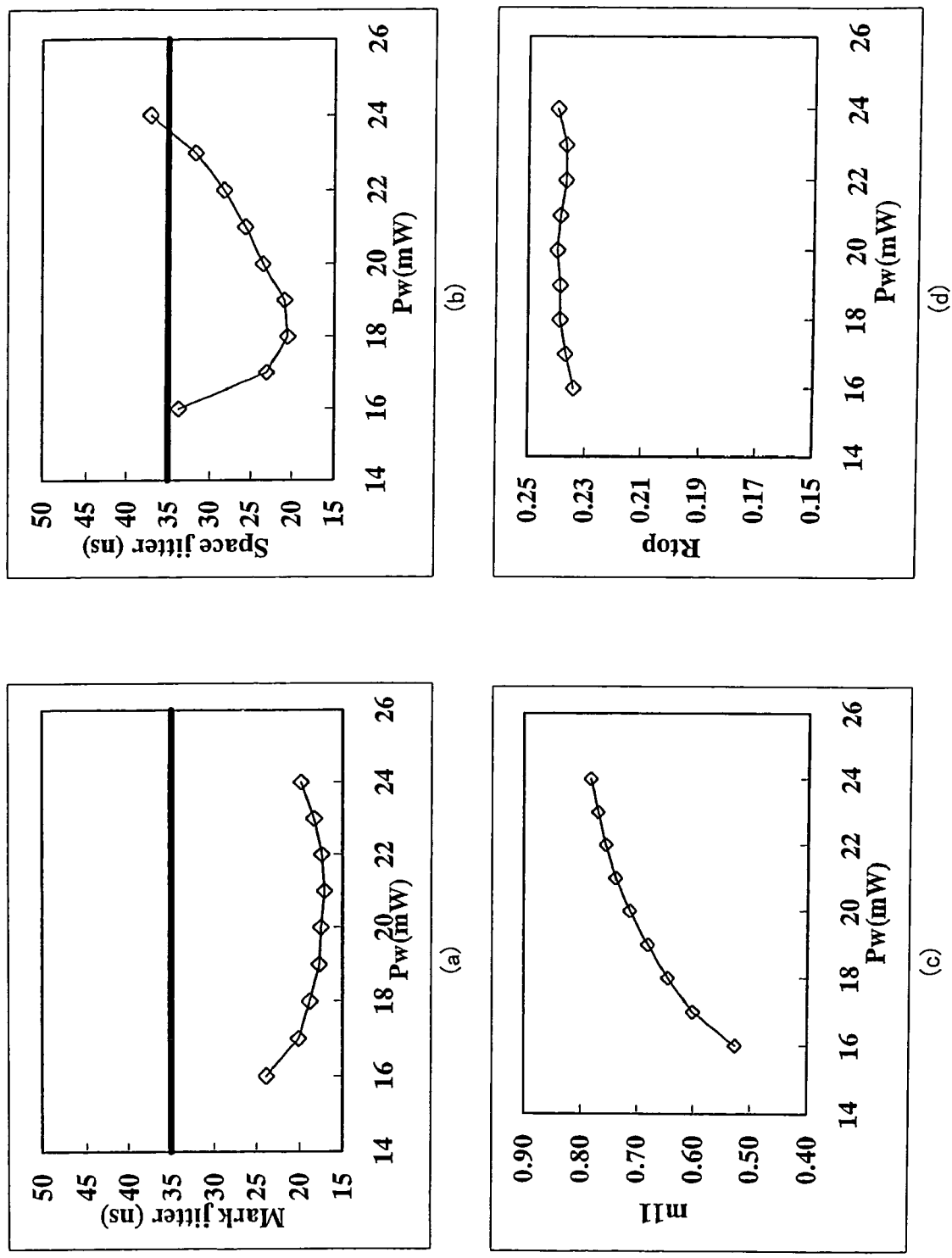
FIG. 62 presents data showing recording characteristics, when recording was carried out at 10-times velocity by employing one embodiment of the recording method of the present invention.

In FIG. 62, (a) to (d) show the Pw dependency of (a) 3 T mark length jitter, (b) 3 T space length jitter, (c) modulation $m_{11}$ and (d) $R_{top}$, respectively.

Recording/retrieving evaluation was carried out by means of DDU1000 tester manufactured by Pulsteck Co. (wavelength: about 650 nm, NA=0.65, spot shape: a generally circular spot of 0.86 µm with an intensity of $1/e^2$, rising and falling time: less than 2 nsec., hereinafter this tester is referred to as tester 3). On the basis of the reference linear velocity of 3.49 m/s of DVD being 1-time velocity, overwriting characteristics at from 6 to 10-times velocities were evaluated. Bias power was set to be constant at 0.5 mW unless otherwise specified.

The reference clock period of data at each linear velocity was one inversely proportionated at each linear velocity against the reference clock period 38.2 nsec of data at 1-time velocity.

Unless otherwise specified, retrieving was carried out at 1-time velocity. The jitter was measured by a time interval analyzer (manufactured by Yokogawa Electric Corporation) from DDU1000.

Modulation $m_{14}$ ($=I_{14}/I_{top}$) was read out by an inspection of the eye pattern on an oscilloscope.

EFM+ random data were overwritten ten times, whereupon the mark lengths of the record data, the space lengths, the mark length and space length jitters, $m_{14}$, $R_{top}$ and the asymmetry value were measured.

Example 16

In the above Basic Example, a disk was prepared and recording was carried out as follows.

On a substrate, 70 nm of a lower protective layer made of $(ZnS)_{80}(SiO_2)_{20}$, 12 nm of a recording layer made of $Ge_{12.5}Sb_{58.3}Sn_{24.3}Te_{4.9}(Te_{0.05}Sn_{0.24}(Ge_{0.18}Sb_{0.82})\ 0.71)$, 18 nm of an upper protective layer made of $(ZnS)_{80}(SiO_2)_{20}$, 2 nm of an interfacial layer made of Ta, 150 nm of a reflective layer made of Ag and about 4 μm of an ultraviolet-curable resin layer, were formed in this order to obtain a disk.

The volume resistivity $\rho_v$ of this Ag reflective layer was 28 nΩ·m, and the sheet resistivity $\rho_s$ was about 0.19Ω/□.

The initialization was carried out by scanning a laser diode beam having a wavelength of about 810 nm and having an oval spot shape having a major axis of about 75 μm and a minor axis of about 1.0 μm, in the minor axis direction at a linear velocity of about $\beta_m$/s. The irradiation power was 700 mW.

On this disk, by means of the tester 3 with NA=0.65, overwriting of EFM+ modulation signal was carried out at 2.5 and 6-times velocities, and the characteristics were evaluated.

While maintaining Pe/Pw i.e. the ratio of erasing power Pe to writing power Pw, to be constant at 0.29 or 0.30, Pw was changed every 1 mW from about 15 mW to about 20 mW, whereby the overwriting characteristics at the respective writing powers were evaluated. Each was evaluated by the value after overwriting ten times.

In 6-times velocity recording, recording method DVD1-1 was applied. In the following, this is designated as "recording method DVD1-1a". "Recording method DVD1-1a" is a practical usage wherein the number of independent parameters in the recording pulse division method (II-A) is further limited.

Recording method DVD1-1a

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m-1$), $\beta_{m-1}+\alpha^m=2$.

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.31$, provided that $\beta_1'=\beta_1+\alpha_1$, $\beta_{i-1}'+\alpha_i'=2$ ($i=3$ to $m-1$), $\beta_{m-1}'+\alpha_m'=2.5$, provided that $\alpha_m'=m+\Delta_m$.

Here, $T_{d1}=T_{d1}'=1$, $\alpha_1=\alpha_1'=1$, $\beta_1=1.25$, $\Delta_1=0.31$, $\alpha_i=\alpha_i'=\alpha c=0.75$ (αc is constant with respect to i when i=2 to m−1), $\beta_{m-1}=1.25$, $\Delta_{m-1}=0$, $\Delta_m=0.5$, $\Delta_{mm}=0.5$, $\alpha_m=0.75$, and $\beta_m=\beta_m'=0.5$, and they are constant when m is at least 3.

Further, when m=2, with respect to 4 T mark, $T_{d1}=1$, $\alpha_1=1$, $\beta_1=1.25$, $\alpha_2=0.75$ and $\beta_{2=0.5}$, and with respect to 5 T mark, $T_{d1}'=1$, $\alpha_1'=1$, $\beta_1'=1.56$, $\alpha_2'=1.25$ and $\beta_m'=0.5$.

When m=1, i.e. with respect to 3 T mark, $T_{d1}'=1$, $\alpha_1'=1.5$ and $\beta_1'=0.56$.

On the other hand, in the case of 2.5-times velocity recording, the following "Recording method DVD2-1a" was used as a specific example of recording method DVD2-1. "Recording method DVD2-1a" is a practical usage wherein the number of independent parameters in the recording pulse division method (V) is further limited.

Recording method DVD2-1a

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m-1$), $\beta_{m-1}+\alpha_m=2$.

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_1'+\alpha_2'=2.56$, provided that $\beta_1'=\beta_1+\Delta_1$, $\beta_{i-1}'+\alpha_i'=2$ ($i=3$ to $m-1$), $\beta_{m-1}'+\alpha_m'=2.57$, provided that $\alpha_m'=\alpha_m+\Delta_m$.

Here, $T_{d1}=T_{d1}'=1.06$, $\alpha_1=\alpha_1'=0.94$, $\beta_1=1.44$, $\Delta_1=0.56$, $\alpha_i=\alpha_i'=\alpha c=0.56$ (αc is constant with respect to i when i=2 to m−1), $\beta_{m-1}=1.44$, $\Delta_{m-1}=0$, $\Delta_m=0.57$, $\Delta_{mm}=0.57$, $\alpha_m=0.56$, and $\beta_m=\beta_m'=1.5$, and they are constant when m is at least 3.

Further, when m=2, with respect to 4 T mark, $T_{d1}=1.06$, $\alpha_1=0.94$, $\beta_1=1.44$, $\alpha_2=0.56$ and $\beta_2=0.5$, and with respect to 5 T mark, $T_{d1}'=1.06$, $\alpha_1'=0.94$, $\beta_1'=2$, $\alpha_2'=1.13$ and $\beta_2'=0.5$.

With respect to 3 T mark, $T_{d1}'=1.06$, $\alpha_1'=1$ and $\beta_1'=1.13$.

Further, $T_{d1}$, $\alpha_i$, $\beta_i$, etc. in each recording method are summarized in Table 20. Each recording method is based on the recording pulse method (II-A) or (V), and therefore, in the case where m is at least 3, ten parameters ($T_{d1}$, $\alpha_1$, $\beta_1$, $\Delta_1$, αc, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (II), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\alpha_1$, $\alpha_m$ and $\beta_m$.

TABLE 20

| Recording method | | $T_{d1}$ | $\alpha_1$ | $\beta_1$ | $\Delta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|---|
| DVD1-1a | m ≥ 3 | 1 | 1 | 1.25 | 0.31 | 0.75 | 1.25 | 0 | 0.75 | 0.5 | 0.5 |
| | n = 5 | 1 | 1 | 1.56 | | | | | 1.25 | | 0.5 |
| | n = 4 | 1 | 1 | 1.25 | | | | | 0.75 | | 0.5 |
| | n = 3 | 1 | 1.5 | 0.56 | | | | | | | |
| DVD2-1a | m ≥ 3 | 1.06 | 0.94 | 1.44 | 0.56 | 0.56 | 1.44 | 0 | 0.56 | 0.57 | 0.5 |
| | n = 5 | 1.06 | 0.94 | 2 | | | | | 1.13 | | 0.5 |
| | n = 4 | 1.06 | 0.94 | 1.44 | | | | | 0.56 | | 0.5 |
| | n = 3 | 1.06 | 1.0 | 1.13 | | | | | | | |

Figure 64:
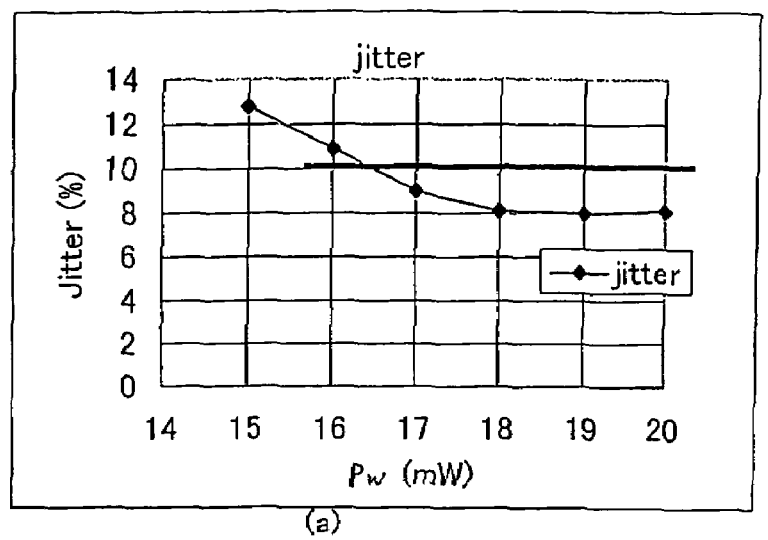
FIG. 64 presents data showing recording characteristics when recording was carried out on a rewritable optical recording medium (RW-DVD) of the present invention at 6-times velocity by another prescribed recording method.
Figure 64:
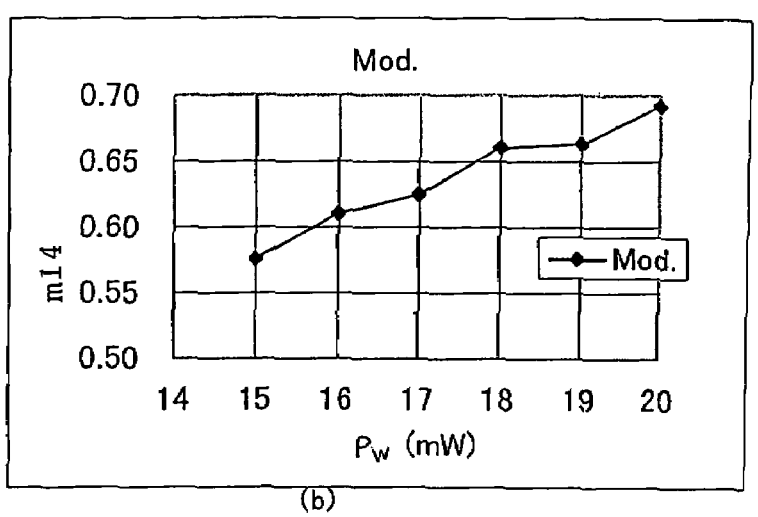
Figure 64:
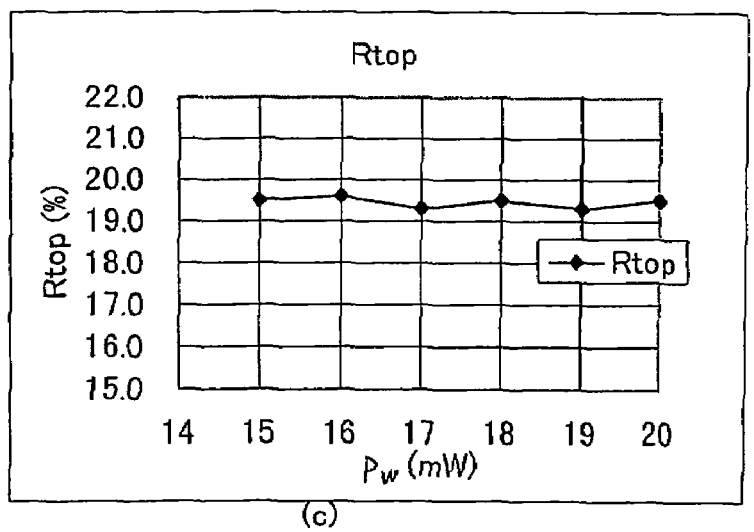

The results of evaluation of overwriting characteristics in the case of "Recording method DVD1-1a" at 6-times velocity, are shown in FIG. 64. Pe/Pw i.e. the ratio of erasing power Pe to writing power Pw was set to be 0.30. Pw was changed every 1 mW from 15 mW to about 21 mW. Bias power Pb was constant at 0.5 mW.

In FIG. 64, (a) to (c) show the Pw dependency of (a) jitter, (b) modulation $m_{14}$ and (c) $R_{top}$, respectively.

The optimum writing power where the jitter becomes minimum, was from 18 to 20 mW in "Recording method DVD1-1a".

From FIG. 64(a), it is evident that at all Pw, the jitter during retrieving at 1-time velocity was less than 15%. Further, the horizontal line in FIG. 64(a) indicates the jitter=10% during retrieving at 1-time velocity, and in the vicinity of the optimum Pw, the jitter values were less than 10%.

From FIGS. 64(b) and (c), it is evident that the modulation $m_{14}$ was from 55% to 80% (from 0.55 to 0.8), and $R_{top}$ was from 18 to 30%.

Figure 65:
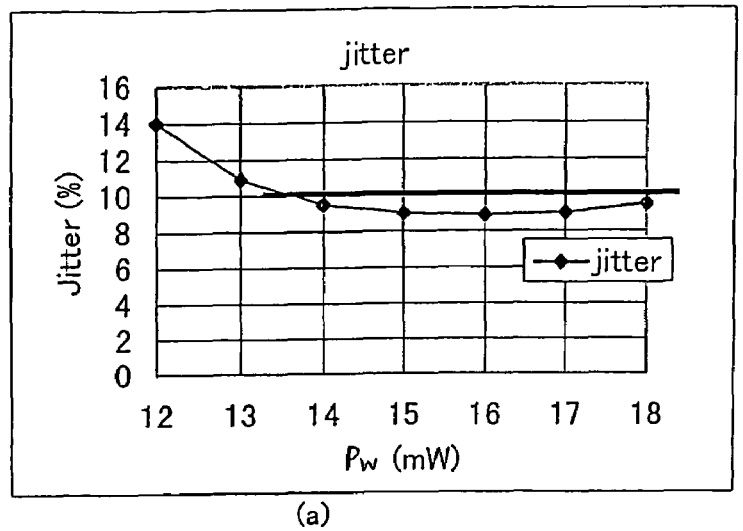
FIG. 65 presents data showing recording characteristics when recording was carried out on a rewritable optical recording medium (RW-DVD) of the present invention at 2.5-times velocity by another prescribed recording method.
Figure 65:
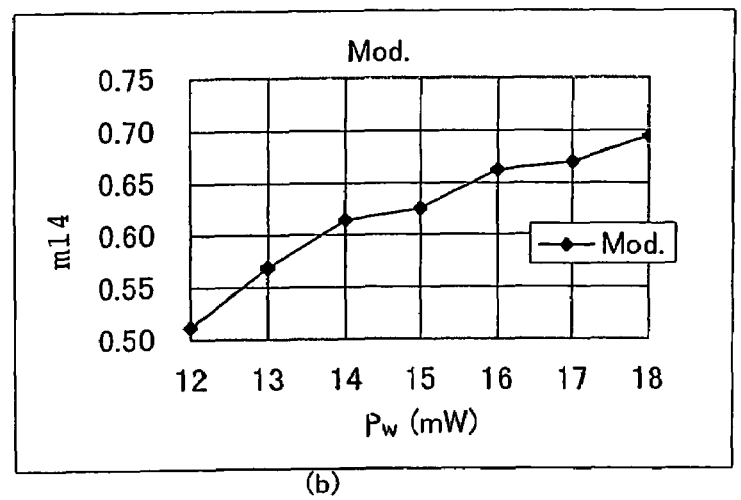
Figure 65:
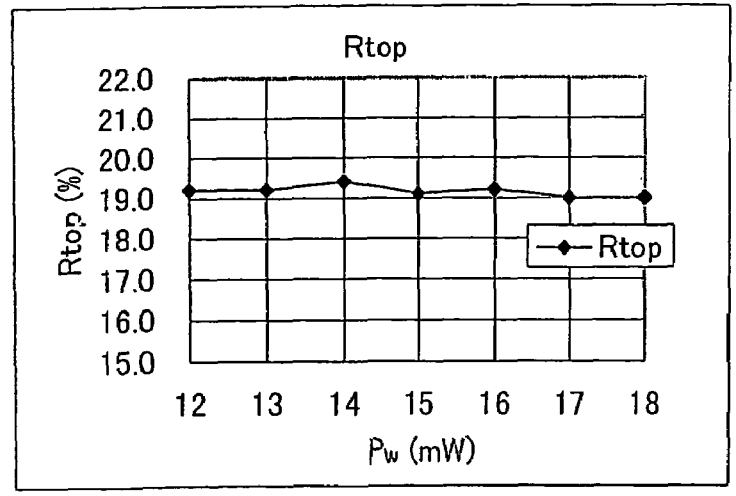

FIG. 65 shows the results of "Recording method DVD2-1a" at 2.5-times velocity. Pe/Pw i.e. the ratio of erasing power Pe to writing power Pw is made to be constant at 0.29, and Pw was changed every 1 mW from about 12 mW to about 18 mW. Bias power Pb was constant at 0.5 W.

FIGS. 65(a) to (c) show the Pw dependency of (a) jitter, (b) modulation $m_{14}$ and (c) $R_{top}$, respectively.

The optimum writing power is in the vicinity of from 15 to 17 mW in 2.5-times velocity recording.

From FIG. 65(a), it is evident that at all Pw, the jitter during retrieving at 1-time velocity is less than 15%. Further, the horizontal line in FIG. 65(a) indicates the jitter=10% during retrieving at 1-time velocity, and in the vicinity of the optimum Pw, the jitter values were less than 10%.

From FIGS. 65(b) and (c), it is evident that the modulation $m_{14}$ was from 55% to 80% (from 0.55 to 0.8), and $R_{top}$ was from 18 to 30%.

Further, in each case, the asymmetry was within a range of from −5 to +10%.

In summarizing the foregoing, good recording characteristics were obtained at 2.5 and 6-times velocities, and if the recording medium and the recording pulse division method (II-A) or (V) of the present invention are applied, good characteristics will be obtained also at linear velocities between them.

Further, the erase ratio at each linear velocity was measured. The 3 T/14 T overwriting erase ratio was measured at 2.5-times velocity by using 3 T and 14 T pulses of "Recording method DVD2-1a", and at 6-times velocity by using 3 T and 14 T pulses of "Recording method DVD1-1a". The 3 T/14 T overwriting erase ratios at 2.5-times velocity and 6-times velocity were 28 and 25 dB, respectively, and thus sufficient erase ratios were obtained at the respective linear velocities.

Further, disks recorded at 6-times velocity by "Recording method DVD1-1a" were subjected to an accelerated test at 105° C., whereby even upon expiration of 3 hours, no substantial deterioration of the recorded signals was observed. The jitter was found to be less than 10%, and the reflectivity $R_{top}$ and the modulation $m_{14}$ also did not substantially decrease and maintained at least 90% of the initial values.

Example 17

In the above Basic Example, a disk was prepared and recording was carried out as follows.

On a substrate, 80 nm of a lower protective layer made of $(ZnS)_{80}(SiO_2)_{20}$, 13.5 nm of a recording layer made of $In_3Ge_3Sb_{81}Te_{13}$ $(In_{0.03}Ge_{0.03}(Sb_{0.86}Te_{0.14})_{0.94})$, 20 nm of an upper protective layer made of $(ZnS)_{80}(SiO_2)_{20}$, 5 nm of an interfacial layer made of Ta, 140 nm of a reflective layer made of Ag and about 4 μm of an ultraviolet-curable resin layer, were formed in this order to obtain a disk. The volume resistivity $\rho_v$ of this Ag reflective layer was 28 nΩ·m, and the sheet resistivity $\rho_s$ was about 0.2Ω/□. The initialization was carried out by scanning a laser diode beam having a wavelength of about 810 nm and having an oval spot shape having a major axis of about 150 μm and a minor axis of about 1.0 μm, in the minor axis direction at a linear velocity of about 4 m/s. The irradiation power was 1200 mW.

On this disk, by means of the tester 3 with NA=0.65, overwriting of EFM+ modulation signal was carried out at 2.5 and 6-times velocities, and the characteristics were evaluated.

While maintaining Pe/Pw i.e. the ratio of erasing power Pe to writing power Pw, to be constant at 0.33 or 0.39, Pw was changed every 1 mW from about 15 mW to about 20 mW, whereby the overwriting characteristics at the respective writing powers were evaluated. Each was evaluated by the value after overwriting ten times.

In 6-times velocity recording, recording method DVD1-2 was applied. This is designated as "recording method DVD1-2a". This is a practical usage wherein the number of independent parameters in the recording pulse division method (III-A) is further limited.

Recording method DVD1-2a

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ (i=2 to m)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ (i=2 to m−1), $\beta_{m-1}'+\alpha_m'=2.8125$, provided that $\beta_{m-1}'=\beta_{m-1}+\beta_{m-1}$ and $\alpha_m'=\alpha_m+\beta_m$.

Here, $T_{d1}=T_{d1}'=0.75$, $\alpha=\alpha_1'=1.25$, $\alpha_i=\alpha_i'=\alpha c=1.2$ ($\alpha c$ is constant with respect to i when i=2 to m−1), $\beta_{m-1}=0.8$, $\Delta_{m-1}=0.5$, $\Delta_m=0.3125$, $\Delta_{mm}=0.8125$, $\alpha_m=1.25$, and $\beta_m=\beta_m'=0.125$, and they are constant when m is at least 3.

Further, when m=2, with respect to 4 T mark, $T_{d1}=0.75$, $\alpha_1=1.25$, $\beta_1=0.8$, $\alpha_2=1.2$ and $\beta_m 0.125$, and with respect to 5 T mark, $T_{d1}'=0.75$, $\alpha_1=1.25$, $\beta_1'=1.1875$, $\alpha_2'=1.5625$ and $\beta_2'=0.125$.

When m=1, i.e. with respect to 3 T mark, $T_{d1}'=0.8125$, $\alpha_1'=1.625$ and $\beta_1'=0.375$.

On the other hand, in the case of 2.5-times velocity recording, the following "Recording method DVD2-2a" was used as a specific example of recording method DVD2-2. "Recording method DVD2-2a" is a practical method wherein the number of independent parameters in the recording pulse division method (VI) is further limited.

Recording Method DVD2-2a

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ (i=2 to m).

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ (i=2 to m−1), $\beta_{m-1}'+\alpha_m'=2.875$, provided that $\beta_{m-1}'=\beta_{m-1}+\Delta_{m-1}$, and $\alpha_m'=\alpha_m+\Delta_m$.

Here, $T_{d1}=T_{d1}'=1.375$, $\alpha_1=\alpha_1'=0.625$, $\alpha_i=\alpha_i'=\alpha c=0.625$ ($\alpha c$ is constant with respect to i when i=2 to m−1), $\beta_{m-1}=1.375$, $\Delta_{m-1}=0.4375$, $\Delta_m=0.4375$, $\Delta_{mm}=0.875$, $\alpha_m=0.625$, and $\beta_m=\beta_m'=0.75$, and they are constant when m is at least 3.

Further, when m=2, with respect to 4 T mark, $T_{d1}=1.375$, $\alpha_1=0.625$, $\beta_1=1.3125$, $\alpha_2=0.625$ and $\beta_2=0.75$, and with respect to 5 T mark, $T_{d1}'=1.375$, $\alpha_1'=0.625$, $\beta_1'=1.9375$, $\alpha_2'=1.0$ and $\beta_2'=0.75$.

With respect to 3 T mark, $T_{d1}'=1.4375$, $\alpha_1'=1.25$ and $\beta_1'=1$.

Further, $T_{d1}$, $\alpha_i$, $\beta_i$, etc. in each recording method are summarized in Table 21. Each recording method is based on the recording pulse method (III-A), and therefore, in the case where m is at least 3, nine parameters ($T_{d1}$, $\alpha_1$, $\beta_1$, $\alpha c$, $\beta_{m-1}$, $\Delta_{m-1}$, $\alpha_m$, $\Delta_m$ and $\beta_m$) and $T_{d1}$, $\alpha_i$ and i when n=3, 4, 5, in the recording pulse division method (III), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\alpha_1$, $\alpha_m$ and $\beta_m$.

TABLE 21

| Recording method | | $T_{d1}$ | $\alpha_1$ | $\beta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|
| DVD1-2a | m ≥ 3 | 0.75 | 1.25 | 0.8 | 1.2 | 0.8 | 0.5 | 1.2 | 0.3125 | 0.125 |
| | n = 5 | 0.75 | 1.25 | 1.1875 | | | | 1.5625 | | 0.125 |
| | n = 4 | 0.75 | 1.25 | 0.8 | | | | 1.2 | | 0.125 |
| | n = 3 | 0.8125 | 1.625 | | | | | | | 0.375 |
| DVD2-2a | m ≥ 3 | 1.375 | 0.625 | 1.375 | 0.625 | 1.375 | 0.4375 | 0.625 | 0.4375 | 0.75 |
| | n = 5 | 1.375 | 0.625 | 1.9375 | | | | 1.0 | | 0.75 |
| | n = 4 | 1.375 | 0.625 | 1.3125 | | | | 0.625 | | 0.75 |
| | n = 3 | 1.4375 | 1.25 | | | | | | | 1 |

Figure 66:
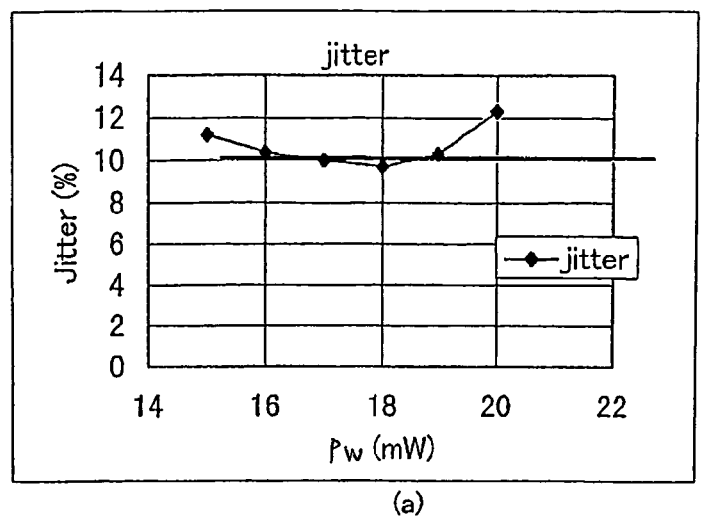
FIG. 66 presents data showing recording characteristics when recording was carried out on a rewritable optical recording medium (RW-DVD) of the present invention at 6-times velocity by another prescribed recording method.
Figure 66:
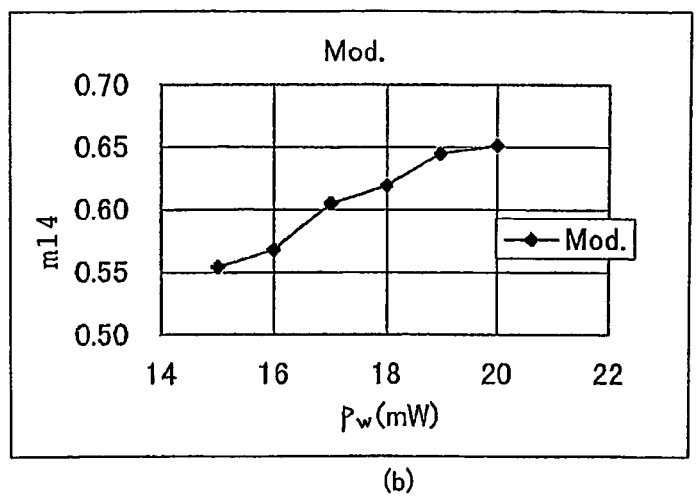
Figure 66:
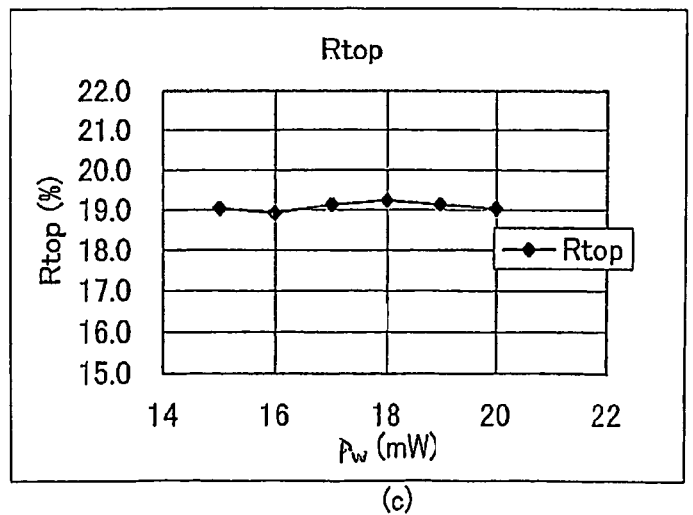

The results of evaluation of overwriting characteristics in the case of "Recording method DVD1-2a" at 6-times velocity, are shown in FIG. 66. Pe/Pw i.e. the ratio of erasing power Pe to writing power Pw was set to be 0.34 in Recording method 1'. Pw was changed every 1 mW from 15 mW to about 20 mW. Bias power Pb was constant at 0.5 mW.

In FIG. 66, (a) to (c) show the Pw dependency of (a) jitter, (b) modulation $m_{14}$ and (c) $R_{top}$, respectively.

The optimum writing power where the jitter becomes minimum, was from 17 to 19 mW in "Recording method DVD1-2a".

From FIG. 66(a), it is evident that at all Pw, the jitter during retrieving at 1-time velocity was less than 15%. Further, the horizontal line in FIG. 66 indicates the jitter=10% during retrieving at 1-time velocity, and in the vicinity of the optimum Pw, the jitter values were less than 10%.

From FIGS. 66(*b*) and (*d*), it is evident that the modulation $m_{14}$ was from 55% to 80% (from 0.55 to 0.8), and $R_{top}$ was from 18 to 30%.

Figure 67:
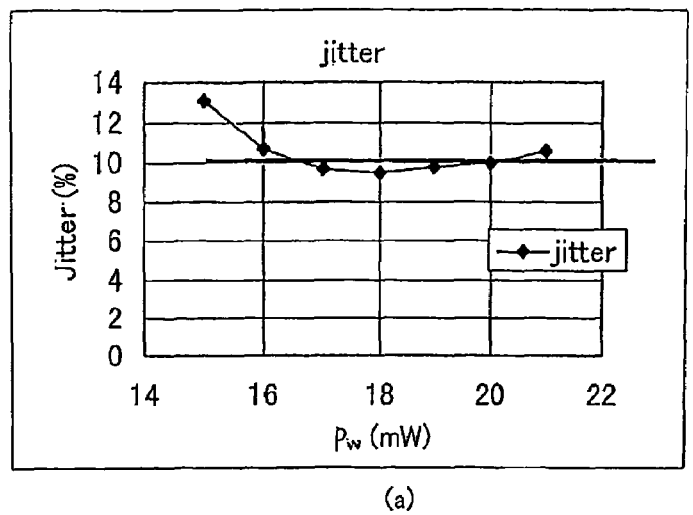
FIG. 67 presents data showing recording characteristics when recording was carried out on a rewritable optical recording medium (RW-DVD) of the present invention at 2.5-times velocity by another prescribed recording method.
Figure 67:
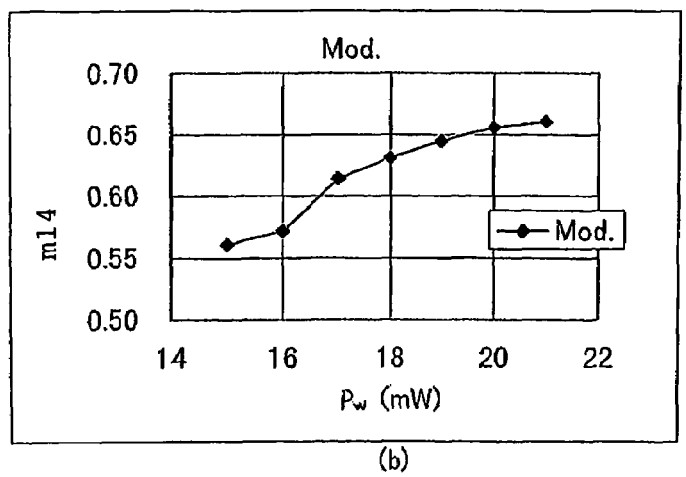
Figure 67:
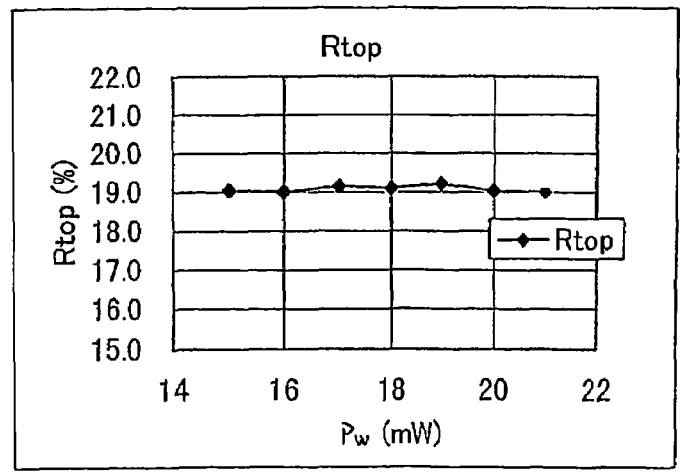

FIG. 67 shows the results of "Recording method DVD2-2*a*" at 2.5-times velocity. Pe/Pw i.e. the ratio of erasing power Pe to writing power Pw is made to be constant at 0.30, and Pw was changed every 1 mW from about 15 mW to about 21 mW. Bias power Pb was constant at 0.5 W.

FIGS. 67(*a*) to (*c*) show the Pw dependency of (a) jitter, (b) modulation $m_{14}$ and (c) $R_{top}$, respectively.

The optimum writing power is in the vicinity of from 17 to 20 mW in 2.5-times velocity recording, and the overwriting characteristics are also evaluated by the values at this power.

From FIG. 67(*a*), it is evident that at all Pw, the jitter during retrieving at 1-time velocity is less than 15%. Further, the horizontal line in FIG. 67(*a*) indicates the jitter=10% during retrieving at 1-time velocity, and in the vicinity of the optimum Pw, the jitter values were less than 10%.

From FIGS. 67(*b*) and (*c*), it is evident that the modulation $m_{14}$ was from 55% to 80% (from 0.55 to 0.8), and $R_{top}$ was from 18 to 30%.

Further, in each case, the asymmetry was within a range of from −5 to +15%.

In summarizing the foregoing, good recording characteristics were obtained at 2.5 and 6-times velocities. Further, good characteristics will be obtained also at linear velocities between them by adjusting pulses.

Further, the erase ratio at each linear velocity was measured. The 3 T/14 T overwriting erase ratio was measured at 2.5-times velocity by using 3 T and 14 T pulses of "Recording method DVD2-2*a*", and at 6-times velocity by using 3 T and 14 T pulses of "Recording method DVD1-2*a*". The 3 T/14 T overwriting erase ratios at 2.5-times velocity and 6-times velocity were 29 and 26 dB, respectively, and thus sufficient erase ratios were obtained at the respective linear velocities.

Further, disks recorded at 6-times velocity by "Recording method DVD1-2*a*" were subjected to an accelerated test at 105° C., whereby even upon expiration of 3 hours, no substantial deterioration of the recorded signals was observed. The jitter was found to have increased by 2 to 3%, but still was lower than 15% in retrieving at 1-time velocity, and the reflectivity $R_{top}$ and the modulation $m_{14}$ also did not substantially decrease and maintained levels slightly lower than 90% of the initial values.

Example 18

In the above Basic Example, a disk was prepared and recording was carried out as follows.

On a substrate, 78 nm of a lower protective layer made of $(ZnS)_{80}(SiO_2)_{20}$, 12 nm of a recording layer made of $Ge_{11.8}Sb_{58.8}Sn_{24.5}Te_{4.9}(Te_{0.05}Sn_{0.25}(Ge_{0.17}Sb_{0.83})_{0.70})$, 20 nm of an upper protective layer made of $(ZnS)_{80}(SiO_2)_{20}$, 2 nm of an interfacial layer made of Ta, 200 nm of a reflective layer made of Ag and about 4 μm of an ultraviolet-curable resin layer, were formed in this order to obtain a disk. The volume resistivity $\rho_v$ of this Ag reflective layer was 28 nΩ·m, and the sheet resistivity $\rho_s$ was about 0.14Ω/□. The initialization was carried out by scanning a laser diode beam having a wavelength of about 810 nm and having an oval spot shape having a major axis of about 75 μm and a minor axis of about 1.0 μm, in the minor axis direction at a linear velocity of about 8 m/s. The irradiation power was 700 mW.

On this disk, by means of the tester 3 with NA=0.65, overwriting of EFM+ modulation signal was carried out 10 times at 3 and 8-times velocities, and the characteristics were evaluated.

In 8-times velocity recording, recording method DVD1-2 was applied. This is designated as "recording method DVD1-2*b*". This is a practical usage wherein the number of independent parameters in the recording pulse division method (III-A) is further limited.

Recording Method DVD1-2*b*

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$), $\beta_{m-1}'+\alpha_m'=20.5625$, provided that $\beta_{m-1}'=\beta_{m-1}+\Delta_{m-1}$ and $\alpha_m'=\alpha_m+\Delta_m$.

Here, $T_{d1}=T_{d1}'=0.875$, $\alpha_1=\alpha_1'=1.125$, $\alpha_i=\alpha_i'=\alpha c=0.8125$ ($\alpha c$ is constant with respect to i when $i=2$ to $m-1$), $\beta_{m-1}=1.1875$, $\Delta_{m-1}=0.125$, $\Delta_m=0.4375$, $\Delta_{mm}=0.5625$, $\alpha_m=0.8125$, and $\beta_m=\beta_m'=0.375$, and they are constant when m is at least 3.

Further, when m=2, with respect to 4 T mark, $T_{d1}=0.875$, $\alpha_1=1.125$, $\beta_1=1.875$, $\alpha_2=0.8125$ and $\beta_m=0.375$, and with respect to 5 T mark, $T_{d1}'=0.875$, $\alpha_1'=1.125$, $\beta_1'=1.3125$, $\alpha_2'=1.25$ and $\beta_2'=0.375$.

When m=1, i.e. with respect to 3 T mark, $T_{d1}'=0.875$, $\alpha_1'=1.5625$ and $\beta_1'=0.5$.

On the other hand, in the case of 3-times velocity recording, the following "Recording method DVD2-2*b*" was used as a specific example of recording method DVD2-2. "Recording method DVD2-2*b*" is a practical usage wherein the number of independent parameters in the recording pulse division method (VI) is further limited.

Recording Method DVD2-2*b*

With respect to an even number mark length nT=2mT in the case where m is at least 3, at the time of recording the mark, the mark was divided into m sections, and $\alpha_i$ and $\beta_i$ in recording pulse sections $\alpha_i T$ and off-pulse sections $\beta_i T$ were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'T$ and off-pulse sections $\beta_i'T$ were set to be as follows.

$T_{d1}'+\alpha_1'=2$, $\beta_{i-1}'+\alpha_i'=2$ ($i=2$ to $m-1$), $\beta_{m-1}'+\alpha_m'=3$, provided that $\beta_{m-1}'=\beta_{m-1}+\Delta_{m-1}$, and $\alpha_m'=\alpha_m+\Delta_m$.

Here, $T_{d1}=T_{d1}'=1.0625$, $\alpha_1=\alpha_1'=0.9375$, $\alpha_i=\alpha_i'=\alpha c=0.5625$ ($\alpha c$ is constant with respect to i when i=2 to m−1), $\beta_{m-1}=1.4375$, $\Delta_{m-1}=0.6875$, $\Delta_m=0.3125$, $\Delta_{mm}=1$, $\alpha_m=0.5625$, and $\beta_m=\beta_m'm=0.5$, and they are constant when m is at least 3.

Further, when m=2, with respect to 4 T mark, $T_{d1}=1.0625$, $\alpha_1=0.9375$, $\beta_1=1.4375$, $\alpha_2=0.5625$ and $\beta_2=0.5$, and with respect to 5 T mark, $T_{d1}'=1.0625$, $\alpha_1'=0.9375$, $\beta_1'=2.125$, $\alpha_2'=0.875$ and $\beta_2'=0.5$.

With respect to 3 T mark, $T_{d1}'=1.0625$, $\alpha_1'=1.125$ and $\beta_1'=1$.

Further, $T_{d1}$, $\alpha_i$, $\beta_i$, etc. in each recording method are summarized in Table 22. Each recording method is based on the recording pulse method (III), and therefore, in the case where m is at least 3, nine parameters ($T_{d1}$, $\alpha_1$, $\beta_1$, $\alpha c$, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (III), are presented. However, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\beta_1$, $\alpha_m$ and $\beta_m$.

From FIG. 69(a), it is evident that at all Pw, the jitter during retrieving at 1-time velocity is less than 15%. Further, the horizontal line in FIG. 69(a) indicates the jitter=10% during retrieving at 1-time velocity, and in the vicinity of the optimum Pw, the jitter values were less than 10%.

From FIGS. 69(b) and (c), it is evident that the modulation $m_{14}$ was from 55% to 80% (from 0.55 to 0.8), and $R_{top}$ was from 18 to 30%.

Further, in each case, the asymmetry was within a range of from −5 to +10%.

In summarizing the foregoing, good recording characteristics were obtained at 3 and 8-times velocities, and good characteristics will be obtained also at linear velocities between them by adjusting pulses.

Further, the erase ratio at each linear velocity was measured. The 3 T/14 T overwriting erase ratio was measured at 3-times velocity by using 3 T and 14 T pulses of "Recording method DVD2-2b", and at 8-times velocity by using 3 T and 14 T pulses of "Recording method DVD1-2b". The 3 T/14 T overwriting erase ratios at 3-times velocity and 8-times velocity were 29 and 26 dB, respectively, and thus sufficient erase ratios were obtained at the respective linear velocities.

TABLE 22

| Recording method | | $T_{d1}$ | $\alpha_1$ | $\beta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|
| DVD1-2b | m ≥ 3 | 0.875 | 1.125 | 1.1875 | 0.8125 | 1.1875 | 0.125 | 0.8125 | 0.4375 | 0.375 |
| | n = 5 | 0.875 | 1.125 | 1.3125 | | | | 1.25 | | 0.375 |
| | n = 4 | 0.875 | 1.125 | 1.1875 | | | | 0.8125 | | 0.375 |
| | n = 3 | 0.875 | 1.5625 | | | | | | | 0.50 |
| DVD2-2b | m ≥ 3 | 1.0625 | 0.9375 | 1.4375 | 0.5625 | 1.4375 | 0.6875 | 0.5625 | 0.3125 | 0.5 |
| | n = 5 | 1.0625 | 0.9375 | 2.125 | | | | 0.875 | | 0.5 |
| | n = 4 | 1.0625 | 0.9375 | 1.4375 | | | | 0.5625 | | 0.5 |
| | n = 3 | 1.0625 | 1.125 | | | | | | | 1 |

Figure 68:
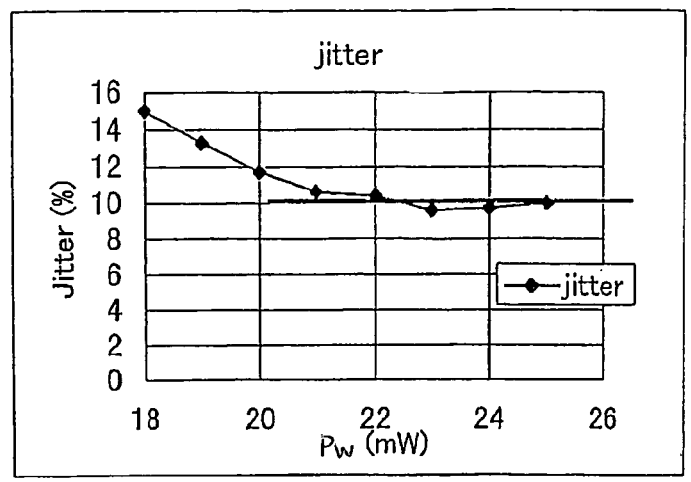
FIG. 68 presents data showing recording characteristics when recording was carried out on a rewritable optical recording medium (RW-DVD) of the present invention at 8-times velocity by another prescribed recording method.
Figure 68:
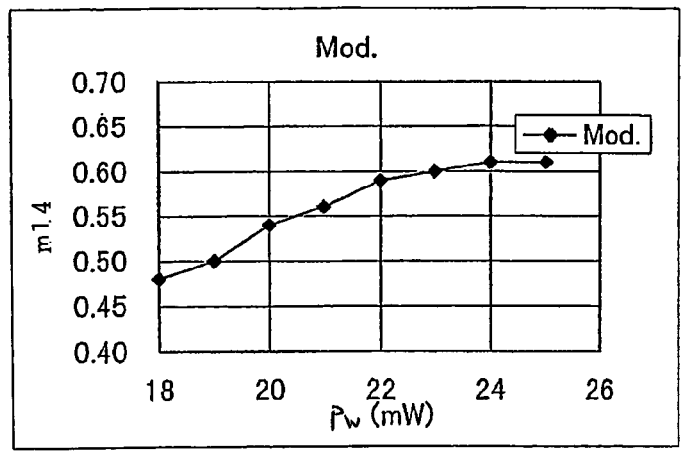
Figure 68:
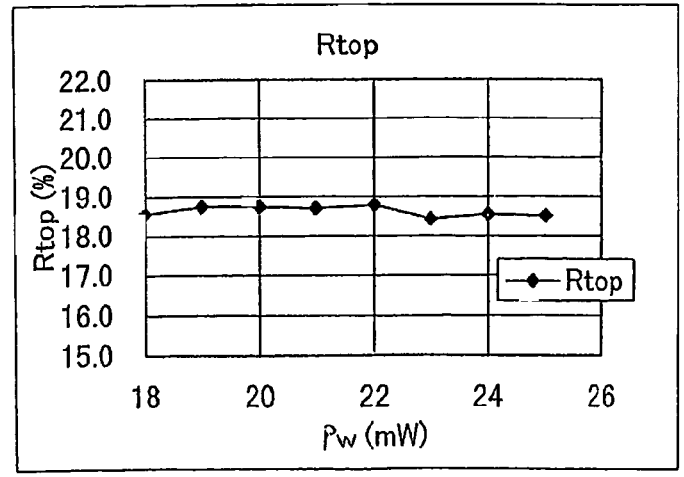

The results of evaluation of overwriting characteristics in the case of "Recording method DVD1-2b" at 8-times velocity, are shown in FIG. 68. Pe/Pw i.e. the ratio of erasing power Pe to writing power Pw was set to be 0.24 in "Recording method DVD1-2b". Pw was changed every 1 mW from 18 mW to about 25 mW. Bias power Pb was constant at 0.5 mW.

In FIG. 68, (a) to (c) show the Pw dependency of (a) jitter, (b) modulation $m_{14}$ and (c) $R_{top}$, respectively.

The optimum writing power where the jitter becomes minimum, was from 22 to 25 mW in "Recording method DVD1-2b".

From FIG. 68(a), it is evident that at all Pw, the jitter during retrieving at 1-time velocity was less than 15%. Further, the horizontal line in FIG. 68 indicates the jitter=10% during retrieving at 1-time velocity, and in the vicinity of the optimum Pw, the jitter values were less than 10%.

From FIGS. 68(b) and (d), it is evident that the modulation $m_{14}$ was from 55% to 80% (from 0.55 to 0.8), and $R_{top}$ was from 18 to 30%.

Figure 69:
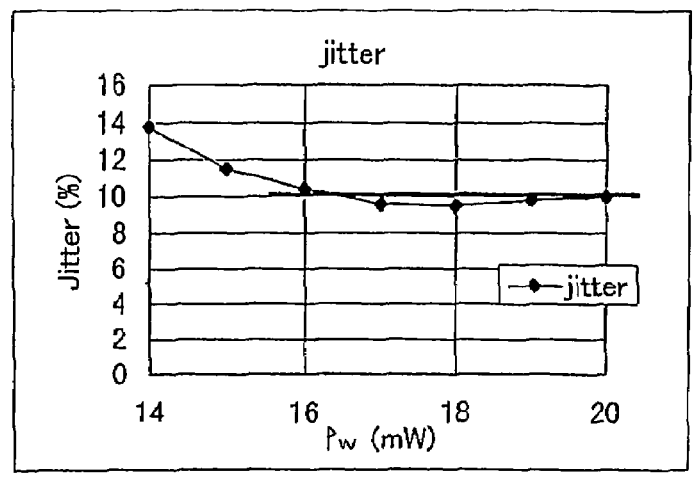
FIG. 69 presents data showing recording characteristics when recording was carried out on a rewritable optical recording medium (RW-DVD) of the present invention at 3-times velocity by another prescribed recording method.
Figure 69:
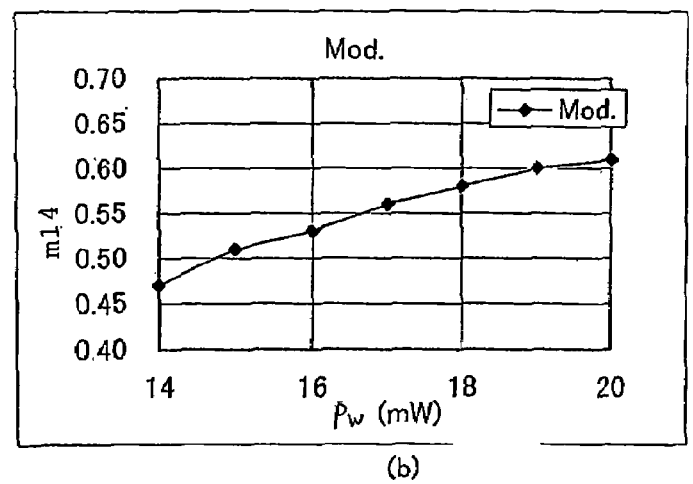
Figure 69:
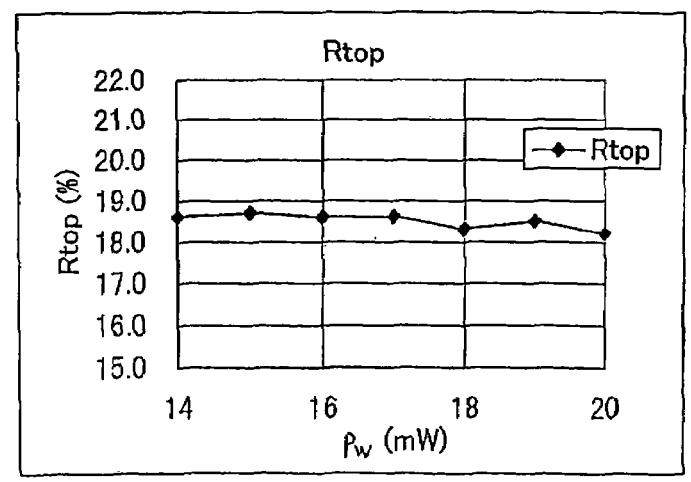

FIG. 69 shows the results of "Recording method DVD2-2b" at 3-times velocity. Pe/Pw i.e. the ratio of erasing power Pe to writing power Pw is made to be constant at 0.25, and Pw was changed every 1 mW from about 14 mW to about 20 mW. Bias power Pb was constant at 0.5 W.

FIGS. 69(a) to (c) show the Pw dependency of (a) jitter, (b) modulation $m_{14}$ and (c) $R_{top}$, respectively.

The optimum writing power is in the vicinity of from 17 to 20 mW in 3-times velocity recording.

Further, disks recorded at 8-times velocity by "Recording method DVD1-2b" were subjected to an accelerated test at 105° C., whereby even upon expiration of 3 hours, no substantial deterioration of the recorded signals was observed. The jitter was found to be less than 10%, and the reflectivity $R_{top}$ and the modulation $m_{14}$ also did not substantially decrease and maintained levels slightly lower than 90% of the initial values.

Example 19

In the above Basic Example, a disk was prepared and recording was carried out as follows.

On a substrate, 80 nm of a lower protective layer made of $(ZnS)_{80}(SiO_2)_{20}$, 13 nm of a recording layer made of $Ge_{7.7}In_{10.1}Sb_{63.6}Sn_{13.8}Te_{4.8}(In_{0.1}Sn_{0.14}Te_{0.05}(Ge_{0.11}Sb_{0.89})_{0.71})$ 20 nm of an upper protective layer made of $(ZnS)_{80}(SiO_2)_{20}$, 2 nm of an interfacial layer made of Ta, 200 nm of a reflective layer made of Ag and about 4 μm of an ultraviolet-curable resin layer, were formed in this order to obtain a disk. The volume resistivity $\rho_v$ of this Ag reflective layer was 28 nΩ·m, and the sheet resistivity $\rho_s$ was about 0.14Ω/□. The initialization was carried out by scanning a laser diode beam having a wavelength of about 810 nm and having an oval spot shape having a major axis of about 75 μm and a minor axis of about 1.0 μm, in the minor axis direction at a linear velocity of about 12 m/s. The irradiation power was 900 mW.

On this disk, by means of the tester 3 with NA=0.65, overwriting of EFM+ modified signal was carried out 10 times at 4, 10 and 12-times velocities, and the characteristics were evaluated.

In 10-times velocity recording, recording method DVD1-2 was applied. This is designated as "recording method DVD1-2$c$". This is a practical usage wherein the number of independent parameters in the recording pulse division method (III-A) is further limited.

Recording Method DVD1-2$c$

With respect to an even number mark length nT=2mT in the case where m is at least 3, the mark was divided into m sections, and $\alpha_i$ and $\beta_i$ in recording pulse sections $\alpha_i$T and off-pulse sections $\beta_i$T were set to be as follows.

$T_{d1}+\alpha_1=2$, $\beta_{i-1}+\alpha_i=2$ ($i=2$ to $m$).

On the other hand, with respect to an odd number mark length nT=(2m+1)T in the case where m is at least 3, the mark was divided into m sections, and $\alpha_i'$ and $\beta_i'$ in recording pulse sections $\alpha_i'$T and off-pulse sections $\beta_i'$T were set to be as follows.

$T_{d1}'+\alpha_1'=2$, $\beta_{m-1}'+\alpha_i'=2$ ($i=2$ to $m-1$), $\beta_{m-1}'+\alpha_m'=2.47$, provided that $\beta_{m-1}'=\beta_{m-1}+\Delta_{m-1}$ and $\alpha_m=\alpha_m+\Delta_m$.

Here, $T_{d1}=T_{d1}'=1$, $\alpha_1=\alpha_1'=1$, $\alpha_i=\alpha_i'=\alpha c=0.8$ ($\alpha c$ is constant with respect to i when i=2 to m−1), $\beta_{m-1}=1.2$, $\Delta_{m-1}=0.2$, $\Delta_m=0.27$, $\Delta_{mm}=0.47$, $\alpha_m=0.8$, and $\beta_m=\beta_m'=0.6$, and they are constant when m is at least 3.

Further, when m=2, with respect to 4 T mark, $T_{d1}=1$, $\alpha_1=1$, $\beta_1=1.2$, $\alpha_2=0.8$ and $\beta_2=0.6$, and with respect to 5 T mark, $T_{d1}'=1$, $\alpha_1'=1$, $\beta_1'=1.27$, $\alpha_2'=1.13$ and $\beta_2'=0.6$.

When m=1, i.e. with respect to 3 T mark, $T_{d1}'=1.2$, $\alpha_1'=1.07$ and $\beta_1'=0.8$.

Further, also in the case of 12-times velocity recording, the recording method DVD1-2 was applied, and this is designated as "Recording method DVD1-2$d$". This is a practical usage wherein the number of independent parameters in the recording pulse division method (III-A) is further limited.

Recording Method DVD1-2$d$

With respect to an even number mark length nT=2mT in the case where m is at least 3, at the time of recording the mark, the mark was divided into m sections, and $\alpha_i$ and $\beta_i$ in recording pulse sections $\alpha_i$T and off-pulse sections $\beta_i$T were set to be as follows.

$T_{d1}+\alpha_1=2$, $\beta_{i-1}+\alpha_i=2$ ($i=2$ to $m$)

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'$T and off-pulse sections $\beta_i'$T were set to be as follows.

$T_{d1}'+\alpha_1'=2$, $\beta_{i-1}'+\alpha_i'=2$ ($i=2$ to $m-1$), $\beta_{m-1}'+\alpha_m'=2.5$, provided that $\beta_{m-1}'=\beta_{m-1}+\Delta_{m-1}$, and $\alpha_m=\alpha_m+\Delta_m$.

Here, $T_{d1}=T_{d1}'=0.92$, $\alpha_1=\alpha_1'=1.08$, $\alpha_i=\alpha_i'=\alpha c=0.83$ ($\alpha c$ is constant with respect to i when i=2 to m−1), $\beta_{m-1}=1.17$, $\Delta_{m-1}=0.25$, $\Delta_m=0.25$, $\Delta_{mm}=0.5$, $\alpha_m=0.83$, and $\beta_m=\beta_m'=0.75$, and they are constant when m is at least 3.

Further, when m=2, with respect to 4 T mark, $T_{d1}=1.92$, $\alpha_1=1.08$, $\beta_1=1.17$, $\alpha_2=0.83$ and $\beta_2=0.75$, and with respect to 5 T mark, $T_{d1}'=0.92$, $\alpha_1'=1.08$, $\beta_1'=1.28$, $\alpha_2'=1.14$ and $\beta_2'=0.75$.

With respect to 3 T mark, $T_{d1}'=1.17$, $\alpha_1'=1.08$ and $\beta_1'=0.67$.

On the other hand, in the case of 4-times velocity recording, the following "Recording method DVD2-2$c$" was used as a specific example of recording method DVD2-2. "Recording method DVD2-2$c$" is a practical usage wherein the number of independent parameters in the recording pulse division method (VI) is further limited.

Recording Method DVD2-2$c$

With respect to an even number mark length nT=2mT in the case where m is at least 3, at the time of recording the mark, the mark was divided into m sections, and $\alpha_i$ and $\beta_i$ in recording pulse sections $\alpha_i$T and off-pulse sections $\beta_i$T were set to be as follows.

$T_{d1}+\alpha_1=2$, $\beta_{i-1}+\alpha_i=2$ ($i=2$ to $m$).

On the other hand, with respect to an odd number mark length nT=(2m+1)T in the case where m is at least 3, at the time of recording the mark, the mark was divided into m sections, and $\alpha_i'$ and $\beta_i'$ in recording pulse sections $\alpha_i'$T and off-pulse sections $\beta_i'$T were set to be as follows.

$T_{d1}'+\alpha_1'=2$, $\beta_{i-1}'+\alpha_i'=2$ ($i=2$ to $m-1$), $\beta_{m-1}'+\alpha_m'=2.88$, provided that $\beta_{m-1}'=\beta_{m-1}+\Delta_{m-1}$ and $\alpha_m=\alpha_m+\Delta_m$.

Here, $T_{d1}=T_{d1}'=1.44$, $\alpha_1=\alpha_1'=0.56$, $\alpha_i=\alpha_i'=\alpha c=0.56$ ($\alpha c$ is constant with respect to i when i=2 to m−1), $\beta_{m-1}=1.44$, $\Delta_{m-1}=0.56$, $\Delta_m=0.32$, $\Delta_{mm}=0.88$, $\alpha_m=0.56$, and $\beta_m=\beta_m'=0.69$, and they are constant when m is at least 3.

Further, when m=2, with respect to 4 T mark, $T_{d1}=1.44$, $\alpha_1=0.56$, $\beta_1=1.44$, $\alpha_2=0.56$ and $\beta_2=0.69$, and with respect to 5 T mark, $T_{d1}'=1.44$, $\alpha_1'=0.56$, $\beta_1'=2$, $\alpha_2'=0.88$ and $\beta_2'=0.69$.

With respect to 3 T mark, $T_{d1}'=1.44$, $\alpha_1'=1.19$ and $\beta_1'=0.88$.

Further, $T_{d1}$, $\alpha_i$, $\beta_i$, etc. in each recording method are summarized in Table 23. Each recording method is based on the recording pulse method (III), and therefore, in the case where m is at least 3, nine parameters ($T_{d1}$, $\alpha_1$, $\beta_1$, $\alpha c$, $\beta_{m-1}$, $\Delta_{m-1}$, $\alpha_m$, $\Delta_m$ and $\beta_m$) and $T_{d1}$, $\alpha_i$ and $\beta_i$ when n=3, 4, 5, in the recording pulse division method (III), are presented. $\beta_m'$ is set to be zero in this Example and therefore omitted. Further, ($T_{d1}'$, $\alpha_1'$ and $\beta_1'$) in the case where n=3 are presented in the columns for $T_{d1}$, $\alpha_1$ and $\beta_1$. ($T_{d1}$, $\alpha_1$, $\beta_1$, $\alpha_2$ and $\beta_2$) in the case where n=4 and ($T_{d1}'$, $\alpha_1'$, $\beta_1'$, $\alpha_2'$ and $\beta_2'$) in the case where n=5 are presented in the columns for $T_{d1}$, $\alpha_1$, $\beta_1$, $\alpha_m$ and $\beta_m$.

TABLE 23

| Recording method | | $T_{d1}$ | $\alpha_1$ | $\beta_1$ | $\alpha c$ | $\beta_{m-1}$ | $\Delta_{m-1}$ | $\alpha_m$ | $\Delta_m$ | $\beta_m$ |
|---|---|---|---|---|---|---|---|---|---|---|
| DVD1-2c | m ≧ 3 | 1 | 1 | 1.2 | 0.8 | 1.2 | 0.2 | 0.8 | 0.27 | 0.6 |
|  | n = 5 | 1 | 1 | 1.27 |  |  |  | 1.13 |  | 0.6 |
|  | n = 4 | 1 | 1 | 1.2 |  |  |  | 0.8 |  | 0.6 |
|  | n = 3 | 1.2 | 1.07 |  |  |  |  |  |  | 0.8 |
| DVD1-2d | m ≧ 3 | 0.92 | 1.08 | 1.17 | 0.83 | 1.17 | 0.25 | 0.83 | 0.25 | 0.75 |
|  | n = 5 | 0.92 | 1.08 | 1.28 |  |  |  | 1.14 |  | 0.75 |
|  | n = 4 | 0.92 | 1.08 | 1.17 |  |  |  | 0.83 |  | 0.75 |
|  | n = 3 | 1.17 | 1.08 |  |  |  |  |  |  | 0.67 |
| DVD2-2c | m ≧ 3 | 1.44 | 0.56 | 1.44 | 0.56 | 1.44 | 0.56 | 0.56 | 0.32 | 0.69 |
|  | n = 5 | 1.44 | 0.56 | 2 |  |  |  | 0.88 |  | 0.69 |
|  | n = 4 | 1.44 | 0.56 | 1.44 |  |  |  | 0.56 |  | 0.69 |
|  | n = 3 | 1.44 | 1.19 |  |  |  |  |  |  | 0.88 |

Figure 70:
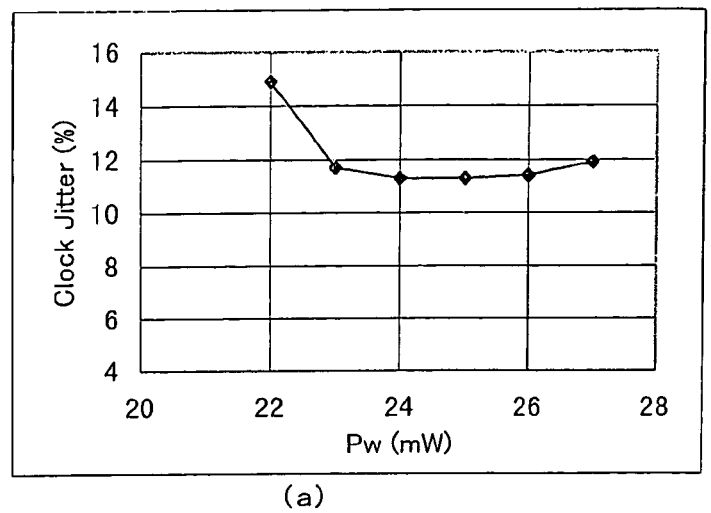
FIG. 70 presents data showing recording characteristics when recording was carried out on a rewritable optical recording medium (RW-DVD) of the present invention at 10-times velocity by another prescribed recording method.
Figure 70:
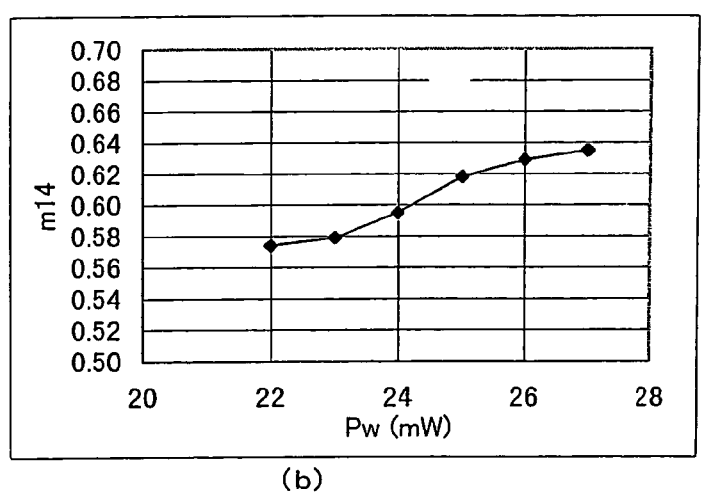
Figure 70:
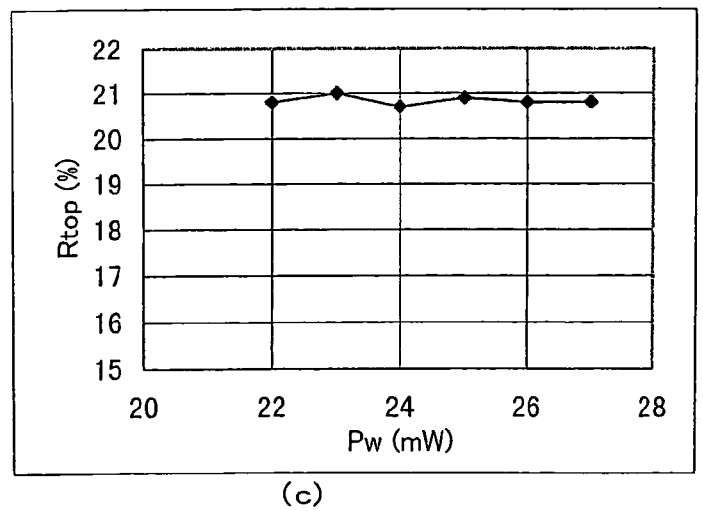

The results of evaluation of overwriting characteristics in the case of "Recording method DVD1-2c" at 10-times velocity, are shown in FIG. 70. Pe/Pw i.e. the ratio of erasing power Pe to writing power Pw was set to be 0.22 in "Recording method DVD1-2c". Pw was changed every 1 mW from 22 mW to about 27 mW. Bias power Pb was constant at 0.5 mW.

In FIG. 70, (a) to (c) show the Pw dependency of (a) clock jitter, (b) modulation $m_{14}$ and (c) $R_{top}$, respectively.

The optimum writing power where the jitter becomes minimum, was in the vicinity of from 24 to 26 mW in "Recording method DVD1-2c".

From FIG. 70(a), it is evident that at all Pw, the jitter during retrieving at 1-time velocity was less than 15%.

Further, from FIGS. 70(a), (b) and (c), it is evident that at the optimum writing power, the clock jitter was less than 12%, the modulation $m_{14}$ was from 55% to 80% (0.55 to 0.8), and $R_{top}$ was from 18 to 30%.

Figure 71:
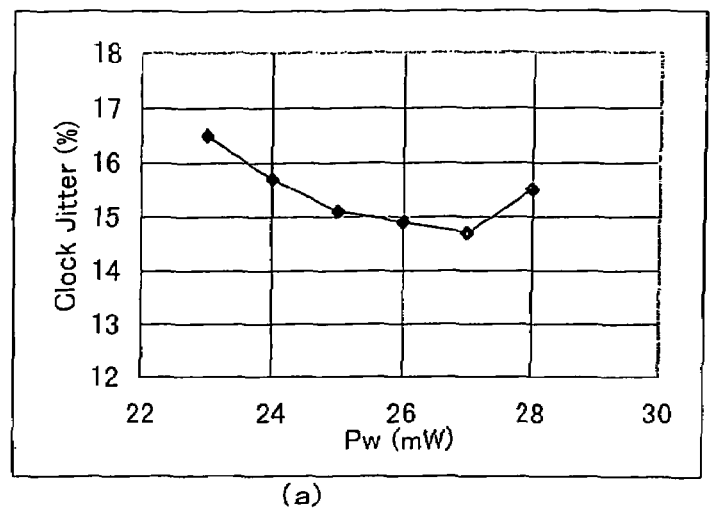
FIG. 71 presents data showing recording characteristics when recording was carried out on a rewritable optical recording medium (RW-DVD) of the present invention at 12-times velocity by another prescribed recording method.
Figure 71:
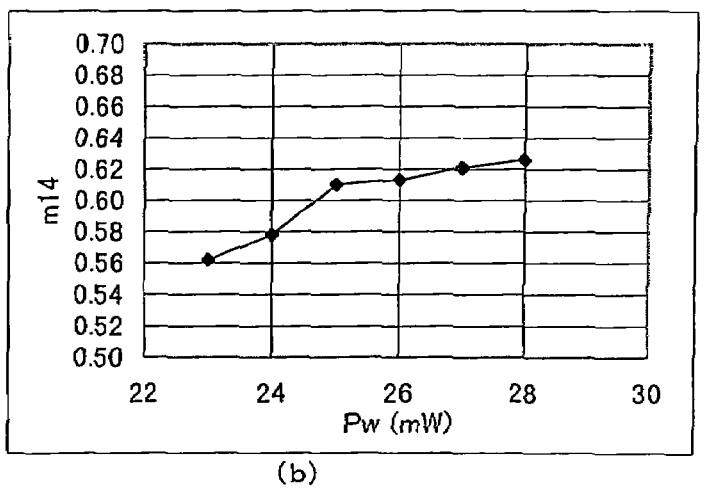
Figure 71:
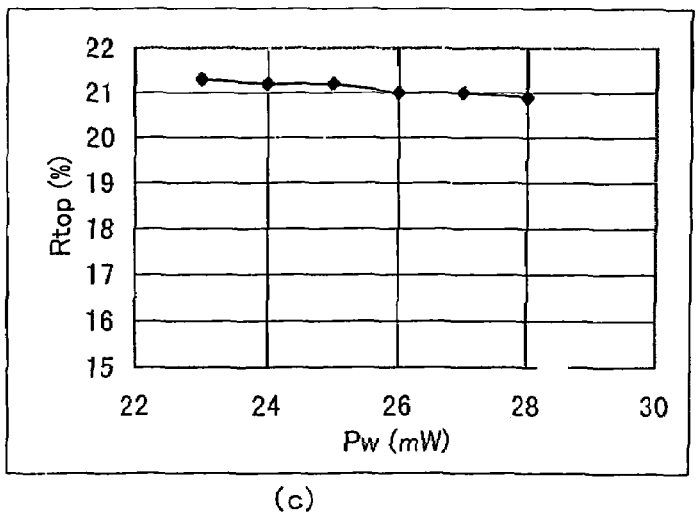

The results of evaluation of overwriting characteristics in the case of "Recording method DVD1-2d" at 12-times velocity, are shown in FIG. 71. Pe/Pw i.e. the ratio of erasing power Pe to writing power Pw was set to be 0.2 in "Recording method DVD1-2d". Pw was changed every 1 mW from 23 mW to about 28 mW. Bias power Pb was constant at 0.5 mW.

In FIGS. 71, (a) to (c) show the Pw dependency of (a) clock jitter, (b) modulation $m_{14}$ and (c) $R_{top}$, respectively.

The optimum writing power where the jitter becomes minimum, was in the vicinity of from 26 to 27 mW in "Recording method DVD1-2d".

From FIGS. 71(a), (b) and (c), it is evident that at the optimum writing power, the clock jitter was less than 15%, the modulation $m_{14}$ was from 55% to 80% (0.55 to 0.8), and $R_{top}$ was from 18 to 30%. Further, the reason why the clock jitter at 12-times velocity exceeded 12%, is that the rising and falling of the recording pulses of the tester 3 used for the measurement were slightly less than 2 nsec, which is relatively large as compared with the reference clock period of about 3.2 nsec. If the time for the rising and falling can be shortened to a level of 1 nsec, the clock jitter can be reduced to a level of 12%. The rising or falling time at a level of 1 nsec is a value which can be sufficiently practically accomplished at present.

Figure 72:
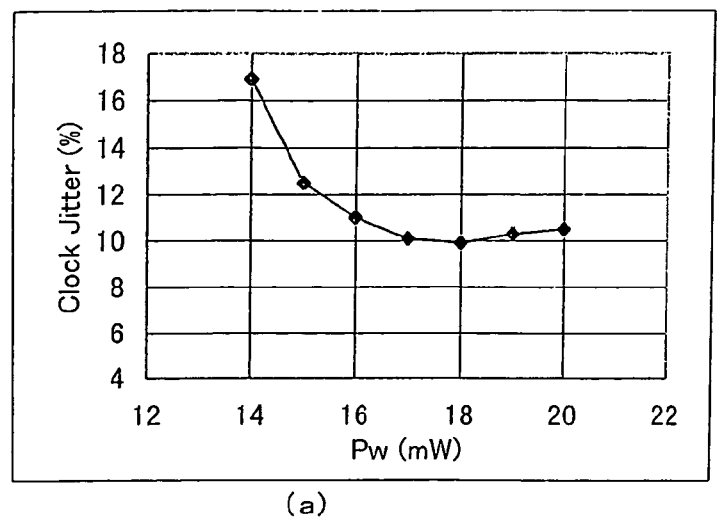
FIG. 72 presents data showing recording characteristics when recording was carried out on a rewritable optical recording medium (RW-DVD) of the present invention at 4-times velocity by another prescribed recording method.
Figure 72:
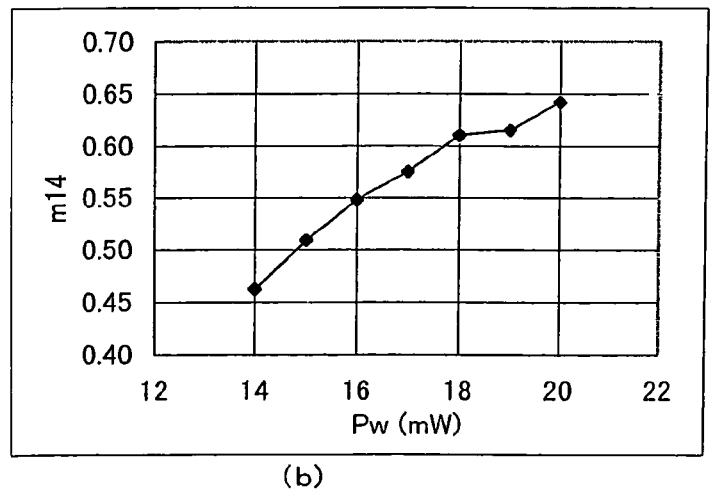
Figure 72:
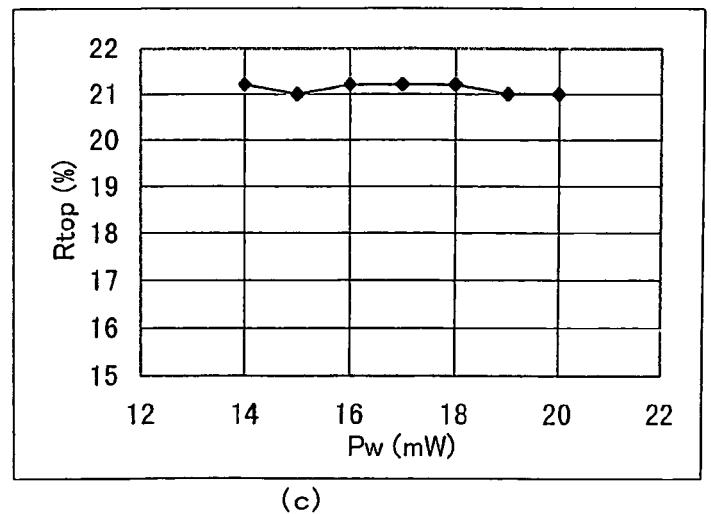

The results of evaluation of overwriting characteristics in the case of "Recording method DVD2-2c" at 4-times velocity, are shown in FIG. 72. Pe/Pw i.e. the ratio of erasing power Pe to writing power Pw was set to be 0.25, and Pw was changed every 1 mW from 14 mW to about 20 mW. Bias power Pb was constant at 0.5 mW.

In FIGS. 72, (a) to (c) show the Pw dependency of (a) clock jitter, (b) modulation $m_{14}$ and (c) $R_{top}$, respectively. The optimum writing power was in the vicinity of from 17 to 20 mW in 4-times velocity recording.

Further, from FIGS. 72(a), (b) and (c), it is evident that at the optimum writing power, the clock jitter was less than 11%, the modulation $m_{14}$ was from 55% to 80% (0.55 to 0.8), and $R_{top}$ was from 18 to 30%.

In summarizing the foregoing, good recording characteristics were obtained at 4, 10 and 12-times velocities. Further, good characteristics will be obtained also at linear velocities between them by adjusting pulses.

Further, the erase ratio at each linear velocity was measured. The 3 T/14 T overwriting erase ratios were measured by using 3 T and 14 T pulses of the recording pulse division methods of Table 23, and found to be at least 25 dB, respectively, and thus sufficient erase ratios were obtained at the respective linear velocities.

Further, disks recorded at 10-times velocity by "Recording method DVD1-2c" of Table 23 were subjected to an accelerated test at 105° C., whereby even upon expiration of 3 hours, no substantial deterioration of the recorded signals was observed. The jitter was found to be less than 12% in retrieving at 1-time velocity, and the reflectivity $R_{top}$ and the modulation $m_{11}$ also did not substantially decrease and maintained at least 90% of the initial values.

Comparative Example 3

On RW-DVD overwritable at 4, 8-times velocity or 5-times velocity as disclosed in Examples of JP-A-2001-331936, overwriting at 8-times velocity was tried.

On a substrate, 68 nm of a lower protective layer made of $(ZnS)_{80}(SiO_2)_{20}$, 14 nm of a recording layer made of $Ge_5Sb_{77}Te_{18}$ $(Ge_{0.05}(Sb_{0.81}Te_{0.19})_{0.95})$, 25 nm of an upper protective layer made of $(ZnS)_{80}(SiO_2)_{20}$, 200 nm of a reflective layer made of $Al_{99.5}Ta_{0.5}$ and about 4 μm of an ultraviolet-curable resin layer, were formed in this order to obtain a disk. The volume resistivity $\rho_v$ of this $Al_{99.5}Ta_{0.5}$ reflective layer was 100 nΩ·m, and the sheet resistivity $\rho_s$ was about 0.5Ω/□. The initialization was carried out by scanning a laser diode beam having a wavelength of about 810 nm and having an oval spot shape having a major axis of about 108 μm and a minor axis of about 1.5 μm, in the minor axis direction at a linear velocity of from 3 to 6 m/s. The irradiation power was 400 to 600 mW. Further, an operation to reduce the noise of the crystallization level was carried out by scanning the groove with DC light of about 6 mW at 4 m/s once each by application of tracking and focusing servo by the tester with a wavelength of 660 and NA=0.65.

On this disk, by means of the tester 3 with NA=0.65, overwriting of EFM+ modulation signal was carried out at 8-times velocity, and the characteristics were evaluated.

As the recording method, the pulse division method disclosed in JP-A-2001-331936 is employed. Specifically, the method of FIG. 26 disclosed in JP-A-2001-331936 is employed.

As the manner of description is different between JP-A-2001-331936 and the present patent, the following description will be made primarily in accordance with the manner of description in JP-A-2001-331936.

With respect to an even number mark length nT=2mT in the case where m is at least 3, the mark was divided into m sections, and $\alpha_i$ and $\beta_i$ in recording pulse sections $\alpha_i T$ and off-pulse sections $\beta_i T$ were set to be as follows.

$T_{d1} + \alpha_i = 2$ ($T_{d1} = 0.95$), $\beta_{i-1} + \alpha_i = 2$ ($i=2$ to $m-1$), $\beta_m + \alpha_m = 1.4$.

On the other hand, with respect to an odd number mark length nT=(2m+1)T in the case where m is at least 3, the mark was divided into m sections, and $\alpha_i'$ and $\beta_i'$ in recording pulse sections $\alpha_i' T$ and off-pulse sections $\beta_i' T$ were set to be as follows.

$T_{d1}' + \alpha_1' = 2.05$ ($T_{d1}' = 1$), $\beta_1' + \alpha_2' = 2.45$, provided that $\beta_1' = \beta_1 + \Delta_1$, $\beta_{i-1}' + \alpha_i' = 2$ ($i=3$ to $m-1$), $\beta_{m-1}' + \alpha_m' = 2.45$.

Here, $\alpha_i = \alpha_1' = 1$ ($i=2$ to $m-1$) and $\beta_i = \beta_i' = 1$ ($i=2$ to $m-1$).

When n is an even number, $\alpha_1 = 1.05$, $\beta_1 = 1$, $\alpha_m = 1$ and $\beta_m = 0.4$.

When n is an odd number, $\alpha_1' = 1.05$, $\beta_1' = 1.45$, $\alpha_m' = 1$ and $\beta_m' = 0.4$.

Further, when m=2, $\alpha_1$, $\beta_1$, $\alpha_2$, $\beta_2$, $\alpha_1'$, $\beta_1'$, $\alpha_2'$ and $\beta_2'$ are deemed to be $\alpha_1$, $\beta_1$, $\alpha_m$, $\beta_m$, $\alpha_1'$, $\beta_1'$, $\alpha_m'$ and $\beta_m'$ in the case where m is at least 3. Namely, with respect to 4 T mark, $T_{d1} = 0.95$, $\alpha_1 = 1.05$, $\beta_1 = 1$, $\alpha_2 = 1$ and $\beta_m = 0.4$, and with respect to 5 T mark, $T_{d1}' = 1$, $\alpha_1' = 1.05$, $\beta_1' = 1.45$, $\alpha_2' = 1$ and $\beta_2' = 0.4$.

When m=1, i.e. with respect to 3 T mark, $T_{d1}' = 1.15$, $\alpha_1' = 1.2$ and $\beta_1' = 0.8$.

In this recording method, at 8-times velocity, Pb was set to be constant at 0.5 mW, and erasing power Pe was set to be 4 mW, 4.5 mW, 5 mW and 5.5 mW. At each Pe, Pw was changed to carry out overwriting 10 times at each writing power to evaluate the characteristics, whereby no good results were obtained, as the clock jitter became at least 20%.

INDUSTRIAL APPLICABILITY

According to the present invention, it is possible to obtain CD-RW capable of one beam overwriting at a high speed of 24-times velocity or 32-times velocity. Further, it is possible to obtain CD-RW which is not only capable of 1-beam overwriting at 24-times velocity or 32-times velocity but also capable of overwriting at a linear velocity lower than 24-times velocity.

Further, according to the present invention, it is possible to obtain RW-DVD capable of 1-beam overwriting at a high speed of 6-times velocity, 8-times velocity, 10-times velocity or 12-times velocity. Further, it is possible to obtain RW-DVD which is not only capable of 1-beam overwriting at 6-times velocity, 8-times velocity, 10-times velocity or 12-times velocity, but also capable of overwriting at a linear velocity lower than 6-times velocity.

Further, according to the present invention, it is possible to obtain a recording method, whereby good recording can be carried out on a rewritable optical recording medium within a wide range of from a low linear velocity to a high linear velocity.

The present invention has been described in detail with reference to specific embodiments, but it should be apparent to those skilled in the art that various changes and modifications can be made without departing from the intention and the scope of the present invention.

Further, this application is based on a Japanese application (JP2002-34827) filed on Feb. 13, 2002, a Japanese application (JP2002-74818) filed on Mar. 18, 2002, a Japanese application (JP2002-126491) filed on Apr. 26, 2002, a Japanese application (JP2002-317858) filed on Oct. 31, 2002, and a Japanese application (JP2002-344557) filed on Nov. 27, 2002, and their entireties are hereby included by reference.

What is claimed is:

1. A recording method for a rewritable optical recording medium, which comprises:
   recording information on a rewritable optical recording medium by a plurality of record mark lengths and space lengths between record marks based on EFM or EFM+ modulations or (1,7) runlength limited (RLL) non-return-to-zero inverted (NRZI) modulation system, wherein:
   between record marks, a laser beam having an erasing power Pe capable of crystallizing an amorphous phase is irradiated to form spaces between record marks, and
   when the time length of one record mark is represented by nT (where T is the reference clock period), for a record mark of n=2m (where m is an integer of at least 1), of which the time length (n−j)T (where j is a real number from −2.0 to 2.0) is divided into m sections of $\alpha_i T$ and $\beta_i T$ comprising $\alpha_1 T$, $\beta_1 T$, $\alpha_2 T$, $\beta_2 T$, . . . , $\alpha_m T$ and $\beta_m T$ (provided that $\Sigma_i(\alpha_i + \beta_i) = n-j$), and for a record mark of n=2m+1 (where m is an integer of at least 1), of which the time length (n−k)T (where k is a real number from −2.0 to 2.0) is divided into m sections of $\alpha_i' T$ and $\beta_i' T$ comprising $\alpha_1' T$, $\beta_1' T$, $\alpha_2' T$, $\beta_2' T$, . . . , $\alpha_m' T$ and $\beta_m' T$ (provided that $\Sigma_i(\alpha_i' + \beta_i') = n-k$), a laser beam having a constant writing power Pw sufficient to melt the recording layer is applied within a time of $\alpha_i T$ and $\alpha_i' T$ (where i is an integer from 1 to m), and a laser beam having a bias power Pb is applied within a time of $\beta_i T$ and $\beta_i' T$ (where i is an integer from 1 to m); and further,
   when m≧3,
   for a record mark of n=2m, when the start time for nT mark is represented by $T_0$, (i) after a delay time $T_{d1}T$ from $T_0$, $\alpha_1 T$ is generated, then,
   (ii) within i=2 to m, $\beta_{i-1}T$ and $\alpha_i T$ are alternately generated in this order, while $\beta_{i-1} + \alpha_i$ is between 1.8 and 2.2 (provided that at i=2 and/or i=m, $\beta_{i-1} + \alpha_i$ may be deviated from about 2 within a range of ±0.5, and when m≧4, $\beta_{i-1}$ and $\alpha_i$ take constant values βc and αc, respectively, within i=3 to m−1), and then,
   (iii) $\beta_m T$ is generated, and
   for a record mark of n=2m+1, when the start time for nT mark is represented by $T_0$,
   (i) after a delay time $T_{d1}'T$ from $T_0$, $\alpha_1' T$ is generated, then,
   (ii) within i=2 to m, $\beta_{i-1}'T$ and $\alpha_i' T$ are alternately generated in this order, while $\beta_{i-1}' + \alpha_i'$ is between 1.8 and 2.2 (provided that at i=2 and/or i=m, $\beta_{i-1}'+\alpha_i'$ may be deviated from about 2 within a range of ±2, and when m≧4, $\beta_{i-1}'$ and $\alpha_i'$ take constant values βc and αc, respectively, within i=3 to m−1), and then, (iii) $\beta_m'T$ is generated, and with the same m, for a record mark of n=2m and a record mark of n=2m+1, $T_{d1}=T_{d1}'$, $\alpha_1=\alpha_1'$, $\beta_1=\beta_1'$ and $\alpha_m \neq \alpha_m'$, and at least one set selected from ($\beta_{m-1}$ and $\beta_{m-1}'$) and ($\beta_m$ and $\beta_m'$) takes different values.

2. The recording method according to claim 1, wherein when m is at least 3, with the same division number m, $\beta_{m-1}'+\alpha_m'+\beta_m'$ in the case where n is an odd number, is larger by from 0.5 to 1.5 than $\beta_{m-1}+\alpha_m+\beta_m$ in the case where n is an even number.

3. The recording method according to claim 1, wherein when m is at least 3, the relations of $T_{d1}'=T_{d1}$, $\alpha_1'=\alpha_1$, $\beta_1+\alpha_2=1.5$ to 2.5, $\beta_{m-1}+\alpha_m=1.5$ to 2.5, $\beta_{m-1}'=\beta_{m-1}+\Delta_{m-1}$ (where $\Delta_{m-1}=0$ to 1), $\alpha_m'=\alpha_m+\Delta_m$ (where $0<\Delta_m\leq 1$), $\beta_m'=\beta_m+\beta_m'$ (where $\Delta_m'=0$ to 1) and $\Delta_{m-1}+\Delta_m\Delta_m'=0.5$ to 1.5 are satisfied, and further, $T_{d1}$, $\alpha_1$, $\beta_1$, αc, $\beta_{m-1}$, $\Delta_{m-1}$, $\alpha_m$, $\beta_m$ and $\beta_m'$ are constant irrespective of m, and $\Delta_m$ takes either value of $\Delta_{m1}$ or $\Delta_{m2}$ depending upon m.

4. The recording method according to claim 3, wherein when m is at least 3, with the same division number m, the relations of $T_{d1}'=T_{d1}$, $\alpha_1=\alpha_1'$, $T_{d1}+\alpha_1=2$, $\beta_{m-1}'=\beta_{m-1}+\Delta_{m-1}$ (where $\Delta_{m-1}=0$ to 1), $\alpha_m'=\alpha c+\Delta_m$ (where $0<\Delta_m\leq 1$), $\Delta_{m-1}\Delta_m+\Delta_m'=0.5$ to 1.5, $\beta_m'=\beta_m+\beta_m'$ and $\Delta_m'=0$ to 1, are satisfied, and $\alpha_1$, αc, $\Delta_{m-1}$, $\Delta_m$, $\beta_m$ and $\beta_m'$ are constant irrespective of m.

5. The recording method according to claim 1, wherein when m is at least 3, $\Delta_m=\Delta_{m1}=\Delta_{m2}$.

6. The recording method according to claim 1, wherein when m is at least 3, at least one formula is satisfied among $T_{d1}+\alpha_1=2$, $\alpha_1=\alpha c$, $\beta_1+\alpha_2=2$, $\beta_{m-1}+\alpha_m=2$ and $\alpha_m=\alpha c$.

7. The recording method according to claim 1, wherein $\alpha_1'$ where n=3, is larger than $\alpha_1'$ where n is at least 4.

8. The recording method according to claim 1, wherein when $T_{d1}'$ where n=3 and 5 is represented by $T_{d1a}$ and $T_{d1c}$, respectively, $T_{d1}$ where n=4 is represented by $T_{d1b}$, and $T_{d1}$ and $T_{d1}'$ where n is at least 6 are represented by $T_{d1d}$, at least one selected from $T_{d1a}$, $T_{d1b}$ and $T_{d1c}$ takes a value different from $T_{d1d}$.

9. The recording method according to claim 1, wherein the rewritable optical recording medium is a circular disk, and recording is carried out at a plurality of recording linear velocities while controlling the recording linear density to be constant so that it will be the same as in a disk CLV-recorded at 1-time reference velocity (i.e. 1.2 m/s to 1.4 m/s in the case of CD, and 3.49 m/s in the case of DVD), in the same disk plane, wherein the maximum linear velocity $V_{max}$ among the recording linear velocities is 20-times velocity, 24-times velocity or 32-times velocity in the case of CD, and 6-times velocity, 8-times velocity, 10-times velocity or 12-times velocity in the case of DVD; and $\alpha_i=\alpha_{imax}$ (where i=1 to m) at the $V_{max}$ is from 0.5 to 2, and $\alpha_i'=\alpha_{imax}'$ (where i=1 to m) at the $V_{max}$ is from 0.5 to 2, and $\alpha_i$ and $\alpha_i'$ (where i=1 to m) are permitted to simply decrease as the linear velocity lowers.

10. The recording method according to claim 9, wherein when the minimum linear velocity $V_{min}$ is 8-times velocity, 10-times velocity, 12-times velocity or 16-times velocity in the case of CD, and 2.5-times velocity, 3-times velocity, 4-times velocity or 5-times velocity in the case of DVD, $T_{d1}+\alpha_1$, $T_{d1}'+\alpha_1'$, $\beta_{i-1}+\alpha_i=2$, and $\beta_{i-1}'+\alpha_i'=2$ (where i=3 to m−1) are, respectively, constant irrespective of the linear velocity within a linear velocity range of from the $V_{min}$ to the $V_{max}$ when m is at least 3.

11. The recording method according to claim 9, wherein at any linear velocity to be used, $\beta_m=0$ to 2, and $\beta_m'=0$ to 3, and $\beta_m$ and $\beta_m'$ are permitted to simply increase as the linear velocity lowers.

12. The recording method according to claim 9, wherein $\beta_m'$ is permitted to simply increase as the linear velocity lowers.

13. The recording method according to claim 9, wherein among $T_{d1}'$, $\alpha_1'$ and $\beta_1'$ where n=3, $T_{d1}'$ and $\beta_1'$ are permitted to simply increase as the linear velocity lowers, and $\alpha_1'$ is permitted to simply decrease as the linear velocity lowers.

14. The recording method according to claim 9, wherein at any linear velocity to be used, $\beta_i T$ (where i=1 to m) and $\beta_i'T$ (where i=1 to m−1) are at least 2 nsec.

15. The recording method according to claim 9, wherein when EFM modified information is recorded on the circular disk rewritable optical recording medium by a plurality of mark lengths, the optical recording medium is rotated so that the linear velocity at the outermost periphery of the record area of the optical recording medium, would be at least 20-times velocity, based on the reference linear velocity (1-time velocity) being a linear velocity of from 1.2 m/s to 1.4 m/s.

16. The recording method according to claim 15, wherein the disk is rotated so that the linear velocity at the innermost periphery of the record area would be at least 16-times velocity of the reference linear velocity, and the recording linear velocity becomes higher towards the outer periphery.

17. The recording method according to claim 15, wherein the record area is divided into a plurality of imaginary zones in every certain radius, and $\beta_m=0$ to 3, and further, $\beta_m$ is made to simply increase towards the inner peripheral zone, and $\alpha_i$ and $\alpha_i'$ are made to simply decrease towards the inner peripheral zone.

18. The recording method according to claim 15, wherein the values of Pb, Pw and Pe/Pw are substantially constant at any radial position.

19. The recording method according to claim 9, wherein when EFM+ modified information is recorded on the circular disk rewritable optical recording medium by a plurality of mark lengths, the optical recording medium is rotated so that the linear velocity at the outermost periphery of the record region of the optical recording medium, would be at least 6-times velocity, based on the reference linear velocity (1-time velocity) being a linear velocity of 3.49 m/s.

20. The recording method according to claim 19, wherein the disk is rotated so that the linear velocity at the innermost periphery of the record region would be at least 6-times velocity of the reference linear velocity, and the recording linear velocity becomes higher towards the outer periphery.

21. The recording method according to claim 19, wherein the record region is divided into a plurality of imaginary zones in every certain radius, and $\beta_m=0$ to 3, and further, $\beta_m$ is made to simply increase towards the inner peripheral zone, and $\alpha_i$ and $\alpha_i'$ are made to simply decrease towards the inner peripheral zone.

22. The recording method according to claim 19, wherein the values of Pb, Pw and Pe/Pw are substantially constant at any radial position.

* * * * *